US008580142B2

(12) United States Patent
Shimada et al.

(10) Patent No.: US 8,580,142 B2
(45) Date of Patent: Nov. 12, 2013

(54) LIQUID CRYSTAL COMPOUND, LIQUID CRYSTAL COMPOSITION AND LIQUID CRYSTAL DISPLAY DEVICE

(75) Inventors: Teru Shimada, Chiba (JP); Masahide Kobayashi, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 635 days.

(21) Appl. No.: 12/677,067

(22) PCT Filed: Sep. 1, 2008

(86) PCT No.: PCT/JP2008/065665

§ 371 (c)(1), (2), (4) Date: Mar. 8, 2010

(87) PCT Pub. No.: WO2009/034867

PCT Pub. Date: Mar. 19, 2009

(65) Prior Publication Data

US 2010/0328600 A1 Dec. 30, 2010

(30) Foreign Application Priority Data

Sep. 10, 2007 (JP) ................................ 2007-233700

(51) Int. Cl.

| | |
|---|---|
| *C09K 19/30* | (2006.01) |
| *C09K 19/32* | (2006.01) |
| *C09K 19/34* | (2006.01) |
| *C09K 19/02* | (2006.01) |
| *C07C 25/13* | (2006.01) |

(52) U.S. Cl.

USPC .............. 252/299.01; 252/299.6; 252/299.62; 252/299.63; 428/1.1; 349/182; 544/298; 544/335; 544/406; 544/408; 546/339; 549/416; 549/420; 549/427; 568/642; 568/647

(58) Field of Classification Search

USPC ............... 252/299.01, 299.6, 299.62, 299.63; 428/1.1; 349/1, 56, 182; 544/298, 335, 544/406, 408; 546/339; 549/416, 420, 427; 560/118; 568/642, 647; 570/129

See application file for complete search history.

(56) References Cited

U.S. PATENT DOCUMENTS

| | | | | |
|---|---|---|---|---|
| 5,204,019 | A | 4/1993 | Reiffenrath et al. | |
| 5,236,620 | A | 8/1993 | Reiffenrath et al. | |
| 6,022,492 | A | 2/2000 | Nonaka et al. | |
| 6,190,576 | B1 | 2/2001 | Andou et al. | |
| 6,319,570 | B1 * | 11/2001 | Andou et al. | 428/1.1 |
| 6,468,608 | B1 | 10/2002 | Bremer et al. | |
| 2003/0078447 | A1 | 4/2003 | Kirsch et al. | |

FOREIGN PATENT DOCUMENTS

| | | |
|---|---|---|
| DE | 3906058 | 9/1989 |
| JP | 2002-193853 | 7/2002 |

OTHER PUBLICATIONS

Article Titled "The synthesis and transition temperatures of some ferroelectric host materials based on 4- and 4'-(trans-4-alkylcyclohexylmethoxy)-2,3-difluorobiphenyls" jointly authored by Michael Hird et al, in Liquid Crystals, 1994,vol. 16, No. 4, pp. 625-641.

Article Titled "Synthesis and physical properties of laterally fluorinated liquid crystals containing 1, 3, 2-dioxaborinane and cyclohexyl units", jointly authored by Guixiang Sun et al., in Liquid Crystals, Aug. 2004, vol. 31, No. 8, pp. 1151-1158.

Article Titled "Synthesis of Laterally difluorinated Ester Liquid Crystal", jointly authored by Wang, et al., in Fine Chemicals, Jun. 2006, vol. 23, pp. 524-526.

Article Titled "EI Mass Spectra of Negative Fluorinated Liquid Crystal Compounds", jointly authored by Yan et al., in Chinese Journal of Liquid Crystals and Displays, Apr. 2007, vol. 22, No. 2, pp. 146-150.

* cited by examiner

*Primary Examiner* — Geraldina Visconti

(74) *Attorney, Agent, or Firm* — J.C. Patents

(57) ABSTRACT

The invention provides a liquid crystal compound having stability to heat, light and so forth, a wide temperature range of a nematic phase, a small viscosity, a suitable optical anisotropy, a suitable elastic constant $K_{33}$, a suitable and negative dielectric anisotropy, and an excellent compatibility with other liquid crystal compounds. The invention provides a liquid crystal composition containing the compound described above and having stability to heat, light and so forth, a small viscosity, a suitable optical anisotropy, a suitable and negative dielectric anisotropy, a suitable elastic constant $K_{33}$, a low threshold voltage, a high maximum temperature of a nematic phase, and a low minimum temperature of the nematic phase.

The invention also provides a liquid crystal display device having a short response time, a small power consumption, a low driving voltage, and a large contrast, and containing the composition described above which can be used in a large temperature range.

For example, a liquid crystal compound having four or more rings in which the central ring has 2,3-difluorophenoxy such as trans-4'-[2,3-difluoro-4-(trans-4-propylcyclohexyl)phenoxymethyl]-trans-4-pentylbicyclohexyl is provided. Further provided is a liquid crystal composition containing the compound, and a liquid crystal display device using this liquid crystal composition.

18 Claims, No Drawings

LIQUID CRYSTAL COMPOUND, LIQUID CRYSTAL COMPOSITION AND LIQUID CRYSTAL DISPLAY DEVICE

FIELD OF THE INVENTION

The invention relates to a new liquid crystal compound which is useful as a material for a liquid crystal display device, and a liquid crystal composition including this compound. The invention relates more specifically to a compound which has four or more rings and the central ring among these being 2,3-difluorophenoxy, a liquid crystal composition including this compound, and a liquid crystal display device including this liquid crystal composition.

BACKGROUND OF THE INVENTION

A liquid crystal display device typified by a liquid crystal display panel, a liquid crystal display module and so forth utilizes optical anisotropy, dielectric anisotropy and so forth which are possessed by a liquid crystal compound (a liquid crystal compound means in this invention a generic term for a compound having a nematic phase, a smectic phase and so forth, and a compound having no liquid crystal phases but useful as a component of a liquid crystal composition.). As operation modes of this liquid crystal display device, a variety of modes are known, such as a PC (phase change), TN (twisted nematic), STN (super twisted nematic), BTN (bistable twisted nematic), ECB (electrically controlled birefringence), OCB (optically compensated bend), IPS (inch-plane switching), VA (vertical alignment), or PSA (Polymer sustained alignment) mode.

It is known that among these operation modes, the ECB, IPS, VA modes and so forth are utilizing a homeotropic property of liquid crystal molecules, and that a limited-viewing angle which is a disadvantage of conventional display modes such as the TN and STN modes can be improved especially by use of the IPS and VA modes.

A large number of liquid crystal compounds in which hydrogen at the lateral position on the benzene-ring is replaced by fluorine have been studied until now as components for a liquid crystal composition having a negative dielectric anisotropy which is usable to the liquid crystal display device with these operation modes (For example, refer to the patent documents Nos. 1 to 5 or the non-patent documents Nos. 1 and 2.).

For example, the patent document No. 1 or the non-patent document No. 1 shows a three-ring compound such as formula (ref. 1) or formula (ref. 2). This compound has a range exhibiting liquid crystal phases (a mesophase range) that is narrow, and a clearing point that is low when used for a liquid crystal composition.

The patent document No. 2 shows a four-ring compound such as formula (ref. 3). However, the dielectric anisotropy of this compound is not sufficiently large negatively.

The patent document No. 3 shows a four-ring compound such as formula (ref. 4) or formula (ref. 5). However, a clearing point is low when this compound is used for a liquid crystal composition.

The patent document No. 4 shows a four-ring compound such as formula (ref. 6). However, the dielectric anisotropy of this compound is not sufficiently large negatively.

The patent document No. 5 shows a four-ring compound such as formula (ref. 7). However, the dielectric anisotropy of this compound is not sufficient large negatively.

The non-patent document No. 2 shows a four-ring compound such as formula (ref. 8). However, this compound has a range exhibiting liquid crystal phases (a mesophase range) that is narrow, and a clearing point that is low when used for a liquid crystal composition. Furthermore, the dielectric anisotropy has a positive value instead of a negative one.

(ref. 1)

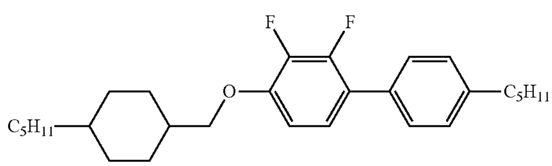

(ref. 2)

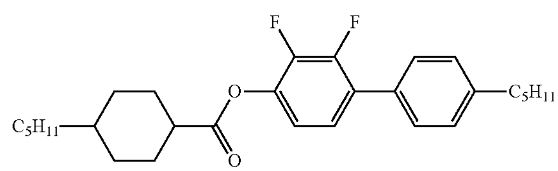

(ref. 3)

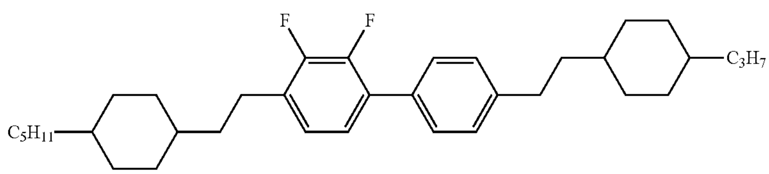

(ref. 4)

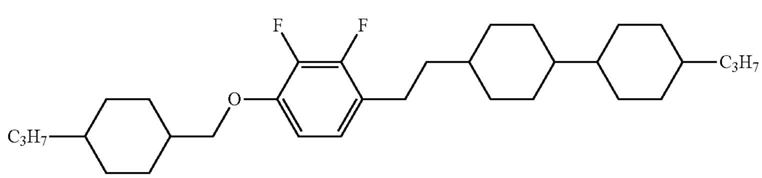

(ref. 5)

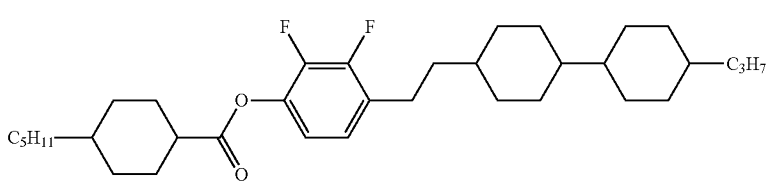

-continued (ref. 6)

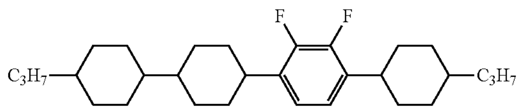

(ref. 7)

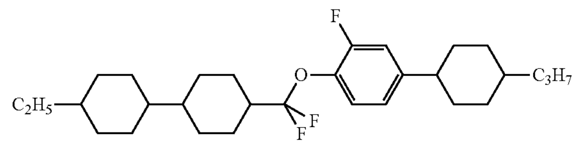

(ref. 8)

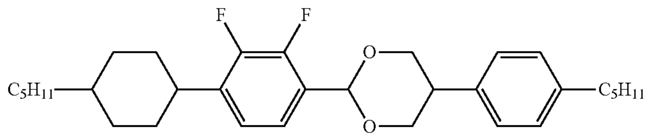

The patent documents cited herein are No. 1: German Patent 3,906,058 C; No. 2: WO 89/08687 A; No. 3: WO 89/08689 A; No. 4: JP 2002-193853 A; and No. 5: German Patent 10,136,751 A (2002). The non-patent documents cited are No. 1: Liquid Crystals (1994), 16 (4), 625-641 and No. 2: Liquid Crystals (2004), 31 (8), 1151-1158.

DISCLOSURE OF THE INVENTION

Subjects to be Solved by the Invention

In view of the circumstances described above, even liquid crystal display devices by means of operation modes such as the IPS and VA modes are more problematic than CRTs for use of display devices, and, for example, an improvement of a response speed, an improvement of contrast, and a decrease in driving voltage are required.

The display devices operated by means of the IPS or VA mode described above are composed of a liquid crystal composition mainly having a negative dielectric anisotropy. In order to further improve these characteristics and so forth, it is required for the liquid crystal compounds contained in this liquid crystal composition to have the characteristics shown in items (1) to (8) below. That is to say:

(1) being chemically stable and physically stable, (2) having a high clearing point (transition temperature on a liquid crystal phase-an isotropic phase), (3) being low in a minimum temperature of liquid crystal phases (a nematic phase, a smectic phase and so forth), especially that of the nematic phase, (4) being low in viscosity, (5) having a suitable optical anisotropy, (6) having a suitable and negative dielectric anisotropy, (7) having a suitable elastic constant $K_{33}$ ($K_{33}$: bend elastic constant), and (8) being excellent in compatibility with other liquid crystal compounds.

A voltage holding ratio can be increased by use of a composition containing a chemically and physically stable liquid crystal compound as described in item (1), for a display device.

The temperature range of a nematic phase can be widened in a composition which contains a liquid crystal compound having a high clearing point or a low minimum temperature of liquid crystal phases as described in items (2) and (3), and thus a display device is usable in a wide temperature range.

Furthermore, when a composition containing a compound with a small viscosity as described in item (4) or a compound having a large elastic constant $K_{33}$ with regard to in item (7) is used for a display device, response speed can be improved, and in the case of a display device using a composition which contains a compound having a suitable optical anisotropy as described in item (5), an improvement of the contrast in a display device can be expected. Optical anisotropy is required in a range of small to large values according to designs of a device. Recently, a method for improving the response speed by means of a smaller cell thickness has been investigated, whereby a liquid crystal composition having a suitable optical anisotropy has also been required.

Moreover, when a liquid crystal compound has a large negative dielectric anisotropy, the threshold voltage of the liquid crystal composition containing this compound can be decreased. Hence, the driving voltage of a display device can be decreased and electric power consumption can also be decreased in the case of a display device using a composition containing a compound which has a suitable and negative dielectric anisotropy as described in item (6). Further, the driving voltage of a display device can be decreased and the electric power consumption can also decreased by use of a composition containing a compound with a small elastic constant $K_{33}$ with regard to item (7).

The liquid crystal compound is generally used as a composition prepared by being mixed with many other liquid crystal compounds in order to exhibit characteristics which cannot be attained with a single compound. Accordingly, it is desirable that a liquid crystal compound used for a display device has an excellent compatibility with other liquid crystal compounds and so forth, as described in item (8). Because the display device may also be used in a wide temperature range including a lower temperature than the freezing point, a compound which exhibits an excellent compatibility even in a low temperature region may be desirable.

The first aim of the invention is to provide a liquid crystal compound having stability to heat, light and so forth, a nematic phase in a wide temperature range, a small viscosity, a suitable optical anisotropy, and a suitable elastic constant $K_{33}$, and further having a suitable and negative dielectric anisotropy and an excellent compatibility with other liquid crystal compounds.

The second aim of the invention is to provide a liquid crystal composition which satisfies at least one characteristic among the characteristics such as stability to heat, light and so forth, a small viscosity, a suitable optical anisotropy, a suitable elastic constant $K_{33}$, and a low threshold voltage, and also a high maximum temperature of a nematic phase (phase-transition temperature on a nematic phase-an isotropic phase) and a low minimum temperature of the nematic phase. It is also the aim to provide a liquid crystal composition having a suitable balance with respect to at least two characteristics.

The third aim of the invention is to provide a liquid crystal display device, which includes the composition described above, having a short response time, a small power consumption, a low driving voltage, a large contrast, and a wide and usable temperature range.

Means to Solve the Subjects

The inventors have keenly studied in view of these subjects described above and thus found that a compound which has four or more rings and the central ring among these being 2,3-difluorophenoxy has at least one characteristic among characteristics such as stability to heat, light and so forth, liquid crystal phases in a wide temperature range, a small viscosity, a suitable optical anisotropy, a suitable elastic constant $K_{33}$, a large negative dielectric anisotropy, and an excellent compatibility with other liquid crystal compounds.

They have also found that a liquid crystal composition including this compound has at least one characteristic among characteristics such as a low threshold voltage, a high maximum temperature of a nematic phase, and a low minimum temperature of the nematic phase in addition to the characteristics above, or has at least two of the characteristics are suitably balanced.

They have further found that a liquid crystal display device including this composition has a short response time, a small electric power consumption, a small driving voltage, a large contrast ratio, and a wide and usable temperature range. On the basis of the above findings, the invention has been completed.

The invention includes item 1 to item 17 described below.

[Item 1] A compound represented by formula (a):

(a)

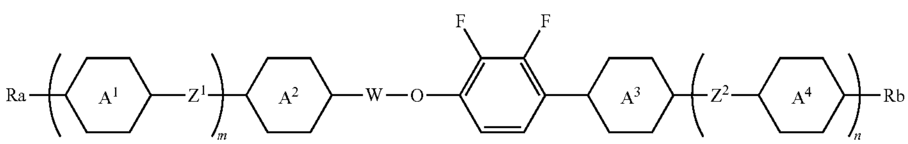

in formula (a),

Ra and Rb are each independently hydrogen, alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons, and in these alkyl, alkenyl, alkoxy, alkoxyalkyl, or alkenyloxy, arbitrary hydrogen may be replaced by fluorine;

ring $A^1$, ring $A^2$, ring $A^3$, and ring $A^4$ are each independently 1,4-cyclohexylene, 1,4-cyclohexenylene, tetrahydropyran-2,5-diyl, pyrimidine-2,5-diyl, pyridine-2,5-diyl, 1,4-phenylene, naphthalene-2,6-diyl, decahydronaphthalene-2,6-diyl, or 1,2,3,4-tetrahydronaphthalene-2,6-diyl, and in these rings, arbitrary hydrogen may be replaced by fluorine;

$Z^1$ and $Z^2$ are each independently a single bond, $-(CH_2)_2-$, $-(CH_2)_4-$, $-CH{=}CH-$, $-C{\equiv}C-$, $-CH_2O-$, $-OCH_2-$, $-COO-$, $-OCO-$, $-CF_2O-$, or $-OCF_2-$;

W is $-CH_2-$, $-CO-$, or $-CF_2-$; and m and n are each independently 0, 1, or 2, and the sum of m and n is 1 or 2.

[Item 2] The compound according to item 1, wherein in formula (a),

Ra and Rb are each independently alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons; and ring $A^1$, ring $A^2$, ring $A^3$, and ring $A^4$ are each independently 1,4-cyclohexylene, 1,4-cyclohexenylene, tetrahydropyran-2,5-diyl, pyrimidine-2,5-diyl, 1,4-phenylene, 2-fluoro-1,4-phenylene, 3-fluoro-1,4-phenylene, or 2,3-difluoro-1,4-phenylene.

[Item 3] A compound represented by any one of formula (a-1) and formula (a-2):

(a-1)

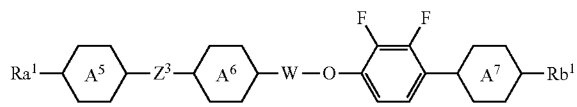

(a-2)

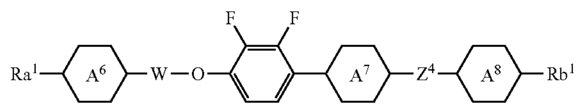

in formula (a-1) and formula (a-2), $Ra^1$ and $Rb^1$ are each independently alkyl having 1 to 12 carbons, alkoxy having 1 to 11 carbons, or alkenyl having 2 to 12 carbons;

ring $A^5$, ring $A^6$, ring $A^7$, and ring $A^8$ are each independently 1,4-cyclohexylene, 1,4-phenylene, 2-fluoro-1,4-phenylene, or 3-fluoro-1,4-phenylene;

$Z^3$ and $Z^4$ are each independently a single bond, $-(CH_2)_2-$, $-CH{=}CH-$, $-C{\equiv}C-$, $-CH_2O-$, $-OCH_2-$, $-COO-$, or $-OCO-$; and W is $-CH_2-$, $-CO-$, or $-CF_2-$.

[Item 4] The compound according to item 3, wherein in formulas (a-1) and (a-2), $Z^3$ and $Z^4$ are each independently a single bond or $-(CH_2)_2-$.

[Item 5] A compound represented by any one of formulas (a-1-1) to (a-1-6) and formulas (a-2-1) to (a-2-6):

(a-1-1)

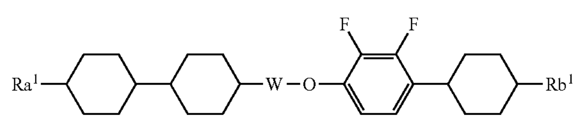

(a-1-2)

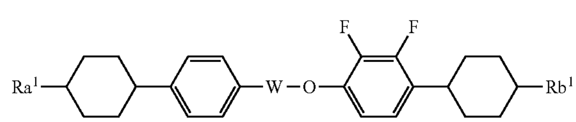

(a-1-3)

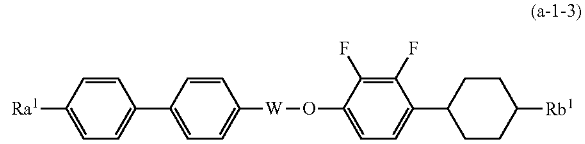

-continued (a-1-4)

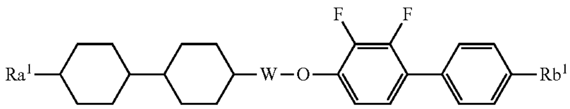

(a-1-5)

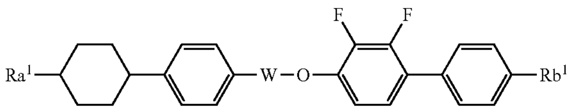

(a-1-6)

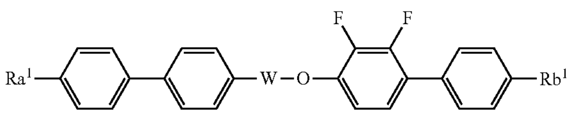

(a-2-1)

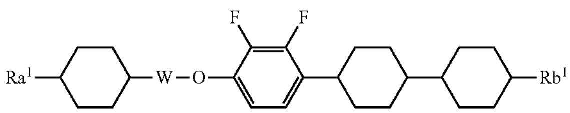

(a-2-2)

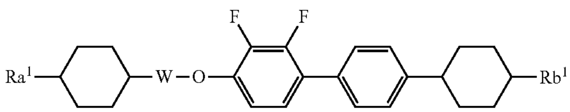

(a-2-3)

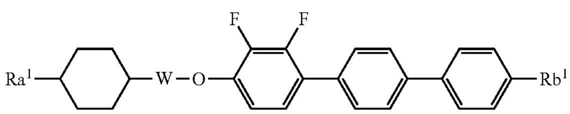

(a-2-4)

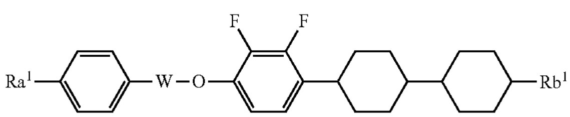

(a-2-5)

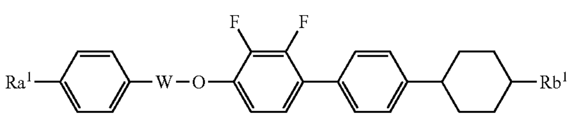

(a-2-6)

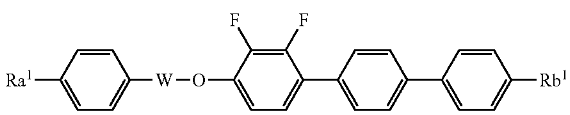

in formulas (a-1-1) to (a-1-6) and formulas (a-2-1) to (a-2-6), $Ra^1$ and $Rb^1$ are each independently alkyl having 1 to 12 carbons, alkoxy having 1 to 11 carbons, or alkenyl having 2 to 12 carbons; and W is —$CH_2$—, —CO—, or —$CF_2$—.

[Item 6] The compound according to item 5, wherein W is —$CH_2$— in formulas (a-1-1) to (a-1-6) and formulas (a-2-1) to (a-2-6).

[Item 7] The compound according to item 5, wherein W is —CO— in formulas (a-1-1) to (a-1-6) and formulas (a-2-1) to (a-2-6).

[Item 8] The compound according to item 5, wherein W is —$CF_2$— in formulas (a-1-1) to (a-1-6) and formulas (a-2-1) to (a-2-6).

[Item 9] A liquid crystal composition having a negative dielectric anisotropy that includes a first component which is at least one compound selected from the compounds according to any one of items 1 to 8 and a second component which is at least one compound selected from the group of compounds represented by formulas (e-1) to (e-3):

(e-1)

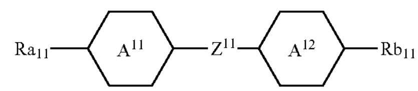

(e-2)

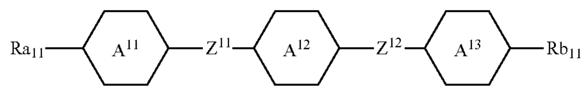

(e-3)

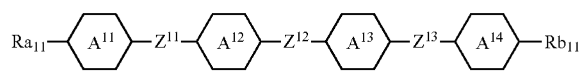

in formulas (e-1) to (e-3), $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine;

ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene,pyrimidine-2,5-diyl, 1,3-dioxane 2,5-diyl, or tetrahydropyran-2,5-diyl; and $Z^{11}$, $Z^{12}$, and $Z^{13}$ are each independently a single bond, —$(CH_2)_2$—, —CH═CH—, —C≡C—, —COO—, or —$CH_2O$—.

[Item 10] A liquid crystal composition having a negative dielectric anisotropy that includes a first component which is at least one compound selected from the group of compounds represented by formulas (a-1-1) to (a-1-6) and formulas (a-2-1) to (a-2-6) according to item 5, and a second component selected from the group of compounds represented by formulas (e-1) to (e-3) according to item 9.

[Item 11] The liquid crystal composition according to item 10, wherein the content ratio of the first component is in the range of 5% to 60% by weight, and the content ratio of the second component is in the range of 40% to 95% by weight, based on the total weight of the liquid crystal composition.

[Item 12] The liquid crystal composition according to item 9 or 10, that further includes a third component which is at least one compound selected from the group of compounds represented by formulas (g-1) to (g-6), in addition to the first and second components:

(g-1)

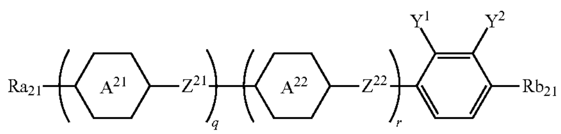

(g-2)

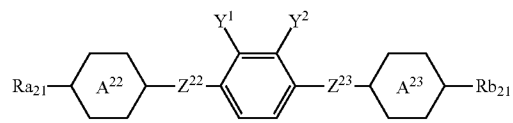

(g-3)

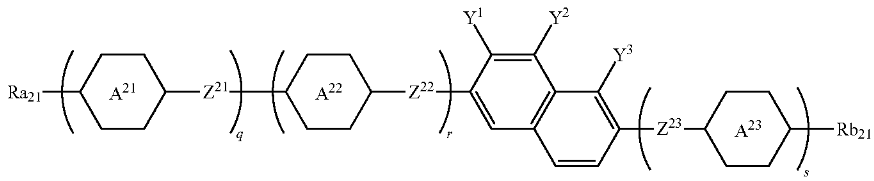

(g-4)

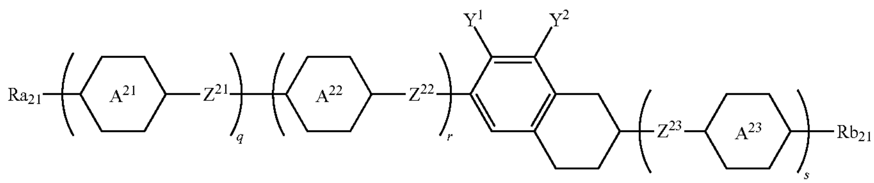

(g-5)

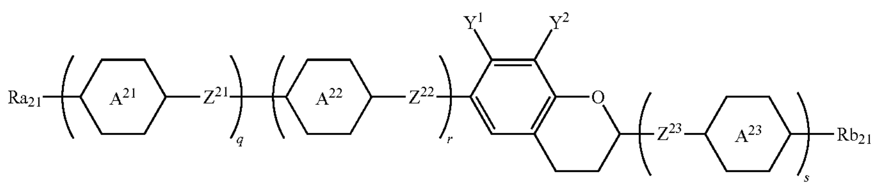

(g-6)

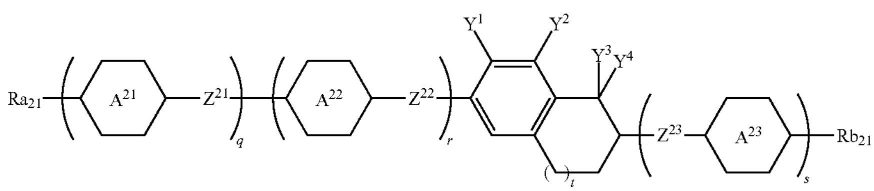

in formulas (g-1) to (g-6), $Ra_{21}$ and $Rb_{21}$ are each independently hydrogen or alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine;

ring $A^{21}$, ring $A^{22}$, and ring $A^{23}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl;

$Z^{21}$, $Z^{22}$, and $Z^{23}$ are each independently a single bond, —$(CH_2)_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$—, or —$CH_2O$—;

$Y^1$, $Y^2$, $Y^3$, and $Y^4$ are each independently fluorine or chlorine;

q, r, and s are each independently 0, 1, or 2, and q+r+s is 1, 2, or 3; and t is 0, 1, or 2.

[Item 13] The liquid crystal composition according to item 12, wherein the third component is at least one compound selected from the group of compounds represented by formulas (h-1) to (h-7):

(h-1)

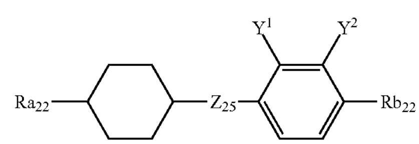

(h-2)

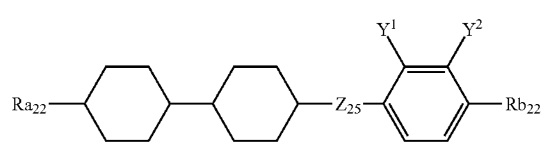

(h-3)

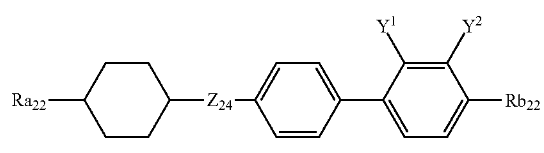

-continued (h-4)

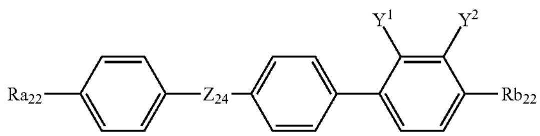

(h-5)

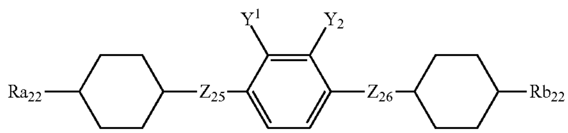

(h-6)

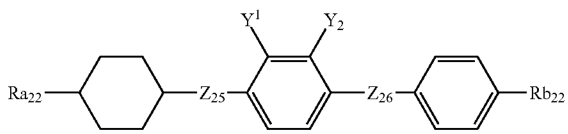

(h-7)

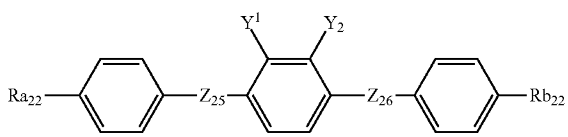

in formulas (h-1) to (h-7), $Ra_{22}$ and $Rb_{22}$ are a straight-chain alkyl having 1 to 8 carbons, a straight-chain alkenyl having 2 to 8 carbons, or alkoxy having 1 to 7 carbons;

$Z^{24}$, $Z^{25}$, and $Z^{26}$ are a single bond, —$(CH_2)_2$—, —COO—, —OCO—, —$CH_2O$—, or —$OCH_2$—; and $Y^1$ and $Y^2$ are simultaneously fluorine or one of $Y^1$ and $Y^2$ is fluorine and the other is chlorine.

[Item 14] A liquid crystal composition having a negative dielectric anisotropy that includes a first component which is at least one compound selected from the group of compounds represented by formulas (a-1-1) to (a-1-6) and formulas (a-2-1) to (a-2-6) according to item 5, a second component which is at least one compound selected from the group of compounds represented by formulas (e-1) to (e-3) according to item 9, and a third component which is at least one compound selected from the group of compounds represented by formulas (h-1) to (h-7) according to item 13.

[Item 15] The liquid crystal composition according to any one of items 12 to 14, wherein the content ratio of the first component is in the range of 5% to 60% by weight, the content ratio of the second component is in the range of 20% to 75% by weight, and the content ratio of the third component is in the range of 20% to 75% by weight, based on the total weight of the liquid crystal composition.

[Item 16] A liquid crystal display device that includes the liquid crystal composition according to any one of items 9 to 15.

[Item 17] The liquid crystal display device according to item 16, wherein the operation mode thereof is a VA mode or an IPS mode, and the driving mode thereof is an active matrix mode.

Effect of the Invention

The liquid crystal compound of the invention has stability to heat, light and so forth, liquid crystal phases in a wide temperature range, a small viscosity, a suitable optical anisotropy, and a suitable elastic constant $K_{33}$ ($K_{33}$: bend elastic constant), and also has a suitable and negative dielectric anisotropy and an excellent compatibility with other liquid crystal compounds. The liquid crystal compound is excellent especially in view of a large negative dielectric anisotropy, a high maximum temperature of a nematic phase, and then an excellent compatibility with other liquid crystal compounds.

The liquid crystal composition of the invention has a small viscosity, a suitable optical anisotropy, a suitable elastic constant $K_{33}$, a suitable and negative dielectric anisotropy, a low threshold voltage, a high maximum temperature of a nematic phase, and a low minimum temperature of the nematic phase. The liquid crystal composition is excellent especially in view of a suitable and negative optical anisotropy and a high maximum temperature of a nematic phase.

The liquid crystal display device of the invention is characterized by including the above composition, and consequently has a short response time, a small power consumption, a small driving voltage, a large contrast ratio, and a wide and usable temperature range. The above composition can be suitably used for a liquid crystal display device with the display mode such as a PC, TN, STN, ECB, OCB, IPS, VA, or PSA mode. It can be suitably used especially for a liquid crystal display device with the IPS, VA, or PSA mode.

BEST EMBODIMENT TO CARRY OUT THE INVENTION

Terms are used in this specification as follows. A liquid crystal compound is a generic term for a compound having liquid crystal phases such as a nematic phase and a smectic phase, and also for a compound having no liquid crystal phases but useful as a component for a liquid crystal composition. The terms, a liquid crystal compound, a liquid crystal composition, and a liquid crystal display device may be abbreviated to a compound, a composition, and a device, respectively. A liquid crystal display device is a generic term for a liquid crystal display panel and a liquid crystal display module. A maximum temperature of a nematic phase is the phase transition temperature of the nematic phase to an isotropic phase, and may simply be abbreviated to a maximum temperature. A minimum temperature of the nematic phase may simply be abbreviated to a minimum temperature. The compounds represented by formula (a) may be abbreviated to the compound (a). In formula (a) and so forth, the symbols $A^1$, $A^2$, $A^3$, $A^4$ and so forth surrounded by a hexagonal shape correspond to ring $A^1$, ring $A^2$, ring $A^3$, ring $A^4$ and so forth, respectively. The amount of a compound expressed as a percentage means a weight percentage (% by weight) based on the total weight of its composition. The invention will be further explained below.

[Liquid Crystal Compound (a)]

The liquid crystal compound of the invention has a structure represented by formula (a) (hereinafter the compound is also referred to as "the compound (a)").

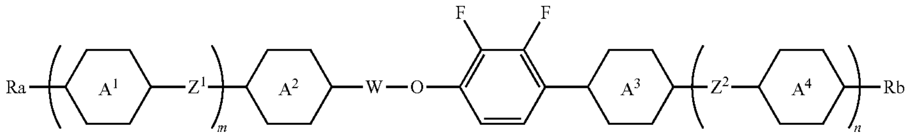

(a)

In formula (a), Ra and Rb are each independently hydrogen, alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons, and in these alkyl, alkenyl, alkoxy, alkoxyalkyl, and alkenyloxy, hydrogen may be replaced by fluorine.

Ring $A^1$, ring $A^2$, ring $A^3$, and ring $A^4$ are each independently 1,4-cyclohexylene, 1,4-cyclohexenylene, tetrahydropyran-2,5-diyl, pyrimidine-2,5-diyl, pyridine-2,5-diyl, 1,4-phenylene, naphthalene-2,6-diyl, decahydronaphthalene-2,6-diyl, or 1,2,3,4-tetrahydronaphthalene-2,6-diyl and in these rings, hydrogen may be replaced by fluorine.

When m is 2, two rings $A^1$ may be the same or different, and when n is 2, two rings $A^4$ may be the same or different.

The symbols $Z^1$ and $Z^2$ are each independently a single bond, —$(CH_2)_2$—, —$(CH_2)_4$—, —CH═CH—, —C≡C—, —$CH_2O$—, —$OCH_2$—, —COO—, —OCO—, —$CF_2O$—, or —$OCF_2$—.

When m is 2, two rings $Z^1$ may be the same or different, and when n is 2, two rings $Z^2$ may be the same or different.

The symbol W is —$CH_2$—, —CO—, or —$CF_2$—.

The symbols m and n are each independently 0, 1, or 2, and the sum of m and n is 1 or 2.

As described above, the compound (a) has four or more rings, the central ring of these is 2,3-difluorophenoxy, and the 2,3-difluorophenoxy is bonded to another ring through a single bond at the 4-position. The compound (a) has liquid crystal phases in a wide temperature range, a small viscosity, a suitable optical anisotropy, a large negative dielectric anisotropy, and an excellent compatibility with other liquid crystal compounds by an effect of the structure. The compound (a) is excellent especially in view of excellent compatibility with other liquid crystal compounds in spite of a large negative dielectric anisotropy and a high maximum temperature of a nematic phase.

It is possible to adjust optionally physical properties, such as optical anisotropy and dielectric anisotropy by suitably selecting Ra, Rb, ring $A^1$, ring $A^2$, ring $A^3$, ring $A^4$, $Z^1$, $Z^2$, W, m, and n of the compound (a). Desirable Ra, Rb, ring $A^1$, ring $A^2$, ring $A^3$, ring $A^4$, $Z^1$, $Z^2$, W, m, and n of the compound (a) and the effects of these kinds on the physical properties of the compound (a) will be explained below.

In formula (a), Ra and Rb are each independently hydrogen, alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons and in these alkyl, alkenyl, alkoxy, alkoxyalkyl, and alkenyloxy, arbitrary hydrogen may be replaced by fluorine.

Specific examples of the alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, and —$C_{12}H_{25}$;

specific examples of the alkenyl include —CH═$CH_2$, —CH═$CHCH_3$, —$CH_2CH$═$CH_2$, —CH═$CHC_2H_5$, —$CH_2CH$═$CHCH_3$, —$(CH_2)_2CH$═$CH_2$, —CH═$CHC_3H_7$, —$CH_2CH$═$CHC_2H_5$, —$(CH_2)_2CH$═$CHCH_3$, and —$(CH_2)_3CH$═$CH_2$;

specific examples of the alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, and —$OC_{11}H_{23}$;

specific examples of the alkoxyalkyl include —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$, and —$(CH_2)_5OCH_3$; and specific examples of the alkenyloxy include —$OCH_2CH$═$CH_2$, —$OCH_2CH$═$CHCH_3$, and —$OCH_2CH$═$CHC_2H_5$.

Specific examples of the alkyl in which hydrogen is replaced by halogen include —$CH_2F$, —$CHF_2$, —$CF_3$, —$(CH_2)_2F$, —$CF_2CH_2F$, —$CF_2CHF_2$, —$CH_2CF_3$, —$CF_2CF_3$, —$(CH_2)_3F$, —$(CF_2)_2CF_3$, —$CF_2CHFCF_3$, and —$CHFCF_2CF_3$;

specific examples of the alkenyl in which hydrogen is replaced by halogen include —CH═CHF, —CH═$CF_2$, —CF═CHF, —CH═$CHCH_2F$, —CH═$CHCF_3$, and —$(CH_2)_2CH$═$CF_2$; and specific examples of the alkoxy in which hydrogen is replaced by halogen include —$OCF_3$, —$OCHF_2$, —$OCH_2F$, —$OCF_2CF_3$, —$OCF_2CHF_2$, —$OCF_2CH_2F$, —$OCF_2CF_2CF_3$, —$OCF_2CHFCF_3$, and —$OCHFCF_2CF_3$.

When Ra and Rb are straight-chains in the compound (a), the temperature range of liquid crystal phases is wide and viscosity is small. The compound in which Ra or Rb is an optically active group is useful as a chiral dopant . A reverse twist domain which will occur in a device can be prevented by adding this compound to a composition. The compound in which Ra and Rb are optically inactive groups is useful as a component of a composition.

When Ra or Rb is alkenyl, a desirable configuration depends on the position of a double bond. A desirable configuration of —CH═CH— in the alkenyl depends on the position of the double bond. A trans-configuration is preferable in the alkenyl having a double bond at an odd-numbered position, such as —CH═$CHCH_3$, —CH═$CHC_3H_7$, —$(CH_2)_2CH$═$CHCH_3$, and —$(CH_2)_4CH$═$CHC_3H_7$. A cis-configuration is preferable in the alkenyl having a double bond at an even-numbered position, such as —$CH_2CH$═$CHCH_3$, —$(CH_2)_3CH$═$CHC_2H_5$, and —$(CH_2)_5CH$═$CHCH_3$. An alkenyl compound having a desirable configuration has a high maximum temperature or a wide temperature range of liquid crystal phases and a large elastic constant ratio $K_{33}/K_{11}$ ($K_{33}$: bend elastic constant, $K_{11}$: spray elastic constant).

In the alkenyl, $CH_2$═CH—$CH_2$—$CH_2$—CH═CH— in which the double bonds are nonadjacent is preferable to $CH_2$═CH—CH═CH—$CH_2$—$CH_2$— in which the double bonds are adjacent, in view of the stability of the compound.

Examples of desirable Ra and Rb are —$CH_3$, —$C_2H_5$, —$C_3H_7$, —$C_4H_9$, —$C_5H_{11}$, —$C_6H_{13}$, —$C_7H_{15}$, —CH═$CH_2$, —CH═$CHCH_3$, —$CH_2CH$═$CH_2$, —CH═$CHC_2H_5$, —$CH_2CH$═$CHCH_3$, —$(CH_2)_2CH$═$CH_2$, —CH═$CHC_3H_7$, —$CH_2CH$═$CHC_2H_5$, —$(CH_2)_2CH$═$CHCH_3$, —$(CH_2)_3CH{=}CH_2$, —$OCH_3$, —$OC_2H_5$, —$OC_3H_7$, —$OC_4H_9$, —$OC_5H_{11}$, —$OC_6H_{13}$, —$CH_2OCH_3$, —$CH_2OC_2H_5$, —$CH_2OC_3H_7$, —$(CH_2)_2OCH_3$, —$(CH_2)_2OC_2H_5$, —$OCH_2CH{=}CH_2$, —$OCH_2CH{=}CHCH_3$, —$OC_2H_4CH{=}CH_2$, —$OC_2H_4CH{=}CHCH_3$, —$OC_3H_6CH{=}CH_2$, and —$OC_3H_6CH{=}CHCH_3$.

Examples of more desirable Ra and Rb are —$CH_3$, —$C_2H_5$, —$C_3H_7$, —$C_4H_9$, —$C_5H_{11}$, —$CH{=}CH_2$, —$CH{=}CHCH_3$, —$(CH_2)_2CH{=}CH_2$, —$CH{=}CHC_3H_7$, —$(CH_2)_2CH{=}CHCH_3$, —$OCH_3$, —$OC_2H_5$, —$OC_3H_7$, —$OC_4H_9$, —$CH_2OCH_3$, —$CH_2OC_2H_5$, —$CH_2OC_3H_7$, —$OCH_2CH{=}CH_2$, —$OCH_2CH{=}CHCH_3$, and —$OC_3H_6CH{=}CHCH_3$.

Examples of most desirable Ra and Rb are —$CH_3$, —$C_2H_5$, —$C_3H_7$, —$C_4H_9$, —$C_5H_{11}$, —$CH{=}CH_2$, —$CH{=}CHCH_3$, —$(CH_2)_2CH{=}CH_2$, —$CH{=}CHC_3H_7$, —$(CH_2)_2CH{=}CHCH_3$ , —$OCH_3$, —$OC_2H_5$, —$OC_3H_7$, and —$OC_4H_9$.

In formula (a) , ring $A^1$, ring $A^2$, ring $A^3$, and ring $A^4$ are each independently 1,4-cyclohexylene, 1,4-cyclohexenylene, tetrahydropyran-2,5-diyl, pyrimidine-2,5-diyl, pyridine-2,5-diyl, 1,4-phenylene, naphthalene-2,6-diyl, decahydronaphthalene-2,6-diyl, or 1,2,3,4-tetrahydronaphthalene-2,6-diyl and in these rings, hydrogen may be replaced by fluorine.

Specific examples of ring $A^1$, ring $A^2$, ring $A^3$, and ring $A^4$ include rings (R-1) to (R-36).

(R-1)

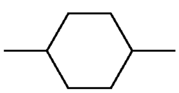

(R-2)

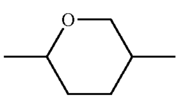

(R-3)

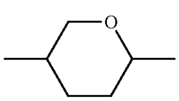

(R-4)

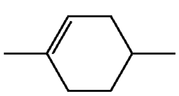

(R-5)

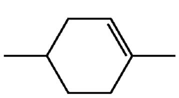

(R-6)

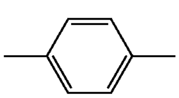

(R-7)

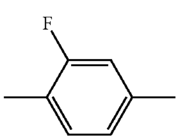

(R-8)

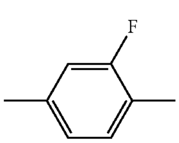

-continued (R-9)

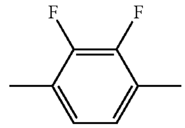

(R-10)

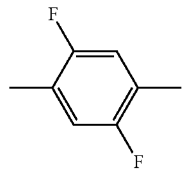

(R-11)

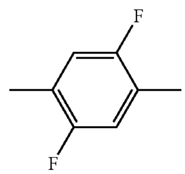

(R-12)

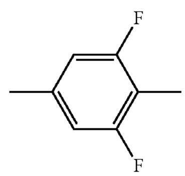

(R-13)

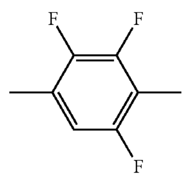

(R-14)

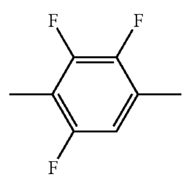

(R-15)

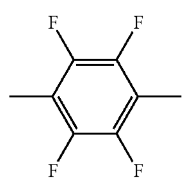

(R-16)

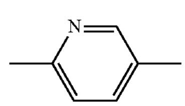

(R-17)

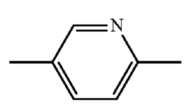

(R-18)

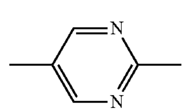

-continued (R-19)

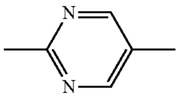

(R-20)

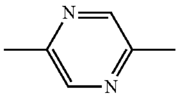

(R-21)

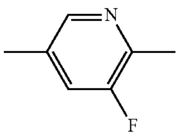

(R-22)

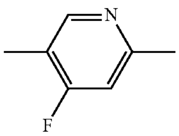

(R-23)

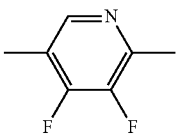

(R-24)

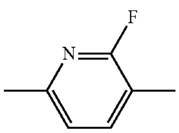

(R-25)

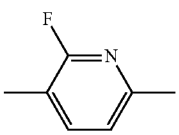

(R-26)

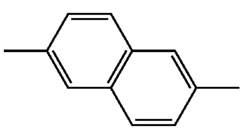

(R-27)

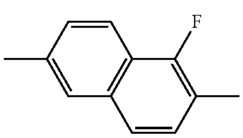

(R-28)

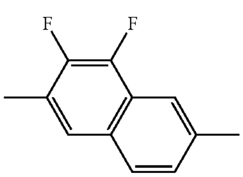

(R-29)

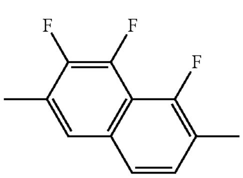

-continued (R-30)

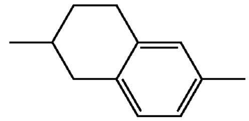

(R-31)

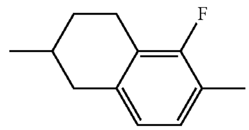

(R-32)

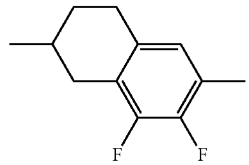

(R-33)

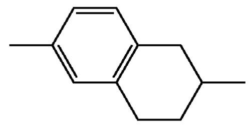

(R-34)

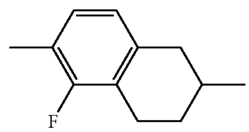

(R-35)

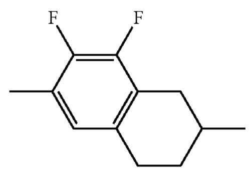

(R-36)

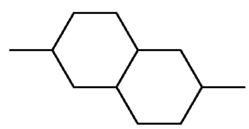

There are trans-isomer and cis-isomer as a stereoisomer in rings (R-1) to (R-3) and rings (R-30) to (R-36), and the trans-isomer is preferable in view of a higher maximum temperature.

When any one or all of ring $A^1$, ring $A^2$, ring $A^3$, and ring $A^4$ are 1,4-phenylene, pyrimidine-2,5-diyl, pyridine-2,5-diyl, or naphthalene-2,6-diyl, wherein arbitrary hydrogen may be replaced by halogen, the optical anisotropy is large. When any one or all of ring $A^1$, ring $A^2$, ring $A^3$, and ring $A^4$ are 1,4-cyclohexylene, 1,4-cyclohexenylene, or 1,2,3,4-tetrahydronaphthalene-2,6-diyl, the optical anisotropy is small.

When at least two rings are 1,4-cyclohexylene, the maximum temperature is high, the optical anisotropy is small, and the viscosity is small. When at least one ring is 1,4-phenylene, the optical anisotropy is comparatively large and the orientational order parameter is large. When at least two rings are 1,4-phenylene, the optical anisotropy is large, the temperature range of liquid crystal phases is wide, and the maximum temperature is high.

When any one or all of ring $A^1$, ring $A^2$, ring $A^3$, and ring $A^4$ are rings (R-7) to (R-9), rings (R-27) to (R-29), ring (R-32), or ring (R-35), the dielectric anisotropy is large and negative.

When any one or all of ring $A^1$, ring $A^2$, ring $A^3$, and ring $A^4$ are rings (R-1) to (R-3), rings (R-6) to (R-12), or rings (R-30) to (R-36), the stability of the compound is high.

When ring $A^1$, ring $A^2$, ring $A^3$, and ring $A^4$ are ring (R-1) or rings (R-6) to (R-9), the compounds are desirable, because the stability is high, the temperature range of liquid crystal phases is wide and the maximum temperature of a nematic phase is high.

When ring $A^1$, ring $A^2$, ring $A^3$, and ring $A^4$ are rings (R-1) to (R-8) , the viscosity is small.

When ring $A^1$, ring $A^2$, ring $A^3$, and ring $A^4$ are ring (R-1) or rings (R-6) to (R-8), the compounds are desirable, because the stability is high, the temperature range of the liquid crystal phases is wide, the viscosity is small, and the maximum temperature of a nematic phase is high.

In formula (a), $Z^1$ and $Z^2$ are each independently a single bond, —$(CH_2)_2$—, —$(CH_2)_4$—, —CH═CH—, —C≡C—, —$CH_2O$—, —$OCH_2$—, —COO—, —OCO—, —$CF_2O$—, or —$OCF_2$—.

Desirable $Z^1$ and $Z^2$ are a single bond and —$(CH2)_2$—, and more desirable $Z^1$ and $Z^2$ are a single bond.

When any one or all of $Z^1$, $Z^2$, and $Z^3$ are a single bond or —$(CH_2)_2$—, heat resistance or light resistance is excellent. When any one or all of the bonding groups are —CH═CH—, the temperature range of liquid crystal phases is wide and the elastic constant ratio $K_{33}/K_{11}$ ($K_{33}$: bend elastic constant, $K_{11}$: spray elastic constant) is large. When any one or all of the bonding groups are —CH═CH— or —C≡C—, the optical anisotropy is large.

A trans isomer is preferable in the configuration of a double bond such as —CH═CH—, because the range of a mesophase is wide and the maximum temperature is high.

In formula (a), W is —$CH_2$—, —CO—, or —$CF_2$—. When W is —$CH_2$—, —CO—, or —$CF_2$—, the temperature range of liquid crystal phases is wide, dielectric anisotropy is large and negative, the stability is high, compatibility with other liquid crystal compounds is excellent, and a composition which include the compound has a high maximum temperature of a nematic phase. In particular, when W is —$CH_2$—, the compound is desirable, because its stability is high, its dielectric anisotropy is large and negative, and a composition which include the compound has a high maximum temperature of a nematic phase. When W is —CO—, the compound is desirable, because its temperature range of liquid crystal phases is wide, its compatibility with other liquid crystal compounds is excellent, and a composition which include the compound has a high maximum temperature of a nematic phase. When W is —$CF_2$—, the compound is desirable, because its compatibility with other liquid crystal compounds is excellent.

In formula (a), m and n are each independently 0, 1, or 2, and the sum of m and n is 1 or 2. When the sum of m and n is 1, a composition which includes the compound has a high maximum temperature of a nematic phase, and when the sum of m and n is 2, a composition which includes the compound has a higher maximum temperature of the nematic phase.

When liquid crystal compounds have the structure represented by formula (a), they have a large negative dielectric anisotropy, wide liquid crystal phases, and an excellent compatibility with other liquid crystal compounds. Furthermore, they have stability to heat, light and so forth, a nematic phase in a wide temperature range, a small viscosity, a suitable optical anisotropy, and a suitable elastic constant $K_{33}$. The liquid crystal composition including this liquid crystal compound (a) is stable under conditions in which a liquid crystal display device is usually used, and this compound does not deposit its crystals (or its smectic phase) even when the composition is kept at a low temperature.

A desirable example of the compound (a) is the compound represented by any one of formulas (a-1) and (a-2). The compound is stable chemically and has liquid crystal phases in a wide temperature range, a small viscosity, a suitable optical anisotropy, a large negative dielectric anisotropy, a suitable elastic constant $K_{33}$, and an excellent compatibility with other liquid crystal compounds by the effect of such a structure. Moreover, a composition which includes the compound has a high maximum temperature of a nematic phase. The composition is excellent especially in view of chemical stability, liquid crystal phases in a wide temperature range, and an excellent compatibility with other liquid crystal compounds.

(a-1)

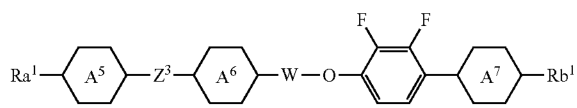

(a-2)

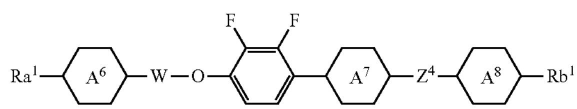

In formulas (a-1) and (a-2), $Ra^1$ and $Rb^1$ are each independently alkyl having 1 to 12 carbons, alkoxy having 1 to 11 carbons, or alkenyl having 2 to 12 carbons;

ring $A^5$, ring $A^6$, ring $A^7$, and ring $A^8$ are each independently 1,4-cyclohexylene, 1,4-phenylene, 2-fluoro-1,4-phenylene, or 3-fluoro-1,4-phenylene;

$Z^3$ and $Z^4$ are each independently a single bond, —$(CH_2)_2$—, —CH═CH—, —C≡C—, —$CH_2O$—, —$OCH_2$—, —COO—, or —OCO—; and W is —$CH_2$—, —CO—, or —$CF_2$—.

A more preferable example of the compound (a) is any one of the compounds (a-1-1) to (a-1-6) and the compounds (a-2-1) to (a-2-6). The compound is more stable chemically, and has liquid crystal phases in a wider temperature range, a smaller viscosity, a suitable optical anisotropy, a large negative dielectric anisotropy, a suitable elastic constant $K_{33}$, and an excellent compatibility with other liquid crystal compounds by the effect of such a structure. Moreover, a composition which includes the compound has a higher maximum temperature of a nematic phase. In particular, the composition is excellent, because it is more stable chemically, and has liquid crystal phases in a wider temperature range and smaller viscosity.

When W is —$CH_2$— in formulas (a-1-1) to (a-1-6) and in formulas (a-2-1) to (a-2-6), the compound is desirable, because the stability of the compound is higher, and the dielectric anisotropy is larger and negative. When W is —CO—, the compound is desirable, because the temperature range of liquid crystal phases is wider, compatibility with other liquid crystal compounds is better, and the maximum temperature of a nematic phase of a composition which include the compound is higher. When W is —$CF_2$—, the compound is desirable, because the compatibility with other liquid crystal compounds is superior to other groups.

(a-1-1)

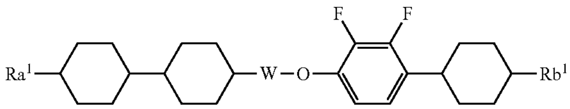

(a-1-2)

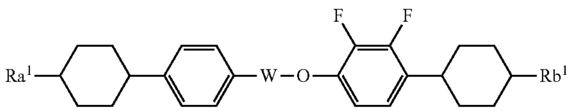

(a-1-3)

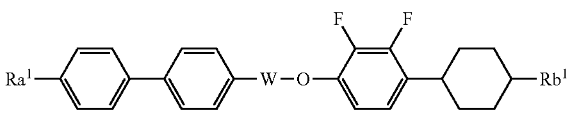

(a-1-4)

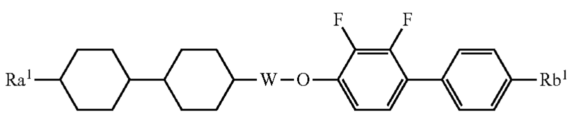

(a-1-5)

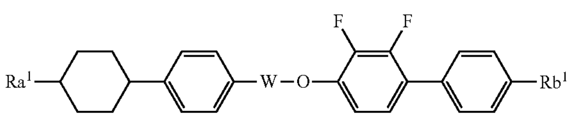

(a-1-6)

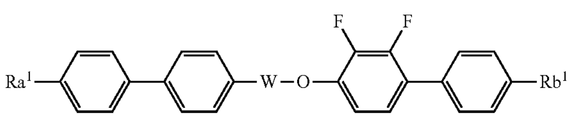

(a-2-1)

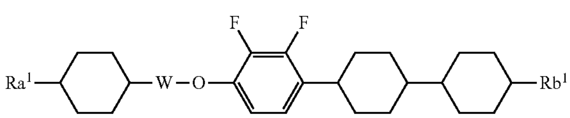

(a-2-2)

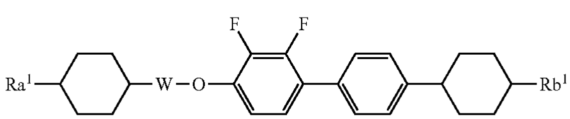

(a-2-3)

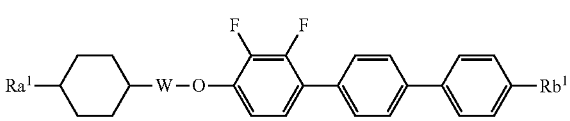

(a-2-4)

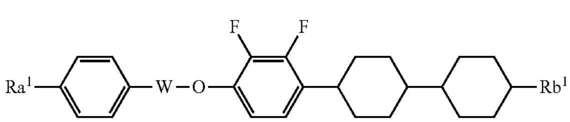

(a-2-5)

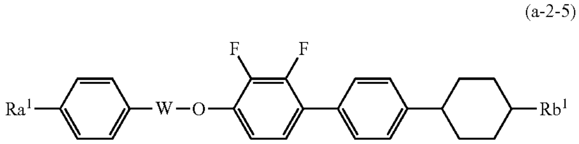

-continued (a-2-6)

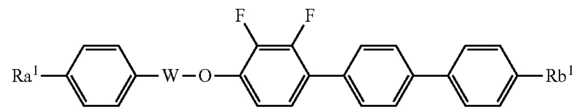

In formulas (a-1-1) to (a-1-6) and formulas (a-2-1) to (a-2-6), $Ra^1$ and $Rb^1$ are each independently alkyl having 1 to 12 carbons, alkoxy having 1 to 11 carbons, or alkenyl having 2 to 12 carbons; and W is —$CH_2$—, —CO—, or —$CF_2$—.

As described above, the compound having objective physical properties can be obtained by suitably selecting the kinds of terminal groups, ring structures, and bonding groups, and the number of rings. Accordingly, the compound (a) can be suitably applied to liquid crystal compositions used for liquid crystal devices with display modes such as PC, TN, STN, ECB, OCB, IPS, VA, and PSA, and especially to liquid crystal compositions used for liquid crystal display devices with display modes such as IPS, VA, and PSA.

The compound (a) that the structure is disclosed in this specification can be synthesized by suitably combining techniques in synthetic organic chemistry. Methods for introducing objective terminal groups, ring structures, and bonding groups into starting materials are described in books such as ORGANIC SYNTHESES (John Wiley & Sons, Inc), ORGANIC REACTIONS (John Wiley & Sons, Inc), COMPREHENSIVE ORGANIC SYNTHESIS (Pergamon Press), and NEW EXPERIMENTAL CHEMISTRY COURSE (Shin Jikken Kagaku Kouza, in Japanese title) (Maruzen).

<Formation of the Bonding Group $Z^1$ or $Z^2$>

Examples of methods for forming the bonding group $Z^1$ or $Z^2$ will be shown. The scheme for forming the bonding group is shown below. In this scheme, $MSG^1$ or $MSG^2$ is a monovalent organic group. A plurality of $MSG^1$ (or $MSG^2$) used in the scheme may be the same or different. The compounds (1A) to (1I) correspond to the liquid crystal compound (a)

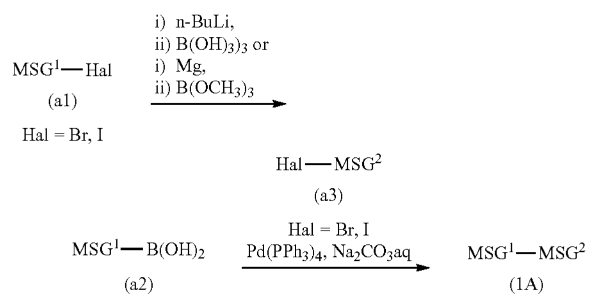

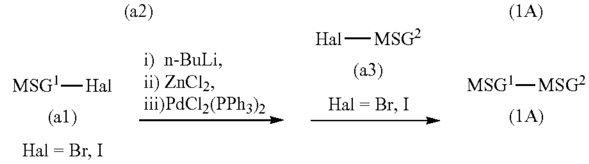

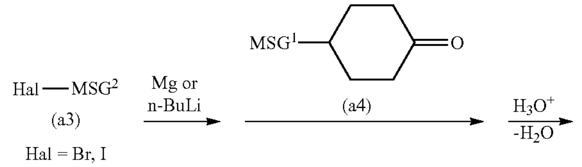

-continued

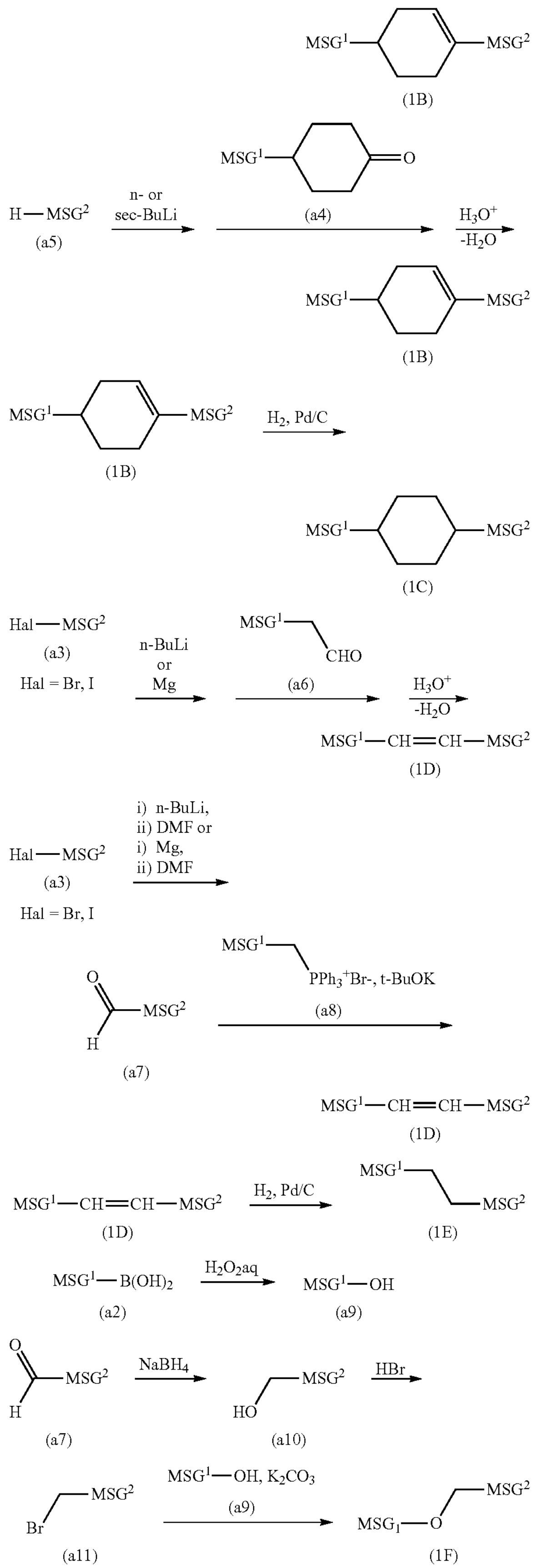

-continued

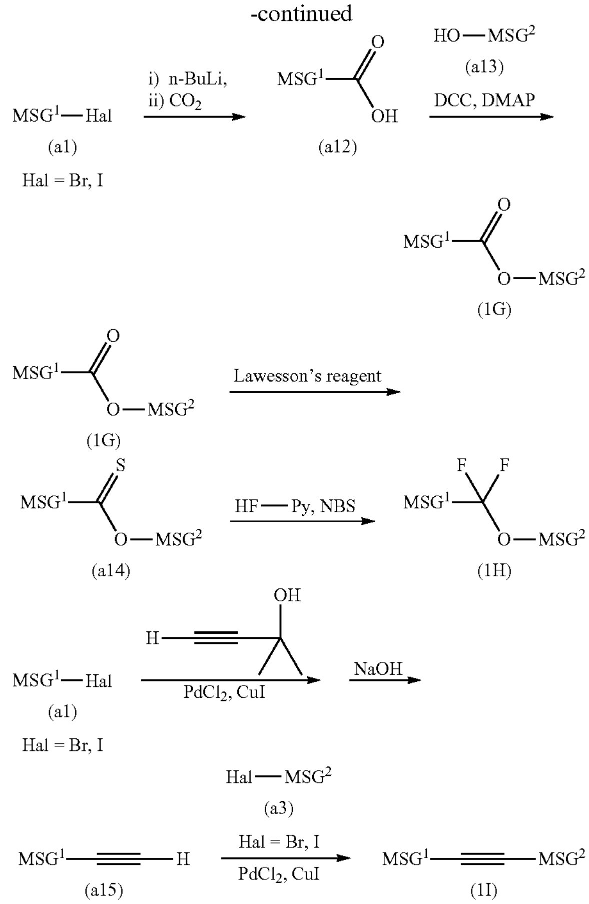

<Formation of Single Bonds, Part 1>

The compound, which is obtained by treating the organohalogen compound (a1) having the monovalent organic group $MSG^1$ with butyl lithium or magnesium, is reacted with a boric acid ester such as trimethyl borate, and then hydrolyzed by an acid such as hydrochloric acid, giving the dihydroxyborane derivative (a2). Subsequently, the compound (1A) can be synthesized by reacting the resultant derivative (a2) with the organohalogen compound (a3) having the monovalent organic group $MSG^2$ in the presence, for example, of an aqueous carbonate solution and tetrakis(triphenylphosphine) palladium ($Pd(PPh_3)_4$).

The compound (1A) can also be synthesized by reacting the organic halogen compound (a1) with n-butyl lithium and further with zinc chloride, and then reacting the compound obtained with the compound (a3) in the presence, for example, of a bistriphenylphosphinedichloropalladium [$PdCl_2(PPh_3)_2$] catalyst.

<Formation of Single Bonds, Part 2>

A Grignard reagent or a lithium salt is prepared by reacting the organic halogen compound (a3) with magnesium or n-butyl lithium, respectively, or by reacting the compound (a5) with n-butyl lithium or sec-butyl lithium. On reacting the Grignard reagent or the lithium salt with the cyclohexanone derivative (a4), the corresponding alcohol derivative is synthesized. Subsequently, the compound (1B) which is combined with the cyclohexene derivative through a single bond can be synthesized by dehydrating the alcohol derivative in the presence of an acid catalyst such as p-toluenesulfonic acid. The compound (1C) having the cyclohexane derivative moiety bonded through a single bond can be synthesized by hydrogenating the compound (1B) thus obtained in the presence of a catalyst such as palladium on carbon (Pd/C). Incidentally, the cyclohexanone derivative (a4) can be synthesized, for example, according to the method described in JP S59-7122 A (1984).

<Formation of Double Bonds>

A Grignard reagent or a lithium salt is prepared by reacting the organohalogen compound (a3) with magnesium or n-butyl lithium, respectively. An alcohol derivative is synthesized by reacting the Grignard reagent or the lithium salt with the aldehyde derivative (a6). Subsequently, the compound (1D) which has a corresponding double bond can be synthesized by dehydrating the resultant alcohol derivative in the presence of an acid catalyst such as p-toluenesulfonic acid.

A Grignard reagent or a lithium salt is prepared by reacting the organic halogen compound (a3) with magnesium or n-butyl lithium, respectively. The aldehyde derivative (a7) is obtained by reacting the Grignard reagent or lithium salt with a formamide such as N,N-dimethylformamide (DMF). Subsequently, the compound (1D) which has a corresponding double bond can be synthesized by reacting the resultant aldehyde derivative (a7) with the phosphorus ylide obtained by treating the phosphonium salt (a8) with a base such as potassium t-butoxide. Since a cis-isomer may be formed depending on reaction conditions in the reaction described above, the cis-isomer is isomerized to a trans isomer according to known methods as requested.

<Formation of —$(CH_2)_2$—>

The compound (1E) can be synthesized by hydrogenating the compound (1D) in the presence of a catalyst such as palladium on carbon (Pd/C).

<Formation of —$CH_2O$— or —$OCH_2$—>

The alcohol derivative (a9) is obtained by oxidizing the dihydroxyborane derivative (a2) with an oxidizing agent such as hydrogen peroxide ($H_2O_2$). In a separate run, the alcohol (a12). The compound (1G) having —COO— can be synthesized by reacting the carboxylic acid derivative (a12) with the alcohol derivative (a13) in the presence of DDC (1,3-dicyclohexylcarbodiimide) and DMAP (4-dimethylaminopyridine). The compounds having —OCO— can also be synthesized according to this method.

<Formation of —$CF_2O$— and —$OCF_2$—>

The compound (a14) is obtained by treating the compound (1G) with a thionating agent such as Lawesson's reagent. The compound (1H) having —$CF_2O$— can be synthesized by fluorinating the compound (a14) by use of a hydrogen fluoride-pyridine complex and NBS (N-bromosuccinimide). Refer to M. Kuroboshi, et al., Chem. Lett., 1992, 827. The compound (1H) is also synthesized by fluorinating the compound (a14) with (diethylamino)sulfur trifluoride (DAST). Refer to W. H. Bunnelle, et al., J. Org. Chem. 1990, 55, 768. These bonding groups can also be formed according to the method described in Peer. Kirsch, et al., Angew. Chem. Int. Ed. 2001, 40, 1480. The compound having —$OCF_2$— can also be synthesized according to this method.

<Formation of —C≡C—>

The compound (a15) is obtained by reacting the compound (a1) with 2-methyl-3-butyne-2-ol in the presence of a catalyst of dichloropalladium and copper halide, and then by deprotecting the resulting product under a basic condition. The compound (1I) can be synthesized by reacting the compound (a15) with the compound (a3) in the presence of a catalyst of dichloropalladium ($PdCl_2$) and cuprous iodide (CuI).

[Method for Producing the Liquid Crystal Compound (a)]

Hereinafter a production example of the liquid crystal compound (b3), that is to say, the liquid crystal compound (a) wherein W is —CO— is shown. In the following reaction pathway, Ra, Rb, ring $A^1$, ring $A^2$, ring $A^3$, ring $A^4$, $Z^1$, $Z^2$, m, and n have the meanings identical to those described above.

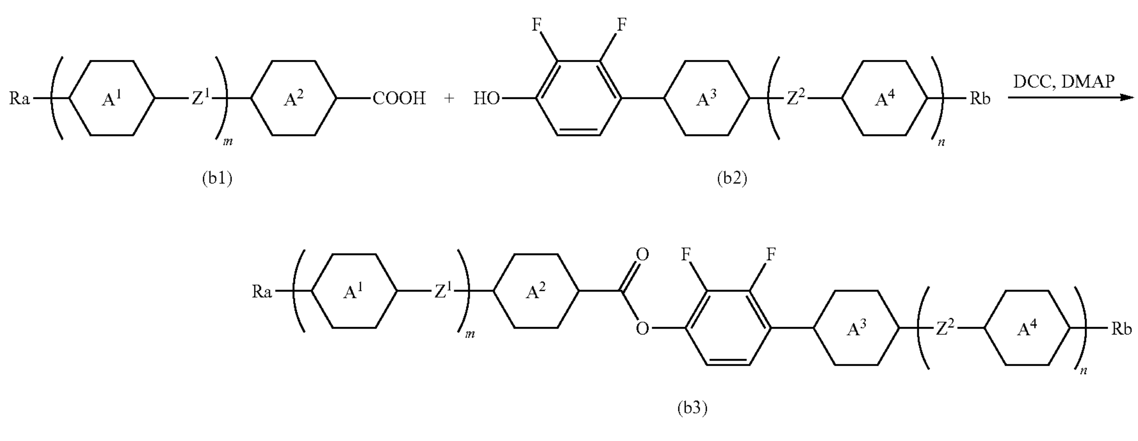

derivative (a10) is obtained by reducing the aldehyde derivative (a7) with a reducing agent such as sodium borohydride. The organohalogen compound (a11) is obtained by halogenating the compound (a10) thus obtained with hydrobromic acid and so forth. The compound (1F) can be synthesized by reacting the compound (a9) thus obtained with the compound (a11) in the presence of potassium carbonate ($K_2CO_3$) or the like. The compound having —$CH_2O$— can also be synthesized according to this method.

<Formation of —COO— and —OCO—>

The compound (a1) is reacted with n-butyl lithium and then with carbon dioxide giving the carboxylic acid derivative The compound (b3) having an ester group, which is one example of the liquid crystal compound (a) of the invention, can be produced by reacting the carboxylic acid derivative (1) with the phenol derivative (b2) in the presence of DCC and DMAP.

Next, a production example of the liquid crystal compound (b7), that is to say, the liquid crystal compound (a) wherein W is —$CH_2$— is shown. In the following reaction pathway, Ra, Rb, ring $A^1$, ring $A^2$, ring $A^3$, ring $A^4$, $Z^1$, $Z^2$, m, and n have the meanings identical to those described above.

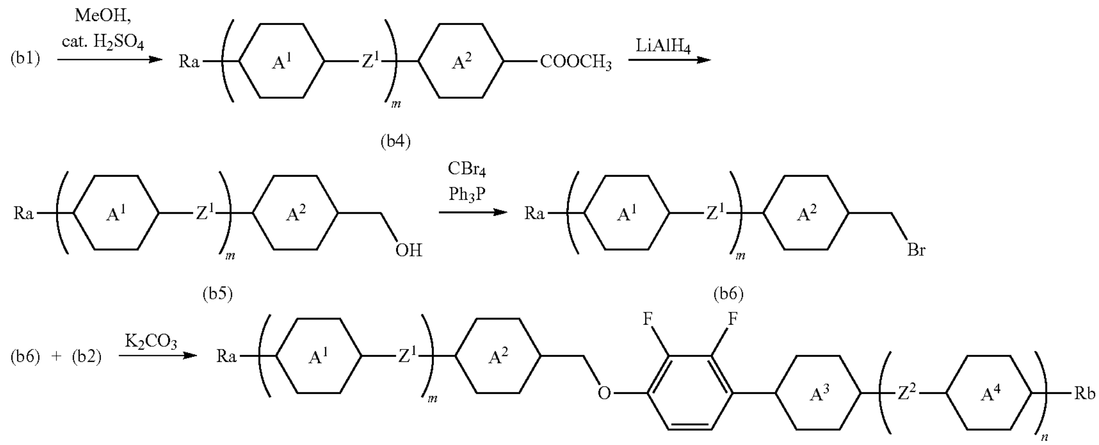

(b4) (b5) (b6) (b7)

The methyl ester derivative (b4) is obtained by reacting the carboxylic acid derivative (b1) with methanol in the presence of a catalyst such as concentrated sulfuric acid or the like. The alcohol derivative (b5) is obtained by reducing the compound (b4) obtained with a reducing agent such as lithium hydride aluminum ($LiAlH_4$). Subsequently, the compound (b6) is obtained by brominating the compound (b5) with carbon tetrabromide ($CBr_4$) and triphenylphosphine ($Ph_3P$). The compound (b7) having a methyleneoxy group, which is an example of the liquid crystal compound (a) of the invention, can be produced by etherifying the compound (b6) obtained with the phenol derivative (b2) in the presence of a base such as potassium carbonate.

Further, a production example of the liquid crystal compound (b3), that is to say, the liquid crystal compound (a) wherein W is —$CH_2$— is shown. In the following reaction pathway, Ra, Rb, ring $A^1$, ring $A^2$, ring $A^3$, ring $A^4$, $Z^1$, $Z^2$, m, and n have the meanings identical to those described above.

[Liquid Crystal Compositions]

Hereinafter, the liquid crystal composition of the invention is explained. This liquid crystal composition is characterized by containing at least one of the liquid crystal compound (a) as a component, and the composition may contain two or more of the liquid crystal compound (a), or may be composed of the liquid crystal compound (a) only. When the liquid crystal composition of the invention is prepared, the components can also be selected in consideration of, for example, dielectric anisotropy of the liquid crystal compound (a). The liquid crystal composition described above has a low viscosity, a suitable and negative dielectric anisotropy, a suitable elastic constant $K_{33}$, a low threshold voltage, a high maximum temperature of a nematic phase (phase transition temperature of a nematic phase to isotropic phase), and a low minimum temperature of the nematic phase.

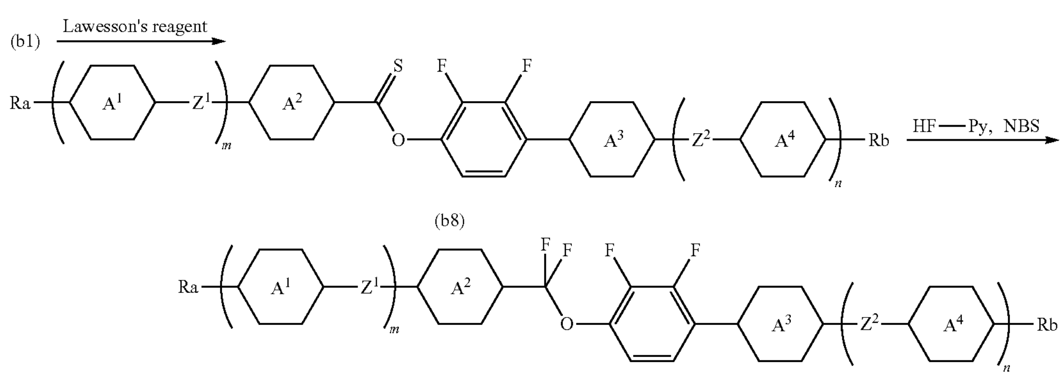

(b8) (b9)

The thioester derivative (b8) is derived from the carboxylic acid derivative (b1) by use of Lawesson's reagent. Subsequently, the compound (b8) obtained is fluorinated with HF-Py or the like in the presence of NBS, producing the compound (b9) having a difluoromethyleneoxy group, which is one example of the liquid crystal compound (a) of the invention.

[The Liquid Crystal Composition (1)]

It is desirable that the liquid crystal composition of the invention further includes at least one compound selected from the group of liquid crystal compounds represented by formulas (e-1) to (e-3) (hereinafter also referred to as the compounds (e-1) to (e-3)) as a second component, in addition to the liquid crystal compound (a) (hereinafter also referred to as the liquid crystal composition (1)).

(e-1)

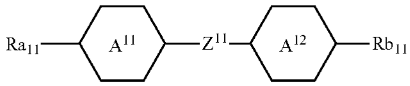

(e-2)

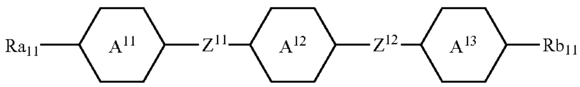

(e-3)

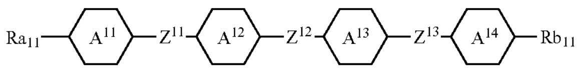

In formulas (e-1) to (e-3), $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine.

Ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl.

The symbols $Z^{11}$, $Z^{12}$, and $Z^{13}$ are each independently a single bond, —$CH_2CH_2$—, —CH═CH—, —C≡C—, —COO—, or —$CH_2O$—.

Viscosity of a liquid crystal composition can be decreased, and the minimum temperature of a nematic phase can also be decreased by the addition of the second component to the liquid crystal compound (a). Because the dielectric anisotropy of the compounds (e-1) to (e-3) is nearly 0, the dielectric anisotropy of the liquid crystal composition containing the compound can be adjusted so as to approach 0.

The compound (e-1) or compound (e-2) is effective in decreasing the viscosity and increasing the voltage holding ratio of the liquid crystal composition including the compound. The compound (e-3) is effective in increasing the maximum temperature of a nematic phase and increasing the voltage holding ratio of the liquid crystal composition including the compound.

In ring $A^{11}$, ring $A^{12}$, ring $A^{13}$, and ring $A^{14}$, when two or more rings are 1,4-cyclohexylene, the maximum temperature of a nematic phase of the liquid crystal composition including them is higher, and when two or more rings are 1,4-phenylene, the optical anisotropy of the composition including them is larger.

More desirable compounds among the second component are the compounds represented by formulas (2-1) to (2-74) (hereinafter also referred to as the compounds (2-1) to (2-74)). In these compounds, $Ra_{11}$ and $Rb_{11}$ have the meanings identical to those described for the compounds (e-1) to (e-3).

(2-1)

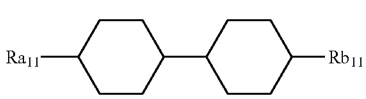

(2-2)

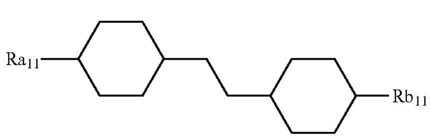

-continued (2-3)

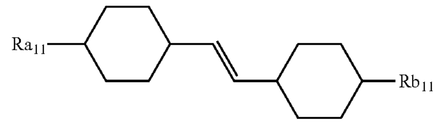

(2-4)

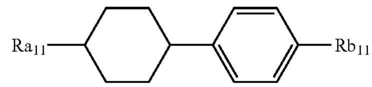

(2-5)

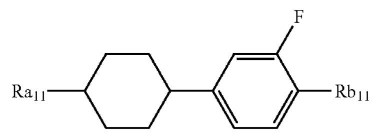

(2-6)

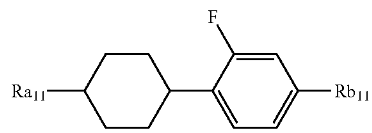

(2-7)

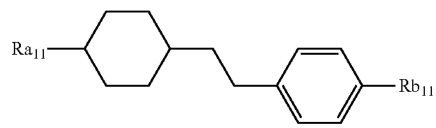

(2-8)

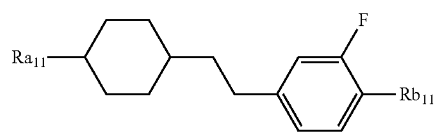

(2-9)

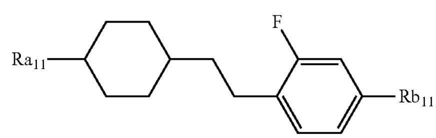

(2-10)

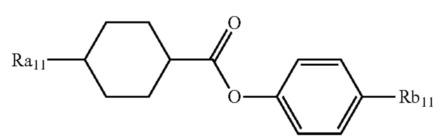

(2-11)

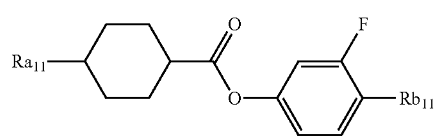

(2-12)

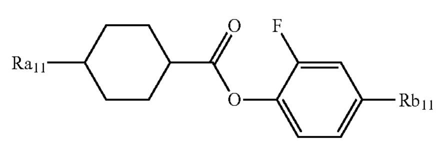

(2-13)

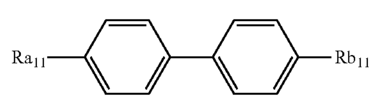

(2-14)

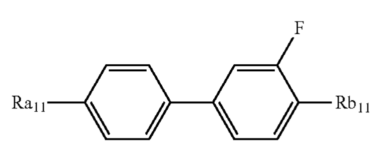

-continued
(2-15)
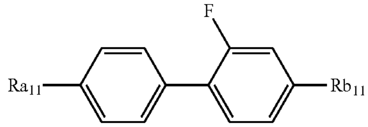
(2-16)
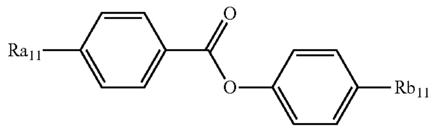
(2-17)
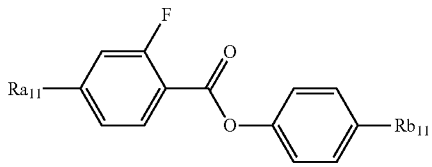
(2-18)
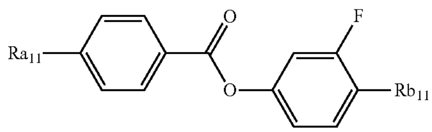
(2-19)
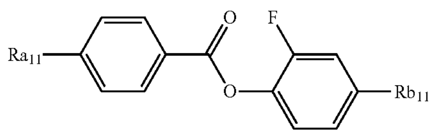
(2-20)
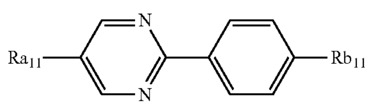
(2-21)
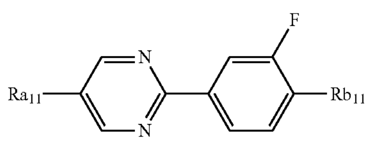
(2-22)
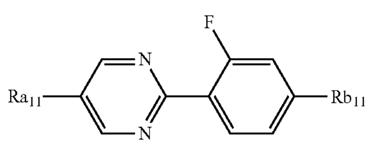
(2-23)
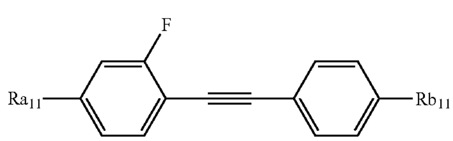
(2-24)
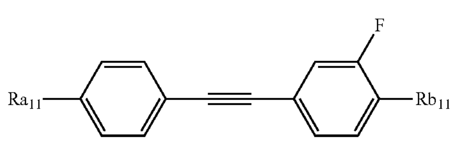
(2-25)
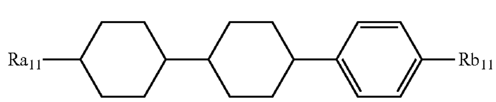
-continued
(2-26)
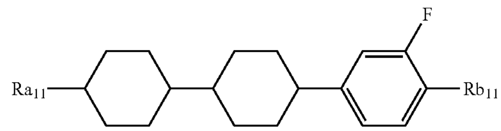
(2-27)
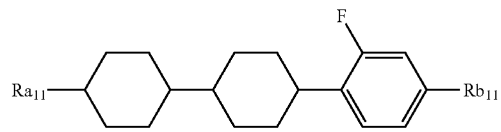
(2-28)
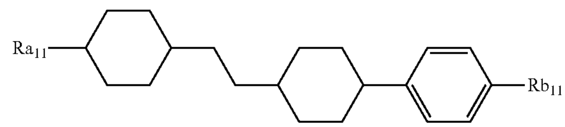
(2-29)
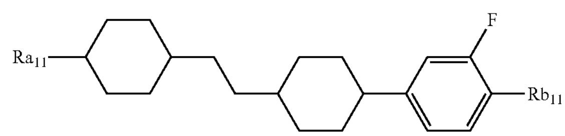
(2-30)
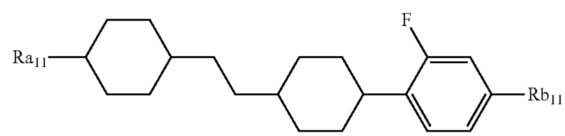
(2-31)
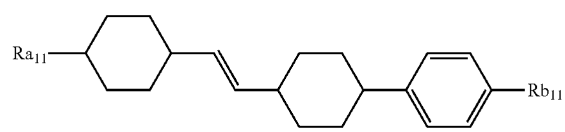
(2-32)
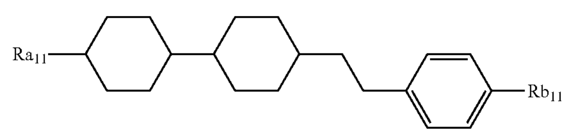
(2-33)
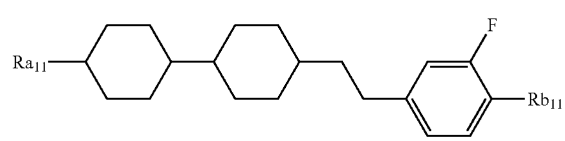
(2-34)
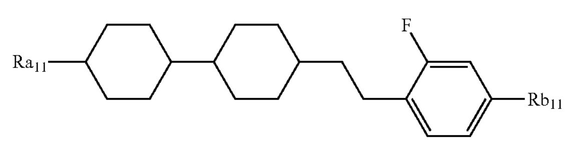
(2-35)
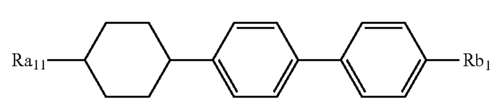

-continued
(2-36)
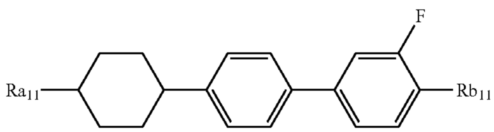
(2-37)
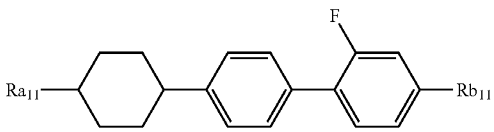
(2-38)
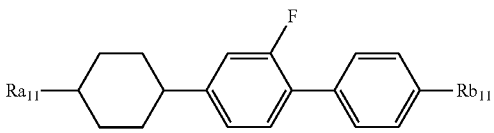
(2-39)
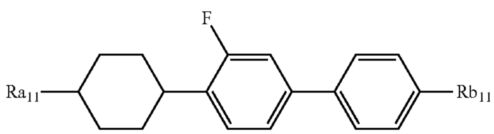
(2-40)
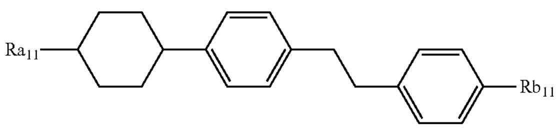
(2-41)
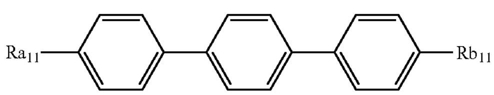
(2-42)
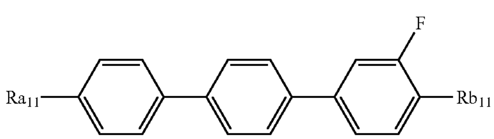
(2-43)
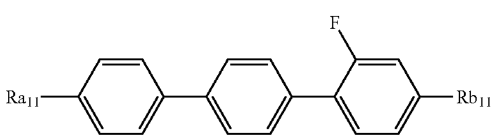
(2-44)
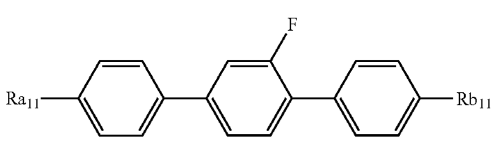
(2-45)
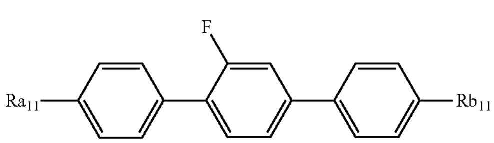
-continued
(2-46)
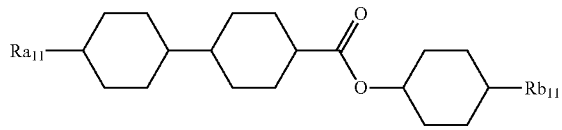
(2-47)
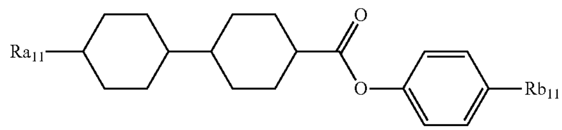
(2-48)
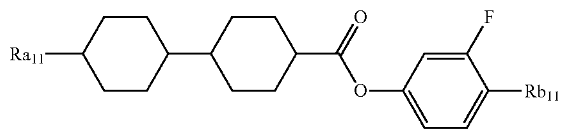
(2-49)
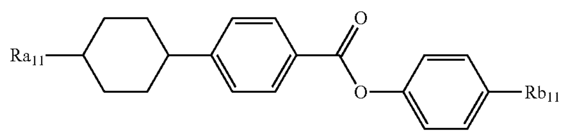
(2-50)
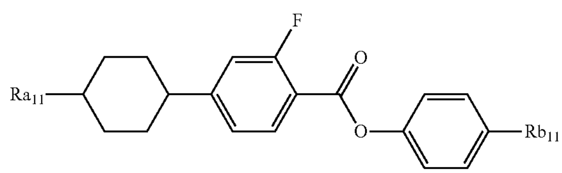
(2-51)
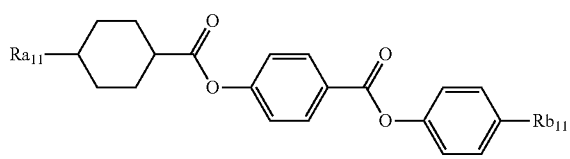
(2-52)
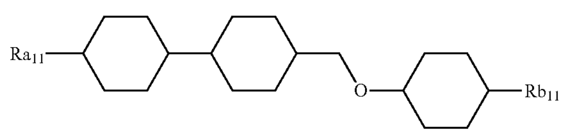
(2-53)
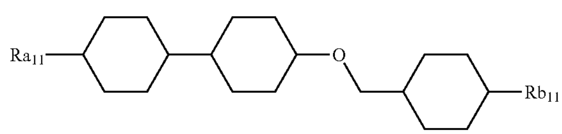
(2-54)
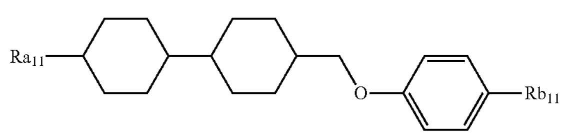
(2-55)
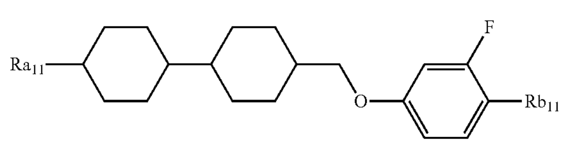

-continued (2-56)

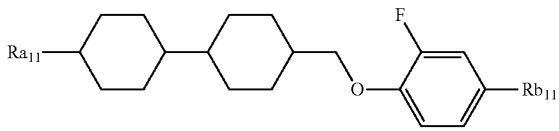

(2-57)

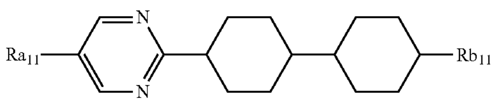

(2-58)

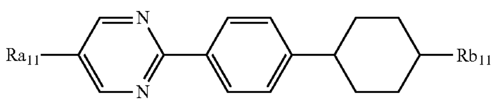

(2-59)

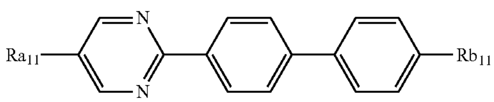

(2-60)

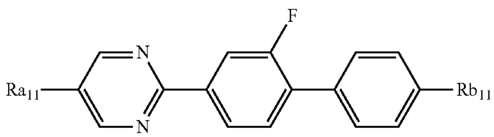

(2-61)

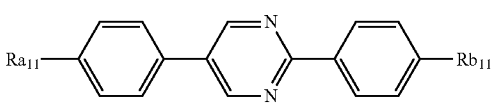

(2-62)

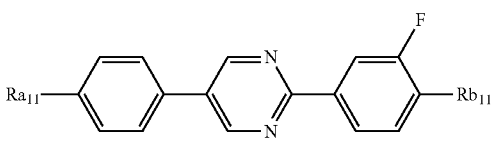

(2-63)

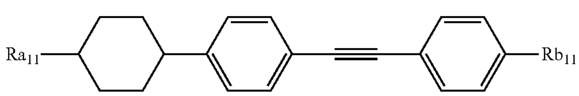

(2-64)

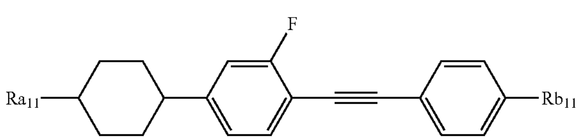

(2-65)

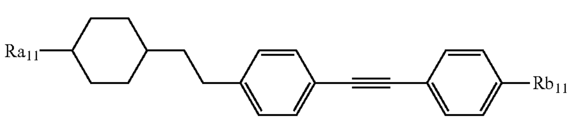

(2-66)

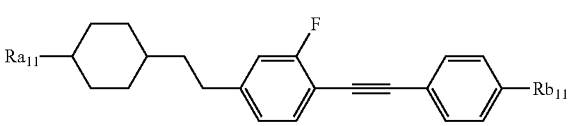

-continued (2-67)

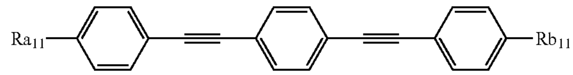

(2-68)

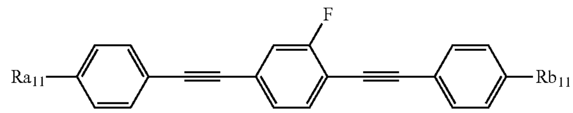

(2-69)

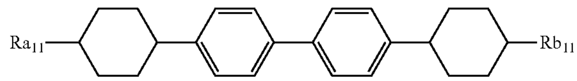

(2-70)

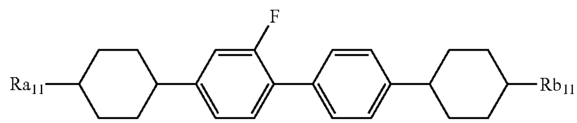

(2-71)

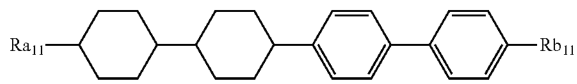

(2-72)

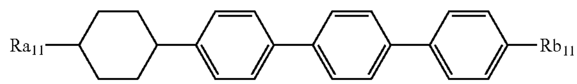

(2-73)

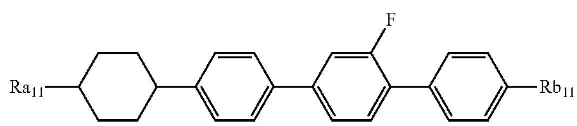

(2-74)

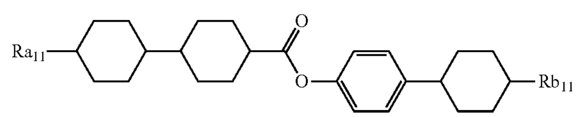

When the second component is the compounds (2-1) to (2-74), a liquid crystal composition which is excellent in heat resistance and light resistance and has a higher voltage holding ratio, a small viscosity, and a nematic phase in a wide range can be prepared.

In particular, the liquid crystal composition (1) in which the first component is at least one compound selected from the group of compounds represented by formulas (a-1-1) to (a-1-6) and formulas (a-2-1) to (a-2-6) and the second component is at least one compound selected from the group of compounds represented by the compounds (e-1) to (e-3) is particularly excellent in heat resistance and light resistance, and has a nematic phase in a wider range, a larger voltage holding ratio, a smaller viscosity, and a suitable elastic constant $K_{33}$.

The content of the second component in the liquid crystal composition (1) of the invention is not limited particularly, and it is desirable to increase the content in view of a lower viscosity. However, the threshold voltage of the liquid crystal composition tends to increase with an increase the content of the second component, because the absolute value of the dielectric anisotropy is decreased. Accordingly the content of the second component is preferably in the range of 40% to 95% by weight, and the content of the first component is preferably 5% to 60% by weight, based on the total weight of the liquid crystal compounds contained in the liquid crystal composition (1), when the liquid crystal composition of the invention is used for a liquid crystal device having a VA mode.

[The Liquid Crystal Composition (2)]

A liquid crystal composition which further includes at least one compound selected from the group of liquid crystal compounds represented by formulas (g-1) to (g-6) (hereinafter also referred to as the compounds (g-1) to (g-6)) as a third component in addition to the first and second components, is also desirable as a liquid crystal composition of the invention (hereinafter also referred to as the liquid crystal composition (2)).

The liquid crystal composition (2) which further includes the third component has a large negative dielectric anisotropy. Moreover, the liquid crystal composition has a wide temperature range of a nematic phase, a small viscosity, a large negative dielectric anisotropy, and a large specific resistance value, and these physical properties are suitably balanced.

Among the third component, the compound (g-1) or the compound (g-2) can decrease viscosity. In view of a low viscosity, heat resistance, and light resistance, at least one (g-1)

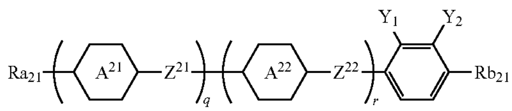

(g-2)

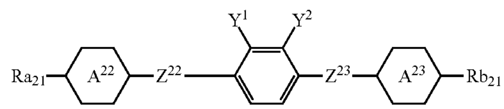

(g-3)

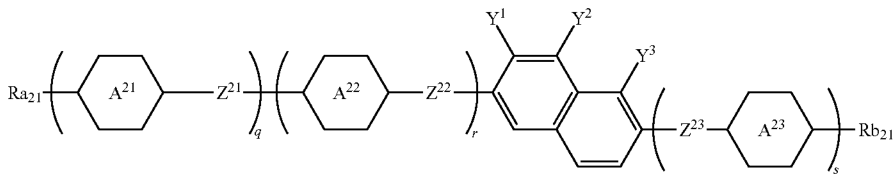

(g-4)

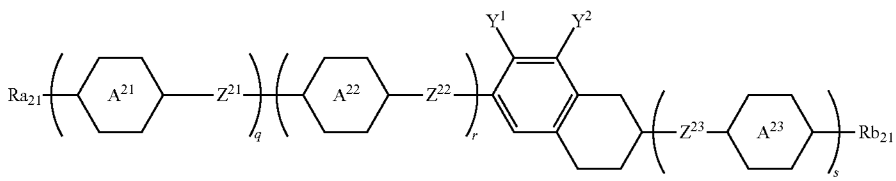

(g-5)

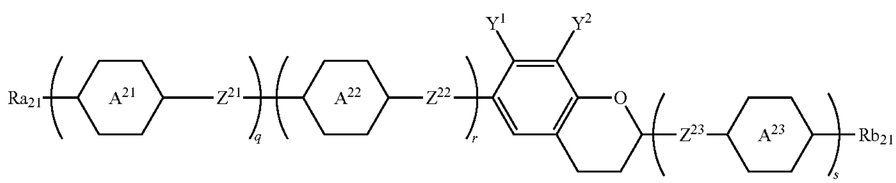

(g-6)

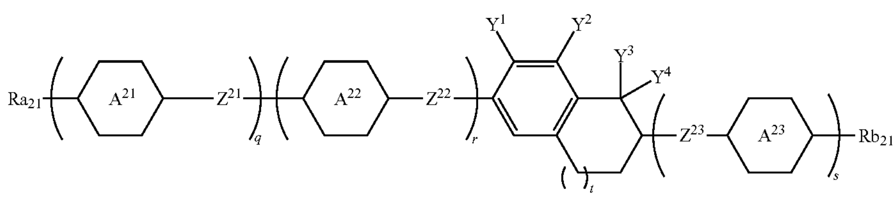

In formulas (g-1) to (g-6), $Ra_{21}$ and $Rb_{21}$ are each independently hydrogen or alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine.

In formulas (g-1) to (g-6), ring $A^{21}$, ring $A^{22}$, and ring $A^{23}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl.

In formulas (g-1) to (g-6), $Z^{21}$, $Z^{22}$, $Z^{23}$ are each independently a single bond, —$(CH_2)_2$—, —CH═C—, —C≡C—, —$OCF_2$—, —$CF_2O$—, —$OCF_2CH_2CH_2$—, —$CH_2CH_2CF_2O$—, —COO—, —$OCH_2$—, or —$CH_2O$—, and $Y^1$, $Y^2$, $Y^3$, and $Y^4$ are each independently fluorine or chlorine.

In formulas (g-1) to (g-6), q, r, and s are each independently 0, 1, or 2, q+r+s is 1, 2, or 3, and t is 0, 1, or 2. When q, r, and s are 2 or 3, a plurality of ring $A^{21}$, ring $A^{22}$, ring $A^{23}$, $Z^{21}$, $Z^{22}$, and $Z^{23}$ may be the same or different.

compound selected from the group of compounds represented by formulas (h-1) to (h-7) (hereinafter also referred to as the compounds (h-1) to (h-7)) is desirable.

(h-1)

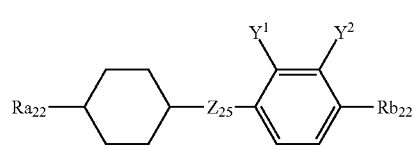

(h-2)

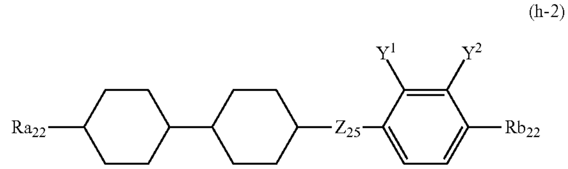

-continued (h-3)

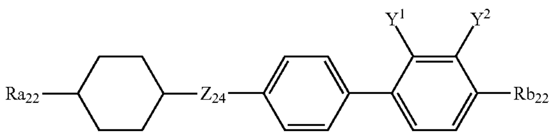

(h-4)

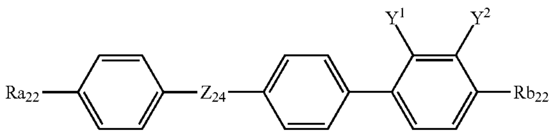

(h-5)

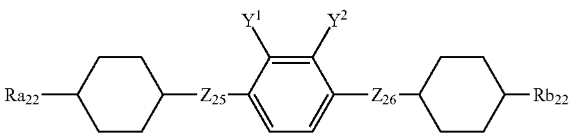

(h-6)

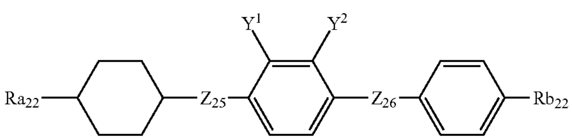

(h-7)

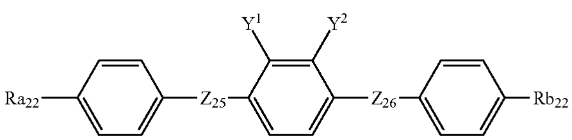

In formulas (h-1) to (h-7), $Ra_{22}$ and $Rb_{22}$ are a straight-chain alkyl having 1 to 8 carbons, a straight-chain alkenyl having 2 to 8 carbons, or alkoxy having 1 to 7 carbons, $Z^{24}$, $Z^{25}$, and $Z^{26}$ are a single bond, —$(CH_2)_2$—, —$CH_2O$—, —$OCH_2$—, —COO—, or —OCO—, and $Y^1$ and $Y^2$ are simultaneously fluorine, or one of $Y^1$ and $Y^2$ is fluorine and the other is chlorine.

For example, the compound (h-1) or compound (h-2) can decrease the viscosity, decrease the threshold voltage value, and decrease the minimum temperature of a nematic phase in the liquid crystal composition including the compound. The compounds (h-2) or (h-3), or the compound (h-4) can decrease the threshold voltage value without decreasing the maximum temperature of a nematic phase in the liquid crystal composition including the compound.

The compound (h-3) and the compound (h-6) can increase optical anisotropy, and the compound (h-4) and the compound (h-7) can further increase optical anisotropy.

The compounds (h-5) or (h-6), or the compound (h-7) can decrease the minimum temperature of a nematic phase in the liquid crystal composition including the compound.

Among the third components, the compounds (3-1) to (3-118) are more desirable. In these compounds, $Rb_{22}$ and $Rb_{22}$ have the meanings identical to those described for the compounds (h-1) to (h-7).

(3-1)

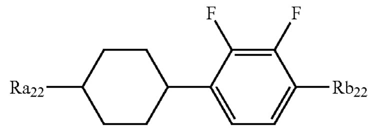

(3-2)

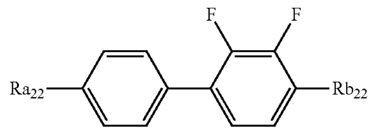

(3-3)

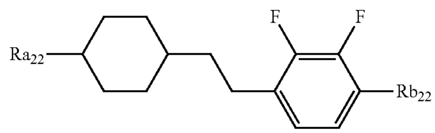

(3-4)

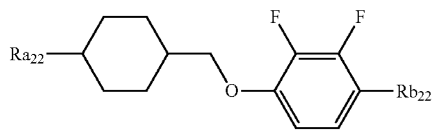

(3-5)

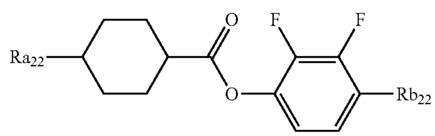

(3-6)

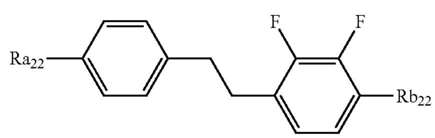

(3-7)

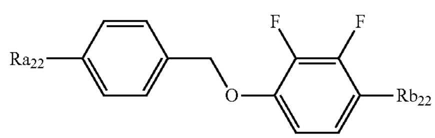

(3-8)

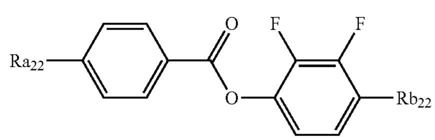

(3-9)

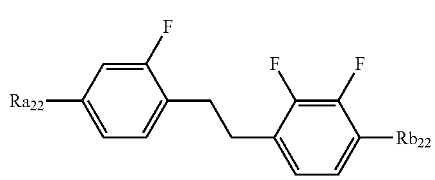

(3-10)

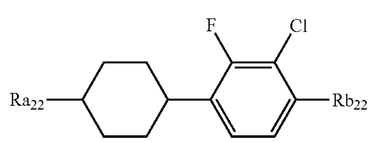

(3-11)

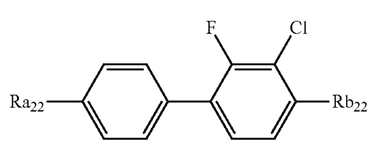

-continued
(3-12)
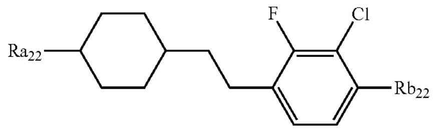
(3-13)
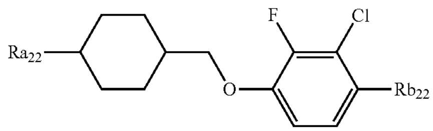
(3-14)
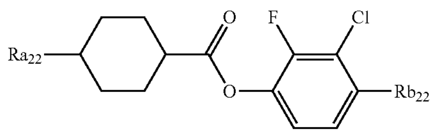
(3-15)
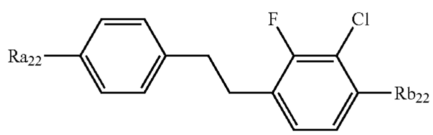
(3-16)
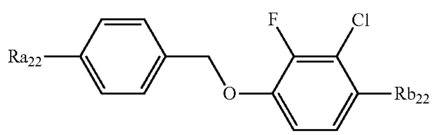
(3-17)
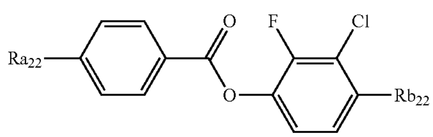
(3-18)
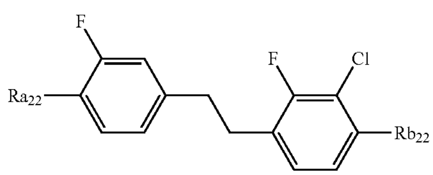
(3-19)
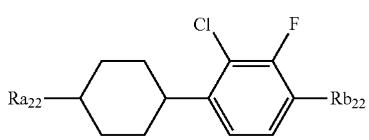
(3-20)
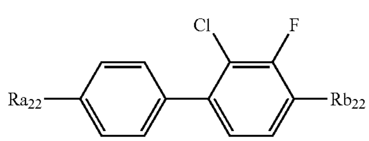
(3-21)
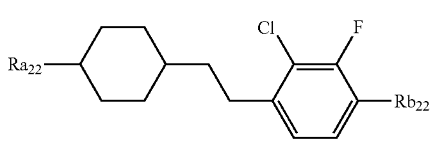
(3-22)
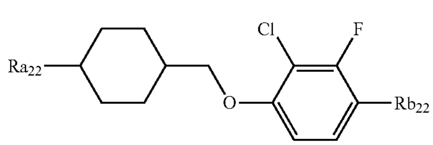
-continued
(3-23)
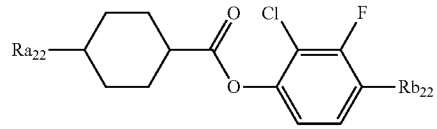
(3-24)
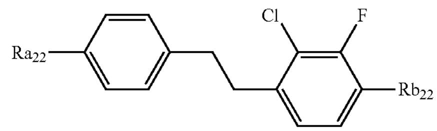
(3-25)
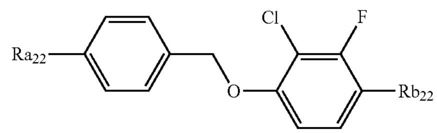
(3-26)
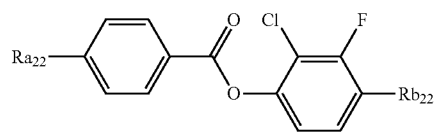
(3-27)
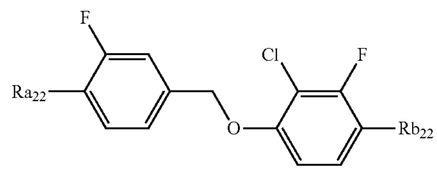
(3-28)
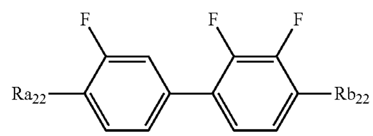
(3-29)
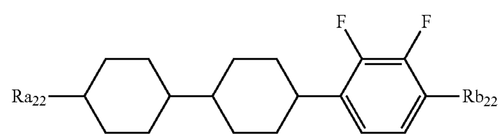
(3-30)
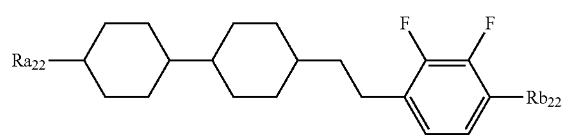
(3-31)
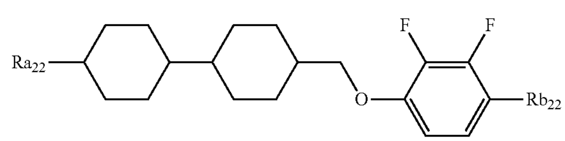
(3-32)
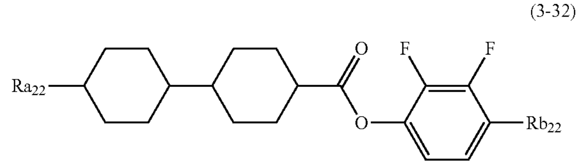

-continued
(3-33)
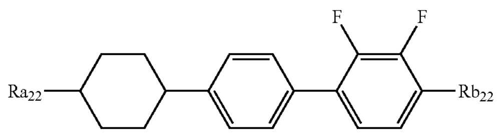
(3-34)
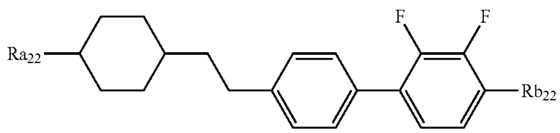
(3-35)
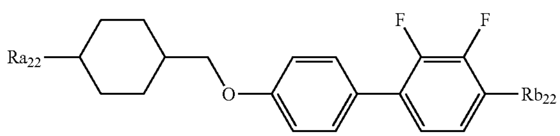
(3-36)
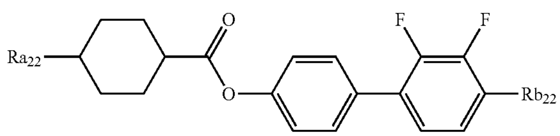
(3-37)
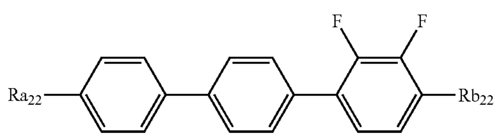
(3-38)
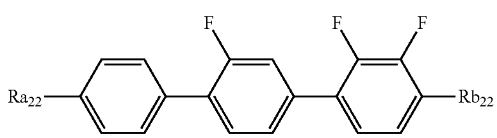
(3-39)
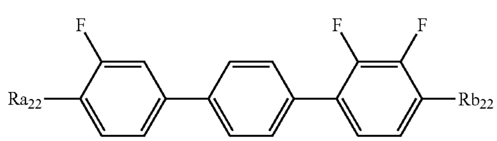
(3-40)
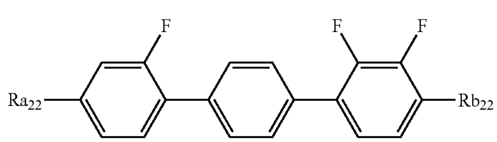
(3-41)
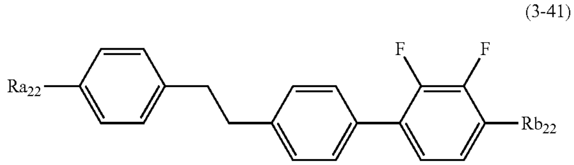
(3-42)
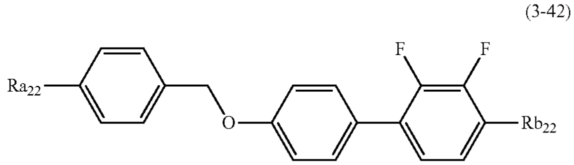
-continued
(3-43)
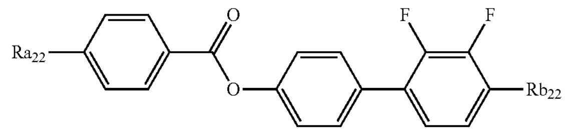
(3-44)
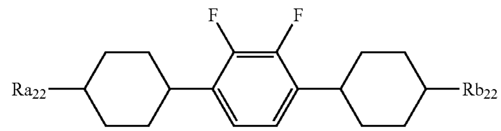
(3-45)
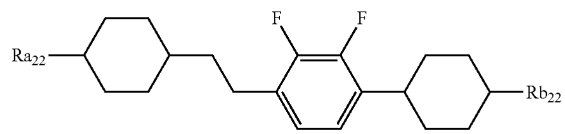
(3-46)
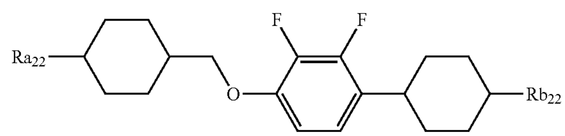
(3-47)
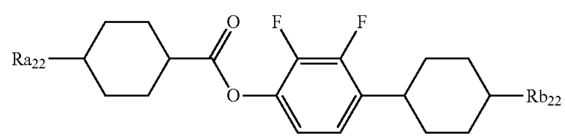
(3-48)
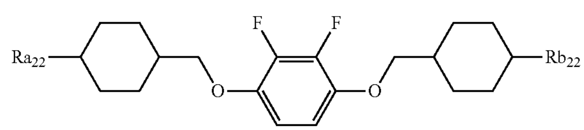
(3-49)
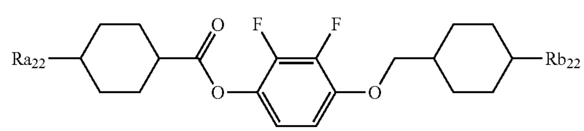
(3-50)
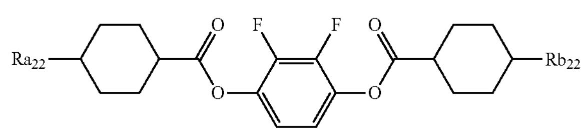
(3-51)
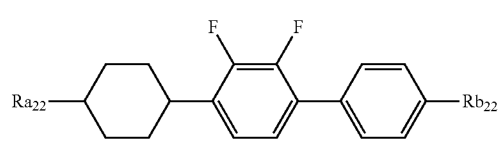
(3-52)
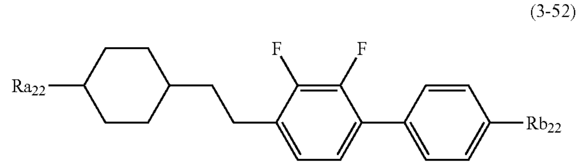

-continued
(3-53)
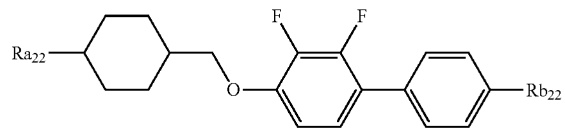
(3-54)
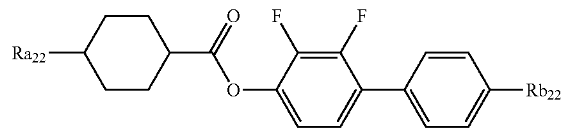
(3-55)
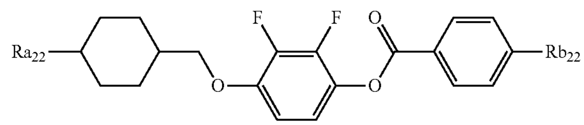
(3-56)
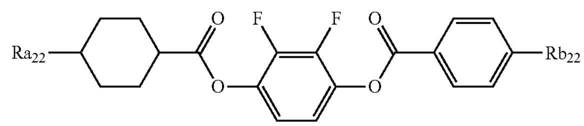
(3-57)
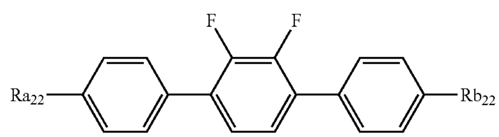
(3-58)
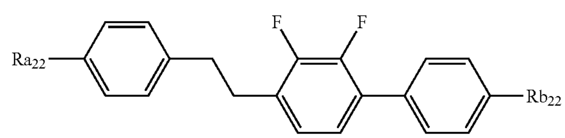
(3-59)
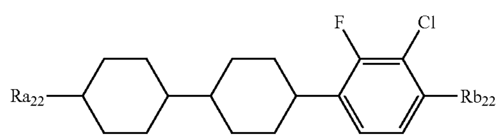
(3-60)
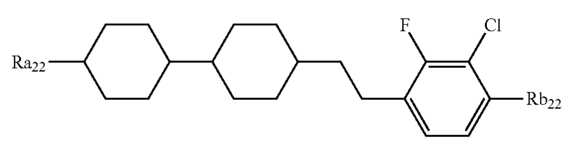
(3-61)
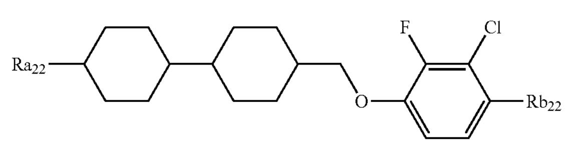
(3-62)
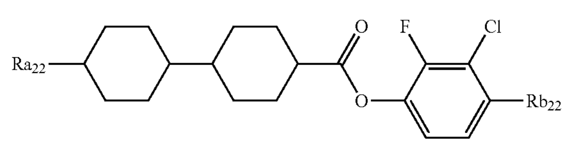
-continued
(3-63)
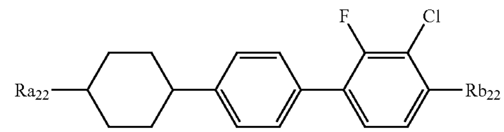
(3-64)
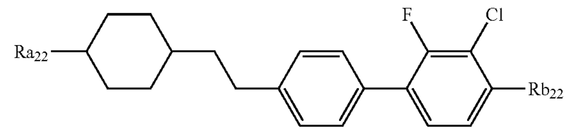
(3-65)
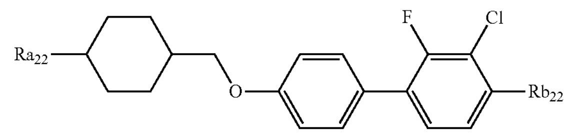
(3-66)
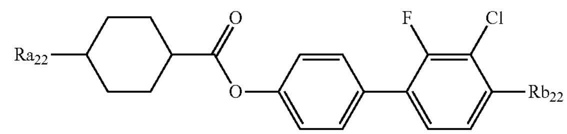
(3-67)
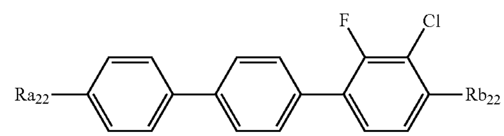
(3-68)
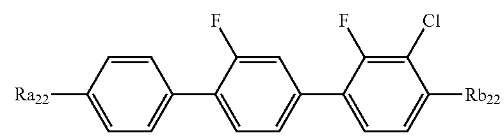
(3-69)
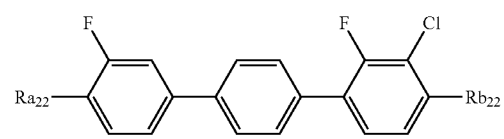
(3-70)
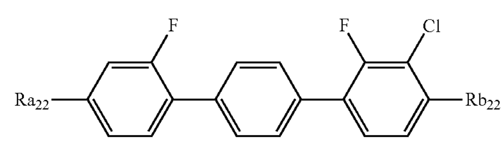
(3-71)
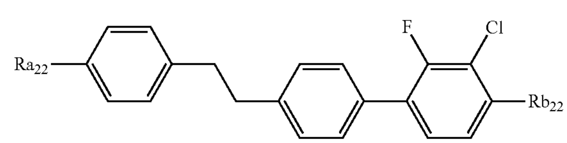
(3-72)
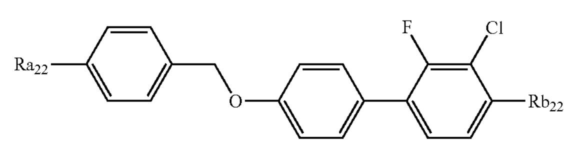

-continued
(3-73)
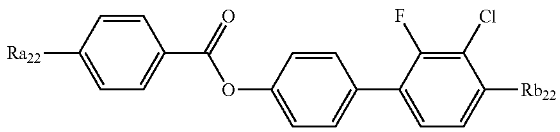
(3-74)
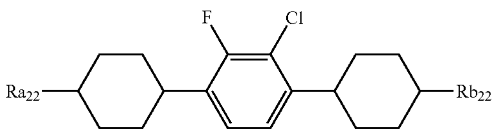
(3-75)
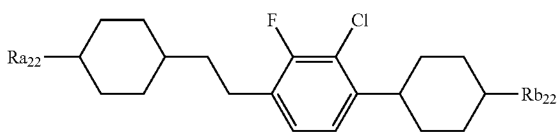
(3-76)
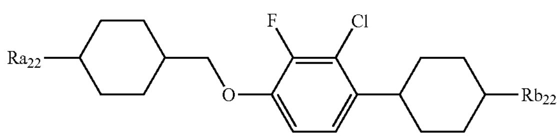
(3-77)
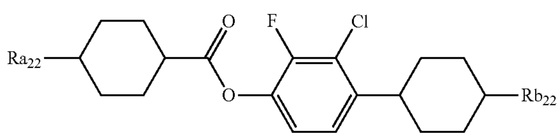
(3-78)
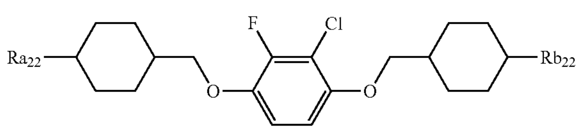
(3-79)
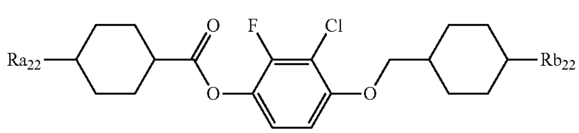
(3-80)
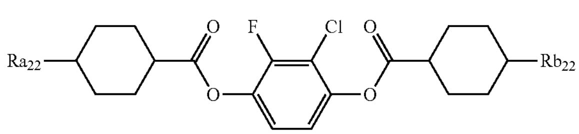
(3-81)
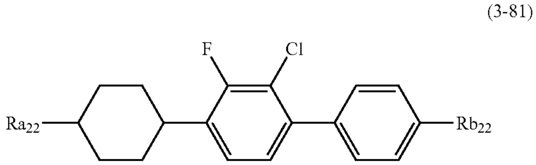
(3-82)
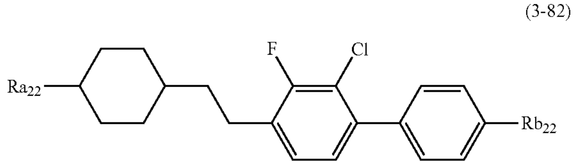
-continued
(3-83)
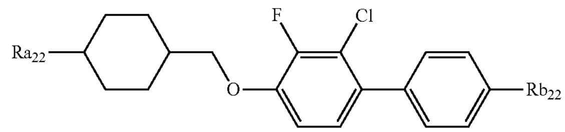
(3-84)
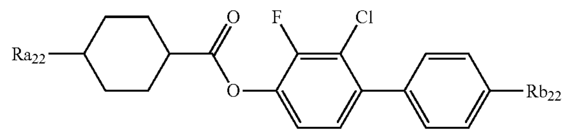
(3-85)
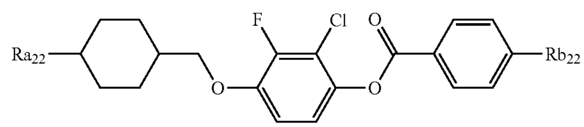
(3-86)
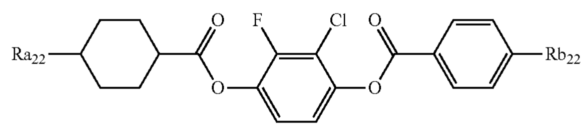
(3-87)
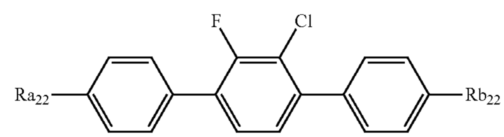
(3-88)
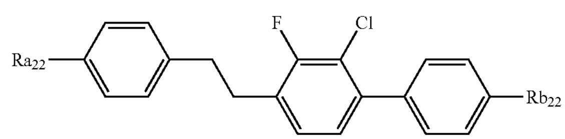
(3-89)
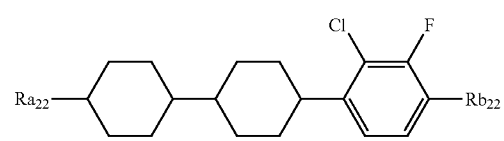
(3-90)
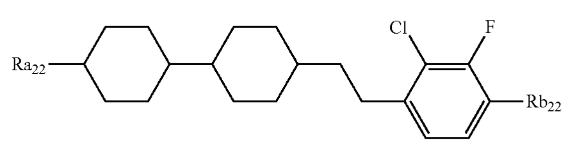
(3-91)
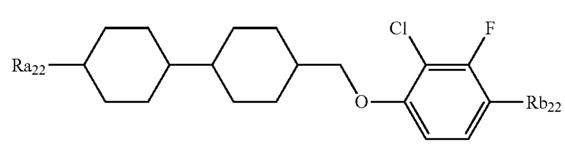
(3-92)
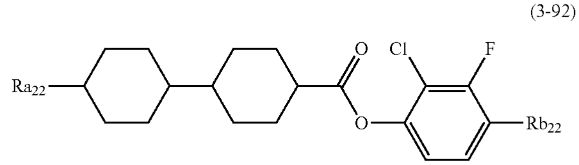

-continued
(3-93)
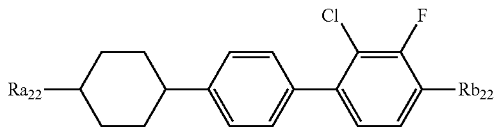
(3-94)
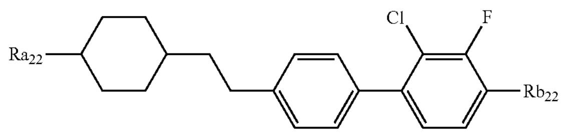
(3-95)
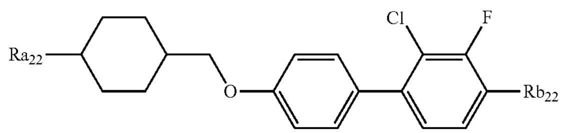
(3-96)
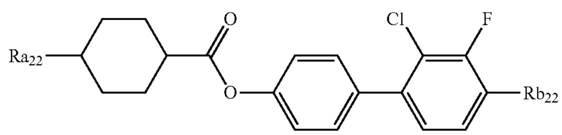
(3-97)
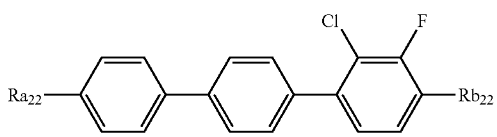
(3-98)
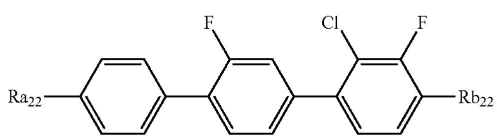
(3-99)
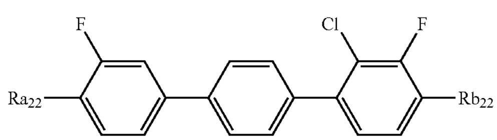
(3-100)
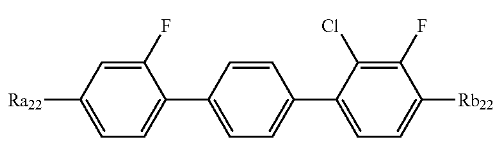
(3-101)
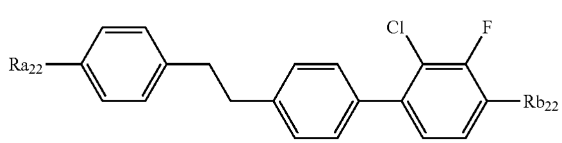
(3-102)
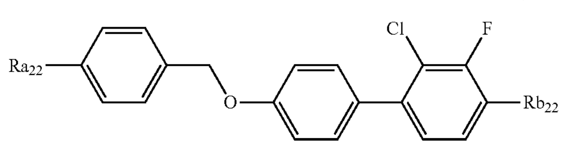
-continued
(3-103)
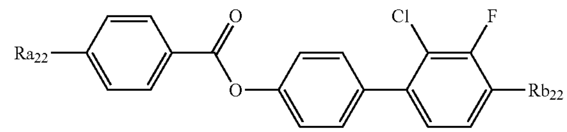
(3-104)
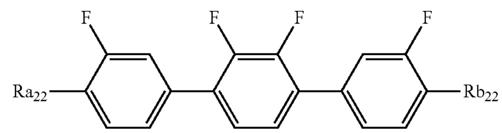
(3-105)
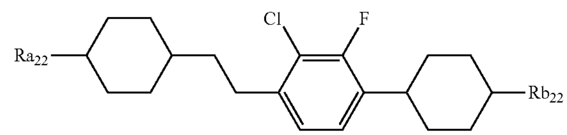
(3-106)
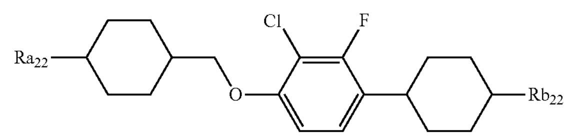
(3-107)
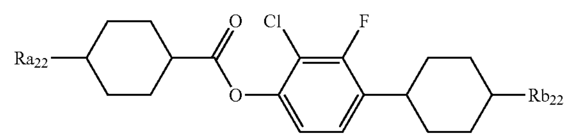
(3-108)
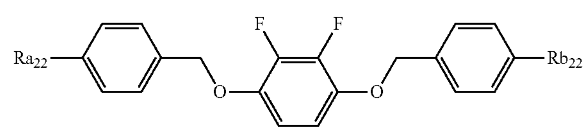
(3-109)
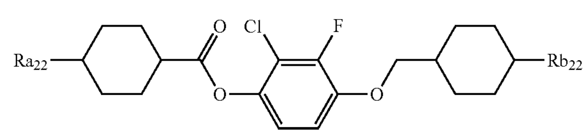
(3-110)
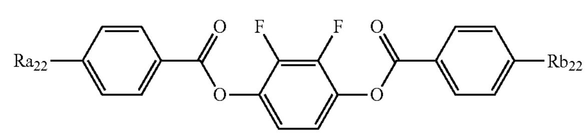
(3-111)
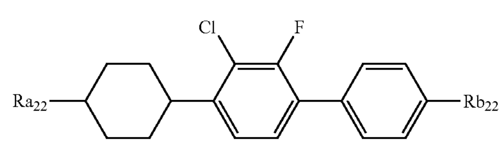
(3-112)
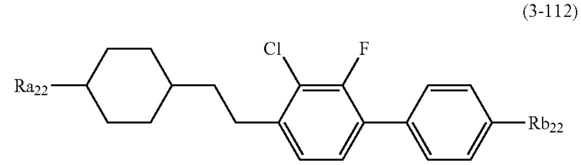

-continued
(3-113)
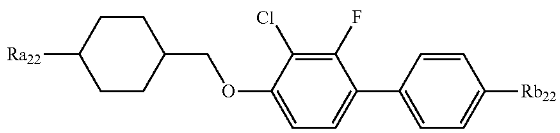
(3-114)
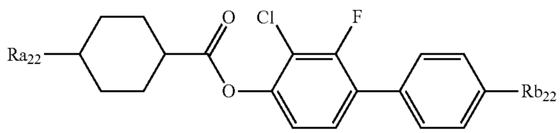
(3-115)
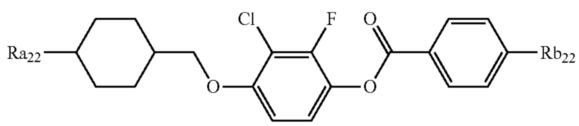
(3-116)
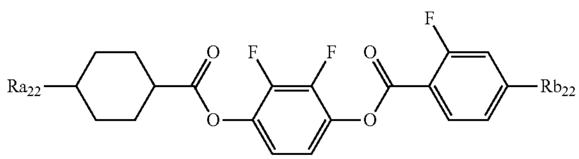
(3-117)
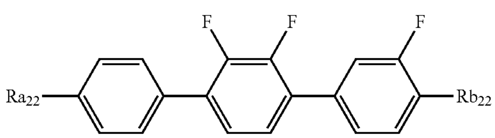
(3-118)
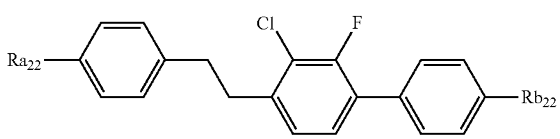
For example, compounds having a condensed ring, such as the compounds (g-3) to (g-6) are desirable in view of decreasing a threshold voltage-value, and the compounds (3-119) to (3-143) are desirable in view of heat resistance or light resistance. In these compounds, $Ra_{22}$ and $Rb_{22}$ have the meanings identical to those described for the compounds (g-3) to (g-6).
(3-119)
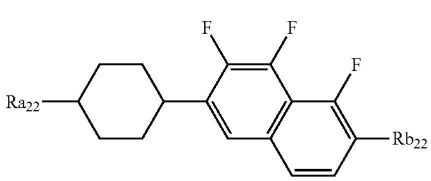
(3-120)
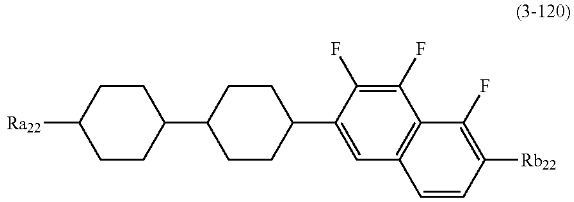
-continued
(3-121)
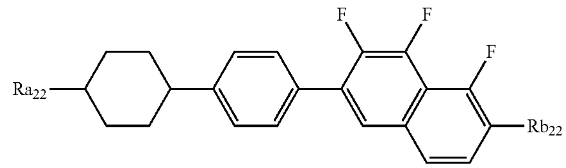
(3-122)
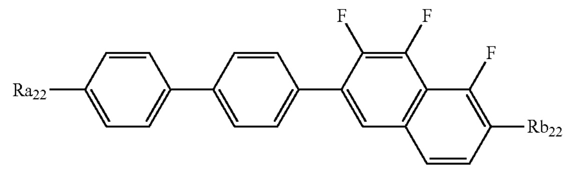
(3-123)
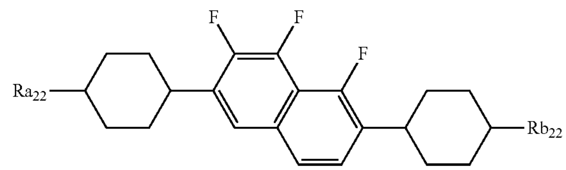
(3-124)
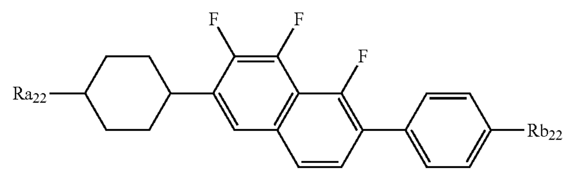
(3-125)
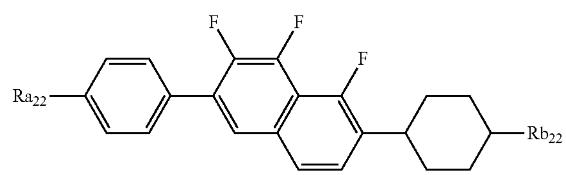
(3-126)
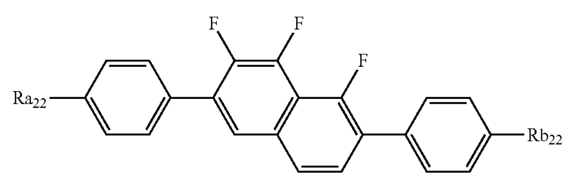
(3-127)
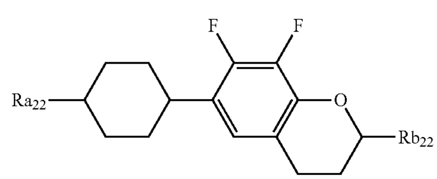
(3-128)
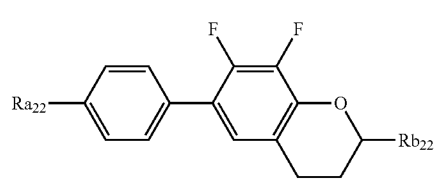

-continued (3-129)

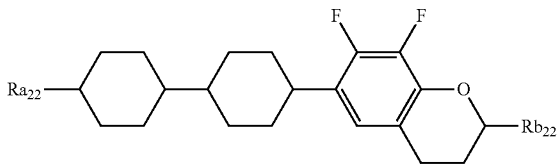

(3-130)

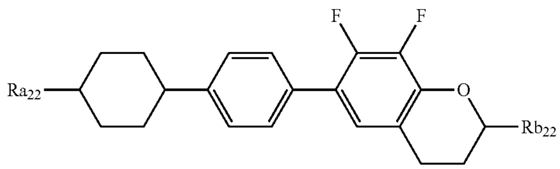

(3-131)

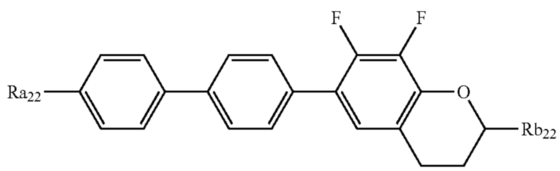

(3-132)

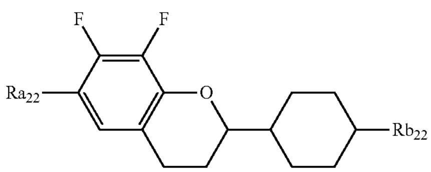

(3-133)

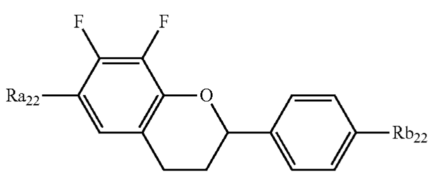

(3-134)

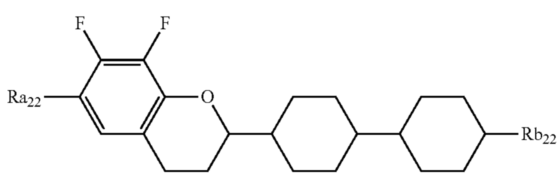

(3-135)

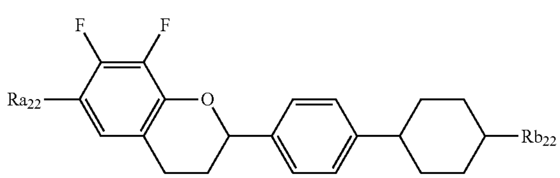

(3-136)

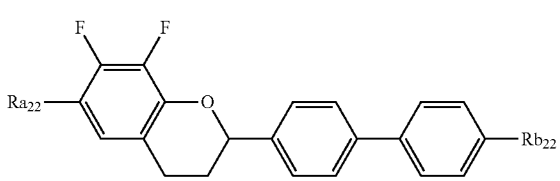

-continued (3-137)

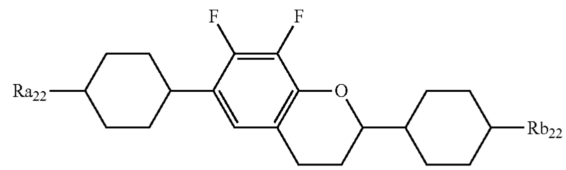

(3-138)

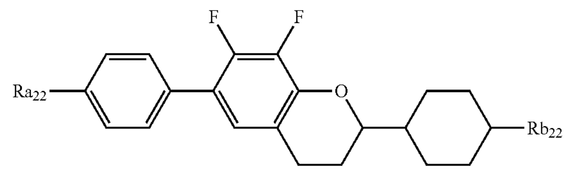

(3-139)

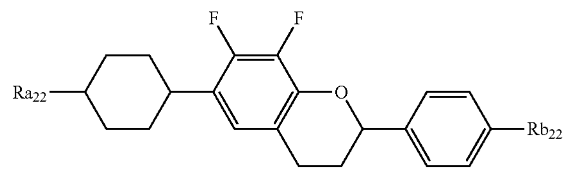

(3-139)

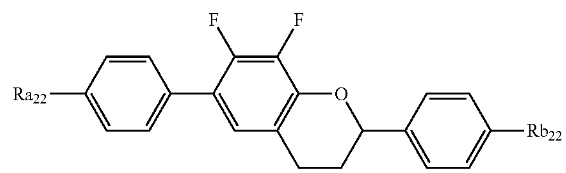

(3-140)

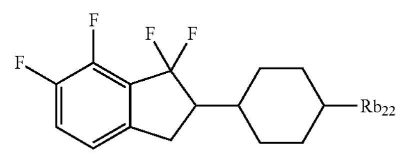

(3-141)

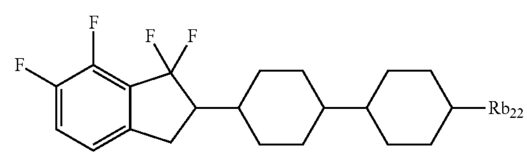

(3-142)

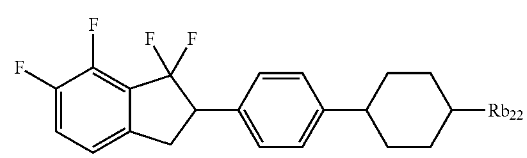

(3-143)

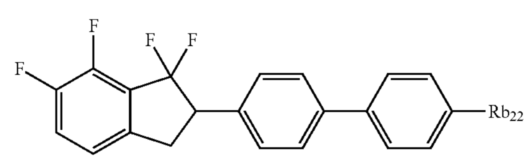

Among the liquid crystal compositions (2), in particular, a liquid crystal composition which includes first, second, and third components has an excellent heat resistance and light resistance, a wide temperature range of a nematic phase, a small viscosity, a high voltage holding ratio, a suitable optical anisotropy, a suitable dielectric anisotropy, and a suitable elastic constant $K_{33}$, wherein the first component is at least one compound selected from the group of compounds represented by formulas (a-1-1) to (a-1-6) and formulas (a-2-1) to (a-2-6), the second component is at least one compound selected from the group of compounds represented by formulas (e-1) to (e-3), and the third component is at least one compound selected from the group of compounds represented by formulas (h-1) to (h-7). Furthermore, the liquid crystal composition is desirable in view of these physical properties suitably balanced.

The content of the third component in the liquid crystal composition of the invention is not limited particularly, and it is desirable to increase the content in view of preventing a decrease in the absolute value of a negative dielectric anisotropy. Although the content ratios of the first, second, and third components of the liquid crystal composition (2) of the invention are not limited particularly, it is desirable that the content ratio of the liquid crystal compound (a) is in the range of 5% to 60% by weight, the content ratio of the second component is in the range of 20% to 75% by weight, and the content ratio of the third component is in the range of 20% to 75% by weight based on the total weight of the liquid crystal composition (2).

When the ratios of the contents of the first, second, and third components of the liquid crystal composition (2) are in the ranges described above, the composition (2) has an excellent heat resistance and light resistance, a wide temperature range of a nematic phase, a small viscosity, a high voltage holding ratio, and a suitable optical anisotropy, a suitable dielectric anisotropy, a suitable elastic constant $K_{33}$. Furthermore, a liquid crystal composition in which these physical properties are more suitably balanced is obtained.

[Aspects and so forth of the Liquid Crystal Composition]

In one aspect on the liquid crystal composition of the invention, other liquid crystal compounds, in addition to the liquid crystal compounds composed of the first and second components, and the third component which is added as requested, may be added and used for the purpose of further adjusting, for example, characteristics of the liquid crystal composition. In another aspect on the liquid crystal composition of the invention, other liquid crystal compounds except the liquid crystal compounds composed of the first and second components, and the third component which is added as requested may not be added and used, for example, in view of their cost.

Additives, such as an optically active compound, a coloring matter, an antifoaming agent, an ultraviolet absorber, an antioxidant, a polymerizable compound, and a polymerization initiator may further be added to the liquid crystal composition of the invention. When the optically active compound is added to the liquid crystal composition of the invention, it can induce a helical structure and giving a twist angle liquid crystals or something.

When the coloring matter is added to the liquid crystal composition of the invention, the liquid crystal composition can be applied to the liquid crystal display device having a GH (Guest host) mode.

When the antifoaming agent is added to the liquid crystal composition of the invention, it is possible to suppress the formation of foam during the transportation of the liquid crystal composition or in a process of manufacturing liquid crystal display devices using this liquid crystal composition.

When the ultraviolet absorber or the antioxidant is added to the liquid crystal composition of the invention, it is possible to prevent degradation or something of the liquid crystal composition and of the liquid crystal display device containing the liquid crystal composition. When the liquid crystal composition is irradiated with ultraviolet light, for example, the ultraviolet absorber can suppress a decrease of a voltage holding ratio or a specific resistance value by suppressing decomposition of compounds. When the liquid crystal composition is heated, for example, the antioxidant can suppress a decrease of a voltage holding ratio and a specific resistance value by suppressing oxidation or decomposition of compounds.

Ultraviolet absorbers include a benzophenone-based ultraviolet absorber, a benzoate-based ultraviolet absorber, and a triazole-based ultraviolet absorber.

A specific example of the benzophenone-based ultraviolet absorber is 2-hydroxy-4-n-octoxybenzophenone.

A specific example of the benzoate-based ultraviolet absorber is 2,4-di-t-butylphenyl-3,5-di-t-butyl-4-hydroxybenzoate.

Specific examples of the triazole-based ultraviolet absorber are 2-(2-hydroxy-5-methylphenyl)benzotriazole, 2-[2-hydroxy-3-(3,4,5,6-tetrahydroxyphthalimide-methyl)-5-methylphenyl]benzotriazole, and 2-(3-t-butyl-2-hydroxy-5-methylphenyl)-5-chlorobenzotriazole.

Antioxidants include a phenol-based antioxidant and an organosulfur-based antioxidant.

Specific examples of the phenol-based antioxidant are 2,6-di-t-butyl-4-methylphenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetra-decylphenol, 2,6-di-t-butyl-4-pentadecylphenol, 2,2'-methylenebis(6-t-butyl 4-methylphenol), 4,4'-butylidenebis (6-t-butyl-3-methylphenol), 2,6-di-t-butyl-4-(2-octadecyloxycarbonyl)ethylphenol, and pentaerythritol tetrakis[3-(3,5-di-t-butyl-4-hydroxyphenyl)propionate].

Specific examples of the organosulfur-based antioxidant are dilauryl-3,3'-thiopropionate, dimyristyl-3,3'-thiopropionate, distearyl-3,3'-thiopropionate, pentaerythritoltetrakis (3-laurylthiopropionate), and 2-mercaptobenzimidazole.

Additives typified by an ultraviolet absorber, antioxidant and so forth may be added and used in the range of amounts which do not prevent the purpose of the invention and can attain the purpose of the addition of the additives.

When an ultraviolet absorber or an antioxidant is added, for example, its content ratio is usually in the range of 10 ppm to 500 ppm, preferably in the range of 30 ppm to 300 ppm, and more preferably in the range of 40 ppm to 200 ppm based on the total weight of the liquid crystal composition of the present invention.

Incidentally, in another aspect, the liquid crystal composition of the invention may contain impurities of starting materials, by-products, solvents used for reactions, catalysts for syntheses and so forth, which have been contaminated in the processes, such as for synthesizing each compound constituting a liquid crystal composition, and for preparing the liquid crystal composition.

A polymerizable compound is mixed into a composition in order to adjust the composition to a device having the PSA (polymer sustained alignment) mode. A desirable example of the polymerizable compound is a compound having a polymerizable group such as a acrylate, a methacrylate, a vinyl compound, a vinyloxy compound, a propenyl ether, or an epoxy compound. A particularly desirable example is an acrylate derivative or a methacrylate derivative. A desirable ratio of the polymerizable compound is 0.05% by weight or more in order to achieve its effect and 10% by weight or less in order to avoid a poor display. A more desirable ratio is in the range of 0.1% to 2% by weight. The polymerizable compound is polymerized on irradiation with ultraviolet light or the like, preferably in the presence of a suitable initiator such as a photo-polymerization initiator. Suitable conditions for polymerization and the suitable type and amount of the initiator are known to a person skilled in the art, and are described in the literature. For example, Irgacure 651 (registered trademark), Irgacure 184 (registered trademark), or Darocure 1173 (registered trademark) (Ciba Geigy AG), which is a photoinitiator, is suitable for radical polymerization. The polymerizable compound contains a photopolymerization initiator preferably in the range of 0.1% to 5% by weight, and more preferably in the range of 1% to 3% by weight.

[Method for Producing Liquid Crystal Compositions]

When each of the compounds which is the components of the liquid crystal composition of the invention is a liquid, for example, the composition is prepared by mixing and shaking the compounds. When the components include solids, the composition is prepared by mixing them, and then shaking after the compounds have been heated and liquefied. Moreover, the liquid crystal composition of the invention can also be prepared by means of other known methods.

[Characteristics of Liquid Crystal Compositions]

Because the maximum temperature of a nematic phase can be adjusted to 70° C. or above and the minimum temperature of the nematic phase can be adjusted to −20° C. or below in the liquid crystal composition of the invention, the temperature range of the nematic phase is wide. Accordingly, the liquid crystal display device containing this liquid crystal composition can be used in a wide temperature range.

In the liquid crystal composition of the invention, the optical anisotropy can be in the range of 0.08 to 0.14, and preferably in the range of 0.05 to 0.18, by suitably adjusting the composition ratio and so forth. The dielectric anisotropy can be normally in the range of −5.0 to −2.0, and preferably in the range of −4.5 to −2.5 in the liquid crystal composition of the invention. The liquid crystal composition having the dielectric anisotropy in these numerical ranges described above can be suitably used for a liquid crystal display device which operates by means of an IPS, VA, or PSA mode.

[Liquid Crystal Display Devices]

The liquid crystal composition of the invention can be used not only for the liquid crystal display device having an operation mode such as a PC, TN, STN, OCB, or PSA mode which is driven by means of a AM mode, but also for the liquid crystal display device having an operation mode such as a PC, TN, STN, OCB, VA, and IPS mode which is driven by means of a passive matrix (PM) mode.

The liquid crystal display devices having the AM and PM mode can be applied to liquid crystal displays and so forth having any of a reflection type, a transmission type, and a semi-transmission type. The liquid crystal composition of the invention can also be used for a DS (dynamic scattering) mode-device using the liquid crystal composition into which an conducting agent is added, a NCAP (nematic curvilinear aligned phase) device prepared by the method of microencapsulating the liquid crystal composition, and a PD (polymer dispersed) device containing a three-dimensional network polymer formed in the liquid crystal composition, for example, a PN (polymer network) device.

Because the liquid crystal composition of the present invention has the characteristics described above, it can be more suitably used for the liquid crystal display device having a AM mode which is operated by means of an operation mode, such as the VA, IPS, or PSA mode, wherein the liquid crystal composition having a negative dielectric anisotropy is used, and especially for the liquid crystal display device having the AM mode which is driven by means of the VA mode.

The direction of an electric field is perpendicular to liquid crystal layers in a liquid crystal display device which is driven by means of the TN mode, the VA mode or the like. On the other hand, the direction of the electric field is parallel to liquid crystal layers in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991/10936 A (patent family: U.S. Pat. No. 5,576,867).

[Example of the Liquid Crystal Compound (a)]

The invention will be explained below in more detail based on examples. However, the invention is not limited to the examples. The term "%" means "% by weight", unless otherwise specified.

Because the compounds obtained were identified on the basis of nuclear magnetic resonance spectra obtained by means of $^{1}$H-NMR analysis, gas chromatograms obtained by means of gas chromatography (GC) analysis and so forth, the analytical methods will be explained first.

EXAMPLES $^{1}$H-NMR Analysis:

A model DRX-500 apparatus (made by Bruker BioSpin Corporation) was used for measurement. Samples prepared in examples and so forth were dissolved in deuterated solvents such as $CDCl_3$ in which the samples were soluble, and measurement was carried out under the conditions of room temperature, twenty four times of accumulation, and 500 MHz. In the explanation of the nuclear magnetic resonance spectra obtained, symbols s, d, t, q, and m stand for a singlet, doublet, triplet, quartet, and multiplet, respectively. Tetramethylsilane (TMS) was used as a standard reference material for a zero-point on chemical shift δ values.

GC Analysis:

A gas chromatograph Model GC-14B made by Shimadzu Corporation was used for measurement. A capillary column CBP1-M25-025 (length 25 m, bore 0.22 mm, film thickness 0.25 μm; dimethylpolysiloxane as a stationary liquid phase; non-polar) made by Shimadzu Corporation was used. Helium was used as a carrier gas, and its flow rate was adjusted to 1 ml per minute. The temperature of the sample injector was set at 300° C. and the temperature of the detector (FID) was set at 300° C.

A sample was dissolved in toluene giving a 1% by weight solution, and then 1 μl of the solution obtained was injected into the sample injector. Chromatopac Model C-R6A made by Shimadzu Corporation or its equivalent was used as a recorder. The resulting gas chromatogram indicated the retention time of peaks and the values of peak areas corresponding to component compounds.

Chloroform or hexane, for example, may also be used as a solvent for diluting the sample. The following capillary columns may also be used: DB-1 (length 30 m, bore 0.25 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd, and so forth.

The ratio of peak areas in the gas chromatogram corresponds to the ratio of component compounds. In general, the percentage by weight of each component compound in an analytical sample is not completely the same with the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of liquid crystal compounds as components. An internal standard method by use of gas chromatograms is used in order to determine the composition ratio of the liquid crystal compounds in the liquid crystal composition more accurately by means of gas chromatograms. The components of each liquid crystal compound (test-component) weighed accurately in a fixed amount and a liquid crystal compound serving as a standard (standard reference material) are analyzed simultaneously by means of gas chromatography, and the relative intensity on the ratio of the peak area of the test-component to that of the standard reference material is calculated in advance. Next, the composition ratio of the liquid crystal compounds in the liquid crystal composition can be determined more accurately by means of the gas-chromatographic analysis using the correction based on the relative intensity of the peak area of each component to that of the standard reference material.

[Samples for Measuring Physical Property-Values of Liquid Crystal Compounds and so forth]

Two kinds of samples are used for measuring the physical property-values of a liquid crystal compound: one is the compound itself, and the other is a mixture of the compound and mother liquid crystals.

In the latter case using a sample in which a compound is mixed with mother liquid crystals, measurement is carried out according to the following method. First, the sample is prepared by mixing 15% by weight of the liquid crystal compound obtained and 85% by weight of the mother liquid crystals. Then, extrapolated values are calculated from the measured values of the resulting sample by means of an extrapolation method based on the following formula. The extrapolated values are regarded as the physical property-values of the compound.

(Extrapolated value)=[100×(Measured value of sample)−(% by weight of mother liquid crystals}×(Measured value of mother liquid crystals)]/(% by weight of liquid crystal compound)

When a smectic phase or crystals are deposited even at this ratio of the liquid crystal compound to the mother liquid crystals at 25° C., the ratio of the liquid crystal compound to the mother liquid crystals is changed in the order of (10% by weight: 90% by weight), (5% by weight: 95% by weight), and (1% by weight: 99% by weight). The physical property-values of the sample are measured at the ratio in which the smectic phase or the crystals are not deposited at 25° C. Extrapolated values are determined according to the above equation, and regarded as the physical property-values of the liquid crystal compound.

There are a variety of mother liquid crystals used for the measurement and, for example, the composition ratio (% by weight) of the mother liquid crystals (i) is as shown below.

Mother Liquid Crystals (i):

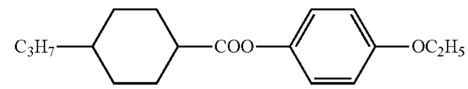

17.2%

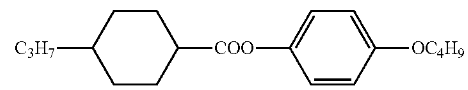

27.6%

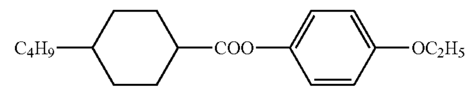

20.7%

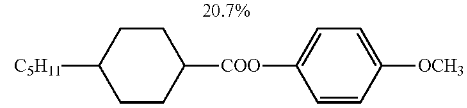

20.7%

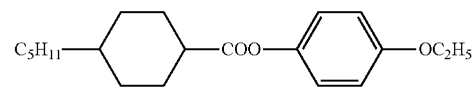

13.8%

[Method for Measuring Physical Property-Values of Liquid Crystal Compounds and so forth]

Physical property-values were measured according to the following methods. Most of the measurement methods were described in the Standard of Electronic Industries Association of Japan, EIAJ•ED-2521A, or those with some modifications. No TFT was attached to a TN device used for measurement.

In regard to the measured values, in the case where a sample was a liquid crystal compound itself, values obtained, as they were, were reported herein as experimental data. In the case where the sample was a mixture of the liquid crystal compound and mother liquid crystals, values obtained by extrapolating measured values were reported herein as experimental data.

Phase Structure and Transition Temperature (° C.):

Measurement was carried out according to the following methods (1) and (2).

(1) A compound was placed on a hot plate of a melting point apparatus (Hot Stage Model FP-52 made by Mettler Toledo International Inc.) equipped with a polarizing microscope, and phase conditions and their changes were observed with the polarizing microscope, specifying the kinds of liquid crystal phases while the compound was heated at the rate of 3° C. per minute.

(2) A sample was heated and then cooled at a rate of 3° C. per minute by use of a Perkin-Elmer differential scanning calorimeter, a DSC-7 System or a Diamond DSC System. A starting point of an endothermic peak or an exothermic peak caused by a phase change of the sample was obtained by means of the extrapolation (on set) and the phase transition temperature was determined.

Hereinafter, the symbol C stood for crystals, which were expressed by $Cr_1$ or $Cr_2$ when the kinds of crystals were distinguishable. The symbols Sm and N stood for a smectic phase and a nematic phase, respectively. The symbol Iso stood for a liquid (isotropic). When the difference between a smectic B phase and a smectic A phase was distinguishable in the smectic phases, they were expressed as SmB, or SmA respectively. Transition temperatures were expressed as, for example, "C 50.0 N 100.0 Iso", which means that the transition temperature from crystals to a nematic phase (CN) is 50.0° C., and the transition temperature from the nematic phase to a liquid (NI) is 100.0° C. The same applied to other transition temperatures.

Maximum Temperature of Nematic Phase ($T_{NI}$; ° C.):

A sample (a liquid crystal composition or a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature meant a temperature measured when part of the sample began to change from a nematic phase to an isotropic liquid. Hereinafter, the maximum temperature of a nematic phase may simply be abbreviated to "maximum temperature."

Compatibility at Low Temperature:

Samples were prepared by mixing a compound with mother liquid crystals so that the amount of the liquid crystal compound became 20% by weight, 15% by weight, 10% by weight, 5% by weight, 3% by weight, and 1% by weight, and placed in glass vials . After these glass vials had been kept in a freezer at 0° C., −5° C., −10° C., or −20° C. for a certain period, they were observed whether or not crystals or a smectic phase had been deposited.

Viscosity (η; Measured at 20° C.; mPa·s):

A mixture of a liquid crystal compound and mother liquid crystals was measured by use of an E-type viscometer.

Optical Anisotropy (Refractive Index Anisotropy; Measured at 25° C.; Δn).

Measurement was carried out by use of an Abbe refractometer with a polarizing plate attached to the ocular, using light at a wavelength of 589 nm. The surface of a main prism was rubbed in one direction, and then a sample (a mixture of a liquid crystal compound and mother liquid crystals) was dropped onto the main prism. A refractive index (n||) was measured when the direction of polarized light was parallel to that of the rubbing. A refractive index (n⊥) was measured when the direction of polarized light was perpendicular to that of the rubbing. The value of optical anisotropy was calculated from the equation:

$$\Delta n = n\| - n\perp.$$

Dielectric Anisotropy (Δ∈; Measured at 25° C.):

An ethanol solution (20 mL) of octadecyltriethoxysilane (0.16 mL) was applied to well-washed glass substrates. The glass substrates were rotated with a spinner, and then heated at 150° C. for 1 hour. A VA device in which a distance (cell gap) was 20 μm was assembled from the two glass substrates. A polyimide alignment film was prepared on glass substrates in a similar manner. After a rubbing-treatment to the alignment film obtained of the glass substrates, a TN device in which a distance between the two glass substrates was 9 μm and the twist angle was 80 degrees was assembled.

A sample (a liquid crystal composition or a mixture of a liquid crystal compound and mother liquid crystals) was put in the VA device obtained, applied with a voltage of 0.5 V (1 kHz, sine waves), and then a dielectric constant (∈||) in a major axis direction of liquid crystal molecules was measured. The sample (the liquid crystal composition or the mixture of the liquid crystal compound and the mother liquid crystals) was put in the TN device obtained, applied with a voltage of 0.5 V (1 kHz, sine waves), and then a dielectric constant (∈⊥) in a minor axis direction of liquid crystal molecules was measured. The value of dielectric anisotropy was calculated from the equation of ∈=∈||−∈⊥.

Voltage Holding Ratio (VHR; Measured at 25° C.; %):

A TN device used for measurement had a polyimide-alignment film and a distance between two glass substrates (cell gap) of 6 μm. A sample was put in the device, and then the device was sealed with an adhesive polymerizable under ultraviolet radiation. The TN device was charged at 25° C. by applying pulse voltage (60 microseconds at 5 V). Decaying voltage was measured for 16.7 milliseconds with a high speed voltmeter, and the area A between a voltage curve and a horizontal axis in a unit period was measured. The area B was an area without the voltage decay. The voltage holding ratio was the percentage of the area A to the area B.

Elastic Constant ($K_{11}$ and $K_{33}$; Measured at 25° C.):

An elastic constant measurement system Model EC-1 made by Toyo Corporation was used for measurement. A sample was put in a homeotropic cell in which a distance between two glass substrates (cell gap) was 20 μm. An electric charge of 20 volts to 0 volts was applied to the cell, and electrostatic capacity and applied voltage were measured. The measured values of the electric capacity (C) and the applied voltage (V) were fitted to formula (2.98) and formula (2.101) in page 75 of the "Liquid crystal device handbook" (The Nikkan Kogyo Shimbun, LTD.) and the value of the elastic constant was obtained from formula (2.100).

Example 1

Synthesis of trans-4'-[2,3-difluoro-4-(trans-4-propylcyclohexyl)phenoxymethyl]-trans-4-pentylbicyclohexyl (No. 1-1-23)

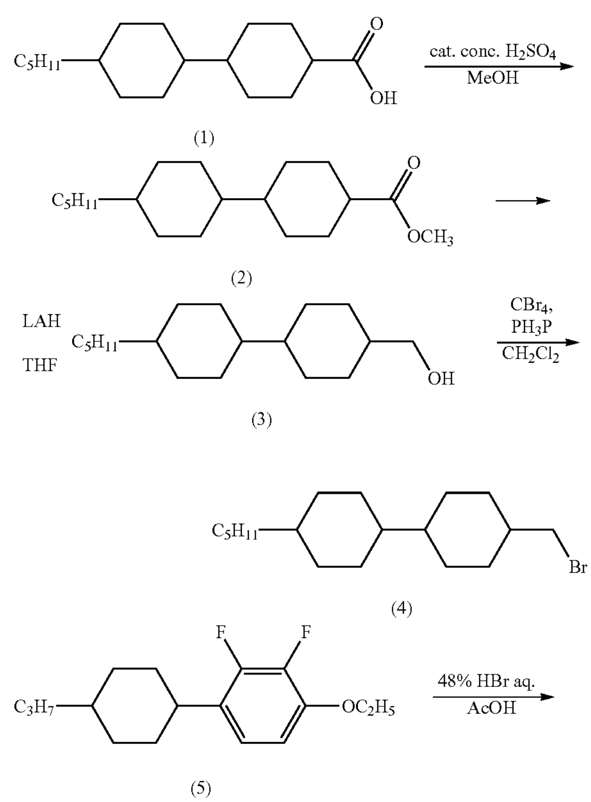

-continued

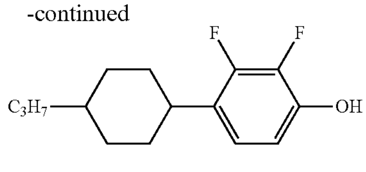

(6)

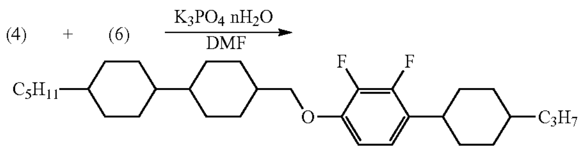

(No. 1-1-23)

First Step:

trans-4'-Pentylbicyclohexyl-trans-4-carboxylic acid (1) (100.0 g), methanol (300 ml), and 95% sulfuric acid (1.0 g) were put in a reaction vessel and stirred under reflux for 2 hours. After completion of the reaction had been confirmed by means of gas chromatographic analysis, the reaction mixture was cooled to room temperature, toluene (600 ml) and water (900 ml) were added thereto, and mixed. The mixture was allowed to stand until it had separated into an organic phase and an aqueous phase, and then an extractive operation into an organic phase was carried out. The organic phases combined were sequentially washed with water, an aqueous 1-N sodium hydroxide solution, and a saturated aqueous solution of sodium hydrogencarbonate, dried over anhydrous magnesium sulfate, and then concentrated under reduced pressure giving the residue. The residue obtained was purified with a fractional operation by means of column chromatography using heptane as the fluent and silica gel as the stationary phase powder, and dried, giving 102.5 g of trans-4'-pentylbicyclohexyl-trans-4-carboxylic acid methylester (2). The yield based on the compound (1) was 97.4%.

Second Step:

Lithiumaluminumhydride (6.4 g) was suspended in THF (500 ml). The compound (2) (100.0 g) was added dropwise in the temperature range of 3° C. to 10° C. to this suspension, and the mixture was stirred for another 2 hours in this temperature range. After completion of the reaction had been confirmed by means of gas chromatographic analysis, ethyl acetate and a saturated aqueous ammonia solution were sequentially added to the reaction mixture on an ice bath, and the deposit was removed by filtration through celite. The filtrate was extracted with ethyl acetate. The organic phase obtained was sequentially washed with water and saturated brine, and dried over anhydrous magnesium sulfate. The solution was concentrated under reduced pressure, giving 85.3 g of a crude compound containing (trans-4'-pentylbicyclohexyl-trans-4-yl) methanol (3). The crude compound obtained was a colorless solid.

Third Step:

The crude compound obtained in the second step (85.3 g) and triphenylphosphine (133.8 g) were dissolved in methylene chloride (400 ml). To this solution, a solution of carbon tetrabromide (169.1 g) in THF (300 ml) was slowly added dropwise at room temperature, and the mixture was stirred at room temperature for another 3 hours. Saturated aqueous solution of sodium hydrogencarbonate and ethyl acetate were added to the reaction mixture obtained, and mixed. Then, the mixture was allowed to stand until it had separated into an organic phase and an aqueous phase, and an extractive operation to an organic phase was carried. The organic phase obtained was sequentially washed with water, saturated brine, and dried over anhydrous magnesium sulfate, and then concentrated under reduced pressure giving the residue. The residue was a light yellow solid. The residue obtained was purified with a fractional operation by means of column chromatography using n-heptane as the eluent and silica gel as the stationary phase powder, and dried, giving 82.3 g of trans-4'-bromomethyl-trans-4-pentyl-bicyclohexyl (4). The compound (4) obtained was a colorless solid. The yield based on the compound (2) was 73.6%.

Fourth Step

1-Ethoxy-2,3-difluoro-4-(trans-4-propylcyclohexyl)benzene (5) (50.0 g), 48% hydrobromic acid (44.8 g), and glacial acetic acid (250 ml) were put in a reaction vessel, and stirred under reflux for 64 hours. After completion of the reaction had been confirmed by means of gas chromatographic analysis, the reaction mixture was cooled to 30° C. Water (500 ml) and toluene (500 ml) were added to the solution obtained, and mixed. Then, the mixture was allowed to stand until it had separated into an organic phase and an aqueous phase, and an extractive operation into an organic phase was carried out. The organic phase obtained was fractionated, washed with brine, and dried over anhydrous magnesium sulfate. The solvent was then distilled off under reduced pressure, and the residue obtained was purified by recrystallization from heptane and dried, giving 41.8 g of 2,3-difluoro-4-(trans-4-propylcyclohexyl)phenol (6). The yield based on the compound (5) was 92.9%.

The compound (5) can also be synthesized by the method described in Japanese Patent 2,811,342 B2 (1998) or the like.

Fifth Step:

The compound (4) (4.9 g), the compound (6) (4.0 g), tripotassium phosphate n-hydrate (4.8 g), and DMF (30 ml) were put in a reaction vessel, and stirred at 70° C. for another 5 hours. After completion of the reaction had been confirmed by means of gas chromatographic analysis, the reaction mixture was cooled to 30° C., and toluene (70 ml) and water (100 ml) were added to the mixture obtained, and mixed. Then, the mixture was allowed to stand until it had separated into an organic phase and an aqueous phase, and an extractive operation into an organic phase was carried out. The organic phase obtained was fractionated, washed with brine, and dried over anhydrous magnesium sulfate. The solvent was then distilled off under reduced pressure, and the residue obtained was purified with a fractional operation by means of column chromatography using a mixed solvent of heptane and toluene (mixing ratio; heptane:toluene=4:1) as the eluent and silica gel as the stationary phase powder. The residue was purified by recrystallization from a mixed solvent of Solmix A-11 and heptane (volume ratio; Solmix A-11:heptane=1:2), and dried, giving 4.0 g of trans-4'-[2,3-difluoro-4-(trans-4-propylcyclohexyl)phenoxymethyl]-trans-4-pentylbicyclohexyl (No. 1-1-23). The yield based on the compound (4) was 53.6%.

Chemical shifts δ (ppm) in $^1$H-NMR analysis were described below, and the compound obtained was identified as trans-4'-[2,3-difluoro-4-(trans-4-propylcyclohexyl)phenoxymethyl]-trans-4-pentylbicyclohexyl. The measurement solvent was $CDCl_3$.

Chemical shifts δ (ppm); 6.82(t, 1H), 6.64(t, 1H), 3.78(d, 2H), 2.73(tt, 1H), 1.93-1.69(m, 13H), and 1.46-0.80(m, 34H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy ($\Delta n$). The physical property-values of the compound (No. 1-1-23) were as follows.

Transition temperature: Cr 90.5 SmB 104.3 SmA 128.2 N 234.1 Iso.

$T_{NI}$=217.9° C., $\Delta\epsilon$=−4.5, $\Delta n$=0.109.

Example 2

Synthesis of trans-4'-[2,3-difluoro-4-(trans-4-propylcyclohexyl)phenoxymethyl]-trans-4-ethylbicyclohexyl (No. 1-1-8)

(No. 1-1-8)

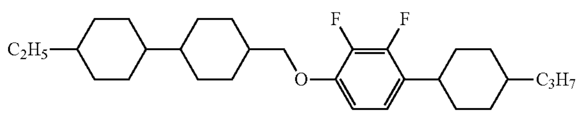

trans-4'-Ethylbicyclohexyl-trans-4-carboxylic acid was used instead of the compound (1), and trans-4'-[2,3-difluoro-4-(trans-4-propylcyclohexyl)phenoxymethyl]-trans-4-ethylbicyclohexyl (No. 1-1-8) was synthesized according to the procedure shown in Example 1.

Chemical shifts δ (ppm) in $^1$H-NMR analysis were described below, and the compound obtained was identified as trans-4'-[2,3-difluoro-4-(trans-4-propylcyclohexyl)phenoxymethyl]-trans-4-ethylbicyclohexyl. The measurement solvent was $CDCl_3$.

Chemical shift δ (ppm); 6.82(t, 1H), 6.64(t, 1H), 3.78(d, 2H), 2.73(tt, 1H), 1.93-1.70(m, 13H), and 1.46-0.80(m, 28H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), and the optical anisotropy ($\Delta n$). The physical property-values of the compound (No. 1-1-8) were as follows.

Transition temperature: Cr 106.3 N 220.8 Iso.

$T_{NI}$=211.9° C., $\Delta\epsilon$=−5.3, $\Delta n$=0.112.

Example 3

Synthesis of trans-4'-[2,3-difluoro-4-(trans-4-pentylcyclohexyl)phenoxymethyl]-trans-4-propylbicyclohexyl (No. 1-1-15)

(No. 1-1-15)

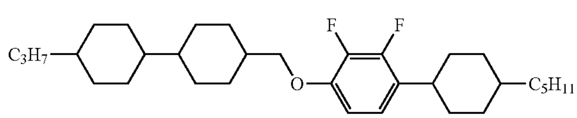

trans-4'-[2,3-Difluoro-4-(trans-4-pentylcyclohexyl)-phenoxymethyl]-trans-4-propylbicyclohexyl (No. 1-1-15) was synthesized according to the procedure shown in Example 1, using trans-4'-propylbicyclohexyl-trans-4-carboxylic acid instead of the compound (1), and using 1-ethoxy-2,3-difluoro-4-(trans-4-pentylcyclohexyl)benzene instead of the compound (5).

Chemical shifts δ (ppm) in $^1$H-NMR analysis were described below, and the compound obtained was identified as trans-4'-[2,3-difluoro-4-(trans-4-pentylcyclohexyl)phenoxymethyl]-trans-4-propylbicyclohexyl. The measurement solvent was $CDCl_3$.

Chemical shift δ (ppm); 6.82(t, 1H), 6.64(t, 1H), 3.78(d, 2H), 2.73(tt, 1H), 1.93-1.69(m, 13H), and 1.46-0.80(m, 34H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), dielectric anisotropy ($\Delta\epsilon$), and optical anisotropy ($\Delta n$). The physical property-values of the compound (No. 1-1-15) were as follows.

Transition temperature: Cr 99.0 N 230.6 Iso.

$T_{NI}$=286.6° C., $\Delta\epsilon$=−6.1, $\Delta n$=0.127.

Example 4

Synthesis of trans-4-[2,3-difluoro-4-(trans-4-vinylcyclohexylmethoxy)phenyl]-trans-4'-propylbicyclohexyl (No. 2-1-29)

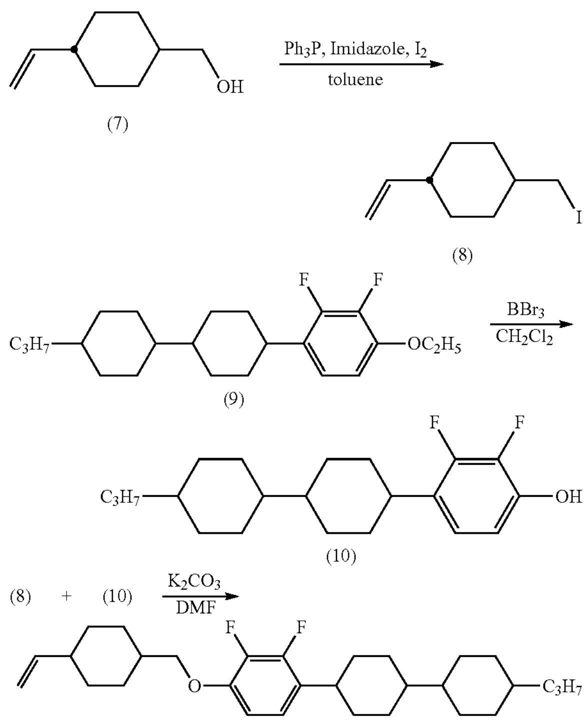

(No. 2-1-29)

First Step:

Under a nitrogen atmosphere, (trans-4-vinyl cyclohexyl) methanol (7) (12.0 g), imidazole (7.6 g), and triphenylphosphine ($Ph_3P$) (29.2 g) were put in toluene (200 ml) and stirred at 5° C. Iodine (27.2 g) was divided into 10 parts and added thereto in the temperature range of 5 to 10° C., and then stirred for another 3 hours . Completion of the reaction was confirmed by means of gas chromatographic analysis. The deposit was removed from the reaction mixture obtained by filtration, and the solvent was distilled off from the filtrate under reduced pressure. The residue obtained was purified with a fractional operation by means of column chromatography using heptane as the eluent and silica gel as the stationary phase powder, and dried, giving 15.2 g of 1-iodomethyl-trans-4-vinylcyclohexane (8). The yield based on the compound (7) was 71.0%.

The compound (7) can be synthesized according to the method described in WO 2006/093102 A and so forth.

Second Step

Under a nitrogen atmosphere, trans-4'-(4-ethoxy-2,3-difluorophenyl)-trans-4'-propylbicyclohexyl (9) (30.3 g) was put in methylene chloride (300 ml), and stirred at −40° C. Boron tribromides ($BBr_3$) (25.0 g) were added thereto, and stirred at 0° C. for 20 hours. Completion of the reaction was confirmed by means of gas chromatographic analysis. The reaction mixture obtained was poured into a vessel containing water (500 ml) cooled at 0° C. and methylene chloride (300 ml), and mixed. Then, the mixture was allowed to stand until it had separated into an organic phase and an aqueous phase, and an extractive operation was carried out. The organic phase obtained was fractionated, washed with brine, and dried over anhydrous magnesium sulfate. The solvent was then distilled off under reduced pressure, and the residue obtained was purified by recrystallization from a mixed solvent of heptane and toluene (volume ratio; heptane and toluene=1:1), and dried, giving 27.0 g of 2,3-difluoro-4-(trans-4'-propylbicyclohexyl-trans-4-yl)phenol (10). The yield based on the compound (9) was 96.5%.

The compound (9) can be synthesized according to the method described in Japanese Patent No. 2,811,342 and so forth.

Third Step

Under a nitrogen atmosphere, compound (10) (1.7 g) and potassium carbonate ($K_2CO_3$) (0.83 g) were put in DMF (10 ml) and stirred at 70° C. The compound (8) (3.0 g) was added thereto and stirred at 70° C. for another 4 hours. The reaction mixture obtained was cooled to 30° C., and toluene (30 ml) and water (30 ml) were added, and mixed. Then, the mixture was allowed to stand until it had separated into an organic phase and an aqueous phase, and an extractive operation into an organic phase was carried out. The organic phase obtained was fractionated, washed with brine, and dried over anhydrous magnesium sulfate. The solvent was then distilled off under reduced pressure, and the residue obtained was purified with a fractional operation by means of column chromatography using a mixed solvent of heptane and toluene (volume ratio; heptane and toluene=4:1) as the eluent and silica gel as the stationary phase powder. The residue was purified by recrystallization from a mixed solvent of Solmix A-11 and heptane (volume ratio; Solmix A-11:heptane=1:2), and dried, giving 0.9 g of trans-4-[2,3-difluoro-4-(trans-4-vinylcyclohexylmethoxy)phenyl]-trans-4'-propylbicyclohexyl (No. 2-1-29). The yield based on the compound (10) was 39.2%.

Chemical shifts δ (ppm) in $^1$H-NMR analysis were described below, and the compound obtained was identified as trans-4-[2,3-difluoro-4-(trans-4-vinylcyclohexylmethoxy)phenyl]-trans-4'-propylbicyclohexyl. The measurement solvent was $CDCl_3$.

Chemical shift δ (ppm); 6.82(t, 1H), 6.65(t, 1H), 5.82-5.75 (m, 1H), 4.97(dt, 1H), 4.91(dt, 1H), 3.81(d, 2H), 2.71(tt, 1H), 1.95-1.71(m, 14H), 1.41(q, 2H), 1.35-1.27(m, 2H), 1.20-0.95 (m, 13H), and 0.89-0.82(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 2-1-29) were as follows.

Transition temperature: $Cr_1$ 69.9 $Cr_2$ 80.8 SmB 96.3 SmA 123.1 N 252.6 Iso.

$T_{NI}$=215.9° C., Δ∈=−5.2, Δn=0.114.

Example 5

Synthesis of trans-4'-[2,3-difluoro-4-(trans-4-propylcyclohexyl)phenoxymethyl]-trans-4-vinylbicyclohexyl (No. 1-1-29)

(No.1-1-29)

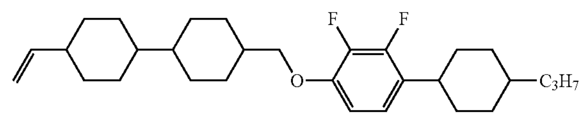

trans-4'-[2,3-Difluoro-4-(trans-4-propylcyclohexyl)-phenoxymethyl]-trans-4-vinylbicyclohexyl (No. 1-1-29) was synthesized according to the procedure shown in Example 4, using (trans-4'-vinylbicyclohexyl-trans-yl) methanol instead of the compound (7) and using the compound (6) instead of the compound (10).

Chemical shifts δ (ppm) in $^1$H-NMR analysis were described below, and the compound obtained was identified as trans-4'-[2,3-difluoro-4-(trans-4-propylcyclohexyl)phenoxymethyl]-trans-4-vinylbicyclohexyl. The measurement solvent was $CDCl_3$.

Chemical shift δ (ppm); 6.82(t, 1H), 6.64(t, 1H), 5.81-5.74 (m, 1H), 4.95(d, 1H), 4.87(d, 1H), 3.78(d, 2H), 2.73(tt, 1H), 1.94-1.76(m, 14H), 1.46-1.18(m, 7H), 1.10-1.04(m, 12H), and 0.90(t, 3H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-1-29) were as follows.

Transition temperature: Cr 96.1 N 234.8 Iso.

$T_{NI}$=211.9° C., Δ∈=−5.3, Δn=0.115.

Example 6

Synthesis of tran-4-{4-[2,3-difluoro-4-(trans-4-pentyl-cyclohexyl)phenoxymethyl]phenyl}-trans-4'-propylbicyclohexyl (No. 1-1-399)

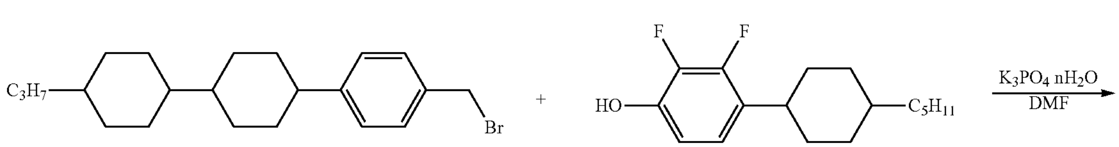

(11) (12)

-continued

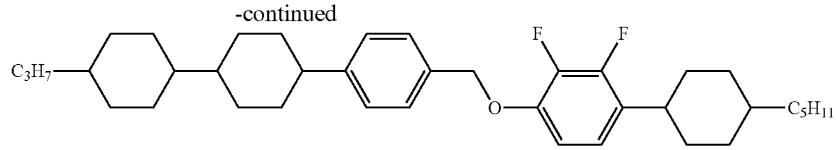

(No. 1-1-399)

trans-4-{4-[2,3-Difluoro-4-(trans-4-pentylcyclohexyl)-phenoxymethyl]phenyl}-trans-4'-propylbicyclohexyl (No. 1-1-399) can be synthesized by selecting trans-4'-(4-bromomethyl -phenyl)-trans-4-propylbicyclohexyl (11) as an alkyl halide derivative and 2,3-difluoro-4-(trans-4-pentylcyclohexyl) phenol (12) as a phenol derivative, according to a procedure similar to that shown in Example 1 or 3.

Example 7

A variety of compounds were synthesized by use of corresponding starting materials according to the procedure shown in Examples 1 to 6, and the compounds were confirmed to be objective.

trans-4'-[2,3-Difluoro-4-(trans-4-ethoxycyclohexyl) phenoxy-methyl]-trans-4-pentylbicyclohexyl (No. 1-1-27)

(No. 1-1-27)

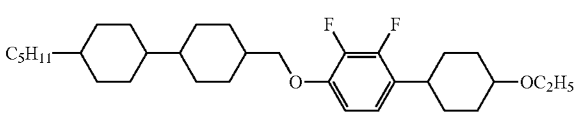

Chemical shift δ (ppm); 6.80(t, 1H), 6.64(t, 1H), 3.78(d, 2H), 3.55(q, 2H), 3.29(tt, 1H), 2.73(tt, 1H), 2.15(d, 2H), 1.95-1.85(m, 4H), 1.80-1.67(m, 7H), and 1.56-0.78(m, 29H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-1-27) were as follows.

Transition temperature: Cr 108.4 SmA 112.7 N 223.0 Iso.

$T_{NI}$=203.6° C., Δ∈=−6.1, Δn=0.113.

2,3-Difluoro-4-(trans-4'-pentylbicyclohexyl-trans-4-ylmethoxy)-4'-biphenyl (No. 1-1-203)

(No. 1-1-203)

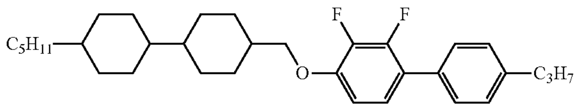

Chemical shift δ (ppm); 7.41(d, 2H), 7.24(d, 2H), 7.07(t, 1H), 3.85(d, 2H), 2.62(t, 2H), 1.95(m, 2H), 1.79-1.64(m, 9H), 1.32-1.21(m, 6H), 1.17-0.94(m, 14H), and 0.89-0.81(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-1-27) were as follows.

Transition temperature: Cr 111.3 SmA 169.8 N 231.6 Iso.

$T_{NI}$=214.6° C., Δ∈=−4.71, Δn=0.167, η=53.7 mPa·s.

4'-Butoxy-2,3,3'-trifluoro-4-(trans-4'-propylbicyclohexyl-trans-4-ylmethoxy)-biphenyl (No. 1-1-209)

(No. 1-1-209)

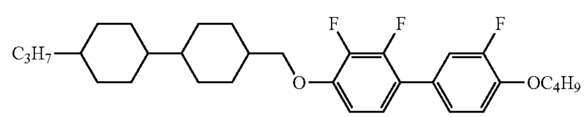

Chemical shift δ (ppm); 7.25-7.18(m, 2H), 7.05-6.98(m, 2H), 6.76(t, 1H), 4.07(t, 2H), 3.84(d, 2H), 1.95(m, 2H), 1.85-1.70(m, 9H), 1.56-1.49(m, 2H), 1.33-1.27(m, 2H), 1.15-1.13 (m, 3H), 1.06-0.94(m, 11H), and 0.89-0.81(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), dielectric anisotropy (Δ∈), and optical anisotropy (Δn). The physical property-values of the compound (No. 1-1-209) were as follows.

Transition temperature: Cr 86.8 SmA 179.8 N 235.5 Iso.

$T_{NI}$=214.6° C., Δ∈=−6.1, Δn=0.174.

4'-Butoxy-2,3,3'-trifluoro-4-(trans-4'-vinylbicyclohexyl-trans-4-ylmethoxy)-biphenyl (No. 1-1-214)

(No. 1-1-214)

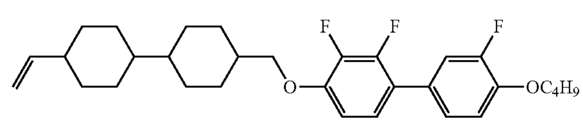

Chemical shift δ (ppm); 7.26-7.19(m, 2H), 7.05-6.99(m, 2H), 6.76(t, 1H), 5.81-5.74(m, 1H), 4.96(d, 1H), 4.88(d, 1H), 4.07(t, 2H), 3.85(d, 2H), 1.96-1.78(m, 12H), 1.56-1.49(m, 2H), and 1.12-0.98(m, 13H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), and the optical anisotropy ($\Delta n$). The physical property-values of the compound (No. 1-1-214) were as follows.

Transition temperature: Cr 91.7 SmA 151.0 N 230.4 Iso.

$T_{NI}$=206.6° C., $\Delta\epsilon$=−6.6, $\Delta n$=0.176.

trans-4-[2,3-Difluoro-4-(trans-4-pentylcyclohexylmethoxy)-phenyl]-trans-4'-propylbicyclohexyl (No. 2-1-23)

(No. 2-1-23)

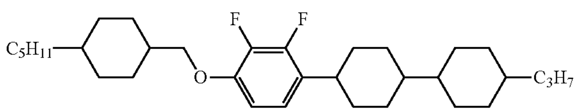

Chemical shift δ (ppm); 6.82(t, 1H), 6.64(t, 1H), 3.78(d, 2H), 2.71(tt, 1H), 1.91-1.72(m, 13H), and 1.44-0.82(m, 34H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), dielectric anisotropy ($\Delta\epsilon$), and optical anisotropy ($\Delta n$). The physical property-values of the compound (No. 1-1-23) were as follows.

Transition temperature: Cr 77.0 SmB 133.2 SmA 167.7 N 246.2 Iso.

$T_{NI}$=268.6° C., $\Delta\epsilon$=−6.9, $\Delta n$=0.141.

2,3-Difluoro-4-(trans-4-pentylcyclohexylmethoxy)-4'-(trans-4-propylcyclohexyl) biphenyl (No. 2-1-85)

(No. 2-1-85)

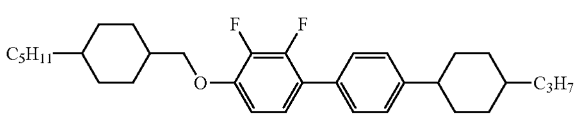

Chemical shift δ (ppm); 7.42(d, 2H), 7.27(d, 2H), 7.07(t, 1H), 6.77(t, 1H), 3.85(d, 2H), 2.50(tt, 1H), 1.93-1.77(m, 9H), 1.52-1.44(m, 2H), 1.39-1.17(m, 14H), 1.10-1.03(m, 4H), and 0.99-0.87(m, 8H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), and the optical anisotropy ($\Delta n$). The physical property-values of the compound (No. 2-1-85) were as follows.

Transition temperature: Cr (50.7 SmX) 76.6 SmC 80.9 N 239.5 Iso.

$T_{NI}$=218.6° C., $\Delta\epsilon$=−5.0, $\Delta n$=0.167.

2,3-Difluoro-4- (trans-4-pentylcyclohexylmethoxy) -4"-propyl-[1,1';4',1"] terphenyltrans-4-propylcyclohexyl)biphenyl (No. 2-1-143)

(No. 2-1-143)

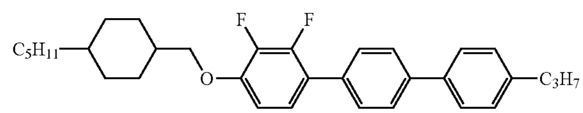

Chemical shift δ (ppm); 7.64(d, 2H), 7.55(t, 4H), 7.26(d, 2H), 7.12(t, 1H), 6.79(t, 1H), 3.87(d, 2H), 2.64(t, 2H), 1.94-1.92(m, 2H), 1.83-1.78(m, 3H), 1.73-1.66(m, 2H), 1.33-1.18 (m, 9H), and 1.08(qd, 2H), 1.00-0.88(m, 8H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), the and optical anisotropy ($\Delta n$). The physical property-values of the compound (No. 2-1-143) were as follows.

Transition temperature: Cr 112.0 N 252.4 Iso.

$T_{NI}$=232.6° C., $\Delta\epsilon$=−4.3, $\Delta n$=0.247.

Example 8

The compounds (No. 1-1-1) to (No. 1-1-410), and the compounds (No. 2-1-1) to (No. 2-1-410), which are shown in Table 1 to Table 56, can be synthesized by a synthesis method which is similar to the methods described in Examples 1 to 7.

TABLE 1

(1-1)

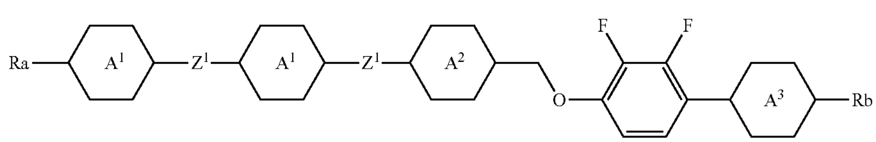

| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-1 | $CH_3$ | 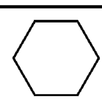 | — | — | — | 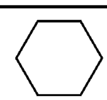 | 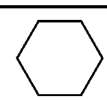 | $CH_3$ | |
| 1-1-2 | $CH_3$ | 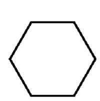 | — | — | — | 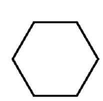 | 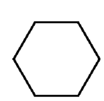 | $C_2H_5$ | |

TABLE 1-continued
(1-1)
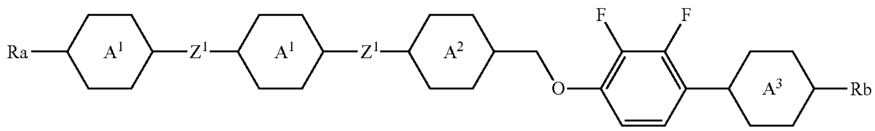
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-3 | $CH_3$ | 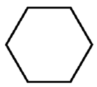 | — | — | — | 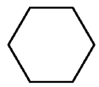 | 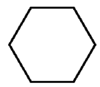 | $C_3H_7$ | |
| 1-1-4 | $CH_3$ | 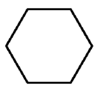 | — | — | — | 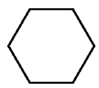 | 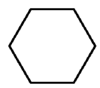 | $C_4H_9$ | |
| 1-1-5 | $CH_3$ | 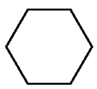 | — | — | — | 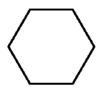 | 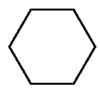 | $C_5H_{11}$ | |
| 1-1-6 | $C_2H_5$ | 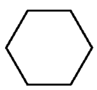 | — | — | — | 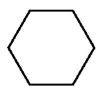 | 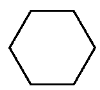 | $CH_3$ | |
| 1-1-7 | $C_2H_5$ | 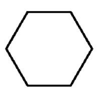 | — | — | — | 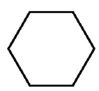 | 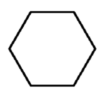 | $C_2H_5$ | |
| 1-1-8 | $C_2H_5$ | 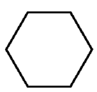 | — | — | — | 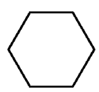 | 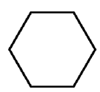 | $C_3H_7$ | Cr 106.3 N 220.8 Iso $T_{NI}$: 211.9° C., Δ ϵ: −5.3, Δ n: 0.112 |
| 1-1-9 | $C_2H_5$ | 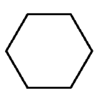 | — | — | — | 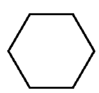 | 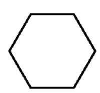 | $C_4H_9$ | |
| 1-1-10 | $C_2H_5$ | 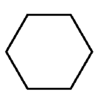 | — | — | — | 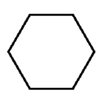 | 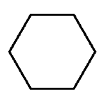 | $C_5H_{11}$ | |
| 1-1-11 | $C_3H_7$ | 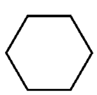 | — | — | — | 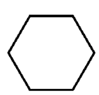 | 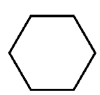 | $CH_3$ | |
| 1-1-12 | $C_3H_7$ | 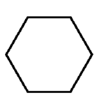 | — | — | — | 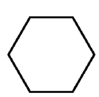 | 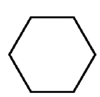 | $C_2H_5$ | |
| 1-1-13 | $C_3H_7$ | 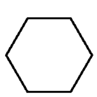 | — | — | — | 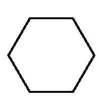 | 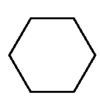 | $C_3H_7$ | |
| 1-1-14 | $C_3H_7$ | 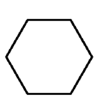 | — | — | — | 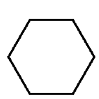 | 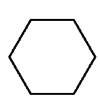 | $C_4H_9$ | |
| 1-1-15 | $C_3H_7$ | 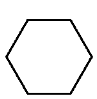 | — | — | — | 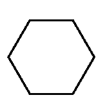 | 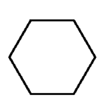 | $C_5H_{11}$ | Cr 99.0 N 230.6 Iso $T_{NI}$: 286.6° C., Δ ϵ: −6.1, Δ n: 0.127 |

TABLE 2

(1-1)

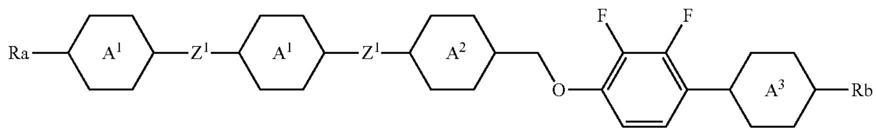

| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-16 | $C_4H_9$ | 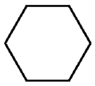 | — | — | — | 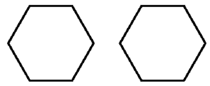 | | $CH_3$ | |
| 1-1-17 | $C_4H_9$ | 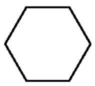 | — | — | — | 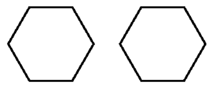 | | $C_2H_5$ | |
| 1-1-18 | $C_4H_9$ | 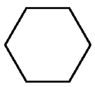 | — | — | — | 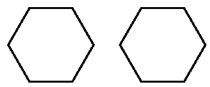 | | $C_3H_7$ | |
| 1-1-19 | $C_4H_9$ | 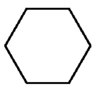 | — | — | — | 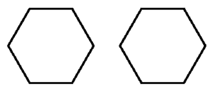 | | $C_4H_9$ | |
| 1-1-20 | $C_4H_9$ | 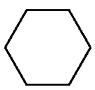 | — | — | — | 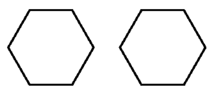 | | $C_5H_{11}$ | |
| 1-1-21 | $C_5H_{11}$ | 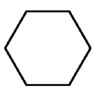 | — | — | — | 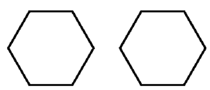 | | $CH_3$ | |
| 1-1-22 | $C_5H_{11}$ | 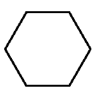 | — | — | — | 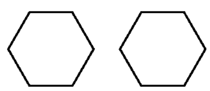 | | $C_2H_5$ | |
| 1-1-23 | $C_5H_{11}$ | 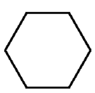 | — | — | — | 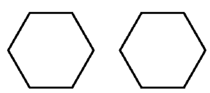 | | $C_3H_7$ | Cr 90.5 SmB 104.3 SmA 128.2 N 234.1 Iso $T_{NI}$: 217.9° C., $\Delta\epsilon$: −4.5, $\Delta n$: 0.109 |
| 1-1-24 | $C_5H_{11}$ | 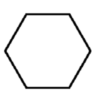 | — | — | — | 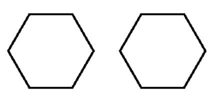 | | $C_4H_9$ | |
| 1-1-25 | $C_5H_{11}$ | 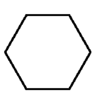 | — | — | — | 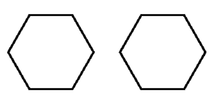 | | $C_5H_{11}$ | |
| 1-1-26 | $C_3H_7$ | 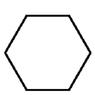 | — | — | — | 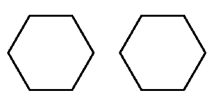 | | $OC_2H_5$ | |
| 1-1-27 | $C_5H_{11}$ | 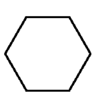 | — | — | — | 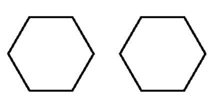 | | $OC_2H_5$ | Cr 108.4 SmA 112.7 N 223.0 Iso $T_{NI}$: 203.6° C., $\Delta\epsilon$: −6.1, $\Delta n$: 0.113 |
| 1-1-28 | $C_2H_5O$ | 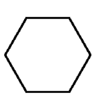 | — | — | — | 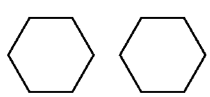 | | $OC_4H_9$ | |
| 1-1-29 | $CH_2{=}CH$ | 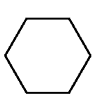 | — | — | — | 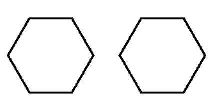 | | $C_3H_7$ | Cr 96.1 N 234.8 Iso $T_{NI}$: 211.9° C., $\Delta\epsilon$: −5.3, $\Delta n$: 0.115 |

TABLE 2-continued
(1-1)
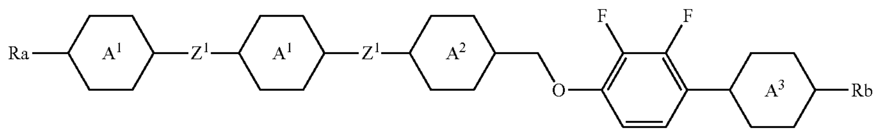
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-30 | $CH_2{=}CH$ | 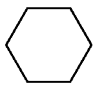 | — | — | — | 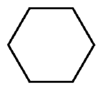 | 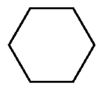 | $C_5H_{11}$ | |
TABLE 3
(1-1)
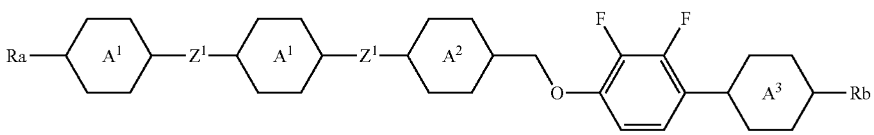
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-31 | $CH_3CH{=}CH$ | 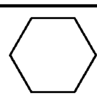 | — | — | — | 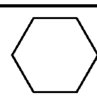 | 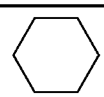 | $C_3H_7$ | |
| 1-1-32 | $CH_3CH{=}CH$ | 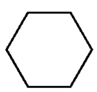 | — | — | — | 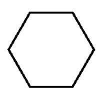 | 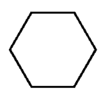 | $C_5H_{11}$ | |
| 1-1-33 | $CH_2{=}CHC_2H_4$ | 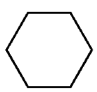 | — | — | — | 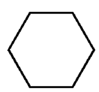 | 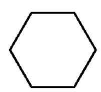 | $C_3H_7$ | |
| 1-1-34 | $CH_2{=}CHC_2H_4$ | 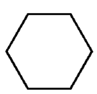 | — | — | — | 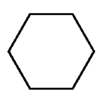 | 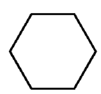 | $C_5H_{11}$ | |
| 1-1-35 | $C_3H_7CH{=}CH$ | 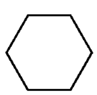 | — | — | | 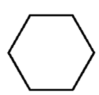 | 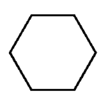 | $C_2H_5$ | |
| 1-1-36 | $C_3H_7CH{=}CH$ | 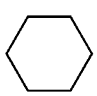 | — | — | — | 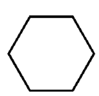 | 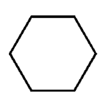 | $C_3H_7$ | |
| 1-1-37 | $CH_3CH{=}CHC_2H_4$ | 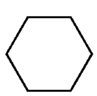 | — | — | — | 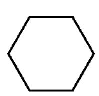 | 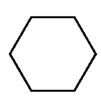 | $CH_3$ | |
| 1-1-38 | $CH_3CH{=}CHC_2H_4$ | 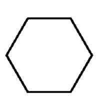 | — | — | — | 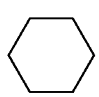 | 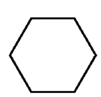 | $C_2H_5$ | |
| 1-1-39 | $C_3H_7$ | 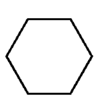 | — | — | — | 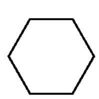 | 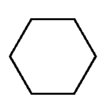 | $CH{=}CH_2$ | |
| 1-1-40 | $C_5H_{11}$ | 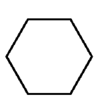 | — | — | — | 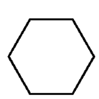 | 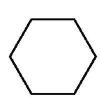 | $CH{=}CH_2$ | |

TABLE 3-continued
(1-1)
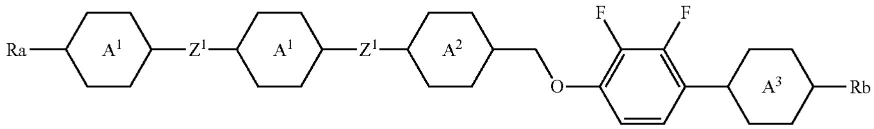
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-41 | $C_3H_7$ | 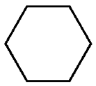 | — | — | — | 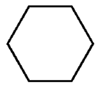 | 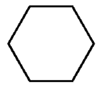 | $CH{=}CHCH_3$ | |
| 1-1-42 | $C_4H_9$ | 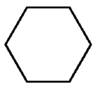 | — | — | — | 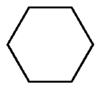 | 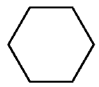 | $CH{=}CHCH_3$ | |
| 1-1-43 | $C_2H_5$ | 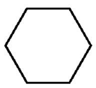 | — | — | — | 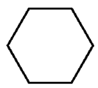 | 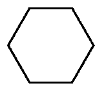 | $C_2H_4CH{=}CH_2$ | |
| 1-1-44 | $C_3H_7$ | 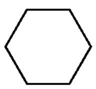 | — | — | — | 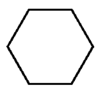 | 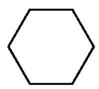 | $C_2H_4CH{=}CH_2$ | |
| 1-1-45 | $CH_3$ | 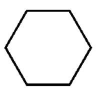 | — | — | — | 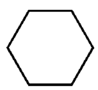 | 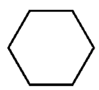 | $CH{=}CHC_3H_7$ | |
TABLE 4
(1-1)
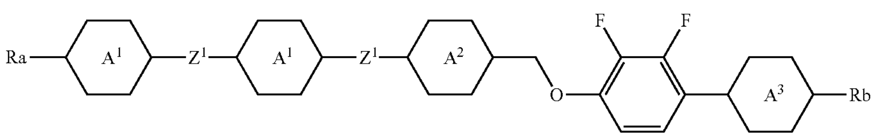
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-46 | $C_2H_5$ | 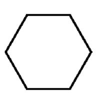 | — | — | — | 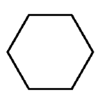 | 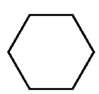 | $CH{=}CHC_3H_7$ | |
| 1-1-47 | $C_2H_5$ | 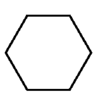 | — | — | — | 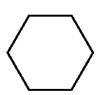 | 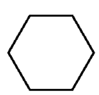 | $C_2H_4CH{=}CHCH_3$ | |
| 1-1-48 | $C_3H_7$ | 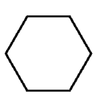 | — | — | — | 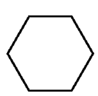 | 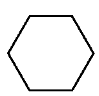 | $C_2H_4CH{=}CHCH_3$ | |
| 1-1-49 | $CH_2{=}CH$ | 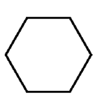 | — | — | — | 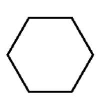 | 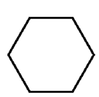 | $C_2H_4CH{=}CH_2$ | |
| 1-1-50 | $CH_3CH{=}CH$ | 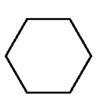 | — | — | — | 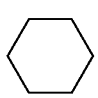 | 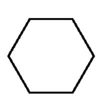 | $CH{=}CH_2$ | |

TABLE 4-continued
(1-1)
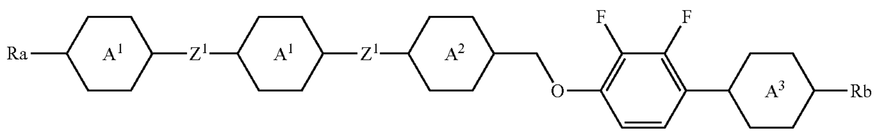
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-51 | $C_3H_7OCH_2$ | 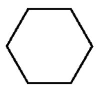 | — | — | — | 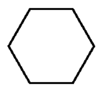 | 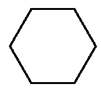 | $C_3H_7$ | |
| 1-1-52 | $C_5H_{11}$ | 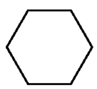 | — | — | — | 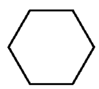 | 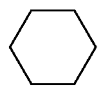 | $OC_2H_4CH{=}CH_2$ | |
| 1-1-53 | $C_3H_7$ | 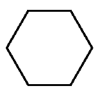 | $CH_2CH_2$ | — | — | 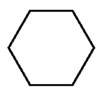 | 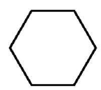 | $C_2H_5$ | |
| 1-1-54 | $C_5H_{11}$ | 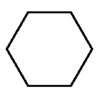 | $CH_2CH_2$ | — | — | 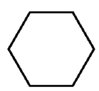 | 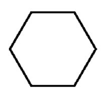 | $C_3H_7$ | |
| 1-1-55 | $C_3H_7$ | 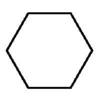 | $CH_2O$ | — | — | 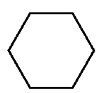 | 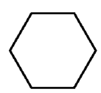 | $C_2H_5$ | |
| 1-1-56 | $C_5H_{11}$ | 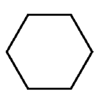 | $OCH_2$ | — | — | 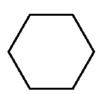 | 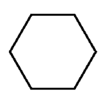 | $C_3H_7$ | |
| 1-1-57 | H | 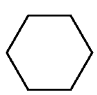 | COO | — | — | 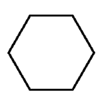 | 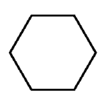 | $C_4H_9$ | |
| 1-1-58 | $C_7H_{15}$ | 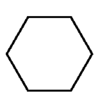 | OCO | — | — | 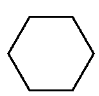 | 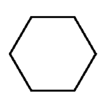 | $C_4H_9$ | |
| 1-1-59 | $C_2H_5$ | 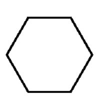 | $CF_2O$ | — | — | 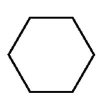 | 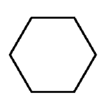 | $C_6H_{13}$ | |
| 1-1-60 | $CH_3$ | 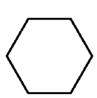 | $OCF_2$ | — | — | 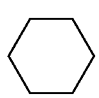 | 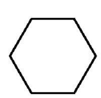 | $C_2H_5$ | |

TABLE 5
(1-1)
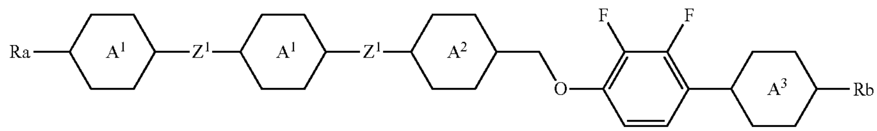
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-61 | $CH_3$ | 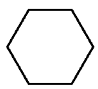 | — | — | — | 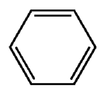 | 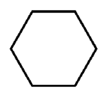 | $CH_3$ | |
| 1-1-62 | $CH_3$ | 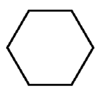 | — | — | — | 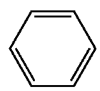 | 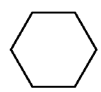 | $C_2H_5$ | |
| 1-1-63 | $CH_3$ | 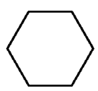 | — | — | — | 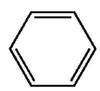 | 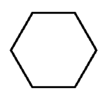 | $C_3H_7$ | |
| 1-1-64 | $CH_3$ | 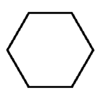 | — | — | — | 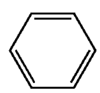 | 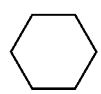 | $C_4H_9$ | |
| 1-1-65 | $CH_3$ | 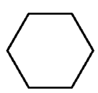 | — | — | — | 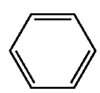 | 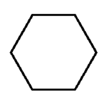 | $C_5H_{11}$ | |
| 1-1-66 | $C_2H_5$ | 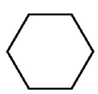 | — | — | — | 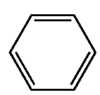 | 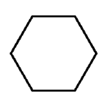 | $CH_3$ | |
| 1-1-67 | $C_2H_5$ | 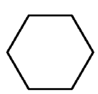 | — | — | — | 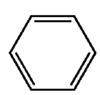 | 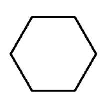 | $C_2H_5$ | |
| 1-1-68 | $C_2H_5$ | 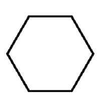 | — | — | — | 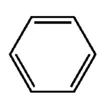 | 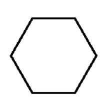 | $C_3H_7$ | |
| 1-1-69 | $C_2H_5$ | 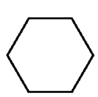 | — | — | — | 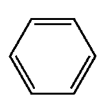 | 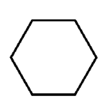 | $C_4H_9$ | |
| 1-1-70 | $C_2H_5$ | 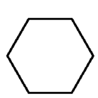 | — | — | — | 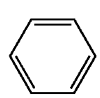 | 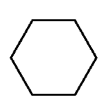 | $C_5H_{11}$ | |
| 1-1-71 | $C_3H_7$ | 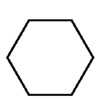 | — | — | — | 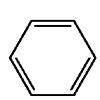 | 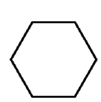 | $CH_3$ | |
| 1-1-72 | $C_3H_7$ | 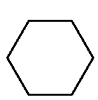 | — | — | — | 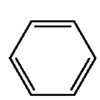 | 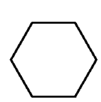 | $C_2H_5$ | |
| 1-1-73 | $C_3H_7$ | 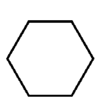 | — | — | — | 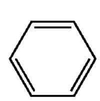 | 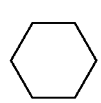 | $C_3H_7$ | |

TABLE 5-continued
(1-1)
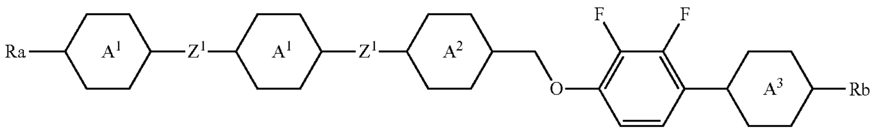
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-74 | $C_3H_7$ | 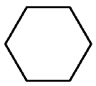 | — | — | — | 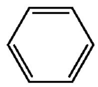 | 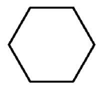 | $C_4H_9$ | |
| 1-1-75 | $C_3H_7$ | 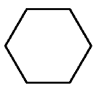 | — | — | — | 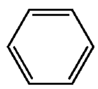 | 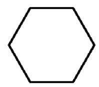 | $C_5H_{11}$ | |
TABLE 6
(1-1)
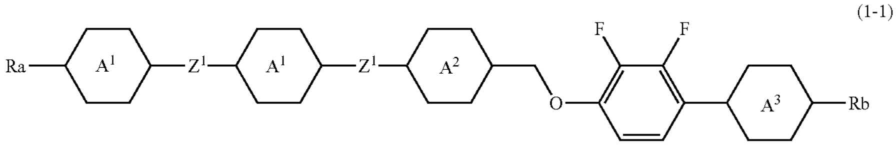
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-76 | $C_4H_9$ | 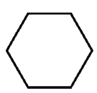 | — | — | — | 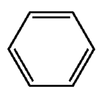 | 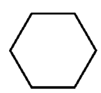 | $CH_3$ | |
| 1-1-77 | $C_4H_9$ | 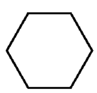 | — | — | — | 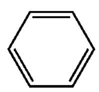 | 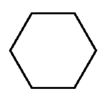 | $C_2H_5$ | |
| 1-1-78 | $C_4H_9$ | 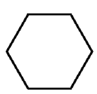 | — | — | — | 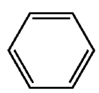 | 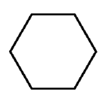 | $C_3H_7$ | |
| 1-1-79 | $C_4H_9$ | 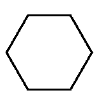 | — | — | — | 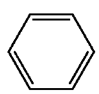 | 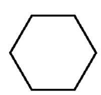 | $C_4H_9$ | |
| 1-1-80 | $C_4H_9$ | 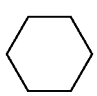 | — | — | — | 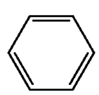 | 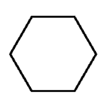 | $C_5H_{11}$ | |
| 1-1-81 | $C_5H_{11}$ | 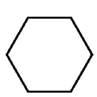 | — | — | — | 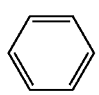 | 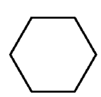 | $CH_3$ | |
| 1-1-82 | $C_5H_{11}$ | 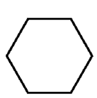 | — | — | — | 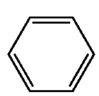 | 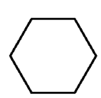 | $C_2H_5$ | |
| 1-1-83 | $C_5H_{11}$ | 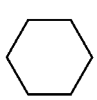 | — | — | — | 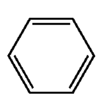 | 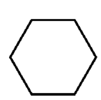 | $C_3H_7$ | |

TABLE 6-continued
(1-1)
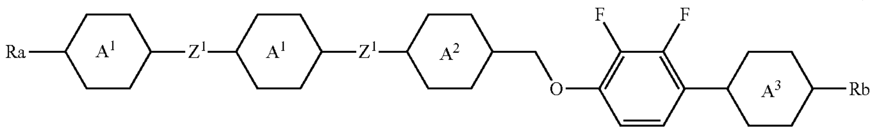
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-84 | $C_5H_{11}$ | 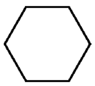 | — | — | — | 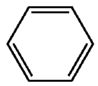 | 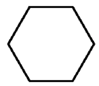 | $C_4H_9$ | |
| 1-1-85 | $C_5H_{11}$ | 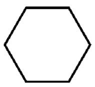 | — | — | — |  | 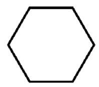 | $C_3H_7$ | |
| 1-1-86 | $C_2H_5O$ | 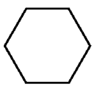 | — | — | — | 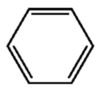 | 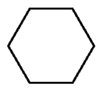 | $C_4H_9$ | |
| 1-1-87 | $C_5H_{11}$ | 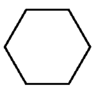 | — | — | — |  | 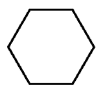 | $OC_2H_5$ | |
| 1-1-88 | $C_2H_5O$ | 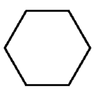 | — | — | — |  | 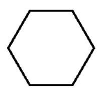 | $OC_4H_9$ | |
| 1-1-89 | $C_5H_{11}$ | 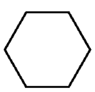 | — | — | — | 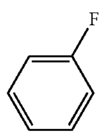 | 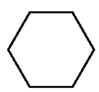 | $C_3H_7$ | |
| 1-1-90 | $C_3H_7$ | 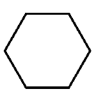 | — | — | — | 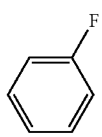 | 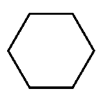 | $C_5H_{11}$ | |
TABLE 7
(1-1)
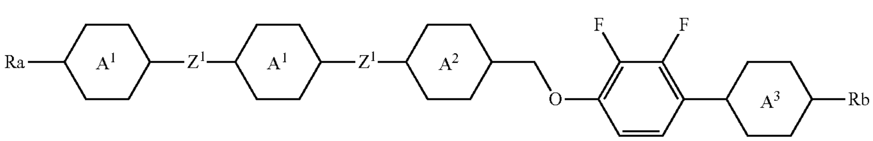
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-91 | $C_2H_5$ | 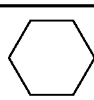 | — | — | — | 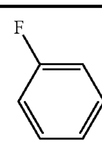 | 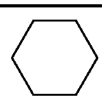 | $C_4H_9$ | |

TABLE 7-continued
(1-1)
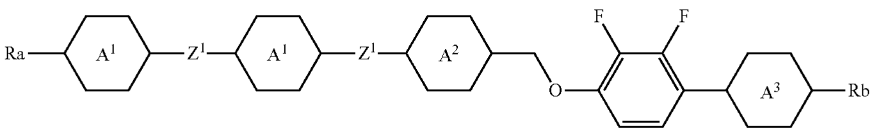
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-92 | $C_5H_{11}$ | 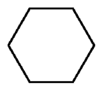 | — | — | — | 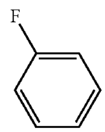 | 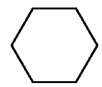 | $C_2H_5$ | |
| 1-1-93 | $CH_2{=}CH$ | 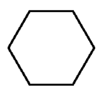 | — | — | — | 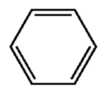 | 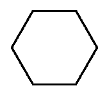 | $C_3H_7$ | |
| 1-1-94 | $CH_2{=}CH$ | 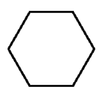 | — | — | — | 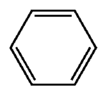 | 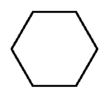 | $C_5H_{11}$ | |
| 1-1-95 | $C_3H_7CH{=}CH$ | 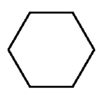 | — | — | — | 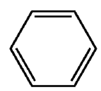 | 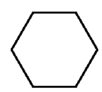 | $C_2H_5$ | |
| 1-1-96 | $C_3H_7CH{=}CH$ | 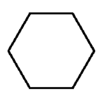 | — | — | — | 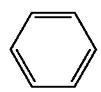 | 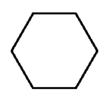 | $C_3H_7$ | |
| 1-1-97 | $C_3CH{=}CHC_2H_4$ | 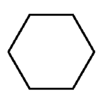 | — | — | — | 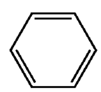 | 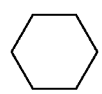 | $CH_3$ | |
| 1-1-98 | $C_3CH{=}CHC_2H_4$ | 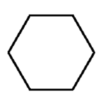 | — | — | — | 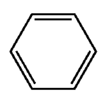 | 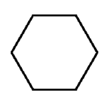 | $C_2H_5$ | |
| 1-1-99 | $C_3H_7$ | 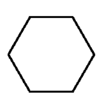 | — | — | — | 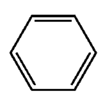 | 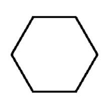 | $CH{=}CH_2$ | |
| 1-1-100 | $C_5H_{11}$ | 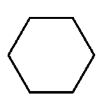 | — | — | — | 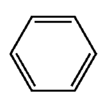 | 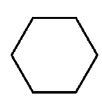 | $CH{=}CH_2$ | |
| 1-1-101 | $C_3H_7$ | 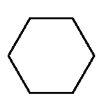 | — | — | — | 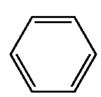 | 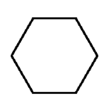 | $CH{=}CHCH_3$ | |
| 1-1-102 | $C_5H_{11}$ | 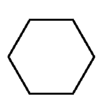 | — | — | — | 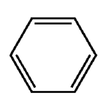 | 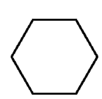 | $CH{=}CHCH_3$ | |
| 1-1-103 | $C_2H_5$ | 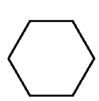 | — | — | — | 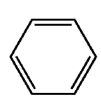 | 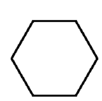 | $C_2H_4CH{=}CH_2$ | |
| 1-1-104 | $C_3H_7$ | 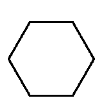 | — | — | — | 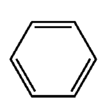 | 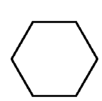 | $C_2H_4CH{=}CH_2$ | |

TABLE 7-continued
(1-1)
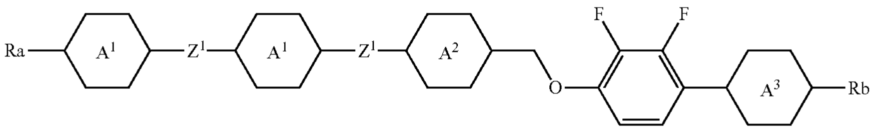
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-105 | $CH_3$ | 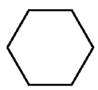 | — | — | — | 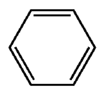 | 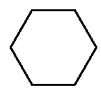 | $CH{=}CHC_3H_7$ | |
TABLE 8
(1-1)
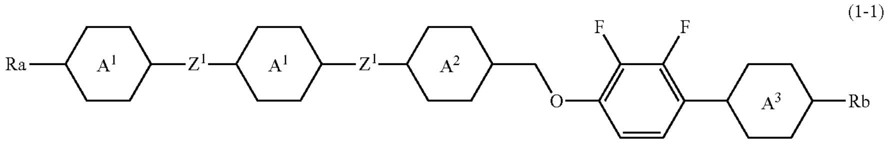
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-106 | $C_2H_5$ | 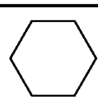 | — | — | — | 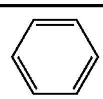 | 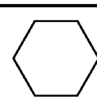 | $CH{=}CHC_3H_7$ | |
| 1-1-107 | $C_2H_5$ | 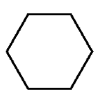 | — | — | — | 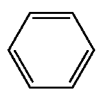 | 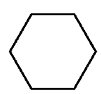 | $C_2H_4CH{=}CHCH_3$ | |
| 1-1-108 | $C_3H_7$ | 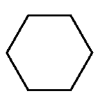 | — | — | — | 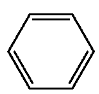 | 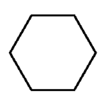 | $C_2H_4CH{=}CHCH_3$ | |
| 1-1-109 | $CH_2{=}CH$ | 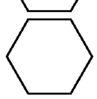 | — | — | — | 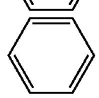 | 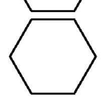 | $C_2H_4CH{=}CH_2$ | |
| 1-1-110 | $CH_3CH{=}CH$ | 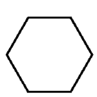 | — | — | — | 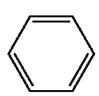 | 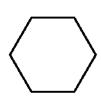 | $CH{=}CH_2$ | |
| 1-1-111 | $C_5H_{11}OCH_2$ | 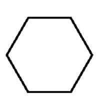 | — | — | — | 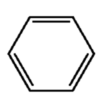 | 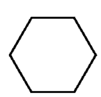 | $C_3H_7$ | |
| 1-1-112 | $C_3H_7$ | 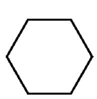 | — | — | — | 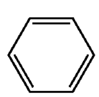 | 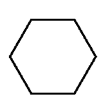 | $OC_2H_4CH{=}CH_2$ | |
| 1-1-113 | $C_4H_9$ | 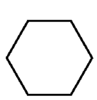 | $CH_2CH_2$ | — | — | 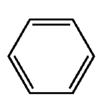 | 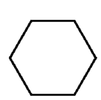 | $C_2H_5$ | |
| 1-1-114 | $C_5H_{11}$ | 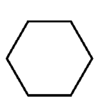 | $CH_2CH_2$ | — | — | 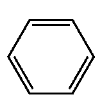 | 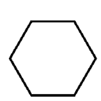 | $C_3H_7$ | |

TABLE 8-continued
(1-1)
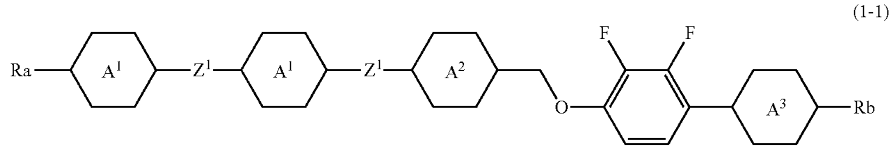
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-115 | $C_3H_7$ | 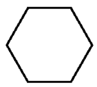 | $CH_2O$ | — | — | 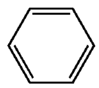 | 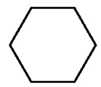 | $C_2H_5$ | |
| 1-1-116 | $C_5H_{11}$ | 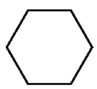 | $OCH_2$ | — | — | 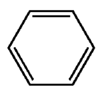 | 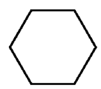 | $C_6H_{13}$ | |
| 1-1-117 | $C_5H_{11}$ | 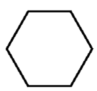 | COO | — | — | 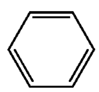 | 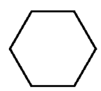 | $C_4H_9$ | |
| 1-1-118 | $C_2H_5$ | 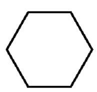 | OCO | — | — | 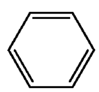 | 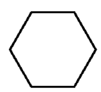 | $C_4H_9$ | |
| 1-1-119 | $C_2H_5$ | 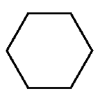 | $CF_2O$ | — | — | 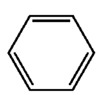 | 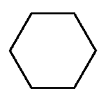 | $CH_3$ | |
| 1-1-120 | $C_4H_9$ | 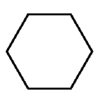 | $OCF_2$ | — | — | 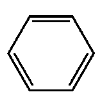 | 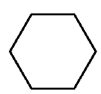 | $C_2H_5$ | |
TABLE 9
(1-1)
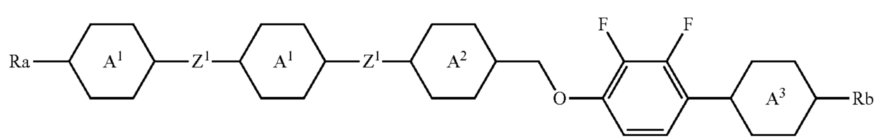
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-121 | $CH_3$ | 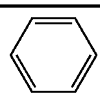 | — | — | — | 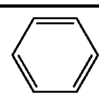 | 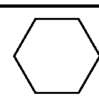 | $CH_3$ | |
| 1-1-122 | $CH_3$ | 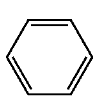 | — | — | — | 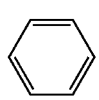 | 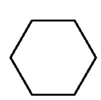 | $C_2H_5$ | |
| 1-1-123 | $CH_3$ | 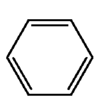 | — | — | — | 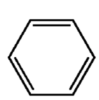 | 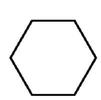 | $C_3H_7$ | |
| 1-1-124 | $CH_3$ | 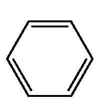 | — | — | — | 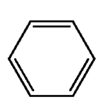 | 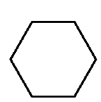 | $C_4H_9$ | |

TABLE 9-continued
(1-1)
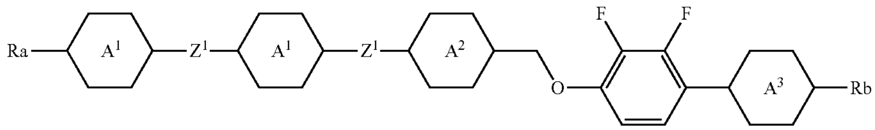
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-125 | $CH_3$ | 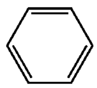 | — | — | — | 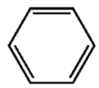 | 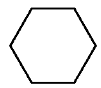 | $C_5H_{11}$ | |
| 1-1-126 | $C_2H_5$ | 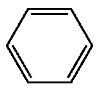 | — | — | — | 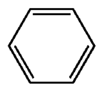 | 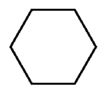 | $CH_3$ | |
| 1-1-127 | $C_2H_5$ | 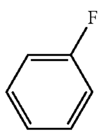  | — | — | — | 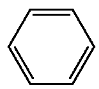 | 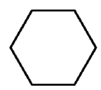 | $C_2H_5$ | |
| 1-1-128 | $C_2H_5$ | 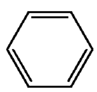 | — | — | — | 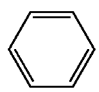 | 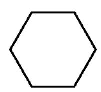 | $C_3H_7$ | |
| 1-1-129 | $C_2H_5$ |  | — | — | — | 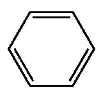 | 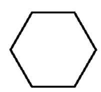 | $C_4H_9$ | |
| 1-1-130 | $C_2H_5$ | 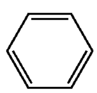 | — | — | — | 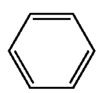 | 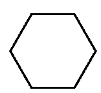 | $C_5H_{11}$ | |
| 1-1-131 | $C_3H_7$ | 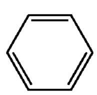 | — | — | — | 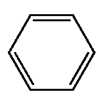 | 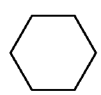 | $CH_3$ | |
| 1-1-132 | $C_3H_7$ | 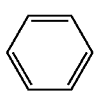 | — | — | — | 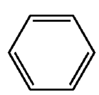 | 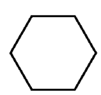 | $C_2H_5$ | |
| 1-1-133 | $C_3H_7$ | 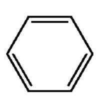 | — | — | — | 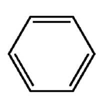 | 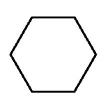 | $C_3H_7$ | |
| 1-1-134 | $C_3H_7$ | 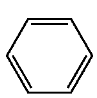 | — | — | — | 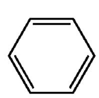 | 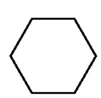 | $C_4H_9$ | |
| 1-1-135 | $C_3H_7$ | 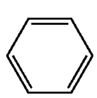 | — | — | — | 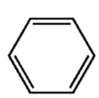 | 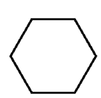 | $C_5H_{11}$ | |

TABLE 10
(1-1)
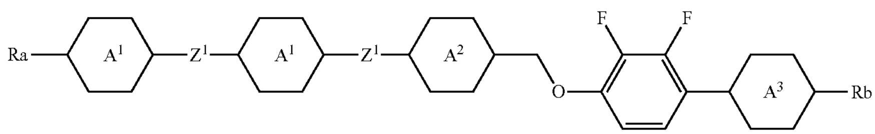
| No. | Ra | A¹ | Z¹ | A¹ | Z¹ | A² | A³ | Rb | Physical property values |
|---|---|---|---|---|---|---|---|---|---|
| 1-1-136 | $C_4H_9$ | 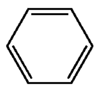 | — | — | — | 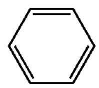 | 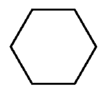 | $CH_3$ | |
| 1-1-137 | $C_4H_9$ | 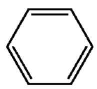 | — | — | — | 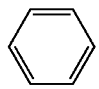 | 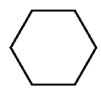 | $C_2H_5$ | |
| 1-1-138 | $C_4H_9$ |  | — | — | — | 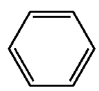 | 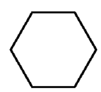 | $C_3H_7$ | |
| 1-1-139 | $C_4H_9$ | 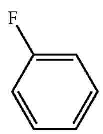 | — | — | — | 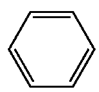 | 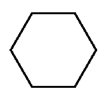 | $C_4H_9$ | |
| 1-1-140 | $C_4H_9$ |  | — | — | — | 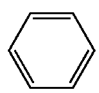 | 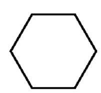 | $C_5H_{11}$ | |
| 1-1-141 | $C_5H_{11}$ | 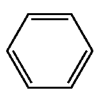 | — | — | — | 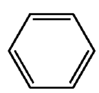 | 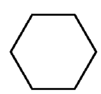 | $CH_3$ | |
| 1-1-142 | $C_5H_{11}$ | 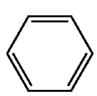 | — | — | — | 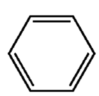 | 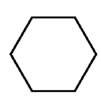 | $C_2H_5$ | |
| 1-1-143 | $C_5H_{11}$ | 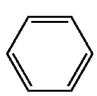 | — | — | — | 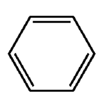 | 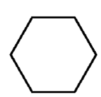 | $C_3H_7$ | |
| 1-1-144 | $C_5H_{11}$ | 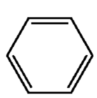 | — | — | — | 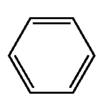 | 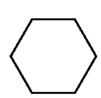 | $C_4H_9$ | |
| 1-1-145 | $C_5H_{11}$ | 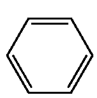 | — | — | — | 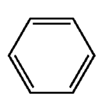 | 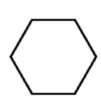 | $C_3H_7$ | |
| 1-1-146 | $C_2H_5O$ | 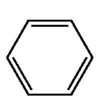 | — | — | — | 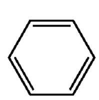 | 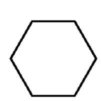 | $C_4H_9$ | |
| 1-1-147 | $C_5H_{11}$ | 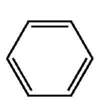 | — | — | — | 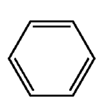 | 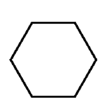 | $OC_2H_5$ | |
| 1-1-148 | $C_2H_5O$ | 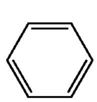 | — | — | — | 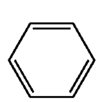 | 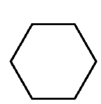 | $OC_4H_9$ | |

TABLE 10-continued
(1-1)
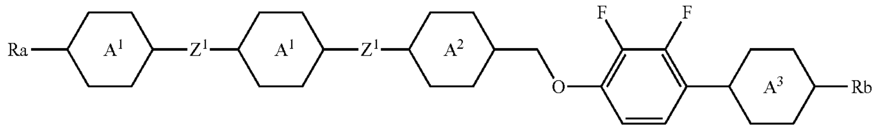
| No. | Ra | A¹ | Z¹ | A¹ | Z¹ | A² | A³ | Rb | Physical property values |
|---|---|---|---|---|---|---|---|---|---|
| 1-1-149 | $C_5H_{11}$ | 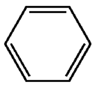 | — | — | — | 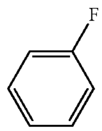 | 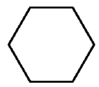 | $C_3H_7$ | |
| 1-1-150 | $C_3H_7$ | 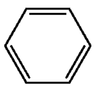 | — | — | — | 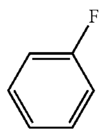 | 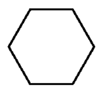 | $C_5H_{11}$ | |
TABLE 11
(1-1)
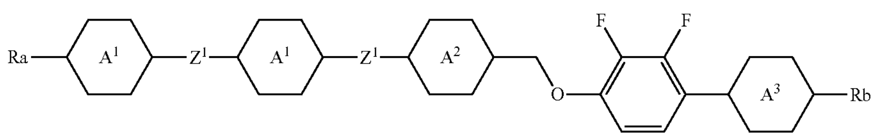
| No. | Ra | A¹ | Z¹ | A¹ | Z¹ | A² | A³ | Rb | Physical property values |
|---|---|---|---|---|---|---|---|---|---|
| 1-1-151 | $C_2H_5$ | 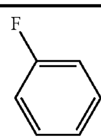 | — | — | — | 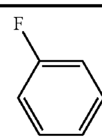 | 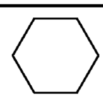 | $C_4H_9$ | |
| 1-1-152 | $C_5H_{11}$ | 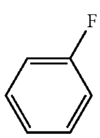 | — | — | — | 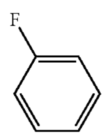 | 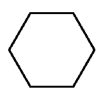 | $C_2H_5$ | |
| 1-1-153 | $CH_2{=}CH$ | 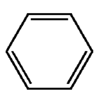 | — | — | — | 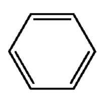 | 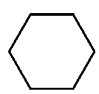 | $C_3H_7$ | |
| 1-1-154 | $CH_2{=}CH$ | 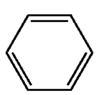 | — | — | — | 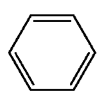 | 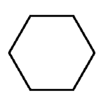 | $C_5H_{11}$ | |
| 1-1-155 | $CH_3CH{=}CH$ | 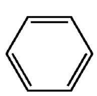 | — | — | — | 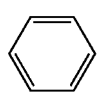 | 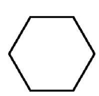 | $C_2H_5$ | |
| 1-1-156 | $CH_2{=}CHC_2H_4$ | 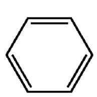 | — | — | — | 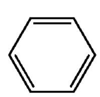 | 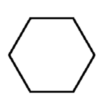 | $C_3H_7$ | |
| 1-1-157 | $C_3H_7CH{=}CH$ | 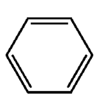 | — | — | — | 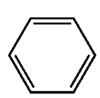 | 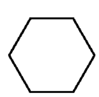 | $C_4H_9$ | |

TABLE 11-continued
(1-1)
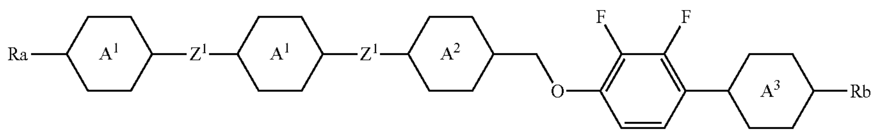
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-158 | $CH_3CH{=}CHC_2H_4$ | 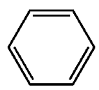 | — | — | — | 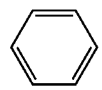 | 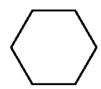 | $C_2H_5$ | |
| 1-1-159 | $C_3H_7$ | 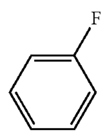 | — | — | — | 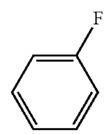 | 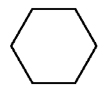 | $CH{=}CH_2$ | |
| 1-1-160 | $C_5H_{11}$ |  | — | — | — | 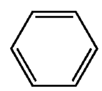 | 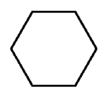 | $CH{=}CH_2$ | |
| 1-1-161 | $C_3H_7$ | 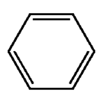 | — | — | — | 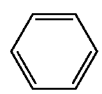 | 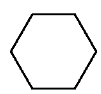 | $CH{=}CHCH_3$ | |
| 1-1-162 | $C_4H_9$ | 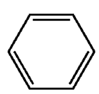 | — | — | — | 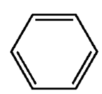 | 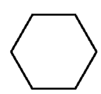 | $CH{=}CHCH_3$ | |
| 1-1-163 | $C_3H_7$ | 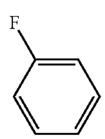 | — | — | — | 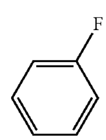 | 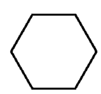 | $C_2H_4CH{=}CH_2$ | |
| 1-1-164 | $C_3H_7$ | 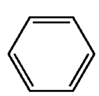 | — | — | — | 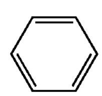 | 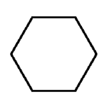 | $C_2H_4CH{=}CH_2$ | |
| 1-1-165 | $C_4H_9$ | 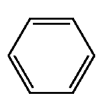 | — | — | — | 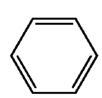 | 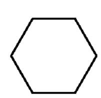 | $CH{=}CHC_3H_7$ | |
TABLE 12
(1-1)
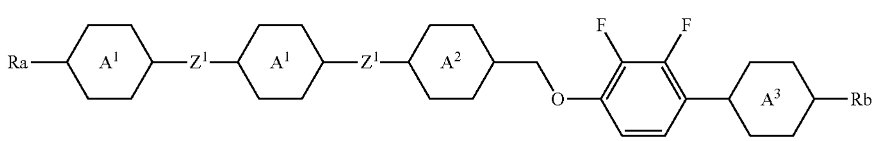
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-166 | $C_2H_5$ | 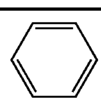 | — | — | — | 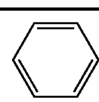 | 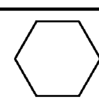 | $CH{=}CHC_3H_7$ | |

TABLE 12-continued
(1-1)
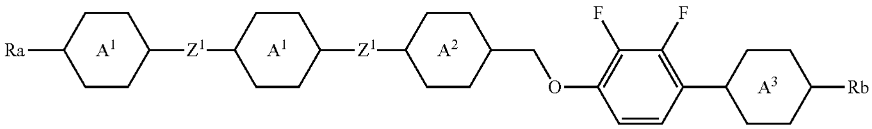
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-167 | $C_2H_5$ |  | — | — | — | 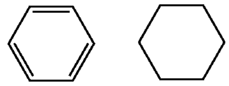 | | $C_2H_4CH{=}CHCH_3$ | |
| 1-1-168 | $C_3H_7$ | 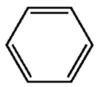 | — | — | — | 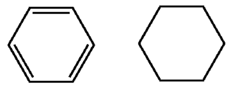 | | $C_2H_4CH{=}CHCH_3$ | |
| 1-1-169 | $CH_2{=}CH$ |  | — | — | — | 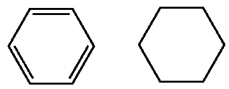 | | $CH{=}CH_2$ | |
| 1-1-170 | $CH_3CH{=}CH$ |  | — | — | — | 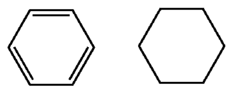 | | $C_2H_4CH{=}CH_2$ | |
| 1-1-171 | $CH_3OCH_2$ |  | — | — | — | 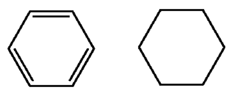 | | $C_3H_7$ | |
| 1-1-172 | $C_2H_5$ |  | — | — | — | 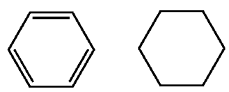 | | $OC_2H_4CH{=}CH_2$ | |
| 1-1-173 | $C_3H_7$ | 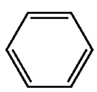 | $CH_2CH_2$ | — | — | 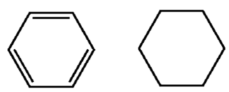 | | $C_2H_5$ | |
| 1-1-174 | $C_5H_{11}$ | 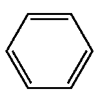 | $CH_2CH_2$ | — | — | 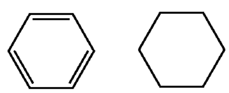 | | $C_3H_7$ | |
| 1-1-175 | $C_3H_7$ | 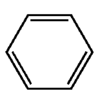 | $CH_2O$ | — | — | 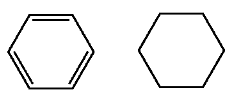 | | $C_3H_7$ | |
| 1-1-176 | $C_3H_7$ | 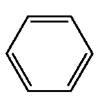 | $OCH_2$ | — | — | 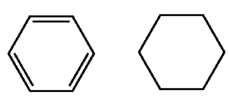 | | $CH_3$ | |
| 1-1-177 | $C_5H_{11}$ | 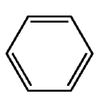 | COO | — | — | 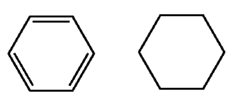 | | $C_4H_9$ | |
| 1-1-178 | $C_2H_5$ | 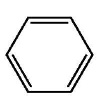 | OCO | — | — | 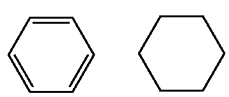 | | $C_3H_7$ | |
| 1-1-179 | $C_2H_5$ | 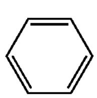 | $CF_2O$ | — | — | 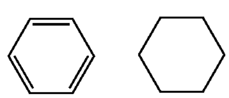 | | $C_7H_{15}$ | |
| 1-1-180 | $C_4H_9$ | 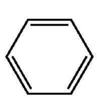 | $OCF_2$ | — | — | 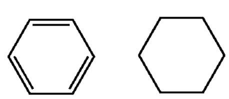 | | $C_2H_5$ | |

TABLE 13
(1-1)
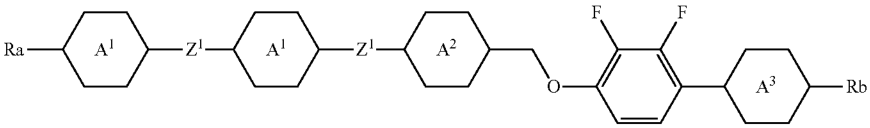
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-181 | $CH_3$ | 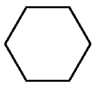 | — | — | — | 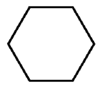 | 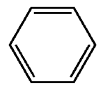 | $CH_3$ | |
| 1-1-182 | $CH_3$ | 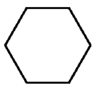 | — | — | — | 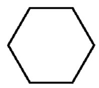 | 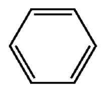 | $C_2H_5$ | |
| 1-1-183 | $CH_3$ | 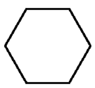 | — | — | — | 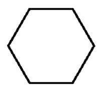 | 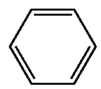 | $C_3H_7$ | |
| 1-1-184 | $CH_3$ | 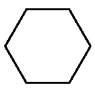 | — | — | — | 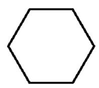 | 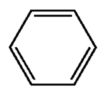 | $C_4H_9$ | |
| 1-1-185 | $CH_3$ | 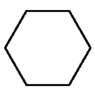 | — | — | — | 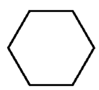 | 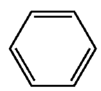 | $C_5H_{11}$ | |
| 1-1-186 | $C_2H_5$ | 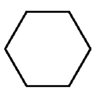 | — | — | — | 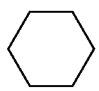 | 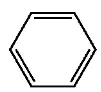 | $CH_3$ | |
| 1-1-187 | $C_2H_5$ | 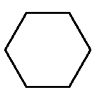 | — | — | — | 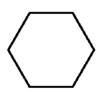 | 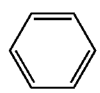 | $C_2H_5$ | |
| 1-1-188 | $C_2H_5$ | 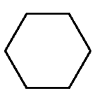 | — | — | — | 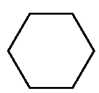 | 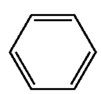 | $C_3H_7$ | |
| 1-1-189 | $C_2H_5$ | 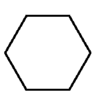 | — | — | — | 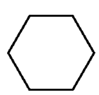 | 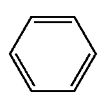 | $C_4H_9$ | |
| 1-1-190 | $C_2H_5$ | 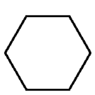 | — | — | — | 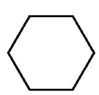 | 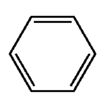 | $C_5H_{11}$ | |
| 1-1-191 | $C_3H_7$ | 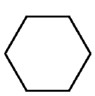 | — | — | — | 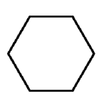 | 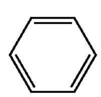 | $CH_3$ | |
| 1-1-192 | $C_3H_7$ | 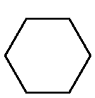 | — | — | — | 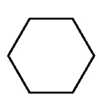 | 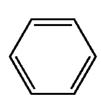 | $C_2H_5$ | |
| 1-1-193 | $C_3H_7$ | 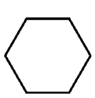 | — | — | — | 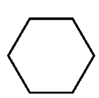 | 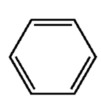 | $C_3H_7$ | |

TABLE 13-continued
(1-1)
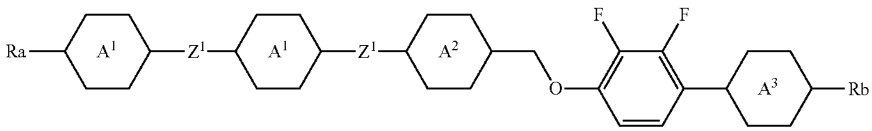
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-194 | $C_3H_7$ | 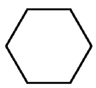 | — | — | — | 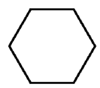 | 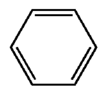 | $C_4H_9$ | |
| 1-1-195 | $C_3H_7$ | 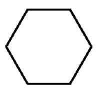 | — | — | — | 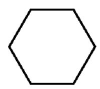 | 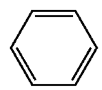 | $C_5H_{11}$ | |
TABLE 14
(1-1)
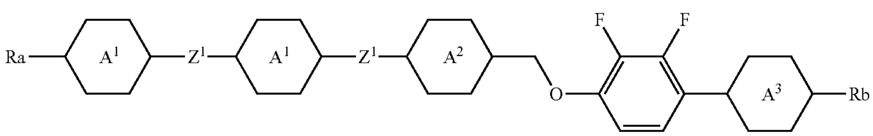
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-196 | $C_4H_9$ | 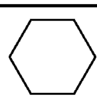 | — | — | — | 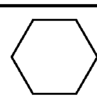 | 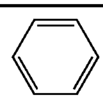 | $CH_3$ | |
| 1-1-197 | $C_4H_9$ | 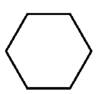 | — | — | — | 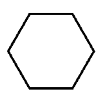 | 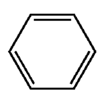 | $C_2H_5$ | |
| 1-1-198 | $C_4H_9$ | 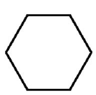 | — | — | — | 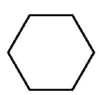 | 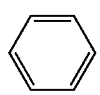 | $C_3H_7$ | |
| 1-1-199 | $C_4H_9$ | 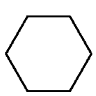 | — | — | — | 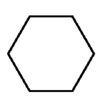 | 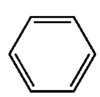 | $C_4H_9$ | |
| 1-1-200 | $C_4H_9$ | 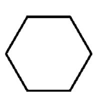 | — | — | — | 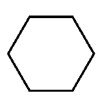 | 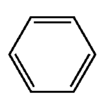 | $C_5H_{11}$ | |
| 1-1-201 | $C_5H_{11}$ | 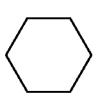 | — | | — | 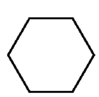 | 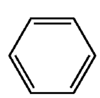 | $CH_3$ | |
| 1-1-202 | $C_5H_{11}$ | 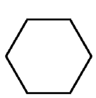 | — | — | — | 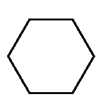 | 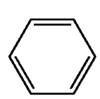 | $C_2H_5$ | |
| 1-1-203 | $C_5H_{11}$ | 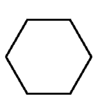 | — | — | — | 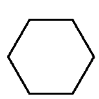 | 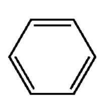 | $C_3H_7$ | Cr 111.3 SmA 169.8 N 231.6 Iso $T_{NI}$: 214.6° C., $\Delta\epsilon$: −4.7, $\Delta n$: 0.167, $\eta$: 53.7 mPa·s |

TABLE 14-continued
(1-1)
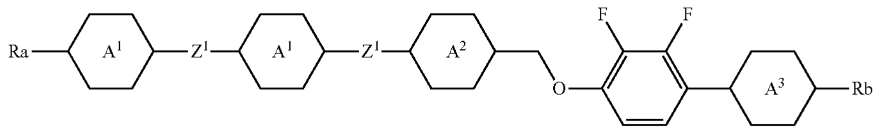
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-204 | $C_5H_{11}$ | 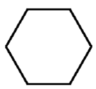 | — | — | — | 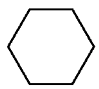 | 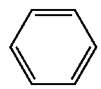 | $C_4H_9$ | |
| 1-1-205 | $C_5H_{11}$ | 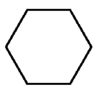 | — | — | — | 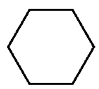 | 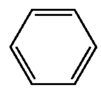 | $C_5H_{11}$ | |
| 1-1-206 | $C_2H_5O$ | 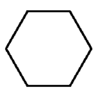 | — | — | — | 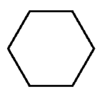 | 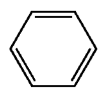 | $C_4H_9$ | |
| 1-1-207 | $C_5H_{11}$ | 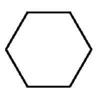 | — | — | — | 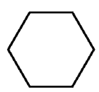 | 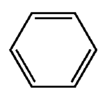 | $OC_2H_5$ | |
| 1-1-208 | $C_5H_5O$ | 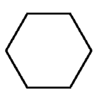 | — | — | — | 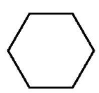 | 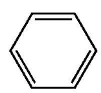 | $OC_4H_9$ | |
| 1-1-209 | $C_3H_7$ | 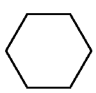 | — | — | — | 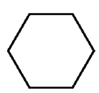 | 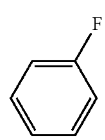 | $OC_4H_9$ | Cr 86.8 SmA 179.8 N 235.5 Iso $T_{NI}$: 214.6° C., Δ ε: −6.1, Δ n: 0.174 |
| 1-1-210 | $C_5H_{11}$ | 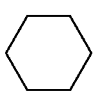 | — | — | — | 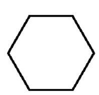 | 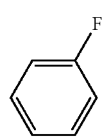 | $OC_2H_5$ | |
TABLE 15
(1-1)
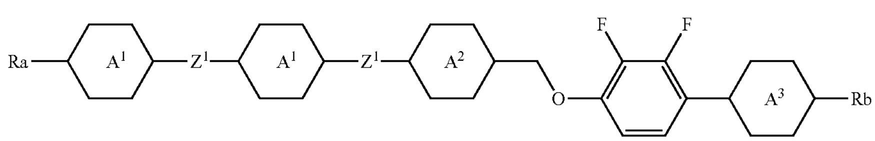
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-211 | $C_3H_7$ | 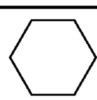 | — | — | — | 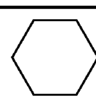 | 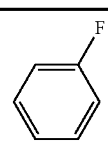 | $C_5H_{11}$ | |
| 1-1-212 | $C_5H_{11}$ | 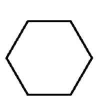 | — | — | — | 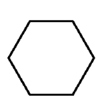 | 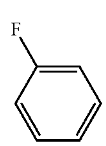 | $C_2H_5$ | |

TABLE 15-continued
(1-1)
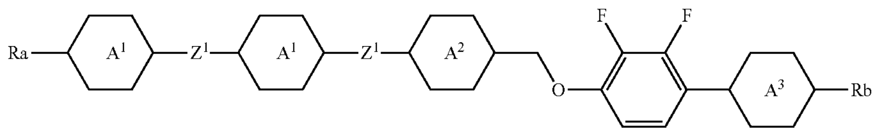
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-213 | $C_4H_9O$ | 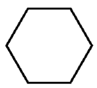 | — | — | — | 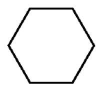 | 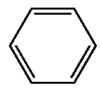 | $C_3H_7$ | |
| 1-1-214 | $CH_2$═CH | 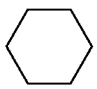 | — | — | — | 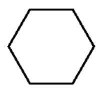 | 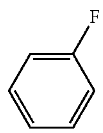 | $OC_4H_9$ | Cr 91.7 SmA 151.0 N 230.4 Iso $T_{NI}$: 206.6° C., Δ ϵ: −6.6, Δ n: 0.176 |
| 1-1-215 | $CH_2$═CH | 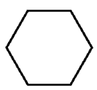 | — | — | — | 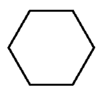 | 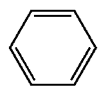 | $C_2H_5$ | |
| 1-1-216 | $CH_2$═$CHC_2H_4$ | 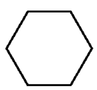 | — | — | — | 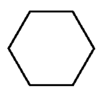 | 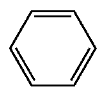 | $C_3H_7$ | |
| 1-1-217 | $CH_3CH$═CH | 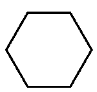 | — | — | — | 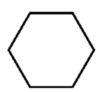 | 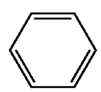 | $CH_3$ | |
| 1-1-218 | $CH_2$═$CHC_2H_4$ | 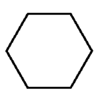 | — | — | — | 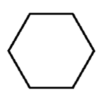 | 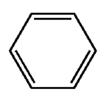 | $C_2H_5$ | |
| 1-1-219 | $C_3H_7CH$═CH | 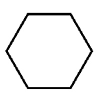 | — | — | — | 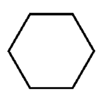 | 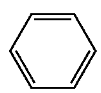 | $C_3H_7$ | |
| 1-1-220 | $CH_3CH$═$CHC_2H_4$ | 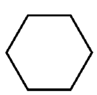 | — | — | — | 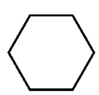 | 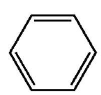 | $C_4H_9$ | |
| 1-1-221 | $CH_3$ | 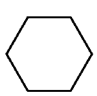 | — | — | — | 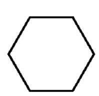 | 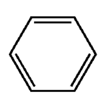 | $CH_2OC_3H_7$ | |
| 1-1-222 | $C_4H_9$ | 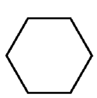 | — | — | — | 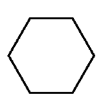 | 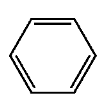 | $CH_2CH_2F$ | |
| 1-1-223 | $C_2H_5$ | 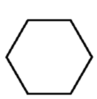 | — | — | — | 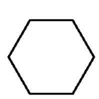 | 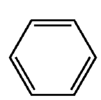 | CH═$CHCH_3$ | |
| 1-1-224 | $C_3H_7$ | 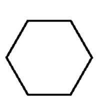 | — | — | — | 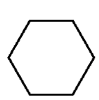 | 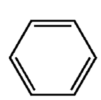 | CH═$CHC_3H_7$ | |
| 1-1-225 | $C_3H_7$ | 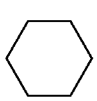 | — | — | — | 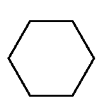 | 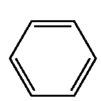 | $C_2H_4CH$═$CH_2$ | |

TABLE 16
(1-1)
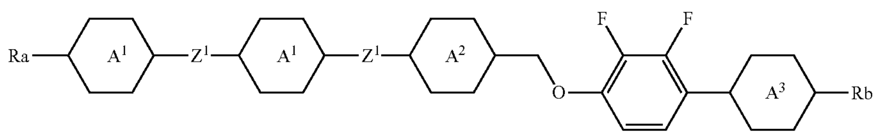
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-226 | $C_2H_5$ | 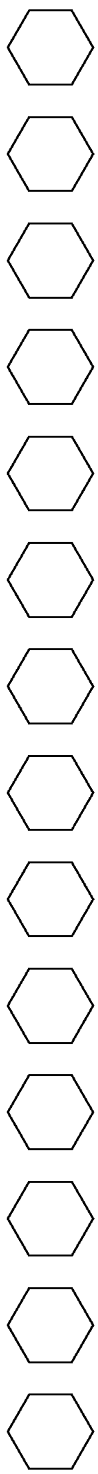 | — | — | — | 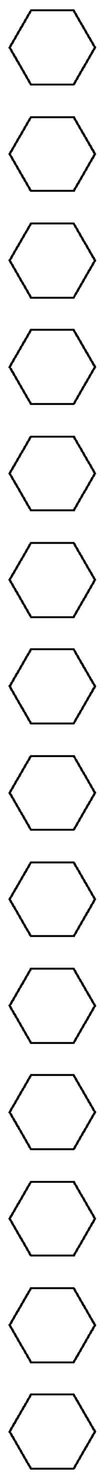 | 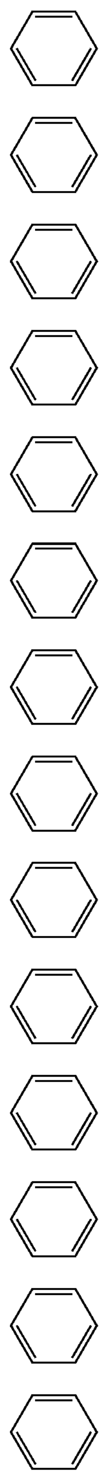 | $C_2H_4CH{=}CH_2$ | |
| 1-1-227 | $C_5H_{11}$ | | — | — | — | | | $C_2H_4CH{=}CHCH_3$ | |
| 1-1-228 | $C_3H_7$ | | — | — | — | | | $C_2H_4CH{=}CHCH_3$ | |
| 1-1-229 | $CH_2{=}CH$ | | — | — | — | | | $C_2H_4CH{=}CH_2$ | |
| 1-1-230 | $CH_3CH{=}OH$ | | — | — | — | | | $C_2H_4CH{=}CH_2$ | |
| 1-1-231 | $C_3H_7OCH_2$ | | — | — | — | | | $C_3H_7$ | |
| 1-1-232 | $C_3H_7$ | | — | — | — | | | $OC_2H_4CH{=}CH_2$ | |
| 1-1-233 | $C_5H_{11}$ | | $CH_2CH_2$ | — | — | | | $C_2H_5$ | |
| 1-1-234 | $C_5H_{11}$ | | $CH_2CH_2$ | — | — | | | $C_3H_7$ | |
| 1-1-235 | $C_3H_7$ | | $CH_2O$ | — | — | | | H | |
| 1-1-236 | $C_2H_5$ | | $OCH_2$ | — | — | | | $C_3H_7$ | |
| 1-1-237 | $C_4H_9$ | | COO | — | — | | | $C_4H_9$ | |
| 1-1-238 | $C_3H_7$ | | OCO | — | — | | | $C_2H_5$ | |
| 1-1-239 | $C_7H_{15}$ | | $CF_2O$ | — | — | | | $C_2H_5$ | |

TABLE 16-continued
(1-1)
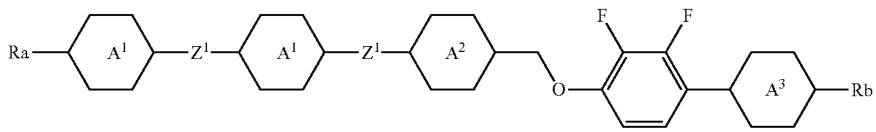
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-240 | $C_9H_{19}$ | 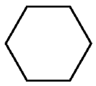 | $OCF_2$ | — | — | 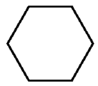 | 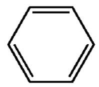 | $CH_3$ | |
TABLE 17
(1-1)
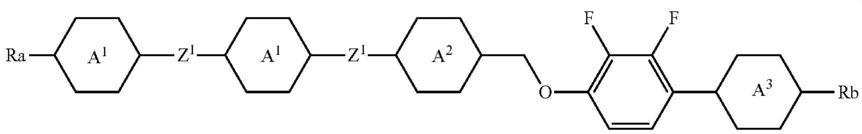
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-241 | $CH_3$ | 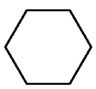 | — | — | — |  | 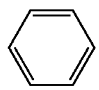 | $CH_3$ | |
| 1-1-242 | $CH_3$ | 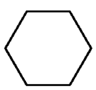 | — | — | — | 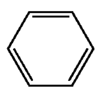 | 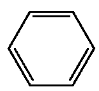 | $C_2H_5$ | |
| 1-1-243 | $CH_3$ | 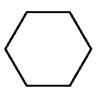 | — | — | — | 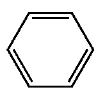 | 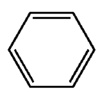 | $C_3H_7$ | |
| 1-1-244 | $CH_3$ | 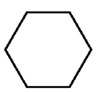 | — | — | — | 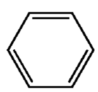 | 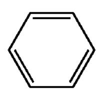 | $C_4H_9$ | |
| 1-1-245 | $CH_3$ | 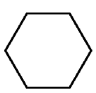 | — | — | — | 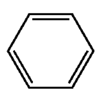 | 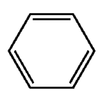 | $C_5H_{11}$ | |
| 1-1-246 | $C_2H_5$ | 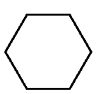 | — | — | — | 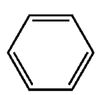 | 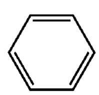 | $CH_3$ | |
| 1-1-247 | $C_2H_5$ | 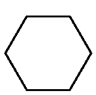 | — | — | — | 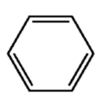 | 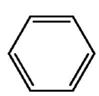 | $C_2H_5$ | |
| 1-1-248 | $C_2H_5$ | 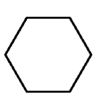 | — | — | — | 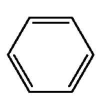 | 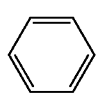 | $C_3H_7$ | |
| 1-1-249 | $C_2H_5$ | 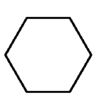 | — | — | — | 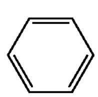 | 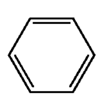 | $C_4H_9$ | |
| 1-1-250 | $C_2H_5$ | 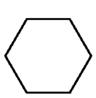 | — | — | — | 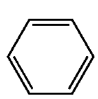 | 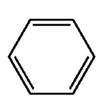 | $C_5H_{11}$ | |

TABLE 17-continued
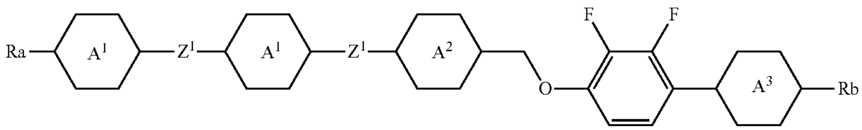
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-251 | $C_3H_7$ | 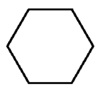 | — | — | — | 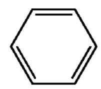 | 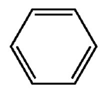 | $CH_3$ | |
| 1-1-252 | $C_3H_7$ | 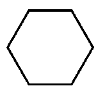 | — | — | — | 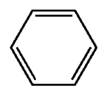 | 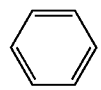 | $C_2H_5$ | |
| 1-1-253 | $C_3H_7$ | 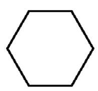 | — | — | — | 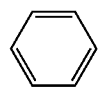 | 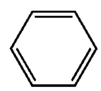 | $C_3H_7$ | |
| 1-1-254 | $C_3H_7$ | 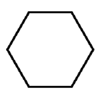 | — | — | — | 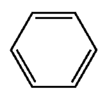 | 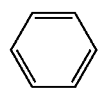 | $C_4H_9$ | |
| 1-1-255 | $C_3H_7$ | 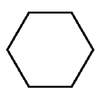 | — | — | — | 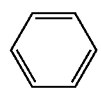 | 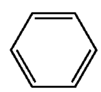 | $C_5H_{11}$ | |
TABLE 18
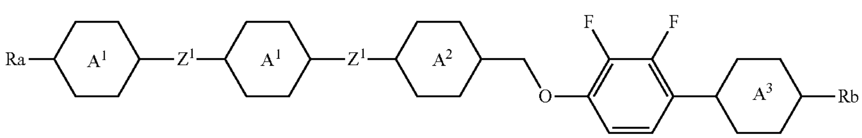
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-256 | $C_4H_9$ | 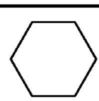 | — | — | — | 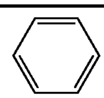 | 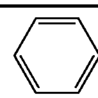 | $CH_3$ | |
| 1-1-257 | $C_4H_9$ | 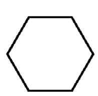 | — | — | — | 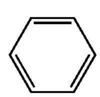 | 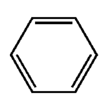 | $C_2H_5$ | |
| 1-1-258 | $C_4H_9$ | 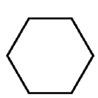 | — | — | — | 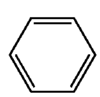 | 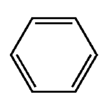 | $C_3H_7$ | |
| 1-1-259 | $C_4H_9$ | 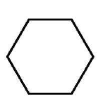 | — | — | — | 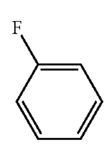 | 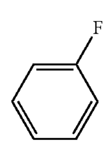 | $C_4H_9$ | |
| 1-1-260 | $C_4H_9$ | 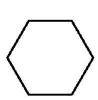 | — | — | — | 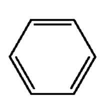 | 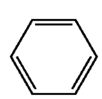 | $C_5H_{11}$ | |

TABLE 18-continued
(1-1)
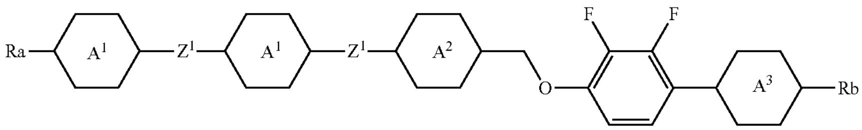
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-261 | $C_5H_{11}$ | 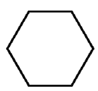 | — | — | — | 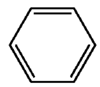 | 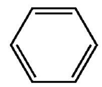 | $CH_3$ | |
| 1-1-262 | $C_5H_{11}$ | 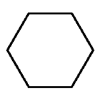 | — | — | — | 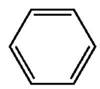 | 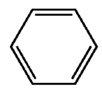 | $C_2H_5$ | |
| 1-1-263 | $C_5H_{11}$ | 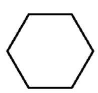 | — | — | — | 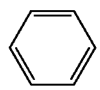 | 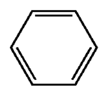 | $C_3H_7$ | |
| 1-1-264 | $C_5H_{11}$ | 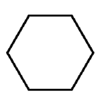 | — | — | — | 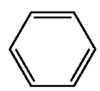 | 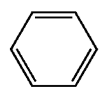 | $C_4H_9$ | |
| 1-1-265 | $C_5H_{11}$ | 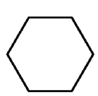 | — | — | — | 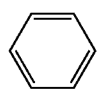 | 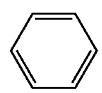 | $C_5H_{11}$ | |
| 1-1-266 | $C_2H_5O$ | 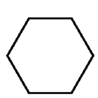 | — | — | — | 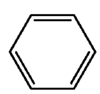 | 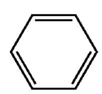 | $C_4H_9$ | |
| 1-1-267 | $C_5H_{11}$ | 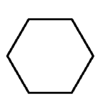 | — | — | — | 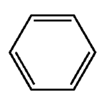 | 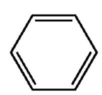 | $OC_2H_5$ | |
| 1-1-268 | $C_2H_5O$ | 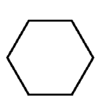 | — | — | — | 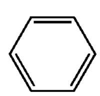 | 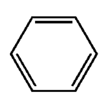 | $OC_4H_9$ | |
| 1-1-269 | $C_3H_7$ | 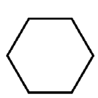 | — | — | — | 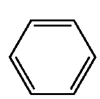 | 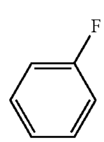 | $OC_4H_9$ | |
| 1-1-270 | $C_5H_{11}$ | 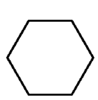 | — | — | — | 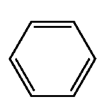 | 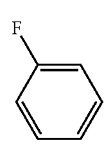 | $OC_2H_5$ | |

TABLE 19
(1-1)
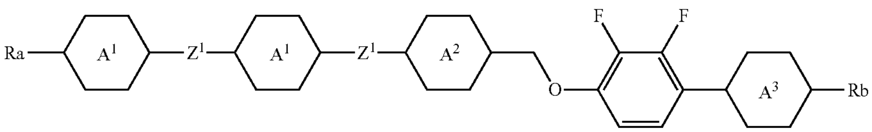
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-271 | $C_3H_7$ | 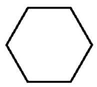 | — | — | — | 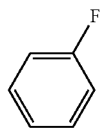 | 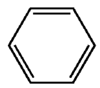 | $C_5H_{11}$ | |
| 1-1-272 | $C_3H_7O$ | 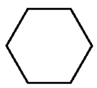 | — | — | — | 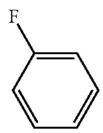 | 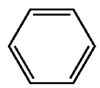 | $C_5H_{11}$ | |
| 1-1-273 | $C_5H_{11}$ | 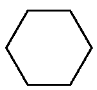 | — | — | — | 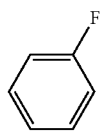 | 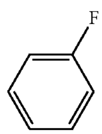 | $OC_2H_5$ | |
| 1-1-274 | $CH_2{=}CH$ | 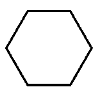 | — | — | — | 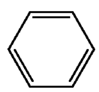 | 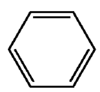 | $C_5H_{11}$ | |
| 1-1-275 | $CH_3CH{=}CH$ | 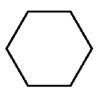 | — | — | — | 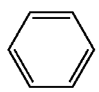 |  | $C_2H_5$ | |
| 1-1-276 | $CH_2{=}CHC_2H_4$ | 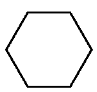 | — | — | — | 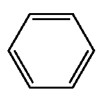 | 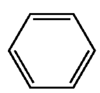 | $C_3H_7$ | |
| 1-1-277 | $C_3H_7CH{=}CH$ | 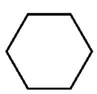 | — | — | — | 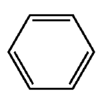 | 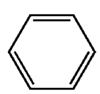 | $CH_3$ | |
| 1-1-278 | $CH_3CH{=}CHC_2H_4$ | 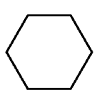 | — | — | — | 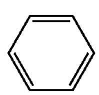 | 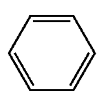 | $C_2H_5$ | |
| 1-1-279 | $C_2H_5$ | 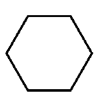 | — | — | — | 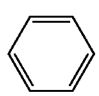 | 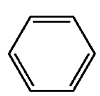 | $CH_2CH_2CHF_2$ | |
| 1-1-280 | $CH_2FCH_2CH_2$ | 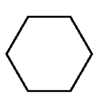 | — | — | — | 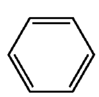 | 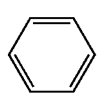 | $C_4H_9$ | |
| 1-1-281 | $CH_3$ | 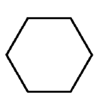 | — | — | — | 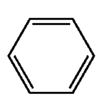 | 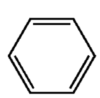 | $CH{=}CH_2$ | |
| 1-1-282 | $C_4H_9$ | 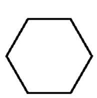 | — | — | — | 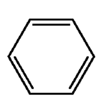 | 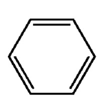 | $CH{=}CHCH_3$ | |
| 1-1-283 | $C_2H_5$ | 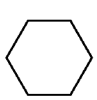 | — | — | — | 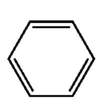 | 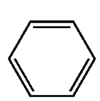 | $C_2H_4CH{=}CH_2$ | |

TABLE 19-continued
(1-1)
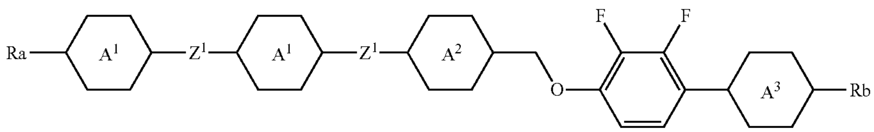
| No. | Ra | A1 | Z1 | A1 | Z1 | A2 | A3 | Rb | Physical property values |
|---|---|---|---|---|---|---|---|---|---|
| 1-1-284 | $C_3H_7$ | 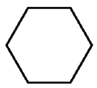 | — | — | — | 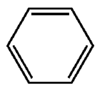 | 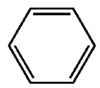 | $C_2H_4CH{=}CH_2$ | |
| 1-1-285 | $C_3H_7$ | 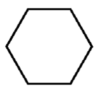 | — | — | — | 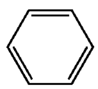 | 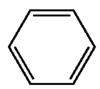 | $CH{=}CHC_3H_7$ | |
TABLE 20
(1-1)
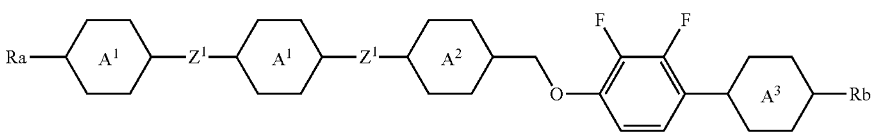
| No. | Ra | A1 | Z1 | A1 | Z1 | A2 | A3 | Rb | Physical property values |
|---|---|---|---|---|---|---|---|---|---|
| 1-1-286 | $C_2H_5$ | 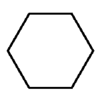 | — | — | — | 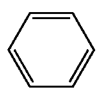 | 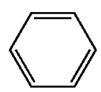 | $CH{=}CHC_3H_7$ | |
| 1-1-287 | $C_5H_{11}$ | 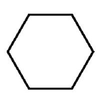 | — | — | — | 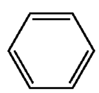 | 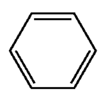 | $C_2H_4CH{=}CHCH_3$ | |
| 1-1-288 | $C_3H_7$ | 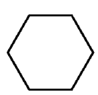 | — | — | — | 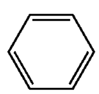 | 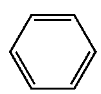 | $C_2H_4CH{=}CHCH_3$ | |
| 1-1-289 | $CH_2{=}CH$ | 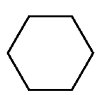 | — | — | — | 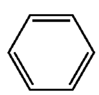 | 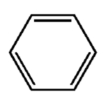 | $C_2H_4CH{=}CH_2$ | |
| 1-1-290 | $CH_3CH{=}CH$ | 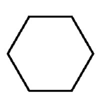 | — | — | — | 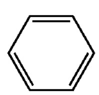 | 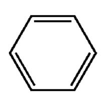 | $CH{=}CH_2$ | |
| 1-1-291 | $C_2H_5OCH_2$ | 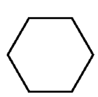 | — | — | — | 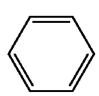 | 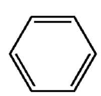 | $C_3H_7$ | |
| 1-1-292 | $C_3H_7$ | 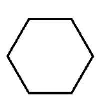 | — | — | — | 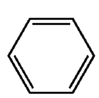 | 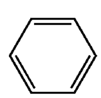 | $OC_2H_4CH{=}CH_2$ | |
| 1-1-293 | $C_3H_7$ | 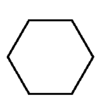 | $CH_2CH_2$ | — | — | 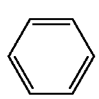 | 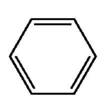 | $C_2H_5$ | |

TABLE 20-continued
(1-1)
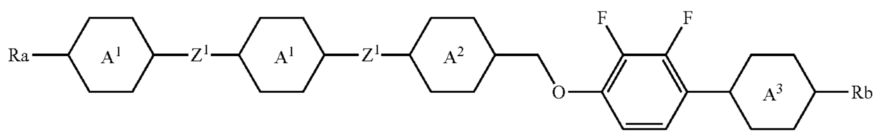
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-294 | $C_2H_5$ | 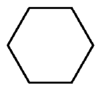 | $CH_2CH_2$ | — | — | 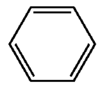 | 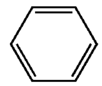 | $C_3H_7$ | |
| 1-1-295 | $C_3H_7$ | 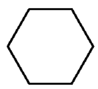 | $CH_2O$ | — | — | 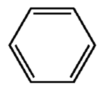 | 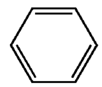 | $C_2H_5$ | |
| 1-1-296 | $C_2H_5$ | 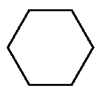 | $OCH_2$ | — | — | 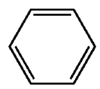 | 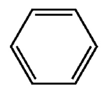 | $C_3H_7$ | |
| 1-1-297 | $C_4H_9$ | 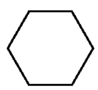 | COO | — | — | 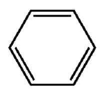 | 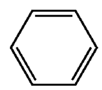 | $C_4H_9$ | |
| 1-1-298 | $C_3H_7$ | 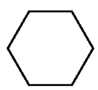 | OCO | — | — | 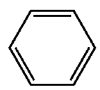 | 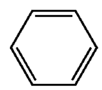 | H | |
| 1-1-299 | $C_2H_5$ | 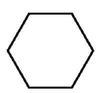 | $CF_2O$ | — | — | 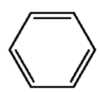 | 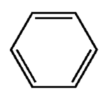 | $C_7H_{15}$ | |
| 1-1-300 | $CH_3$ | 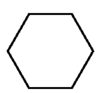 | $OCF_2$ | — | — | 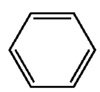 | 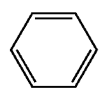 | $C_2H_5$ | |
TABLE 21
(1-1)
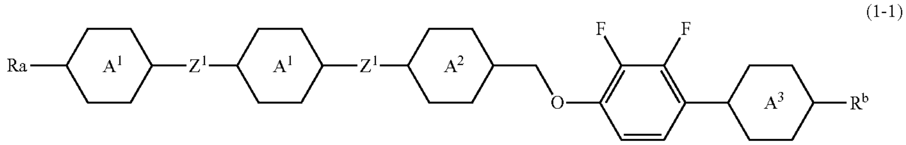
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-301 | $CH_3$ | 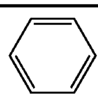 | — | — | — | 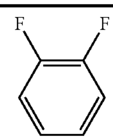 | 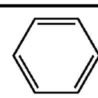 | $C_5H_{11}$ | |
| 1-1-302 | $CH_3$ | 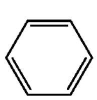 | — | — | — | 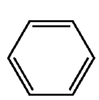 | 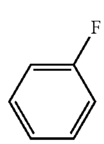 | $OC_2H_5$ | |

TABLE 21-continued
(1-1)
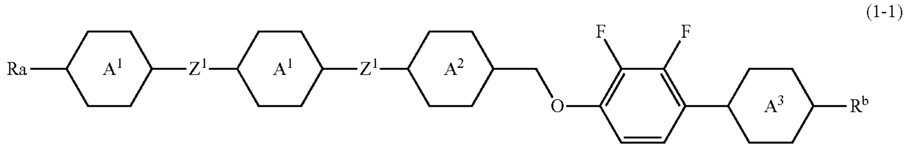
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-303 | $CH_3$ | 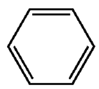 | — | — | — | 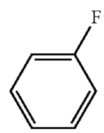 | 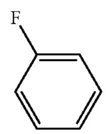 | $OC_2H_5$ | |
| 1-1-304 | $CH_3$ | 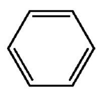 | — | — | — | 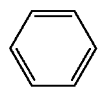 | 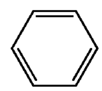 | $C_5H_{11}$ | |
| 1-1-305 | $CH_3$ | 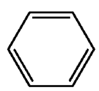 | — | — | — | 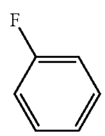 | 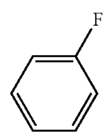 | $C_2H_5$ | |
| 1-1-306 | $C_2H_5$ | 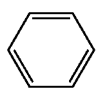 | — | — | — | 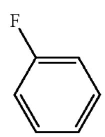 | 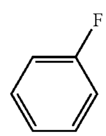 | $OC_4H_9$ | |
| 1-1-307 | $C_2H_5$ | 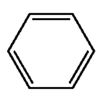 | — | — | — | 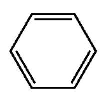 | 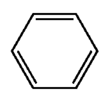 | $CH_3$ | |
| 1-1-308 | $C_2H_5$ | 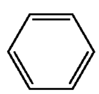 | — | — | — | 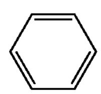 | 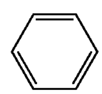 | $C_2H_5$ | |
| 1-1-309 | $C_2H_5$ | 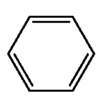 | — | — | — | 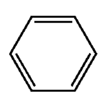 | 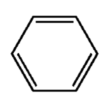 | $C_3H_7$ | |
| 1-1-310 | $C_2H_5$ | 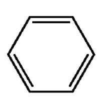 | — | — | — | 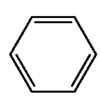 | 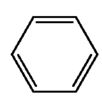 | $C_4H_9$ | |
| 1-1-311 | $C_3H_7$ | 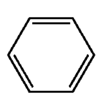 | — | — | — | 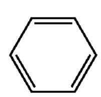 | 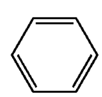 | $CH_3$ | |
| 1-1-312 | $C_3H_7$ | 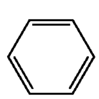 | — | — | — | 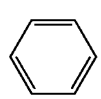 | 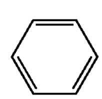 | $CH{=}CH_2$ | |
| 1-1-313 | $C_3H_7$ | 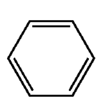 | — | — | — | 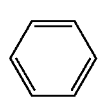 | 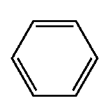 | $CH{=}CHCH_3$ | |
| 1-1-314 | $C_3H_7$ | 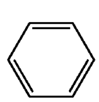 | — | — | — | 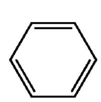 | 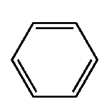 | $CH{=}CHC_3H_7$ | |

TABLE 21-continued
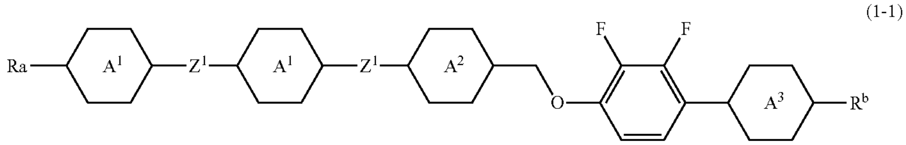
(1-1)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-315 | $C_3H_7$ | 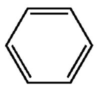 | — | — | — | 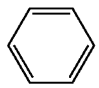 | 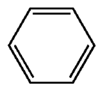 | $C_2H_4CH{=}CH_2$ | |
TABLE 22
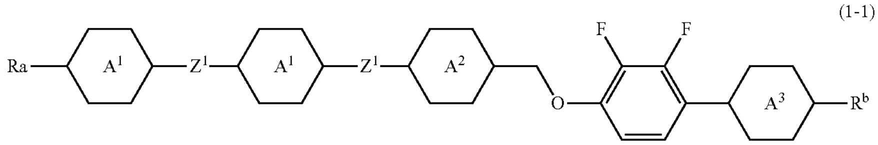
(1-1)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-316 | $C_4H_9$ | 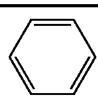 | — | — | — | 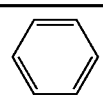 | 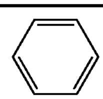 | $C_2H_4CH{=}CH_2$ | |
| 1-1-317 | $C_4H_9$ | 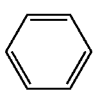 | — | — | — | 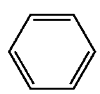 | 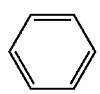 | $C_2H_4CH{=}CHCH_3$ | |
| 1-1-318 | $C_4H_9$ | 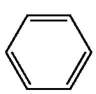 | — | — | — | 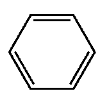 | 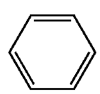 | $C_2H_4CH{=}CHCH_3$ | |
| 1-1-319 | $C_4H_9$ | 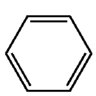 | — | — | — | 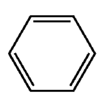 | 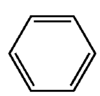 | $C_2H_4CH{=}CH_2$ | |
| 1-1-320 | $C_4H_9$ | 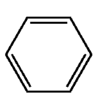 | — | — | — | 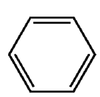 | 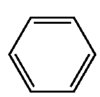 | $C_2H_4CH{=}CHCH_3$ | |
| 1-1-321 | $C_5H_{11}$ | 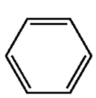 | — | — | — | 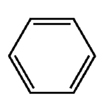 | 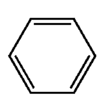 | $C_3H_7$ | |
| 1-1-322 | $C_5H_{11}$ | 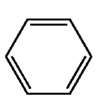 | — | — | — | 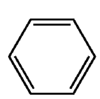 | 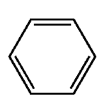 | $OC_2H_4CH{=}CH_2$ | |
| 1-1-323 | $C_5H_{11}$ | 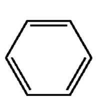 | — | — | — | 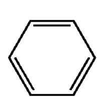 | 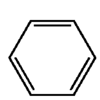 | $C_2H_5$ | |
| 1-1-324 | $C_5H_{11}$ | 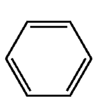 | — | — | — | 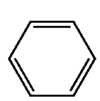 | 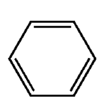 | $C_3H_7$ | |
| 1-1-325 | $C_5H_{11}$ | 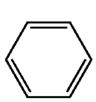 | — | — | — | 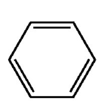 | 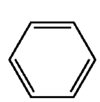 | $C_2H_5$ | |

TABLE 22-continued
(1-1)
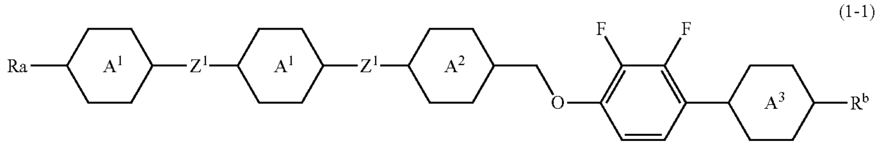
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-326 | $C_2H_5O$ |  | — | — | — | 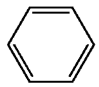 | 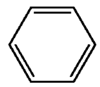 | $C_3H_7$ | |
| 1-1-327 | $C_5H_{11}$ |  | — | — | — | 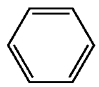 | 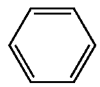 | $C_4H_9$ | |
| 1-1-328 | $C_2H_5O$ |  | — | — | — | 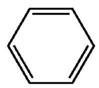 | 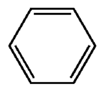 | $C_7H_{15}$ | |
| 1-1-329 | $C_3H_7$ | 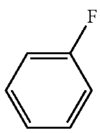 | — | — | — |  | 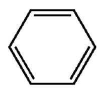 | $C_4H_9$ | |
| 1-1-330 | $C_5H_{11}$ |  | — | — | — | 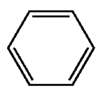 | 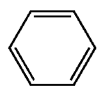 | $C_2H_5$ | |
TABLE 23
(1-1)
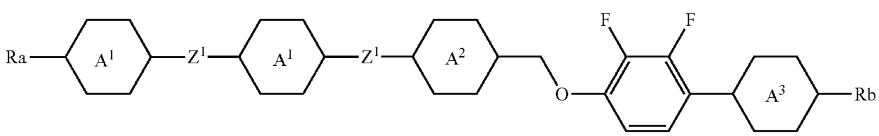
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-331 | $C_3H_7$ | 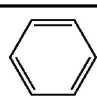 | — | — | — | 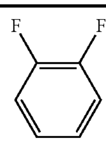 | 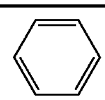 | $C_5H_{11}$ | |
| 1-1-332 | $C_3H_7O$ | 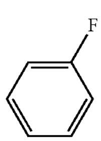 | — | — | — | 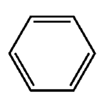 | 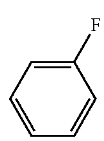 | $OC_2H_5$ | |
| 1-1-333 | $C_5H_{11}$ | 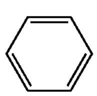 | — | — | — | 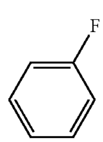 | 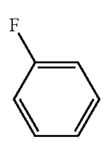 | $OC_2H_5$ | |
| 1-1-334 | $C_2H_5O$ | 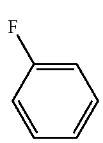 | — | — | — | 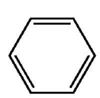 | 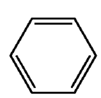 | $C_5H_{11}$ | |

TABLE 23-continued
(1-1)
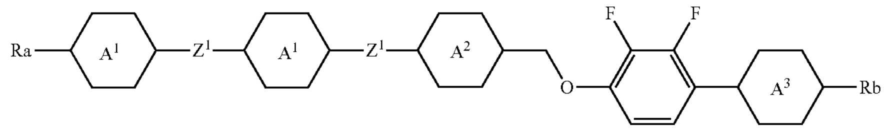
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-335 | $C_4H_9$ | 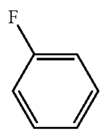 | — | — | — | 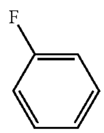 | 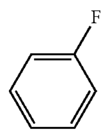 | $C_2H_5$ | |
| 1-1-336 | $C_2H_5O$ | 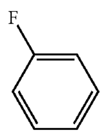 | — | — | — | 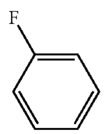 | 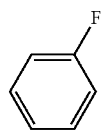 | $OC_4H_9$ | |
| 1-1-337 | $CH_2{=}CH$ | 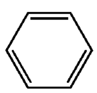 | — | — | — | 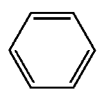 | 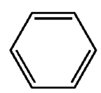 | $CH_3$ | |
| 1-1-338 | $CH_3CH{=}CH$ | 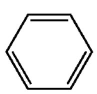 | — | — | — | 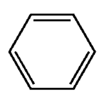 | 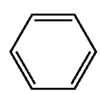 | $C_2H_5$ | |
| 1-1-339 | $CH_2{=}CHC_2H_4$ | 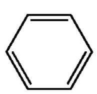 | — | — | — | 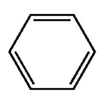 | 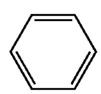 | $C_3H_7$ | |
| 1-1-340 | $C_3H_7CH{=}CH$ | 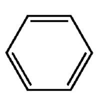 | — | — | — | 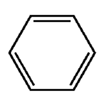 | 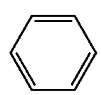 | $C_4H_9$ | |
| 1-1-341 | $CH_3CH{=}CHC_2H_4$ | 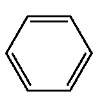 | — | — | — | 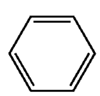 | 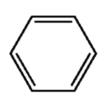 | $CH_3$ | |
| 1-1-342 | $C_4H_9$ | 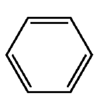 | — | — | — | 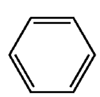 | 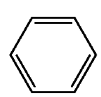 | $CH{=}CH_2$ | |
| 1-1-343 | $C_2H_5$ | 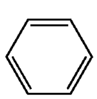 | — | — | — | 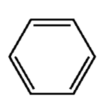 | 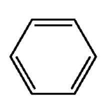 | $CH{=}CHCH_3$ | |
| 1-1-344 | $C_3H_7$ | 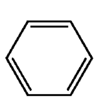 | — | — | — | 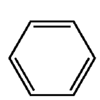 | 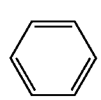 | $CH{=}CHC_3H_7$ | |
| 1-1-345 | $C_3H_7$ | 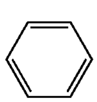 | — | — | — | 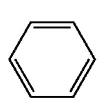 | 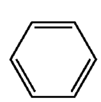 | $C_2H_4CH{=}CH_2$ | |

TABLE 24
(1-1)
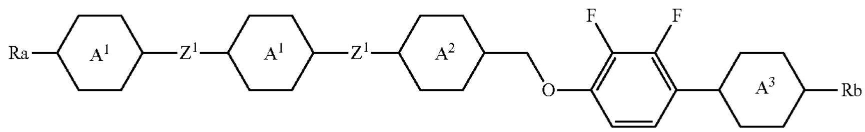
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-346 | $C_2H_5$ |  | — | — | — | 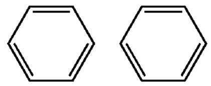 | | $C_2H_4CH{=}CH_2$ | |
| 1-1-347 | $C_5H_{11}$ |  | — | — | — | 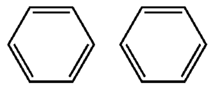 | | $C_2H_4CH{=}CHCH_3$ | |
| 1-1-348 | $C_3H_7$ | 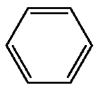 | — | — | — | 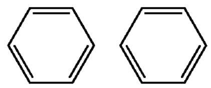 | | $C_2H_4CH{=}CHCH_3$ | |
| 1-1-349 | $CH_3CH{=}CHC_2H_4$ | 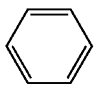 | — | — | — | 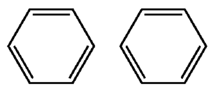 | | $C_2H_4CH{=}CH_2$ | |
| 1-1-350 | $CH_2{=}CHC_2H_4$ |  | — | — | — | 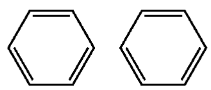 | | $C_2H_4CH{=}CHCH_3$ | |
| 1-1-351 | $C_4H_9OCH_2$ |  | — | — | — | 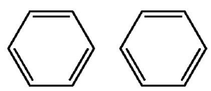 | | $C_3H_7$ | |
| 1-1-352 | $C_3H_7$ |  | — | — | — | 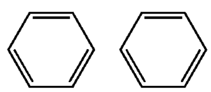 | | $OC_2H_4CH{=}CH_2$ | |
| 1-1-353 | $C_3H_7$ | 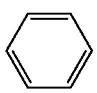 | $CH_2CH_2$ | — | — | 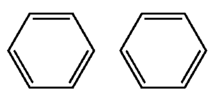 | | $C_2H_5$ | |
| 1-1-354 | $C_2H_5$ |  | $CH_2CH_2$ | — | — | 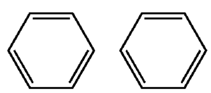 | | $C_3H_7$ | |
| 1-1-355 | $C_3H_7$ | 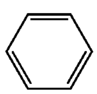 | $CH_2O$ | — | — | 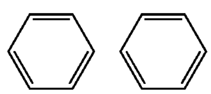 | | $C_2H_5$ | |
| 1-1-356 | $C_2H_5$ | 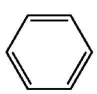 | $OCH_2$ | — | — | 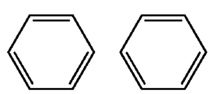 | | $C_3H_7$ | |
| 1-1-357 | $C_4H_9O$ | 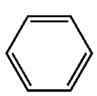 | COO | — | — | 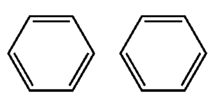 | | $C_4H_9$ | |
| 1-1-358 | $C_3H_7$ | 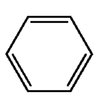 | OCO | — | — | 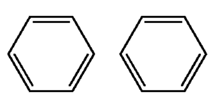 | | $C_7H_{15}$ | |
| 1-1-359 | $C_2H_5$ | 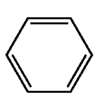 | $CF_2O$ | — | — | 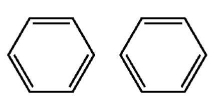 | | $C_4H_9$ | |

TABLE 24-continued
(1-1)
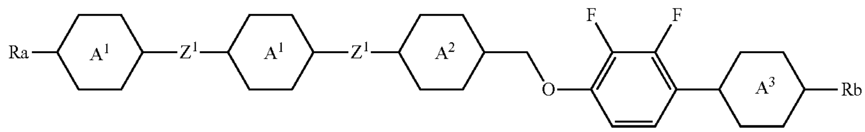
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-360 | $CH_3$ | 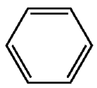 | $OCF_2$ | — | — | 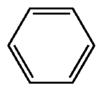 | 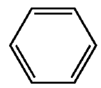 | $C_2H_5$ | |
TABLE 25
(1-1)
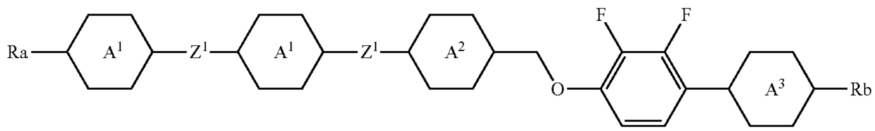
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-361 | $C_3H_7$ | 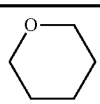 | — | — | — | 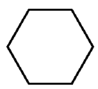 | 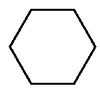 | $C_2H_5$ | |
| 1-1-362 | $C_5H_{11}$ | 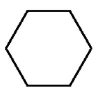 | — | — | — | 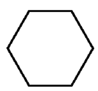 | 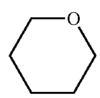 | $C_4H_9$ | |
| 1-1-363 | $CH_3$ | 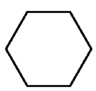 | — | — | — | 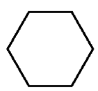 | 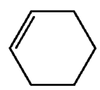 | $C_3H_7$ | |
| 1-1-364 | $C_4H_9$ | 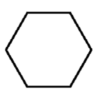 | — | — | — | 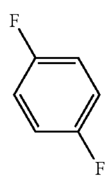 | 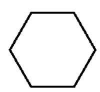 | $C_2H_5$ | |
| 1-1-365 | $CH_3$ | 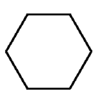 | — | — | — | 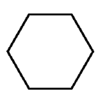 | 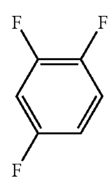 | $OC_2H_5$ | |
| 1-1-366 | $C_2H_5$ | 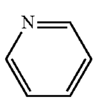 | — | — | — | 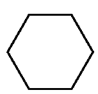 | 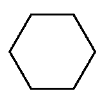 | $C_2H_5$ | |
| 1-1-367 | $C_2H_5$ | 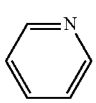 | — | — | — | 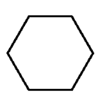 | 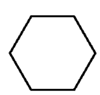 | $C_3H_7$ | |
| 1-1-368 | $C_2H_5$ | 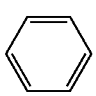 | — | — | — | 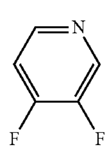 | 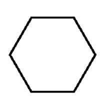 | $C_3H_7$ | |

TABLE 25-continued
(1-1)
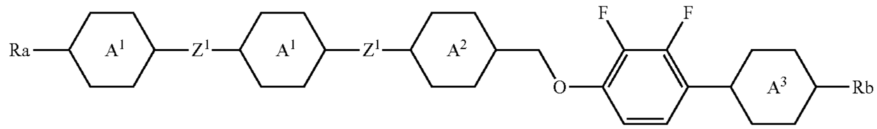
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-369 | $C_2H_5O$ | 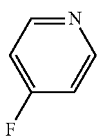 | — | — | — | 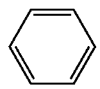 | 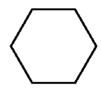 | $C_4H_9$ | |
| 1-1-370 | $C_2H_5$ | 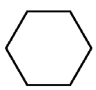 | — | — | — | 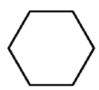 | 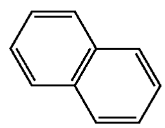 | $C_5H_{11}$ | |
| 1-1-371 | $C_3H_7$ | 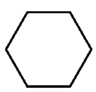 | — | — | — | 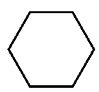 | 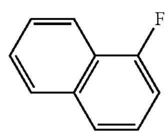 | $C_4H_9$ | |
| 1-1-372 | $C_3H_7$ | 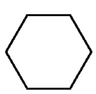 | $(CH_2)_4$ | — | — | 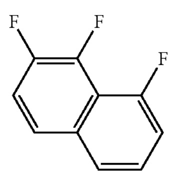 | 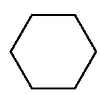 | $C_2H_5$ | |
| 1-1-373 | $C_2H_5$ | 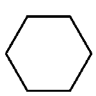 | — | — | — | 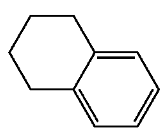 | 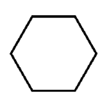 | $C_5H_{11}$ | |
| 1-1-374 | $C_3H_7$ | 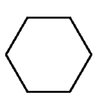 | — | — | — | 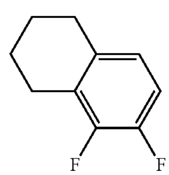 | 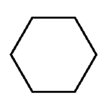 | $C_4H_9$ | |
| 1-1-375 | $C_3H_7$ | 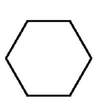 | — | — | — | 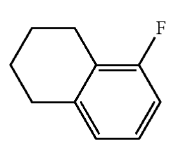 | 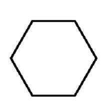 | $C_5H_{11}$ | |

TABLE 26
(1-1)
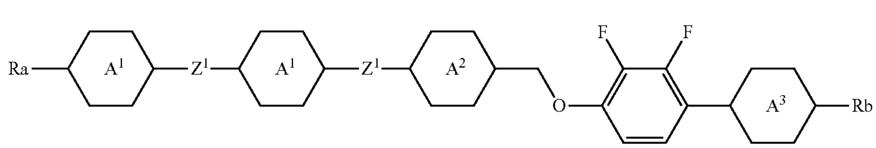
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-376 | $C_4H_9$ | 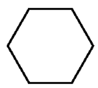 | — | — | — | 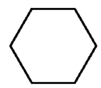 | 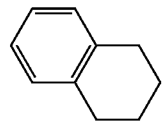 | $C_5H_{11}$ | |
| 1-1-377 | $C_5H_{11}$ | 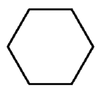 | — | — | — | 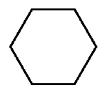 | 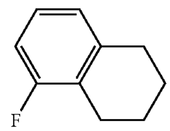 | $C_2H_5$ | |
| 1-1-378 | $C_4H_9$ | 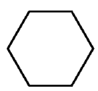 | — | — | — | 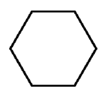 | 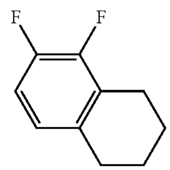 | $C_3H_7$ | |
| 1-1-379 | $C_4H_9$ | 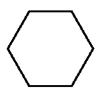 | CH=CH | — | — | 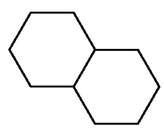 | 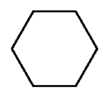 | $C_4H_9$ | |
| 1-1-380 | $C_3H_7$ | 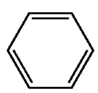 | — | — | — | 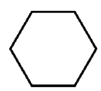 | 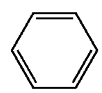 | $C_5H_{11}$ | |
| 1-1-381 | $C_5H_{11}$ | 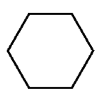 | — | — | — | 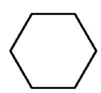 | 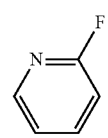 | $OC_4H_9$ | |
| 1-1-382 | $C_5H_{11}$ | 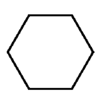 | — | — | — | 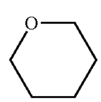 | 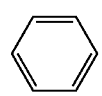 | $C_2H_5$ | |
| 1-1-383 | $C_5H_{11}$ | 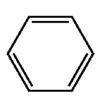 | — | — | — | 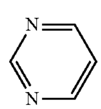 | 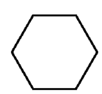 | $C_3H_7$ | |
| 1-1-384 | $C_5H_{11}$ | 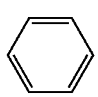 | — | — | — | 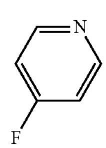 | 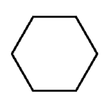 | $C_4H_9$ | |
| 1-1-385 | $C_2H_5O$ | 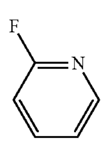 | — | — | — | 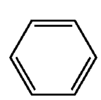 | 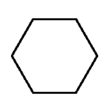 | $C_5H_{11}$ | |

TABLE 26-continued
(1-1)
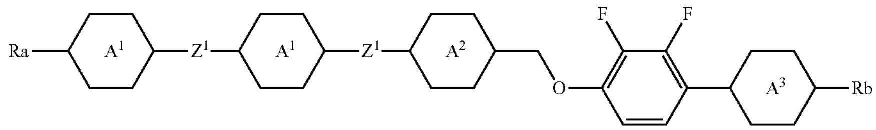
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-386 | $C_2H_5O$ | 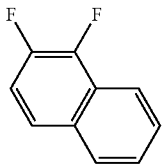 | C≡C | — | — | 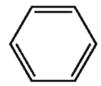 | 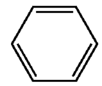 | $C_4H_9$ | |
| 1-1-387 | $C_5H_{11}$ |  | — | — | — | 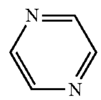 | 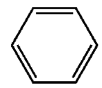 | $OC_2H_5$ | |
| 1-1-388 | $C_2H_5O$ | 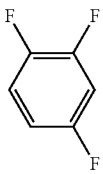 | — | — | — | 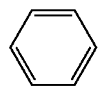 | 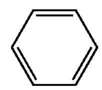 | $C_5H_{11}$ | |
| 1-1-389 | $C_5H_{11}$ | 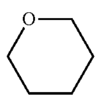 | — | — | — | 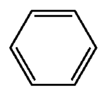 | 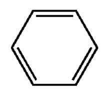 | $C_3H_7$ | |
| 1-1-390 | $C_3H_7$ | 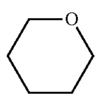 | — | — | — | 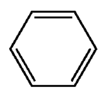 | 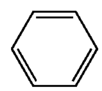 | $C_5H_{11}$ | |
TABLE 27
(1-1)
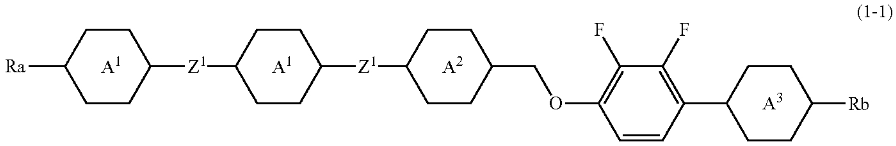
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-391 | $C_3H_7$ | 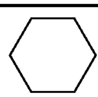 | — | 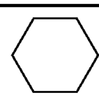 | — | 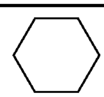 | 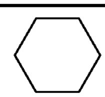 | $C_5H_{11}$ | |
| 1-1-392 | $C_5H_{11}$ | 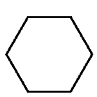 | — | 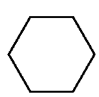 | — | 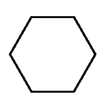 | 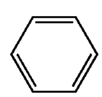 | $C_3H_7$ | |
| 1-1-393 | $C_3H_7$ | 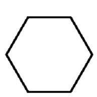 | — | 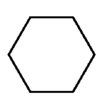 | — | 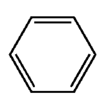 | 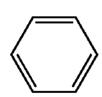 | $C_5H_{11}$ | |
| 1-1-394 | $C_5H_{11}$ | 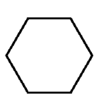 | — | 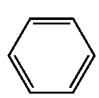 | — | 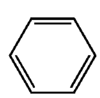 | 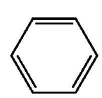 | $C_3H_7$ | |

TABLE 27-continued
(1-1)
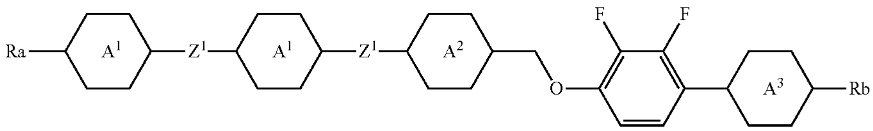
| No. | Ra | A¹ | Z¹ | A¹ | Z¹ | A² | A³ | Rb | Physical property values |
|---|---|---|---|---|---|---|---|---|---|
| 1-1-395 | $C_3H_7$ | 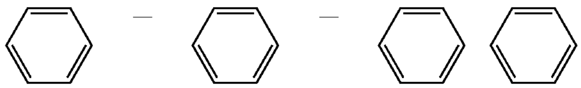 | — | | — | | | $C_5H_{11}$ | |
| 1-1-396 | $C_5H_{11}$ | 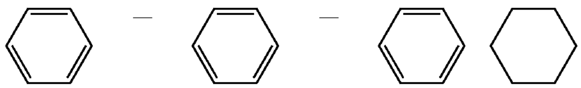 | — | | — | | | $C_3H_7$ | |
| 1-1-397 | $C_3H_7$ | 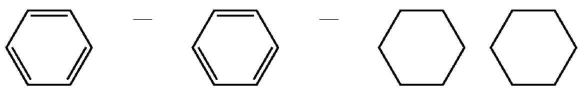 | — | | — | | | $C_5H_{11}$ | |
| 1-1-398 | $C_5H_{11}$ | 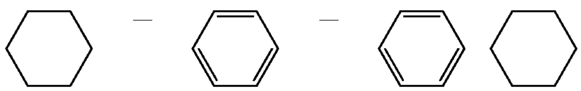 | — | | — | | | $C_3H_7$ | |
| 1-1-399 | $C_3H_7$ | 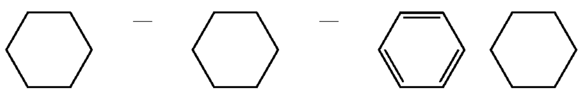 | — | | — | | | $C_5H_{11}$ | |
| 1-1-400 | $C_5H_{11}$ | 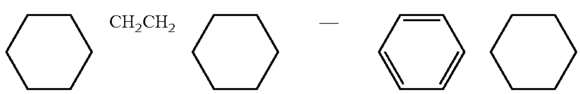 | $CH_2CH_2$ | | — | | | $C_3H_7$ | |
| 1-1-401 | $C_3H_7$ | 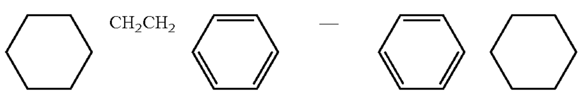 | $CH_2CH_2$ | | — | | | $C_5H_{11}$ | |
| 1-1-402 | $C_5H_{11}$ | 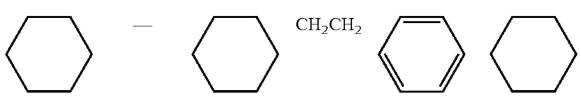 | — | | $CH_2CH_2$ | | | $C_3H_7$ | |
| 1-1-403 | $C_3H_7$ | 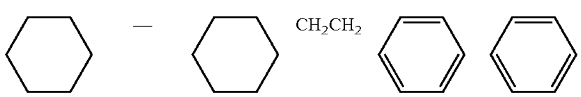 | — | | $CH_2CH_2$ | | | $C_5H_{11}$ | |
| 1-1-404 | $C_5H_{11}$ | 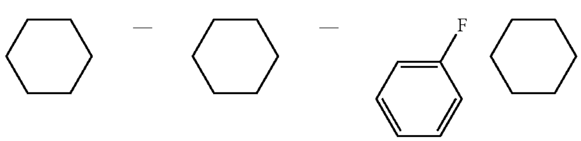 | — | | — | | | $C_3H_7$ | |
| 1-1-405 | $C_3H_7$ | 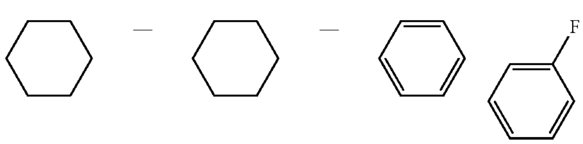 | — | | — | | | $C_5H_{11}$ | |

TABLE 28
(1-1)
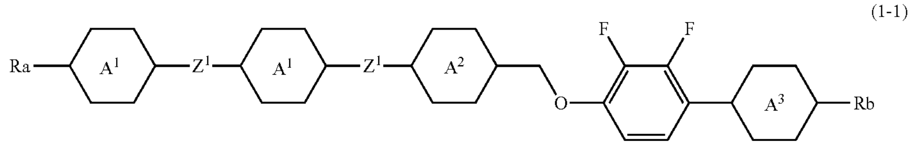
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-1-406 | $C_5H_{11}$ | 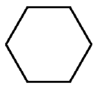 | — | 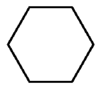 | — | 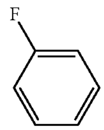 | 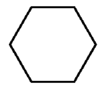 | $C_3H_7$ | |
| 1-1-407 | $C_3H_7$ | 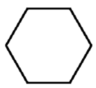 | — | 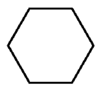 | — | 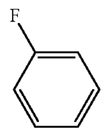 | 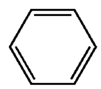 | $C_5H_{11}$ | |
| 1-1-408 | $C_3H_7$ | 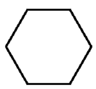 | — | 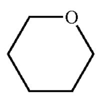 | — | 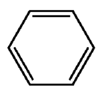 | 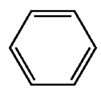 | $C_5H_{11}$ | |
| 1-1-409 | $C_3H_7$ | 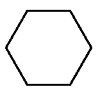 | — | 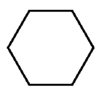 | — | 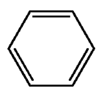 | 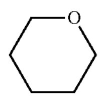 | $C_5H_{11}$ | |
| 1-1-410 | $C_3H_7$ | 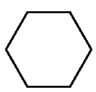 | — | 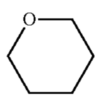 | — | 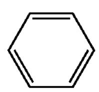 | 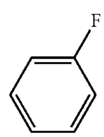 | $C_5H_{11}$ | |
TABLE 29
(2-1)
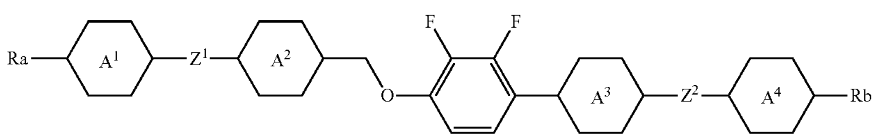
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-1 | $CH_3$ | — | — | 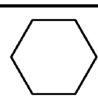 | 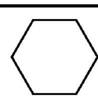 | — | 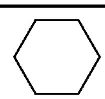 | $CH_3$ | |
| 2-1-2 | $CH_3$ | — | — | 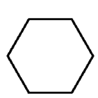 | 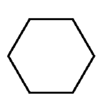 | — | 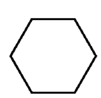 | $C_2H_5$ | |
| 2-1-3 | $CH_3$ | — | — | 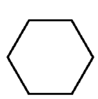 | 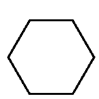 | — | 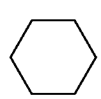 | $C_3H_7$ | |
| 2-1-4 | $CH_3$ | — | — | 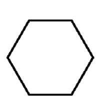 | 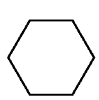 | — | 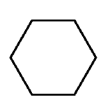 | $C_4H_9$ | |
| 2-1-5 | $CH_3$ | — | — | 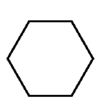 | 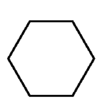 | — | 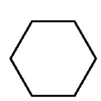 | $C_5H_{11}$ | |

TABLE 29-continued
(2-1)
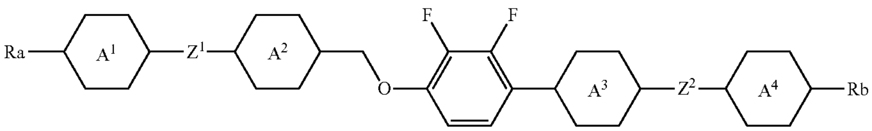
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-6 | $C_2H_5$ | — | — | 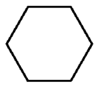 | 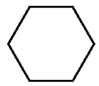 | — | 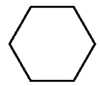 | $CH_3$ | |
| 2-1-7 | $C_2H_5$ | — | — | 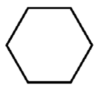 | 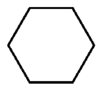 | — | 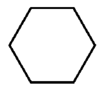 | $C_2H_5$ | |
| 2-1-8 | $C_2H_5$ | — | — | 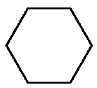 | 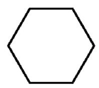 | — | 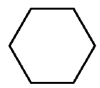 | $C_3H_7$ | |
| 2-1-9 | $C_2H_5$ | — | — | 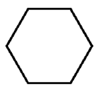 | 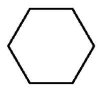 | — | 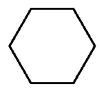 | $C_4H_9$ | |
| 2-1-10 | $C_2H_5$ | — | — | 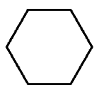 | 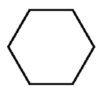 | — | 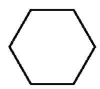 | $C_5H_{11}$ | |
| 2-1-11 | $C_3H_7$ | — | — | 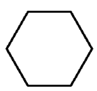 | 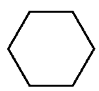 | — | 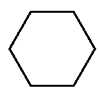 | $CH_3$ | |
| 2-1-12 | $C_3H_7$ | — | — | 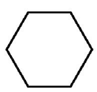 | 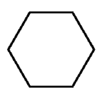 | — | 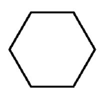 | $C_2H_5$ | |
| 2-1-13 | $C_3H_7$ | — | — | 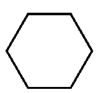 | 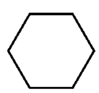 | — | 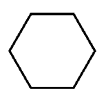 | $C_3H_7$ | |
| 2-1-14 | $C_3H_7$ | — | — | 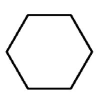 | 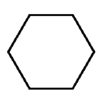 | — | 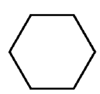 | $C_4H_9$ | |
| 2-1-15 | $C_3H_7$ | — | — | 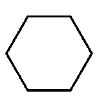 | 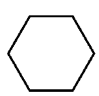 | — | 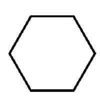 | $C_5H_{11}$ | |
TABLE 30
(2-1)
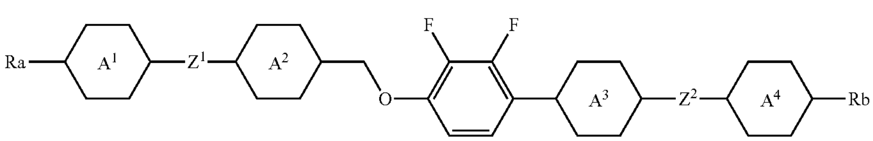
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-16 | $C_4H_9$ | — | — | 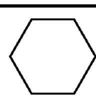 | 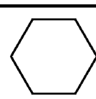 | — | 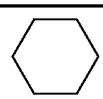 | $CH_3$ | |

TABLE 30-continued
(2-1)
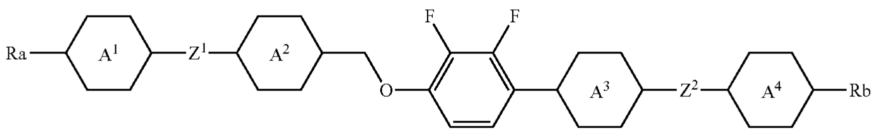
| No. | Ra | $A^1$ | $Z^1$ | $A^2$ / $A^3$ | $Z^2$ | $A^4$ | Rb | Physical property values |
|---|---|---|---|---|---|---|---|---|
| 2-1-17 | $C_4H_9$ | — | — | 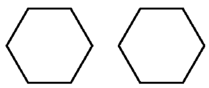 | — | 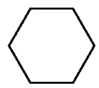 | $C_2H_5$ | |
| 2-1-18 | $C_4H_9$ | — | — | 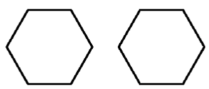 | — | 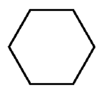 | $C_3H_7$ | |
| 2-1-19 | $C_4H_9$ | — | — | 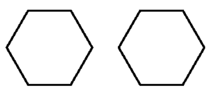 | — | 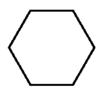 | $C_4H_9$ | |
| 2-1-20 | $C_4H_9$ | — | — | 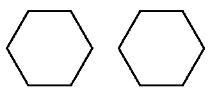 | — | 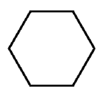 | $C_5H_{11}$ | |
| 2-1-21 | $C_5H_{11}$ | — | — | 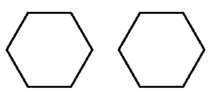 | — | 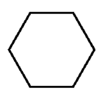 | $CH_3$ | |
| 2-1-22 | $C_5H_{11}$ | — | — | 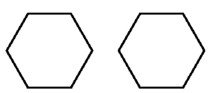 | — | 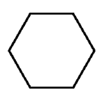 | $C_2H_5$ | |
| 2-1-23 | $C_5H_{11}$ | — | — | 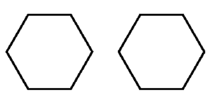 | — | 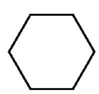 | $C_3H_7$ | Cr 77.0 SmB 133.2 SmA 167.7 N 246.2 Iso $T_{NI}$: 268.6° C., Δ ε: −6.9, Δ n: 0.141 |
| 2-1-24 | $C_5H_{11}$ | — | — | 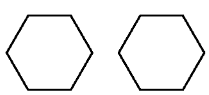 | — | 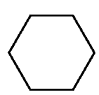 | $C_4H_9$ | |
| 2-1-25 | $C_5H_{11}$ | — | — | 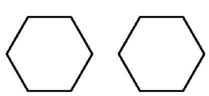 | — | 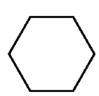 | $C_5H_{11}$ | |
| 2-1-26 | $C_2H_5O$ | — | — | 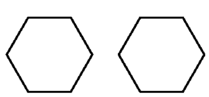 | — | 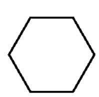 | $C_4H_9$ | |
| 2-1-27 | $C_5H_{11}$ | — | — | 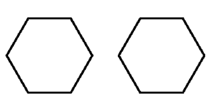 | — | 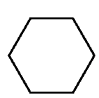 | $OC_2H_5$ | |
| 2-1-28 | $C_2H_5O$ | — | — | 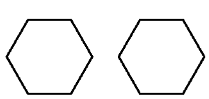 | — | 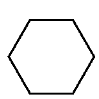 | $OC_4H_9$ | |
| 2-1-29 | $CH_2{=}CH$ | — | — | 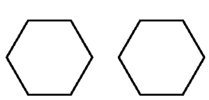 | — | 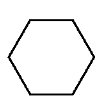 | $C_3H_7$ | Cr1 69.9 Cr2 80.8 SmB 96.3 SmA 123.1 N 252.6 Iso $T_{NI}$: 215.9° C., Δ ε: −5.2, Δ n: 0.114 |
| 2-1-30 | $CH_2{=}CH$ | — | — | 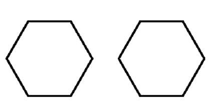 | — | 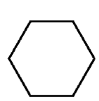 | $C_5H_{11}$ | |

Table 31
(2-1)
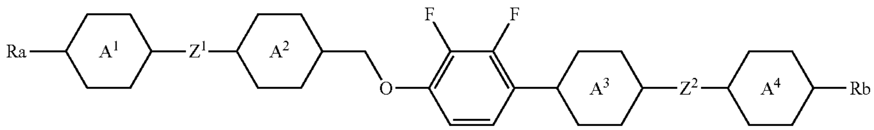
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-31 | $CH_3CH{=}CH$ | — | — | 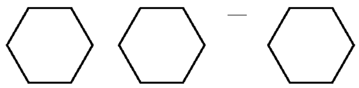 | | — | | $C_3H_7$ | |
| 2-1-32 | $CH_3CH{=}CH$ | — | — | 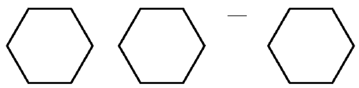 | | — | | $C_5H_{11}$ | |
| 2-1-33 | $CH_2{=}CHC_2H_4$ | — | — | 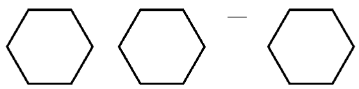 | | — | | $C_3H_7$ | |
| 2-1-34 | $CH_2{=}CHC_2H_4$ | — | — | 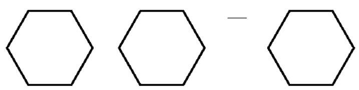 | | — | | $C_5H_{11}$ | |
| 2-1-35 | $C_3H_7CH{=}CH$ | — | — | 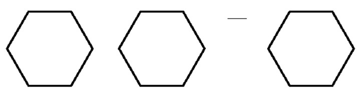 | | — | | $C_2H_5$ | |
| 2-1-36 | $C_3H_7CH{=}CH$ | — | — | 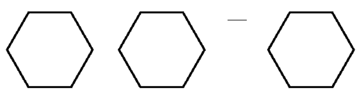 | | — | | $C_3H_7$ | |
| 2-1-37 | $CH_3CH{=}CHC_2H_4$ | — | — | 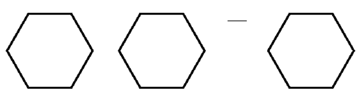 | | — | | $CH_3$ | |
| 2-1-38 | $CH_3CH{=}CHC_2H_4$ | — | — | 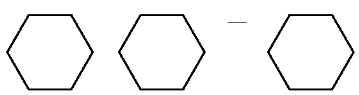 | | — | | $C_2H_5$ | |
| 2-1-39 | $C_3H_7$ | — | — | 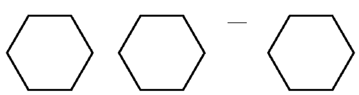 | | — | | $CH{=}CH_2$ | |
| 2-1-40 | $C_5H_{11}$ | — | — | 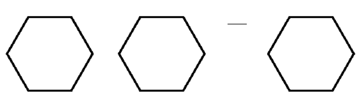 | | — | | $CH{=}CH_2$ | |
| 2-1-41 | $C_3H_7$ | — | — | 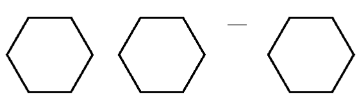 | | — | | $CH{=}CHCH_3$ | |
| 2-1-42 | $C_4H_9$ | — | — | 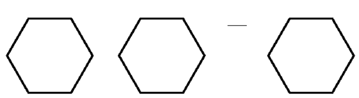 | | — | | $CH{=}CHCH_3$ | |
| 2-1-43 | $C_2H_5$ | — | — | 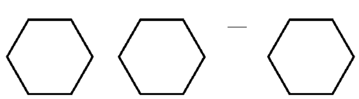 | | — | | $C_2H_4CH{=}CH_2$ | |
| 2-1-44 | $C_3H_7$ | — | — | 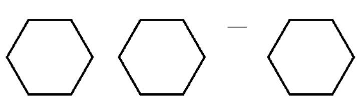 | | — | | $C_2H_4CH{=}CH_2$ | |

Table 31-continued
(2-1)
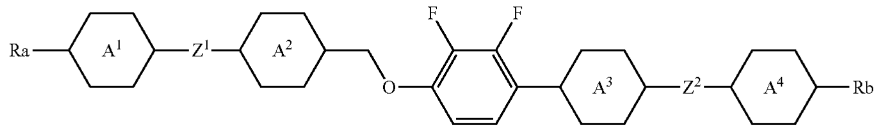
| No. | Ra | A[1] | Z[1] | A[2] | A[3] | Z[2] | A[4] | Rb | Physical property values |
|---|---|---|---|---|---|---|---|---|---|
| 2-1-45 | $CH_3$ | — | — | 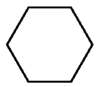 | 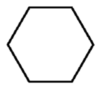 | — | 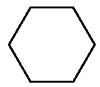 | $CH{=}CHC_3H_7$ | |
TABLE 32
(2-1)
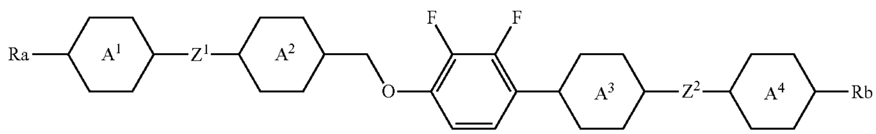
| No. | Ra | A[1] | Z[1] | A[2] | A[3] | Z[2] | A[4] | Rb | Physical property values |
|---|---|---|---|---|---|---|---|---|---|
| 2-1-46 | $C_2H_5$ | — | — | 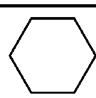 | 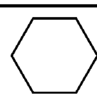 | — | 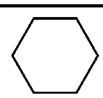 | $CH{=}CHC_3H_7$ | |
| 2-1-47 | $C_2H_5$ | — | — | 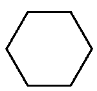 | 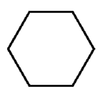 | — | 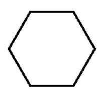 | $C_2H_4CH{=}CHCH_3$ | |
| 2-1-48 | $C_3H_7$ | — | — | 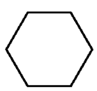 | 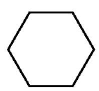 | — | 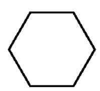 | $C_2H_4CH{=}CHCH_3$ | |
| 2-1-49 | $CH_2{=}CH$ | — | — | 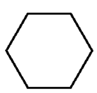 | 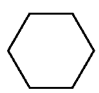 | — | 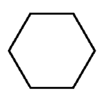 | $C_2H_4CH{=}CH_2$ | |
| 2-1-50 | $CH_3CH{=}CH$ | — | — | 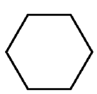 | 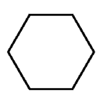 | — | 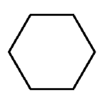 | $CH{=}CH_2$ | |
| 2-1-51 | $C_3H_7OCH_2$ | — | — | 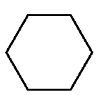 | 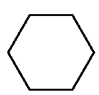 | — | 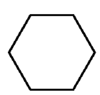 | $C_3H_7$ | |
| 2-1-52 | $C_5H_{11}$ | — | — | 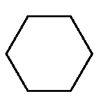 | 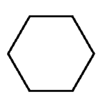 | — | 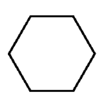 | $OC_2H_4CH{=}CH_2$ | |
| 2-1-53 | $C_3H_7$ | — | — | 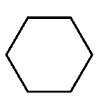 | 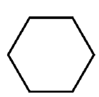 | $CH_2CH_2$ | 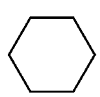 | $C_2H_5$ | |
| 2-1-54 | $C_5H_{11}$ | — | — | 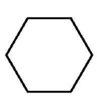 | 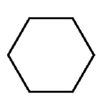 | $CH_2CH_2$ | 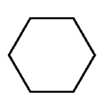 | $C_3H_7$ | |
| 2-1-55 | $C_3H_7$ | — | — | 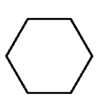 | 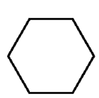 | $CH_2O$ | 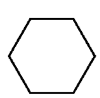 | $C_2H_5$ | |

TABLE 32-continued
(2-1)
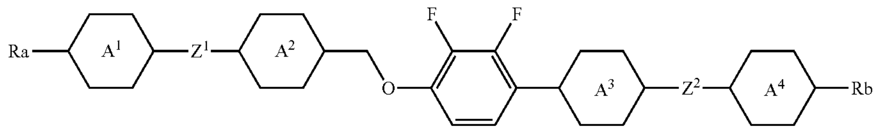
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-56 | $C_5H_{11}$ | — | — | 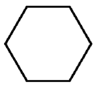 | 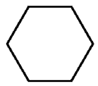 | $OCH_2$ | 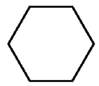 | $C_3H_7$ | |
| 2-1-57 | H | — | — | 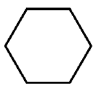 | 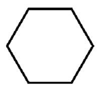 | COO | 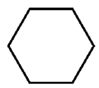 | $C_4H_9$ | |
| 2-1-58 | $C_7H_{15}$ | — | — | 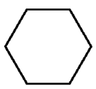 | 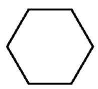 | OCO | 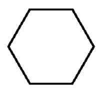 | $C_4H_9$ | |
| 2-1-59 | $C_2H_5$ | — | — | 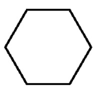 | 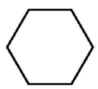 | $CF_2O$ | 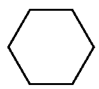 | $C_6H_{13}$ | |
| 2-1-60 | $CH_3$ | — | — | 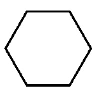 | 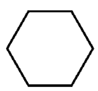 | $OCF_2$ | 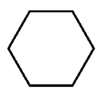 | $C_2H_5$ | |
TABLE 33
(2-1)
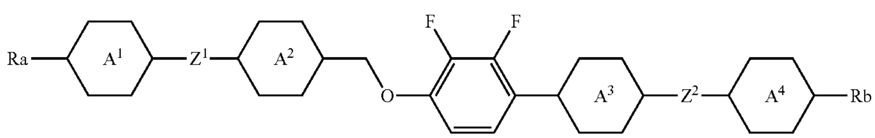
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-61 | $CH_3$ | — | — | 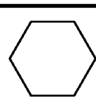 | 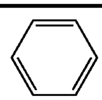 | — | 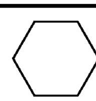 | $CH_3$ | |
| 2-1-62 | $CH_3$ | — | — | 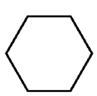 | 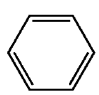 | — | 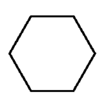 | $C_2H_5$ | |
| 2-1-63 | $CH_3$ | — | — | 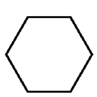 | 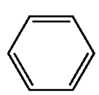 | — | 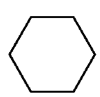 | $C_3H_7$ | |
| 2-1-64 | $CH_3$ | — | — | 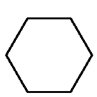 | 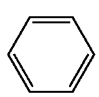 | — | 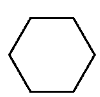 | $C_4H_9$ | |
| 2-1-65 | $CH_3$ | — | — | 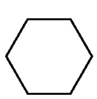 | 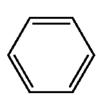 | — | 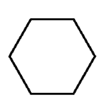 | $C_5H_{11}$ | |
| 2-1-66 | $C_2H_5$ | — | — | 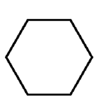 | 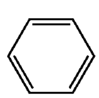 | — | 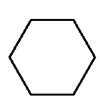 | $CH_3$ | |

TABLE 33-continued
(2-1)
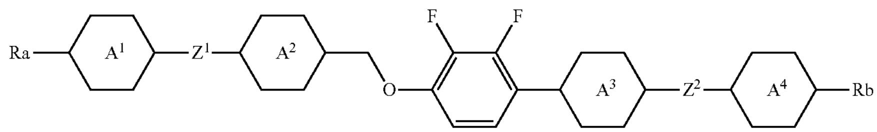
| No. | Ra | A¹ | Z¹ | A² | A³ | Z² | A⁴ | Rb | Physical property values |
|---|---|---|---|---|---|---|---|---|---|
| 2-1-67 | $C_2H_5$ | — | — | 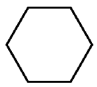 | 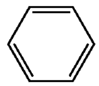 | — | 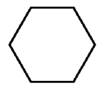 | $C_2H_5$ | |
| 2-1-68 | $C_2H_5$ | — | — | 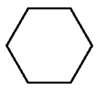 | 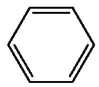 | — | 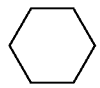 | $C_3H_7$ | |
| 2-1-69 | $C_2H_5$ | — | — | 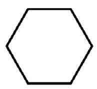 | 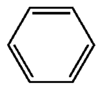 | — | 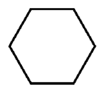 | $C_4H_9$ | |
| 2-1-70 | $C_2H_5$ | — | — | 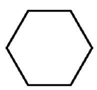 | 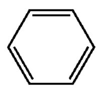 | — | 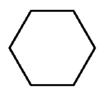 | $C_5H_{11}$ | |
| 2-1-71 | $C_3H_7$ | — | — | 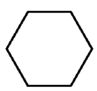 | 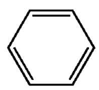 | — | 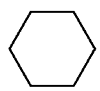 | $CH_3$ | |
| 2-1-72 | $C_3H_7$ | — | — | 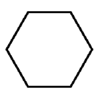 | 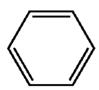 | — | 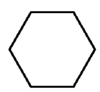 | $C_2H_5$ | |
| 2-1-73 | $C_3H_7$ | — | — | 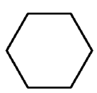 | 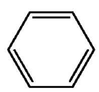 | — | 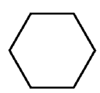 | $C_3H_7$ | |
| 2-1-74 | $C_3H_7$ | — | — | 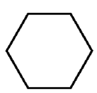 | 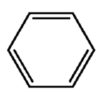 | — | 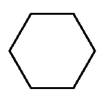 | $C_4H_9$ | |
| 2-1-75 | $C_3H_7$ | — | — | 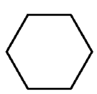 | 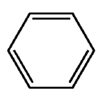 | — | 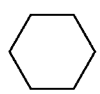 | $C_5H_{11}$ | |
TABLE 34
(2-1)
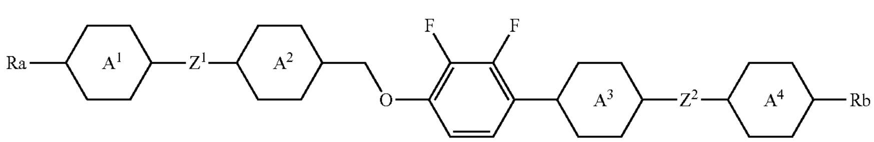
| No. | Ra | A¹ | Z¹ | A² | A³ | Z² | A⁴ | Rb | Physical property values |
|---|---|---|---|---|---|---|---|---|---|
| 2-1-76 | $C_4H_9$ | — | — | 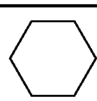 | 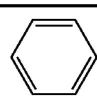 | — | 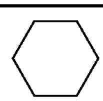 | $CH_3$ | |
| 2-1-77 | $C_4H_9$ | — | — | 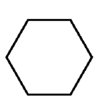 | 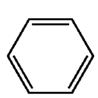 | — | 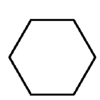 | $C_2H_5$ | |

TABLE 34-continued
(2-1)
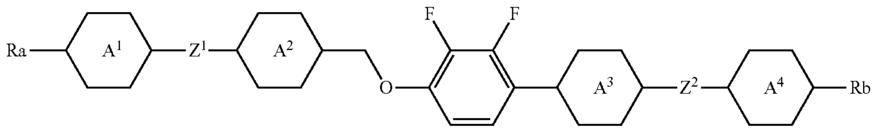
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-78 | $C_4H_9$ | — | — | 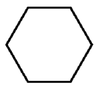 | 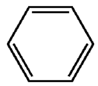 | — | 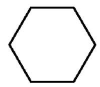 | $C_3H_7$ | |
| 2-1-79 | $C_4H_9$ | — | — | 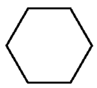 | 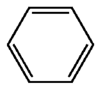 | — | 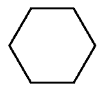 | $C_4H_9$ | |
| 2-1-80 | $C_4H_9$ | — | — | 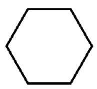 |  | — | 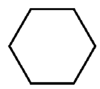 | $C_5H_{11}$ | |
| 2-1-81 | $C_5H_{11}$ | — | — | 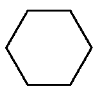 | 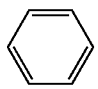 | — | 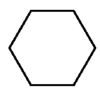 | $CH_3$ | |
| 2-1-82 | $C_5H_{11}$ | — | — | 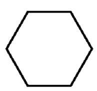 |  | — | 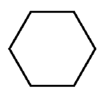 | $C_2H_5$ | |
| 2-1-83 | $C_5H_{11}$ | — | — | 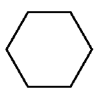 |  | — | 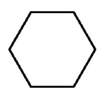 | $C_3H_7$ | |
| 2-1-84 | $C_5H_{11}$ | — | — | 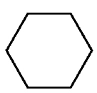 |  | — | 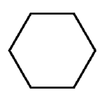 | $C_4H_9$ | |
| 2-1-85 | $C_5H_{11}$ | — | — | 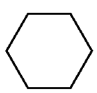 |  | — | 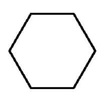 | $C_3H_7$ | Cr (50.7 SmX) 76.6 SmC 80.9 N 239.5 Iso $T_{NI}$: 218.6° C., $\Delta\epsilon$: −5.0, $\Delta n$: 0.167 |
| 2-1-86 | $C_2H_5O$ | — | — | 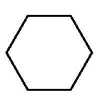 | 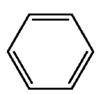 | — | 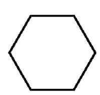 | $C_4H_9$ | |
| 2-1-87 | $C_5H_{11}$ | — | — | 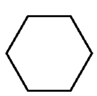 | 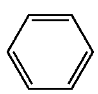 | — | 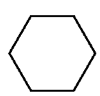 | $OC_2H_5$ | |
| 2-1-88 | $C_2H_5O$ | — | — | 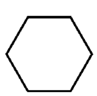 | 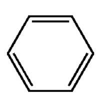 | — | 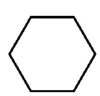 | $OC_4H_9$ | |
| 2-1-89 | $C_5H_{11}$ | — | — | 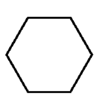 | 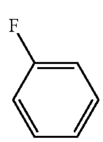 | — | 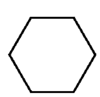 | $C_3H_7$ | |
| 2-1-90 | $C_3H_7$ | — | — | 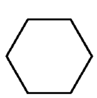 | 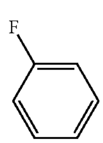 | — | 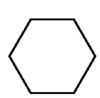 | $C_5H_{11}$ | |

TABLE 35
(2-1)
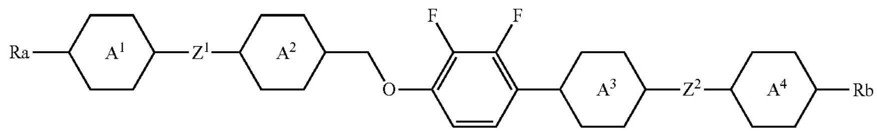
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-91 | $C_2H_5$ | — | — | 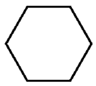 | 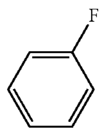 | — | 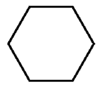 | $C_4H_9$ | |
| 2-1-92 | $C_5H_{11}$ | — | — | 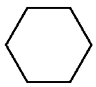 | 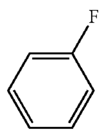 | — | 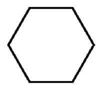 | $C_2H_5$ | |
| 2-1-93 | $CH_2{=}CH$ | — | — | 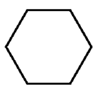 | 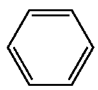 | — | 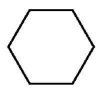 | $C_3H_7$ | |
| 2-1-94 | $CH_2{=}CH$ | — | — | 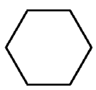 | 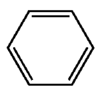 | — | 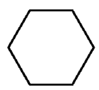 | $C_5H_{11}$ | |
| 2-1-95 | $CH_3CH{=}CH$ | — | — | 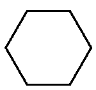 | 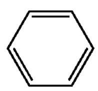 | — | 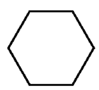 | $C_2H_5$ | |
| 2-1-96 | $CH_2{=}CHC_2H_4$ | — | — | 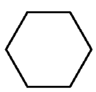 | 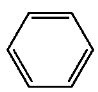 | — | 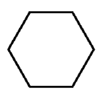 | $C_3H_7$ | |
| 2-1-97 | $C_3H_7CH{=}CH$ | — | — | 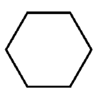 | 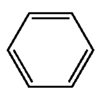 | — | 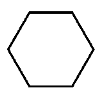 | $CH_3$ | |
| 2-1-98 | $CH_3CH{=}CHC_2H_4$ | — | — | 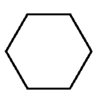 | 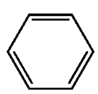 | — | 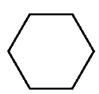 | $C_2H_5$ | |
| 2-1-99 | $C_3H_7$ | — | — | 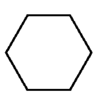 | 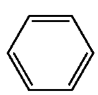 | — | 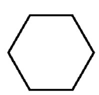 | $CH{=}CH_2$ | |
| 2-1-100 | $C_5H_{11}$ | — | — | 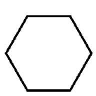 | 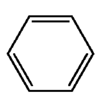 | — | 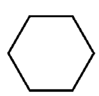 | $CH{=}CH_2$ | |
| 2-1-101 | $C_3H_7$ | — | — | 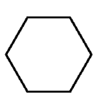 | 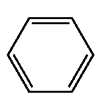 | — | 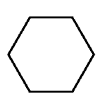 | $CH{=}CHCH_3$ | |
| 2-1-102 | $C_4H_9$ | — | — | 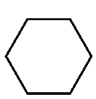 | 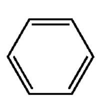 | — | 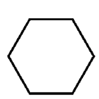 | $CH{=}CHCH_3$ | |
| 2-1-103 | $C_2H_5$ | — | — | 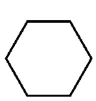 | 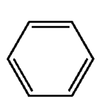 | — | 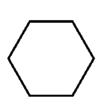 | $C_2H_4CH{=}CH_2$ | |

TABLE 35-continued
(2-1)
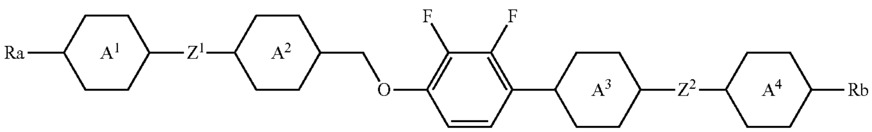
| No. | Ra | A¹ | Z¹ | A² | A³ | Z² | A⁴ | Rb | Physical property values |
|---|---|---|---|---|---|---|---|---|---|
| 2-1-104 | $C_3H_7$ | — | — | 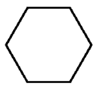 | 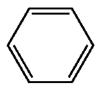 | — | 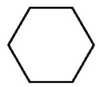 | $C_2H_4CH{=}CH_2$ | |
| 2-1-105 | $CH_3$ | — | — | 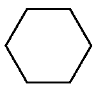 | 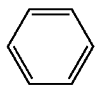 | — | 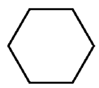 | $CH{=}CHC_3H_7$ | |
TABLE 36
(2-1)
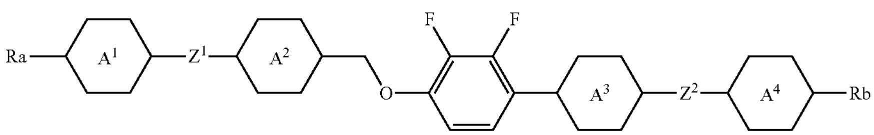
| No. | Ra | A¹ | Z¹ | A² | A³ | Z² | A⁴ | Rb | Physical property values |
|---|---|---|---|---|---|---|---|---|---|
| 2-1-106 | $C_2H_5$ | — | — | 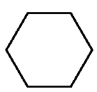 | 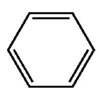 | — | 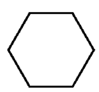 | $CH{=}CHC_3H_7$ | |
| 2-1-107 | $C_2H_5$ | — | — | 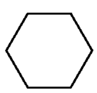 | 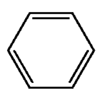 | — | 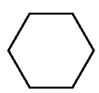 | $C_2H_4CH{=}CHCH_3$ | |
| 2-1-108 | $C_3H_7$ | — | — | 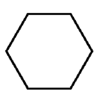 | 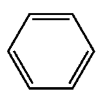 | — | 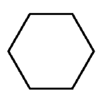 | $C_2H_4CH{=}CHCH_3$ | |
| 2-1-109 | $CH_2{=}CH$ | — | — | 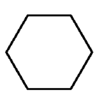 | 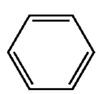 | — | 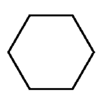 | $C_2H_4CH{=}CH_2$ | |
| 2-1-110 | $CH_3CH{=}CH$ | — | — | 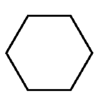 | 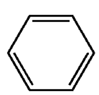 | — | 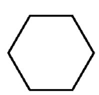 | $CH{=}CH_2$ | |
| 2-1-111 | $C_5H_{11}OCH_2$ | — | — | 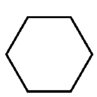 | 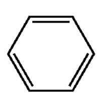 | — | 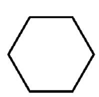 | $C_3H_7$ | |
| 2-1-112 | $C_3H_7$ | — | — | 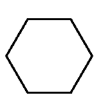 | 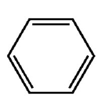 | — | 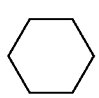 | $OC_2H_4CH{=}CH_2$ | |
| 2-1-113 | $C_4H_9$ | — | — | 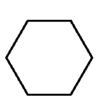 | 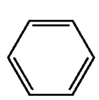 | $CH_2CH_2$ | 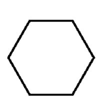 | $C_2H_5$ | |

TABLE 36-continued
(2-1)
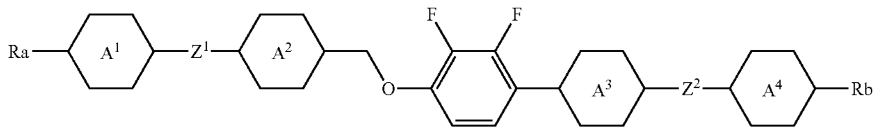
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-114 | $C_5H_{11}$ | — | — | 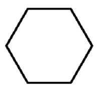 | 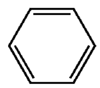 | $CH_2CH_2$ | 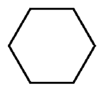 | $C_3H_7$ | |
| 2-1-115 | $C_3H_7$ | — | — | 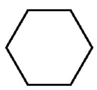 | 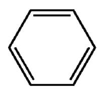 | $CH_2O$ | 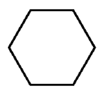 | $C_2H_5$ | |
| 2-1-116 | $C_5H_{11}$ | — | — | 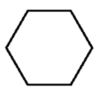 | 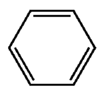 | $OCH_2$ | 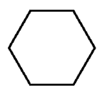 | $C_6H_{13}$ | |
| 2-1-117 | $C_5H_{11}$ | — | — | 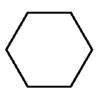 | 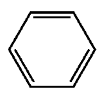 | COO | 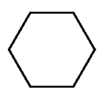 | $C_4H_9$ | |
| 2-1-118 | $C_2H_5$ | — | — | 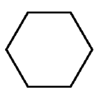 | 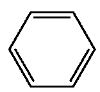 | OCO | 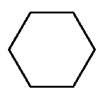 | $C_4H_9$ | |
| 2-1-119 | $C_2H_5$ | — | — | 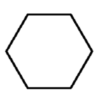 | 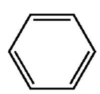 | $CF_2O$ | 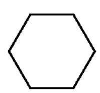 | $CH_3$ | |
| 2-1-120 | $C_4H_9$ | — | — | 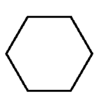 | 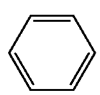 | $OCF_2$ | 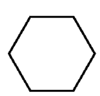 | $C_2H_5$ | |
TABLE 37
(2-1)
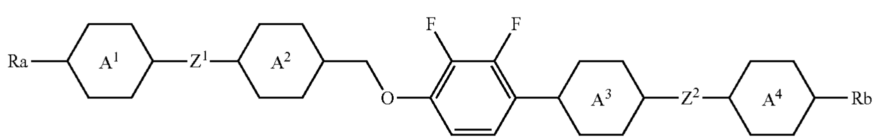
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-121 | $CH_3$ | — | — | 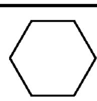 | 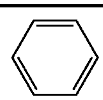 | — | 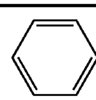 | $CH_3$ | |
| 2-1-122 | $CH_3$ | — | — | 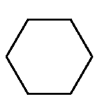 | 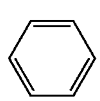 | — | 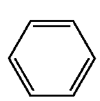 | $C_2H_5$ | |
| 2-1-123 | $CH_3$ | — | — | 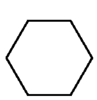 | 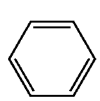 | — | 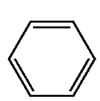 | $C_3H_7$ | |
| 2-1-124 | $CH_3$ | — | — | 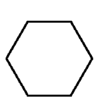 | 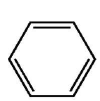 | — | 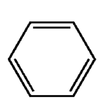 | $C_4H_9$ | |

TABLE 37-continued
(2-1)
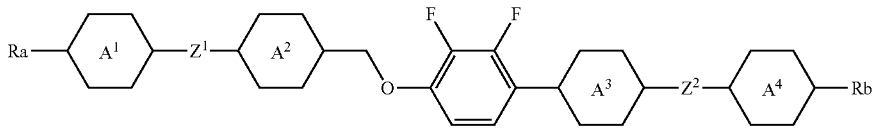
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-125 | $CH_3$ | — | — | 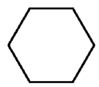 | 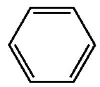 | — | 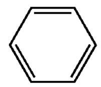 | $C_5H_{11}$ | |
| 2-1-126 | $C_2H_5$ | — | — | 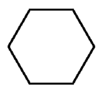 |  | — | 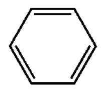 | $CH_3$ | |
| 2-1-127 | $C_2H_5$ | — | — | 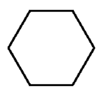 | 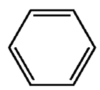 | — | 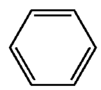 | $C_2H_5$ | |
| 2-1-128 | $C_2H_5$ | — | — | 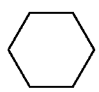 | 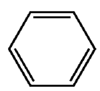 | — | 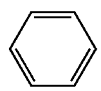 | $C_3H_7$ | |
| 2-1-129 | $C_2H_5$ | — | — | 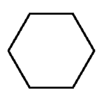 | 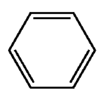 | — | 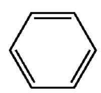 | $C_4H_9$ | |
| 2-1-130 | $C_2H_5$ | — | — | 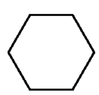 | 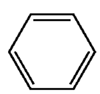 | — | 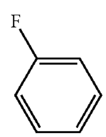 | $C_5H_{11}$ | |
| 2-1-131 | $C_3H_7$ | — | — | 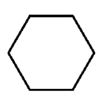 | 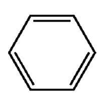 | — | 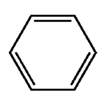 | $CH_3$ | |
| 2-1-132 | $C_3H_7$ | — | — | 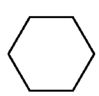 | 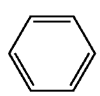 | — | 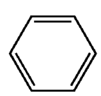 | $C_2H_5$ | |
| 2-1-133 | $C_3H_7$ | — | — | 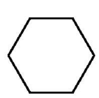 | 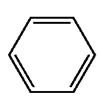 | — | 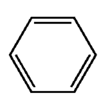 | $C_3H_7$ | |
| 2-1-134 | $C_3H_7$ | — | — | 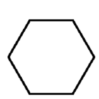 | 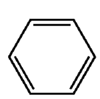 | — | 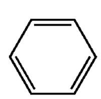 | $C_4H_9$ | |
| 2-1-135 | $C_3H_7$ | — | — | 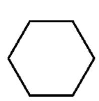 | 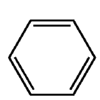 | — | 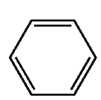 | $C_5H_{11}$ | |

TABLE 38
(2-1)
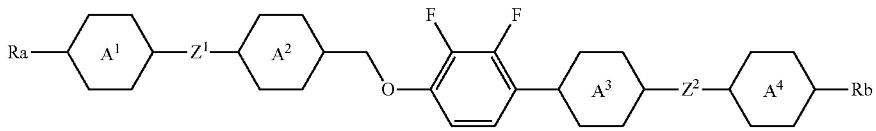
| No. | Ra | A[1] | Z[1] | A[2] | A[3] | Z[2] | A[4] | Rb | Physical property values |
|---|---|---|---|---|---|---|---|---|---|
| 2-1-136 | $C_4H_9$ | — | — | 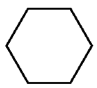 | 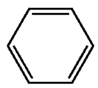 | — | 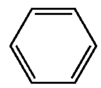 | $CH_3$ | |
| 2-1-137 | $C_4H_9$ | — | — | 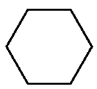 |  | — | 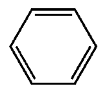 | $C_2H_5$ | |
| 2-1-138 | $C_4H_9$ | — | — | 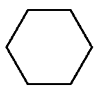 | 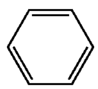 | — | 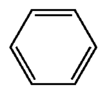 | $C_3H_7$ | |
| 2-1-139 | $C_4H_9$ | — | — | 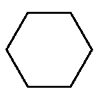 |  | — | 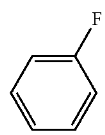 | $C_4H_9$ | |
| 2-1-140 | $C_4H_9$ | — | — | 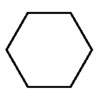 |  | — | 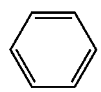 | $C_5H_{11}$ | |
| 2-1-141 | $C_5H_{11}$ | — | — | 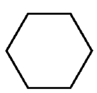 | 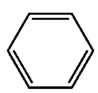 | — | 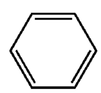 | $CH_3$ | |
| 2-1-142 | $C_5H_{11}$ | — | — | 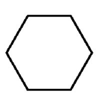 | 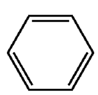 | — | 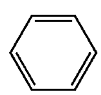 | $C_2H_5$ | |
| 2-1-143 | $C_5H_{11}$ | — | — | 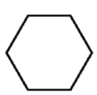 | 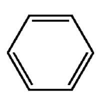 | — | 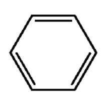 | $C_3H_7$ | Cr 112.0 N 252.4 Iso<br>$T_{NI}$: 232.6° C., Δ ϵ: −4.3, Δ n: 0.247 |
| 2-1-144 | $C_5H_{11}$ | — | — | 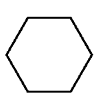 | 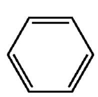 | — | 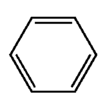 | $C_4H_9$ | |
| 2-1-145 | $C_5H_{11}$ | — | — | 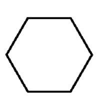 | 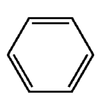 | — | 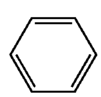 | $C_5H_{11}$ | |
| 2-1-146 | $C_2H_5O$ | — | — | 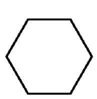 | 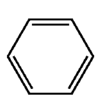 | — | 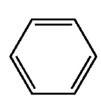 | $C_4H_9$ | |
| 2-1-147 | $C_5H_{11}$ | — | — | 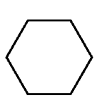 | 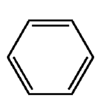 | — | 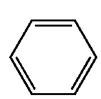 | $OC_2H_5$ | |
| 2-1-148 | $C_2H_5O$ | — | — | 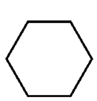 | 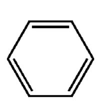 | — | 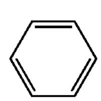 | $OC_4H_9$ | |

TABLE 38-continued
(2-1)
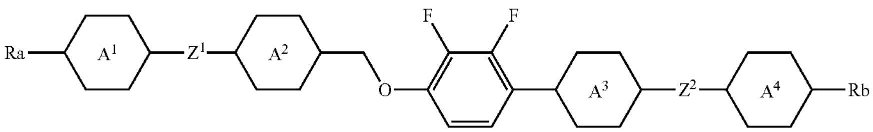
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-149 | $C_3H_7$ | — | — | 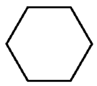 |  | — | 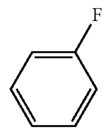 | $OC_4H_9$ | |
| 2-1-150 | $C_5H_{11}$ | — | — | 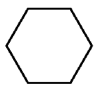 | 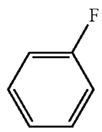 | — | 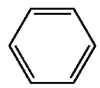 | $OC_2H_5$ | |
TABLE 39
(2-1)
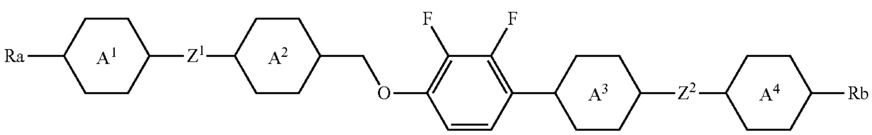
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-151 | $C_3H_7$ | — | — | 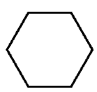 | 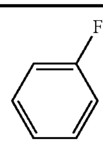 | — | 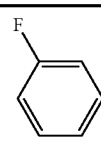 | $C_5H_{11}$ | |
| 2-1-152 | $C_3H_7O$ | — | — | 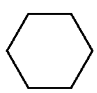 | 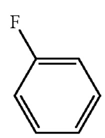 | — |  | $C_5H_{11}$ | |
| 2-1-153 | $C_5H_{11}$ | — | — | 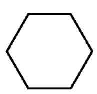 | 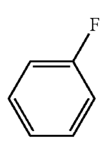 | — | 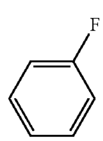 | $OC_2H_5$ | |
| 2-1-154 | $CH_2{=}CH$ | — | — | 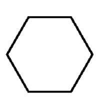 | 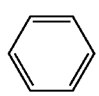 | — | 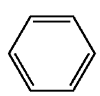 | $C_5H_{11}$ | |
| 2-1-155 | $CH_3CH{=}CH$ | — | — | 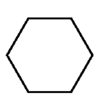 | 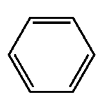 | — | 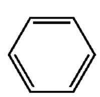 | $C_2H_5$ | |
| 2-1-156 | $CH_2{=}CHC_2H_4$ | — | — | 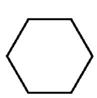 | 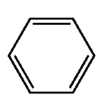 | — | 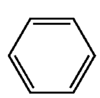 | $C_3H_7$ | |
| 2-1-157 | $C_3H_7CH{=}CH$ | — | — | 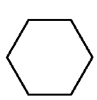 | 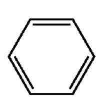 | — | 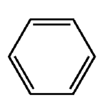 | $CH_3$ | |

TABLE 39-continued
(2-1)
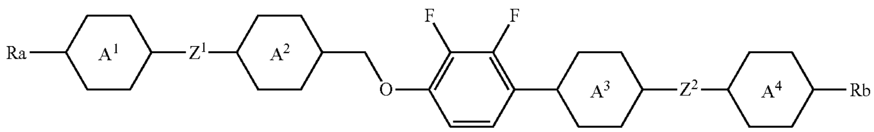
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-158 | $CH_3CH{=}CHC_2H_4$ | — | — | 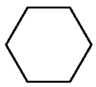 | 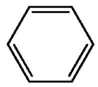 | — | 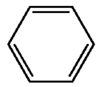 | $C_2H_5$ | |
| 2-1-159 | $C_2H_5$ | — | — | 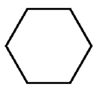 | 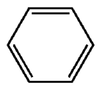 | — | 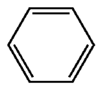 | $CH_2CH_2CHF_2$ | |
| 2-1-160 | $CH_2FCH_2CH_2$ | — | — | 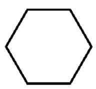 | 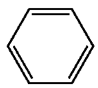 | — | 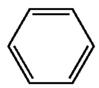 | $C_4H_9$ | |
| 2-1-161 | $CH_3$ | — | — | 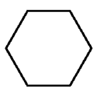 | 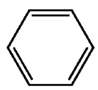 | — |  | $CH{=}CH_2$ | |
| 2-1-162 | $C_4H_9$ | — | — | 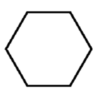 |  | — | 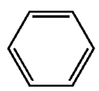 | $CH{=}CHCH_3$ | |
| 2-1-163 | $C_2H_5$ | — | — | 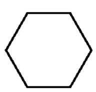 | 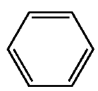 | — | 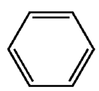 | $C_2H_4CH{=}CH_2$ | |
| 2-1-164 | $C_3H_7$ | — | — | 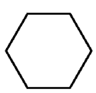 | 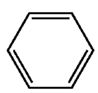 | — |  | $C_2H_4CH{=}CH_2$ | |
| 2-1-165 | $C_3H_7$ | — | — | 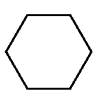 | 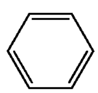 | — | 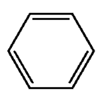 | $CH{=}CHC_3H_7$ | |
TABLE 40
(2-1)
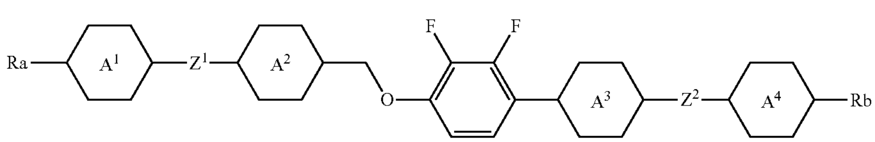
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-166 | $C_2H_5$ | — | — | 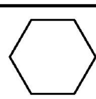 | 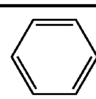 | — | 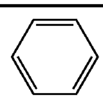 | $CH{=}CHC_3H_7$ | |
| 2-1-167 | $C_5H_{11}$ | — | — | 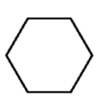 | 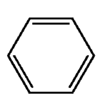 | — | 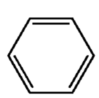 | $C_2H_4CH{=}CHCH_3$ | |
| 2-1-168 | $C_3H_7$ | — | — | 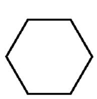 | 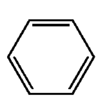 | — | 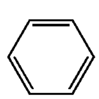 | $C_2H_4CH{=}CHCH_3$ | |

TABLE 40-continued
(2-1)
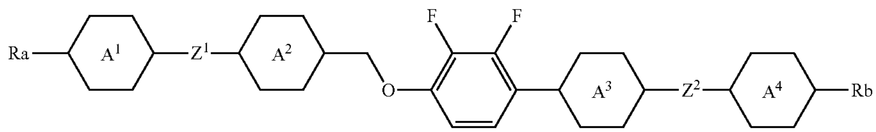
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-169 | $CH_2{=}CH$ | — | — | 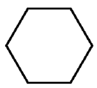 |  | — | 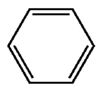 | $C_2H_4CH{=}CH_2$ | |
| 2-1-170 | $CH_3CH{=}CH$ | — | — | 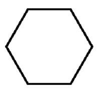 |  | — | 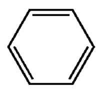 | $CH{=}CH_2$ | |
| 2-1-171 | $C_2H_5OCH_2$ | — | — | 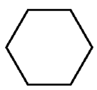 |  | — |  | $C_3H_7$ | |
| 2-1-172 | $C_3H_7$ | — | — | 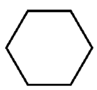 |  | — | 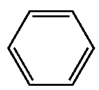 | $OC_2H_4CH{=}CH_2$ | |
| 2-1-173 | $C_3H_7$ | — | — | 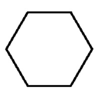 | 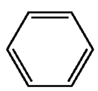 | $CH_2CH_2$ | 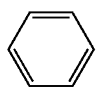 | $C_2H_5$ | |
| 2-1-174 | $C_2H_5$ | — | — | 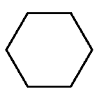 |  | C≡C | 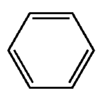 | $C_3H_7$ | |
| 2-1-175 | $C_3H_7$ | — | — | 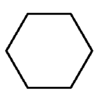 | 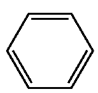 | $CH_2O$ | 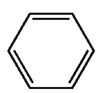 | $C_2H_5$ | |
| 2-1-176 | $C_2H_5$ | — | — | 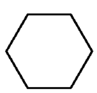 | 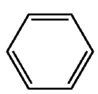 | $OCH_2$ | 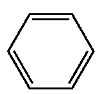 | $C_3H_7$ | |
| 2-1-177 | $C_4H_9$ | — | — | 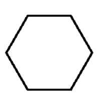 | 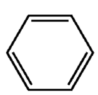 | COO | 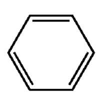 | $C_4H_9$ | |
| 2-1-178 | $C_3H_7$ | — | — | 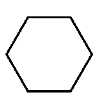 | 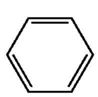 | OCO | 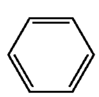 | H | |
| 2-1-179 | $C_2H_5$ | — | — | 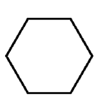 | 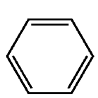 | $CF_2O$ | 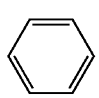 | $C_7H_{15}$ | |
| 2-1-180 | $CH_3$ | — | — | 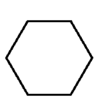 | 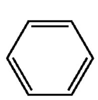 | $OCF_2$ | 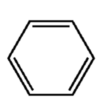 | $C_2H_5$ | |

TABLE 41
(2-1)
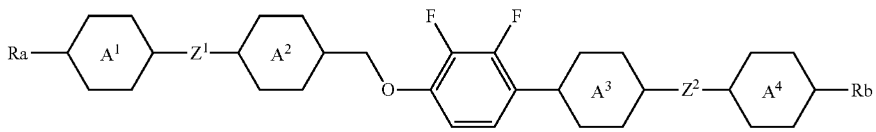
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-181 | $CH_3$ | — | — | 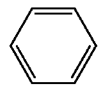 | 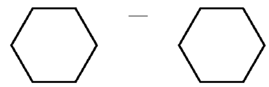 | — | | $CH_3$ | |
| 2-1-182 | $CH_3$ | — | — | 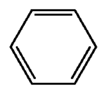 | 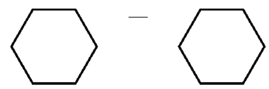 | — | | $C_2H_5$ | |
| 2-1-183 | $CH_3$ | — | — | 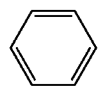 | 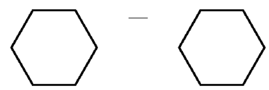 | — | | $C_3H_7$ | |
| 2-1-184 | $CH_3$ | — | — | 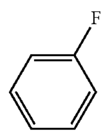 | 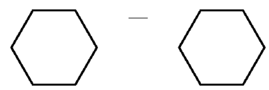 | — | | $C_4H_9$ | |
| 2-1-185 | $CH_3$ | — | — | 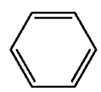 | 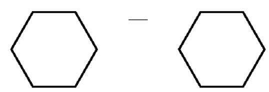 | — | | $C_5H_{11}$ | |
| 2-1-186 | $C_2H_5$ | — | — | 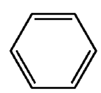 | 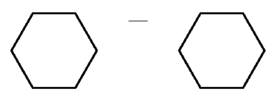 | — | | $CH_3$ | |
| 2-1-187 | $C_2H_5$ | — | — | 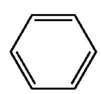 | 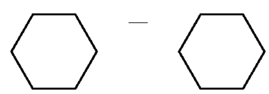 | — | | $C_2H_5$ | |
| 2-1-188 | $C_2H_5$ | — | — | 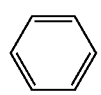 | 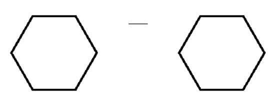 | — | | $C_3H_7$ | |
| 2-1-189 | $C_2H_5$ | — | — | 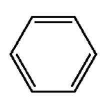 | 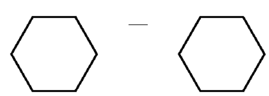 | — | | $C_4H_9$ | |
| 2-1-190 | $C_2H_5$ | — | — | 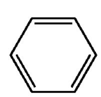 | 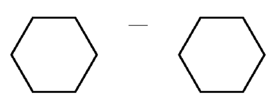 | — | | $C_5H_{11}$ | |
| 2-1-191 | $C_3H_7$ | — | — | 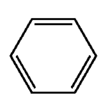 | 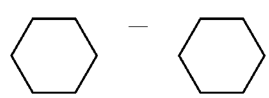 | — | | $CH_3$ | |
| 2-1-192 | $C_3H_7$ | — | — | 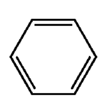 | 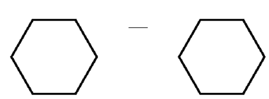 | — | | $C_2H_5$ | |
| 2-1-193 | $C_3H_7$ | — | — | 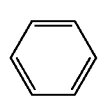 | 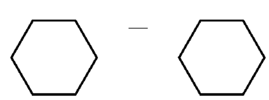 | — | | $C_3H_7$ | |
| 2-1-194 | $C_3H_7$ | — | — | 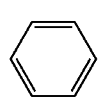 | 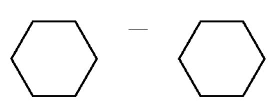 | — | | $C_4H_9$ | |

TABLE 41-continued
(2-1)
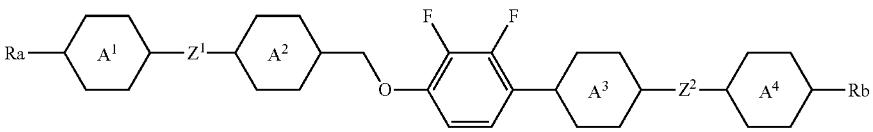
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-195 | $C_3H_7$ | — | — | 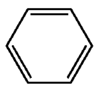 | 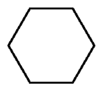 | — | 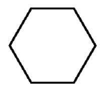 | $C_5H_{11}$ | |
TABLE 42
(2-1)
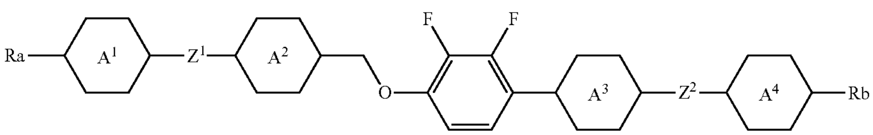
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-196 | $C_4H_9$ | — | — | 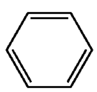 | 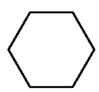 | — | 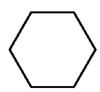 | $CH_3$ | |
| 2-1-197 | $C_4H_9$ | — | — | 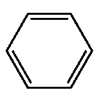 | 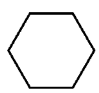 | — | 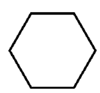 | $C_2H_5$ | |
| 2-1-198 | $C_4H_9$ | — | — | 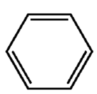 | 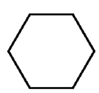 | — | 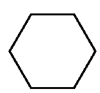 | $C_3H_7$ | |
| 2-1-199 | $C_4H_9$ | — | — | 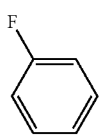  | 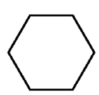 | — | 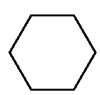 | $C_4H_9$ | |
| 2-1-200 | $C_4H_9$ | — | — | 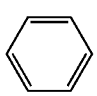 | 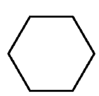 | — | 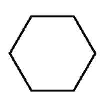 | $C_5H_{11}$ | |
| 2-1-201 | $C_5H_{11}$ | — | — | 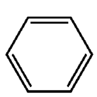 | 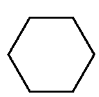 | — | 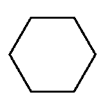 | $CH_3$ | |
| 2-1-202 | $C_5H_{11}$ | — | — | 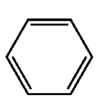 | 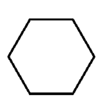 | — | 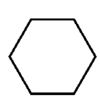 | $C_2H_5$ | |
| 2-1-203 | $C_5H_{11}$ | — | — | 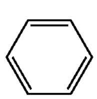 | 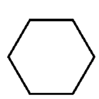 | — | 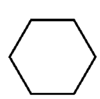 | $C_3H_7$ | |
| 2-1-204 | $C_5H_{11}$ | — | — | 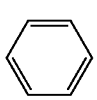 | 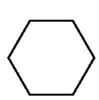 | — | 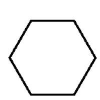 | $C_4H_9$ | |

TABLE 42-continued
(2-1)
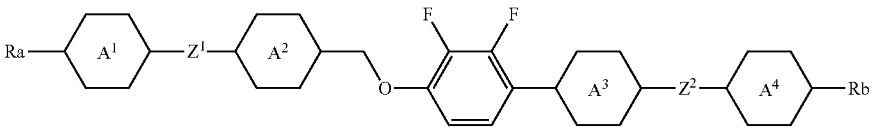
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-205 | $C_5H_{11}$ | — | — |  | 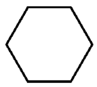 | — | 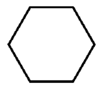 | $C_3H_7$ | |
| 2-1-206 | $C_2H_5O$ | — | — | 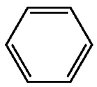 | 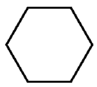 | — | 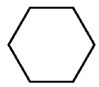 | $C_4H_9$ | |
| 2-1-207 | $C_5H_{11}$ | — | — | 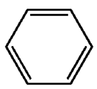 | 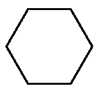 | — | 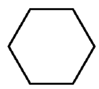 | $OC_2H_5$ | |
| 2-1-208 | $C_2H_5O$ | — | — | 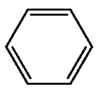 | 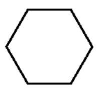 | — | 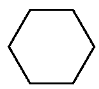 | $OC_4H_9$ | |
| 2-1-209 | $C_5H_{11}$ | — | — |  | 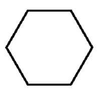 | — | 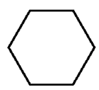 | $C_3H_7$ | |
| 2-1-210 | $C_3H_7$ | — | — |  | 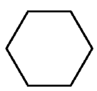 | — | 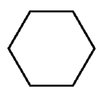 | $C_5H_{11}$ | |
TABLE 43
(2-1)
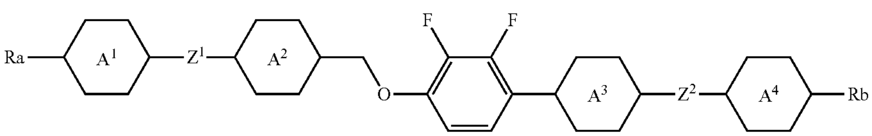
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-211 | $C_2H_5$ | — | — | 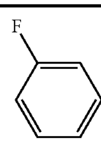 | 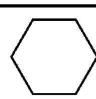 | — | 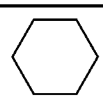 | $CH_2CH_2F$ | |
| 2-1-212 | $CH_3OC_2H_4$ | — | — | 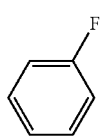 | 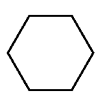 | — | 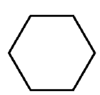 | $C_2H_5$ | |
| 2-1-213 | $CH_2{=}CH$ | — | — | 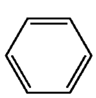 | 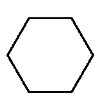 | — | 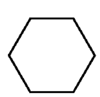 | $C_3H_7$ | |
| 2-1-214 | $CH_2{=}CH$ | — | — | 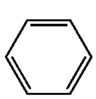 | 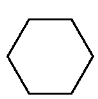 | — | 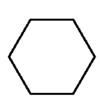 | $C_5H_{11}$ | |

TABLE 43-continued
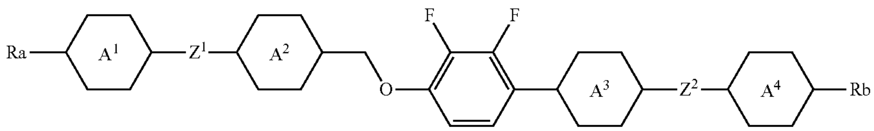
(2-1)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-215 | $CH_3CH{=}CH$ | — | — | 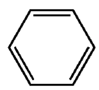 | 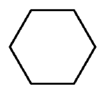 | — | 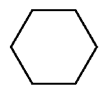 | $C_2H_5$ | |
| 2-1-216 | $CH_2{=}CHC_2H_4$ | — | — | 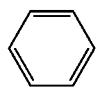 | 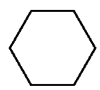 | — | 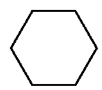 | $C_3H_7$ | |
| 2-1-217 | $C_3H_7CH{=}CH$ | — | — | 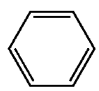 | 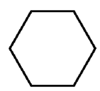 | — | 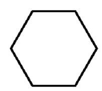 | $C_4H_9$ | |
| 2-1-218 | $CH_3CH{=}CHC_2H_4$ | — | — | 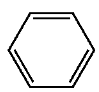 | 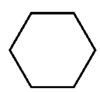 | — | 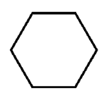 | $C_2H_5$ | |
| 2-1-219 | $C_3H_7$ | — | — | 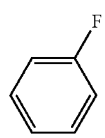  | 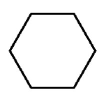 | — | 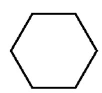 | $CH{=}CH_2$ | |
| 2-1-220 | $C_5H_{11}$ | — | — | 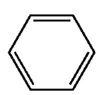 | 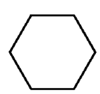 | — | 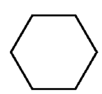 | $CH{=}CH_2$ | |
| 2-1-221 | $C_3H_7$ | — | — | 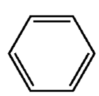 | 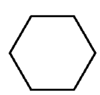 | — | 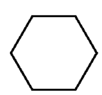 | $CH{=}CHCH_3$ | |
| 2-1-222 | $C_4H_9$ | — | — | 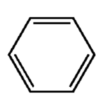 | 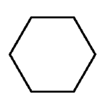 | — | 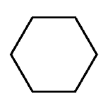 | $CH{=}CHCH_3$ | |
| 2-1-223 | $C_3H_7$ | — | — | 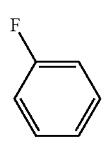  | 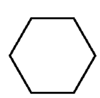 | — | 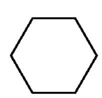 | $C_2H_4CH{=}CH_2$ | |
| 2-1-224 | $C_3H_7$ | — | — | 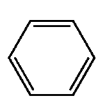 | 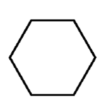 | — | 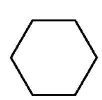 | $C_2H_4CH{=}CH_2$ | |
| 2-1-225 | $C_4H_9$ | — | — | 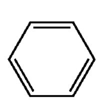 | 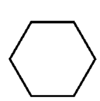 | — | 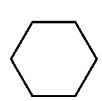 | $CH{=}CHC_3H_7$ | |

TABLE 44
(2-1)
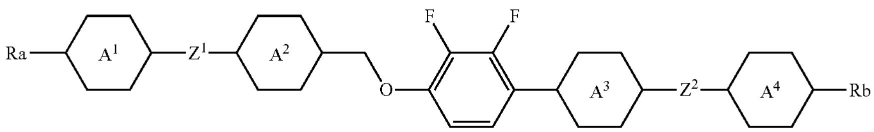
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-226 | $C_2H_5$ | — | — | 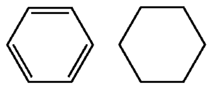 | | — | 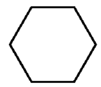 | $CH{=}CHC_3H_7$ | |
| 2-1-227 | $C_2H_5$ | — | — | 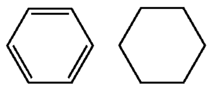 | | — | 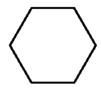 | $C_2H_4CH{=}CHCH_3$ | |
| 2-1-228 | $C_3H_7$ | — | — | 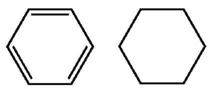 | | — | 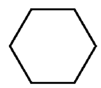 | $C_2H_4CH{=}CHCH_3$ | |
| 2-1-229 | $CH_2{=}CH$ | — | — | 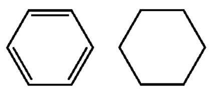 | | — | 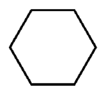 | $CH{=}CH_2$ | |
| 2-1-230 | $CH_3CH{=}CH$ | — | — | 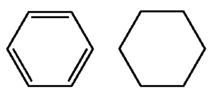 | | — | 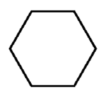 | $C_2H_4CH{=}CH_2$ | |
| 2-1-231 | $CH_3OCH_2$ | — | — | 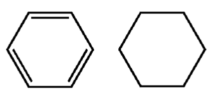 | | — | 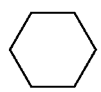 | $C_3H_7$ | |
| 2-1-232 | $C_2H_5$ | — | — | 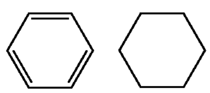 | | — | 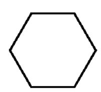 | $OC_2H_4CH{=}CH_2$ | |
| 2-1-233 | $C_5H_{11}$ | — | — | 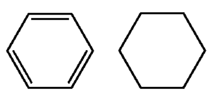 | | $CH_2CH_2$ | 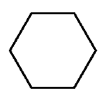 | $C_2H_5$ | |
| 2-1-234 | $C_5H_{11}$ | — | — | 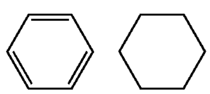 | | $CH_2CH_2$ | 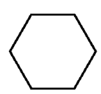 | $C_3H_7$ | |
| 2-1-235 | $C_2H_5$ | — | — | 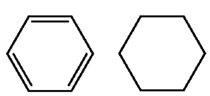 | | $CH_2O$ | 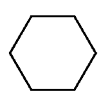 | $C_3H_7$ | |
| 2-1-236 | $C_3H_7$ | — | — | 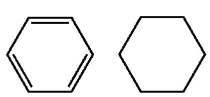 | | $OCH_2$ | 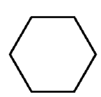 | $CH_3$ | |
| 2-1-237 | $C_5H_{11}$ | — | — | 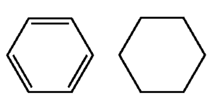 | | COO | 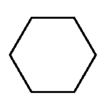 | $C_4H_9$ | |
| 2-1-238 | $C_2H_5$ | — | — | 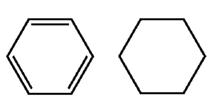 | | OCO | 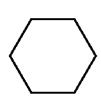 | $C_3H_7$ | |
| 2-1-239 | $C_2H_5$ | — | — | 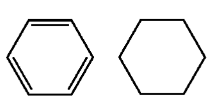 | | $CF_2O$ | 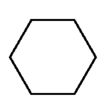 | $C_6H_{13}$ | |

TABLE 44-continued
(2-1)
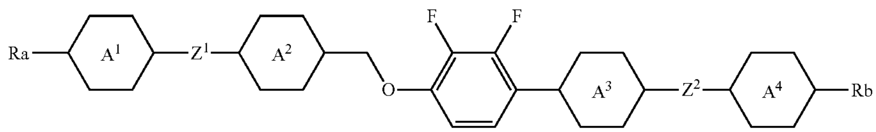
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-240 | $C_4H_9$ | — | — |  | 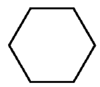 | $OCF_2$ | 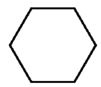 | $C_2H_5$ | |
TABLE 45
(2-1)
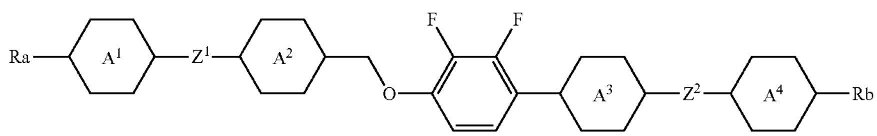
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-241 | $CH_3$ | — | — | 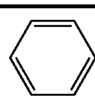 | 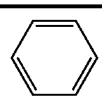 | — | 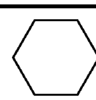 | $CH_3$ | |
| 2-1-242 | $CH_3$ | — | — | 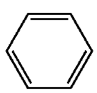 | 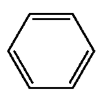 | — | 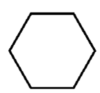 | $C_2H_5$ | |
| 2-1-243 | $CH_3$ | — | — | 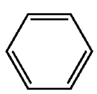 | 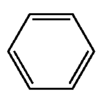 | — | 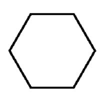 | $C_3H_7$ | |
| 2-1-244 | $CH_3$ | — | — | 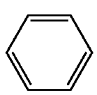 | 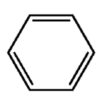 | — | 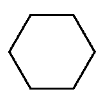 | $C_4H_9$ | |
| 2-1-245 | $CH_3$ | — | — | 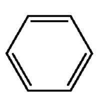 | 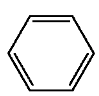 | — | 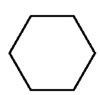 | $C_5H_{11}$ | |
| 2-1-246 | $C_2H_5$ | — | — | 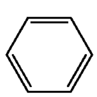 | 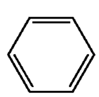 | — | 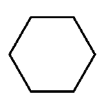 | $CH_3$ | |
| 2-1-247 | $C_2H_5$ | — | — | 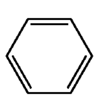 | 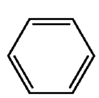 | — | 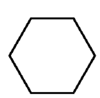 | $C_2H_5$ | |
| 2-1-248 | $C_2H_5$ | — | — | 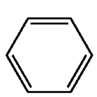 | 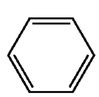 | — | 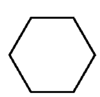 | $C_3H_7$ | |
| 2-1-249 | $C_2H_5$ | — | — | 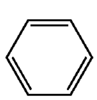 | 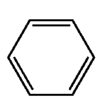 | — | 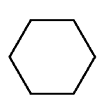 | $C_4H_9$ | |
| 2-1-250 | $C_2H_5$ | — | — | 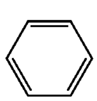 | 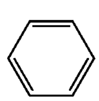 | — | 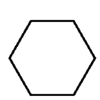 | $C_5H_{11}$ | |

TABLE 45-continued
(2-1)
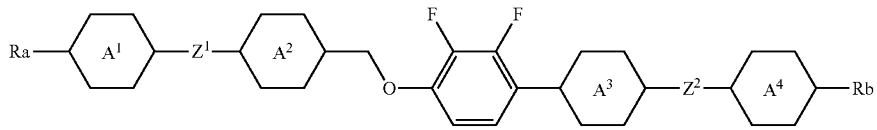
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-251 | $C_3H_7$ | — | — | 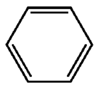 | 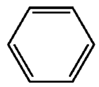 | — | 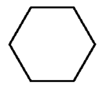 | $CH_3$ | |
| 2-1-252 | $C_3H_7$ | — | — |  | 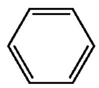 | — | 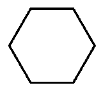 | $C_2H_5$ | |
| 2-1-253 | $C_3H_7$ | — | — |  | 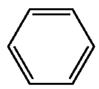 | — | 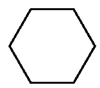 | $C_3H_7$ | |
| 2-1-254 | $C_3H_7$ | — | — | 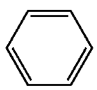 | 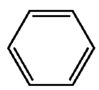 | — | 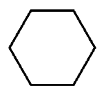 | $C_4H_9$ | |
| 2-1-255 | $C_3H_7$ | — | — |  | 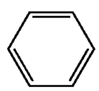 | — | 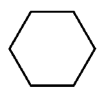 | $C_5H_{11}$ | |
TABLE 46
(2-1)
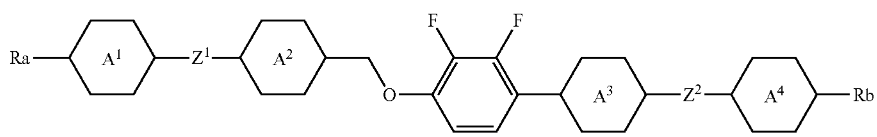
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-256 | $C_4H_9$ | — | — | 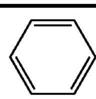 | 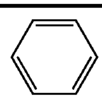 | — | 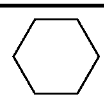 | $CH_3$ | |
| 2-1-257 | $C_4H_9$ | — | — | 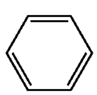 | 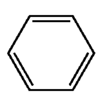 | — | 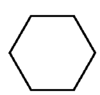 | $C_2H_5$ | |
| 2-1-258 | $C_4H_9$ | — | — | 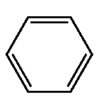 | 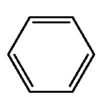 | — | 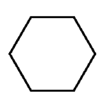 | $C_3H_7$ | |
| 2-1-259 | $C_4H_9$ | — | — | 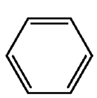 | 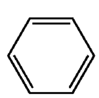 | — | 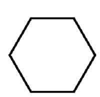 | $C_4H_9$ | |
| 2-1-260 | $C_4H_9$ | — | — | 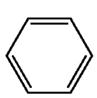 | 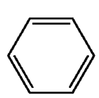 | — | 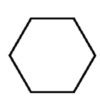 | $C_5H_{11}$ | |
| 2-1-261 | $C_5H_{11}$ | — | — | 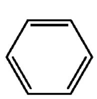 | 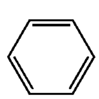 | — | 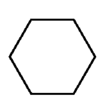 | $CH_3$ | |

TABLE 46-continued
(2-1)
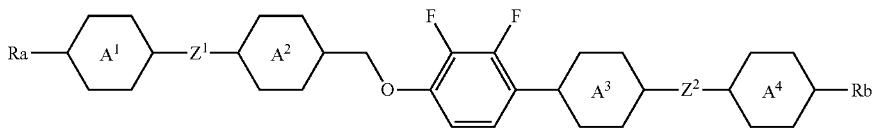
| No. | Ra | A1 | Z1 | A2 | A3 | Z2 | A4 | Rb | Physical property values |
|---|---|---|---|---|---|---|---|---|---|
| 2-1-262 | $C_5H_{11}$ | — | — | 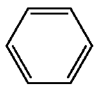 | 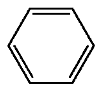 | — | 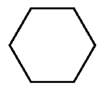 | $C_2H_5$ | |
| 2-1-263 | $C_5H_{11}$ | — | — |  |  | — | 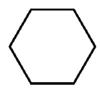 | $C_3H_7$ | |
| 2-1-264 | $C_5H_{11}$ | — | — | 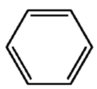 | 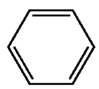 | — | 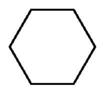 | $C_4H_9$ | |
| 2-1-265 | $C_5H_{11}$ | — | — | 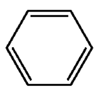 | 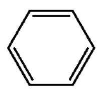 | — | 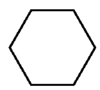 | $C_5H_{11}$ | |
| 2-1-266 | $C_2H_5O$ | — | — | 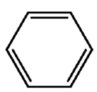 |  | — | 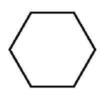 | $C_4H_9$ | |
| 2-1-267 | $C_5H_{11}$ | — | — |  | 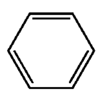 | — | 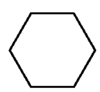 | $OC_2H_5$ | |
| 2-1-268 | $C_2H_5O$ | — | — | 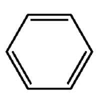 | 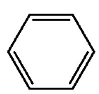 | — | 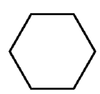 | $OC_4H_9$ | |
| 2-1-269 | $C_3H_7$ | — | — | 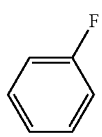 | 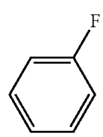 | — | 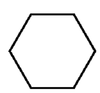 | $OC_4H_9$ | |
| 2-1-270 | $C_5H_{11}$ | — | — | 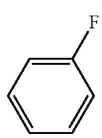 | 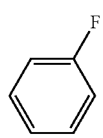 | — | 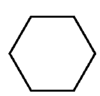 | $OC_2H_5$ | |
TABLE 47
(2-1)
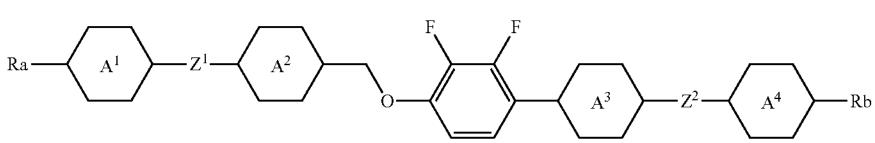
| No. | Ra | A1 | Z1 | A2 | A3 | Z2 | A4 | Rb | Physical property values |
|---|---|---|---|---|---|---|---|---|---|
| 2-1-271 | $C_3H_7$ | — | — | 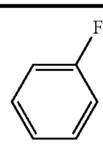 | 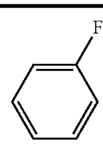 | — | 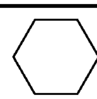 | $C_5H_{11}$ | |

TABLE 47-continued
(2-1)
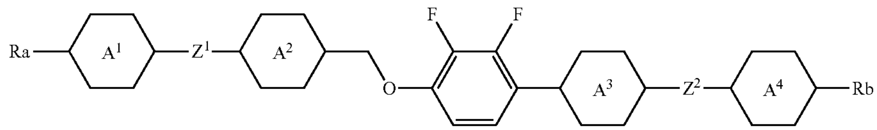
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-272 | $C_5H_{11}$ | — | — | 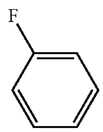 | 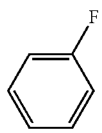 | — | 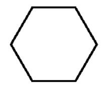 | $C_2H_5$ | |
| 2-1-273 | $C_4H_9O$ | — | — | 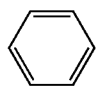 | 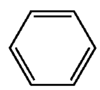 | — | 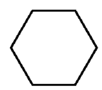 | $C_3H_7$ | |
| 2-1-274 | $CH_2{=}CH$ | — | — | 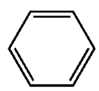 | 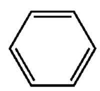 | — | 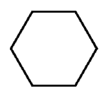 | $C_5H_{11}$ | |
| 2-1-275 | $CH_3CH{=}CH$ | — | — | 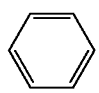 | 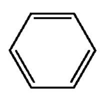 | — | 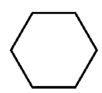 | $C_2H_5$ | |
| 2-1-276 | $C_3H_7CH{=}CH$ | — | — | 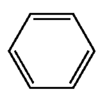 | 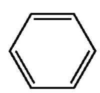 | — | 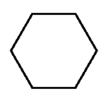 | $C_3H_7$ | |
| 2-1-277 | $CH_2{=}CHC_2H_4$ | — | — | 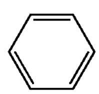 | 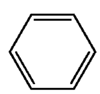 | — | 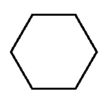 | $CH_3$ | |
| 2-1-278 | $CH_2{=}CHC_2H_4$ | — | — | 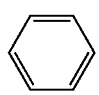 | 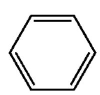 | — | 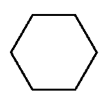 | $C_2H_5$ | |
| 2-1-279 | $CH_3CH{=}CHC_2H_4$ | — | — | 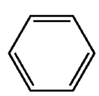 | 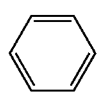 | — | 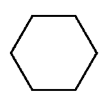 | $C_3H_7$ | |
| 2-1-280 | $CH_3CH{=}CHC_2H_4$ | — | — | 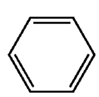 | 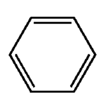 | — | 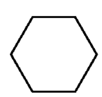 | $C_4H_9$ | |
| 2-1-281 | $C_3H_7$ | — | — | 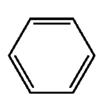 | 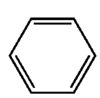 | — | 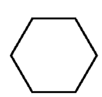 | $CH_2OC_3H_7$ | |
| 2-1-282 | $C_4H_9$ | — | — | 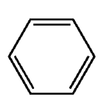 | 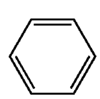 | — | 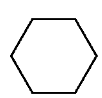 | $CH_2CH_2F$ | |
| 2-1-283 | $C_2H_5$ | — | — | 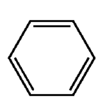 | 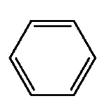 | — | 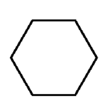 | $CH{=}CH_2$ | |
| 2-1-284 | $C_3H_7$ | — | — | 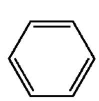 | 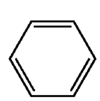 | — | 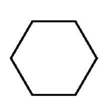 | $CH{=}CHCH_3$ | |

TABLE 47-continued
(2-1)
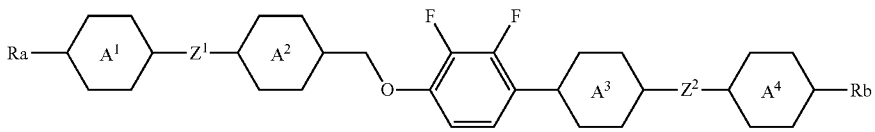
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-285 | $C_3H_7$ | — | — |  | 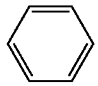 | — | 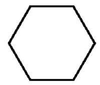 | $CH{=}CHC_3H_7$ | |
TABLE 48
(2-1)
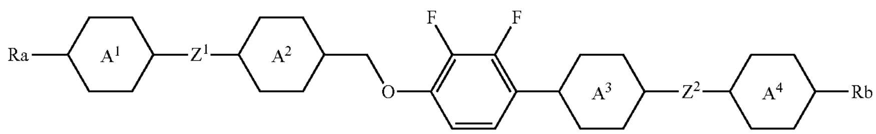
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-286 | $C_2H_5$ | — | — | 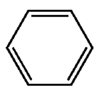 | 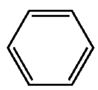 | — | 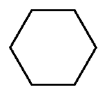 | $C_2H_4CH{=}CH_2$ | |
| 2-1-287 | $C_5H_{11}$ | — | — |  | 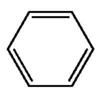 | — | 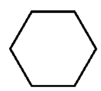 | $C_2H_4CH{=}CH_2$ | |
| 2-1-288 | $C_4H_9$ | — | — |  | 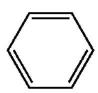 | — | 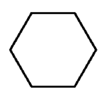 | $C_2H_4CH{=}CHCH_3$ | |
| 2-1-289 | $CH_2{=}CHC_2H_4$ | — | — |  | 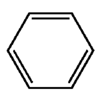 | — | 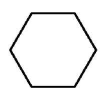 | $CH{=}CH_2$ | |
| 2-1-290 | $CH_3CH{=}CHC_2H_4$ | — | — | 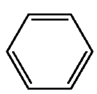 | 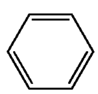 | — | 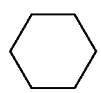 | $CH{=}CHCH_3$ | |
| 2-1-291 | $CH_3OCH_2CH_2$ | — | — | 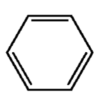 | 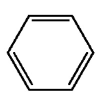 | — | 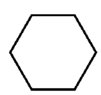 | $C_3H_7$ | |
| 2-1-292 | $C_3H_7$ | — | — | 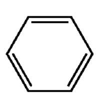 | 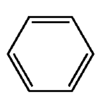 | — | 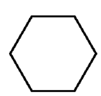 | $OC_2H_4CH{=}CH_2$ | |
| 2-1-293 | $C_5H_{11}$ | — | — | 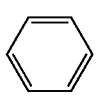 | 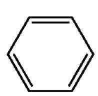 | $CH_2CH_2$ | 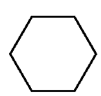 | $C_2H_5$ | |
| 2-1-294 | $C_5H_{11}$ | — | — | 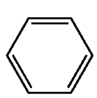 | 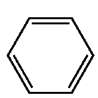 | $CH_2CH_2$ | 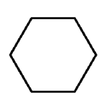 | $C_3H_7$ | |
| 2-1-295 | $C_3H_7$ | — | — | 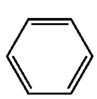 | 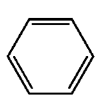 | $CH_2O$ | 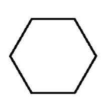 | $C_5H_{11}$ | |

TABLE 48-continued
(2-1)
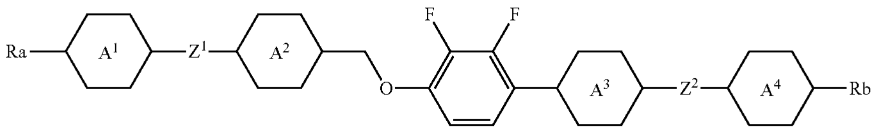
| No. | Ra | A¹ | Z¹ | A² | A³ | Z² | A⁴ | Rb | Physical property values |
|---|---|---|---|---|---|---|---|---|---|
| 2-1-296 | $C_2H_5$ | — | — |  | 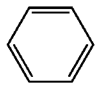 | $OCH_2$ | 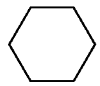 | $C_3H_7$ | |
| 2-1-297 | $C_4H_9$ | — | — |  | 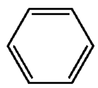 | COO | 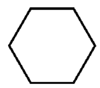 | $C_4H_9$ | |
| 2-1-298 | $C_3H_7$ | — | — |  | 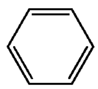 | OCO | 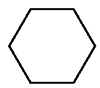 | $C_2H_5$ | |
| 2-1-299 | $C_{10}H_{21}$ | — | — | 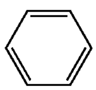 | 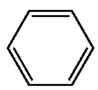 | $CF_2O$ | 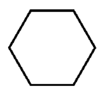 | $C_2H_5$ | |
| 2-1-300 | $CH_3$ | — | — |  | 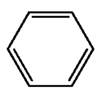 | $OCF_2$ | 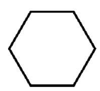 | $CH_3$ | |
TABLE 49
(2-1)
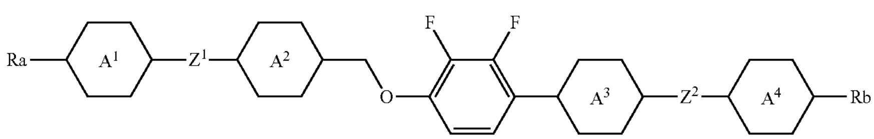
| No. | Ra | A¹ | Z¹ | A² | A³ | Z² | A⁴ | Rb | Physical property values |
|---|---|---|---|---|---|---|---|---|---|
| 2-1-301 | $CH_3$ | — | — | 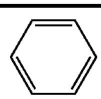 | 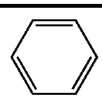 | — | 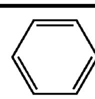 | $CH_3$ | |
| 2-1-302 | $CH_3$ | — | — | 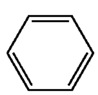 | 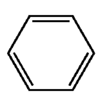 | — | 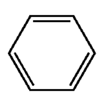 | $C_2H_5$ | |
| 2-1-303 | $CH_3$ | — | — | 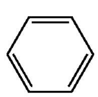 | 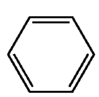 | — | 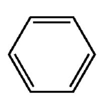 | $C_3H_7$ | |
| 2-1-304 | $CH_3$ | — | — | 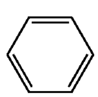 | 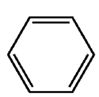 | — | 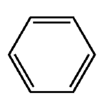 | $C_4H_9$ | |
| 2-1-305 | $CH_3$ | — | — | 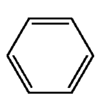 | 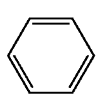 | — | 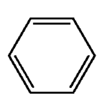 | $C_5H_{11}$ | |
| 2-1-306 | $C_2H_5$ | — | — | 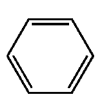 | 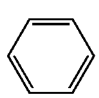 | — | 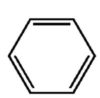 | $CH_3$ | |

TABLE 49-continued
(2-1)
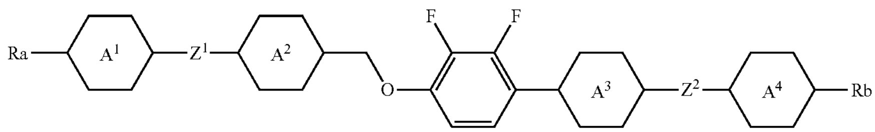
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-307 | $C_2H_5$ | — | — | 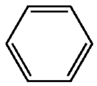 | 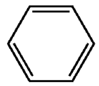 | — | 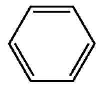 | $C_2H_5$ | |
| 2-1-308 | $C_2H_5$ | — | — |  | 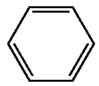 | — | 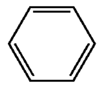 | $C_3H_7$ | |
| 2-1-309 | $C_2H_5$ | — | — | 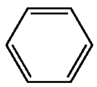 | 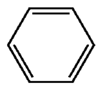 | — | 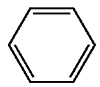 | $C_4H_9$ | |
| 2-1-310 | $C_2H_5$ | — | — |  |  | — |  | $C_5H_{11}$ | |
| 2-1-311 | $C_3H_7$ | — | — |  | 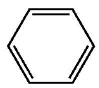 | — | 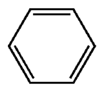 | $CH_3$ | |
| 2-1-312 | $C_3H_7$ | — | — | 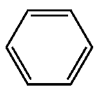 | 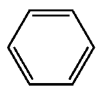 | — |  | $C_2H_5$ | |
| 2-1-313 | $C_3H_7$ | — | — |  | 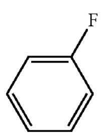 | — | 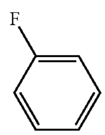 | $C_3H_7$ | |
| 2-1-314 | $C_3H_7$ | — | — | 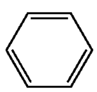 | 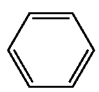 | — | 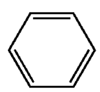 | $C_4H_9$ | |
| 2-1-315 | $C_3H_7$ | — | — | 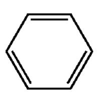 | 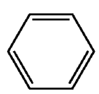 | — | 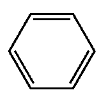 | $C_5H_{11}$ | |
TABLE 50
(2-1)
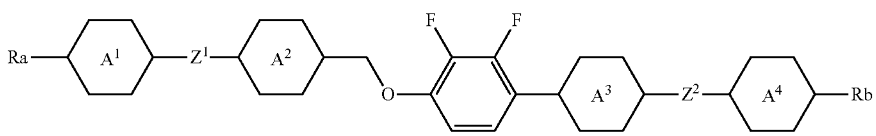
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-316 | $C_4H_9$ | — | — | 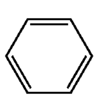 | 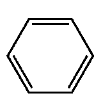 | — | 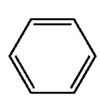 | $CH_3$ | |

TABLE 50-continued
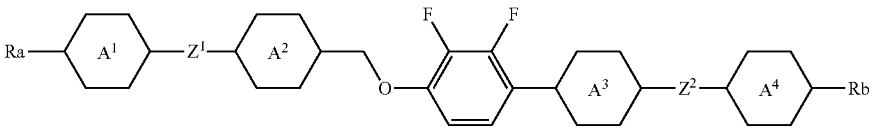
(2-1)
| No. | Ra | A1 | Z1 | A2 | A3 | Z2 | A4 | Rb | Physical property values |
|---|---|---|---|---|---|---|---|---|---|
| 2-1-317 | $C_4H_9$ | — | — | 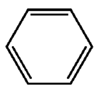 |  | — | 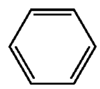 | $C_2H_5$ | |
| 2-1-318 | $C_4H_9$ | — | — | 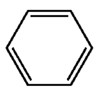 | 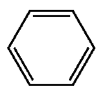 | — | 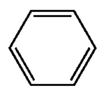 | $C_3H_7$ | |
| 2-1-319 | $C_4H_9$ | — | — |  |  | — | 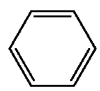 | $C_4H_9$ | |
| 2-1-320 | $C_4H_9$ | — | — |  | 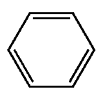 | — | 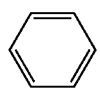 | $C_5H_{11}$ | |
| 2-1-321 | $C_5H_{11}$ | — | — | 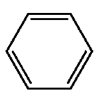 | 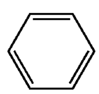 | — | 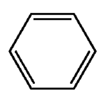 | $CH_3$ | |
| 2-1-322 | $C_5H_{11}$ | — | — | 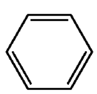 | 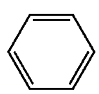 | — | 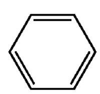 | $C_2H_5$ | |
| 2-1-323 | $C_5H_{11}$ | — | — | 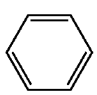 | 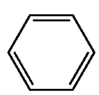 | — | 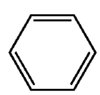 | $C_3H_7$ | |
| 2-1-324 | $C_5H_{11}$ | — | — | 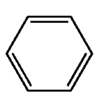 | 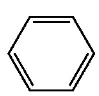 | — | 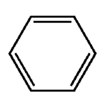 | $C_4H_9$ | |
| 2-1-325 | $C_5H_{11}$ | — | — | 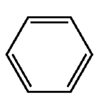 | 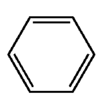 | — | 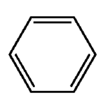 | $C_5H_{11}$ | |
| 2-1-326 | $C_2H_5O$ | — | — | 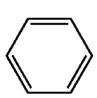 | 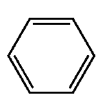 | — | 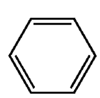 | $C_4H_9$ | |
| 2-1-327 | $C_5H_{11}$ | — | — | 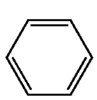 | 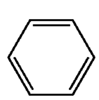 | — | 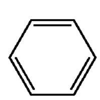 | $OC_2H_5$ | |
| 2-1-328 | $C_2H_5O$ | — | — | 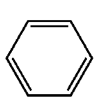 | 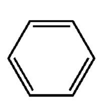 | — | 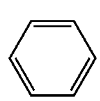 | $OC_4H_9$ | |
| 2-1-329 | $C_3H_7$ | — | — | 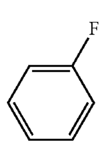 | 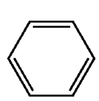 | — | 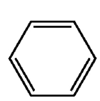 | $OC_4H_9$ | |

TABLE 50-continued
(2-1)
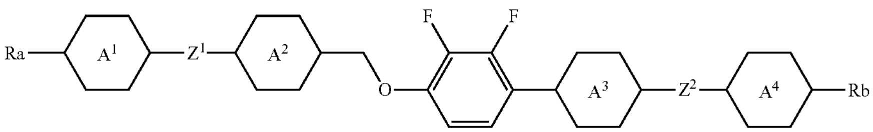
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-330 | $C_5H_{11}$ | — | — |  |  | — | 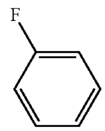 | $OC_2H_5$ | |
TABLE 51
(2-1)
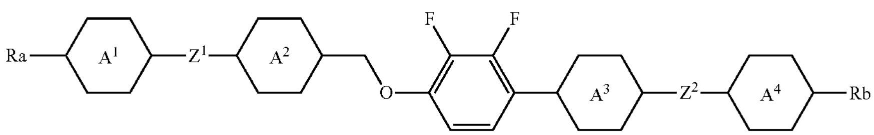
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-331 | $C_3H_7$ | — | — |  | 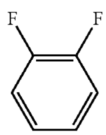 | — | 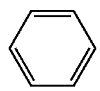 | $C_5H_{11}$ | |
| 2-1-332 | $C_3H_7O$ | — | — | 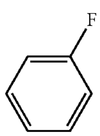 | 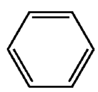 | — | 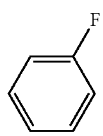 | $OC_2H_5$ | |
| 2-1-333 | $C_5H_{11}$ | — | — | 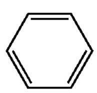 | 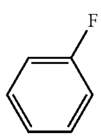 | — | 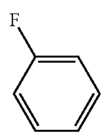 | $OC_2H_5$ | |
| 2-1-334 | $C_2H_5O$ | — | — | 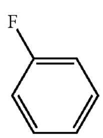 | 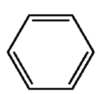 | — | 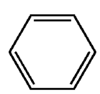 | $C_5H_{11}$ | |
| 2-1-335 | $C_4H_9$ | — | — | 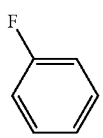 | 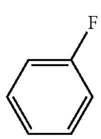 | — | 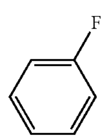 | $C_2H_5$ | |
| 2-1-336 | $C_2H_5O$ | — | — | 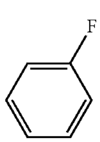 | 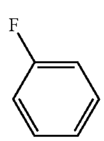 | — | 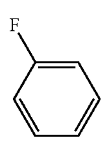 | $OC_4H_9$ | |
| 2-1-337 | $CH_2{=}CH$ | — | — | 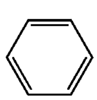 | 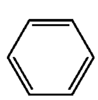 | — | 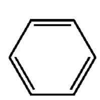 | $CH_3$ | |

TABLE 51-continued
(2-1)
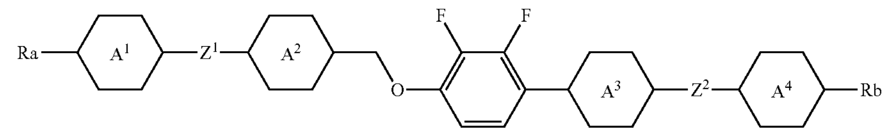
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-338 | $CH_3CH{=}CH$ | — | — | 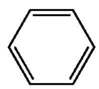 | 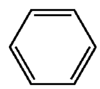 | — | 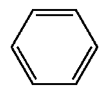 | $C_2H_5$ | |
| 2-1-339 | $CH_2{=}CHC_2H_4$ | — | — | 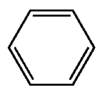 | 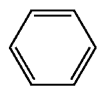 | — | 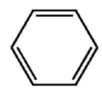 | $C_3H_7$ | |
| 2-1-340 | $C_3H_7CH{=}CH$ | — | — | 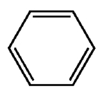 | 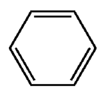 | — | 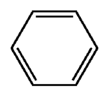 | $C_4H_9$ | |
| 2-1-341 | $CH_3CH{=}CHC_2H_4$ | — | — | 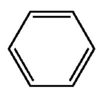 | 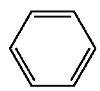 | — | 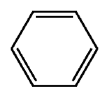 | $CH_3$ | |
| 2-1-342 | $C_4H_9$ | — | — | 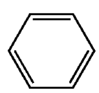 | 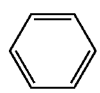 | — | 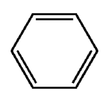 | $CH{=}CH_2$ | |
| 2-1-343 | $C_2H_5$ | — | — | 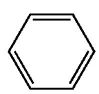 | 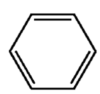 | — | 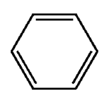 | $CH{=}CHCH_3$ | |
| 2-1-344 | $C_3H_7$ | — | — | 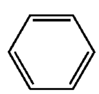 | 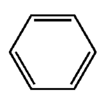 | — | 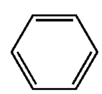 | $CH{=}CHC_3H_7$ | |
| 2-1-345 | $C_3H_7$ | — | — | 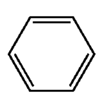 | 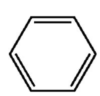 | — | 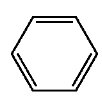 | $C_2H_4CH{=}CH_2$ | |
TABLE 52
(2-1)
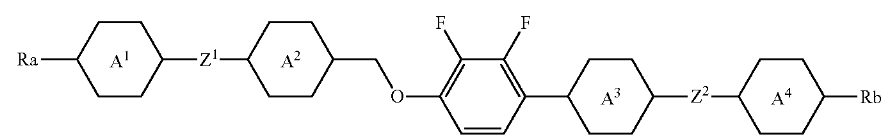
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-346 | $C_2H_5$ | — | — | 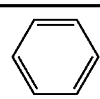 | 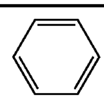 | — | 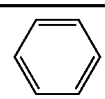 | $C_2H_4CH{=}CH_2$ | |
| 2-1-347 | $C_5H_{11}$ | — | — | 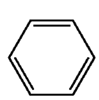 | 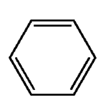 | — | 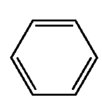 | $C_2H_4CH{=}CHCH_3$ | |
| 2-1-348 | $C_3H_7$ | — | — | 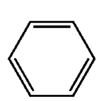 | 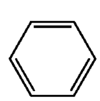 | — | 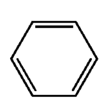 | $C_2H_4CH{=}CHCH_3$ | |

TABLE 52-continued
(2-1)
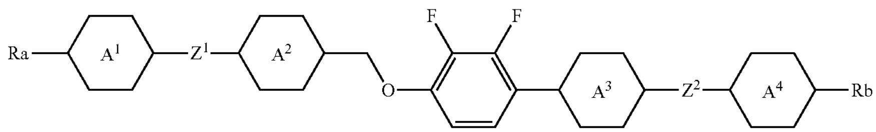
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-349 | $CH_3CH{=}CHC_2H_4$ | — | — | 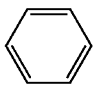 | 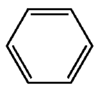 | — | 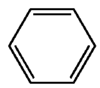 | $C_2H_4CH{=}CH_2$ | |
| 2-1-350 | $CH_2{=}CHC_2H_4$ | — | — | 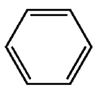 |  | — | 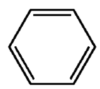 | $C_2H_4CH{=}CHCH_3$ | |
| 2-1-351 | $C_4H_9OCH_2$ | — | — |  | 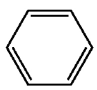 | — | 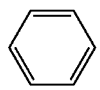 | $C_3H_7$ | |
| 2-1-352 | $C_3H_7$ | — | — |  | 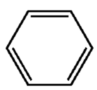 | — | 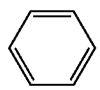 | $OC_2H_4CH{=}CH_2$ | |
| 2-1-353 | $C_3H_7$ | — | — |  | 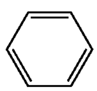 | $CH_2CH_2$ | 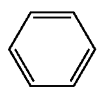 | $C_2H_5$ | |
| 2-1-354 | $C_2H_5$ | — | — | 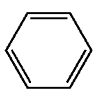 |  | $CH_2CH_2$ | 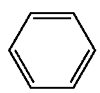 | $C_3H_7$ | |
| 2-1-355 | $C_3H_7$ | — | — | 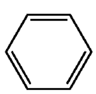 | 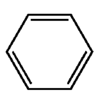 | $CH_2O$ | 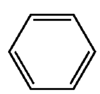 | $C_2H_5$ | |
| 2-1-356 | $C_2H_5$ | — | — | 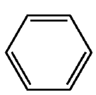 | 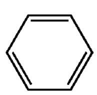 | $OCH_2$ | 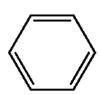 | $C_3H_7$ | |
| 2-1-357 | $C_4H_9O$ | — | — | 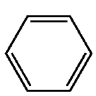 | 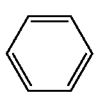 | COO | 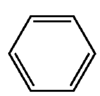 | $C_4H_9$ | |
| 2-1-358 | $C_3H_7$ | — | — | 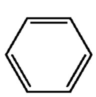 | 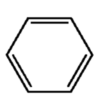 | OCO | 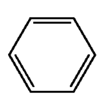 | $C_7H_{15}$ | |
| 2-1-359 | $C_2H_5$ | — | — | 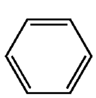 | 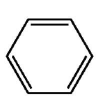 | $CF_2O$ | 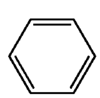 | $C_4H_9$ | |
| 2-1-360 | $CH_3$ | — | — | 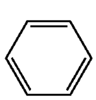 | 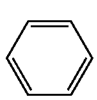 | $OCF_2$ | 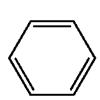 | $C_2H_5$ | |

TABLE 53
(2-1)
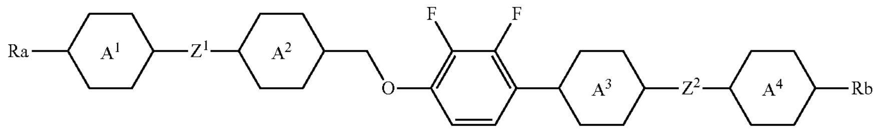
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-361 | $C_3H_7$ | — | — | 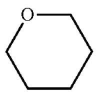 | 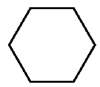 | — | 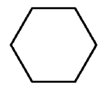 | $C_5H_{11}$ | |
| 2-1-362 | $C_5H_{11}$ | — | — | 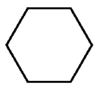 | 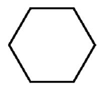 | — | 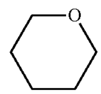 | $C_2H_5$ | |
| 2-1-363 | $CH_3$ | — | — | 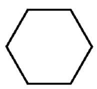 | 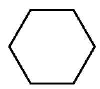 | — | 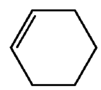 | $C_3H_7$ | |
| 2-1-364 | $C_4H_9$ | — | — | 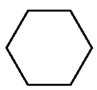 | 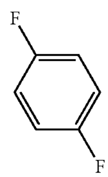 | — | 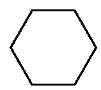 | $C_2H_5$ | |
| 2-1-365 | $C_5H_{11}$ | — | — | 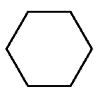 | 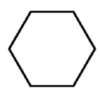 | — | 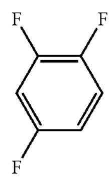 | $OC_4H_9$ | |
| 2-1-366 | $CH_3$ | — | — | 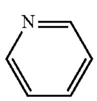 | 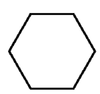 | CH═CH | 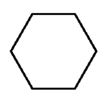 | $C_2H_5$ | |
| 2-1-367 | $C_2H_5$ | — | — | 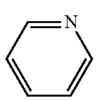 | 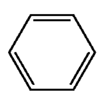 | — | 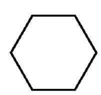 | $C_3H_7$ | |
| 2-1-368 | $C_2H_5$ | — | — | 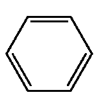 | 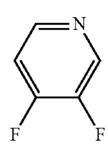 | — | 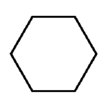 | $C_3H_7$ | |
| 2-1-369 | $C_3H_7O$ | — | — | 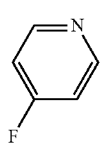 | 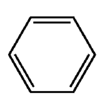 | — | 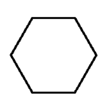 | $C_4H_9$ | |
| 2-1-370 | $C_2H_5$ | — | — | 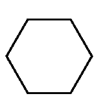 | 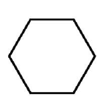 | — | 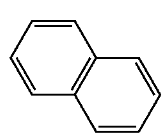 | $C_5H_{11}$ | |

TABLE 53-continued
(2-1)
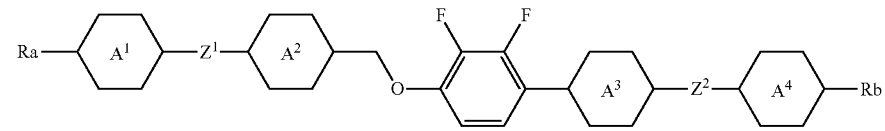
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-371 | $C_3H_7$ | — | — | 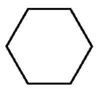 | 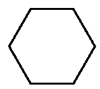 | — | 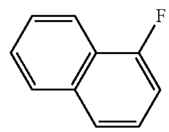 | $C_4H_9$ | |
| 2-1-372 | $C_3H_7$ | — | — | 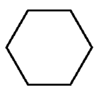 | 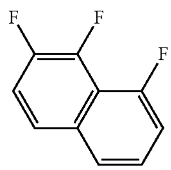 | — | 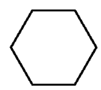 | $C_2H_5$ | |
| 2-1-373 | $C_2H_5$ | — | — | 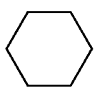 | 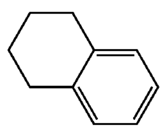 | — | 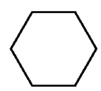 | $C_5H_{11}$ | |
| 2-1-374 | $C_3H_7$ | — | — | 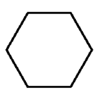 | 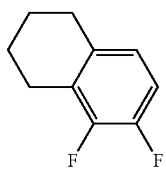 | — | 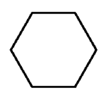 | $C_4H_9$ | |
| 2-1-375 | $C_3H_7$ | — | — | 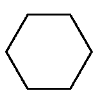 | 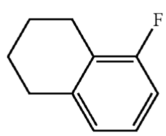 | — | 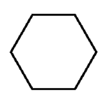 | $C_5H_{11}$ | |
TABLE 54
(2-1)
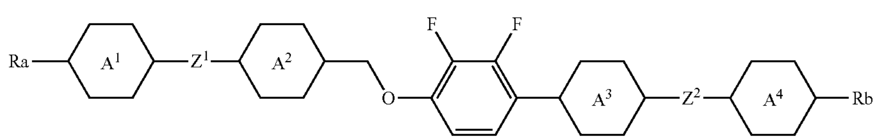
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-376 | $C_4H_9$ | — | — | 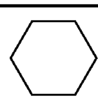 | 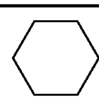 | — | 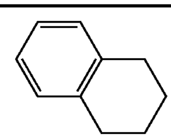 | $C_5H_{11}$ | |
| 2-1-377 | $C_5H_{11}$ | — | — | 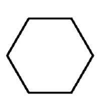 | 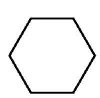 | — | 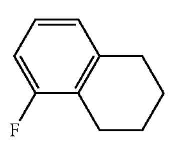 | $C_2H_5$ | |

TABLE 54-continued
(2-1)
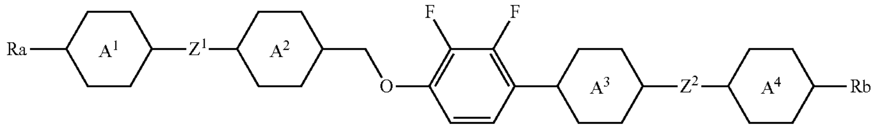
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-378 | $C_4H_9$ | — | — | 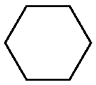 | 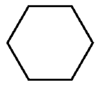 | — | 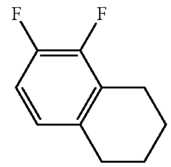 | $C_3H_7$ | |
| 2-1-379 | $C_4H_9$ | — | — | 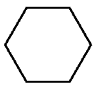 | 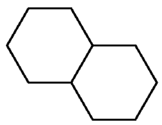 | — | 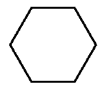 | $C_4H_9$ | |
| 2-1-380 | $C_4H_9$ | — | — | 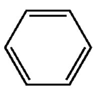 | 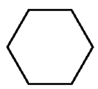 | — | 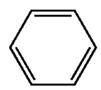 | $C_5H_{11}$ | |
| 2-1-381 | $C_5H_{11}$ | — | — | 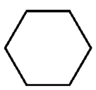 | 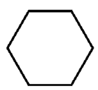 | — | 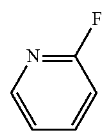 | $OC_4H_9$ | |
| 2-1-382 | $C_5H_{11}$ | — | — | 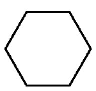 | 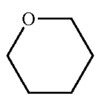 | — | 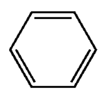 | $C_2H_5$ | |
| 2-1-383 | $C_5H_{11}$ | — | — | 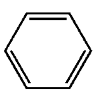 | 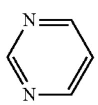 | — | 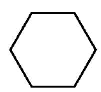 | $C_3H_7$ | |
| 2-1-384 | $C_5H_{11}$ | — | — | 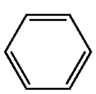 | 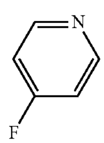 | — | 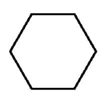 | $C_4H_9$ | |
| 2-1-385 | $CH_3O$ | — | — | 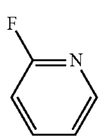 | 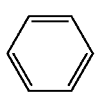 | — | 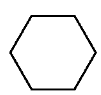 | $C_5H_{11}$ | |
| 2-1-386 | $C_2H_5O$ | — | — | 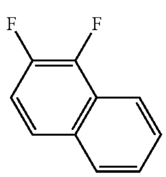 | 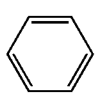 | — | 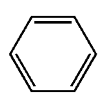 | $C_4H_9$ | |
| 2-1-387 | $C_5H_{11}$ | — | — | 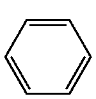 | 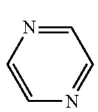 | $(CH_2)_4$ | 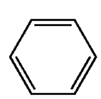 | $CH_3$ | |

TABLE 54-continued
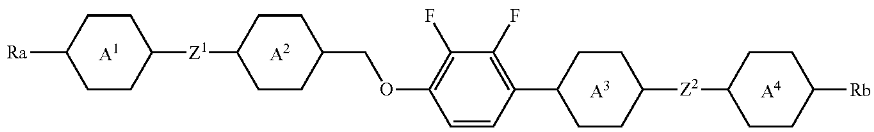
(2-1)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-388 | $C_4H_9O$ | — | — | 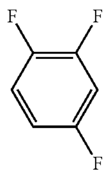 | 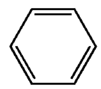 | — | 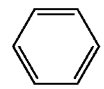 | $C_5H_{11}$ | |
| 2-1-389 | $C_5H_{11}$ | — | — | 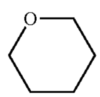 | 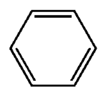 | — | 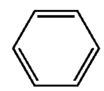 | $C_3H_7$ | |
| 2-1-390 | $C_3H_7$ | — | — | 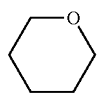 | 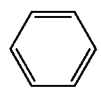 | — | 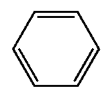 | $C_5H_{11}$ | |
TABLE 55
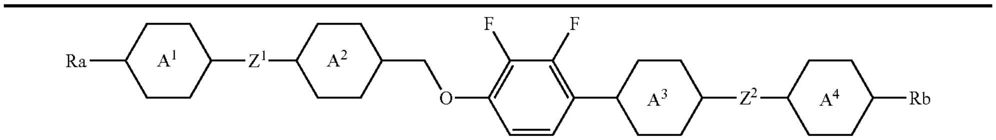
(2-1)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-391 | $C_3H_7$ | 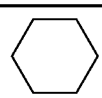 | — | 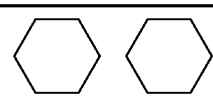 | | — | 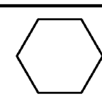 | $C_5H_{11}$ | |
| 2-1-392 | $C_5H_{11}$ | 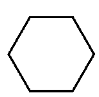 | — | 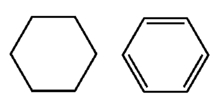 | | — | 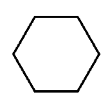 | $C_3H_7$ | |
| 2-1-393 | $C_3H_7$ | 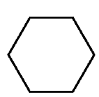 | — | 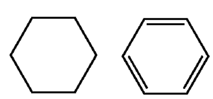 | | — | 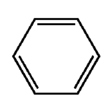 | $C_5H_{11}$ | |
| 2-1-394 | $C_5H_{11}$ | 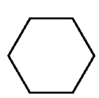 | — | 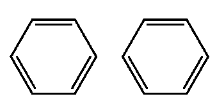 | | — | 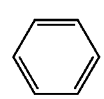 | $C_3H_7$ | |
| 2-1-395 | $C_3H_7$ | 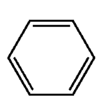 | — | 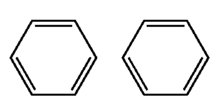 | | — | 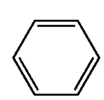 | $C_5H_{11}$ | |
| 2-1-396 | $C_5H_{11}$ | 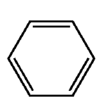 | — | 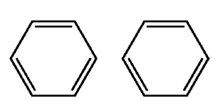 | | — | 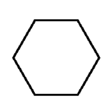 | $C_3H_7$ | |
| 2-1-397 | $C_3H_7$ | 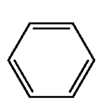 | — | 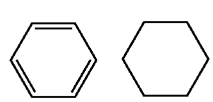 | | — | 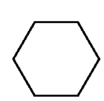 | $C_5H_{11}$ | |

TABLE 55-continued
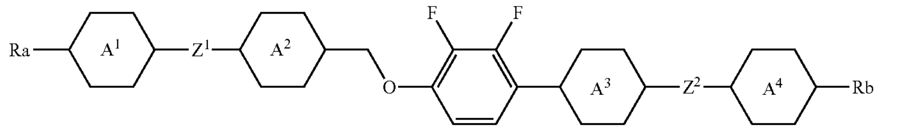
(2-1)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-398 | $C_3H_7$ | 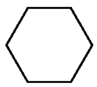 | — | 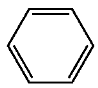 | 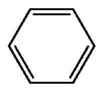 | — | 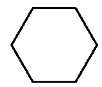 | $C_2H_5$ | |
| 2-1-399 | $C_3H_7$ | 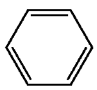 | — | 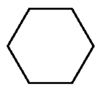 | 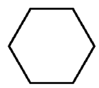 | — | 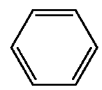 | $C_5H_{11}$ | |
| 2-1-400 | $C_5H_{11}$ | 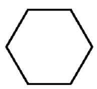 | $CH_2CH_2$ | 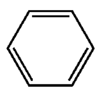 | 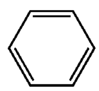 | — | 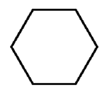 | $C_3H_7$ | |
| 2-1-401 | $C_3H_7$ | 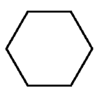 | $CH_2CH_2$ | 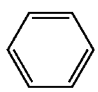 | 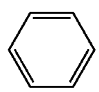 | — | 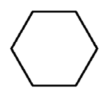 | $C_5H_{11}$ | |
| 2-1-402 | $C_5H_{11}$ | 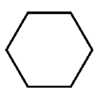 | — | 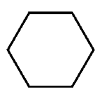 | 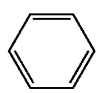 | $CH_2CH_2$ | 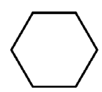 | $C_3H_7$ | |
| 2-1-403 | $C_3H_7$ | 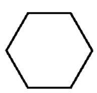 | — | 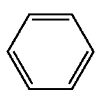 | 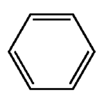 | $CH_2CH_2$ | 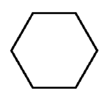 | $C_5H_{11}$ | |
| 2-1-404 | $C_5H_{11}$ | 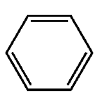 | — | 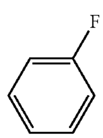 | 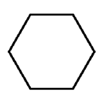 | — | 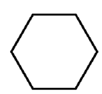 | $C_3H_7$ | |
| 2-1-405 | $C_3H_7$ | 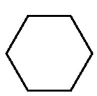 | — | 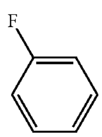 | 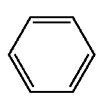 | — | 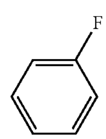 | $C_5H_{11}$ | |
TABLE 56
(2-1)
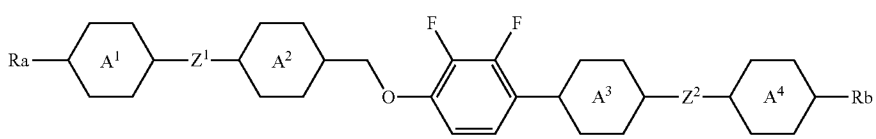
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-406 | $C_5H_{11}$ | 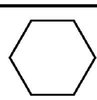 | — | 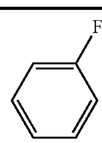 | 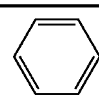 | — | 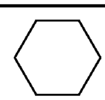 | $C_3H_7$ | |

TABLE 56-continued (2-1)

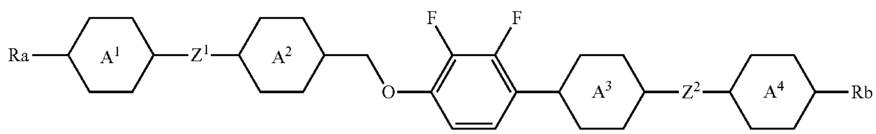

| No. | Ra | $A^1$ | $Z^1$ | $A^2$ | $A^3$ | $Z^2$ | $A^4$ | Rb | Physical property values |
|---|---|---|---|---|---|---|---|---|---|
| 2-1-407 | $C_3H_7$ | 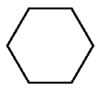 | — | 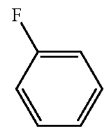 | 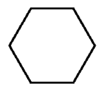 | — | 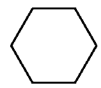 | $C_5H_{11}$ | |
| 2-1-408 | $C_3H_7$ | 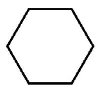 | — | 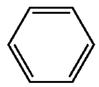 | 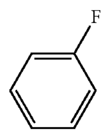 | — | 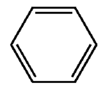 | $C_5H_{11}$ | |
| 2-1-409 | $C_3H_7$ | 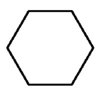 | — | 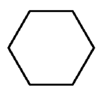 | 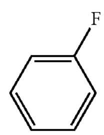 | — | 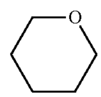 | $C_5H_{11}$ | |
| 2-1-410 | $C_3H_7$ | 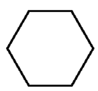 | — | 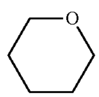 | 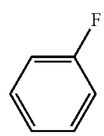 | — | 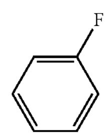 | $C_5H_{11}$ | |

Example 9

Synthesis of 4-(4-pentylcyclohexyl)benzoic acid 2,3-difluoro-4'-propylbiphenyl-4-ylester (No. 1-2-263)

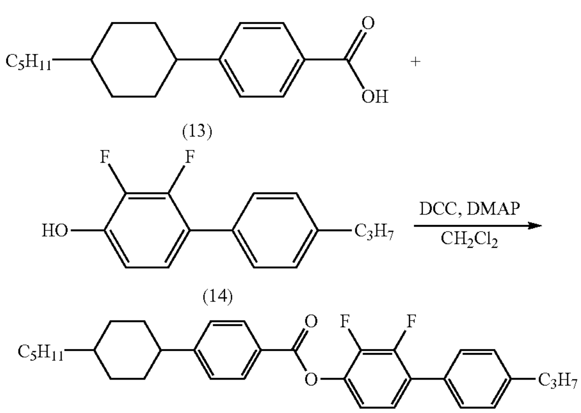

(No. 1-2-263)

Under a nitrogen atmosphere, 4-(4-trans-4-pentylcyclohexyl benzoic acid (13) (3.3 g), 2,3-difluoro-4'-propylbiphenyl-4-ol (14) (3.0 g), 1,3-dicyclocarbodiimide (DCC) (2.6 g), and 4-dimethylaminopyridine (DMAP) (0.15 g) were put in methylene chloride ($CH_2Cl_2$) (30 ml), and stirred at 25° C. for another 20 hours. After completion of the reaction had been confirmed by means of gas chromatographic analysis, methylene chloride (20 ml) and water (50 ml) were added, and mixed. Then, the mixture was allowed to stand until it had separated into an organic phase and an aqueous phase, and an extractive operation into an organic phase was carried out. The organic phase obtained was fractionated, washed with water, and dried over anhydrous magnesium sulfate. The residue obtained was purified with a fractional operation by means of column chromatography using toluene as the eluent and silica gel as the stationary phase powder. The residue obtained was further purified by recrystallization from a mixed solvent of heptane and THF (volume ratio; heptane: THF=2:1), and dried, giving 4.6 g of 4-(trans-4-pentylcyclohexyl)benzoic acid 2,3-difluoro-4'-propylbiphenyl-4-ylester (No. 1-2-263). The yield based on the compound (13) was 75.1%.

The compound (14) can be synthesized according to a procedure similar to that for 3-chloro-2-fluoro-4'-propylbiphenyl-4-ol, which is described in WO 2006/093189 A, by use of 1-bromo-2,3-difluoro-4-methoxybenzene as a starting material.

Chemical shifts δ (ppm) in $^1H$-NMR analysis were described below, and the compound obtained was identified as 4-(trans-4-pentylcyclohexyl)benzoic acid 2,3-difluoro-4'-propylbiphenyl-4-ylester. The measurement solvent was $CDCl_3$.

Chemical shift δ (ppm); 8.14(d, 2H), 7.46(d, 2H), 7.36(d, 2H), 7.27(d, 2H), 7.21(t, 1H), 7.08(t, 1H), 2.64(t, 2H), 2.57(tt, 1H), 1.93-1.89(t, 4H), 1.73-1.65(m, 2H), 1.49(qt, 2H), 1.37-1.22(m, 9H), 1.07(qt, 2H), 0.98(t, 3H), and 0.90(t, 3H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), and the optical anisotropy ($\Delta n$). The physical property-values of the compound (No. 1-2-263) were as follows.

Transition temperature: Cr 122.5 N 289.8 Iso.

$T_{NI}$=232.6° C., $\Delta\epsilon$=−2.0, $\Delta n$=0.219.

Example 10

Synthesis of trans-4-pentylcyclohexanecarboxylic acid 2,3-difluoro-4-(trans-4'-propylbicyclohexyl-trans-4-yl)phenylester (No. 2-2-23)

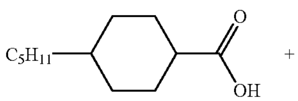

(15)

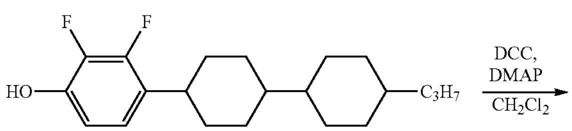

(10)

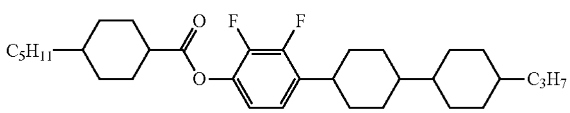

(No. 2-2-23)

Under a nitrogen atmosphere, trans-4-pentylcyclohexyl carboxylic acid (15) (2.2 g), the compound (10) (3.7 g), 1,3-dicyclocarbodiimide (2.3 g), and 4-dimethylaminopyridine (0.14 g) were put in methylene chloride ($CH_2Cl_2$) (30 ml), and stirred at 25° C. for another 4 hours. After completion of the reaction had been confirmed by means of gas chromatographic analysis, methylene chloride (20 ml) and water (50 ml) were added, and mixed. Then, the mixture was allowed to stand until it had separated into an organic phase and an aqueous phase, and an extractive operation into an organic phase was carried out. The organic phase obtained was fractionated, washed with water, and dried over anhydrous magnesium sulfate. The solution obtained was concentrated under reduced pressure, and the residue was purified with a fractional operation by means of column chromatography using toluene as the eluent and silica gel as the stationary phase powder. The residue obtained was further purified by recrystallization from a mixed solvent of heptane and THF (volume ratio; heptane:THF=2:1), and dried, giving 3.4 g of trans-4-pentylcyclohexanecarboxylic acid 2,3-difluoro-4-(trans-4'-propylbicyclohexyl-trans-4-yl)phenylester (No. 2-2-23). The yield based on the compound (15) was 58.8%.

Chemical shifts δ (ppm) in $^1$H-NMR analysis were described below, and the compound obtained was identified as trans-4-pentylcyclohexanecarboxylicacid 2,3-difluoro-4-(trans-4'-propylbicyclohexyl-trans-4-yl)phenylester. The measurement solvent was $CDCl_3$.

Chemical shift δ (ppm); 6.93(t, 1H), 6.80(t, 1H), 2.78(tt, 1H), 2.52(tt, 1H), 2.14(d, 2H), 1.89-1.83(m, 6H), 1.77-1.72 (m, 4H), 1.58-1.52(m, 2H), 1.46-1.39(m, 2H), 1.35-0.93(m, 22H), and 0.90-0.84(m, 8H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\epsilon$), and the optical anisotropy ($\Delta n$). The physical property-values of the compound (No. 2-2-23) were as follows.

Transition temperature: Cr 84.5 SmA 187.8 N 310.3 Iso.

$T_{NI}$=251.9° C., $\Delta\epsilon$=−3.2, $\Delta n$=0.114.

Example 11

Synthesis of 4-(trans-4-propylcyclohexyl)benzoic acid 4'-(trans-4-ethylcyclohexyl)-2,3-difluorobiphenyl-4-yl ester (No. 2-2-398)

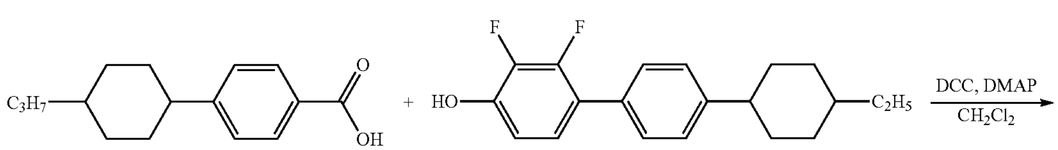

(16) (17)

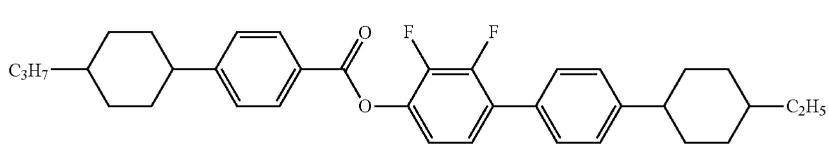

(No. 2-2-398)

4-(trans-4-Propylcyclohexyl)benzoic acid 4'-(trans-4-ethylcyclohexyl)-2,3-difluorobiphenyl-4-yl ester (No. 2-2-398) can be synthesized by selecting 4-(trans-4-propylcyclohexyl) benzoic acid (16) as benzoic acid and 4'-(trans-4-ethylcyclohexyl)-2,3-difluorobiphenyl-4-ol (17) as a phenol derivative, and applying a similar technique as that shown in Example 7 or 9.

Example 12

A variety of compounds were synthesized according to the procedure shown in Examples 9, 10, and 11, using corresponding starting materials, and the compounds were confirmed to be objective.

trans-4'-Pentylbicyclohexyl-trans-4-carboxylic acid 2,3-difluoro-4-(trans-4-propylcyclohexyl)phenylester (No. 1-2-23)

(No. 1-2-23)

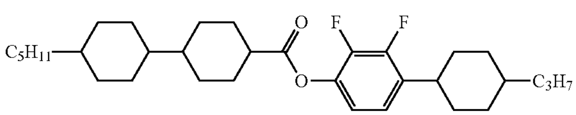

Chemical shift δ (ppm); 6.93(t, 1H), 6.80(t, 1H), 2.80(tt, 1H), 2.50(tt, 1H), 2.16(d, 2H), 1.86-1.70(m, 10H), 1.58-1.41 (m, 4H), 1.38-0.94(m, 22H), and 0.91-0.81(m, 8H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-2-23) were as follows.

Transition temperature: Cr 55.2 SmC 74.9 SmA 179.6 N 307.2 Iso.

$T_{NI}$=255.9° C., Δ∈=−3.6, Δn=0.114.

trans-4'-Pentylbicyclohexyl-trans-4-carboxylic acid 2,3-difluoro-4-(trans-4-ethoxycyclohexyl)phenylester (No. 1-2-27)

(No. 1-2-27)

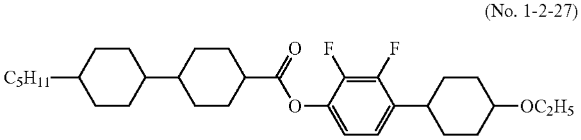

Chemical shift delta (ppm); 6.92(t, 1H), 6.81(t, 1H), 3.55 (q, 2H), 3.29(tt, 1H), 2.81(tt, 1H), 2.50(tt, 1H), 2.16(d, 4H), 1.95-1.82(m, 4H), 1.80-1.68(m, 4H), 1.59-1.44(m, 4H), 1.43-0.92(m, 20H), and 0.91-0.80(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-2-27) were as follows.

Transition temperature: Cr 57.0 SmB 161.9 SmC 174.4 N 300.8 Iso.

$T_{NI}$=239.3° C., Δ∈=−3.9, Δn=0.109.

trans-4'-Pentylcyclohexyl-trans 4-carboxylic acid 2,3-difluoro-4-(trans-4-propylcyclohexyl)phenylester (No. 1-2-83)

(No. 1-2-83)

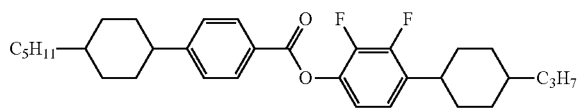

Chemical shift δ (ppm); 8.12(d, 2H), 7.35(d, 2H), 7.01-6.93(m, 2H), 2.84(tt, 1H) and 2.57(tt, 1H), 1.92-1.87(m, 8H), 1.53-1.44(m, 4H), 1.39-1.20(m, 14H), 1.13-1.03(m, 4H), and 0.92-0.89(m, 6H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-2-83) were as follows.

Transition temperature: $Cr_1$ 65.5 $Cr_2$ 113.0 N 297.9 Iso.

$T_{NI}$=243.9° C., Δ∈=−2.8, Δn=0.154.

2-Fluoro-4-(trans-4'-pentylcyclohexyl)benzoic acid 2,3-difluoro-4-(trans-4-propylcyclohexyl)phenylester (No. 1-2-89)

(NO. 1-2-89)

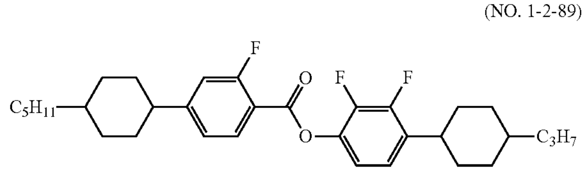

Chemical shift δ (ppm); 8.01(t, 1H), 7.12(dd, 1H), 7.05(dd, 1H), 7.01-6.94(m, 2H), 2.84(tt, 1H), 2.55(tt, 1H), 1.93-1.87 (m, 8H), 1.53-1.41(m, 4H), 1.37-1.20(m, 14H), 1.13-1.02(m, 4H), and 0.92-0.89(m, 6H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-2-89) were as follows.

Transition temperature: $Cr_1$ 76.4 $Cr_2$ 99.9 N 289.9 Iso.

$T_{NI}$=227.3° C., Δ∈=−3.6, Δn=0.149.

4'-Pentylbiphenyl-4-carboxylic acid 2,3-difluoro-4-(trans-4-propylcyclohexyl)phenylester (No. 1-2-143)

(No. 1-2-143)

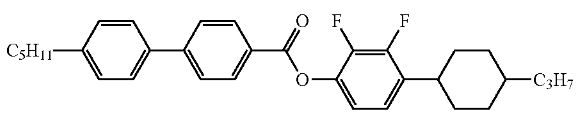

Chemical shift δ (ppm); 8.25(d, 2H), 7.73(d, 2H), 7.58(d, 2H), 7.30(d, 2H), 7.01-6.97(m, 2H), 2.85(tt, 1H), 2.67(t, 2H), 1.91-1.87(m, 4H), 1.68-1.65(m, 2H), 1.52-1.45(m, 2H), 1.38-1.31(m, 7H), 1.25-1.20(m, 2H), 1.09(qd, 2H), and 0.92-0.89 (m, 6H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), dielectric anisotropy ($\Delta\in$), and optical anisotropy ($\Delta n$). The physical property-values of the compound (No. 1-2-143) were as follows.

Transition temperature: $Cr_1$ 119.0 N 296.8 Iso.

$T_{NI}$=243.9° C., $\Delta\in$=−2.9, $\Delta n$=0.220.

trans-4'-Pentylbicyclohexyl-trans-4-carboxylic acid 2,3-difluoro-4-(trans-4-propylcyclohexyl)phenylester (No. 1-2-203)

(No. 1-2-203)

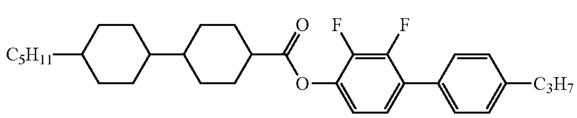

Chemical shift δ (ppm); 7.42(d, 2H), 7.26(d, 2H), 7.16(t, 1H), 6.93(t, 1H), 2.63(t, 2H), 2.54(tt, 1H), 2.19(d, 2H), 1.88-1.86(m, 2H), 1.78-1.64(m, 6H), 1.61-1.52(m, 2H), 1.32-1.20 (m, 6H), 1.18-0.96(m, 12H), and 0.90-0.82(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\in$), and the optical anisotropy ($\Delta n$). The physical property-values of the compound (No. 1-2-203) were as follows.

Transition temperature: Cr 77.3 SmA 147.0 N 307.3 Iso.

$T_{NI}$=249.3° C., $\Delta\in$=−3.2, $\Delta n$=0.154.

trans-4'-Propylbicyclohexyl-trans-4-carboxylic acid 4'-butoxy-2,3,3'-trifluorobiphenyl-4-ylester (No. 1-2-209)

(No. 1-2-209)

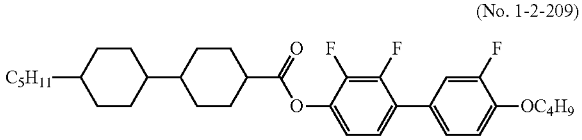

Chemical shift δ (ppm); 7.26(d, 1H), 7.22(d, 1H), 7.13(t, 1H), 7.02(t, 1H), 6.94(t, 1H), 4.08(t, 2H), 2.54(tt, 1H), 2.19(d, 2H), 1.88-1.71(m, 8H), 1.61-1.52(m, 4H), 1.33-1.27(m, 2H), 1.16-0.96(m, 12H), and 0.89-0.82(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\in$), and the optical anisotropy ($\Delta n$). The physical property-values of the compound (No. 1-2-209) were as follows.

Transition temperature: Cr 72.0 SmA 212.3 N 303.2 Iso.

$T_{NI}$=244.6° C., $\Delta\in$=−4.8, $\Delta n$=0.167.

4'-Pentylbiphenyl-4-carboxylic acid 2,3-difluoro-4'-propylbiphenyl-4-ylester (No. 1-2-323)

(No. 1-2-323)

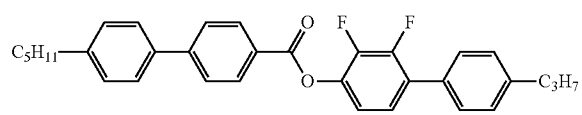

Chemical shift δ (ppm); 8.28(d, 2H), 7.75(d, 2H), 7.59(d, 2H), 7.47(d, 2H), 7.32-7.28(m, 4H), 7.28(t, 1H), 7.12(t, 1H), 2.69-2.63(m, 4H), 1.73-1.64(m, 4H), 1.39-1.35(m, 4H), 0.99 (t, 3H), and 0.92(t, 3H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy ($\Delta\in$), and the optical anisotropy ($\Delta n$). The physical property-values of the compound (No. 1-2-323) were as follows.

Transition temperature: Cr 132.4 N 291.4 Iso.

$T_{NI}$=238.6° C., $\Delta\in$=−1.9, $\Delta n$=0.277.

4-Pentyl benzoic acid 2,3-difluoro-4-(trans-4'-propylbicyclohexyl-trans-4-yl)phenylesterbiphenyl-4-yl ester (No. 2-2-203)

(No. 2-2-203)

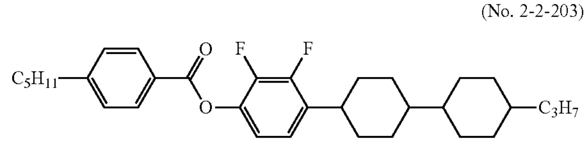

Chemical shift δ (ppm); 8.11(d, 2H), 7.32(d, 2H), 7.10-6.93(m, 2H), 2.82(tt, 1H), 2.70(t, 2H), 1.92-1.84(m, 4H), 1.78-1.73(m, 4H), 1.67-1.64(m, 2H), 1.47-1.42(m, 2H), 1.39-1.28(m, 6H), 1.23-0.97(m, 9H), and 0.92-0.85(m, 8H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), dielectric anisotropy ($\Delta\epsilon$), and optical anisotropy ($\Delta n$). The physical property-values of the compound (No. 2-2-203) were as follows.

Transition temperature: Cr 117.7 N 302.0 Iso.

$T_{NI}$=240.6° C., $\Delta\epsilon$=−2.6, $\Delta n$=0.154.

Example 13

The compounds (No. 1-2-1) to (No. 1-2-410), and the compounds (No. 2-2-1) to (No. 2-2-410), which are shown in Table 57 to Table 112, can be synthesized by synthesis methods similar to those described in Examples 9, 10, 11, and 12.

TABLE 57

(1-2)

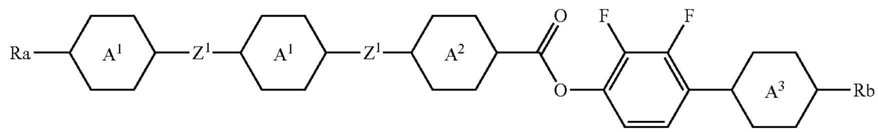

| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-1 | $CH_3$ | 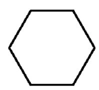 | — | — | — | 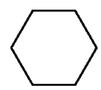 | 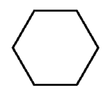 | $CH_3$ | |
| 1-2-2 | $CH_3$ | 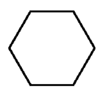 | — | — | — | 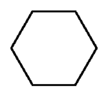 | 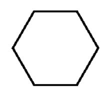 | $C_2H_5$ | |
| 1-2-3 | $CH_3$ | 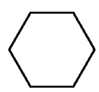 | — | — | — | 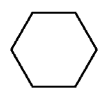 | 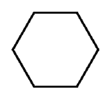 | $C_3H_7$ | |
| 1-2-4 | $CH_3$ | 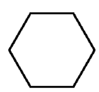 | — | — | — | 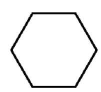 | 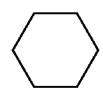 | $C_4H_9$ | |
| 1-2-5 | $CH_3$ | 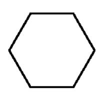 | — | — | — | 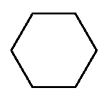 | 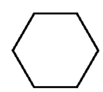 | $C_5H_{11}$ | |
| 1-2-6 | $C_2H_5$ | 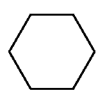 | — | — | — | 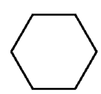 | 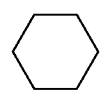 | $CH_3$ | |
| 1-2-7 | $C_2H_5$ | 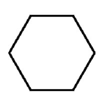 | — | — | — | 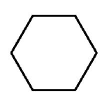 | 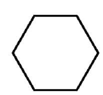 | $C_2H_5$ | |
| 1-2-8 | $C_2H_5$ | 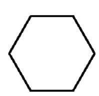 | — | — | — | 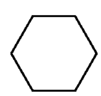 | 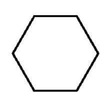 | $C_3H_7$ | |
| 1-2-9 | $C_2H_5$ | 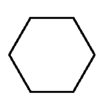 | — | — | — | 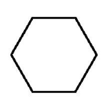 | 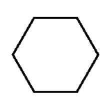 | $C_4H_9$ | |
| 1-2-10 | $C_2H_5$ | 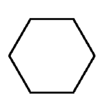 | — | — | — | 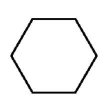 | 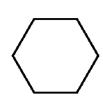 | $C_5H_{11}$ | |
| 1-2-11 | $C_3H_7$ | 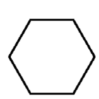 | — | — | — | 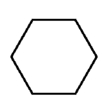 | 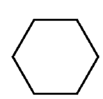 | $CH_3$ | |
| 1-2-12 | $C_3H_7$ | 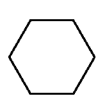 | — | — | — | 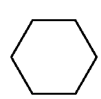 | 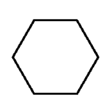 | $C_2H_5$ | |

TABLE 57-continued
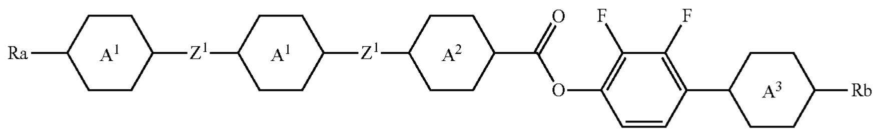
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-13 | $C_3H_7$ | 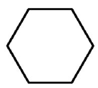 | — | — | — | 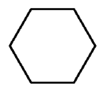 | 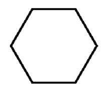 | $C_3H_7$ | |
| 1-2-14 | $C_3H_7$ | 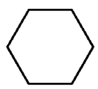 | — | — | — | 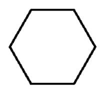 | 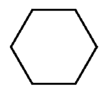 | $C_4H_9$ | |
| 1-2-15 | $C_3H_7$ | 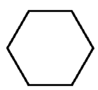 | — | — | — | 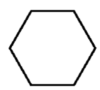 | 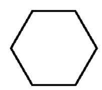 | $C_5H_{11}$ | |
TABLE 58
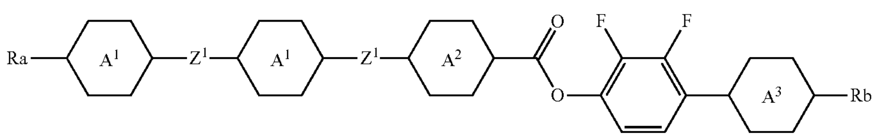
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-16 | $C_4H_9$ | 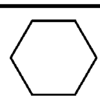 | — | — | — | 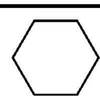 | 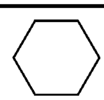 | $CH_3$ | |
| 1-2-17 | $C_4H_9$ | 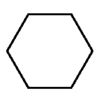 | — | — | — | 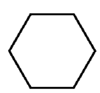 | 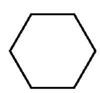 | $C_2H_5$ | |
| 1-2-18 | $C_4H_9$ | 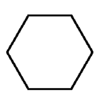 | — | — | — | 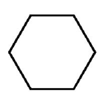 | 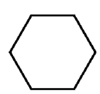 | $C_3H_7$ | |
| 1-2-19 | $C_4H_9$ | 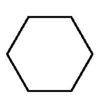 | — | — | — | 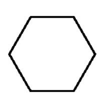 | 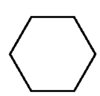 | $C_4H_9$ | |
| 1-2-20 | $C_4H_9$ | 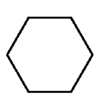 | — | — | — | 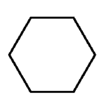 | 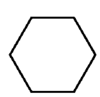 | $C_5H_{11}$ | |
| 1-2-21 | $C_5H_{11}$ | 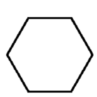 | — | — | — | 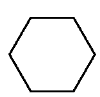 | 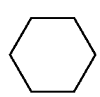 | $CH_3$ | |
| 1-2-22 | $C_5H_{11}$ | 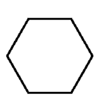 | — | — | — | 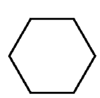 | 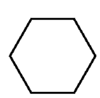 | $C_2H_5$ | |
| 1-2-23 | $C_5H_{11}$ | 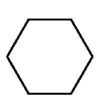 | — | — | — | 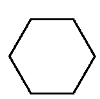 | 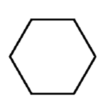 | $C_3H_7$ | Cr 55.2 SmC 74.9 SmA 179.6 N 307.2 Iso $T_{NI}$: 255.9° C., $\Delta\epsilon$: −3.6, $\Delta n$: 0.114 |

TABLE 58-continued
(1-2)
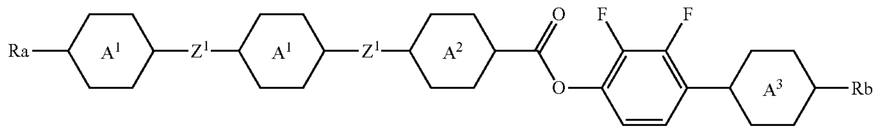
| No. | Ra | $A^1$ | $Z^1$ | $A^1$ | $Z^1$ | $A^2$ | $A^3$ | Rb | Physical property values |
| --- | --- | --- | --- | --- | --- | --- | --- | --- | --- |
| 1-2-24 | $C_5H_{11}$ | 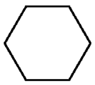 | — | — | — | 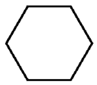 | 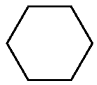 | $C_4H_9$ | |
| 1-2-25 | $C_5H_{11}$ | 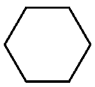 | — | — | — | 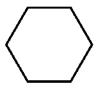 | 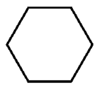 | $C_5H_{11}$ | |
| 1-2-26 | $C_2H_5O$ | 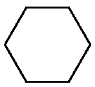 | — | — | — | 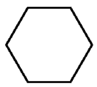 | 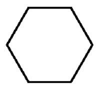 | $C_4H_9$ | |
| 1-2-27 | $C_5H_{11}$ | 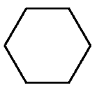 | — | — | — | 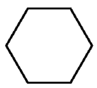 | 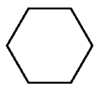 | $OC_2H_5$ | Cr 57.0 SmB 161.9 SmC 174.4 N 300.8 Iso $T_{NI}$: 239.3° C., $\Delta\epsilon$: −3.9, $\Delta n$: 0.109 |
| 1-2-28 | $C_2H_5O$ | 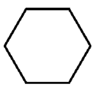 | — | — | — | 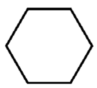 | 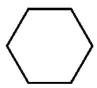 | $OC_4H_9$ | |
| 1-2-29 | $CH_2{=}CH$ | 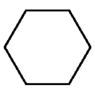 | — | — | — | 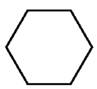 | 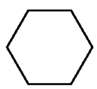 | $C_3H_7$ | |
| 1-2-30 | $CH_2{=}CH$ | 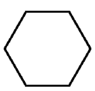 | — | — | — | 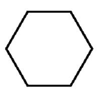 | 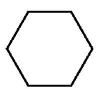 | $C_5H_{11}$ | |
TABLE 59
(1-2)
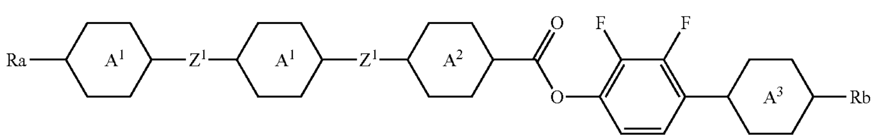
| No. | Ra | $A^1$ | $Z^1$ | $A^1$ | $Z^1$ | $A^2$ | $A^3$ | Rb | Physical property values |
| --- | --- | --- | --- | --- | --- | --- | --- | --- | --- |
| 1-2-31 | $CH_3CH{=}CH$ | 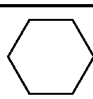 | — | — | — | 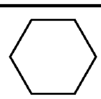 | 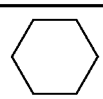 | $C_3H_7$ | |
| 1-2-32 | $CH_3CH{=}CH$ | 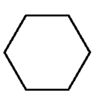 | — | — | — | 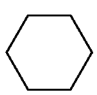 | 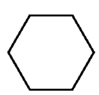 | $C_5H_{11}$ | |
| 1-2-33 | $CH_2{=}CHC_2H_4$ | 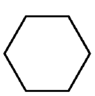 | — | — | — | 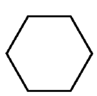 | 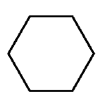 | $C_3H_7$ | |
| 1-2-34 | $CH_2{=}CHC_2H_4$ | 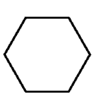 | — | — | — | 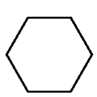 | 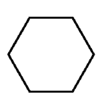 | $C_5H_{11}$ | |

TABLE 59-continued
(1-2)
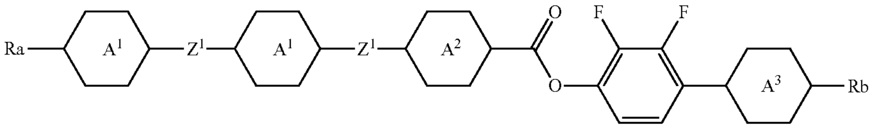
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-35 | $CH_3CH{=}CH$ | 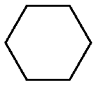 | — | — | — | 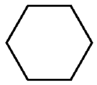 | 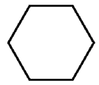 | $C_2H_5$ | |
| 1-2-36 | $CH_3CH{=}CH$ | 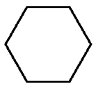 | — | — | — | 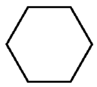 | 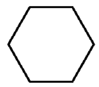 | $C_3H_7$ | |
| 1-2-37 | $CH_3CH{=}CHC_2H_4$ | 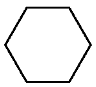 | — | — | — | 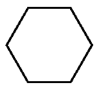 | 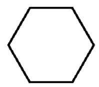 | $CH_3$ | |
| 1-2-38 | $CH_3CH{=}CHC_2H_4$ | 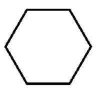 | — | — | — | 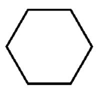 | 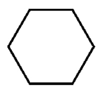 | $C_2H_5$ | |
| 1-2-39 | $C_3H_7$ | 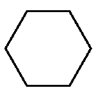 | — | — | — | 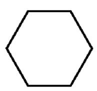 | 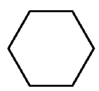 | $CH{=}CH_2$ | |
| 1-2-40 | $C_5H_{11}$ | 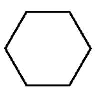 | — | — | — | 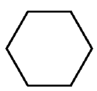 | 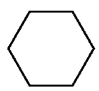 | $CH{=}CH_2$ | |
| 1-2-41 | $C_3H_7$ | 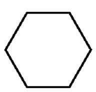 | — | — | — | 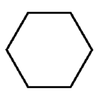 | 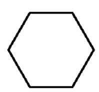 | $CH{=}CHCH_3$ | |
| 1-2-42 | $C_4H_9$ | 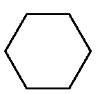 | — | — | — | 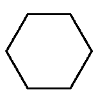 | 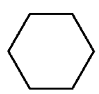 | $CH{=}CHCH_3$ | |
| 1-2-43 | $C_2H_5$ | 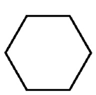 | — | — | — | 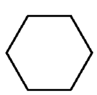 | 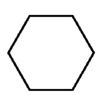 | $C_2H_4CH{=}CH_2$ | |
| 1-2-44 | $C_3H_7$ | 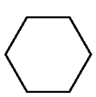 | — | — | — | 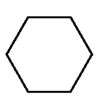 | 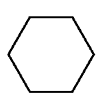 | $C_2H_4CH{=}CH_2$ | |
| 1-2-45 | $CH_3$ | 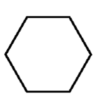 | — | — | — | 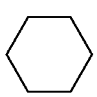 | 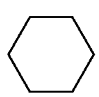 | $CH{=}CHC_3H_7$ | |

TABLE 60
(1-2)
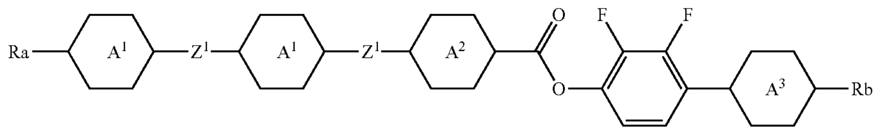
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-46 | $C_2H_5$ | | — | — | — | | | $CH{=}CHC_3H_7$ | |
| 1-2-47 | $C_2H_5$ | | — | — | — | | | $C_2H_4CH{=}CHCH_3$ | |
| 1-2-48 | $C_3H_7$ | | — | — | — | | | $C_2H_4CH{=}CHCH_3$ | |
| 1-2-49 | $CH_2{=}CH$ | | — | — | — | | | $C_2H_4CH{=}CH_2$ | |
| 1-2-50 | $CH_3CH{=}CH$ | | — | — | — | | | $CH{=}CH_2$ | |
| 1-2-51 | $C_3H_7OCH_2$ | | — | — | — | | | $C_3H_7$ | |
| 1-2-52 | $C_5H_{11}$ | | — | — | — | | | $OC_2H_4CH{=}CH_2$ | |
| 1-2-53 | $C_3H_7$ | | $CH_2CH_2$ | — | — | | | $C_2H_5$ | |
| 1-2-54 | $C_5H_{11}$ | | $(CH_2)_4$ | — | — | | | $C_3H_7$ | |
| 1-2-55 | $C_3H_7$ | | $CH_2O$ | — | — | | | $C_2H_5$ | |
| 1-2-56 | $C_5H_{11}$ | | $OCH_2$ | — | — | | | $C_3H_7$ | |
| 1-2-57 | $C_2H_5$ | | COO | — | — | | | $C_4H_9$ | |
| 1-2-58 | $C_7H_{15}$ | | OCO | — | — | | | H | |
| 1-2-59 | $C_2H_5$ | | $CF_2O$ | — | — | | | $C_6H_{13}$ | |

TABLE 60-continued
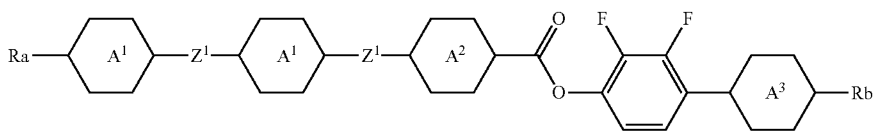
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-60 | $CH_3$ | 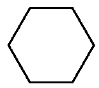 | $OCF_2$ | — | — | 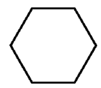 | 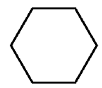 | $C_2H_5$ | |
TABLE 61
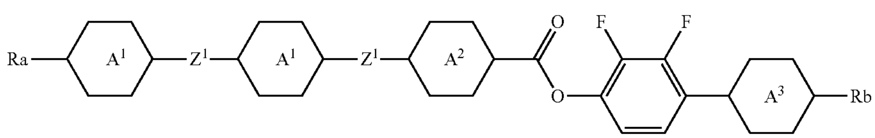
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-61 | $CH_3$ | 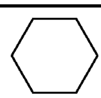 | — | — | — | 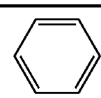 | 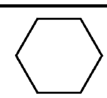 | $CH_3$ | |
| 1-2-62 | $CH_3$ | 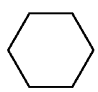 | — | — | — | 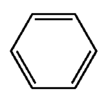 | 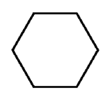 | $C_2H_5$ | |
| 1-2-63 | $CH_3$ | 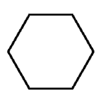 | — | — | — | 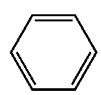 | 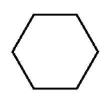 | $C_3H_7$ | |
| 1-2-64 | $CH_3$ | 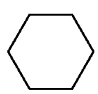 | — | — | — | 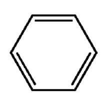 | 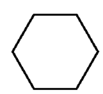 | $C_4H_9$ | |
| 1-2-65 | $CH_3$ | 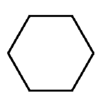 | — | — | — | 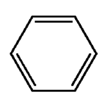 | 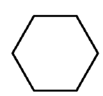 | $C_5H_{11}$ | |
| 1-2-66 | $C_2H_5$ | 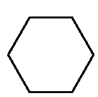 | — | — | — | 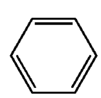 | 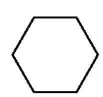 | $CH_3$ | |
| 1-2-67 | $C_2H_5$ | 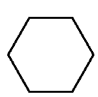 | — | — | — | 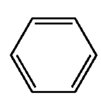 | 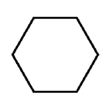 | $C_2H_5$ | |
| 1-2-68 | $C_2H_5$ | 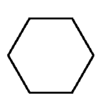 | — | — | — | 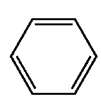 | 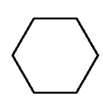 | $C_3H_7$ | |
| 1-2-69 | $C_2H_5$ | 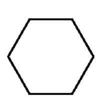 | — | — | — | 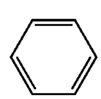 | 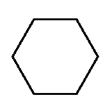 | $C_4H_9$ | |
| 1-2-70 | $C_2H_5$ | 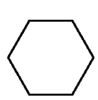 | — | — | — | 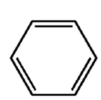 | 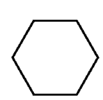 | $C_5H_{11}$ | |

TABLE 61-continued
(1-2)
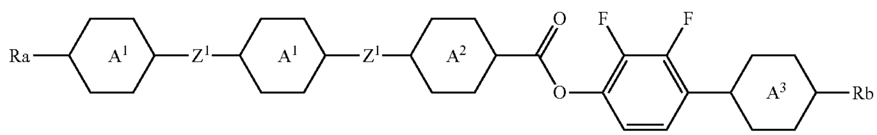
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-71 | $C_3H_7$ | 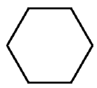 | — | — | — | 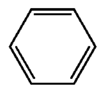 | 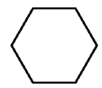 | $CH_3$ | |
| 1-2-72 | $C_3H_7$ | 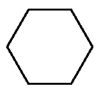 | — | — | — | 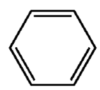 | 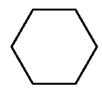 | $C_2H_5$ | |
| 1-2-73 | $C_3H_7$ | 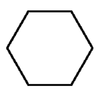 | — | — | — | 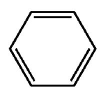 | 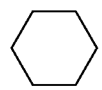 | $C_3H_7$ | |
| 1-2-74 | $C_3H_7$ | 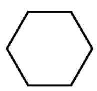 | — | — | — | 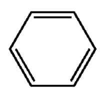 | 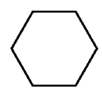 | $C_4H_9$ | |
| 1-2-75 | $C_3H_7$ | 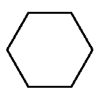 | — | — | — | 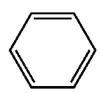 | 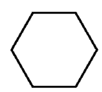 | $C_5H_{11}$ | |
TABLE 62
(1-2)
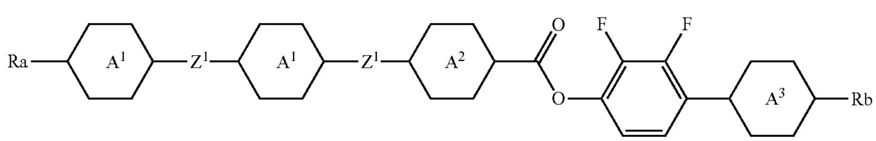
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-76 | $C_4H_9$ | 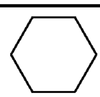 | — | — | — | 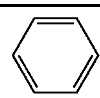 | 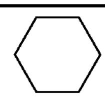 | $CH_3$ | |
| 1-2-77 | $C_4H_9$ | 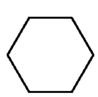 | — | — | — | 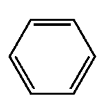 | 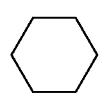 | $C_2H_5$ | |
| 1-2-78 | $C_4H_9$ | 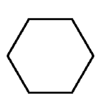 | — | — | — | 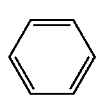 | 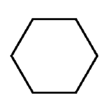 | $C_3H_7$ | |
| 1-2-79 | $C_4H_9$ | 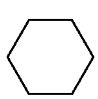 | — | — | — | 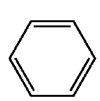 | 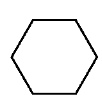 | $C_4H_9$ | |
| 1-2-80 | $C_4H_9$ | 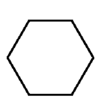 | — | — | — | 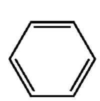 | 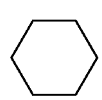 | $C_5H_{11}$ | |
| 1-2-81 | $C_5H_{11}$ | 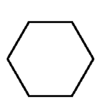 | — | — | — | 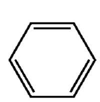 | 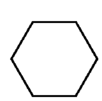 | $CH_3$ | |

TABLE 62-continued
(1-2)
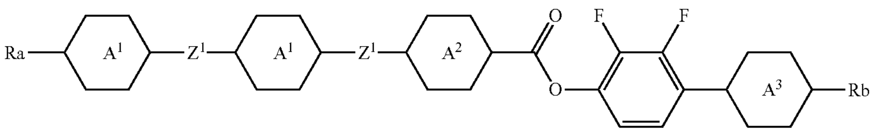
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-82 | $C_5H_{11}$ | 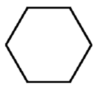 | — | — | — | 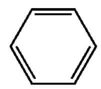 | 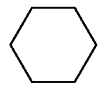 | $C_2H_5$ | |
| 1-2-83 | $C_5H_{11}$ | 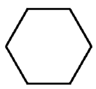 | — | — | — | 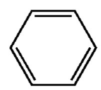 | 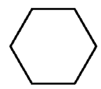 | $C_3H_7$ | $Cr_1$ 65.5 $Cr_2$ 113.0 N 297.9 Iso $T_{NI}$: 243.9° C., Δ ϵ: −2.8, Δ n: 0.154 |
| 1-2-84 | $C_5H_{11}$ | 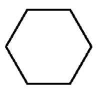 | — | — | — | 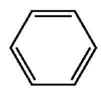 | 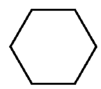 | $C_4H_9$ | |
| 1-2-85 | $C_5H_{11}$ | 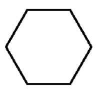 | — | — | — | 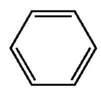 | 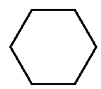 | $C_3H_7$ | |
| 1-2-86 | $C_2H_5O$ | 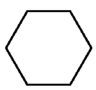 | — | — | — | 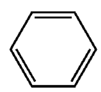 | 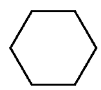 | $C_4H_9$ | |
| 1-2-87 | $C_5H_{11}$ | 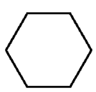 | — | — | — | 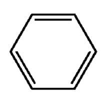 | 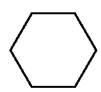 | $OC_2H_5$ | |
| 1-2-88 | $C_2H_5O$ | 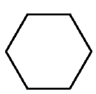 | — | — | — | 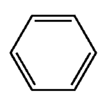 | 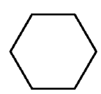 | $OC_4H_9$ | |
| 1-2-89 | $C_5H_{11}$ | 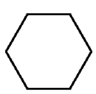 | — | — | — | 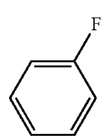 | 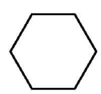 | $C_3H_7$ | $Cr_1$ 76.4 $Cr_2$ 99.9 N 289.9 Iso $T_{NI}$: 227.3° C., Δ ϵ: −3.6, Δ n: 0.149 |
| 1-2-90 | $C_3H_7$ | 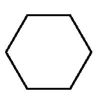 | — | — | — | 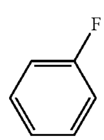 | 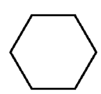 | $C_5H_{11}$ | |
TABLE 63
(1-2)
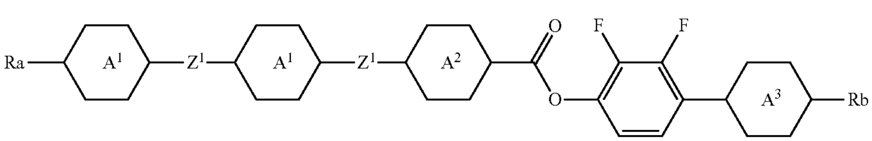
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-91 | $C_2H_5$ | 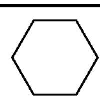 | — | — | — | 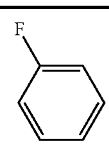 | 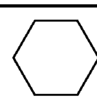 | $C_4H_9$ | |

TABLE 63-continued
(1-2)
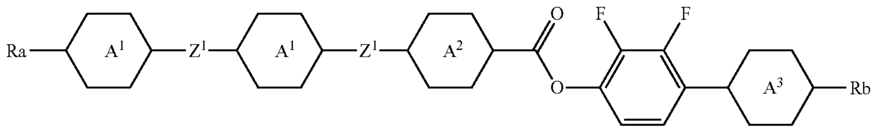
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-92 | $C_5H_{11}$ | 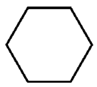 | — | — | — | 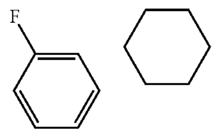 | | $C_2H_5$ | |
| 1-2-93 | $CH_2{=}CH$ | 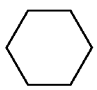 | — | — | — | 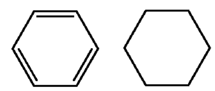 | | $C_3H_7$ | |
| 1-2-94 | $CH_2{=}CH$ | 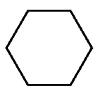 | — | — | — | 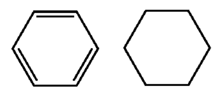 | | $C_5H_{11}$ | |
| 1-2-95 | $CH_3CH{=}CH$ | 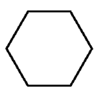 | — | — | — | 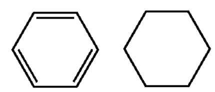 | | $C_2H_5$ | |
| 1-2-96 | $CH_2{=}CH_2H_4$ | 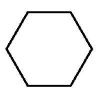 | — | — | — | 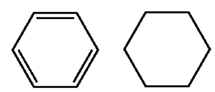 | | $C_3H_7$ | |
| 1-2-97 | $C_3H_7CH{=}CH$ | 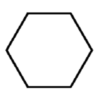 | — | — | — | 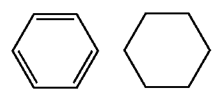 | | $CH_3$ | |
| 1-2-98 | $CH_3CH{=}CHC_2H_4$ | 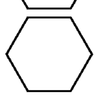 | — | — | — | 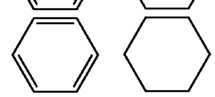 | | $C_2H_5$ | |
| 1-2-99 | $C_3H_7$ | 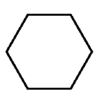 | — | — | — | 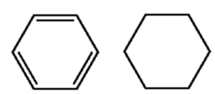 | | $CH{=}CH_2$ | |
| 1-2-100 | $C_5H_{11}$ | 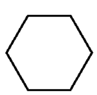 | — | — | — | 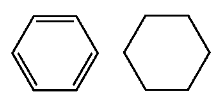 | | $CH{=}CH_2$ | |
| 1-2-101 | $C_3H_7$ | 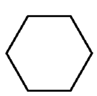 | — | — | — | 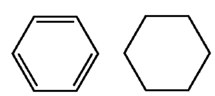 | | $CH{=}CHCH_3$ | |
| 1-2-102 | $C_4H_9$ | 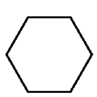 | — | — | — | 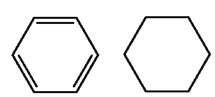 | | $CH{=}CHCH_3$ | |
| 1-2-103 | $C_2H_5$ | 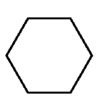 | — | — | — | 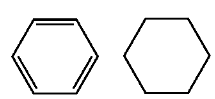 | | $C_2H_4CH{=}CH_2$ | |
| 1-2-104 | $C_3H_7$ | 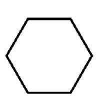 | — | — | — | 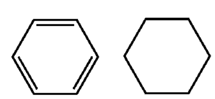 | | $C_2H_4CH{=}CH_2$ | |
| 1-2-105 | $CH_3$ | 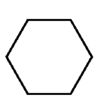 | — | — | — | 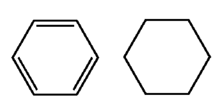 | | $CH{=}CHC_3H_7$ | |

TABLE 64
(1-2)
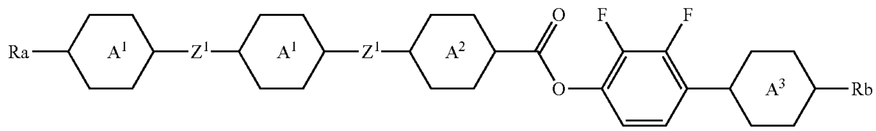
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-106 | $C_2H_5$ | 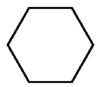 | — | — | — | 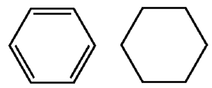 | | $CH{=}CHC_3H_7$ | |
| 1-2-107 | $C_2H_5$ | 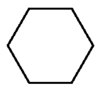 | — | — | — | 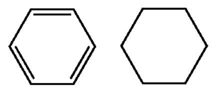 | | $C_2H_4CH{=}CHCH_3$ | |
| 1-2-108 | $C_3H_7$ | 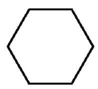 | — | — | — | 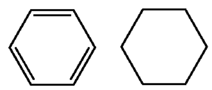 | | $C_2H_4CH{=}CHCH_3$ | |
| 1-2-109 | $CH_2{=}CH$ | 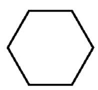 | — | — | — | 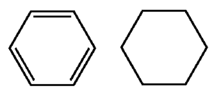 | | $C_2H_4CH{=}CH_2$ | |
| 1-2-110 | $CH_3CH{=}CH$ | 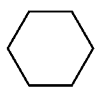 | — | — | — | 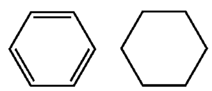 | | $CH{=}CH_2$ | |
| 1-2-111 | $C_5H_{11}OCH_2O$ | 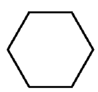 | — | — | — | 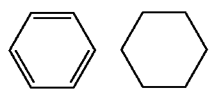 | | $C_3H_7$ | |
| 1-2-112 | $C_3H_7$ | 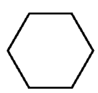 | — | — | — | 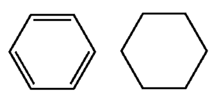 | | $OC_2H_4CH{=}CH_2$ | |
| 1-2-113 | $C_4H_9$ | 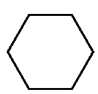 | $CH_2CH_2$ | — | — | 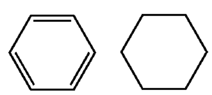 | | $C_2H_5$ | |
| 1-2-114 | $C_5H_{11}$ | 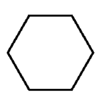 | $CH_2CH_2$ | — | — | 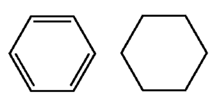 | | $C_3H_7$ | |
| 1-2-115 | $C_3H_7$ | 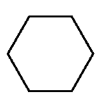 | $CH_2O$ | — | — | 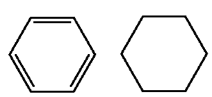 | | $C_2H_5$ | |
| 1-2-116 | $C_5H_{11}$ | 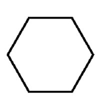 | $OCH_2$ | — | — | 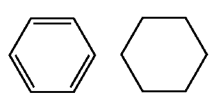 | | $C_6H_{13}$ | |
| 1-2-117 | $C_5H_{11}$ | 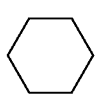 | COO | — | — | 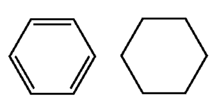 | | $C_4H_9$ | |
| 1-2-118 | $C_2H_5$ | 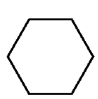 | OCO | — | — | 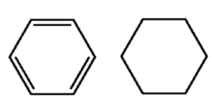 | | $C_4H_9$ | |
| 1-2-119 | $C_2H_5$ | 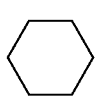 | $CF_2O$ | — | — | 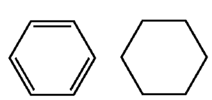 | | $CH_3$ | |

TABLE 64-continued
(1-2)
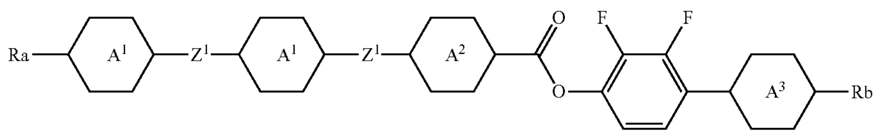
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-120 | $C_4H_9$ | 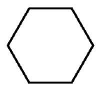 | $OCF_2$ | — | — | 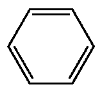 | 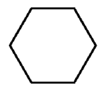 | $C_2H_5$ | |
TABLE 65
(1-2)
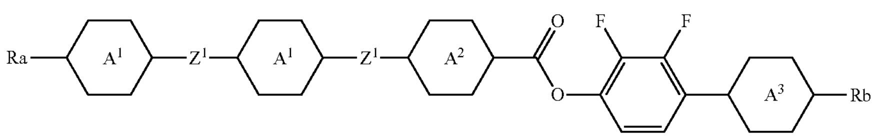
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-121 | $CH_3$ | 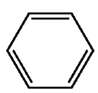 | — | — | — | 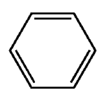 | 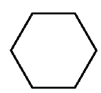 | $CH_3$ | |
| 1-2-122 | $CH_3$ | 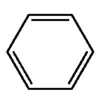 | — | — | — | 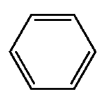 | 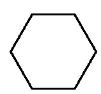 | $C_2H_5$ | |
| 1-2-123 | $CH_3$ | 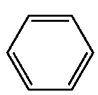 | — | — | — | 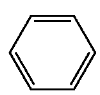 | 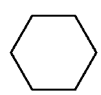 | $C_3H_7$ | |
| 1-2-124 | $CH_3$ | 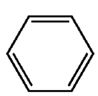 | — | — | — | 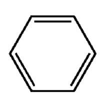 | 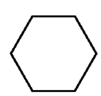 | $C_4H_9$ | |
| 1-2-125 | $CH_3$ | 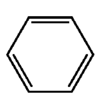 | — | — | — | 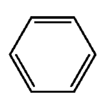 | 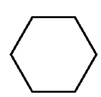 | $C_5H_{11}$ | |
| 1-2-126 | $C_2H_5$ | 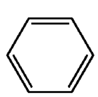 | — | — | — | 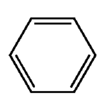 | 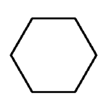 | $CH_3$ | |
| 1-2-127 | $C_2H_5$ | 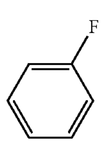 | — | — | — | 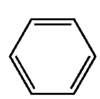 | 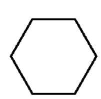 | $C_2H_5$ | |
| 1-2-128 | $C_2H_5$ | 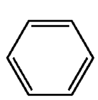 | — | — | — | 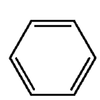 | 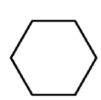 | $C_3H_7$ | |
| 1-2-129 | $C_2H_5$ | 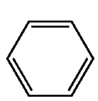 | — | — | — | 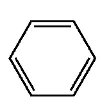 | 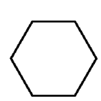 | $C_4H_9$ | |

TABLE 65-continued
(1-2)
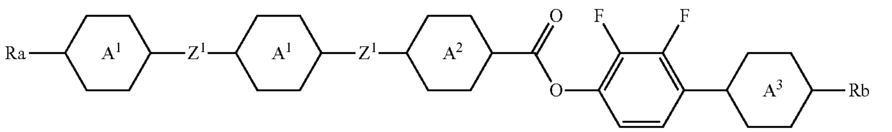
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-130 | $C_2H_5$ | 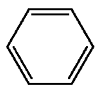 | — | — | — | 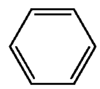 | 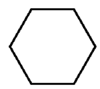 | $C_5H_{11}$ | |
| 1-2-131 | $C_3H_7$ |  | — | — | — | 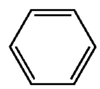 | 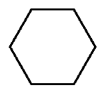 | $CH_3$ | |
| 1-2-132 | $C_3H_7$ |  | — | — | — | 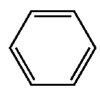 | 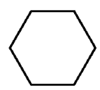 | $C_2H_5$ | |
| 1-2-133 | $C_3H_7$ |  | — | — | — | 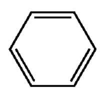 | 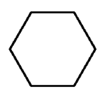 | $C_3H_7$ | |
| 1-2-134 | $C_3H_7$ | 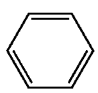 | — | — | — | 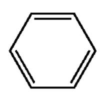 | 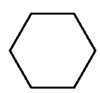 | $C_4H_9$ | |
| 1-2-135 | $C_3H_7$ | 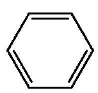 | — | — | — | 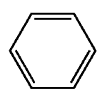 | 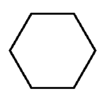 | $C_5H_{11}$ | |
TABLE 66
(1-2)
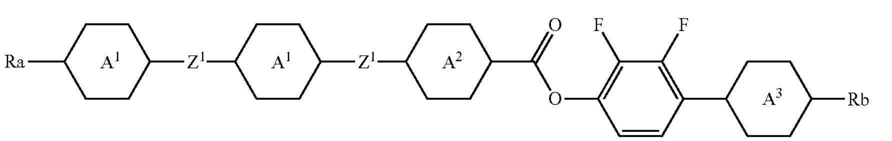
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-136 | $C_4H_9$ | 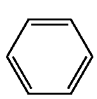 | — | — | — | 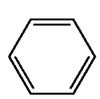 | 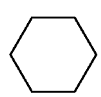 | $CH_3$ | |
| 1-2-137 | $C_4H_9$ | 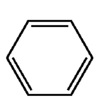 | — | — | — | 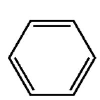 | 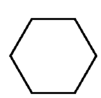 | $C_2H_5$ | |
| 1-2-138 | $C_4H_9$ | 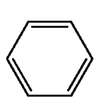 | — | — | — | 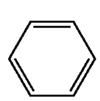 | 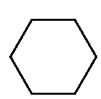 | $C_3H_7$ | |
| 1-2-139 | $C_4H_9$ | 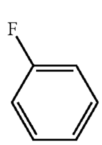 | — | — | — | 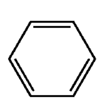 | 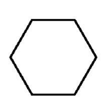 | $C_4H_9$ | |

TABLE 66-continued
(1-2)
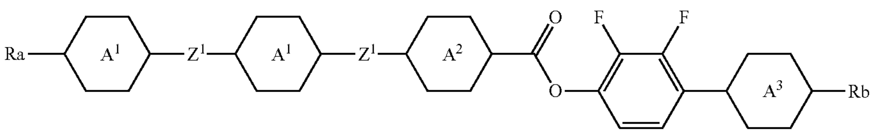
| No. | Ra | A¹ | Z¹ | A¹ | Z¹ | A² | A³ | Rb | Physical property values |
|---|---|---|---|---|---|---|---|---|---|
| 1-2-140 | $C_4H_9$ |  | — | — | — | 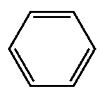 | 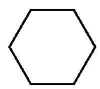 | $C_5H_{11}$ | |
| 1-2-141 | $C_5H_{11}$ |  | — | — | — | 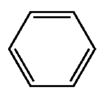 | 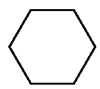 | $CH_3$ | |
| 1-2-142 | $C_5H_{11}$ |  | — | — | — | 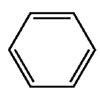 | 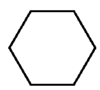 | $C_2H_5$ | |
| 1-2-143 | $C_5H_{11}$ | 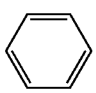 | — | — | — | 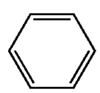 | 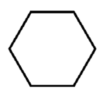 | $C_3H_7$ | Cr 119.0 N 296.8 Iso $T_{NI}$: 243.9° C., Δ ϵ:-2.9, Δ n: 0.220 |
| 1-2-144 | $C_5H_{11}$ | 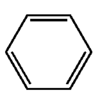 | — | — | — | 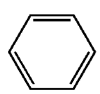 | 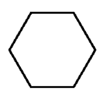 | $C_4H_9$ | |
| 1-2-145 | $C_5H_{11}$ | 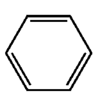 | — | — | — | 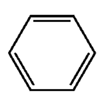 | 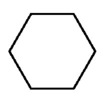 | $C_3H_7$ | |
| 1-2-146 | $C_2H_5O$ | 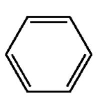 | — | — | — | 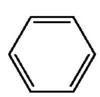 | 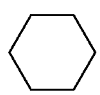 | $C_4H_9$ | |
| 1-2-147 | $C_5H_{11}$ | 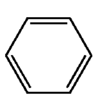 | — | — | — | 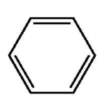 | 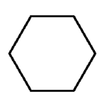 | $OC_2H_5$ | |
| 1-2-148 | $C_2H_5O$ | 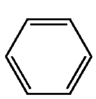 | — | — | — | 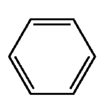 | 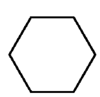 | $OC_4H_9$ | |
| 1-2-149 | $C_5H_{11}$ | 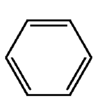 | — | — | — | 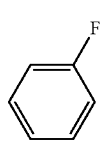 | 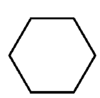 | $C_3H_7$ | |
| 1-2-150 | $C_3H_7$ | 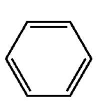 | — | — | — | 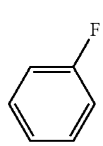 | 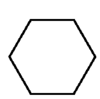 | $C_5H_{11}$ | |

TABLE 67
(1-2)
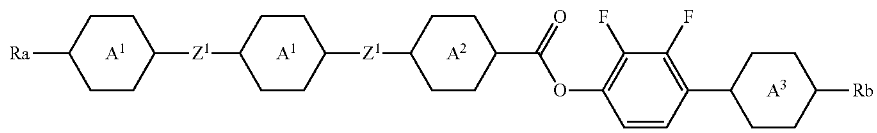
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-151 | $C_2H_5$ | 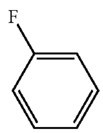 | — | — | — | 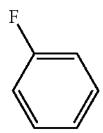 | 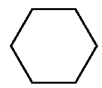 | $C_4H_9$ | |
| 1-2-152 | $C_5H_{11}$ | 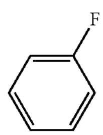 | — | — | — | 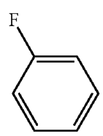 | 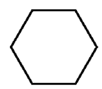 | $C_2H_5$ | |
| 1-2-153 | $CH_2{=}CH$ | 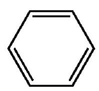 | — | — | — | 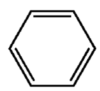 | 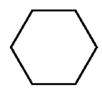 | $C_3H_7$ | |
| 1-2-154 | $CH_2{=}CH$ | 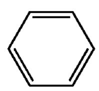 | — | — | — | 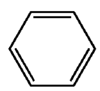 | 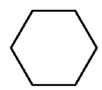 | $C_5H_{11}$ | |
| 1-2-155 | $CH_3CH{=}CH$ | 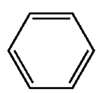 | — | — | — | 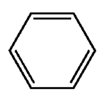 | 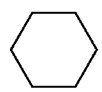 | $C_2H_5$ | |
| 1-2-156 | $CH_2{=}CHC_2H_4$ | 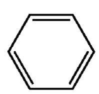 | — | — | — | 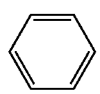 | 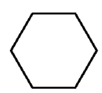 | $C_3H_7$ | |
| 1-2-157 | $C_3H_7CH{=}CH$ | 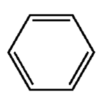 | — | — | — | 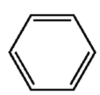 | 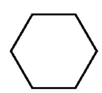 | $C_4H_9$ | |
| 1-2-158 | $CH_3CH{=}CHC_2H_4$ | 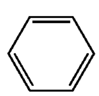 | — | — | — | 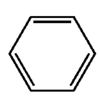 | 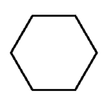 | $C_2H_5$ | |
| 1-2-159 | $C_3H_7$ | 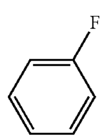 | — | — | — | 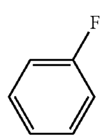 | 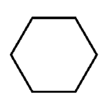 | $CH{=}CH_2$ | |
| 1-2-160 | $C_5H_{11}$ | 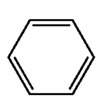 | — | — | — | 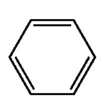 | 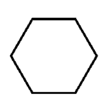 | $CH{=}CH_2$ | |
| 1-2-161 | $C_3H_7$ | 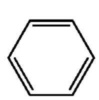 | — | — | — | 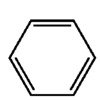 | 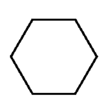 | $CH{=}CHCH_3$ | |
| 1-2-162 | $C_4H_9$ | 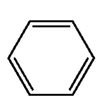 | — | — | — | 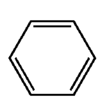 | 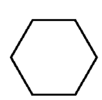 | $CH{=}CHCH_3$ | |

TABLE 67-continued
(1-2)
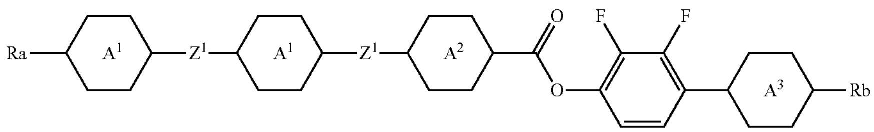
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-163 | $C_3H_7$ | 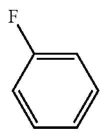 | — | — | — | 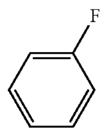 | 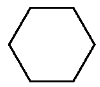 | $C_2H_4CH{=}CH_2$ | |
| 1-2-164 | $C_3H_7$ | 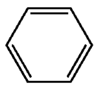 | — | — | — | 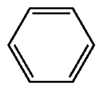 | 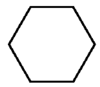 | $C_2H_4CH{=}CH_2$ | |
| 1-2-165 | $C_4H_9$ | 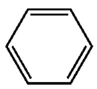 | — | — | — |  | 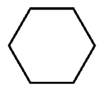 | $CH{=}CHC_3H_7$ | |
TABLE 68
(1-2)
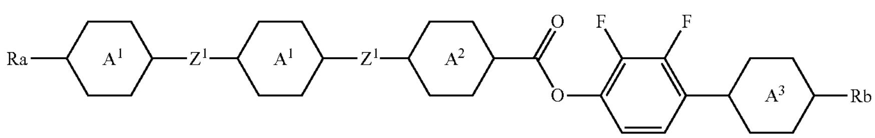
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-166 | $C_2H_5$ | 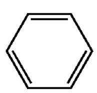 | — | — | — | 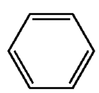 | 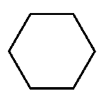 | $CH{=}CHC_3H_7$ | |
| 1-2-167 | $C_2H_5$ | 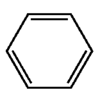 | — | — | — | 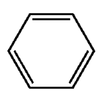 | 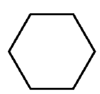 | $C_2H_4CH{=}CHCH_3$ | |
| 1-2-168 | $C_3H_7$ | 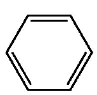 | — | — | — | 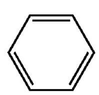 | 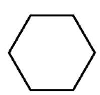 | $C_2H_4CH{=}CHCH_3$ | |
| 1-2-169 | $CH_2{=}CH$ | 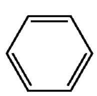 | — | — | — | 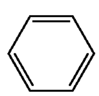 | 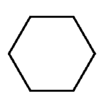 | $CH{=}CH_2$ | |
| 1-2-170 | $CH_3CH{=}CH$ | 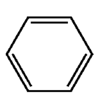 | — | — | — | 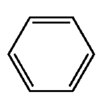 | 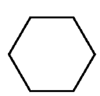 | $C_2H_4CH{=}CH_2$ | |
| 1-2-171 | $CH_3OCH_2$ | 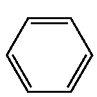 | — | — | — | 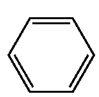 | 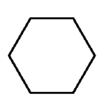 | $C_3H_7$ | |
| 1-2-172 | $C_2H_5$ | 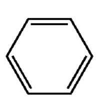 | — | — | — | 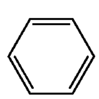 | 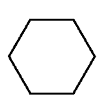 | $OC_2H_4CH{=}CH_2$ | |

TABLE 68-continued
(1-2)
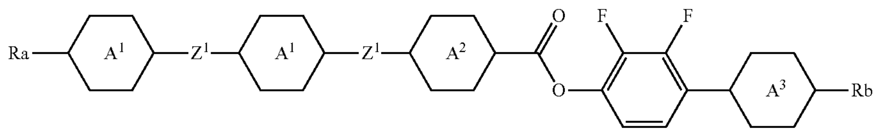
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-173 | $C_3H_7$ | 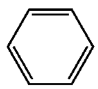 | $CH_2CH_2$ | — | — | 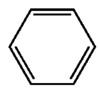 | 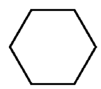 | $C_2H_5$ | |
| 1-2-174 | $C_5H_{11}$ |  | $CH_2CH_2$ | — | — | 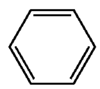 | 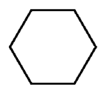 | $C_3H_7$ | |
| 1-2-175 | $C_3H_7$ |  | $CH_2O$ | — | — | 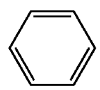 | 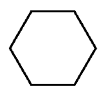 | $C_3H_7$ | |
| 1-2-176 | $C_3H_7$ | 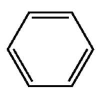 | $OCH_2$ | — | — | 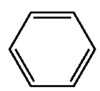 | 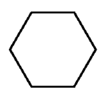 | $CH_3$ | |
| 1-2-177 | $C_5H_{11}$ | 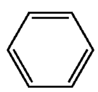 | COO | — | — | 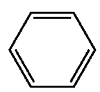 | 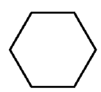 | $C_4H_9$ | |
| 1-2-178 | $C_2H_5$ | 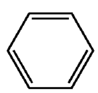 | OCO | — | — | 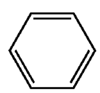 | 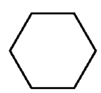 | $C_3H_7$ | |
| 1-2-179 | $C_2H_5$ | 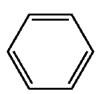 | $CF_2O$ | — | — | 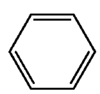 | 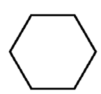 | $C_7H_{15}$ | |
| 1-2-180 | $C_4H_9$ | 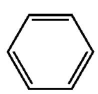 | $OCF_2$ | — | — | 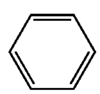 | 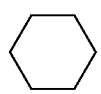 | $C_2H_5$ | |
TABLE 69
(1-2)
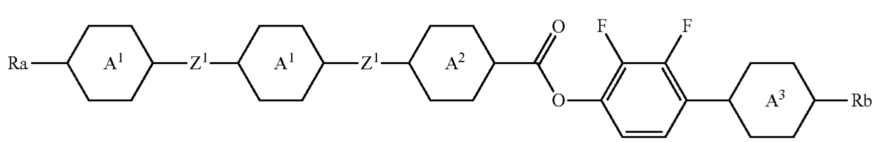
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-181 | $CH_3$ | 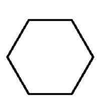 | — | — | — | 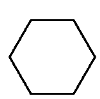 | 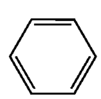 | $CH_3$ | |
| 1-2-182 | $CH_3$ | 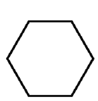 | — | — | — | 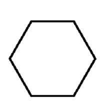 | 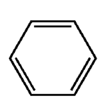 | $C_2H_5$ | |

TABLE 69-continued
(1-2)
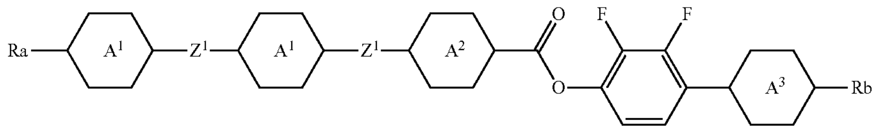
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-183 | $CH_3$ | 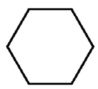 | — | — | — | 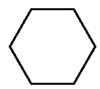 | 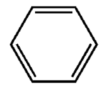 | $C_3H_7$ | |
| 1-2-184 | $CH_3$ | 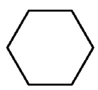 | — | — | — | 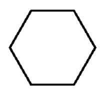 | 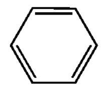 | $C_4H_9$ | |
| 1-2-185 | $CH_3$ | 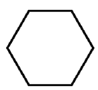 | — | — | — | 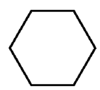 | 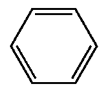 | $C_5H_{11}$ | |
| 1-2-186 | $C_2H_5$ | 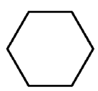 | — | — | — | 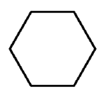 | 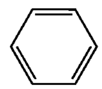 | $CH_3$ | |
| 1-2-187 | $C_2H_5$ | 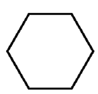 | — | — | — | 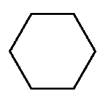 | 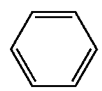 | $C_2H_5$ | |
| 1-2-188 | $C_2H_5$ | 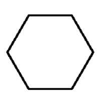 | — | — | — | 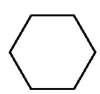 | 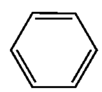 | $C_3H_7$ | |
| 1-2-189 | $C_2H_5$ | 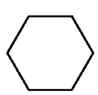 | — | — | — | 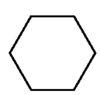 | 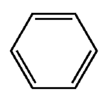 | $C_4H_9$ | |
| 1-2-190 | $C_2H_5$ | 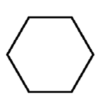 | — | — | — | 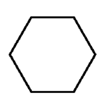 | 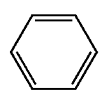 | $C_5H_{11}$ | |
| 1-2-191 | $C_3H_7$ | 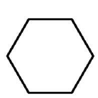 | — | — | — | 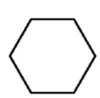 | 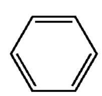 | $CH_3$ | |
| 1-2-192 | $C_3H_7$ | 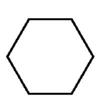 | — | — | — | 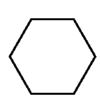 | 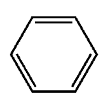 | $C_2H_5$ | |
| 1-2-193 | $C_3H_7$ | 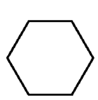 | — | — | — | 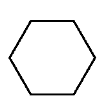 | 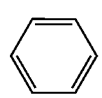 | $C_3H_7$ | |
| 1-2-194 | $C_3H_7$ | 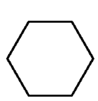 | — | — | — | 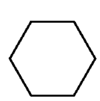 | 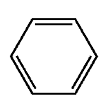 | $C_4H_9$ | |
| 1-2-195 | $C_3H_7$ | 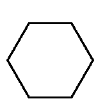 | — | — | — | 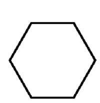 | 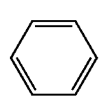 | $C_5H_{11}$ | |

TABLE 70
(1-2)
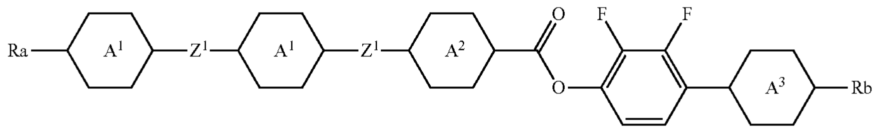
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-196 | $C_4H_9$ | 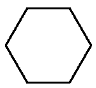 | — | — | — | 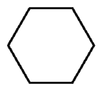 | 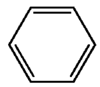 | $CH_3$ | |
| 1-2-197 | $C_4H_9$ | 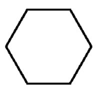 | — | — | — | 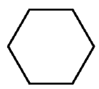 | 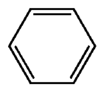 | $C_2H_5$ | |
| 1-2-198 | $C_4H_9$ | 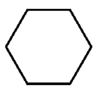 | — | — | — | 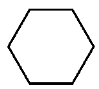 |  | $C_3H_7$ | |
| 1-2-199 | $C_4H_9$ | 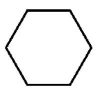 | — | — | — | 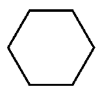 | 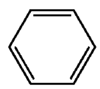 | $C_4H_9$ | |
| 1-2-200 | $C_4H_9$ | 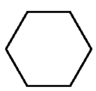 | — | — | — | 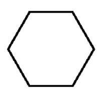 | 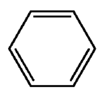 | $C_5H_{11}$ | |
| 1-2-201 | $C_5H_{11}$ | 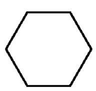 | — | — | — | 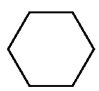 | 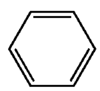 | $CH_3$ | |
| 1-2-202 | $C_5H_{11}$ | 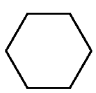 | — | — | — | 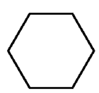 | 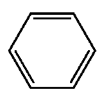 | $C_2H_5$ | |
| 1-2-203 | $C_5H_{11}$ | 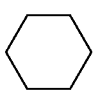 | — | — | — | 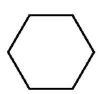 | 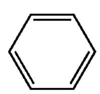 | $C_3H_7$ | Cr 77.3 SmA 147.0 N 307.3 Iso $T_{NI}$: 249.3° C., Δ ϵ: -3.2, Δ n:0.154 |
| 1-2-204 | $C_5H_{11}$ | 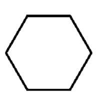 | — | — | — | 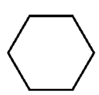 | 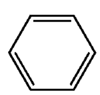 | $C_4H_9$ | |
| 1-2-205 | $C_5H_{11}$ | 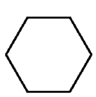 | — | — | — | 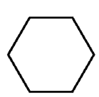 | 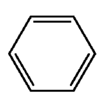 | $C_5H_{11}$ | |
| 1-2-206 | $C_2H_5O$ | 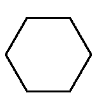 | — | — | — | 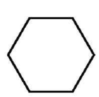 | 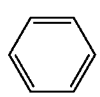 | $C_4H_9$ | |
| 1-2-207 | $C_5H_{11}$ | 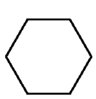 | — | — | — | 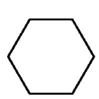 | 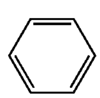 | $OC_2H_5$ | |
| 1-2-208 | $C_2H_5O$ | 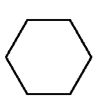 | — | — | — | 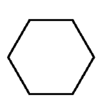 | 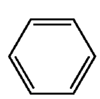 | $OC_4H_9$ | |

TABLE 70-continued
(1-2)
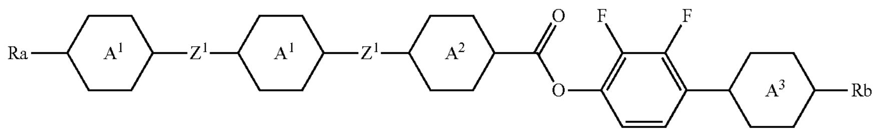
| No. | Ra | A¹ | Z¹ | A¹ | Z¹ | A² | A³ | Rb | Physical property values |
|---|---|---|---|---|---|---|---|---|---|
| 1-2-209 | $C_3H_7$ | 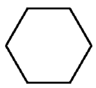 | — | — | — | 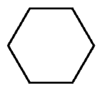 | 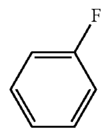 | $OC_4H_9$ | Cr 72.0 SmA 212.3 N 303.2 Iso $T_{NI}$: 244.6° C., Δ ϵ:-4.8, Δ n:0.167 |
| 1-2-210 | $C_5H_{11}$ | 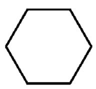 | — | — | — | 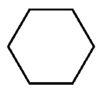 | 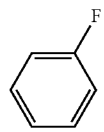 | $OC_2H_5$ | |
TABLE 71
(1-2)
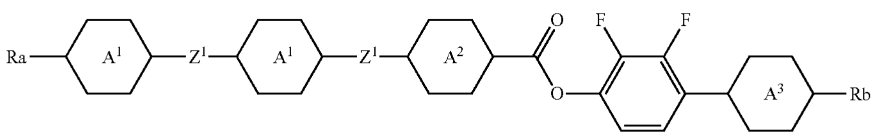
| No. | Ra | A¹ | Z¹ | A¹ | Z¹ | A² | A³ | Rb | Physical property values |
|---|---|---|---|---|---|---|---|---|---|
| 1-2-211 | $C_3H_7$ | 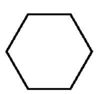 | — | — | — | 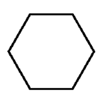 | 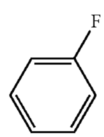 | $C_5H_{11}$ | |
| 1-2-212 | $C_5H_{11}$ | 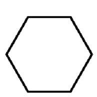 | — | — | — | 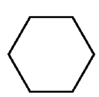 | 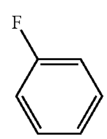 | $C_2H_5$ | |
| 1-2-213 | $C_4H_9O$ | 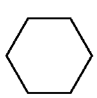 | — | — | — | 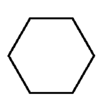 | 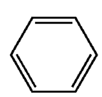 | $C_3H_7$ | |
| 1-2-214 | $CH_2$═CH | 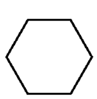 | — | — | — | 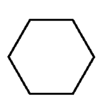 | 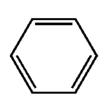 | $C_5H_{11}$ | |
| 1-2-215 | $CH_2$═CH | 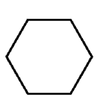 | — | — | — | 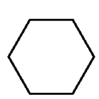 | 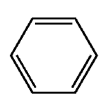 | $C_2H_5$ | |
| 1-2-216 | $CH_2$═$CHC_2H_4$ | 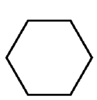 | — | — | — | 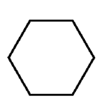 | 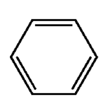 | $C_3H_7$ | |

TABLE 71-continued
(1-2)
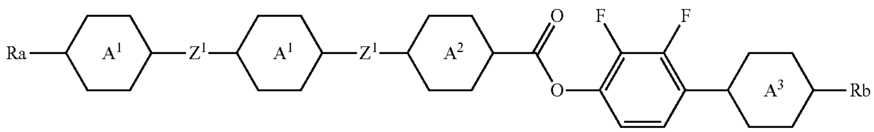
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-217 | $CH_3CH{=}CH$ | 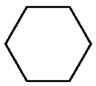 | — | — | — | 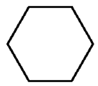 | 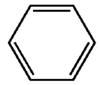 | $CH_3$ | |
| 1-2-218 | $CH_2{=}CHC_2H_4$ | 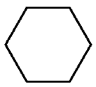 | — | — | — | 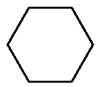 | 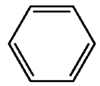 | $C_2H_5$ | |
| 1-2-219 | $C_3H_7CH{=}CH$ | 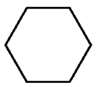 | — | — | — | 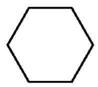 | 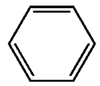 | $C_3H_7$ | |
| 1-2-220 | $CH_3CH{=}CHC_2H_4$ | 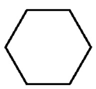 | — | — | — | 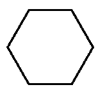 | 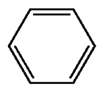 | $C_4H_9$ | |
| 1-2-221 | $CH_3$ | 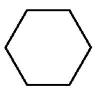 | — | — | — | 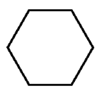 |  | $CH_2OC_3H_7$ | |
| 1-2-222 | $C_4H_9$ | 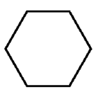 | — | — | — | 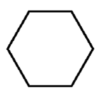 | 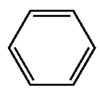 | $CH_2CH_2F$ | |
| 1-2-223 | $C_2H_5$ | 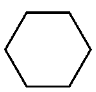 | — | — | — | 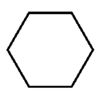 | 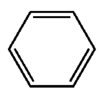 | $CH{=}CHCH_3$ | |
| 1-2-224 | $C_3H_7$ | 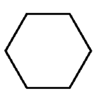 | — | — | — | 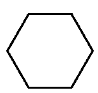 |  | $CH{=}CHC_3H_7$ | |
| 1-2-225 | $C_3H_7$ | 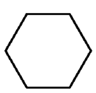 | — | — | — | 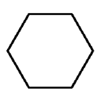 | 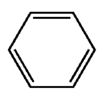 | $C_2H_4CH{=}CH_2$ | |
TABLE 72
(1-2)
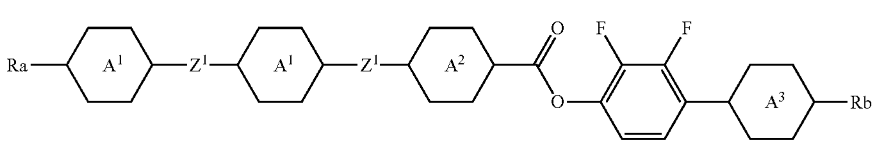
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-226 | $C_2H_5$ | 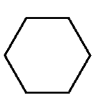 | — | — | — | 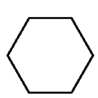 | 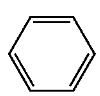 | $C_2H_4CH{=}CH_2$ | |

TABLE 72-continued
(1-2)
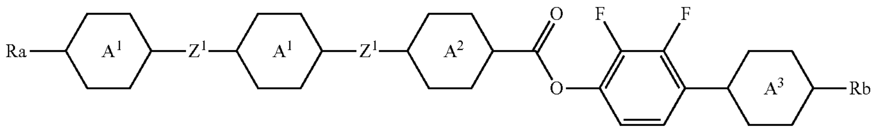
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-227 | $C_5H_{11}$ | 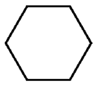 | — | — | — | 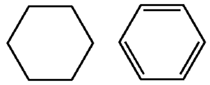 | | $C_2H_4CH{=}CHCH_3$ | |
| 1-2-228 | $C_3H_7$ | 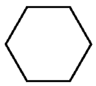 | — | — | — | 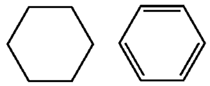 | | $C_2H_4CH{=}CHCH_3$ | |
| 1-2-229 | $CH_2{=}CH$ | 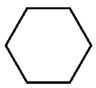 | — | — | — | 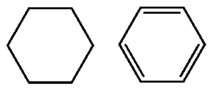 | | $C_2H_4CH{=}CH_2$ | |
| 1-2-230 | $CH_3CH{=}CH$ | 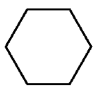 | — | — | — | 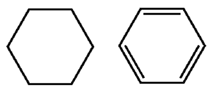 | | $C_2H_4CH{=}CH_2$ | |
| 1-2-231 | $C_3H_7OCH_2$ | 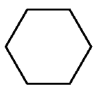 | — | — | — | 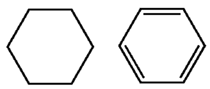 | | $C_3H_7$ | |
| 1-2-232 | $C_3H_7$ | 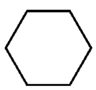 | — | — | — | 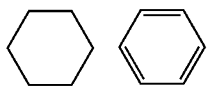 | | $OC_2H_4CH{=}CH_2$ | |
| 1-2-233 | $C_5H_{11}$ | 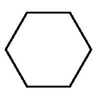 | $CH_2CH_2$ | — | — | 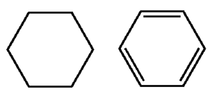 | | $C_2H_5$ | |
| 1-2-234 | $C_5H_{11}$ | 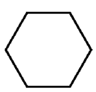 | $CH{=}CH$ | — | — | 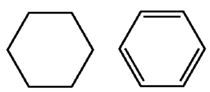 | | $C_3H_7$ | |
| 1-2-235 | $C_3H_7$ | 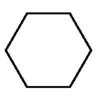 | $CH_2O$ | — | — | 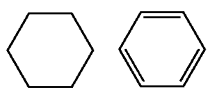 | | H | |
| 1-2-236 | $C_2H_5$ | 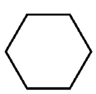 | $OCH_2$ | — | — | 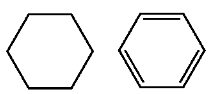 | | $C_3H_7$ | |
| 1-2-237 | $C_4H_9$ | 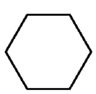 | COO | — | — | 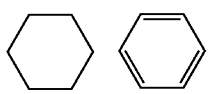 | | $C_4H_9$ | |
| 1-2-238 | $C_3H_7$ | 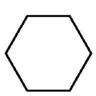 | OCO | — | — | 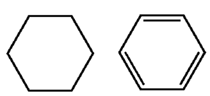 | | $C_2H_5$ | |
| 1-2-239 | $C_7H_{15}$ | 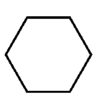 | $CF_2O$ | — | — | 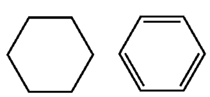 | | $C_2H_5$ | |
| 1-2-240 | $C_9H_{19}$ | 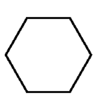 | $OCF_2$ | — | — | 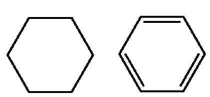 | | $CH_3$ | |

TABLE 73
(1-2)
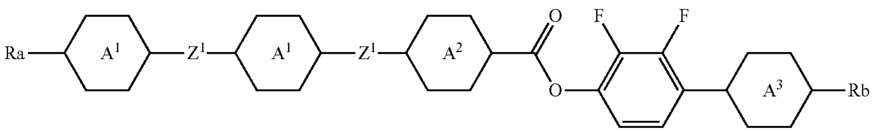
| No. | Ra | $A^1$ | $Z^1$ | $A^1$ | $Z^1$ | $A^2$ / $A^3$ | Rb | Physical property values |
|---|---|---|---|---|---|---|---|---|
| 1-2-241 | $CH_3$ | 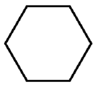 | — | — | — | 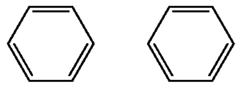 | $CH_3$ | |
| 1-2-242 | $CH_3$ | 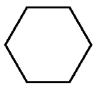 | — | — | — | 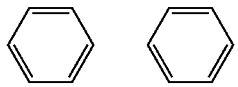 | $C_2H_5$ | |
| 1-2-243 | $CH_3$ | 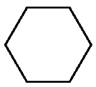 | — | — | — | 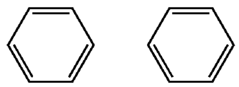 | $C_3H_7$ | |
| 1-2-244 | $CH_3$ | 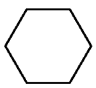 | — | — | — | 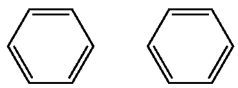 | $C_4H_9$ | |
| 1-2-245 | $CH_3$ | 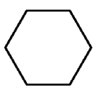 | — | — | — | 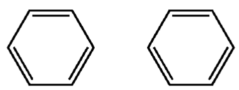 | $C_5H_{11}$ | |
| 1-2-246 | $C_2H_5$ | 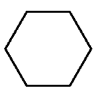 | — | — | — | 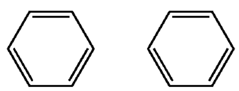 | $CH_3$ | |
| 1-2-247 | $C_2H_5$ | 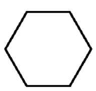 | — | — | — | 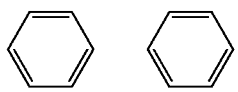 | $C_2H_5$ | |
| 1-2-248 | $C_2H_5$ | 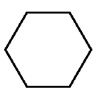 | — | — | — | 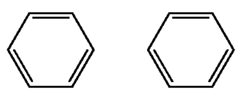 | $C_3H_7$ | |
| 1-2-249 | $C_2H_5$ | 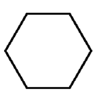 | — | — | — | 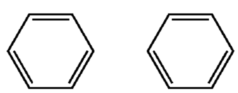 | $C_4H_9$ | |
| 1-2-250 | $C_2H_5$ | 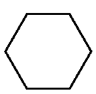 | — | — | — | 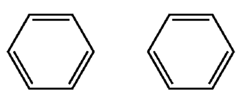 | $C_5H_{11}$ | |
| 1-2-251 | $C_3H_7$ | 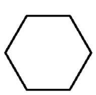 | — | — | — | 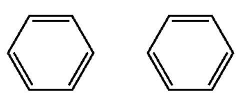 | $CH_3$ | |
| 1-2-252 | $C_3H_7$ | 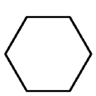 | — | — | — | 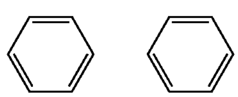 | $C_2H_5$ | |
| 1-2-253 | $C_3H_7$ | 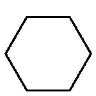 | — | — | — | 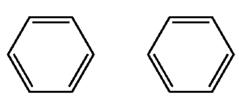 | $C_3H_7$ | |
| 1-2-254 | $C_3H_7$ | 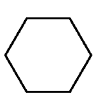 | — | — | — | 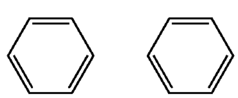 | $C_4H_9$ | |

TABLE 73-continued
(1-2)
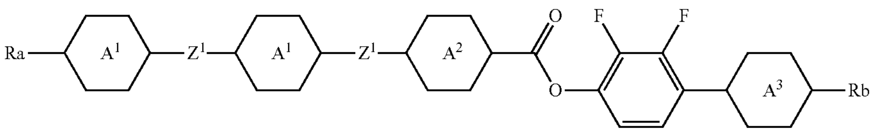
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-255 | $C_3H_7$ | 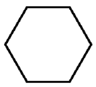 | — | — | — | 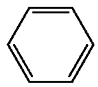 | 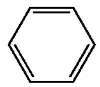 | $C_5H_{11}$ | |
TABLE 74
(1-2)
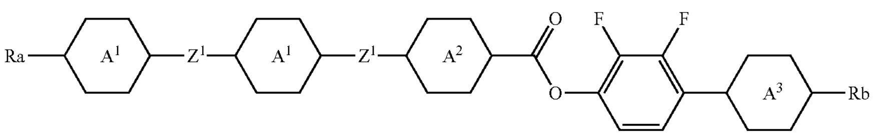
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-256 | $C_4H_9$ | 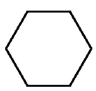 | — | — | — | 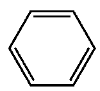 | 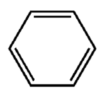 | $CH_3$ | |
| 1-2-257 | $C_4H_9$ | 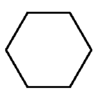 | — | — | — | 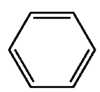 | 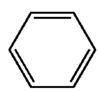 | $C_2H_5$ | |
| 1-2-258 | $C_4H_9$ | 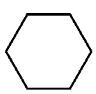 | — | — | — | 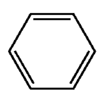 | 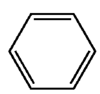 | $C_3H_7$ | |
| 1-2-259 | $C_4H_9$ | 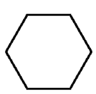 | — | — | — | 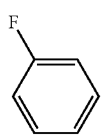 | 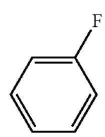 | $C_4H_9$ | |
| 1-2-260 | $C_4H_9$ | 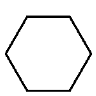 | — | — | — | 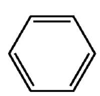 | 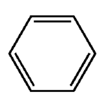 | $C_5H_{11}$ | |
| 1-2-261 | $C_5H_{11}$ | 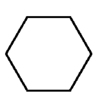 | — | — | — | 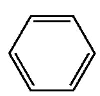 | 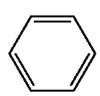 | $CH_3$ | |
| 1-2-262 | $C_5H_{11}$ | 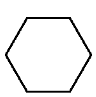 | — | — | — | 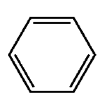 | 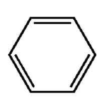 | $C_2H_5$ | |
| 1-2-263 | $C_5H_{11}$ | 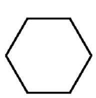 | — | — | — | 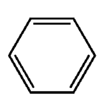 | 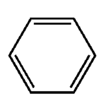 | $C_3H_7$ | Cr 122.5 N 289.8 Iso $T_{NI}$: 232.6° C., Δ ϵ:-2.0, Δ n: 0.219 |
| 1-2-264 | $C_5H_{11}$ | 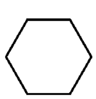 | — | — | — | 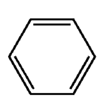 | 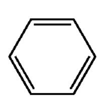 | $C_4H_9$ | |

TABLE 74-continued
(1-2)
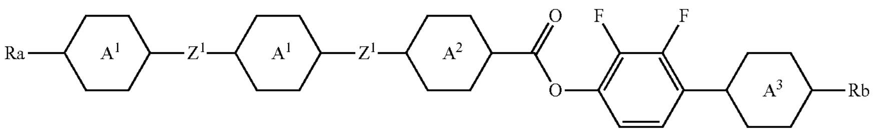
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-265 | $C_5H_{11}$ | 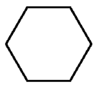 | — | — | — | 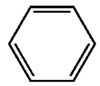 | 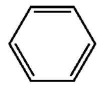 | $C_5H_{11}$ | |
| 1-2-266 | $C_2H_5O$ | 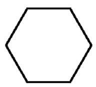 | — | — | — | 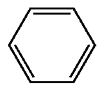 | 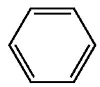 | $C_4H_9$ | |
| 1-2-267 | $C_5H_{11}$ | 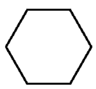 | — | — | — |  | 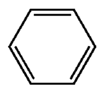 | $OC_2H_5$ | |
| 1-2-268 | $C_2H_5O$ | 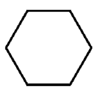 | — | — | — | 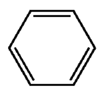 | 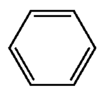 | $OC_4H_9$ | |
| 1-2-269 | $C_3H_7$ | 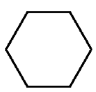 | — | — | — | 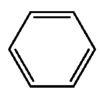 | 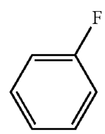 | $OC_4H_9$ | |
| 1-2-270 | $C_5H_{11}$ | 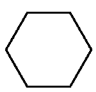 | — | — | — | 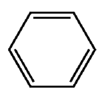 | 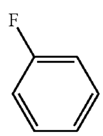 | $OC_2H_5$ | |
TABLE 75
(1-2)
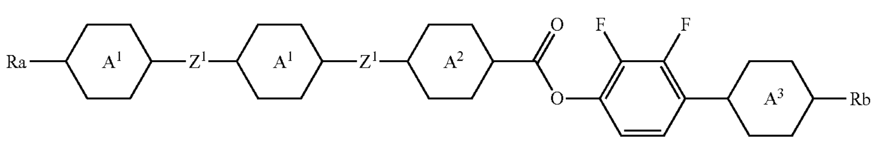
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-271 | $C_3H_7$ | 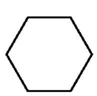 | — | — | — | 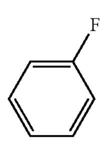 | 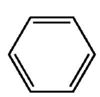 | $C_5H_{11}$ | |
| 1-2-272 | $C_3H_7O$ | 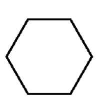 | — | — | — | 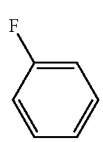 | 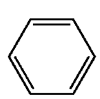 | $C_5H_{11}$ | |

TABLE 75-continued
(1-2)
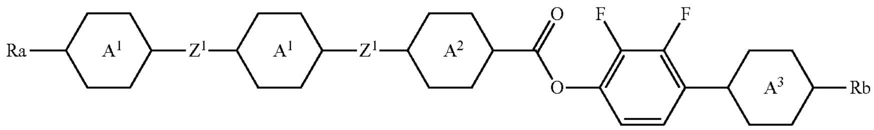
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-273 | $C_5H_{11}$ | 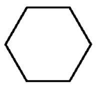 | — | — | — | 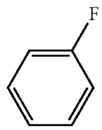 | 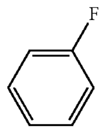 | $OC_2H_5$ | |
| 1-2-274 | $CH_2{=}CH$ | 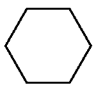 | — | — | — | 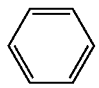 | 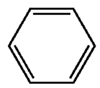 | $C_5H_{11}$ | |
| 1-2-275 | $CH_3CH{=}CH$ | 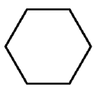 | — | — | — | 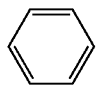 |  | $C_2H_5$ | |
| 1-2-276 | $CH_2{=}CHC_2H_4$ | 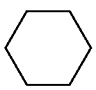 | — | — | — |  | 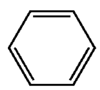 | $C_3H_7$ | |
| 1-2-277 | $C_3H_7CH{=}CH$ | 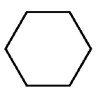 | — | — | — | 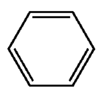 | 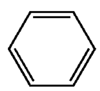 | $CH_3$ | |
| 1-2-278 | $CH_3CH{=}CHC_2H_4$ | 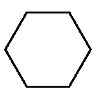 | — | — | — | 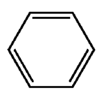 | 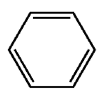 | $C_2H_5$ | |
| 1-2-279 | $C_2H_5$ | 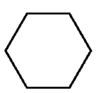 | — | — | — | 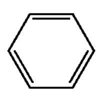 | 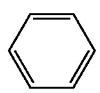 | $CH_2CH_2CHF_2$ | |
| 1-2-280 | $CH_2FCH_2CH_2$ | 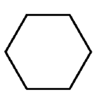 | — | — | — | 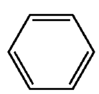 | 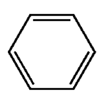 | $C_4H_9$ | |
| 1-2-281 | $CH_3$ | 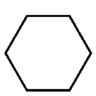 | — | — | — | 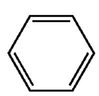 | 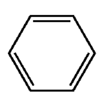 | $CH{=}CH_2$ | |
| 1-2-282 | $C_4H_9$ | 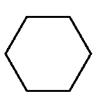 | — | — | — | 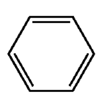 | 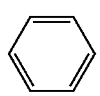 | $CH{=}CHCH_3$ | |
| 1-2-283 | $C_2H_5$ | 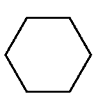 | — | — | — | 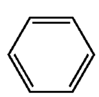 | 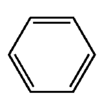 | $C_2H_4CH{=}CH_2$ | |
| 1-2-284 | $C_3H_7$ | 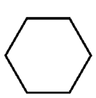 | — | — | — | 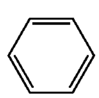 | 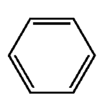 | $C_2H_4CH{=}CH_2$ | |
| 1-2-285 | $C_3H_7$ | 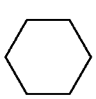 | — | — | — | 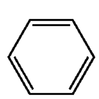 | 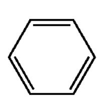 | $CH{=}CHC_3H_7$ | |

TABLE 76
(1-2)
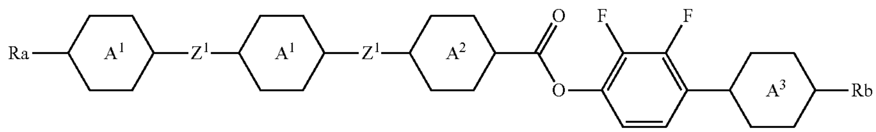
| No. | Ra | A1 | Z1 | A1 | Z1 | A2 A3 | Rb | Physical property values |
|---|---|---|---|---|---|---|---|---|
| 1-2-286 | $C_2H_5$ | 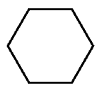 | — | — | — | 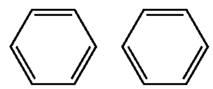 | $CH{=}CHC_3H_7$ | |
| 1-2-287 | $C_5H_{11}$ | 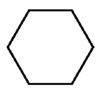 | — | — | — | 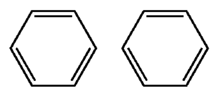 | $C_2H_4CH{=}CHCH_3$ | |
| 1-2-288 | $C_3H_7$ | 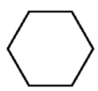 | — | — | — | 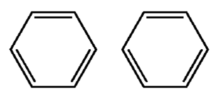 | $C_2H_4CH{=}CHCH_3$ | |
| 1-2-289 | $CH_2{=}CH$ | 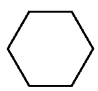 | — | — | — | 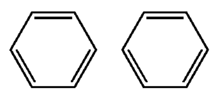 | $C_2H_4CH{=}CH_2$ | |
| 1-2-290 | $CH_3CH{=}CH$ | 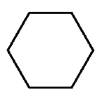 | — | — | — | 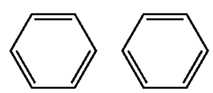 | $CH{=}CH_2$ | |
| 1-2-291 | $C_2H_5OCH_2$ | 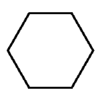 | — | — | — | 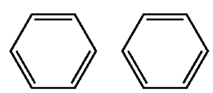 | $C_3H_7$ | |
| 1-2-292 | $C_3H_7$ | 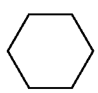 | — | — | — | 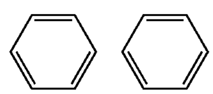 | $OC_2H_4CH{=}CH_2$ | |
| 1-2-293 | $C_3H_7$ | 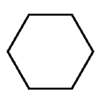 | $CH_2CH_2$ | — | — | 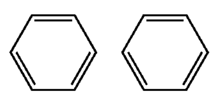 | $C_2H_5$ | |
| 1-2-294 | $C_2H_5$ | 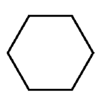 | $CH_2CH_2$ | — | — | 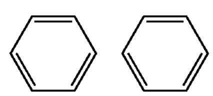 | $C_3H_7$ | |
| 1-2-295 | $C_3H_7$ | 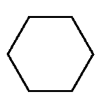 | $CH_2O$ | — | — | 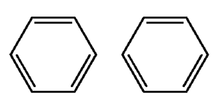 | $C_2H_5$ | |
| 1-2-296 | $C_2H_5$ | 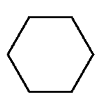 | $OCH_2$ | — | — | 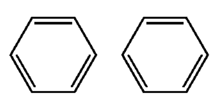 | $C_3H_7$ | |
| 1-2-297 | $C_4H_9$ | 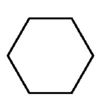 | COO | — | — | 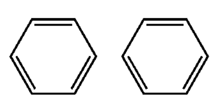 | $C_4H_9$ | |
| 1-2-298 | $C_3H_7$ | 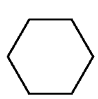 | OCO | — | — | 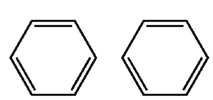 | H | |
| 1-2-299 | $C_2H_5$ | 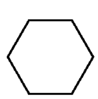 | $CF_2O$ | — | — | 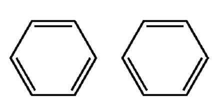 | $C_7H_{15}$ | |

TABLE 76-continued
(1-2)
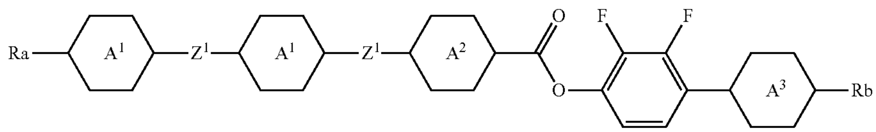
| No. | Ra | A¹ | Z¹ | A¹ | Z¹ | A² | A³ | Rb | Physical property values |
|---|---|---|---|---|---|---|---|---|---|
| 1-2-300 | $CH_3$ | 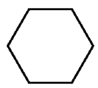 | $OCF_2$ | — | — |  | 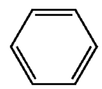 | $C_2H_5$ | |
TABLE 77
(1-2)
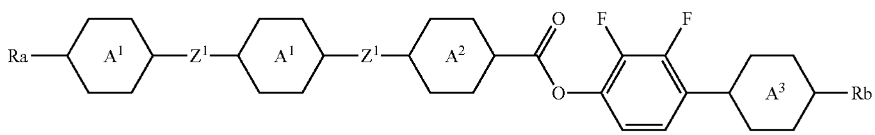
| No. | Ra | A¹ | Z¹ | A¹ | Z¹ | A² | A³ | Rb | Physical property values |
|---|---|---|---|---|---|---|---|---|---|
| 1-2-301 | $CH_3$ | 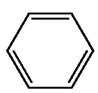 | — | — | — | 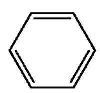 | 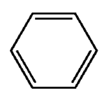 | $CH_3$ | |
| 1-2-302 | $CH_3$ | 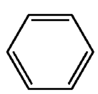 | — | — | — | 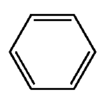 | 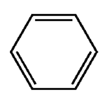 | $C_2H_5$ | |
| 1-2-303 | $CH_3$ | 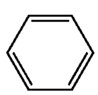 | — | — | — | 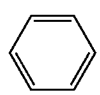 | 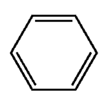 | $C_3H_7$ | |
| 1-2-304 | $CH_3$ | 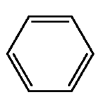 | — | — | — | 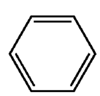 | 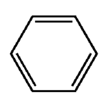 | $C_4H_9$ | |
| 1-2-305 | $CH_3$ | 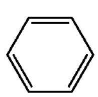 | — | — | — | 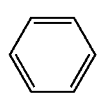 | 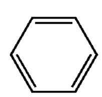 | $C_5H_{11}$ | |
| 1-2-306 | $C_2H_5$ | 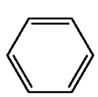 | — | — | — | 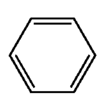 | 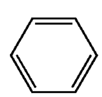 | $CH_3$ | |
| 1-2-307 | $C_2H_5$ | 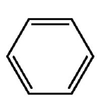 | — | — | — | 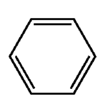 | 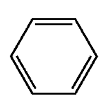 | $C_2H_5$ | |
| 1-2-308 | $C_2H_5$ | 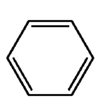 | — | — | — | 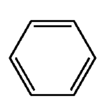 | 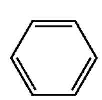 | $C_3H_7$ | |
| 1-2-309 | $C_2H_5$ | 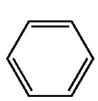 | — | — | — | 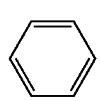 | 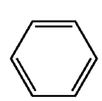 | $C_4H_9$ | |

TABLE 77-continued
(1-2)
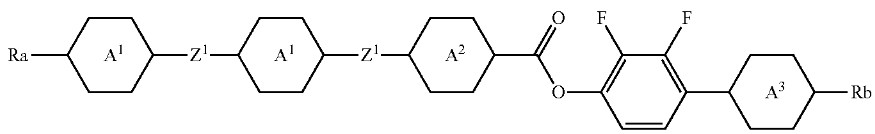
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-310 | $C_2H_5$ | 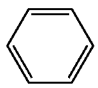 | — | — | — | 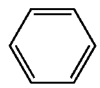 | 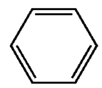 | $C_5H_{11}$ | |
| 1-2-311 | $C_3H_7$ |  | — | — | — | 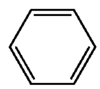 | 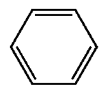 | $CH_3$ | |
| 1-2-312 | $C_3H_7$ | 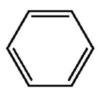 | — | — | — | 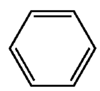 | 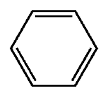 | $C_2H_5$ | |
| 1-2-313 | $C_3H_7$ |  | — | — | — | 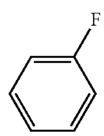 | 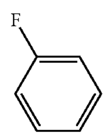 | $C_3H_7$ | |
| 1-2-314 | $C_3H_7$ | 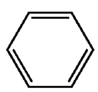 | — | — | — | 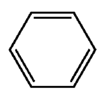 | 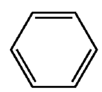 | $C_4H_9$ | |
| 1-2-315 | $C_3H_7$ | 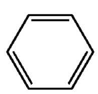 | — | — | — | 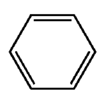 | 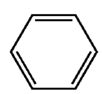 | $C_5H_{11}$ | |
TABLE 78
(1-2)
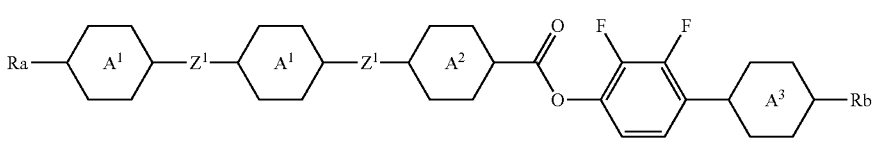
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-316 | $C_4H_9$ | 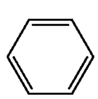 | — | — | — | 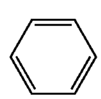 | 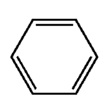 | $CH_3$ | |
| 1-2-317 | $C_4H_9$ | 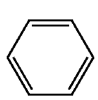 | — | — | — | 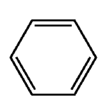 | 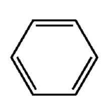 | $C_2H_5$ | |
| 1-2-318 | $C_4H_9$ | 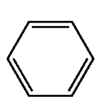 | — | — | — | 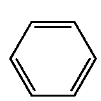 | 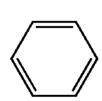 | $C_3H_7$ | |
| 1-2-319 | $C_4H_9$ | 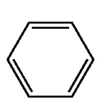 | — | — | — | 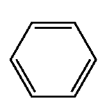 | 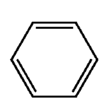 | $C_4H_9$ | |

TABLE 78-continued
(1-2)
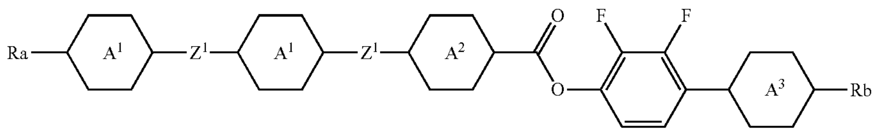
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-320 | $C_4H_9$ | 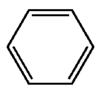 | — | — | — | 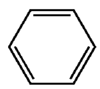 | 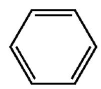 | $C_5H_{11}$ | |
| 1-2-321 | $C_5H_{11}$ |  | — | — | — | 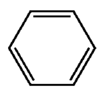 | 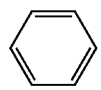 | $CH_3$ | |
| 1-2-322 | $C_5H_{11}$ |  | — | — | — | 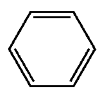 | 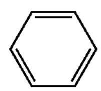 | $C_2H_5$ | |
| 1-2-323 | $C_5H_{11}$ | 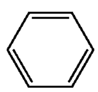 | — | — | — | 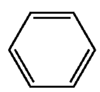 | 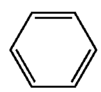 | $C_3H_7$ | Cr 132.4 N 291.4 Iso $T_{NI}$: 238.6° C., Δ ϵ:-1.9, Δ n:0.277 |
| 1-2-324 | $C_5H_{11}$ |  | — | — | — | 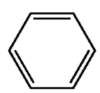 | 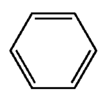 | $C_4H_9$ | |
| 1-2-325 | $C_5H_{11}$ | 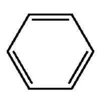 | — | — | — | 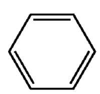 | 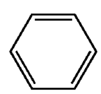 | $C_5H_{11}$ | |
| 1-2-326 | $C_2H_5O$ | 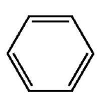 | — | — | — | 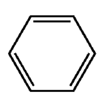 | 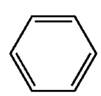 | $C_4H_9$ | |
| 1-2-327 | $C_5H_{11}$ | 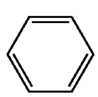 | — | — | — | 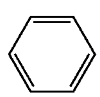 | 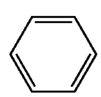 | $OC_2H_5$ | |
| 1-2-328 | $C_2H_5O$ | 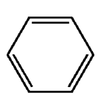 | — | — | — | 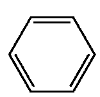 | 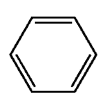 | $OC_4H_9$ | |
| 1-2-329 | $C_3H_7$ | 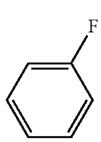 | — | — | — | 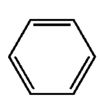 | 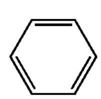 | $OC_4H_9$ | |
| 1-2-330 | $C_5H_{11}$ | 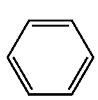 | — | — | — | 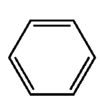 | 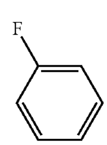 | $OC_2H_5$ | |

Table 79
(1-2)
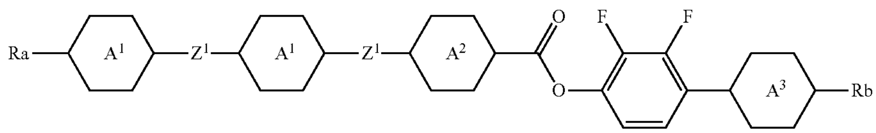
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-331 | $C_3H_7$ | 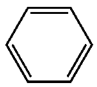 | — | — | — | 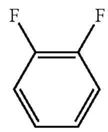 | 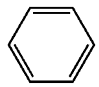 | $C_5H_{11}$ | |
| 1-2.332 | $C_3H_7O$ | 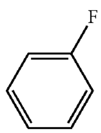 | — | — | — | 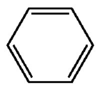 | 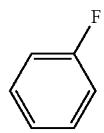 | $OC_2H_5$ | |
| 1-2-333 | $C_5H_{11}$ |  | — | — | — | 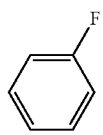 | 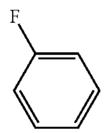 | $OC_2H_5$ | |
| 1-2-334 | $C_2H_5O$ | 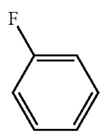 | — | — | — |  | 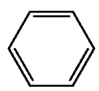 | $C_5H_{11}$ | |
| 1-2-335 | $C_4H_9$ | 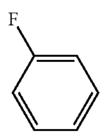 | — | — | — | 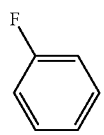 | 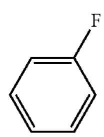 | $C_2H_5$ | |
| 1-2-336 | $C_2H_5O$ | 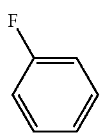 | — | — | — | 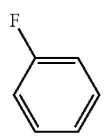 | 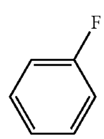 | $OC_4H_9$ | |
| 1-2-337 | $CH_2{=}CH$ | 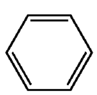 | — | — | — | 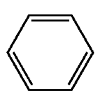 | 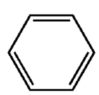 | $CH_3$ | |
| 1-2-338 | $CH_3CH{=}CH$ | 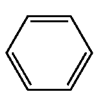 | — | — | — | 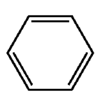 | 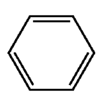 | $C_2H_5$ | |
| 1-2-339 | $CH_2{=}CHC_2H_4$ | 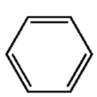 | — | — | — | 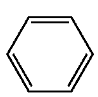 | 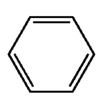 | $C_3H_7$ | |
| 1-2-340 | $C_3H_7CH{=}CH$ | 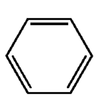 | — | — | — | 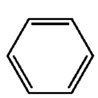 | 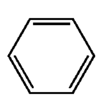 | $C_4H_9$ | |
| 1-2-341 | $CH_3CH{=}CHC_2H_4$ | 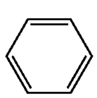 | — | — | — | 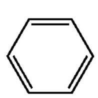 | 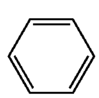 | $CH_3$ | |

Table 79-continued
(1-2)
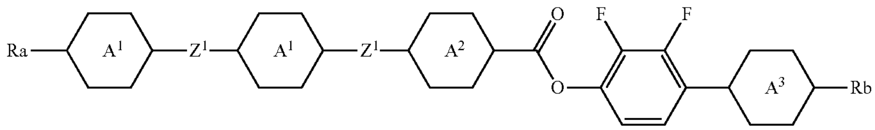
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-342 | $C_4H_9$ | 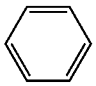 | — | — | — |  | 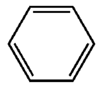 | $CH{=}CH_2$ | |
| 1-2-343 | $C_2H_5$ |  | — | — | — | 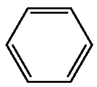 | 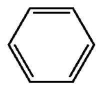 | $CH{=}CHCH_3$ | |
| 1-2-344 | $C_3H_7$ | 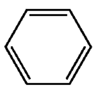 | — | — | — |  |  | $CH{=}CHC_3H_7$ | |
| 1-2-345 | $C_3H_7$ |  | — | — | — |  | 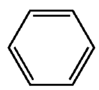 | $C_2H_4CH{=}CH_2$ | |
TABLE 80
(1-2)
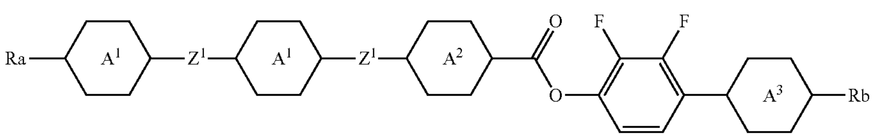
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-346 | $C_2H_5$ | 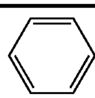 | — | — | — | 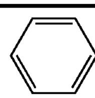 | 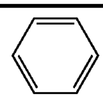 | $C_2H_4CH{=}CH_2$ | |
| 1-2-347 | $C_5H_{11}$ | 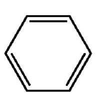 | — | — | — | 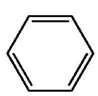 | 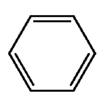 | $C_2H_4CH{=}CHCH_3$ | |
| 1-2-348 | $C_3H_7$ | 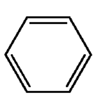 | — | — | — | 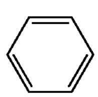 | 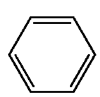 | $C_2H_4CH{=}CHCH_3$ | |
| 1-2-349 | $CH_3CH{=}CHC_2H_4$ | 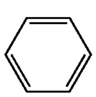 | — | — | — | 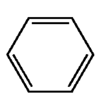 | 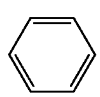 | $C_2H_4CH{=}CH_2$ | |
| 1-2-350 | $CH_2{=}CHC_2H_4O$ | 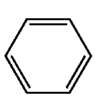 | — | — | — | 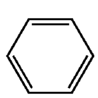 | 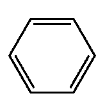 | $C_4H_9CH{=}CHCH_3$ | |
| 1-2-351 | $C_4H_9OCH_2$ | 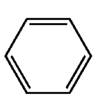 | — | — | — | 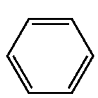 | 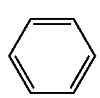 | $C_3H_7$ | |

TABLE 80-continued
(1-2)
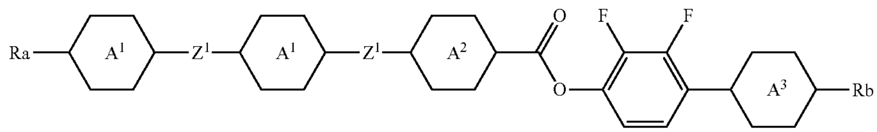
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-352 | $C_3H_7$ | 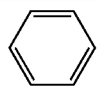 | — | — | — | 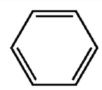 | 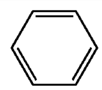 | $OC_2H_4CH{=}CH_2$ | |
| 1-2-353 | $C_3H_7$ | 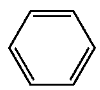 | $CH_2CH_2$ | — | — | 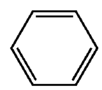 | 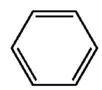 | $C_2H_5$ | |
| 1-2-354 | $C_2H_5$ | 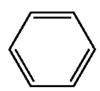 | $C{\equiv}C$ | — | — | 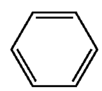 | 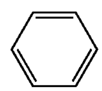 | $C_3H_7$ | |
| 1-2-355 | $C_3H_7$ | 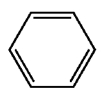 | $CH_2O$ | — | — | 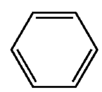 | 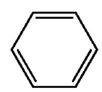 | $C_2H_5$ | |
| 1-2-356 | $C_2H_5$ | 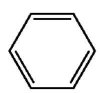 | $OCH_2$ | — | — | 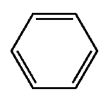 | 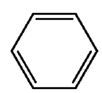 | $C_3H_7$ | |
| 1-2-357 | $C_4H_9O$ | 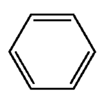 | COO | — | — | 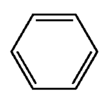 | 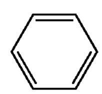 | $C_4H_9$ | |
| 1-2-358 | $C_3H_7$ | 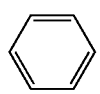 | OCO | — | — | 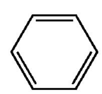 | 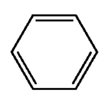 | $C_7H_{15}$ | |
| 1-2-359 | $C_2H_5$ | 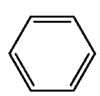 | $CF_2O$ | — | — | 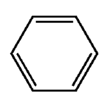 | 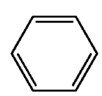 | $C_4H_9$ | |
| 1-2-360 | $CH_3$ | 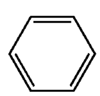 | $OCF_2$ | — | — | 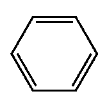 | 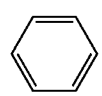 | $C_2H_5$ | |
TABLE 81
(1-2)
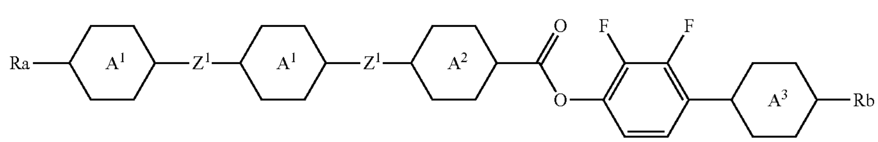
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-361 | $C_3H_7$ | 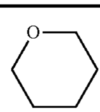 | — | — | — | 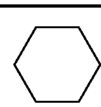 | 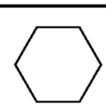 | $C_2H_5$ | |

TABLE 81-continued
(1-2)
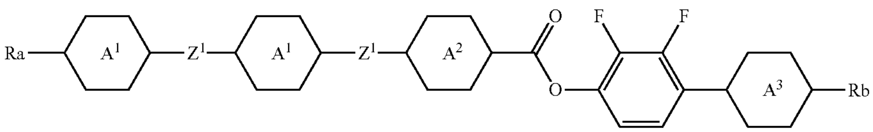
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-362 | $C_5H_{11}$ | 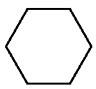 | — | — | — | 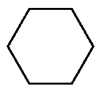 | 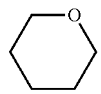 | $C_4H_9$ | |
| 1-2-363 | $CH_3$ | 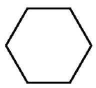 | — | — | — | 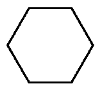 | 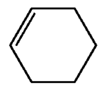 | $C_3H_7$ | |
| 1-2-364 | $C_4H_9$ | 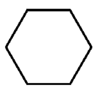 | — | — | — | 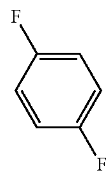 | 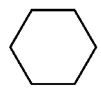 | $C_2H_5$ | |
| 1-2-365 | $CH_3$ | 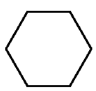 | — | — | — | 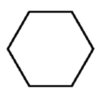 | 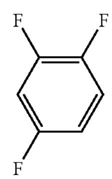 | $OC_2H_5$ | |
| 1-2-366 | $C_2H_5$ | 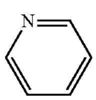 | — | — | — | 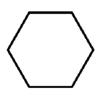 | 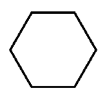 | $C_2H_5$ | |
| 1-2-367 | $C_2H_5$ | 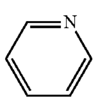 | — | — | — | 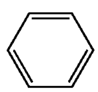 | 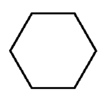 | $C_3H_7$ | |
| 1-2-368 | $C_2H_5$ | 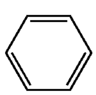 | — | — | — | 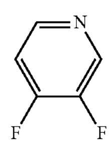 | 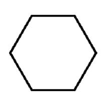 | $C_3H_7$ | |
| 1-2-369 | $C_2H_5O$ | 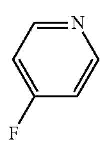 | — | — | — | 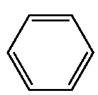 | 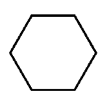 | $C_4H_9$ | |
| 1-2-370 | $C_2H_5$ | 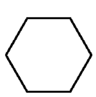 | — | — | — | 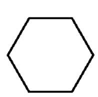 | 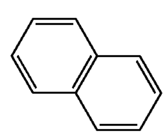 | $C_5H_{11}$ | |
| 1-2-371 | $C_3H_7$ | 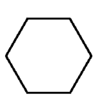 | — | — | — | 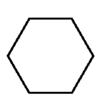 | 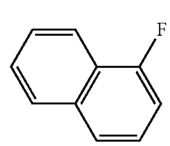 | $C_4H_9$ | |

TABLE 81-continued
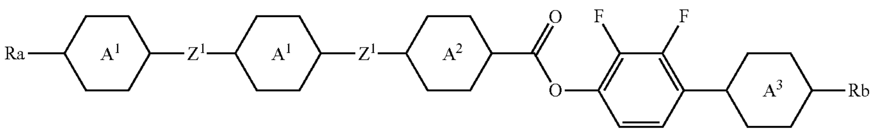
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-372 | $C_3H_7$ | 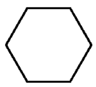 | — | — | — | 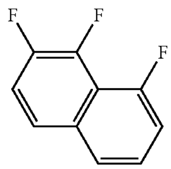 | 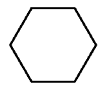 | $C_2H_5$ | |
| 1-2-373 | $C_2H_5$ | 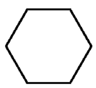 | — | — | — | 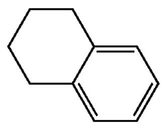 | 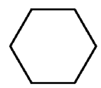 | $C_5H_{11}$ | |
| 1-2-374 | $C_3H_7$ | 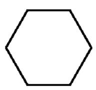 | — | — | — | 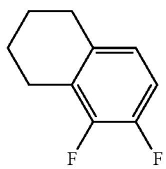 | 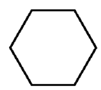 | $C_4H_9$ | |
| 1-2-375 | $C_3H_7$ | 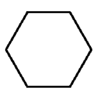 | — | — | — | 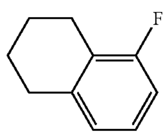 | 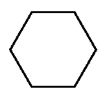 | $C_5H_{11}$ | |
TABLE 82
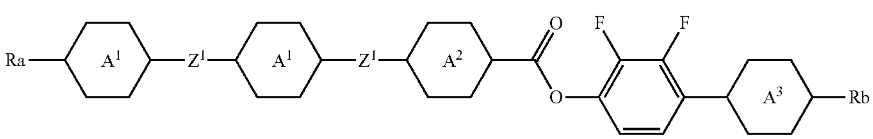
(1-2)
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-376 | $C_4H_9$ | 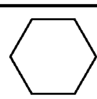 | — | — | — | 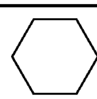 | 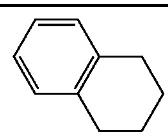 | $C_5H_{11}$ | |
| 1-2-377 | $C_5H_{11}$ | 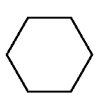 | — | — | — | 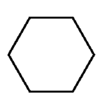 | 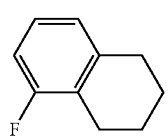 | $C_2H_5$ | |
| 1-2-378 | $C_4H_9$ | 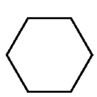 | — | — | — | 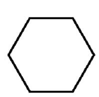 | 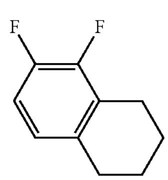 | $C_3H_7$ | |

TABLE 82-continued
(1-2)
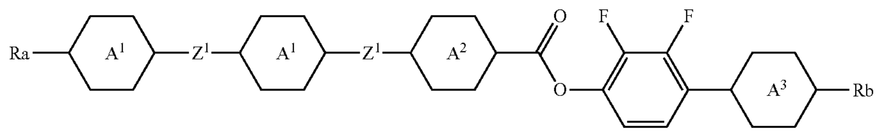
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-379 | $C_3H_7$ | 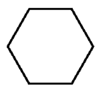 | — | — | — | 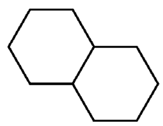 | 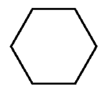 | $C_4H_9$ | |
| 1-2-380 | $C_5H_{11}$ | 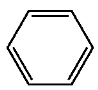 | — | — | — | 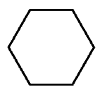 | 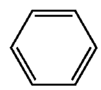 | $C_3H_7$ | |
| 1-2-381 | $C_3H_7$ | 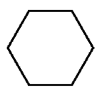 | — | — | — | 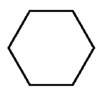 | 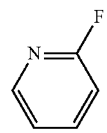 | $OC_4H_9$ | |
| 1-2-382 | $C_3H_7$ | 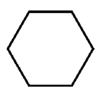 | — | — | — | 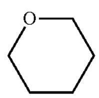 | 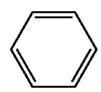 | $C_2H_5$ | |
| 1-2-383 | $C_5H_{11}$ | 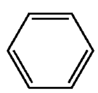 | — | — | — | 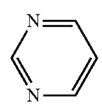 | 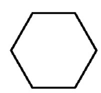 | $C_3H_7$ | |
| 1-2-384 | $C_5H_{11}$ | 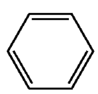 | — | — | — | 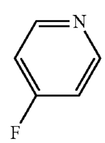 | 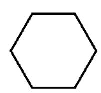 | $C_4H_9$ | |
| 1-2-385 | $C_2H_5O$ | 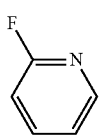 | — | — | — | 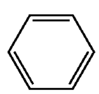 | 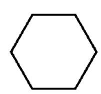 | $C_5H_{11}$ | |
| 1-2-386 | $C_2H_5O$ | 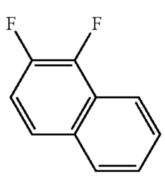 | — | — | — | 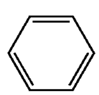 | 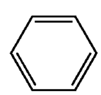 | $C_4H_9$ | |
| 1-2-387 | $C_5H_{11}$ | 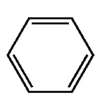 | — | — | — | 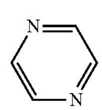 | 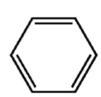 | $OC_2H_5$ | |
| 1-2-388 | $C_2H_5O$ | 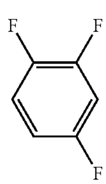 | — | — | — | 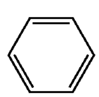 | 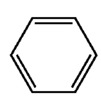 | $C_5H_{11}$ | |

TABLE 82-continued
(1-2)
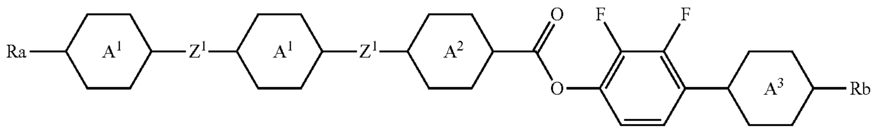
| No. | Ra | A¹ | Z¹ | A¹ | Z¹ | A² | A³ | Rb | Physical property values |
|---|---|---|---|---|---|---|---|---|---|
| 1-2-389 | $C_5H_{11}$ | 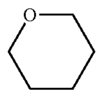 | — | — | — | 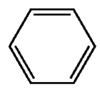 | 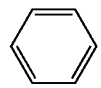 | $C_3H_7$ | |
| 1-2-390 | $C_3H_7$ | 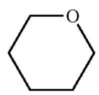 | — | — | — | 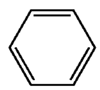 | 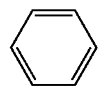 | $C_5H_{11}$ | |
TABLE 83
(1-2)
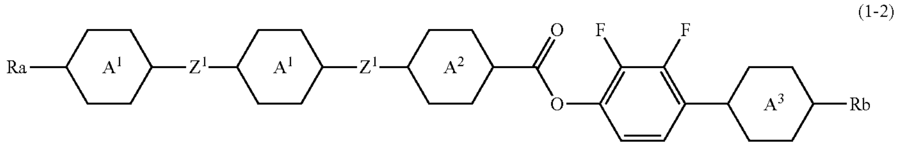
| No. | Ra | A¹ | Z¹ | A¹ | Z¹ | A² | A³ | Rb | Physical property values |
|---|---|---|---|---|---|---|---|---|---|
| 1-2-391 | $C_3H_7$ | 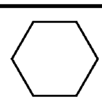 | — | 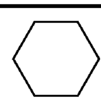 | — | 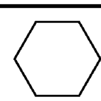 | 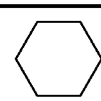 | $C_5H_{11}$ | |
| 1-2-392 | $C_5H_{11}$ | 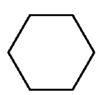 | — | 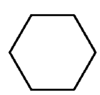 | — | 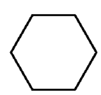 | 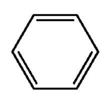 | $C_3H_7$ | |
| 1-2-393 | $C_3H_7$ | 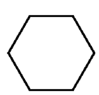 | — | 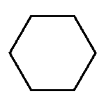 | — | 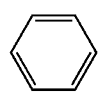 | 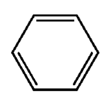 | $C_5H_{11}$ | |
| 1-2-394 | $C_5H_{11}$ | 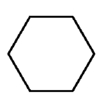 | — | 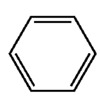 | — | 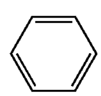 | 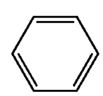 | $C_3H_7$ | |
| 1-2-395 | $C_3H_7$ | 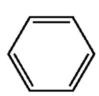 | — | 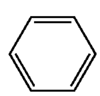 | — | 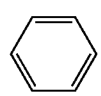 | 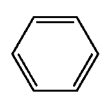 | $C_5H_{11}$ | |
| 1-2-396 | $C_5H_{11}$ | 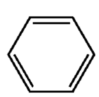 | — | 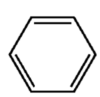 | — | 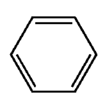 | 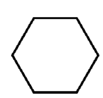 | $C_3H_7$ | |
| 1-2-397 | $C_3H_7$ | 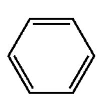 | — | 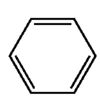 | — | 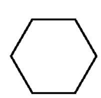 | 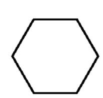 | $C_5H_{11}$ | |
| 1-2-398 | $C_5H_{11}$ | 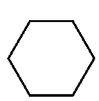 | — | 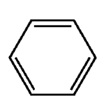 | — | 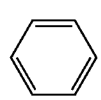 | 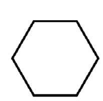 | $C_3H_7$ | |

TABLE 83-continued
(1-2)
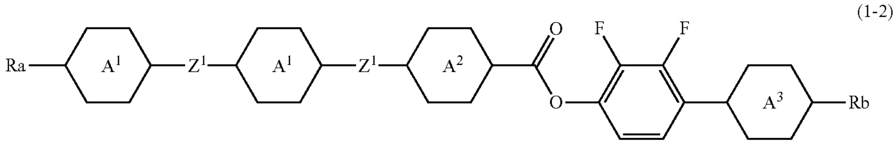
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-399 | $C_3H_7$ | 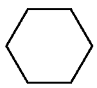 | — | 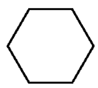 | — | 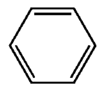 | 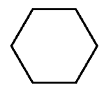 | $C_5H_{11}$ | |
| 1-2-400 | $C_5H_{11}$ | 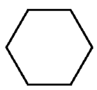 | $CH_2CH_2$ | 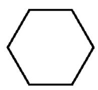 | — | 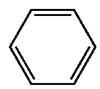 | 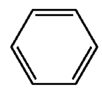 | $C_3H_7$ | |
| 1-2-401 | $C_3H_7$ | 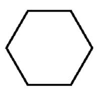 | $CH_2CH_2$ |  | — | 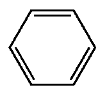 | 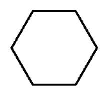 | $C_5H_{11}$ | |
| 1-2-402 | $C_5H_{11}$ | 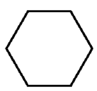 | — | 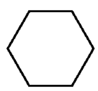 | $CH_2CH_2$ | 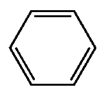 | 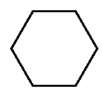 | $C_3H_7$ | |
| 1-2-403 | $C_3H_7$ | 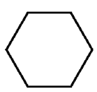 | — | 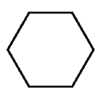 | $CH_2CH_2$ | 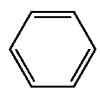 | 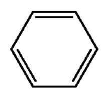 | $C_5H_{11}$ | |
| 1-2-404 | $C_5H_{11}$ | 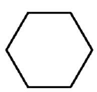 | — | 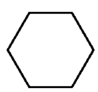 | — | 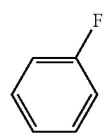 | 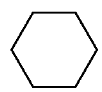 | $C_3H_7$ | |
| 1-2-405 | $C_3H_7$ | 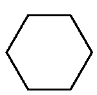 | — | 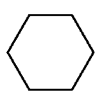 | — | 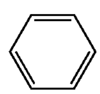 | 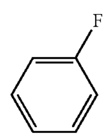 | $C_5H_{11}$ | |
TABLE 84
(1-2)
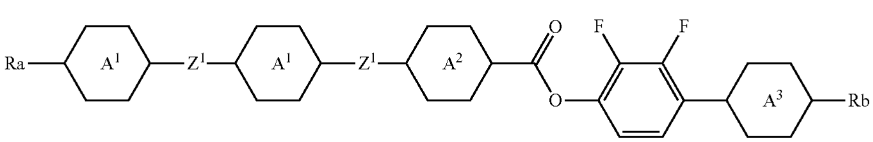
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-406 | $C_5H_{11}$ | 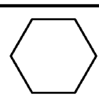 | — | 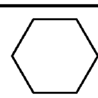 | — | 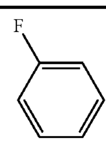 | 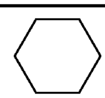 | $C_3H_7$ | |
| 1-2-407 | $C_3H_7$ | 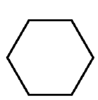 | — | 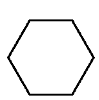 | — | 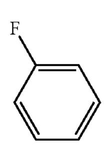 | 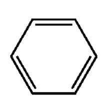 | $C_5H_{11}$ | |

TABLE 84-continued
(1-2)
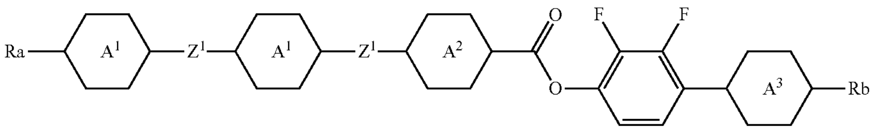
| No. | Ra | $A^1$ | $Z^1$ | $A^1$ | $Z^1$ | $A^2$ | $A^3$ | Rb | Physical property values |
|---|---|---|---|---|---|---|---|---|---|
| 1-2-408 | $C_3H_7$ | 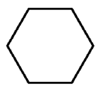 | — | 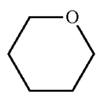 | — | 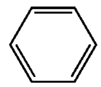 | 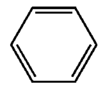 | $C_5H_{11}$ | |
| 1-2-409 | $C_3H_7$ | 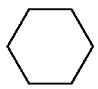 | — | 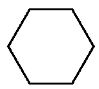 | — | 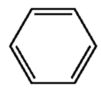 | 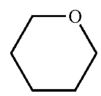 | $C_5H_{11}$ | |
| 1-2-410 | $C_3H_7$ | 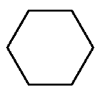 | — | 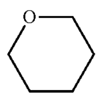 | — | 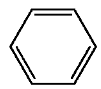 | 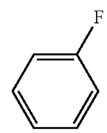 | $C_5H_{11}$ | |
TABLE 85
(2-2)
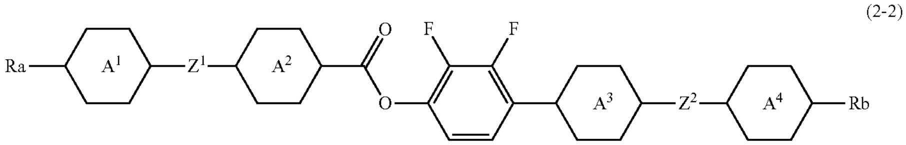
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-1 | $CH_3$ | — | — | 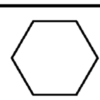 | 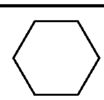 | — | 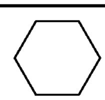 | $CH_3$ | |
| 2-2-2 | $CH_3$ | — | — | 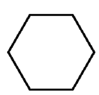 | 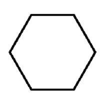 | — | 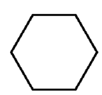 | $C_2H_5$ | |
| 2-2-3 | $CH_3$ | — | — | 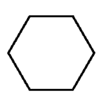 | 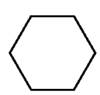 | — | 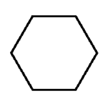 | $C_3H_7$ | |
| 2-2-4 | $CH_3$ | — | — | 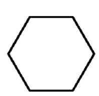 | 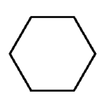 | — | 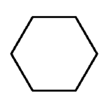 | $C_4H_9$ | |
| 2-2-5 | $CH_3$ | — | — | 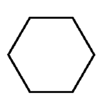 | 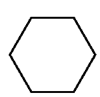 | — | 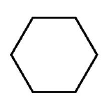 | $C_5H_{11}$ | |
| 2-2-6 | $C_2H_5$ | — | — | 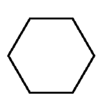 | 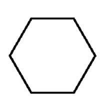 | — | 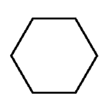 | $CH_3$ | |
| 2-2-7 | $C_2H_5$ | — | — | 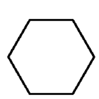 | 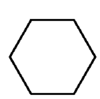 | — | 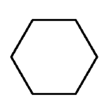 | $C_2H_5$ | |

TABLE 85-continued
(2-2)
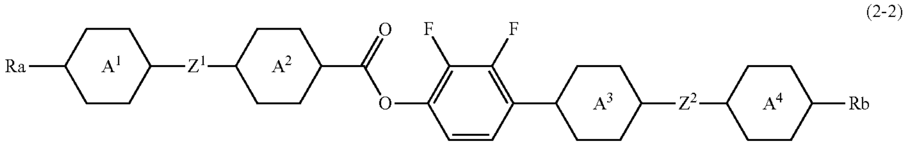
| No. | Ra | A1 | Z1 | A2 | A3 | Z2 | A4 | Rb | Physical property values |
|---|---|---|---|---|---|---|---|---|---|
| 2-2-8 | $C_2H_5$ | — | — | 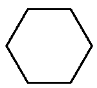 | 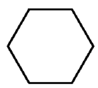 | — | 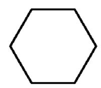 | $C_3H_7$ | |
| 2-2-9 | $C_2H_5$ | — | — | 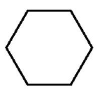 | 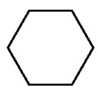 | — | 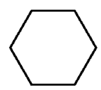 | $C_4H_9$ | |
| 2-2-10 | $C_2H_5$ | — | — | 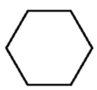 | 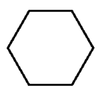 | — | 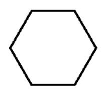 | $C_5H_{11}$ | |
| 2-2-11 | $C_3H_7$ | — | — | 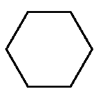 | 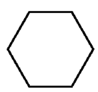 | — | 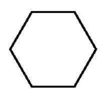 | $CH_3$ | |
| 2-2-12 | $C_3H_7$ | — | — | 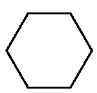 | 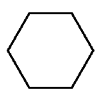 | — | 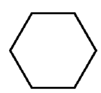 | $C_2H_5$ | |
| 2-2-13 | $C_3H_7$ | — | — | 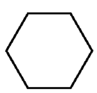 | 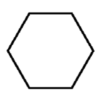 | — | 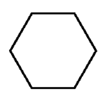 | $C_3H_7$ | |
| 2-2-14 | $C_3H_7$ | — | — | 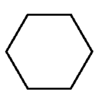 | 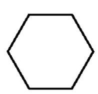 | — | 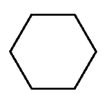 | $C_4H_9$ | |
| 2-2-15 | $C_3H_7$ | — | — | 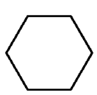 | 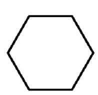 | — | 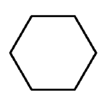 | $C_5H_{11}$ | |
TABLE 86
(2-2)
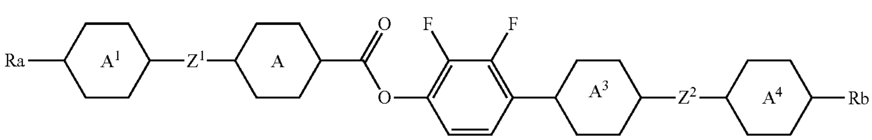
| No. | Ra | A1 | Z1 | A2 | A3 | Z2 | A4 | Rb | Physical property values |
|---|---|---|---|---|---|---|---|---|---|
| 2-2-16 | $C_4H_9$ | — | — | 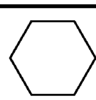 | 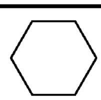 | — | 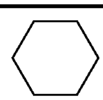 | $CH_3$ | |
| 2-2-17 | $C_4H_9$ | — | — | 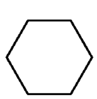 | 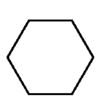 | — | 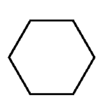 | $C_2H_5$ | |
| 2-2-18 | $C_4H_9$ | — | — | 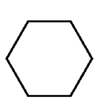 | 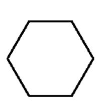 | — | 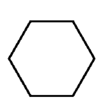 | $C_3H_7$ | |

TABLE 86-continued
(2-2)
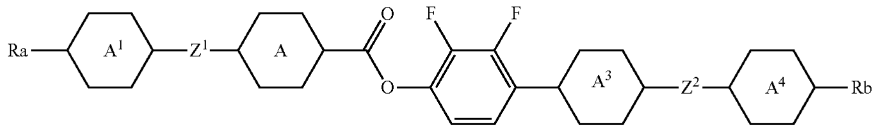
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-19 | $C_4H_9$ | — | — | 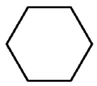 | 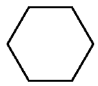 | — | 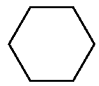 | $C_4H_9$ | |
| 2-2-20 | $C_4H_9$ | — | — | 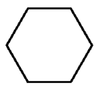 | 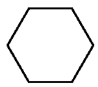 | — | 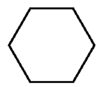 | $C_5H_{11}$ | |
| 2-2-21 | $C_5H_{11}$ | — | — | 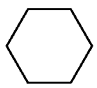 | 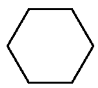 | — | 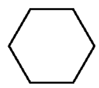 | $CH_3$ | |
| 2-2-22 | $C_5H_{11}$ | — | — | 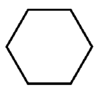 | 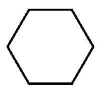 | — | 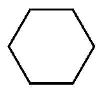 | $C_2H_5$ | |
| 2-2-23 | $C_5H_{11}$ | — | — | 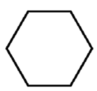 | 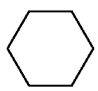 | — | 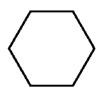 | $C_3H_7$ | Cr 84.5 SmA 187.8 N 310.3 Iso $T_{NI}$: 251.9° C., $\Delta\epsilon$ : −3.2, $\Delta$ n: 0.114 |
| 2-2-24 | $C_5H_{11}$ | — | — | 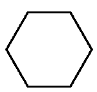 | 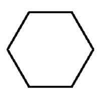 | — | 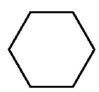 | $C_4H_9$ | |
| 2-2-25 | $C_5H_{11}$ | — | — | 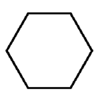 | 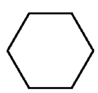 | — | 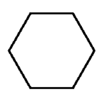 | $C_5H_{11}$ | |
| 2-2-26 | $C_2H_5O$ | — | — | 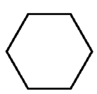 | 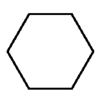 | — | 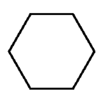 | $C_4H_9$ | |
| 2-2-27 | $C_5H_{11}$ | — | — | 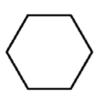 | 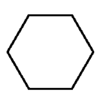 | — | 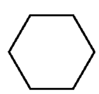 | $OC_2H_5$ | |
| 2-2-28 | $C_2H_5O$ | — | — | 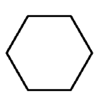 | 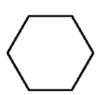 | — | 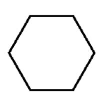 | $OC_4H_9$ | |
| 2-2-29 | $CH_2{=}CH$ | — | — | 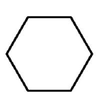 | 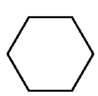 | — | 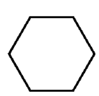 | $C_3H_7$ | |
| 2-2-30 | $CH_2{=}CH$ | — | — | 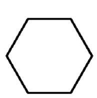 | 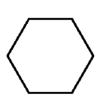 | — | 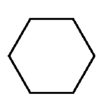 | $C_5H_{11}$ | |

TABLE 87
(2-2)
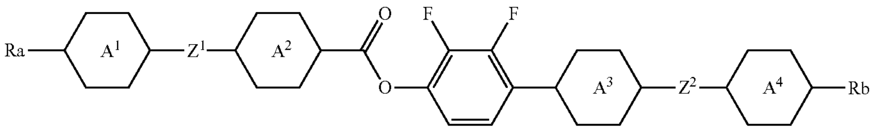
| No. | Ra | A¹ | Z¹ | A² | A³ | Z² | A⁴ | Rb | Physical property values |
|---|---|---|---|---|---|---|---|---|---|
| 2-2-31 | $CH_3CH{=}CH$ | — | — | 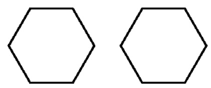 | | — | 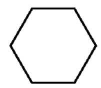 | $C_3H_7$ | |
| 2-2-32 | $CH_3CH{=}CH$ | — | — | 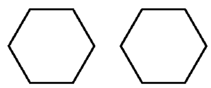 | | — | 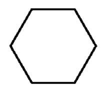 | $C_5H_{11}$ | |
| 2-2-33 | $CH_2{=}CHC_2H_4$ | — | — | 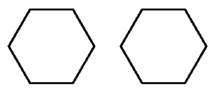 | | — | 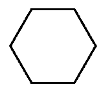 | $C_3H_7$ | |
| 2-2-34 | $CH_2{=}CHC_2H_4$ | — | — | 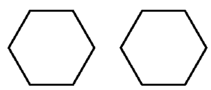 | | — | 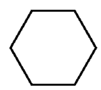 | $C_5H_{11}$ | |
| 2-2-35 | $C_3H_7CH{=}CH$ | — | — | 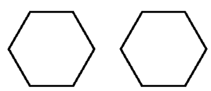 | | — | 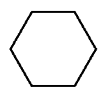 | $C_2H_5$ | |
| 2-2-36 | $C_3H_7CH{=}CH$ | — | — | 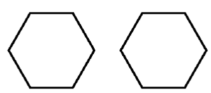 | | — | 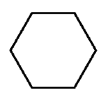 | $C_3H_7$ | |
| 2-2-37 | $CH_3CH{=}CHC_2H_4$ | — | — | 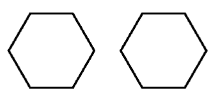 | | — | 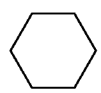 | $CH_3$ | |
| 2-2-38 | $CH_3CH{=}CHC_2H_4$ | — | — | 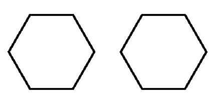 | | — | 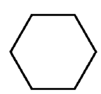 | $C_2H_5$ | |
| 2-2-39 | $C_3H_7$ | — | — | 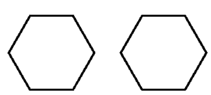 | | — | 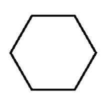 | $CH{=}CH_2$ | |
| 2-2-40 | $C_5H_{11}$ | — | — | 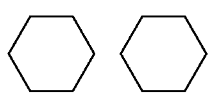 | | — | 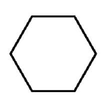 | $CH{=}CH_2$ | |
| 2-2-41 | $C_3H_7$ | — | — | 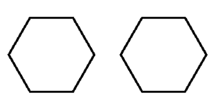 | | — | 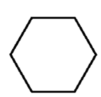 | $CH{=}CHCH_3$ | |
| 2-2-42 | $C_4H_9$ | — | — | 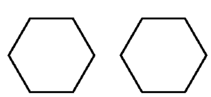 | | — | 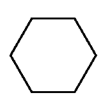 | $CH{=}CHCH_3$ | |
| 2-2-43 | $C_2H_5$ | — | — | 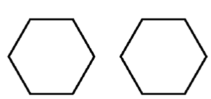 | | — | 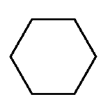 | $C_2H_4CH{=}CH_2$ | |
| 2-2-44 | $C_3H_7$ | — | — | 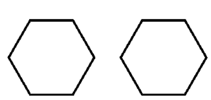 | | — | 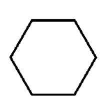 | $C_2H_4CH{=}CH_2$ | |

TABLE 87-continued
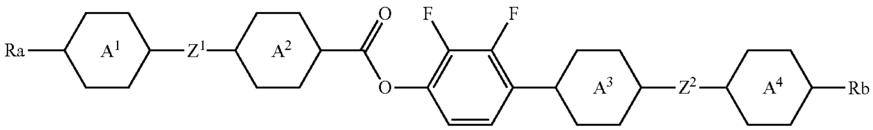
(2-2)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-45 | $CH_3$ | — | — | 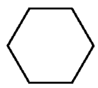 | 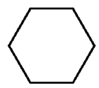 | — | 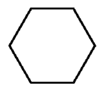 | $CH{=}CHC_3H_7$ | |
TABLE 88
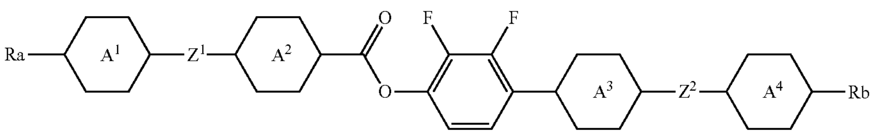
(2-2)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-46 | $C_2H_5$ | — | — | 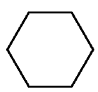 | 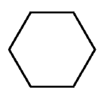 | — | 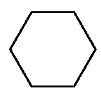 | $CH{=}CHC_3H_7$ | |
| 2-2-47 | $C_2H_5$ | — | — | 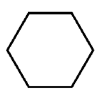 | 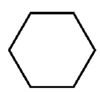 | — | 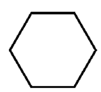 | $C_2H_4CH{=}CHCH_3$ | |
| 2-2-48 | $C_3H_7$ | — | — | 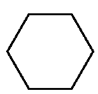 | 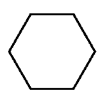 | — | 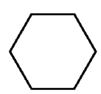 | $C_2H_4CH{=}CHCH_3$ | |
| 2-2-49 | $CH_2{=}CH$ | — | — | 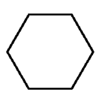 | 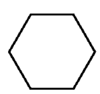 | — | 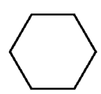 | $C_2H_4CH{=}CH_2$ | |
| 2-2-50 | $CH_3CH{=}CH$ | — | — | 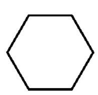 | 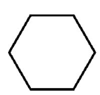 | — | 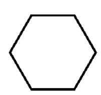 | $CH{=}CH_2$ | |
| 2-2-51 | $C_3H_7OCH_2$ | — | — | 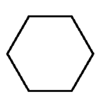 | 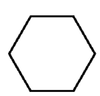 | — | 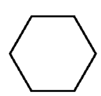 | $C_3H_7$ | |
| 2-2-52 | $C_5H_{11}$ | — | — | 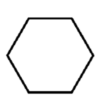 | 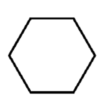 | — | 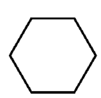 | $OC_2H_4CH{=}CH_2$ | |
| 2-2-53 | $C_3H_7$ | — | — | 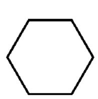 | 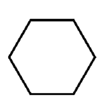 | $CH_2CH_2$ | 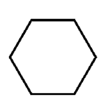 | $C_2H_5$ | |
| 2-2-54 | $C_5H_{11}$ | — | — | 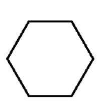 | 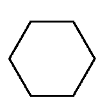 | $CH{=}CH$ | 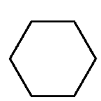 | $C_3H_7$ | |

TABLE 88-continued
(2-2)
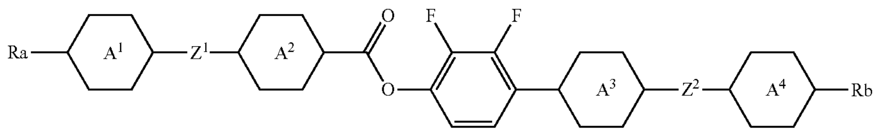
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-55 | $C_3H_7$ | — | — | 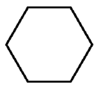 | 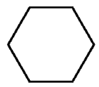 | $CH_2O$ | 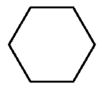 | $C_2H_5$ | |
| 2-2-56 | $C_5H_{11}$ | — | — | 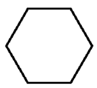 | 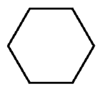 | $OCH_2$ | 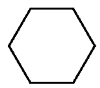 | $C_3H_7$ | |
| 2-2-57 | H | — | — | 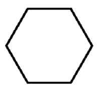 | 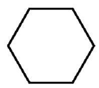 | COO | 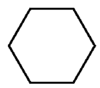 | $C_4H_9$ | |
| 2-2-58 | $C_7H_{15}$ | — | — | 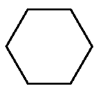 | 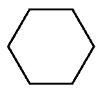 | OCO | 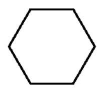 | $C_4H_9$ | |
| 2-2-59 | $C_2H_5$ | — | — | 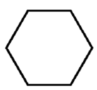 | 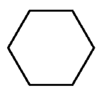 | $CF_2O$ | 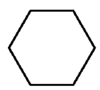 | $C_6H_{13}$ | |
| 2-2-60 | $CH_3$ | — | — | 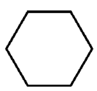 | 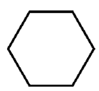 | $OCF_2$ | 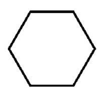 | $C_2H_5$ | |
TABLE 89
(2-2)
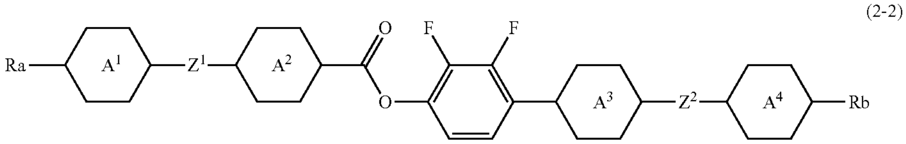
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-61 | $CH_3$ | — | — | 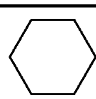 | 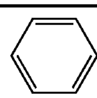 | — | 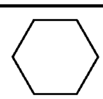 | $CH_3$ | |
| 2-2-62 | $CH_3$ | — | — | 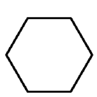 | 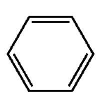 | — | 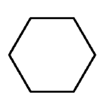 | $C_2H_5$ | |
| 2-2-63 | $CH_3$ | — | — | 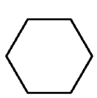 | 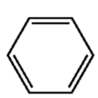 | — | 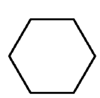 | $C_3H_7$ | |
| 2-2-64 | $CH_3$ | — | — | 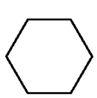 | 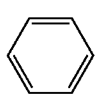 | — | 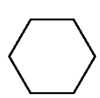 | $C_4H_9$ | |
| 2-2-65 | $CH_3$ | — | — | 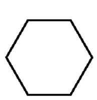 | 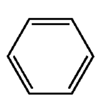 | — | 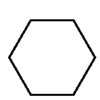 | $C_5H_{11}$ | |

TABLE 89-continued
(2-2)
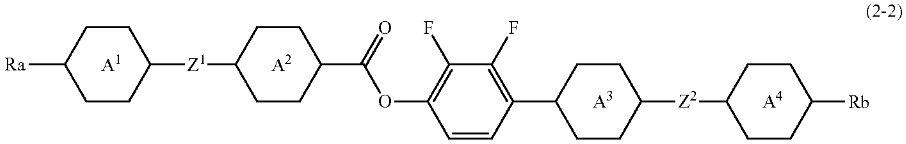
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-66 | $C_2H_5$ | — | — | 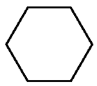 | 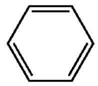 | — | 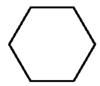 | $CH_3$ | |
| 2-2-67 | $C_2H_5$ | — | — | 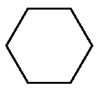 | 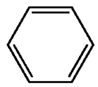 | — | 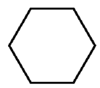 | $C_2H_5$ | |
| 2-2-68 | $C_2H_5$ | — | — | 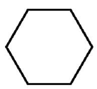 | 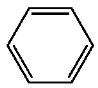 | — | 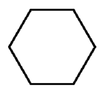 | $C_3H_7$ | |
| 2-2-69 | $C_2H_5$ | — | — | 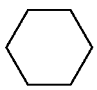 | 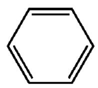 | — | 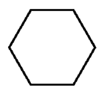 | $C_4H_9$ | |
| 2-2-70 | $C_2H_5$ | — | — | 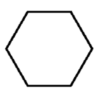 | 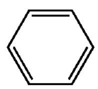 | — | 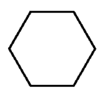 | $C_5H_{11}$ | |
| 2-2-71 | $C_3H_7$ | — | — | 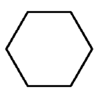 | 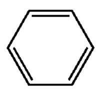 | — | 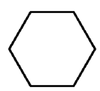 | $CH_3$ | |
| 2-2-72 | $C_3H_7$ | — | — | 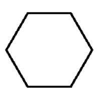 | 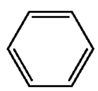 | — | 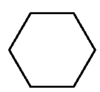 | $C_2H_5$ | |
| 2-2-73 | $C_3H_7$ | — | — | 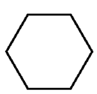 | 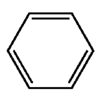 | — | 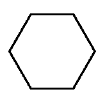 | $C_3H_7$ | |
| 2-2-74 | $C_3H_7$ | — | — | 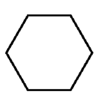 | 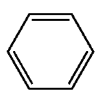 | — | 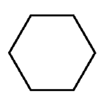 | $C_4H_9$ | |
| 2-2-75 | $C_3H_7$ | — | — | 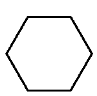 | 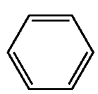 | — | 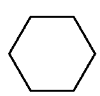 | $C_5H_{11}$ | |
TABLE 90
(2-2)
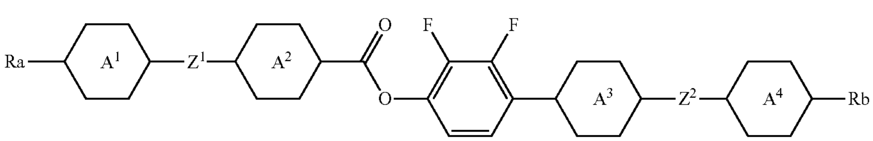
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-76 | $C_4H_9$ | — | — | 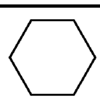 | 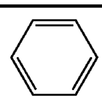 | — | 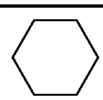 | $CH_3$ | |

TABLE 90-continued
(2-2)
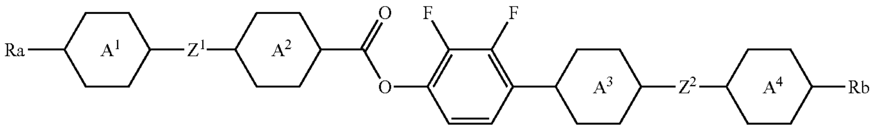
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-77 | $C_4H_9$ | — | — | 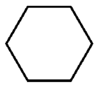 | 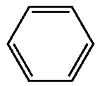 | — | 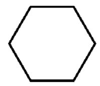 | $C_2H_5$ | |
| 2-2-78 | $C_4H_9$ | — | — | 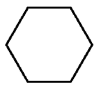 | 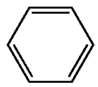 | — | 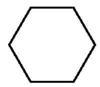 | $C_3H_7$ | |
| 2-2-79 | $C_4H_9$ | — | — | 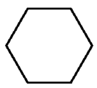 | 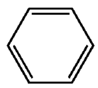 | — | 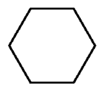 | $C_4H_9$ | |
| 2-2-80 | $C_4H_9$ | — | — | 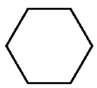 | 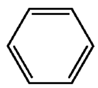 | — | 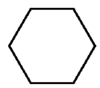 | $C_5H_{11}$ | |
| 2-2-81 | $C_5H_{11}$ | — | — | 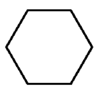 | 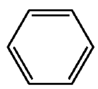 | — | 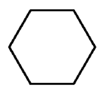 | $CH_3$ | |
| 2-2-82 | $C_5H_{11}$ | — | — | 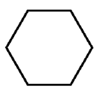 |  | — | 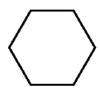 | $C_2H_5$ | |
| 2-2-83 | $C_5H_{11}$ | — | — | 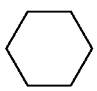 | 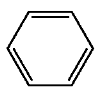 | — | 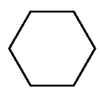 | $C_3H_7$ | |
| 2-2-84 | $C_5H_{11}$ | — | — | 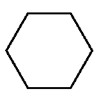 | 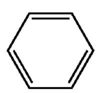 | — | 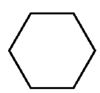 | $C_4H_9$ | |
| 2-2-85 | $C_5H_{11}$ | — | — | 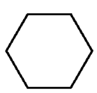 | 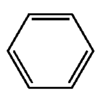 | — | 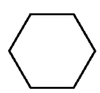 | $C_3H_7$ | |
| 2-2-86 | $C_2H_5O$ | — | — | 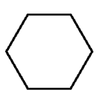 | 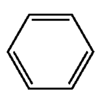 | — | 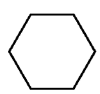 | $C_4H_9$ | |
| 2-2-87 | $C_5H_{11}$ | — | — | 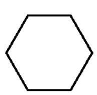 | 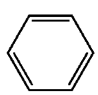 | — | 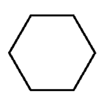 | $OC_2H_5$ | |
| 2-2-88 | $C_2H_5O$ | — | — | 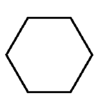 | 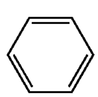 | — | 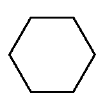 | $OC_4H_9$ | |
| 2-2-89 | $C_5H_{11}$ | — | — | 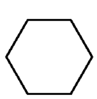 | 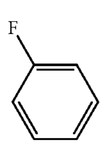 | — | 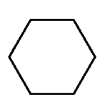 | $C_3H_7$ | |

TABLE 90-continued
(2-2)
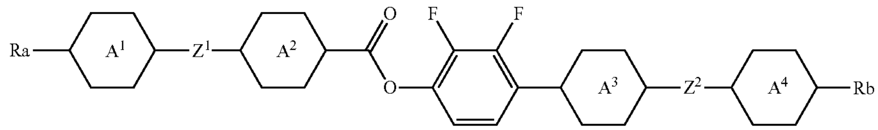
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-90 | $C_3H_7$ | — | — | 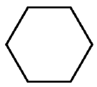 | 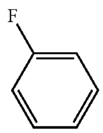 | — | 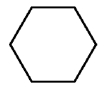 | $C_5H_{11}$ | |
TABLE 91
(2-2)
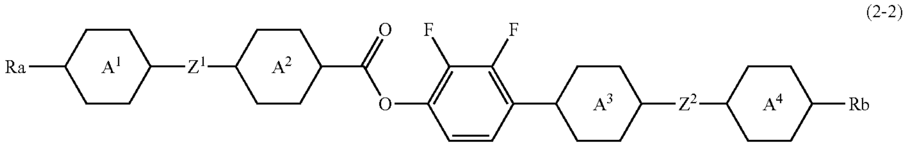
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-91 | $C_2H_5$ | — | — | 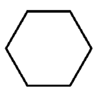 | 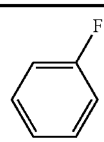 | — | 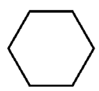 | $C_4H_9$ | |
| 2-2-92 | $C_5H_{11}$ | — | — | 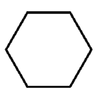 | 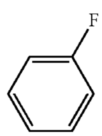 | — | 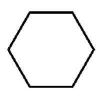 | $C_2H_5$ | |
| 2-2-93 | $CH_2{=}CH$ | — | — | 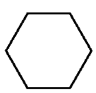 | 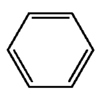 | — | 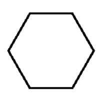 | $C_3H_7$ | |
| 2-2-94 | $CH_2{=}CH$ | — | — | 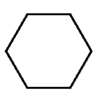 | 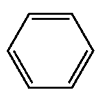 | — | 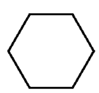 | $C_5H_{11}$ | |
| 2-2-95 | $CH_3CH{=}CH$ | — | — | 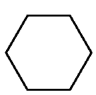 | 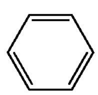 | — | 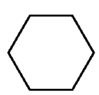 | $C_2H_5$ | |
| 2-2-96 | $CH_2{=}CHC_2H_4$ | — | — | 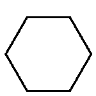 | 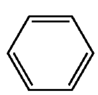 | — | 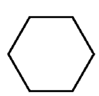 | $C_3H_7$ | |
| 2-2-97 | $C_3H_7CH{=}CH$ | — | — | 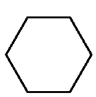 | 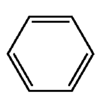 | — | 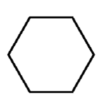 | $CH_3$ | |
| 2-2-98 | $CH_3CH{=}CHC_2H_4$ | — | — | 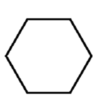 | 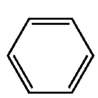 | — | 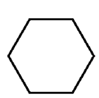 | $C_2H_5$ | |

TABLE 91-continued
(2-2)
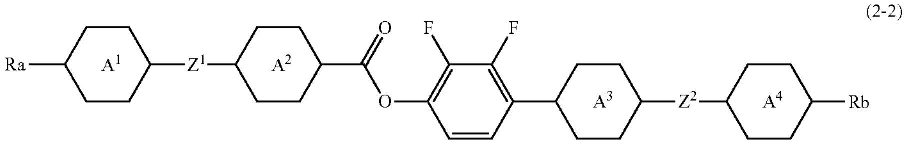
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-99 | $C_3H_7$ | — | — | 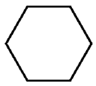 |  | — | 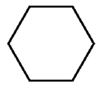 | $CH{=}CH_2$ | |
| 2-2-100 | $C_5H_{11}$ | — | — | 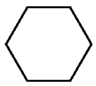 |  | — | 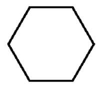 | $CH{=}CH_2$ | |
| 2-2-101 | $C_3H_7$ | — | — | 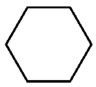 | 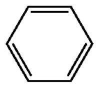 | — | 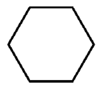 | $CH{=}CHCH_3$ | |
| 2-2-102 | $C_4H_9$ | — | — | 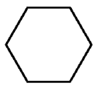 |  | — | 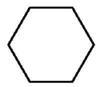 | $CH{=}CHCH_3$ | |
| 2-2-103 | $C_2H_5$ | — | — | 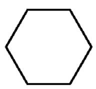 |  | — | 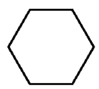 | $C_2H_4CH{=}CH_2$ | |
| 2-2-104 | $C_3H_7$ | — | — | 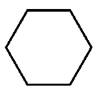 |  | — | 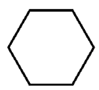 | $C_2H_4CH{=}CH_2$ | |
| 2-2-105 | $CH_3$ | — | — | 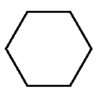 | 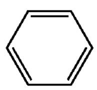 | — | 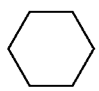 | $CH{=}CHC_3H_7$ | |
TABLE 92
(2-2)
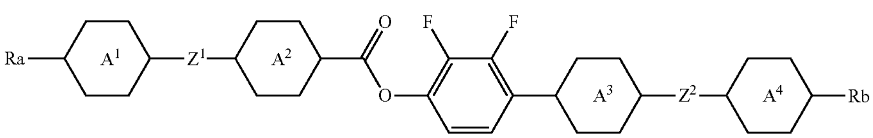
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-106 | $C_2H_5$ | — | — | 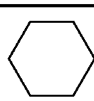 | 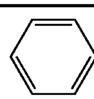 | — | 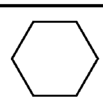 | $CH{=}CHC_3H_7$ | |
| 2-2-107 | $C_2H_5$ | — | — | 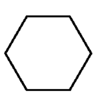 | 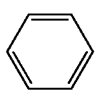 | — | 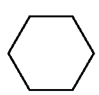 | $C_2H_4CH{=}CHCH_3$ | |
| 2-2-108 | $C_3H_7$ | — | — | 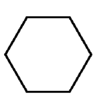 | 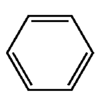 | — | 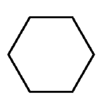 | $C_2H_4CH{=}CHCH_3$ | |
| 2-2-109 | $CH_2{=}CH$ | — | — | 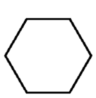 | 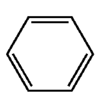 | — | 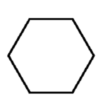 | $C_2H_4CH{=}CH_2$ | |

TABLE 92-continued
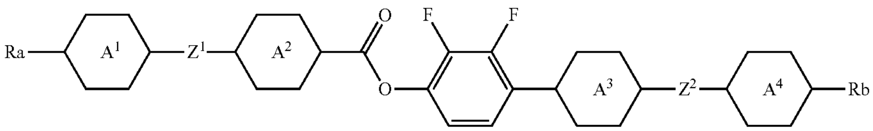
(2-2)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-110 | $CH_3CH{=}CH$ | — | — | 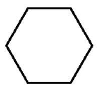 | 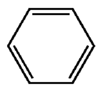 | — | 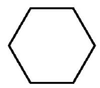 | $CH{=}CH_2$ | |
| 2-2-111 | $C_5H_{11}OCH_2$ | — | — | 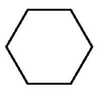 |  | — | 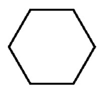 | $C_3H_7$ | |
| 2-2-112 | $C_3H_7$ | — | — | 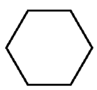 | 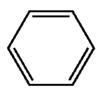 | — | 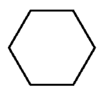 | $OC_2H_4CH{=}CH_2$ | |
| 2-2-113 | $C_4H_9$ | — | — | 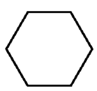 | 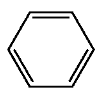 | $CH_2CH_2$ | 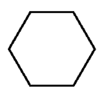 | $C_2H_5$ | |
| 2-2-114 | $C_5H_{11}$ | — | — | 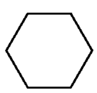 | 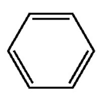 | $CH_2CH_2$ | 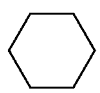 | $C_3H_7$ | |
| 2-2-115 | $C_3H_7$ | — | — | 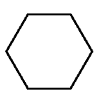 | 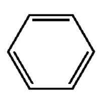 | $CH_2O$ | 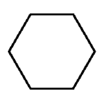 | $C_2H_5$ | |
| 2-2-116 | $C_5H_{11}$ | — | — | 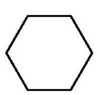 | 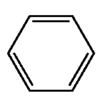 | $OCH_2$ | 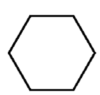 | $C_6H_{13}$ | |
| 2-2-117 | $C_5H_{11}$ | — | — | 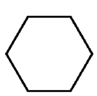 | 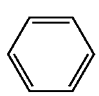 | COO | 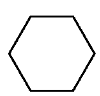 | $C_4H_9$ | |
| 2-2-118 | $C_2H_5$ | — | — | 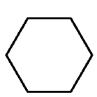 | 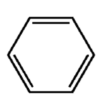 | OCO | 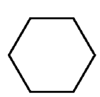 | $C_4H_9$ | |
| 2-2-119 | $C_2H_5$ | — | — | 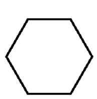 | 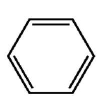 | $CF_2O$ | 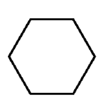 | $CH_3$ | |
| 2-2-120 | $C_4H_9$ | — | — | 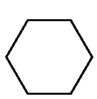 | 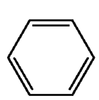 | $OCF_2$ | 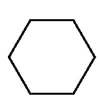 | $C_2H_5$ | |

TABLE 93
(2-2)
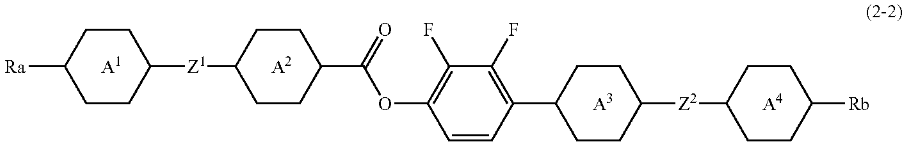
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-121 | $CH_3$ | — | — | 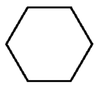 |  | — | 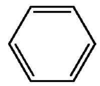 | $CH_3$ | |
| 2-2-122 | $CH_3$ | — | — | 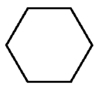 | 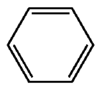 | — | 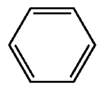 | $C_2H_5$ | |
| 2-2-123 | $CH_3$ | — | — | 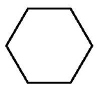 | 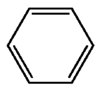 | — | 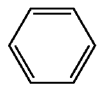 | $C_3H_7$ | |
| 2-2-124 | $CH_3$ | — | — | 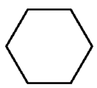 | 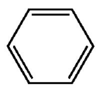 | — | 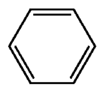 | $C_4H_9$ | |
| 2-2-125 | $CH_3$ | — | — | 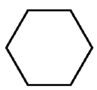 | 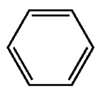 | — | 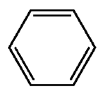 | $C_5H_{11}$ | |
| 2-2-126 | $C_2H_5$ | — | — | 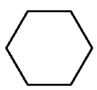 | 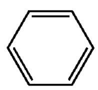 | — | 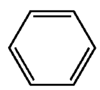 | $CH_3$ | |
| 2-2-127 | $C_2H_5$ | — | — | 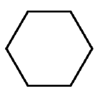 | 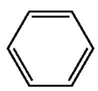 | — | 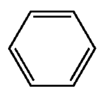 | $C_2H_5$ | |
| 2-2-128 | $C_2H_5$ | — | — | 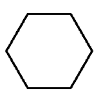 | 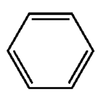 | — | 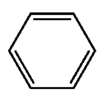 | $C_3H_7$ | |
| 2-2-129 | $C_2H_5$ | — | — | 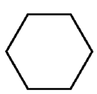 | 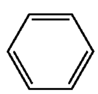 | — | 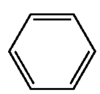 | $C_4H_9$ | |
| 2-2-130 | $C_2H_5$ | — | — | 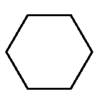 | 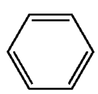 | — | 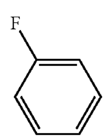  | $C_5H_{11}$ | |
| 2-2-131 | $C_3H_7$ | — | — | 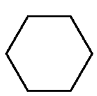 | 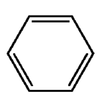 | — | 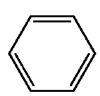 | $CH_3$ | |
| 2-2-132 | $C_3H_7$ | — | — | 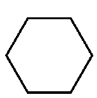 | 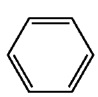 | — | 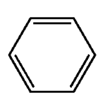 | $C_2H_5$ | |
| 2-2-133 | $C_3H_7$ | — | — | 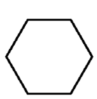 | 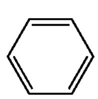 | — | 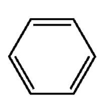 | $C_3H_7$ | |

TABLE 93-continued
(2-2)
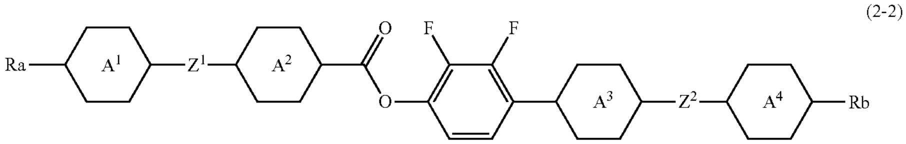
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-134 | $C_3H_7$ | — | — | 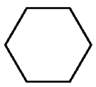 | 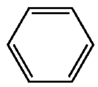 | — | 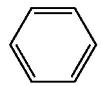 | $C_4H_9$ | |
| 2-2-135 | $C_3H_7$ | — | — | 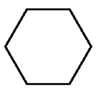 | 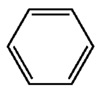 | — | 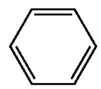 | $C_5H_{11}$ | |
TABLE 94
(2-2)
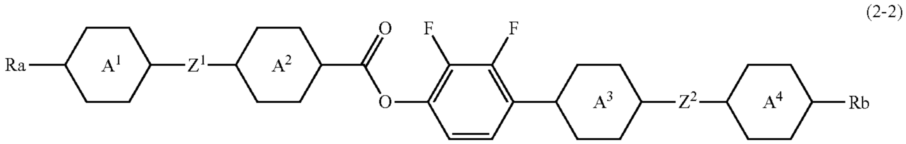
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-136 | $C_4H_9$ | — | — | 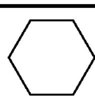 | 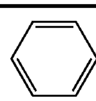 | — | 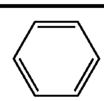 | $CH_3$ | |
| 2-2-137 | $C_4H_9$ | — | — | 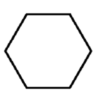 | 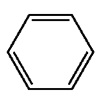 | — | 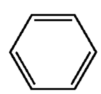 | $C_2H_5$ | |
| 2-2-138 | $C_4H_9$ | — | — | 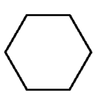 | 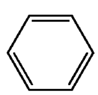 | — | 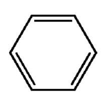 | $C_3H_7$ | |
| 2-2-139 | $C_4H_9$ | — | — | 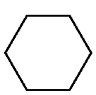 | 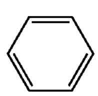 | — | 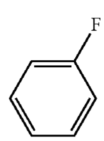 | $C_4H_9$ | |
| 2-2-140 | $C_4H_9$ | — | — | 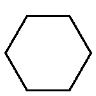 | 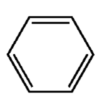 | — | 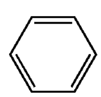 | $C_5H_{11}$ | |
| 2-2-141 | $C_5H_{11}$ | — | — | 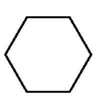 | 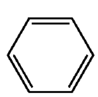 | — | 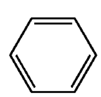 | $CH_3$ | |
| 2-2-142 | $C_5H_{11}$ | — | — | 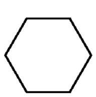 | 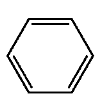 | — | 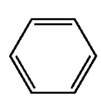 | $C_2H_5$ | |
| 2-2-143 | $C_5H_{11}$ | — | — | 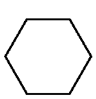 | 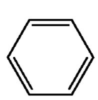 | — | 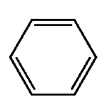 | $C_3H_7$ | |

TABLE 94-continued
(2-2)
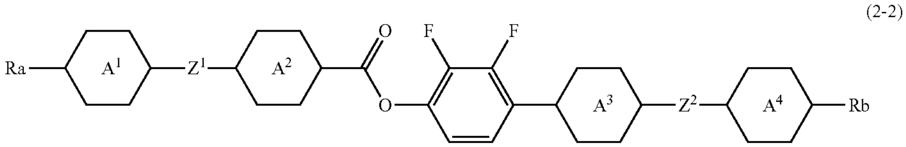
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-144 | $C_5H_{11}$ | — | — | 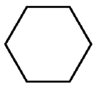 | 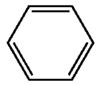 | — | 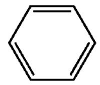 | $C_4H_9$ | |
| 2-2-145 | $C_5H_{11}$ | — | — | 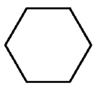 | 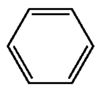 | — | 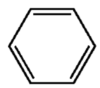 | $C_5H_{11}$ | |
| 2-2-146 | $C_2H_5O$ | — | — | 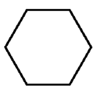 | 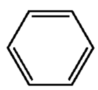 | — | 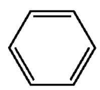 | $C_4H_9$ | |
| 2-2-147 | $C_5H_{11}$ | — | — | 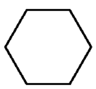 | 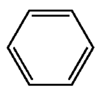 | — | 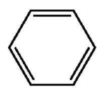 | $OC_2H_5$ | |
| 2-2-148 | $C_2H_5O$ | — | — | 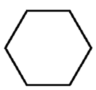 | 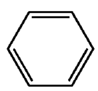 | — | 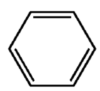 | $OC_4H_9$ | |
| 2-2-149 | $C_3H_7$ | — | — | 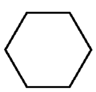 | 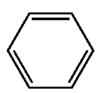 | — | 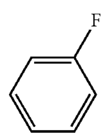 | $OC_4H_9$ | |
| 2-2-150 | $C_5H_{11}$ | — | — | 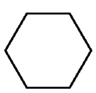 | 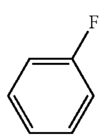 | — | 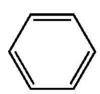 | $OC_2H_5$ | |
TABLE 95
(2-2)
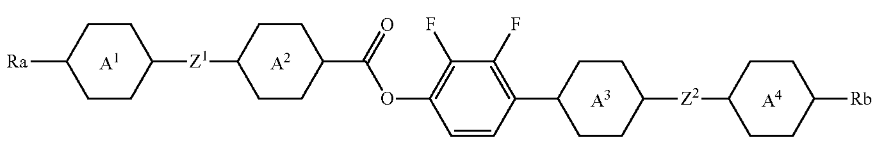
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-151 | $C_3H_7$ | — | — | 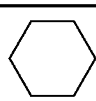 | 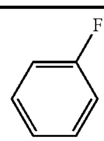 | — | 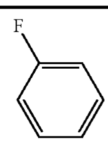 | $C_5H_{11}$ | |
| 2-2-152 | $C_3H_7O$ | — | — | 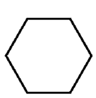 | 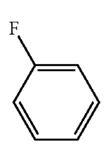 | — | 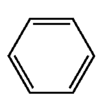 | $C_5H_{11}$ | |

TABLE 95-continued
(2-2)
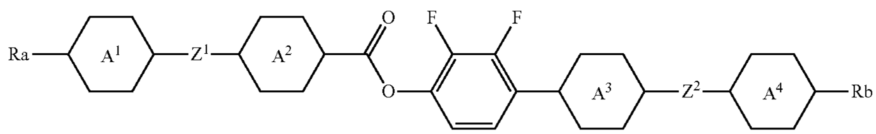
| No. | Ra | A[1] | Z[1] | A[2] | A[3] | Z[2] | A[4] | Rb | Physical property values |
|---|---|---|---|---|---|---|---|---|---|
| 2-2-153 | $C_5H_{11}$ | — | — | 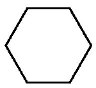 | 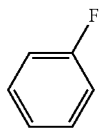 | — | 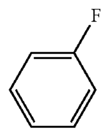 | $OC_2H_5$ | |
| 2-2-154 | $CH_2{=}CH$ | — | — | 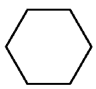 | 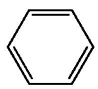 | — | 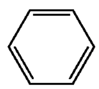 | $C_5H_{11}$ | |
| 2-2-155 | $CH_3CH{=}CH$ | — | — | 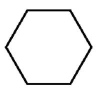 |  | — | 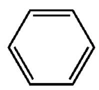 | $C_2H_5$ | |
| 2-2-156 | $CH_2{=}CHC_2H_4$ | — | — | 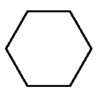 | 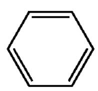 | — | 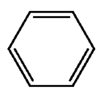 | $C_3H_7$ | |
| 2-2-157 | $C_3H_7CH{=}CH$ | — | — | 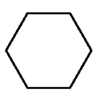 | 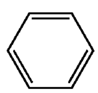 | — |  | $CH_3$ | |
| 2-2-158 | $CH_3CH{=}CHC_2H_4$ | — | — | 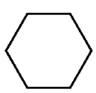 | 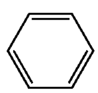 | — | 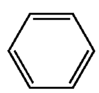 | $C_2H_5$ | |
| 2-2-159 | $C_2H_5$ | — | — | 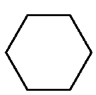 | 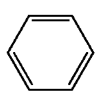 | — | 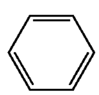 | $CH_2CH_2CHF_2$ | |
| 2-2-160 | $CH_2FCH_2CH_2$ | — | — | 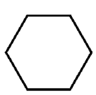 | 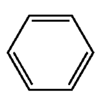 | — | 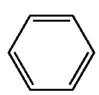 | $C_4H_9$ | |
| 2-2-161 | $CH_3$ | — | — | 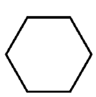 | 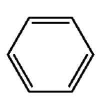 | — | 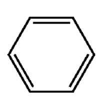 | $CH{=}CH_2$ | |
| 2-2-162 | $C_4H_9$ | — | — | 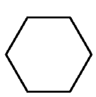 | 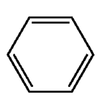 | — | 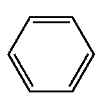 | $CH{=}CHCH_3$ | |
| 2-2-163 | $C_2H_5$ | — | — | 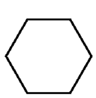 | 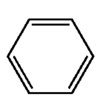 | — | 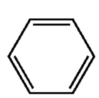 | $C_2H_4CH{=}CH_2$ | |
| 2-2-164 | $C_3H_7$ | — | — | 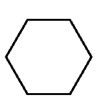 | 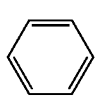 | — | 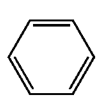 | $C_2H_4CH{=}CH_2$ | |
| 2-2-165 | $C_3H_7$ | — | — | 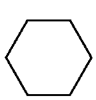 | 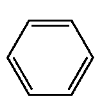 | — | 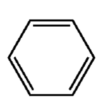 | $CH{=}CHC_3H_7$ | |

TABLE 96
(2-2)
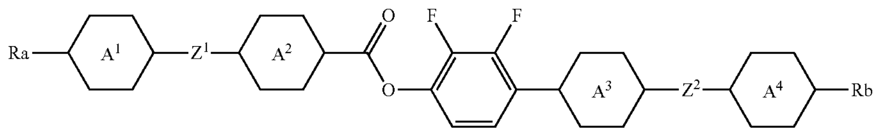
| No. | Ra | $A^1$ | $Z^1$ | $A^2$ / $A^3$ | $Z^2$ | $A^4$ | Rb | Physical property values |
|---|---|---|---|---|---|---|---|---|
| 2-2-166 | $C_2H_5$ | — | — | 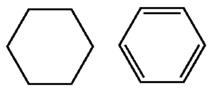 | — | 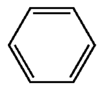 | $CH{=}CHC_3H_7$ | |
| 2-2-167 | $C_5H_{11}$ | — | — | 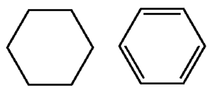 | — | 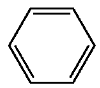 | $C_2H_4CH{=}CHCH_3$ | |
| 2-2-168 | $C_3H_7$ | — | — | 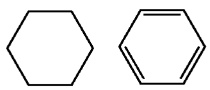 | — | 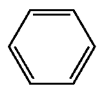 | $C_2H_4CH{=}CHCH_3$ | |
| 2-2-169 | $CH_2{=}CH$ | — | — | 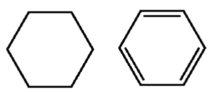 | — | 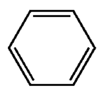 | $C_2H_4CH{=}CH_2$ | |
| 2-2-170 | $CH_3CH{=}CH$ | — | — | 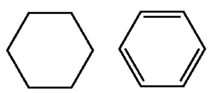 | — |  | $CH{=}CH_2$ | |
| 2-2-171 | $C_2H_5OCH_2$ | — | — | 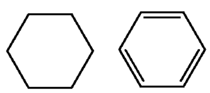 | — |  | $C_3H_7$ | |
| 2-2-172 | $C_3H_7$ | — | — | 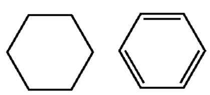 | — | 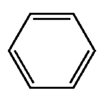 | $OC_2H_4CH{=}CH_2$ | |
| 2-2-173 | $C_3H_7$ | — | — | 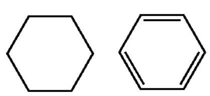 | $CH_2CH_2$ | 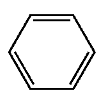 | $C_2H_5$ | |
| 2-2-174 | $C_2H_5$ | — | — | 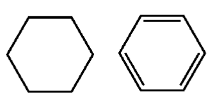 | $CH_2CH_2$ | 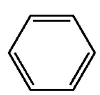 | $C_3H_7$ | |
| 2-2-175 | $C_3H_7$ | — | — | 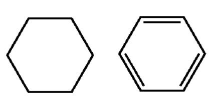 | $CH_2O$ | 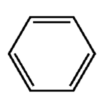 | $C_2H_5$ | |
| 2-2-176 | $C_2H_5$ | — | — | 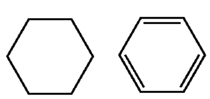 | $OCH_2$ | 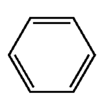 | $C_3H_7$ | |
| 2-2-177 | $C_4H_9$ | — | — | 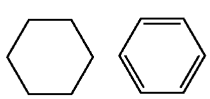 | COO | 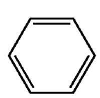 | $C_4H_9$ | |
| 2-2-178 | $C_3H_7$ | — | — | 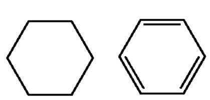 | OCO | 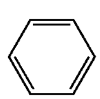 | H | |
| 2-2-179 | $C_2H_5$ | — | — | 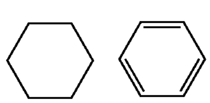 | $CF_2O$ | 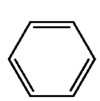 | $C_7H_{15}$ | |

TABLE 96-continued
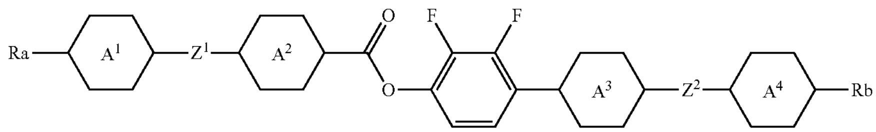
(2-2)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-180 | $CH_3$ | — | — | 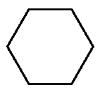 | 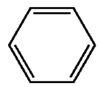 | $OCF_2$ | 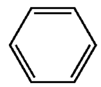 | $C_2H_5$ | |
TABLE 97
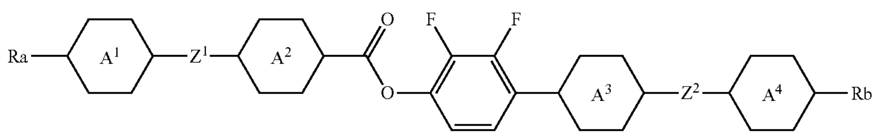
(2-2)
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-181 | $CH_3$ | — | — |  | 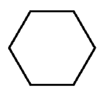 | — | 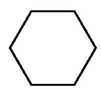 | $CH_3$ | |
| 2-2-182 | $CH_3$ | — | — |  | 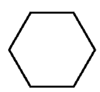 | — | 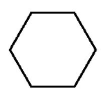 | $C_2H_5$ | |
| 2-2-183 | $CH_3$ | — | — | 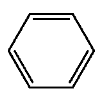 | 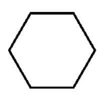 | — | 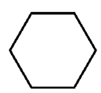 | $C_3H_7$ | |
| 2-2-184 | $CH_3$ | — | — | 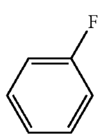 | 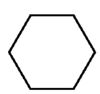 | — | 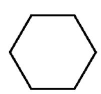 | $C_4H_9$ | |
| 2-2-185 | $CH_3$ | — | — | 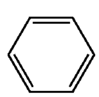 | 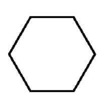 | — | 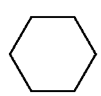 | $C_5H_{11}$ | |
| 2-2-186 | $C_2H_5$ | — | — | 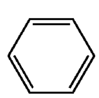 | 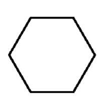 | — | 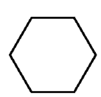 | $CH_3$ | |
| 2-2-187 | $C_2H_5$ | — | — | 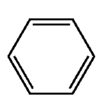 | 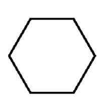 | — | 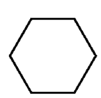 | $C_2H_5$ | |
| 2-2-188 | $C_2H_5$ | — | — | 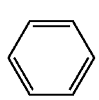 | 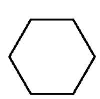 | — | 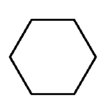 | $C_3H_7$ | |
| 2-2-189 | $C_2H_5$ | — | — | 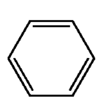 | 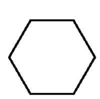 | — | 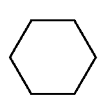 | $C_4H_9$ | |

TABLE 97-continued
(2-2)
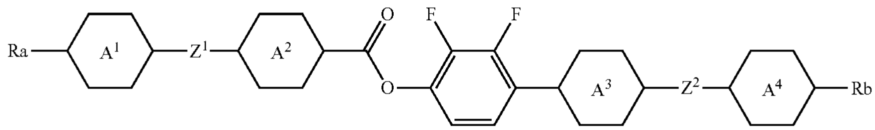
| No. | Ra | A1 | Z1 | A2 | A3 | Z2 | A4 | Rb | Physical property values |
| --- | --- | --- | --- | --- | --- | --- | --- | --- | --- |
| 2-2-190 | $C_2H_5$ | — | — | 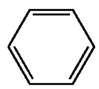 | 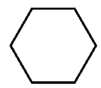 | — | 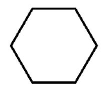 | $C_5H_{11}$ | |
| 2-2-191 | $C_3H_7$ | — | — | 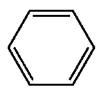 | 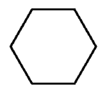 | — | 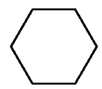 | $CH_3$ | |
| 2-2-192 | $C_3H_7$ | — | — | 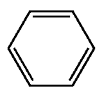 | 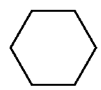 | — | 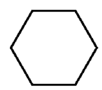 | $C_2H_5$ | |
| 2-2-193 | $C_3H_7$ | — | — |  | 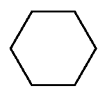 | — | 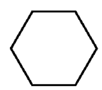 | $C_3H_7$ | |
| 2-2-194 | $C_3H_7$ | — | — | 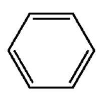 | 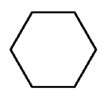 | — | 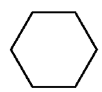 | $C_4H_9$ | |
| 2-2-195 | $C_3H_7$ | — | — | 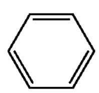 | 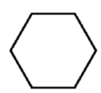 | — | 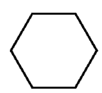 | $C_5H_{11}$ | |
TABLE 98
(2-2)
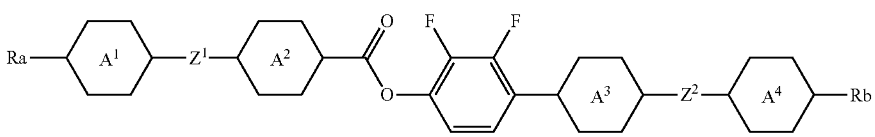
| No. | Ra | A1 | Z1 | A2 | A3 | Z2 | A4 | Rb | Physical property values |
| --- | --- | --- | --- | --- | --- | --- | --- | --- | --- |
| 2-2-196 | $C_4H_9$ | — | — | 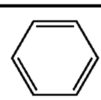 | 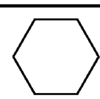 | — | 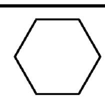 | $CH_3$ | |
| 2-2-197 | $C_4H_9$ | — | — | 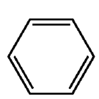 | 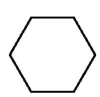 | — | 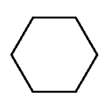 | $C_2H_5$ | |
| 2-2-198 | $C_4H_9$ | — | — | 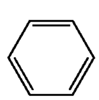 | 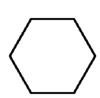 | — | 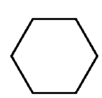 | $C_3H_7$ | |
| 2-2-199 | $C_4H_9$ | — | — | 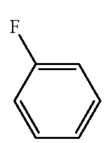 | 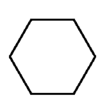 | — | 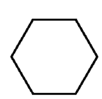 | $C_4H_9$ | |
| 2-2-200 | $C_4H_9$ | — | — | 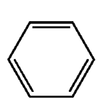 | 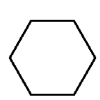 | — | 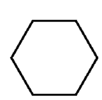 | $C_5H_{11}$ | |

TABLE 98-continued
(2-2)
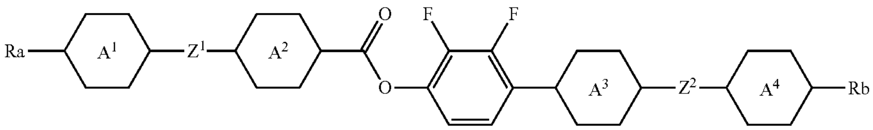
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-201 | $C_5H_{11}$ | — | — |  | 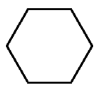 | — | 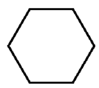 | $CH_3$ | |
| 2-2-202 | $C_5H_{11}$ | — | — |  | 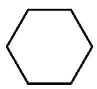 | — | 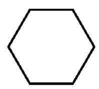 | $C_2H_5$ | |
| 2-2-203 | $C_5H_{11}$ | — | — | 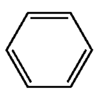 | 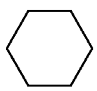 | — | 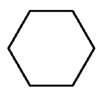 | $C_3H_7$ | Cr 117.7 N 302.0 Iso<br>$T_{NI}$: 240.6° C., Δ ε: −2.6, Δ n: 0.154 |
| 2-2-204 | $C_5H_{11}$ | — | — |  | 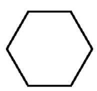 | — | 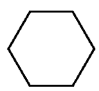 | $C_4H_9$ | |
| 2-2-205 | $C_5H_{11}$ | — | — | 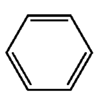 | 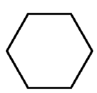 | — | 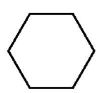 | $C_3H_7$ | |
| 2-2-206 | $C_2H_5O$ | — | — | 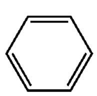 | 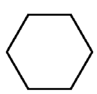 | — | 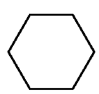 | $C_4H_9$ | |
| 2-2-207 | $C_5H_{11}$ | — | — | 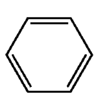 | 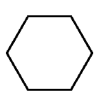 | — | 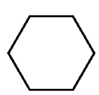 | $OC_2H_5$ | |
| 2-2-208 | $C_2H_5O$ | — | — | 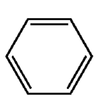 | 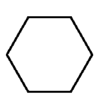 | — | 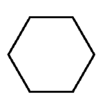 | $OC_4H_9$ | |
| 2-2-209 | $C_5H_{11}$ | — | — | 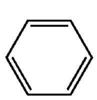 | 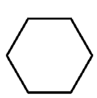 | — | 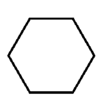 | $C_3H_7$ | |
| 2-2-210 | $C_3H_7$ | — | — | 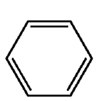 | 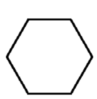 | — | 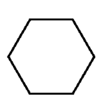 | $C_5H_{11}$ | |

TABLE 99
(2-2)
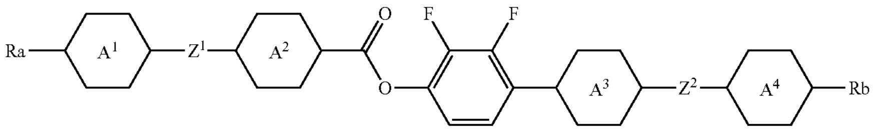
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-211 | $C_2H_5$ | — | — | 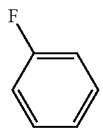 | 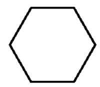 | — | 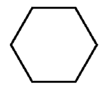 | $CH_2CH_2F$ | |
| 2-2-212 | $CH_3OC_2H_4$ | — | — | 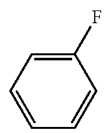 | 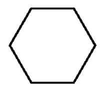 | — | 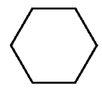 | $C_2H_5$ | |
| 2-2-213 | $CH_2{=}CH$ | — | — | 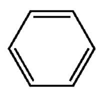 | 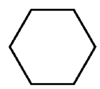 | — | 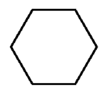 | $C_3H_7$ | |
| 2-2-214 | $CH_2{=}CH$ | — | — | 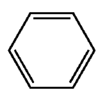 | 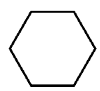 | — | 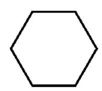 | $C_5H_{11}$ | |
| 2-2-215 | $CH_3CH{=}CH$ | — | — | 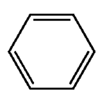 | 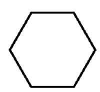 | — | 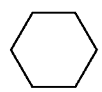 | $C_2H_5$ | |
| 2-2-216 | $CH_2{=}CHC_2H_4$ | — | — | 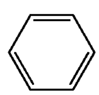 | 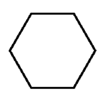 | — | 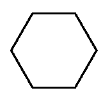 | $C_3H_7$ | |
| 2-2-217 | $C_3H_7CH{=}CH$ | — | — | 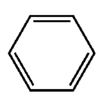 | 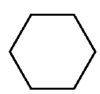 | — | 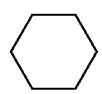 | $C_4H_9$ | |
| 2-2-218 | $CH_3CH{=}CHC_2H_4$ | — | — | 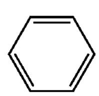 | 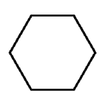 | — | 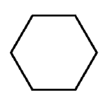 | $C_2H_5$ | |
| 2-2-219 | $C_3H_7$ | — | — | 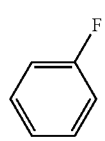 | 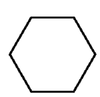 | — | 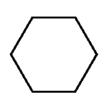 | $CH{=}CH_2$ | |
| 2-2-220 | $C_5H_{11}$ | — | — | 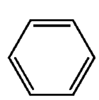 | 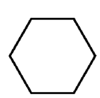 | — | 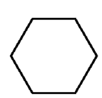 | $CH{=}CH_2$ | |
| 2-2-221 | $C_3H_7$ | — | — | 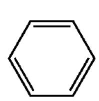 | 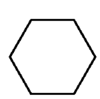 | — | 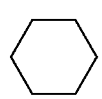 | $CH{=}CHCH_3$ | |
| 2-2-222 | $C_4H_9$ | — | — | 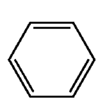 | 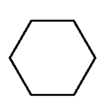 | — | 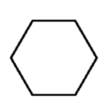 | $CH{=}CHCH_3$ | |

TABLE 99-continued
(2-2)
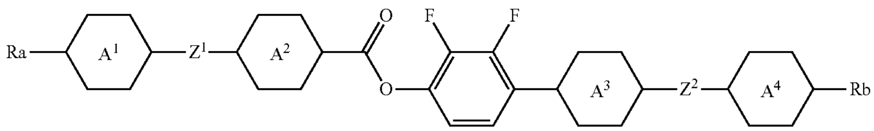
| No. | Ra | A¹ | Z¹ | A² | A³ | Z² | A⁴ | Rb | Physical property values |
|---|---|---|---|---|---|---|---|---|---|
| 2-2-223 | $C_3H_7$ | — | — | 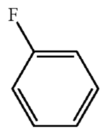 | 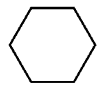 | — | 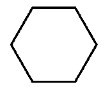 | $C_2H_4CH{=}CH_2$ | |
| 2-2-224 | $C_3H_7$ | — | — | 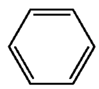 | 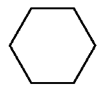 | — | 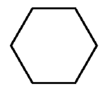 | $C_2H_4CH{=}CH_2$ | |
| 2-2-225 | $C_4H_9$ | — | — | 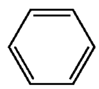 | 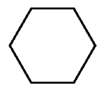 | — | 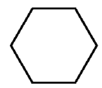 | $CH{=}CHC_3H_7$ | |
TABLE 100
(2-2)
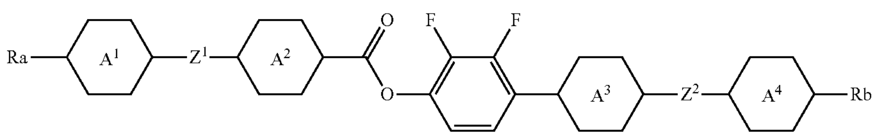
| No. | Ra | A¹ | Z¹ | A² | A³ | Z² | A⁴ | Rb | Physical property values |
|---|---|---|---|---|---|---|---|---|---|
| 2-2-226 | $C_2H_5$ | — | — | 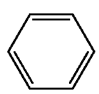 | 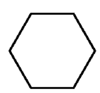 | — | 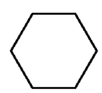 | $CH{=}CHC_3H_7$ | |
| 2-2-227 | $C_2H_5$ | — | — | 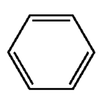 | 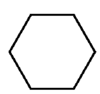 | — | 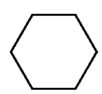 | $C_2H_4CH{=}CHCH_3$ | |
| 2-2-228 | $C_3H_7$ | — | — | 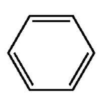 | 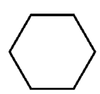 | — | 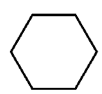 | $C_2H_4CH{=}CHCH_3$ | |
| 2-2-229 | $CH_2{=}CH$ | — | — | 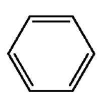 | 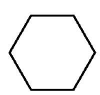 | — | 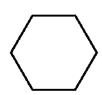 | $CH{=}CH_2$ | |
| 2-2-230 | $CH_3CH{=}CH$ | — | — | 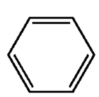 | 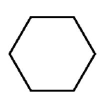 | — | 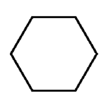 | $C_2H_4CH{=}CH_2$ | |
| 2-2-231 | $CH_3OCH_2$ | — | — | 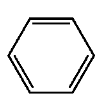 | 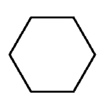 | — | 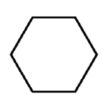 | $C_3H_7$ | |
| 2-2-232 | $C_2H_5$ | — | — | 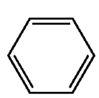 | 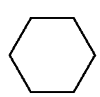 | — | 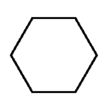 | $OC_2H_4CH{=}CH_2$ | |

TABLE 100-continued
(2-2)
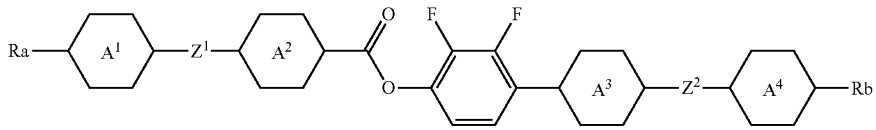
| No. | Ra | A¹ | Z¹ | A² | A³ | Z² | A⁴ | Rb | Physical property values |
|---|---|---|---|---|---|---|---|---|---|
| 2-2-233 | $C_5H_{11}$ | — | — |  | 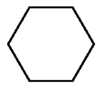 | $CH_2CH_2$ | 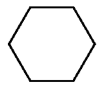 | $C_2H_5$ | |
| 2-2-234 | $C_5H_{11}$ | — | — | 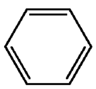 | 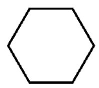 | $CH_2CH_2$ | 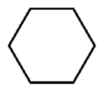 | $C_3H_7$ | |
| 2-2-235 | $C_2H_5$ | — | — | 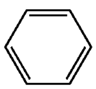 | 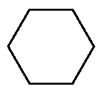 | $CH_2O$ | 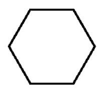 | $C_3H_7$ | |
| 2-2-236 | $C_3H_7$ | — | — | 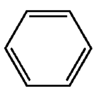 | 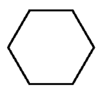 | $OCH_2$ | 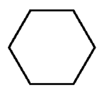 | $CH_3$ | |
| 2-2-237 | $C_5H_{11}$ | — | — | 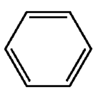 | 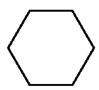 | COO | 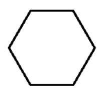 | $C_4H_9$ | |
| 2-2-238 | $C_2H_5$ | — | — |  | 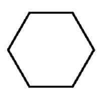 | OCO | 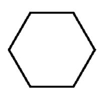 | $C_3H_7$ | |
| 2-2-239 | $C_2H_5$ | — | — | 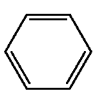 | 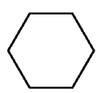 | $CF_2O$ | 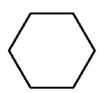 | $C_6H_{13}$ | |
| 2-2-240 | $C_4H_9$ | — | — | 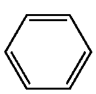 | 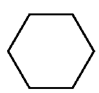 | $OCF_2$ | 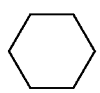 | $C_2H_5$ | |
TABLE 101
(2-2)
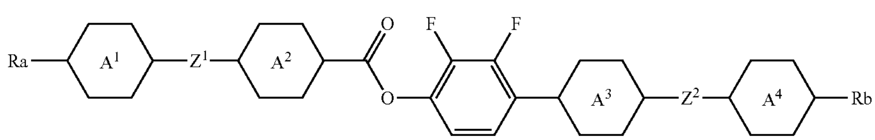
| No. | Ra | A¹ | Z¹ | A² | A³ | Z² | A⁴ | Rb | Physical property values |
|---|---|---|---|---|---|---|---|---|---|
| 2-2-241 | $CH_3$ | — | — | 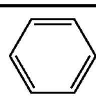 | 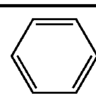 | — | 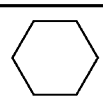 | $CH_3$ | |
| 2-2-242 | $CH_3$ | — | — | 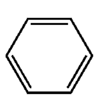 | 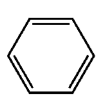 | — | 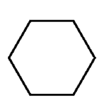 | $C_2H_5$ | |
| 2-2-243 | $CH_3$ | — | — | 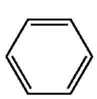 | 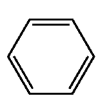 | — | 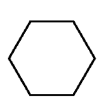 | $C_3H_7$ | |

TABLE 101-continued
(2-2)
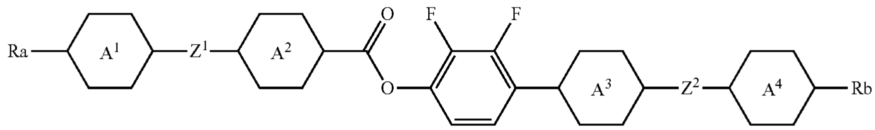
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-244 | $CH_3$ | — | — |  | 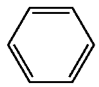 | — | 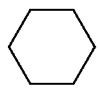 | $C_4H_9$ | |
| 2-2-245 | $CH_3$ | — | — |  | 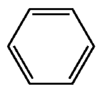 | — | 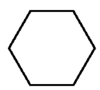 | $C_5H_{11}$ | |
| 2-2-246 | $C_2H_5$ | — | — | 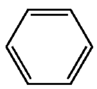 |  | — | 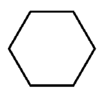 | $CH_3$ | |
| 2-2-247 | $C_2H_5$ | — | — | 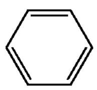 | 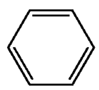 | — | 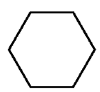 | $C_2H_5$ | |
| 2-2-248 | $C_2H_5$ | — | — |  |  | — | 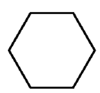 | $C_3H_7$ | |
| 2-2-249 | $C_2H_5$ | — | — |  | 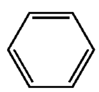 | — | 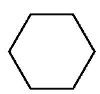 | $C_4H_9$ | |
| 2-2-250 | $C_2H_5$ | — | — |  | 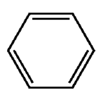 | — | 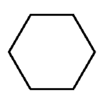 | $C_5H_{11}$ | |
| 2-2-251 | $C_3H_7$ | — | — | 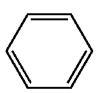 | 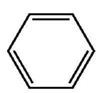 | — | 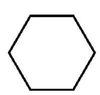 | $CH_3$ | |
| 2-2-252 | $C_3H_7$ | — | — | 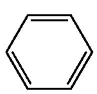 | 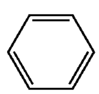 | — | 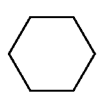 | $C_2H_5$ | |
| 2-2-253 | $C_3H_7$ | — | — | 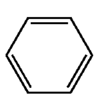 | 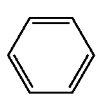 | — | 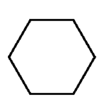 | $C_3H_7$ | |
| 2-2-254 | $C_3H_7$ | — | — | 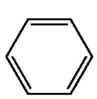 | 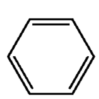 | — | 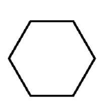 | $C_4H_9$ | |
| 2-2-255 | $C_3H_7$ | — | — | 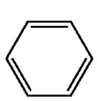 | 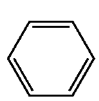 | — | 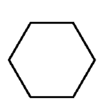 | $C_5H_{11}$ | |

TABLE 102
(2-2)
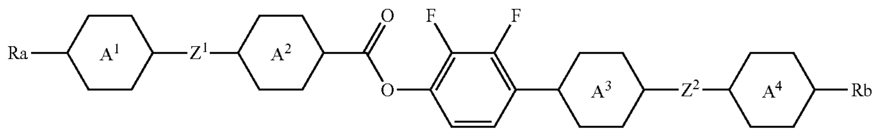
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-256 | $C_4H_9$ | — | — | 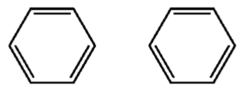 | | — | 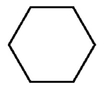 | $CH_3$ | |
| 2-2-257 | $C_4H_9$ | — | — | 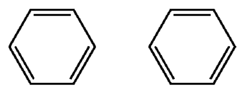 | | — | 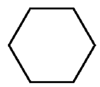 | $C_2H_5$ | |
| 2-2-258 | $C_4H_9$ | — | — | 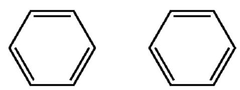 | | — | 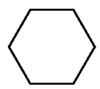 | $C_3H_7$ | |
| 2-2-259 | $C_4H_9$ | — | — | 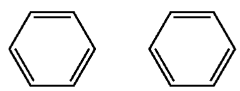 | | — | 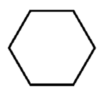 | $C_4H_9$ | |
| 2-2-260 | $C_4H_9$ | — | — | 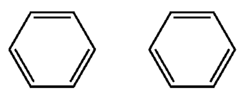 | | — | 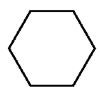 | $C_5H_{11}$ | |
| 2-2-261 | $C_5H_{11}$ | — | — | 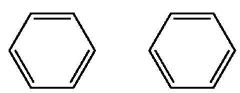 | | — | 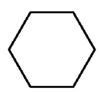 | $CH_3$ | |
| 2-2-262 | $C_5H_{11}$ | — | — | 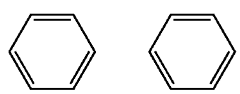 | | — | 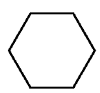 | $C_2H_5$ | |
| 2-2-263 | $C_5H_{11}$ | — | — | 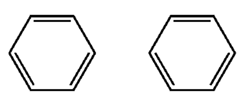 | | — | 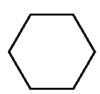 | $C_3H_7$ | |
| 2-2-264 | $C_5H_{11}$ | — | — | 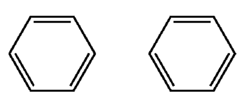 | | — | 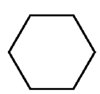 | $C_4H_9$ | |
| 2-2-265 | $C_5H_{11}$ | — | — | 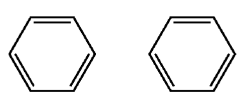 | | — | 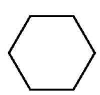 | $C_5H_{11}$ | |
| 2-2-266 | $C_2H_5O$ | — | — | 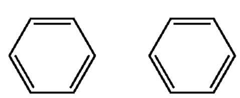 | | — | 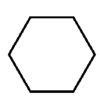 | $C_4H_9$ | |
| 2-2-267 | $C_5H_{11}$ | — | — | 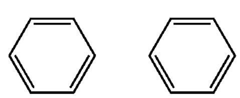 | | — | 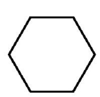 | $OC_2H_5$ | |
| 2-2-268 | $C_2H_5O$ | — | — | 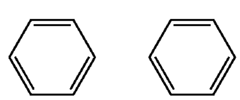 | | — | 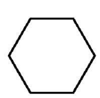 | $OC_4H_9$ | |
| 2-2-269 | $C_3H_7$ | — | — | 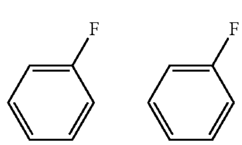 | | — | 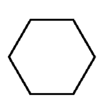 | $OC_4H_9$ | |

TABLE 102-continued
(2-2)
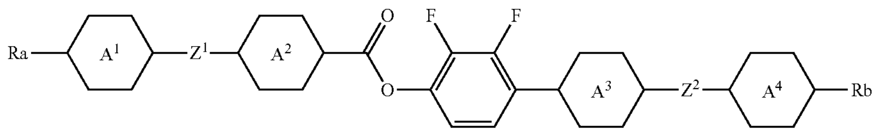
| No. | Ra | A¹ | Z¹ | A² | A³ | Z² | A⁴ | Rb | Physical property values |
|---|---|---|---|---|---|---|---|---|---|
| 2-2-270 | $C_5H_{11}$ | — | — | 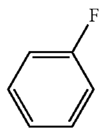 | 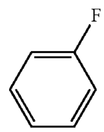 | — | 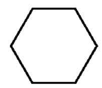 | $OC_2H_5$ | |
TABLE 103
(2-2)
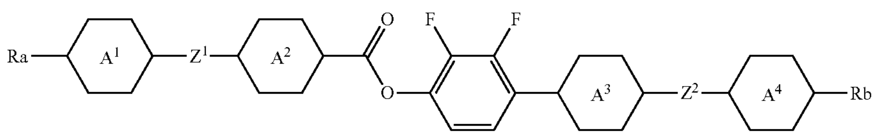
| No. | Ra | A¹ | Z¹ | A² | A³ | Z² | A⁴ | Rb | Physical property values |
|---|---|---|---|---|---|---|---|---|---|
| 2-2-271 | $C_3H_7$ | — | — | 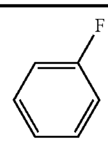 | 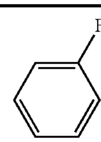 | — | 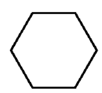 | $C_5H_{11}$ | |
| 2-2-272 | $C_5H_{11}$ | — | — | 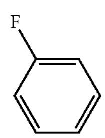 | 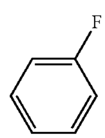 | — | 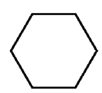 | $C_2H_5$ | |
| 2-2-273 | $C_4H_9O$ | — | — | 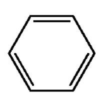 | 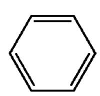 | — | 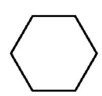 | $C_3H_7$ | |
| 2-2-274 | $CH_2{=}CH$ | — | — | 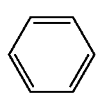 | 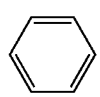 | — | 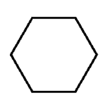 | $C_5H_{11}$ | |
| 2-2-275 | $CH_3CH{=}CH$ | — | — | 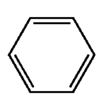 | 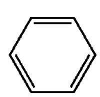 | — | 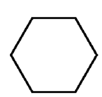 | $C_2H_5$ | |
| 2-2-276 | $C_3H_7CH{=}CH$ | — | — | 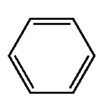 | 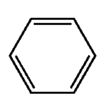 | — | 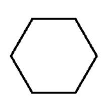 | $C_3H_7$ | |
| 2-2-277 | $CH_2{=}CHC_2H_4$ | — | — | 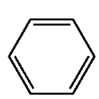 | 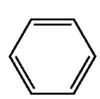 | — | 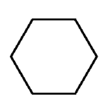 | $CH_3$ | |
| 2-2-278 | $CH_2{=}CHC_2H_4$ | — | — | 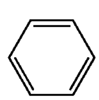 | 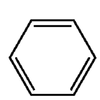 | — | 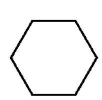 | $C_2H_5$ | |
| 2-2-279 | $CH_3CH{=}CHC_2H_4$ | — | — | 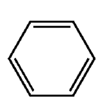 | 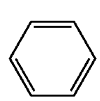 | — | 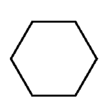 | $C_3H_7$ | |

TABLE 103-continued
(2-2)
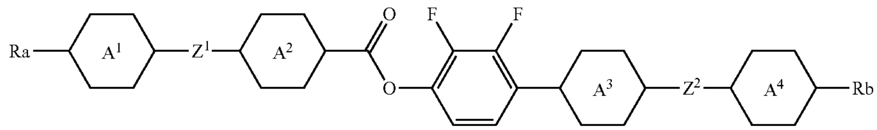
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-280 | $CH_3CH{=}CHC_2H_4$ | — | — | 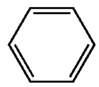 | 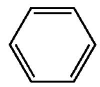 | — | 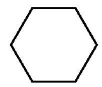 | $C_4H_9$ | |
| 2-2-281 | $C_3H_7$ | — | — | 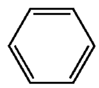 | 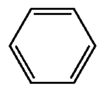 | — | 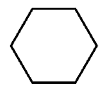 | $CH_2OC_3H_7$ | |
| 2-2-282 | $C_4H_9$ | — | — | 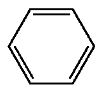 | 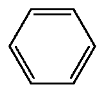 | — | 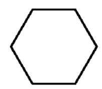 | $CH_2CH_2F$ | |
| 2-2-283 | $C_2H_5$ | — | — | 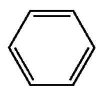 | 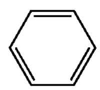 | — | 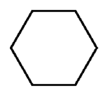 | $CH{=}CH_2$ | |
| 2-2-284 | $C_3H_7$ | — | — | 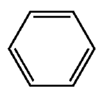 | 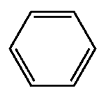 | — | 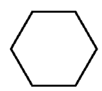 | $CH{=}CHCH_3$ | |
| 2-2-285 | $C_3H_7$ | — | — | 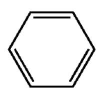 | 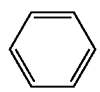 | — | 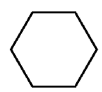 | $CH{=}CHC_3H_7$ | |
TABLE 104
(2-2)
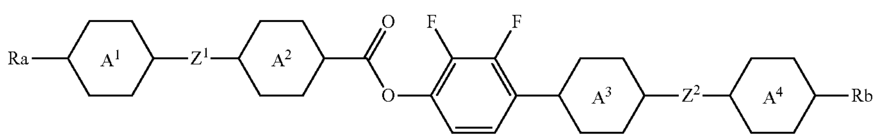
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-286 | $C_2H_5$ | — | — | 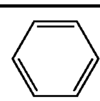 | 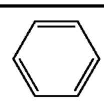 | — | 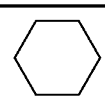 | $C_2H_4CH{=}CH_2$ | |
| 2-2-287 | $C_5H_{11}$ | — | — | 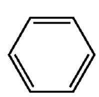 | 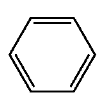 | — | 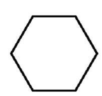 | $C_2H_4CH{=}CH_2$ | |
| 2-2-288 | $C_4H_9$ | — | — | 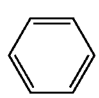 | 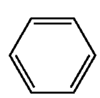 | — | 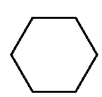 | $C_2H_4CH{=}CHCH_3$ | |
| 2-2-289 | $CH_2{=}CHC_2H_4$ | — | — | 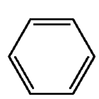 | 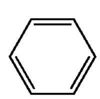 | — | 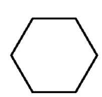 | $CH{=}CH_2$ | |
| 2-2-290 | $CH_3CH{=}CHC_2H_4$ | — | — | 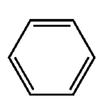 | 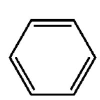 | — | 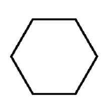 | $CH{=}CHCH_3$ | |

TABLE 104-continued
(2-2)
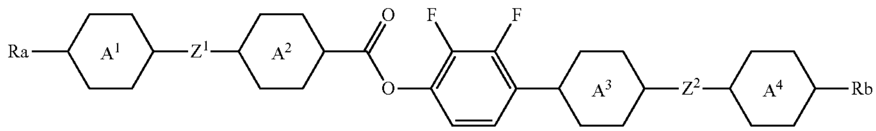
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-291 | $CH_3OCH_2CH_2$ | — | — | 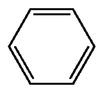 | 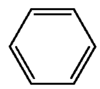 | — | 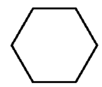 | $C_3H_7$ | |
| 2-2-292 | $C_3H_7$ | — | — | 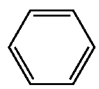 | 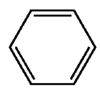 | — | 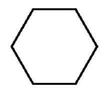 | $OC_2H_4CH{=}CH_2$ | |
| 2-2-293 | $C_5H_{11}$ | — | — | 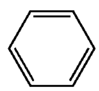 | 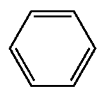 | $CH_2CH_2$ | 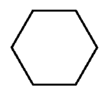 | $C_2H_5$ | |
| 2-2-294 | $C_5H_{11}$ | — | — | 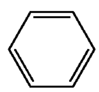 | 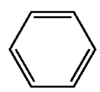 | $CH_2CH_2$ | 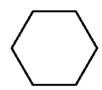 | $C_3H_7$ | |
| 2-2-295 | $C_3H_7$ | — | — | 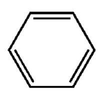 | 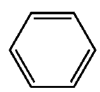 | $CH_2O$ | 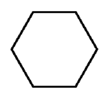 | $C_5H_{11}$ | |
| 2-2-296 | $C_2H_5$ | — | — | 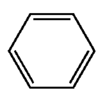 | 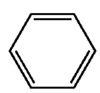 | $OCH_2$ | 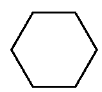 | $C_3H_7$ | |
| 2-2-297 | $C_4H_9$ | — | — | 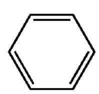 | 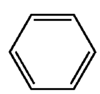 | COO | 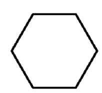 | $C_4H_9$ | |
| 2-2-298 | $C_3H_7$ | — | — | 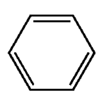 | 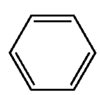 | OCO | 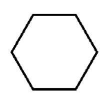 | $C_2H_5$ | |
| 2-2-299 | $C_{10}H_{21}$ | — | — | 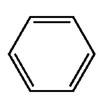 | 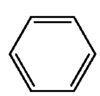 | $CF_2O$ | 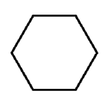 | $C_2H_5$ | |
| 2-2-300 | $CH_3$ | — | — | 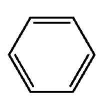 | 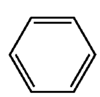 | $OCF_2$ | 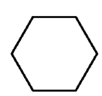 | $CH_3$ | |
TABLE 105
(2-2)
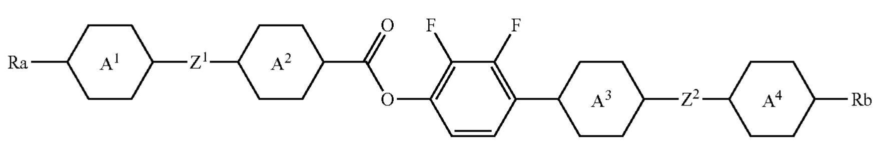
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-301 | $CH_3$ | — | — | 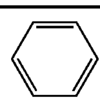 | 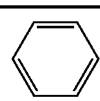 | — | 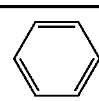 | $CH_3$ | |

TABLE 105-continued
(2-2)
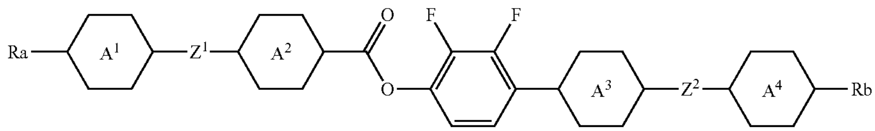
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-302 | $CH_3$ | — | — | 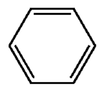 | 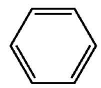 | — | 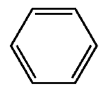 | $C_2H_5$ | |
| 2-2-303 | $CH_3$ | — | — | 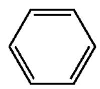 | 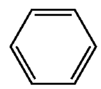 | — | 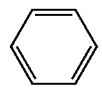 | $C_3H_7$ | |
| 2-2-304 | $CH_3$ | — | — | 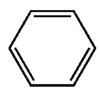 | 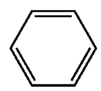 | — | 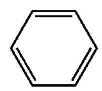 | $C_4H_9$ | |
| 2-2-305 | $CH_3$ | — | — | 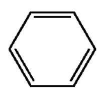 | 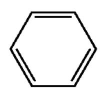 | — | 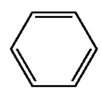 | $C_5H_{11}$ | |
| 2-2-306 | $C_2H_5$ | — | — | 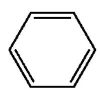 | 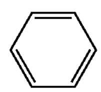 | — | 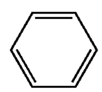 | $CH_3$ | |
| 2-2-307 | $C_2H_5$ | — | — | 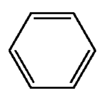 | 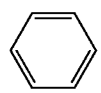 | — | 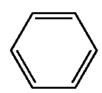 | $C_2H_5$ | |
| 2-2-308 | $C_2H_5$ | — | — | 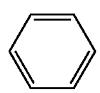 | 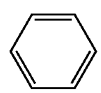 | — | 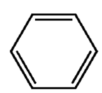 | $C_3H_7$ | |
| 2-2-309 | $C_2H_5$ | — | — | 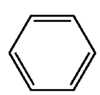 | 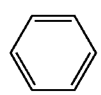 | — | 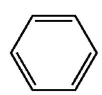 | $C_4H_9$ | |
| 2-2-310 | $C_2H_5$ | — | — | 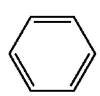 | 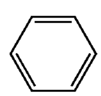 | — | 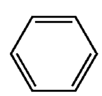 | $C_5H_{11}$ | |
| 2-2-311 | $C_3H_7$ | — | — | 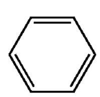 | 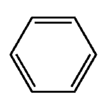 | — | 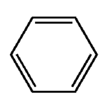 | $CH_3$ | |
| 2-2-312 | $C_3H_7$ | — | — | 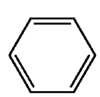 | 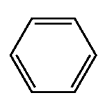 | — | 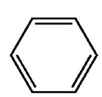 | $C_2H_5$ | |
| 2-2-313 | $C_3H_7$ | — | — | 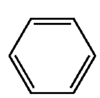 | 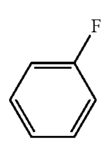 | — | 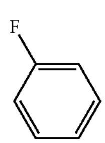 | $C_3H_7$ | |
| 2-2-314 | $C_3H_7$ | — | — | 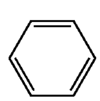 | 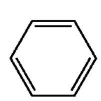 | — | 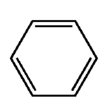 | $C_4H_9$ | |

TABLE 105-continued
(2-2)
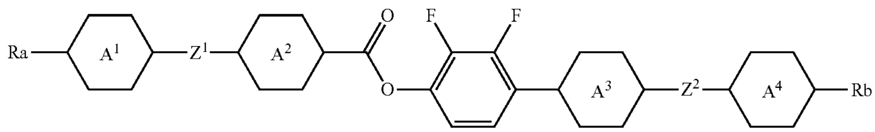
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-315 | $C_3H_7$ | — | — |  |  | — | 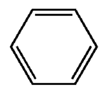 | $C_5H_{11}$ | |
TABLE 106
(2-2)
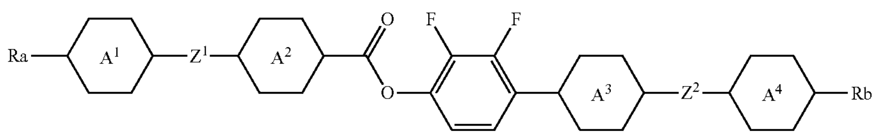
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-316 | $C_4H_9$ | — | — | 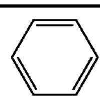 | 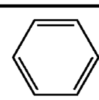 | — | 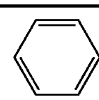 | $CH_3$ | |
| 2-2-317 | $C_4H_9$ | — | — | 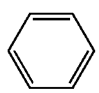 | 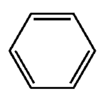 | — | 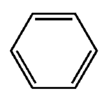 | $C_2H_5$ | |
| 2-2-318 | $C_4H_9$ | — | — | 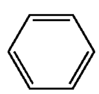 | 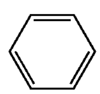 | — | 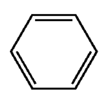 | $C_3H_7$ | |
| 2-2-319 | $C_4H_9$ | — | — | 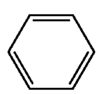 | 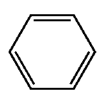 | — | 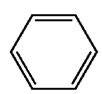 | $C_4H_9$ | |
| 2-2-320 | $C_4H_9$ | — | — | 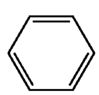 | 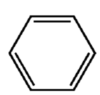 | — | 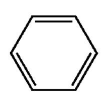 | $C_5H_{11}$ | |
| 2-2-321 | $C_5H_{11}$ | — | — | 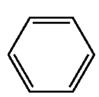 | 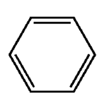 | — | 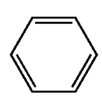 | $CH_3$ | |
| 2-2-322 | $C_5H_{11}$ | — | — | 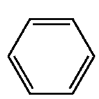 | 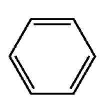 | — | 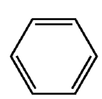 | $C_2H_5$ | |
| 2-2-323 | $C_5H_{11}$ | — | — | 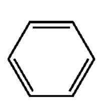 | 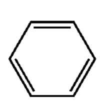 | — | 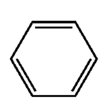 | $C_3H_7$ | |
| 2-2-324 | $C_5H_{11}$ | — | — | 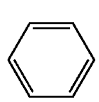 | 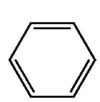 | — | 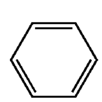 | $C_4H_9$ | |
| 2-2-325 | $C_5H_{11}$ | — | — | 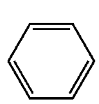 | 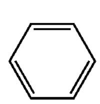 | — | 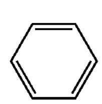 | $C_5H_{11}$ | |

TABLE 106-continued
(2-2)
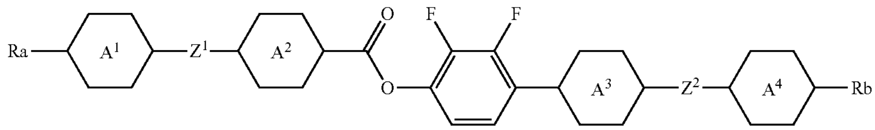
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-326 | $C_2H_5O$ | — | — |  | 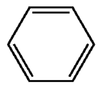 | — | 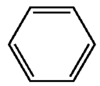 | $C_4H_9$ | |
| 2-2-327 | $C_5H_{11}$ | — | — |  | 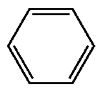 | — | 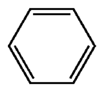 | $OC_2H_5$ | |
| 2-2-328 | $C_2H_5O$ | — | — | 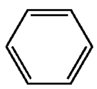 |  | — |  | $OC_4H_9$ | |
| 2-2-329 | $C_3H_7$ | — | — | 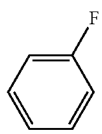 |  | — | 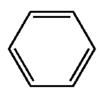 | $OC_4H_9$ | |
| 2-2-330 | $C_5H_{11}$ | — | — | 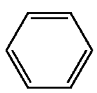 | 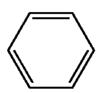 | — | 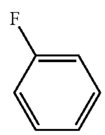 | $OC_2H_5$ | |
TABLE 107
(2-2)
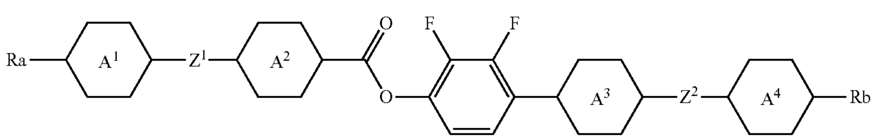
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-331 | $C_3H_7$ | — | — | 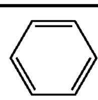 | 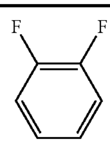 | — | 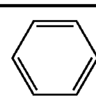 | $C_5H_{11}$ | |
| 2-2-332 | $C_3H_7O$ | — | — | 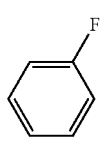 | 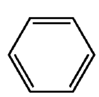 | — | 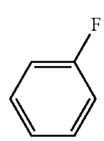 | $OC_2H_5$ | |
| 2-2-333 | $C_5H_{11}$ | — | — | 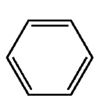 | 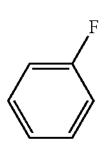 | — | 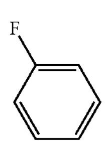 | $OC_2H_5$ | |

TABLE 107-continued
(2-2)
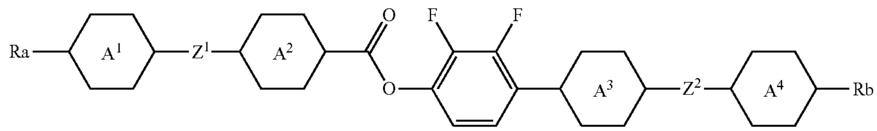
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-334 | $C_2H_5O$ | — | — | 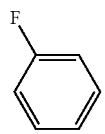 | 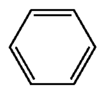 | — | 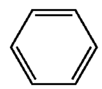 | $C_5H_{11}$ | |
| 2-2-335 | $C_4H_9$ | — | — | 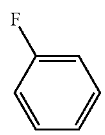 | 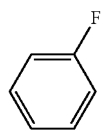 | — | 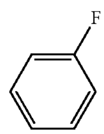 | $C_2H_5$ | |
| 2-2-336 | $C_2H_5O$ | — | — | 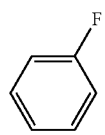 | 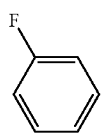 | — | 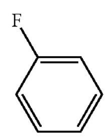 | $OC_4H_9$ | |
| 2-2-337 | $CH_2{=}CH$ | — | — | 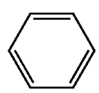 | 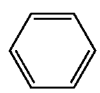 | — | 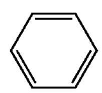 | $CH_3$ | |
| 2-2-338 | $CH_3CH{=}CH$ | — | — | 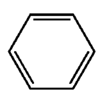 | 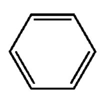 | — | 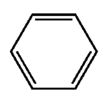 | $C_2H_5$ | |
| 2-2-339 | $CH_2{=}CHC_2H_4$ | — | — | 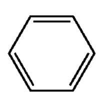 | 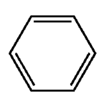 | — | 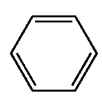 | $C_3H_7$ | |
| 2-2-340 | $C_3H_7CH{=}CH$ | — | — | 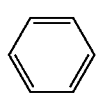 | 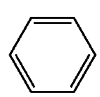 | — | 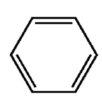 | $C_4H_9$ | |
| 2-2-341 | $CH_3CH{=}CHC_2H_4$ | — | — | 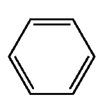 | 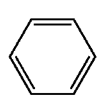 | — | 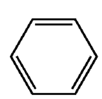 | $CH_3$ | |
| 2-2-342 | $C_4H_9$ | — | — | 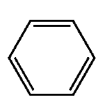 | 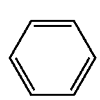 | — | 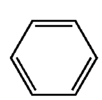 | $CH{=}CH_2$ | |
| 2-2-343 | $C_2H_5$ | — | — | 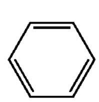 | 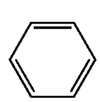 | — | 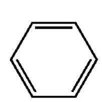 | $CH{=}CHCH_3$ | |
| 2-2-344 | $C_3H_7$ | — | — | 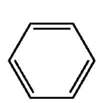 | 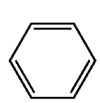 | — | 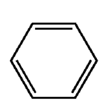 | $CH{=}CHC_3H_7$ | |
| 2-2-345 | $C_3H_7$ | — | — | 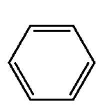 | 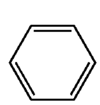 | — | 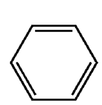 | $C_2H_4CH{=}CH_2$ | |

TABLE 108
(2-2)
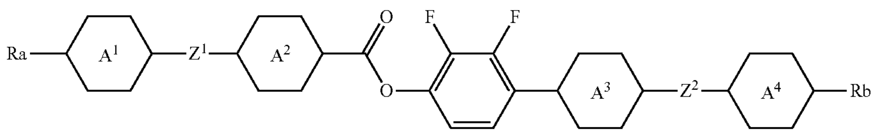
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-346 | $C_2H_5$ | — | — | 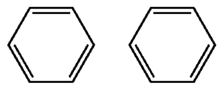 | | — | 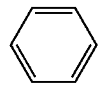 | $C_2H_4CH{=}CH_2$ | |
| 2-2-347 | $C_5H_{11}$ | — | — | 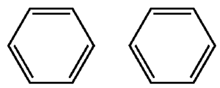 | | — | 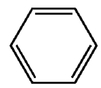 | $C_2H_4CH{=}CHCH_3$ | |
| 2-2-348 | $C_3H_7$ | — | — | 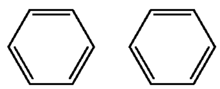 | | — | 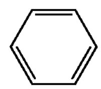 | $C_2H_4CH{=}CHCH_3$ | |
| 2-2-349 | $CH_3CH{=}CHC_2H_4$ | — | — | 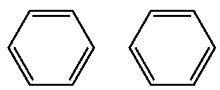 | | — | 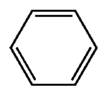 | $C_2H_4CH{=}CH_2$ | |
| 2-2-350 | $CH_2{=}CHC_2H_4$ | — | — | 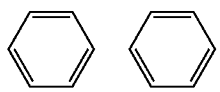 | | — | 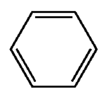 | $C_2H_4CH{=}CHCH_3$ | |
| 2-2-351 | $C_4H_9OCH_2$ | — | — | 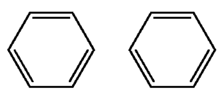 | | — | 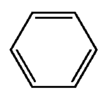 | $C_3H_7$ | |
| 2-2-352 | $C_3H_7$ | — | — | 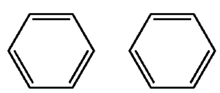 | | — | 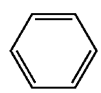 | $OC_2H_4CH{=}CH_2$ | |
| 2-2-353 | $C_3H_7$ | — | — | 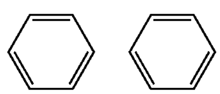 | | $CH_2CH_2$ | 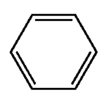 | $C_2H_5$ | |
| 2-2-354 | $C_2H_5$ | — | — | 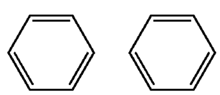 | | $(CH_2)_4$ | 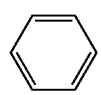 | $C_3H_7$ | |
| 2-2-355 | $C_3H_7$ | — | — | 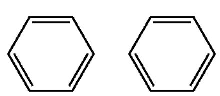 | | $CH_2O$ | 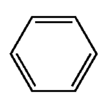 | $C_2H_5$ | |
| 2-2-356 | $C_2H_5$ | — | — | 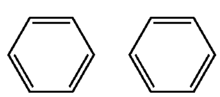 | | $OCH_2$ | 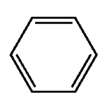 | $C_3H_7$ | |
| 2-2-357 | $C_4H_9O$ | — | — | 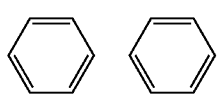 | | COO | 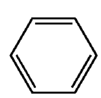 | $C_4H_9$ | |
| 2-2-358 | $C_3H_7$ | — | — | 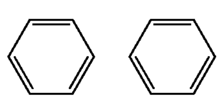 | | OCO | 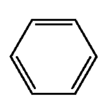 | $C_7H_{15}$ | |
| 2-2-359 | $C_2H_5$ | — | — | 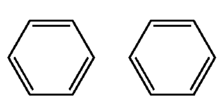 | | $CF_2O$ | 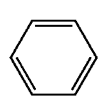 | $C_4H_9$ | |

TABLE 108-continued
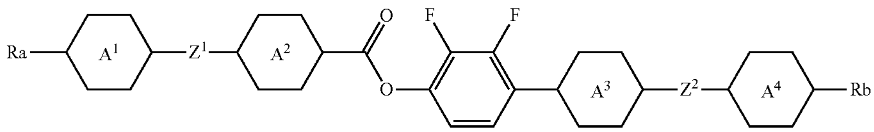
(2-2)
| No. | Ra | A¹ | Z¹ | A² | A³ | Z² | A⁴ | Rb | Physical property values |
|---|---|---|---|---|---|---|---|---|---|
| 2-2-360 | $CH_3$ | — | — | 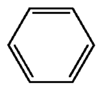 | 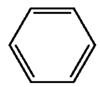 | $OCF_2$ | 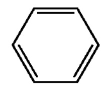 | $C_2H_5$ | |
TABLE 109
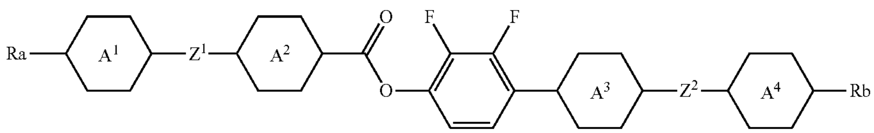
(2-2)
| No. | Ra | A¹ | Z¹ | A² | A³ | Z² | A⁴ | Rb | Physical property values |
|---|---|---|---|---|---|---|---|---|---|
| 2-2-361 | $C_3H_7$ | — | — | 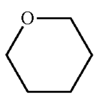 | 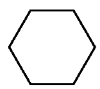 | — | 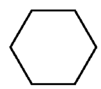 | $C_5H_{11}$ | |
| 2-2-362 | $C_5H_{11}$ | — | — | 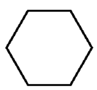 | 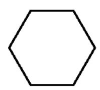 | — | 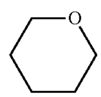 | $C_2H_5$ | |
| 2-2-363 | $CH_3$ | — | — | 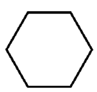 | 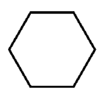 | — | 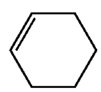 | $C_3H_7$ | |
| 2-2-364 | $C_4H_9$ | — | — | 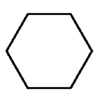 | 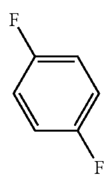 | — | 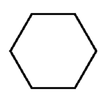 | $C_2H_5$ | |
| 2-2-365 | $C_5H_{11}$ | — | — | 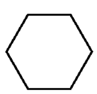 | 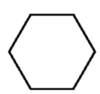 | — | 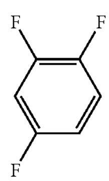 | $OC_4H_9$ | |
| 2-2-366 | $CH_3$ | — | — | 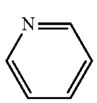 | 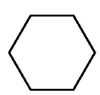 | — | 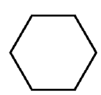 | $C_2H_5$ | |
| 2-2-367 | $C_2H_5$ | — | — | 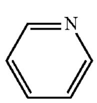 | 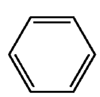 | — | 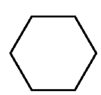 | $C_3H_7$ | |
| 2-2-368 | $C_2H_5$ | — | — | 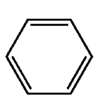 | 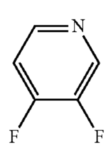 | — | 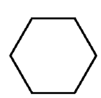 | $C_3H_7$ | |

TABLE 109-continued
(2-2)
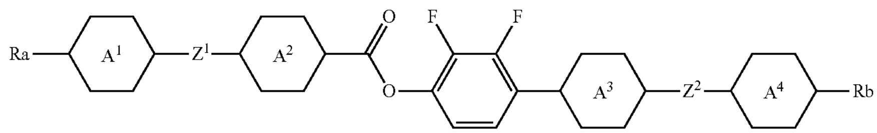
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-369 | $C_3H_7O$ | — | — | 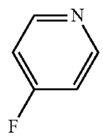 | 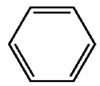 | — | 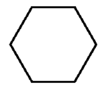 | $C_4H_9$ | |
| 2-2-370 | $C_2H_5$ | — | — | 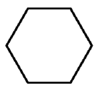 | 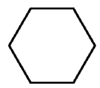 | — | 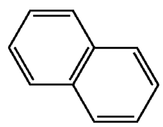 | $C_5H_{11}$ | |
| 2-2-371 | $C_3H_7$ | — | — | 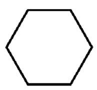 | 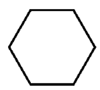 | — | 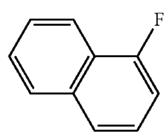 | $C_4H_9$ | |
| 2-2-372 | $C_3H_7$ | — | — | 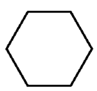 | 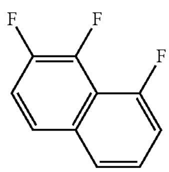 | — | 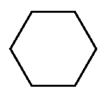 | $C_2H_5$ | |
| 2-2-373 | $C_2H_5$ | — | — | 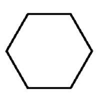 | 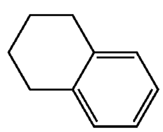 | — | 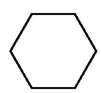 | $C_5H_{11}$ | |
| 2-2-374 | $C_3H_7$ | — | — | 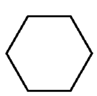 | 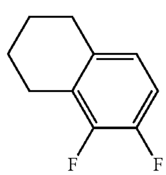 | — | 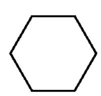 | $C_4H_9$ | |
| 2-2-375 | $C_3H_7$ | — | — | 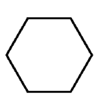 | 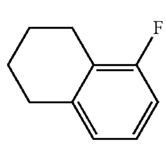 | — | 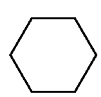 | $C_5H_{11}$ | |

TABLE 110
(2-2)
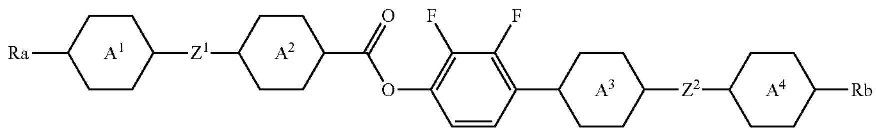
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-376 | $C_4H_9$ | — | — | 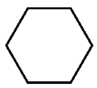 | 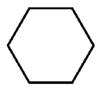 | — | 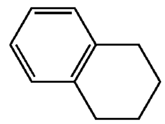 | $C_5H_{11}$ | |
| 2-2-377 | $C_5H_{11}$ | — | — | 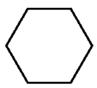 | 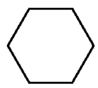 | — | 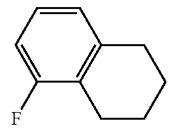 | $C_2H_5$ | |
| 2-2-378 | $C_4H_9$ | — | — | 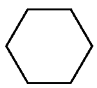 | 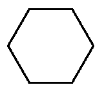 | — | 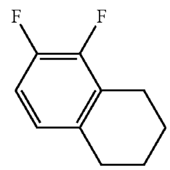 | $C_3H_7$ | |
| 2-2-379 | $C_4H_9$ | — | — | 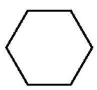 | 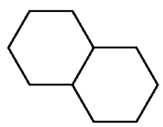 | — | 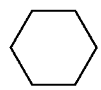 | $C_4H_9$ | |
| 2-2-380 | $C_5H_{11}$ | — | — | 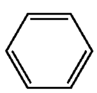 | 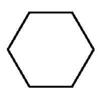 | — | 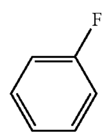 | $OC_2H_5$ | |
| 2-2-381 | $C_5H_{11}$ | — | — | 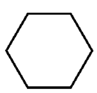 | 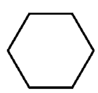 | — | 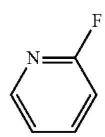 | $OC_4H_9$ | |
| 2-2-382 | $C_5H_{11}$ | — | — | 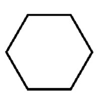 | 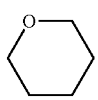 | — | 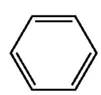 | $C_2H_5$ | |
| 2-2-383 | $C_3H_7$ | — | — | 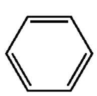 | 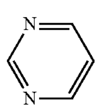 | — | 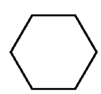 | $C_3H_7$ | |
| 2-2-384 | $C_5H_{11}$ | — | — | 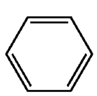 | 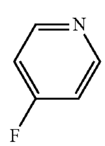 | — | 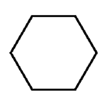 | $C_4H_9$ | |
| 2-2-385 | $CH_3O$ | — | — | 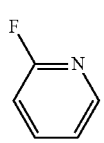 | 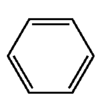 | — | 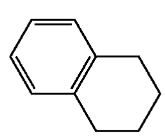 | $C_5H_{11}$ | |

TABLE 110-continued
(2-2)
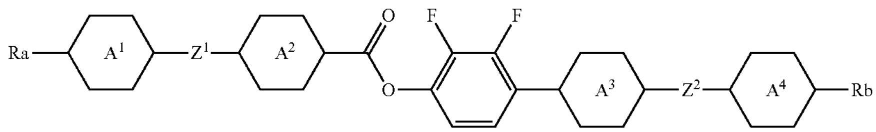
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-386 | $C_2H_5O$ | — | — | 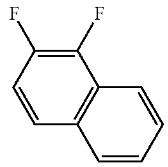 | 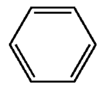 | $C\equiv C$ | 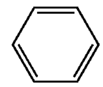 | $C_4H_9$ | |
| 2-2-387 | $C_5H_{11}$ | — | — |  | 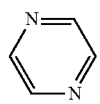 | — | 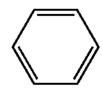 | $CH_3$ | |
| 2-2-388 | $C_4H_9O$ | — | — | 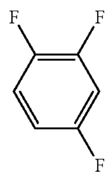 | 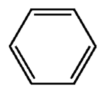 | — | 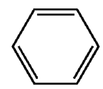 | $C_5H_{11}$ | |
| 2-2-389 | $C_5H_{11}$ | — | — | 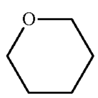 | 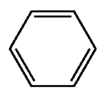 | — | 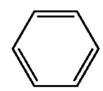 | $C_3H_7$ | |
| 2-2-390 | $C_3H_7$ | — | — | 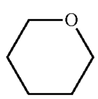 | 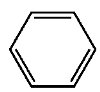 | — | 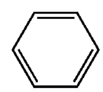 | $C_5H_{11}$ | |
TABLE 111
(2-2)
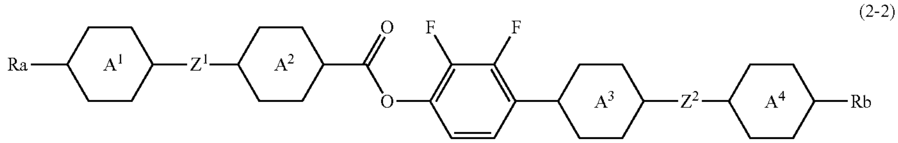
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-391 | $C_3H_7$ | 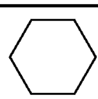 | — | 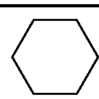 | 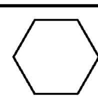 | — | 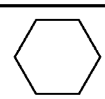 | $C_5H_{11}$ | |
| 2-2-392 | $C_5H_{11}$ | 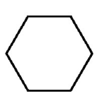 | — | 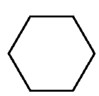 | 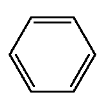 | — | 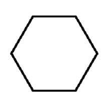 | $C_3H_7$ | |
| 2-2-393 | $C_3H_7$ | 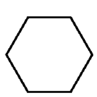 | — | 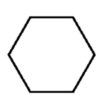 | 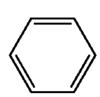 | — | 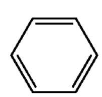 | $C_5H_{11}$ | |
| 2-2-394 | $C_5H_{11}$ | 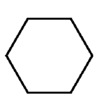 | — | 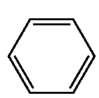 | 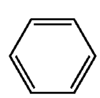 | — | 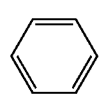 | $C_3H_7$ | |

TABLE 111-continued
(2-2)
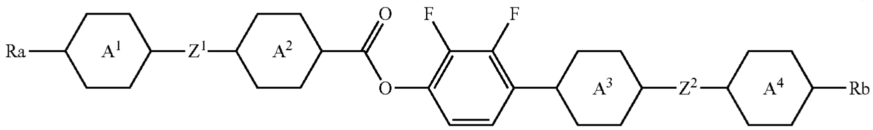
| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-395 | $C_3H_7$ |  | — | 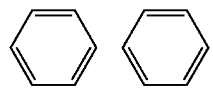 | | — | 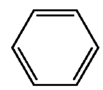 | $C_5H_{11}$ | |
| 2-2-396 | $C_5H_{11}$ |  | — | 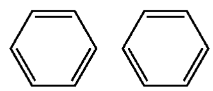 | | — | 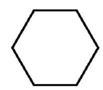 | $C_3H_7$ | |
| 2-2-397 | $C_3H_7$ | 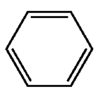 | — | 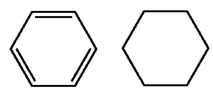 | | — | 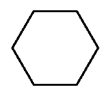 | $C_5H_{11}$ | |
| 2-2-398 | $C_3H_7$ | 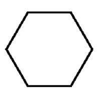 | — | 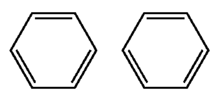 | | — | 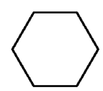 | $C_2H_5$ | |
| 2-2-399 | $C_3H_7$ | 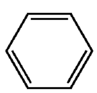 | — | 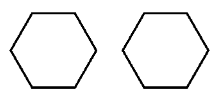 | | — | 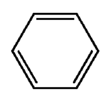 | $C_5H_{11}$ | |
| 2-2-400 | $C_5H_{11}$ | 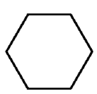 | $CH_2CH_2$ | 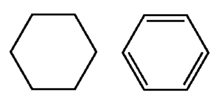 | | — | 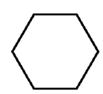 | $C_3H_7$ | |
| 2-2-401 | $C_3H_7$ | 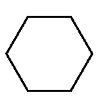 | $CH_2CH_2$ | 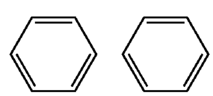 | | — | 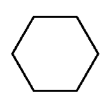 | $C_5H_{11}$ | |
| 2-2-402 | $C_5H_{11}$ | 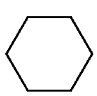 | — | 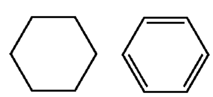 | | $CH_2CH_2$ | 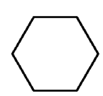 | $C_3H_7$ | |
| 2-2-403 | $C_3H_7$ | 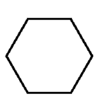 | — | 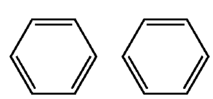 | | $CH_2CH_2$ | 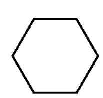 | $C_5H_{11}$ | |
| 2-2-404 | $C_5H_{11}$ | 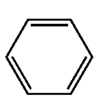 | — | 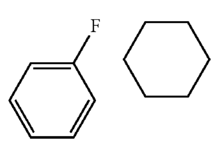 | | — | 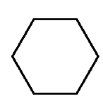 | $C_3H_7$ | |
| 2-2-405 | $C_3H_7$ | 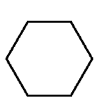 | — | 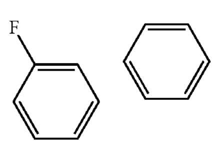 | | — | 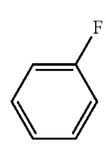 | $C_5H_{11}$ | |

TABLE 112

(2-2)

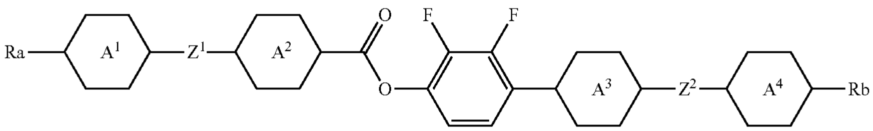

| No. | Ra | $A^1$ | $Z^1$ | $A^2$ | $A^3$ | $Z^2$ | $A^4$ | Rb | Physical property values |
|---|---|---|---|---|---|---|---|---|---|
| 2-2-406 | $C_5H_{11}$ | 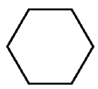 | — | 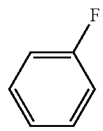 | 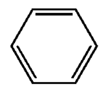 | — | 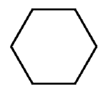 | $C_3H_7$ | |
| 2-2-407 | $C_3H_7$ | 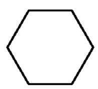 | — | 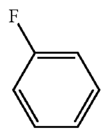 | 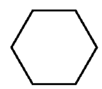 | — | 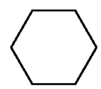 | $C_5H_{11}$ | |
| 2-2-408 | $C_3H_7$ | 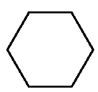 | — | 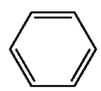 | 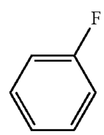 | — | 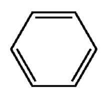 | $C_5H_{11}$ | |
| 2-2-409 | $C_3H_7$ | 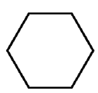 | — | 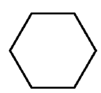 | 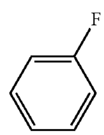 | — | 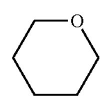 | $C_5H_{11}$ | |
| 2-2-410 | $C_3H_7$ | 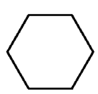 | — | 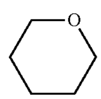 | 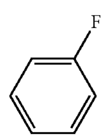 | — | 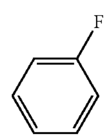 | $C_5H_{11}$ | |

Example 14

Synthesis of 4-[Difluoro-(trans-4'-pentylbicyclohexyl-3-ene-4-yl)methoxy]-2,3-difluoro-4'-propylbiphenyl (No. 1-3-363)

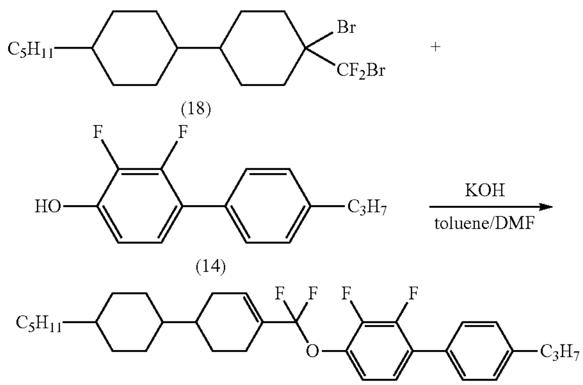

(No. 1-3-363)

Under a nitrogen atmosphere, 4-Bromo-4-bromodifluoromethyl-trans-4'-pentylbicyclohexyl (18) (10.2 g), 2,3-difluoro-4'-propylbiphenyl-4-ol (14) (5.4 g), and potassium hydroxide (KOH) (3.7 g) were put in a mixed solvent of toluene (25 ml) and DMF (25 ml), and stirred at 111° C. for another 3 hours. After completion of the reaction had been confirmed by means of gas chromatographic analysis, the reaction liquid was cooled to 25° C. Toluene (50 ml) and water (100 ml) were added to the reaction mixture, and mixed. Then, the mixture was allowed to stand until it had separated into an organic phase and an aqueous phase, and an extractive operation into an organic phase was carried out. The organic phase obtained was fractionated, washed with water, and dried over anhydrous magnesium sulfate. The solution obtained was concentrated under reduced pressure, and the residue was purified with a fractional operation by means of column chromatography using heptane as the eluent and silica gel as the stationary phase powder. The residue obtained was further purified by recrystallization from a mixed solvent of heptane and Solmix A-11 (volume ratio; heptane:Solmix A-11=2:1), and dried, giving 6.3 g of 4-[difluoro-(trans-4'-pentylbicyclohexyl-3-ene-4-yl) methoxy]-2,3-difluoro-4'-propylbiphenyl (No. 1-3-363). The yield based on the compound (14) was 67.0%.

The compound (18) can be synthesized according to a procedure similar to that for 3-chloro-2-fluoro-4'-propylbiphenyl-4-ol described in WO 2006/093189 A, using 1-bromo-2,3-difluoro-4-methoxybenzene as a raw material.

Chemical shifts δ (ppm) in $^1$H-NMR analysis were described below, and the compound obtained was identified as 4-[difluoro-(trans-4'-pentylbicyclohexyl-3-ene-4-yl) methoxy]-2,3-difluoro-4'-propylbiphenyl. The measurement solvent was $CDCl_3$.

Chemical shift δ (ppm); 7.44(d, 2H), 7.27(d, 2H), 7.17-7.12(m, 2H), 6.42(s, 1H), 2.64(t, 2H), 2.42-2.37(m, 1H), 2.24-2.21(m, 2H), 1.93-1.90(m, 2H), 1.80-1.65(m, 6H), 1.42-1.20(m, 8H), 1.18-1.11(m, 4H), 1.15-0.95(m, 5H), and 0.91-0.86(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-3-363) were as follows.

Transition temperature: C 51.2 N 207.9 Iso.

$T_{NI}$=188.6° C., Δn=0.154.

Example 15

Synthesis of 4-[difluoro-(trans-4'-pentylbicyclohexyl-trans-4-yl)methoxy]-2,3-difluoro-4'-propylbiphenyl (No. 1-3-203)

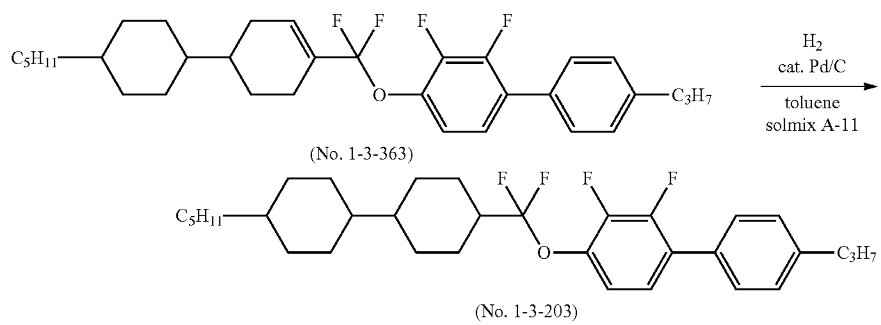

The compound (No. 1-3-363) (5.7 g) and palladium on carbon (Pd/C) (0.3 g) were put in a mixed solvent of toluene (30 ml) and Solmix A-11 (30 ml), and stirred for five days at 25° C. under a hydrogen atmosphere. After completion of the reaction had been confirmed by means of gas chromatographic analysis, palladium on carbon (Pd/C) in the reaction mixed-solution was removed by filtration, and the filtrate was purified with a fractional operation by means of column chromatography using heptane as the eluent and silica gel as the stationary phase powder. The product was further purified by recrystallization from a mixed solvent of heptane and Solmix A-11 (volume ratio; heptane:Solmix A-11=2:1), and dried, giving 3.76 g of 4-[difluoro-(trans-4'-pentylbicyclohexyl-trans-4-yl)methoxy]-2,3-difluoro-4'-propylbiphenyl (No. 1-3-203). The yield based on the compound (No. 1-3-363) was 65.7%.

Chemical shifts δ (ppm) in $^1$H-NMR analysis were described below, and the compound obtained was identified as 4-[difluoro-(trans-4'-pentylbicyclohexyl-trans-4-yl)methoxy]-2,3-difluoro-4'-propylbiphenyl. The measurement solvent was $CDCl_3$.

Chemical shift δ (ppm); 7.43(d, 2H), 7.26(d, 2H), 7.13(q, 2H), 2.63(t, 2H), 2.10-2.06(m, 3H), 1.86(d, 2H), 1.78-1.65 (m, 6H), 1.45-1.37(m, 2H), 1.33-1.21(m, 6H), 1.17-0.95(m, 12H), and 0.90-0.84(m, 5H).

Measured values of the compound itself were used for the transition temperature, and extrapolated values converted from the measured values of the sample, in which the compound was mixed in the mother liquid crystals (i), by means of the extrapolation method described above were used for the maximum temperature ($T_{NI}$), the dielectric anisotropy (Δ∈), and the optical anisotropy (Δn). The physical property-values of the compound (No. 1-3-203) were as follows.

Transition temperature: Cr 45.3 SmB 65.9 N 265.4 Iso.

$T_{NI}$=219.9° C., Δε=−1.55, Δn=0.140.

Example 16

The compounds (No. 1-3-1) to (No. 1-3-390), and the compounds (No. 2-3-1) to (No. 2-3-390), which are shown in Table 113 to 164, can be synthesized by synthetic methods similar to those described in Examples 14 and 15.

(1-3)
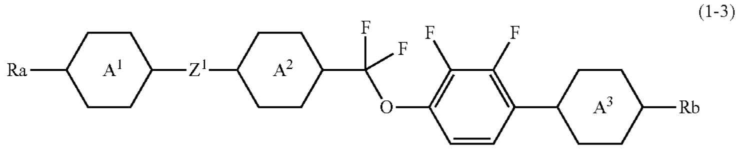
| No. | Ra | $A^1$ | $Z^1$ | $A^2$ | $A^3$ | Rb | Physical property values |
|---|---|---|---|---|---|---|---|
| 1-3-1 | $CH_3$ | 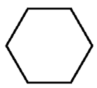 | — | 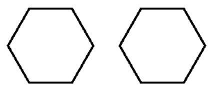 | | $CH_3$ | |
| 1-3-2 | $CH_3$ | 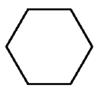 | — | 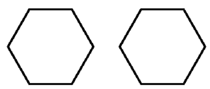 | | $C_2H_5$ | |
| 1-3-3 | $CH_3$ | 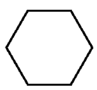 | — | 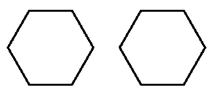 | | $C_3H_7$ | |
| 1-3-4 | $CH_3$ | 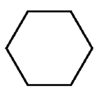 | — | 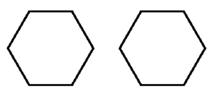 | | $C_4H_9$ | |
| 1-3-5 | $CH_3$ | 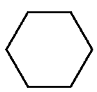 | — | 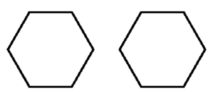 | | $C_5H_{11}$ | |
| 1-3-6 | $C_2H_5$ | 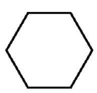 | — | 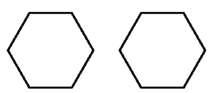 | | $CH_3$ | |
| 1-3-7 | $C_2H_5$ | 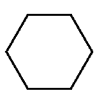 | — | 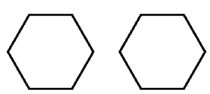 | | $C_2H_5$ | |
| 1-3-8 | $C_2H_5$ | 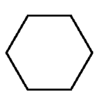 | — | 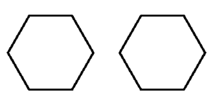 | | $C_3H_7$ | |
| 1-3-9 | $C_2H_5$ | 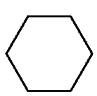 | — | 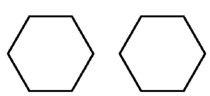 | | $C_4H_9$ | |
| 1-3-10 | $C_2H_5$ | 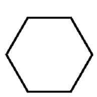 | — | 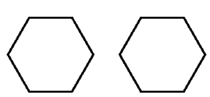 | | $C_5H_{11}$ | |
| 1-3-11 | $C_3H_7$ | 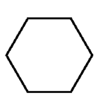 | — | 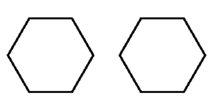 | | $CH_3$ | |
| 1-3-12 | $C_3H_7$ | 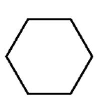 | — | 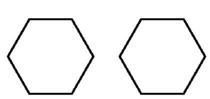 | | $C_2H_5$ | |
| 1-3-13 | $C_3H_7$ | 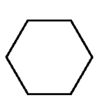 | — | 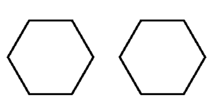 | | $C_3H_7$ | |
| 1-3-14 | $C_3H_7$ | 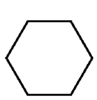 | — | 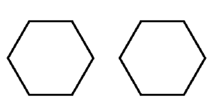 | | $C_4H_9$ | |

-continued
(1-3)
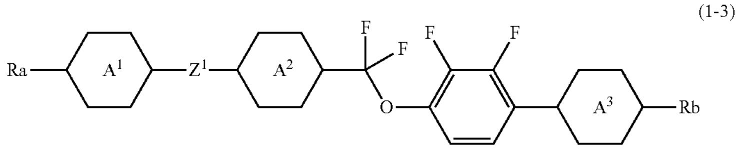
| No. | Ra | A¹ | Z¹ | A² | A³ | Rb | Physical property values |
|---|---|---|---|---|---|---|---|
| 1-3-15 | $C_3H_7$ | 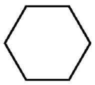 | — | 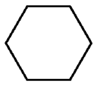 | 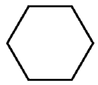 | $C_5H_{11}$ | |
TABLE 114
(1-3)
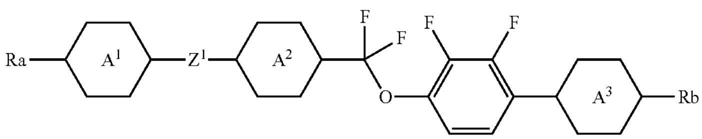
| No. | Ra | A¹ | Z¹ | A² | A³ | Rb | Physical property values |
|---|---|---|---|---|---|---|---|
| 1-3-16 | $C_4H_9$ | 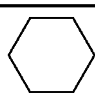 | — | 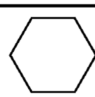 | 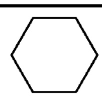 | $CH_3$ | |
| 1-3-17 | $C_4H_9$ | 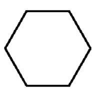 | — | 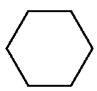 | 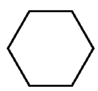 | $C_2H_5$ | |
| 1-3-18 | $C_4H_9$ | 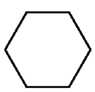 | — | 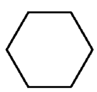 | 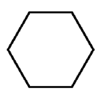 | $C_3H_7$ | |
| 1-3-19 | $C_4H_9$ | 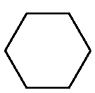 | — | 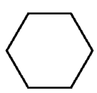 | 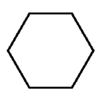 | $C_4H_9$ | |
| 1-3-20 | $C_4H_9$ | 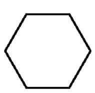 | — | 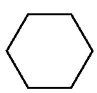 | 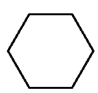 | $C_5H_{11}$ | |
| 1-3-21 | $C_5H_{11}$ | 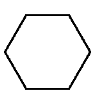 | — | 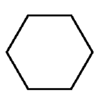 | 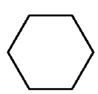 | $CH_3$ | |
| 1-3-22 | $C_5H_{11}$ | 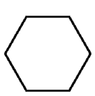 | — | 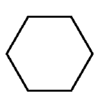 | 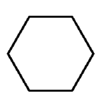 | $C_2H_5$ | |
| 1-3-23 | $C_5H_{11}$ | 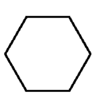 | — | 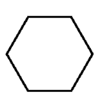 | 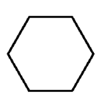 | $C_3H_7$ | |
| 1-3-24 | $C_5H_{11}$ | 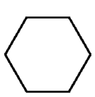 | — | 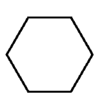 | 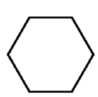 | $C_4H_9$ | |
| 1-3-25 | $C_5H_{11}$ | 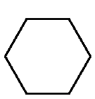 | — | 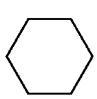 | 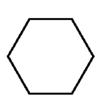 | $C_5H_{11}$ | |

TABLE 114-continued
(1-3)
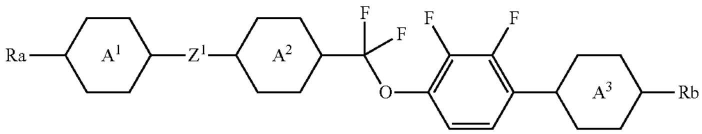
| No. | Ra | $A^1$ | $Z^1$ | $A^2$ | $A^3$ | Rb | Physical property values |
|---|---|---|---|---|---|---|---|
| 1-3-26 | $C_2H_5O$ | 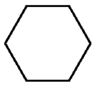 | — | 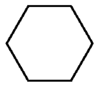 | 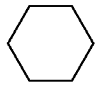 | $C_4H_9$ | |
| 1-3-27 | $C_5H_{11}$ | 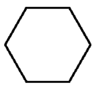 | — | 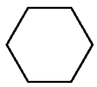 | 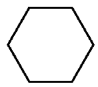 | $OC_2H_5$ | |
| 1-3-28 | $C_2H_5O$ | 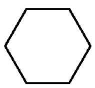 | — | 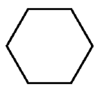 | 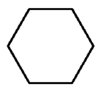 | $OC_4H_9$ | |
| 1-3-29 | $CH_2{=}CH$ | 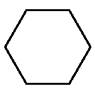 | — | 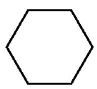 | 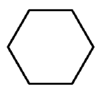 | $C_3H_7$ | |
| 1-3-30 | $CH_2{=}CH$ | 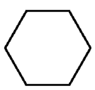 | — | 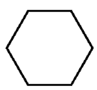 | 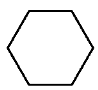 | $C_5H_{11}$ | |
TABLE 115
(1-3)
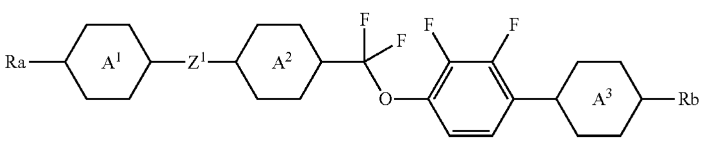
| No. | Ra | $A^1$ | $Z^1$ | $A^2$ | $A^3$ | Rb | Physical property values |
|---|---|---|---|---|---|---|---|
| 1-3-31 | $CH_3CH{=}CH$ | 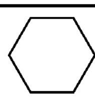 | — | 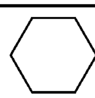 | 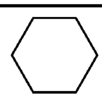 | $C_3H_7$ | |
| 1-3-32 | $CH_3CH{=}CH$ | 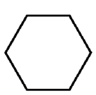 | — | 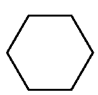 | 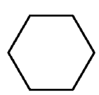 | $C_5H_{11}$ | |
| 1-3-33 | $CH_2{=}CHC_2H_4$ | 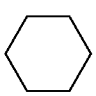 | — | 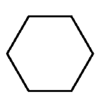 | 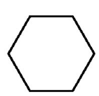 | $C_3H_7$ | |
| 1-3-34 | $CH_2{=}CHC_2H_4$ | 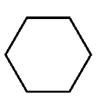 | — | 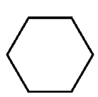 | 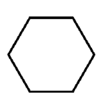 | $C_5H_{11}$ | |
| 1-3-35 | $C_3H_7CH{=}CH$ | 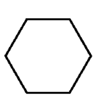 | — | 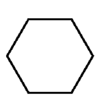 | 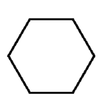 | $C_2H_5$ | |
| 1-3-36 | $C_3H_7CH{=}CH$ | 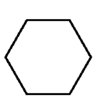 | — | 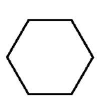 | 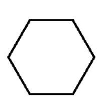 | $C_3H_7$ | |

TABLE 115-continued
(1-3)
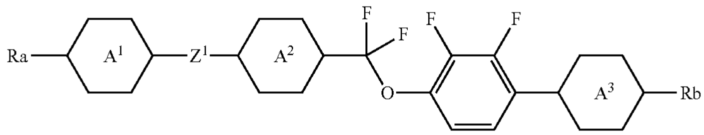
| No. | Ra | A¹ | Z¹ | A² | A³ | Rb | Physical property values |
|---|---|---|---|---|---|---|---|
| 1-3-37 | $CH_3CH{=}CHC_2H_4$ | 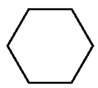 | — | 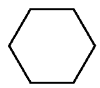 | 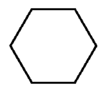 | $CH_3$ | |
| 1-3-38 | $CH_3CH{=}CHC_2H_4$ | 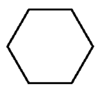 | — | 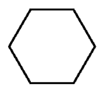 | 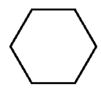 | $C_2H_5$ | |
| 1-3-39 | $C_3H_7$ | 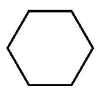 | — | 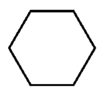 | 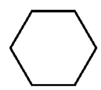 | $CH{=}CH_2$ | |
| 1-3-40 | $C_5H_{11}$ | 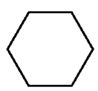 | — | 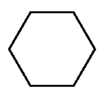 | 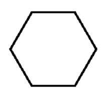 | $CH{=}CH_2$ | |
| 1-3-41 | $C_3H_7$ | 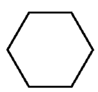 | — | 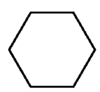 | 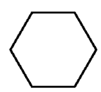 | $CH{=}CHCH_3$ | |
| 1-3-42 | $C_4H_9$ | 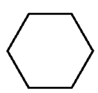 | — | 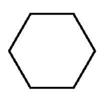 | 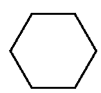 | $CH{=}CHCH_3$ | |
| 1-3-43 | $C_2H_5$ | 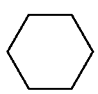 | — | 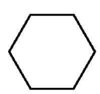 | 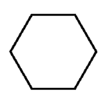 | $C_2H_4CH{=}CH_2$ | |
| 1-3-44 | $C_3H_7$ | 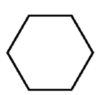 | — | 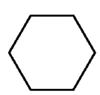 | 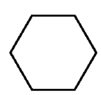 | $C_2H_4CH{=}CH_2$ | |
| 1-3-45 | $CH_3$ | 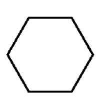 | — | 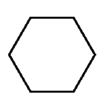 | 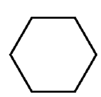 | $CH{=}CHC_3H_7$ | |
TABLE 116
(1-3)
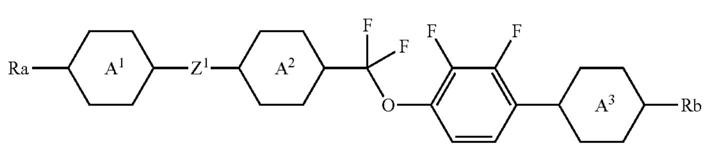
| No. | Ra | A¹ | Z¹ | A² | A³ | Rb | Physical property values |
|---|---|---|---|---|---|---|---|
| 1-3-46 | $C_2H_5$ | 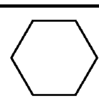 | — | 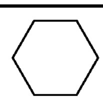 | 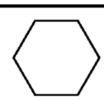 | $CH{=}CHC_3H_7$ | |

TABLE 116-continued
(1-3)
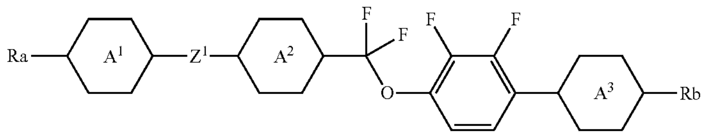
| No. | Ra | $A^1$ | $Z^1$ | $A^2$ | $A^3$ | Rb | Physical property values |
|---|---|---|---|---|---|---|---|
| 1-3-47 | $C_2H_5$ | 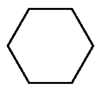 | — | 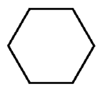 | 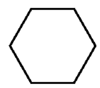 | $C_2H_4CH{=}CHCH_3$ | |
| 1-3-48 | $C_3H_7$ | 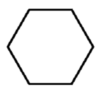 | — | 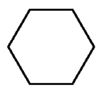 | 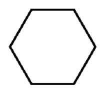 | $C_2H_4CH{=}CHCH_3$ | |
| 1-3-49 | $CH_2{=}CH$ | 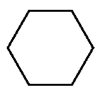 | — | 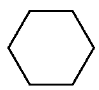 | 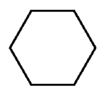 | $C_2H_4CH{=}CH_2$ | |
| 1-3-50 | $CH_3CH{=}CH$ | 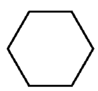 | — | 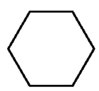 | 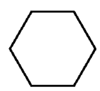 | $CH{=}CH_2$ | |
| 1-3-51 | $C_3H_7OCH_2$ | 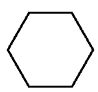 | — | 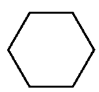 | 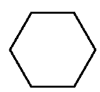 | $C_3H_7$ | |
| 1-3-52 | $C_5H_{11}$ | 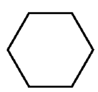 | — | 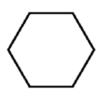 | 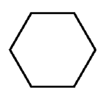 | $OC_2H_4CH{=}CH_2$ | |
| 1-3-53 | $C_3H_7$ | 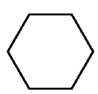 | $CH_2CH_2$ | 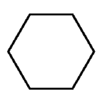 | 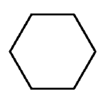 | $C_2H_5$ | |
| 1-3-54 | $C_5H_{11}$ | 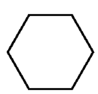 | $CH{=}CH$ | 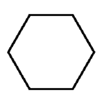 | 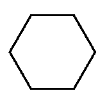 | $C_3H_7$ | |
| 1-3-55 | $C_3H_7$ | 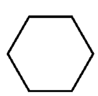 | $CH_2O$ | 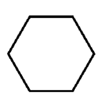 | 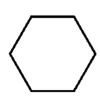 | $C_2H_5$ | |
| 1-3-56 | $C_5H_{11}$ | 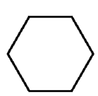 | $OCH_2$ | 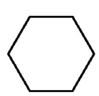 | 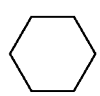 | $C_3H_7$ | |
| 1-3-57 | $C_2H_5$ | 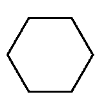 | COO | 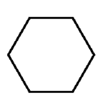 | 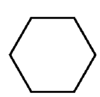 | $C_4H_9$ | |
| 1-3-58 | $C_7H_{15}$ | 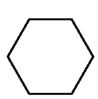 | OCO | 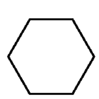 | 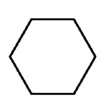 | H | |
| 1-3-59 | $C_2H_5$ | 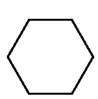 | $CF_2O$ | 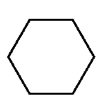 | 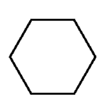 | $C_6H_{13}$ | |

TABLE 116-continued
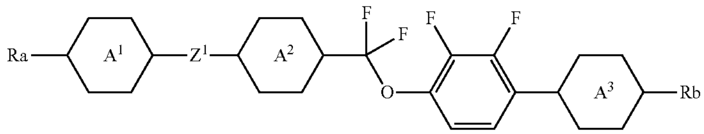
(1-3)
| No. | Ra | $A^1$ | $Z^1$ | $A^2$ | $A^3$ | Rb | Physical property values |
|---|---|---|---|---|---|---|---|
| 1-3-60 | $CH_3$ | 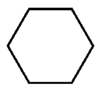 | $OCF_2$ | 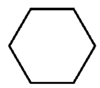 | 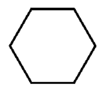 | $C_2H_5$ | |
TABLE 117
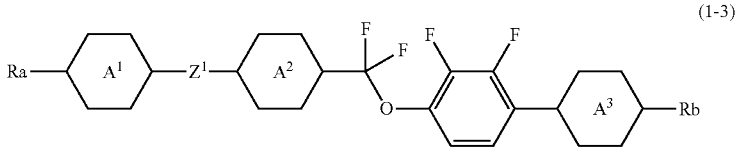
(1-3)
| No. | Ra | $A^1$ | $Z^1$ | $A^2$ | $A^3$ | Rb | Physical property values |
|---|---|---|---|---|---|---|---|
| 1-3-61 | $CH_3$ | 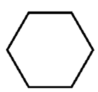 | — | 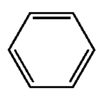 | 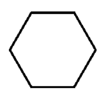 | $CH_3$ | |
| 1-3-62 | $CH_3$ | 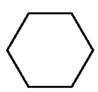 | — | 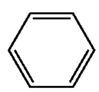 | 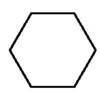 | $C_2H_5$ | |
| 1-3-63 | $CH_3$ | 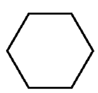 | — | 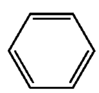 | 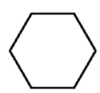 | $C_3H_7$ | |
| 1-3-64 | $CH_3$ | 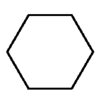 | — | 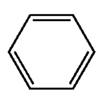 | 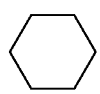 | $C_4H_9$ | |
| 1-3-65 | $CH_3$ | 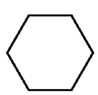 | — | 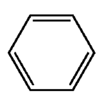 | 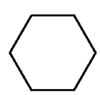 | $C_5H_{11}$ | |
| 1-3-66 | $C_2H_5$ | 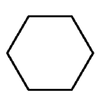 | — | 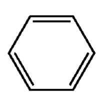 | 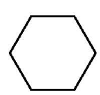 | $CH_3$ | |
| 1-3-67 | $C_2H_5$ | 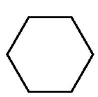 | — | 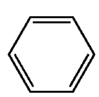 | 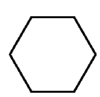 | $C_2H_5$ | |
| 1-3-68 | $C_2H_5$ | 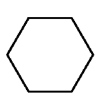 | — | 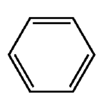 | 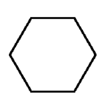 | $C_3H_7$ | |
| 1-3-69 | $C_2H_5$ | 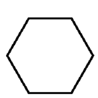 | — | 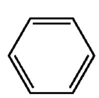 | 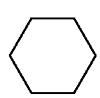 | $C_4H_9$ | |

TABLE 117-continued
(1-3)
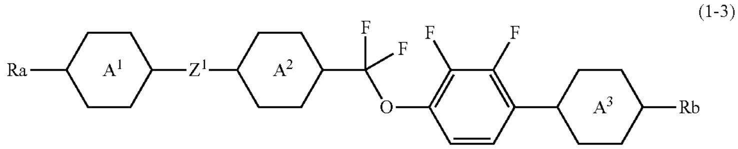
| No. | Ra | $A^1$ | $Z^1$ | $A^2$ | $A^3$ | Rb | Physical property values |
|---|---|---|---|---|---|---|---|
| 1-3-70 | $C_2H_5$ | 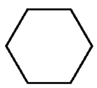 | — | 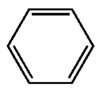 | 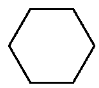 | $C_5H_{11}$ | |
| 1-3-71 | $C_3H_7$ | 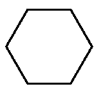 | — | 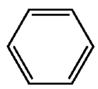 | 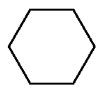 | $CH_3$ | |
| 1-3-72 | $C_3H_7$ | 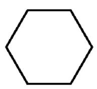 | — | 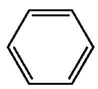 | 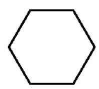 | $C_2H_5$ | |
| 1-3-73 | $C_3H_7$ | 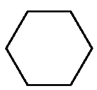 | — | 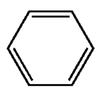 | 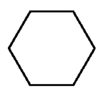 | $C_3H_7$ | |
| 1-3-74 | $C_3H_7$ | 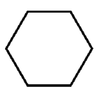 | — | 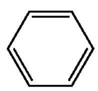 | 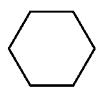 | $C_4H_9$ | |
| 1-3-75 | $C_3H_7$ | 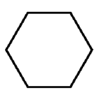 | — | 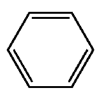 | 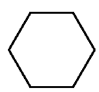 | $C_5H_{11}$ | |
TABLE 118
(1-3)
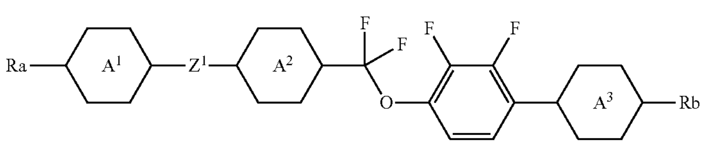
| No. | Ra | $A^1$ | $Z^1$ | $A^2$ | $A^3$ | Rb | Physical property values |
|---|---|---|---|---|---|---|---|
| 1-3-76 | $C_4H_9$ | 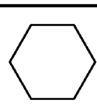 | — | 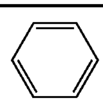 | 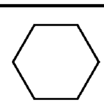 | $CH_3$ | |
| 1-3-77 | $C_4H_9$ | 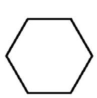 | — | 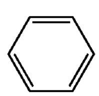 | 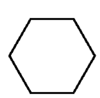 | $C_2H_5$ | |
| 1-3-78 | $C_4H_9$ | 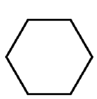 | — | 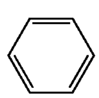 | 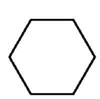 | $C_3H_7$ | |
| 1-3-79 | $C_4H_9$ | 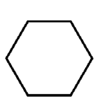 | — | 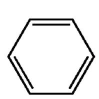 | 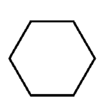 | $C_4H_9$ | |

TABLE 118-continued
(1-3)
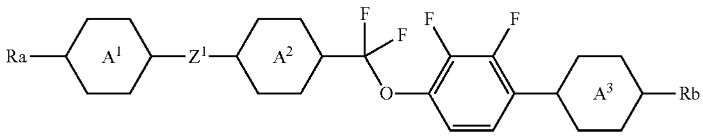
| No. | Ra | $A^1$ | $Z^1$ | $A^2$ | $A^3$ | Rb | Physical property values |
|---|---|---|---|---|---|---|---|
| 1-3-80 | $C_4H_9$ | 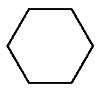 | — | 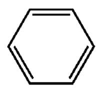 | 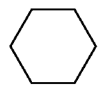 | $C_5H_{11}$ | |
| 1-3-81 | $C_5H_{11}$ | 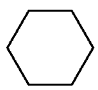 | — |  | 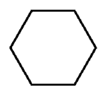 | $CH_3$ | |
| 1-3-82 | $C_5H_{11}$ | 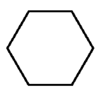 | — | 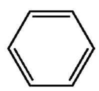 | 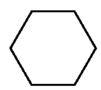 | $C_2H_5$ | |
| 1-3-83 | $C_5H_{11}$ | 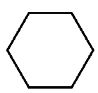 | — | 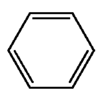 | 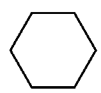 | $C_3H_7$ | |
| 1-3-84 | $C_5H_{11}$ | 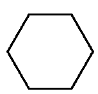 | — | 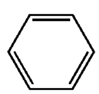 | 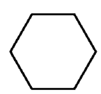 | $C_4H_9$ | |
| 1-3-85 | $C_5H_{11}$ | 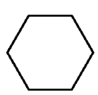 | — | 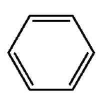 | 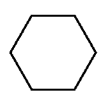 | $C_3H_7$ | |
| 1-3-86 | $C_2H_5O$ | 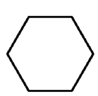 | — | 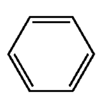 | 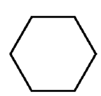 | $C_4H_9$ | |
| 1-3-87 | $C_5H_{11}$ | 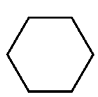 | — | 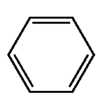 | 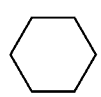 | $OC_2H_5$ | |
| 1-3-88 | $C_2H_5O$ | 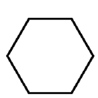 | — | 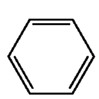 | 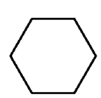 | $OC_4H_9$ | |
| 1-3-89 | $C_5H_{11}$ | 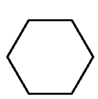 | — | 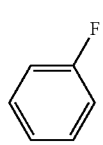 | 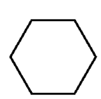 | $C_3H_7$ | |
| 1-3-90 | $C_3H_7$ | 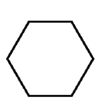 | — | 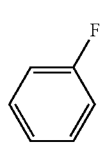 | 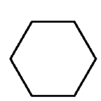 | $C_5H_{11}$ | |

TABLE 119
(1-3)
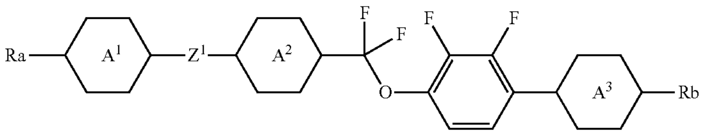
| No. | Ra | A¹ | Z¹ | A² | A³ | Rb | Physical property values |
|---|---|---|---|---|---|---|---|
| 1-3-91 | $C_2H_5$ | 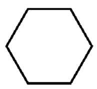 | — | 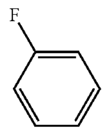 | 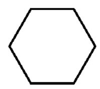 | $C_4H_9$ | |
| 1-3-92 | $C_5H_{11}$ | 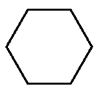 | — | 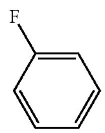 | 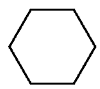 | $C_2H_5$ | |
| 1-3-93 | $CH_2{=}CH$ | 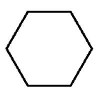 | — | 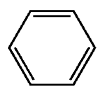 | 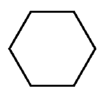 | $C_3H_7$ | |
| 1-3-94 | $CH_2{=}CH$ | 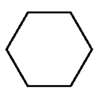 | — | 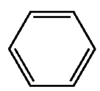 | 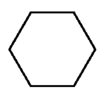 | $C_5H_{11}$ | |
| 1-3-95 | $CH_3CH{=}CH$ | 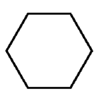 | — | 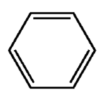 | 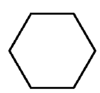 | $C_2H_5$ | |
| 1-3-96 | $CH_2{=}CHC_2H_4$ | 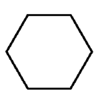 | — | 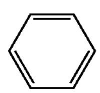 | 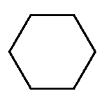 | $C_3H_7$ | |
| 1-3-97 | $C_3H_7CH{=}CH$ | 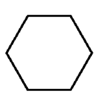 | — | 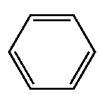 | 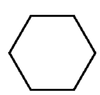 | $CH_3$ | |
| 1-3-98 | $CH_3CH{=}CHC_2H_4$ | 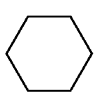 | — | 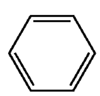 | 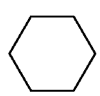 | $C_2H_5$ | |
| 1-3-99 | $C_3H_7$ | 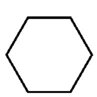 | — | 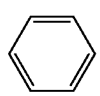 | 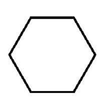 | $CH{=}CH_2$ | |
| 1-3-100 | $C_5H_{11}$ | 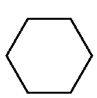 | — | 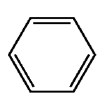 | 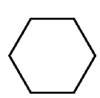 | $CH{=}CH_2$ | |
| 1-3-101 | $C_3H_7$ | 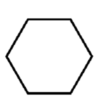 | — | 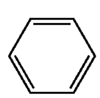 | 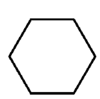 | $CH{=}CHCH_3$ | |
| 1-3-102 | $C_4H_9$ | 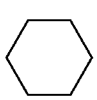 | — | 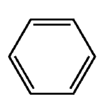 | 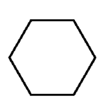 | $CH{=}CHCH_3$ | |
| 1-3-103 | $C_2H_5$ | 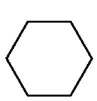 | — | 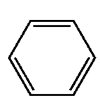 | 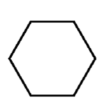 | $C_2H_4CH{=}CH_2$ | |

TABLE 119-continued
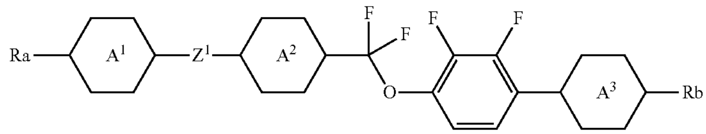
(1-3)
| No. | Ra | A1 | Z1 | A2 | A3 | Rb | Physical property values |
|---|---|---|---|---|---|---|---|
| 1-3-104 | $C_3H_7$ | 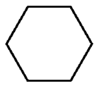 | — | 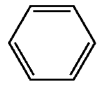 | 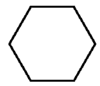 | $C_2H_4CH{=}CH_2$ | |
| 1-3-105 | $CH_3$ | 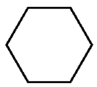 | — | 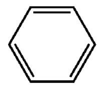 | 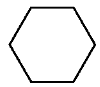 | $CH{=}CHC_3H_7$ | |
TABLE 120
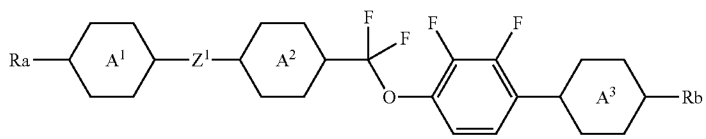
(1-3)
| No. | Ra | A1 | Z1 | A2 | A3 | Rb | Physical property values |
|---|---|---|---|---|---|---|---|
| 1-3-106 | $C_2H_5$ | 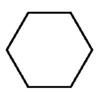 | — | 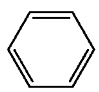 | 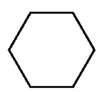 | $CH{=}CHC_3H_7$ | |
| 1-3-107 | $C_2H_5$ | 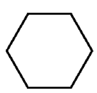 | — | 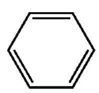 | 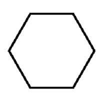 | $C_2H_4CH{=}CHCH_3$ | |
| 1-3-108 | $C_3H_7$ | 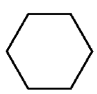 | — |  | 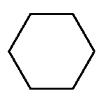 | $C_2H_4CH{=}CHCH_3$ | |
| 1-3-109 | $CH_2{=}CH$ | 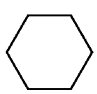 | — | 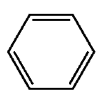 | 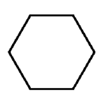 | $C_2H_4CH{=}CH_2$ | |
| 1-3-110 | $CH_3CH{=}CH$ | 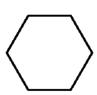 | — | 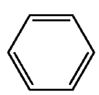 | 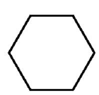 | $CH{=}CH_2$ | |
| 1-3-111 | $C_5H_{11}OCH_2$ | 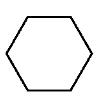 | — | 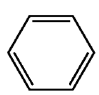 | 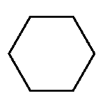 | $C_3H_7$ | |
| 1-3-112 | $C_3H_7$ | 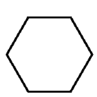 | — | 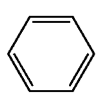 | 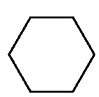 | $OC_2H_4CH{=}CH_2$ | |
| 1-3-113 | $C_4H_9$ | 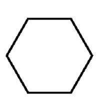 | $CH_2CH_2$ | 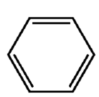 | 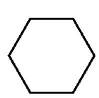 | $C_2H_5$ | |

TABLE 120-continued
(1-3)
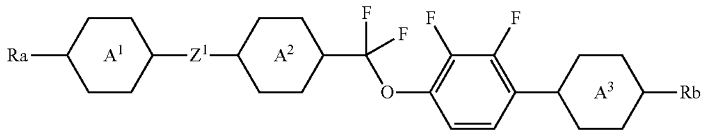
| No. | Ra | $A^1$ | $Z^1$ | $A^2$ | $A^3$ | Rb | Physical property values |
|---|---|---|---|---|---|---|---|
| 1-3-114 | $C_5H_{11}$ | 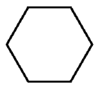 | $CH_2CH_2$ | 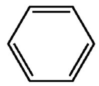 | 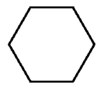 | $C_3H_7$ | |
| 1-3-115 | $C_3H_7$ | 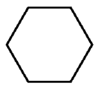 | $CH_2O$ | 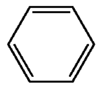 | 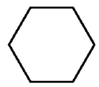 | $C_2H_5$ | |
| 1-3-116 | $C_5H_{11}$ | 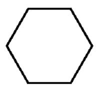 | $OCH_2$ | 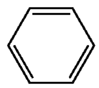 | 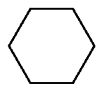 | $C_6H_{13}$ | |
| 1-3-117 | $C_5H_{11}$ | 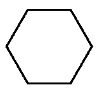 | COO | 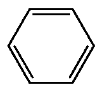 | 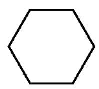 | $C_4H_9$ | |
| 1-3-118 | $C_2H_5$ | 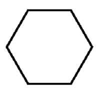 | OCO | 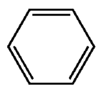 | 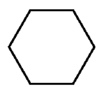 | $C_4H_9$ | |
| 1-3-119 | $C_2H_5$ | 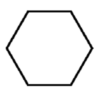 | $CF_2O$ | 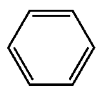 | 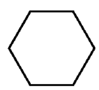 | $CH_3$ | |
| 1-3-120 | $C_4H_9$ | 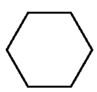 | $OCF_2$ | 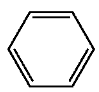 | 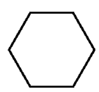 | $C_2H_5$ | |
TABLE 121
(1-3)
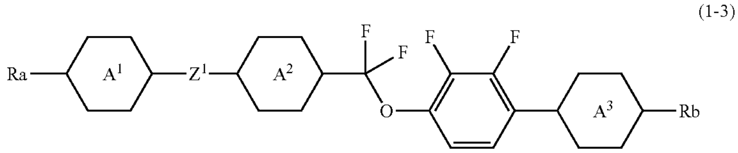
| No. | Ra | $A^1$ | $Z^1$ | $A^2$ | $A^3$ | Rb | Physical property values |
|---|---|---|---|---|---|---|---|
| 1-3-121 | $CH_3$ | 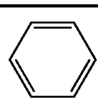 | — | 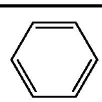 | 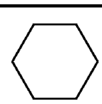 | $CH_3$ | |
| 1-3-122 | $CH_3$ | 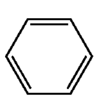 | — | 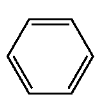 | 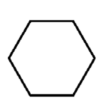 | $C_2H_5$ | |
| 1-3-123 | $CH_3$ | 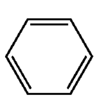 | — | 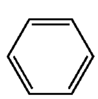 | 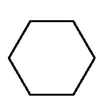 | $C_3H_7$ | |

TABLE 121-continued
(1-3)
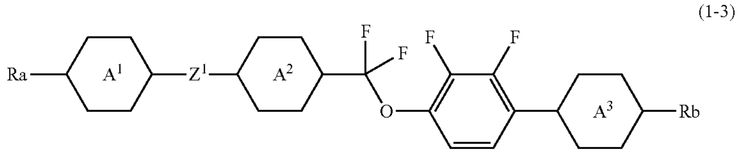
| No. | Ra | A¹ | Z¹ | A² | A³ | Rb | Physical property values |
|---|---|---|---|---|---|---|---|
| 1-3-124 | $CH_3$ | 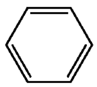 | — | 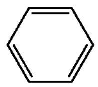 | 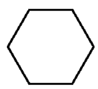 | $C_4H_9$ | |
| 1-3-125 | $CH_3$ | 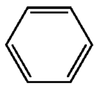 | — | 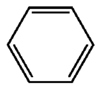 | 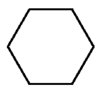 | $C_5H_{11}$ | |
| 1-3-126 | $C_2H_5$ | 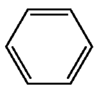 | — |  | 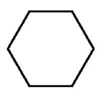 | $CH_3$ | |
| 1-3-127 | $C_2H_5$ | 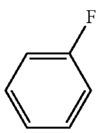 | — |  | 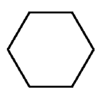 | $C_2H_5$ | |
| 1-3-128 | $C_2H_5$ |  | — | 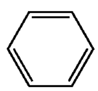 | 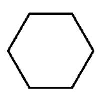 | $C_3H_7$ | |
| 1-3-129 | $C_2H_5$ | 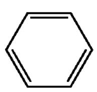 | — | 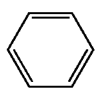 | 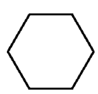 | $C_4H_9$ | |
| 1-3-130 | $C_2H_5$ | 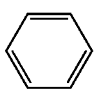 | — | 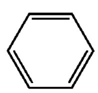 | 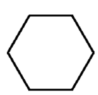 | $C_5H_{11}$ | |
| 1-3-131 | $C_3H_7$ | 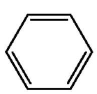 | — | 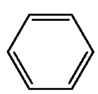 | 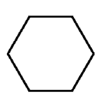 | $CH_3$ | |
| 1-3-132 | $C_3H_7$ | 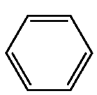 | — | 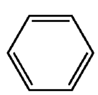 | 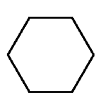 | $C_2H_5$ | |
| 1-3-133 | $C_3H_7$ | 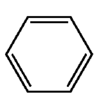 | — | 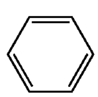 | 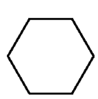 | $C_3H_7$ | |
| 1-3-134 | $C_3H_7$ | 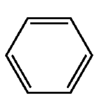 | — | 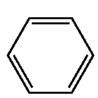 | 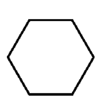 | $C_4H_9$ | |
| 1-3-135 | $C_3H_7$ | 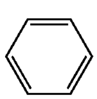 | — | 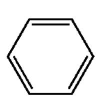 | 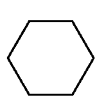 | $C_5H_{11}$ | |

TABLE 122
(1-3)
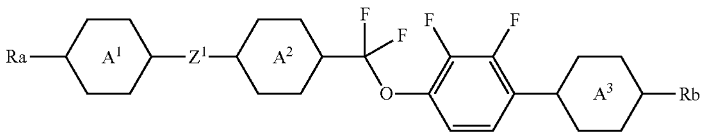
| No. | Ra | $A^1$ | $Z^1$ | $A^2$ | $A^3$ | Rb | Physical property values |
|---|---|---|---|---|---|---|---|
| 1-3-136 | $C_4H_9$ | 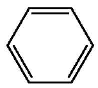 | — | 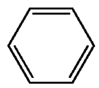 | 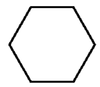 | $CH_3$ | |
| 1-3-137 | $C_4H_9$ | 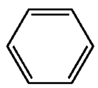 | — | 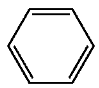 | 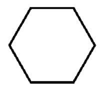 | $C_2H_5$ | |
| 1-3-138 | $C_4H_9$ |  | — |  | 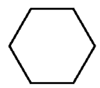 | $C_3H_7$ | |
| 1-3-139 | $C_4H_9$ | 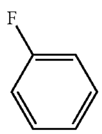 | — | 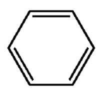 | 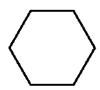 | $C_4H_9$ | |
| 1-3-140 | $C_4H_9$ | 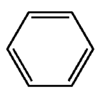 | — | 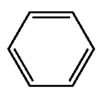 | 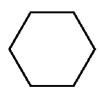 | $C_5H_{11}$ | |
| 1-3-141 | $C_5H_{11}$ | 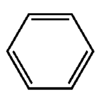 | — | 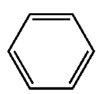 | 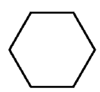 | $CH_3$ | |
| 1-3-142 | $C_5H_{11}$ | 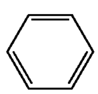 | — | 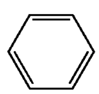 | 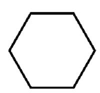 | $C_2H_5$ | |
| 1-3-143 | $C_5H_{11}$ | 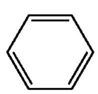 | — | 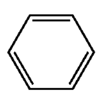 | 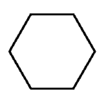 | $C_3H_7$ | |
| 1-3-144 | $C_5H_{11}$ | 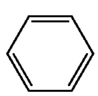 | — | 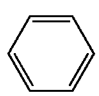 | 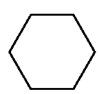 | $C_4H_9$ | |
| 1-3-145 | $C_5H_{11}$ | 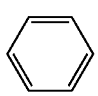 | — | 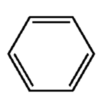 | 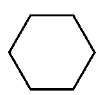 | $C_3H_7$ | |
| 1-3-146 | $C_2H_5O$ | 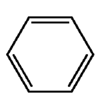 | — | 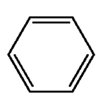 | 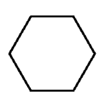 | $C_4H_9$ | |
| 1-3-147 | $C_5H_{11}$ | 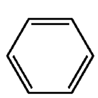 | — | 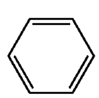 | 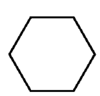 | $OC_2H_5$ | |
| 1-3-148 | $C_2H_5O$ | 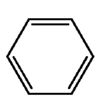 | — | 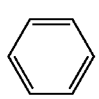 | 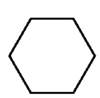 | $OC_4H_9$ | |

TABLE 122-continued
(1-3)
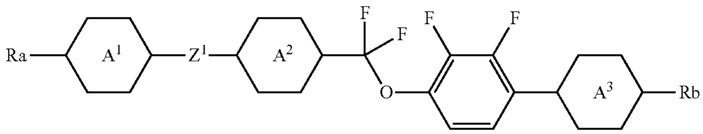
| No. | Ra | A1 | Z1 | A2 | A3 | Rb | Physical property values |
|---|---|---|---|---|---|---|---|
| 1-3-149 | $C_5H_{11}$ | 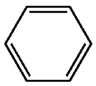 | — | 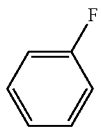 | 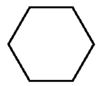 | $C_3H_7$ | |
| 1-3-150 | $C_3H_7$ |  | — | 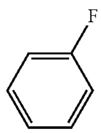 | 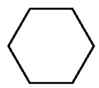 | $C_5H_{11}$ | |
TABLE 123
(1-3)
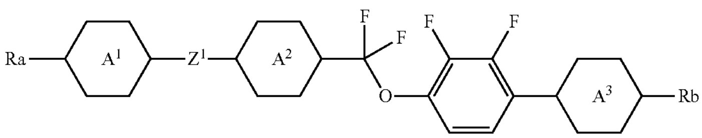
| No. | Ra | A1 | Z1 | A2 | A3 | Rb | Physical property values |
|---|---|---|---|---|---|---|---|
| 1-3-151 | $C_2H_5$ | 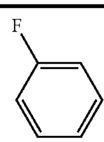 | — | 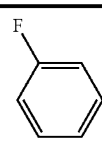 | 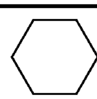 | $C_4H_9$ | |
| 1-3-152 | $C_5H_{11}$ | 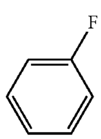 | — | 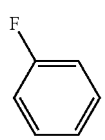 | 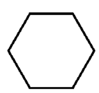 | $C_2H_5$ | |
| 1-3-153 | $CH_2{=}CH$ | 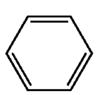 | — | 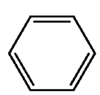 | 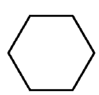 | $C_3H_7$ | |
| 1-3-154 | $CH_2{=}CH$ | 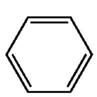 | — | 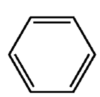 | 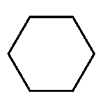 | $C_5H_{11}$ | |
| 1-3-155 | $CH_3CH{=}CH$ | 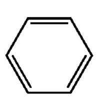 | — | 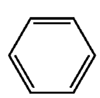 | 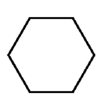 | $C_2H_5$ | |
| 1-3-156 | $CH_2{=}CHC_2H_4$ | 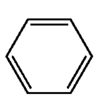 | — | 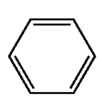 | 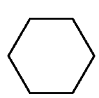 | $C_3H_7$ | |
| 1-3-157 | $C_3H_7CH{=}CH$ | 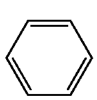 | — | 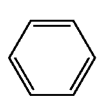 | 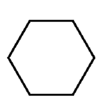 | $C_4H_9$ | |

TABLE 123-continued
(1-3)
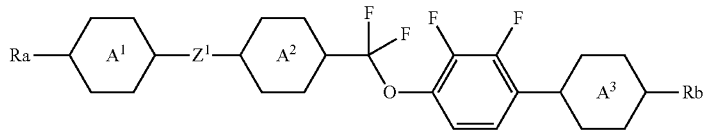
| No. | Ra | A¹ | Z¹ | A² | A³ | Rb | Physical property values |
|---|---|---|---|---|---|---|---|
| 1-3-158 | $CH_3CH{=}CHC_2H_4$ |  | — |  | 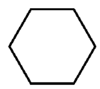 | $C_2H_5$ | |
| 1-3-159 | $C_3H_7$ | 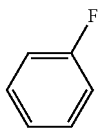 | — | 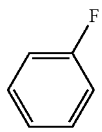 | 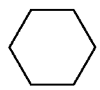 | $CH{=}CH_2$ | |
| 1-3-160 | $C_5H_{11}$ |  | — | 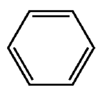 | 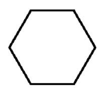 | $CH{=}CH_2$ | |
| 1-3-161 | $C_3H_7$ |  | — | 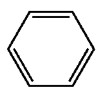 | 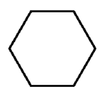 | $CH{=}CHCH_3$ | |
| 1-3-162 | $C_4H_9$ |  | — |  | 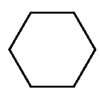 | $CH{=}CHCH_3$ | |
| 1-3-163 | $C_3H_7$ | 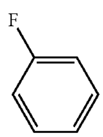 | — | 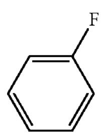 | 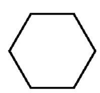 | $C_2H_4CH{=}CH_2$ | |
| 1-3-164 | $C_3H_7$ | 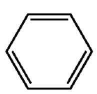 | — | 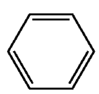 | 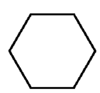 | $C_2H_4CH{=}CH_2$ | |
| 1-3-165 | $C_4H_9$ | 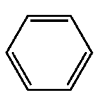 | — | 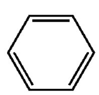 | 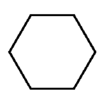 | $CH{=}CHC_3H_7$ | |
TABLE 124
(1-3)
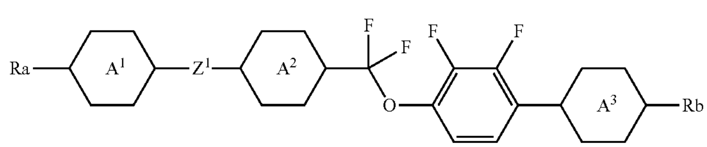
| No. | Ra | A¹ | Z¹ | A² | A³ | Rb | Physical property values |
|---|---|---|---|---|---|---|---|
| 1-3-166 | $C_2H_5$ | 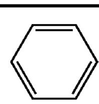 | — | 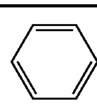 | 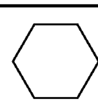 | $CH{=}CHC_3H_7$ | |

TABLE 124-continued
(1-3)
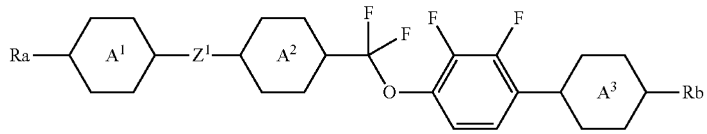
| No. | Ra | $A^1$ | $Z^1$ | $A^2$ | $A^3$ | Rb | Physical property values |
|---|---|---|---|---|---|---|---|
| 1-3-167 | $C_2H_5$ | 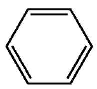 | — | 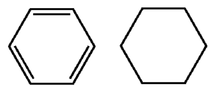 | | $C_2H_4CH{=}CHCH_3$ | |
| 1-3-168 | $C_3H_7$ | 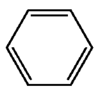 | — | 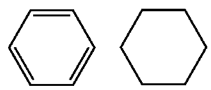 | | $C_2H_4CH{=}CHCH_3$ | |
| 1-3-169 | $CH_2{=}CH$ |  | — | 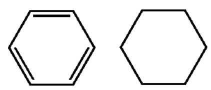 | | $CH{=}CH_2$ | |
| 1-3-170 | $CH_3CH{=}CH$ | 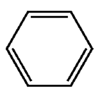 | — | 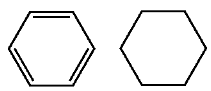 | | $C_2H_4CH{=}CH_2$ | |
| 1-3-171 | $CH_3OCH_2$ | 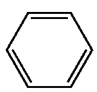 | — | 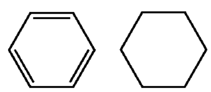 | | $C_3H_7$ | |
| 1-3-172 | $C_2H_5$ | 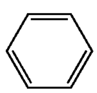 | — | 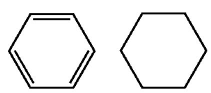 | | $OC_2H_4CH{=}CH_2$ | |
| 1-3-173 | $C_3H_7$ | 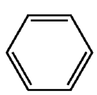 | $CH_2CH_2$ | 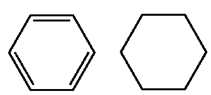 | | $C_2H_5$ | |
| 1-3-174 | $C_5H_{11}$ | 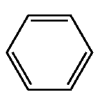 | C≡C | 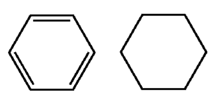 | | $C_3H_7$ | |
| 1-3-175 | $C_3H_7$ | 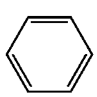 | $CH_2O$ | 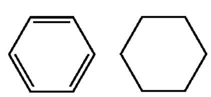 | | $C_3H_7$ | |
| 1-3-176 | $C_3H_7$ | 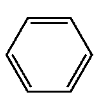 | $OCH_2$ | 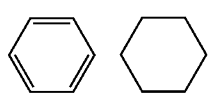 | | $CH_3$ | |
| 1-3-177 | $C_5H_{11}$ | 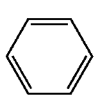 | COO | 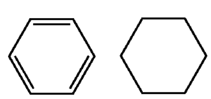 | | $C_4H_9$ | |
| 1-3-178 | $C_2H_5$ | 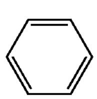 | OCO | 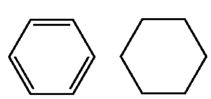 | | $C_3H_7$ | |
| 1-3-179 | $C_2H_5$ | 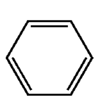 | $CF_2O$ | 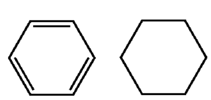 | | $C_7H_{15}$ | |
| 1-3-180 | $C_4H_9$ | 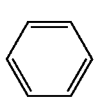 | $OCF_2$ | 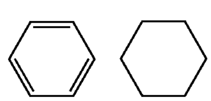 | | $C_2H_5$ | |

TABLE 125
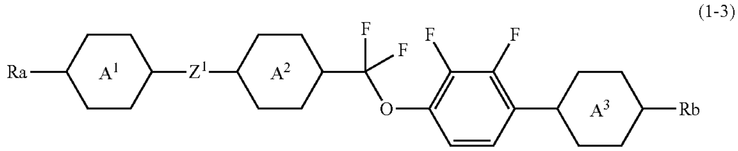
(1-3)
| No. | Ra | A¹ | Z¹ | A² | A³ | Rb | Physical property values |
|---|---|---|---|---|---|---|---|
| 1-3-181 | $CH_3$ | 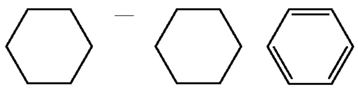 | — | | | $CH_3$ | |
| 1-3-182 | $CH_3$ | 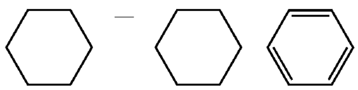 | — | | | $C_2H_5$ | |
| 1-3-183 | $CH_3$ | 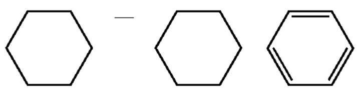 | — | | | $C_3H_7$ | |
| 1-3-184 | $CH_3$ | 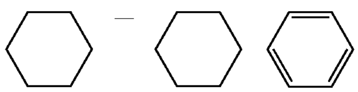 | — | | | $C_4H_9$ | |
| 1-3-185 | $CH_3$ | 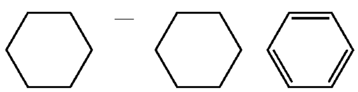 | — | | | $C_5H_{11}$ | |
| 1-3-186 | $C_2H_5$ | 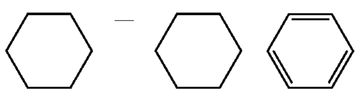 | — | | | $CH_3$ | |
| 1-3-187 | $C_2H_5$ | 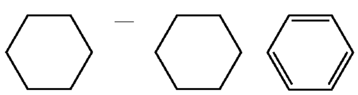 | — | | | $C_2H_5$ | |
| 1-3-188 | $C_2H_5$ | 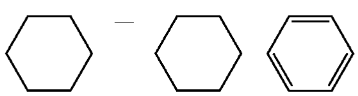 | — | | | $C_3H_7$ | |
| 1-3-189 | $C_2H_5$ | 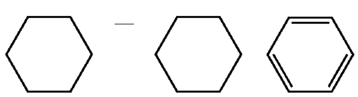 | — | | | $C_4H_9$ | |
| 1-3-190 | $C_2H_5$ | 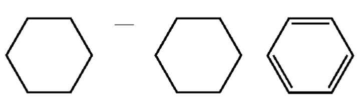 | — | | | $C_5H_{11}$ | |
| 1-3-191 | $C_3H_7$ | 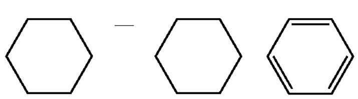 | — | | | $CH_3$ | |
| 1-3-192 | $C_3H_7$ | 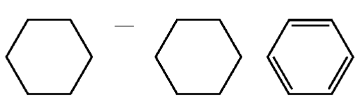 | — | | | $C_2H_5$ | |
| 1-3-193 | $C_3H_7$ | 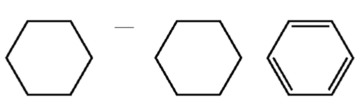 | — | | | $C_3H_7$ | |
| 1-3-194 | $C_3H_7$ | 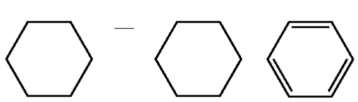 | — | | | $C_4H_9$ | |

TABLE 125-continued
(1-3)
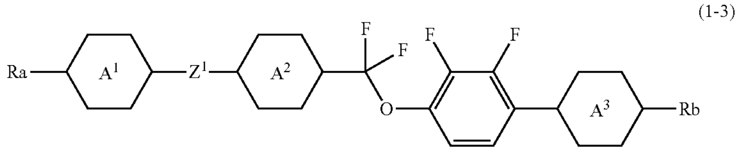
| No. | Ra | $A^1$ | $Z^1$ | $A^2$ | $A^3$ | Rb | Physical property values |
|---|---|---|---|---|---|---|---|
| 1-3-195 | $C_3H_7$ | 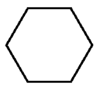 | — | 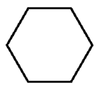 | 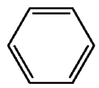 | $C_5H_{11}$ | |
TABLE 126
(1-3)
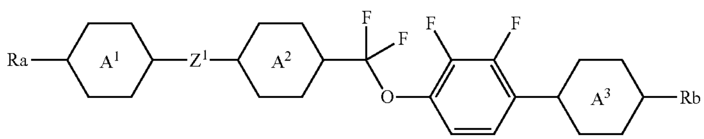
| No. | Ra | $A^1$ | $Z^1$ | $A^2$ | $A^3$ | Rb | Physical property values |
|---|---|---|---|---|---|---|---|
| 1-3-196 | $C_4H_9$ | 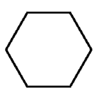 | — | 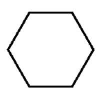 | 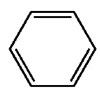 | $CH_3$ | |
| 1-3-197 | $C_4H_9$ | 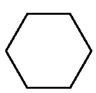 | — | 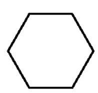 | 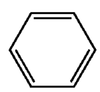 | $C_2H_5$ | |
| 1-3-198 | $C_4H_9$ | 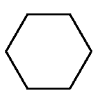 | — | 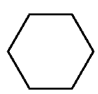 | 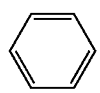 | $C_3H_7$ | |
| 1-3-199 | $C_4H_9$ | 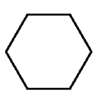 | — | 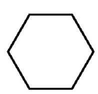 | 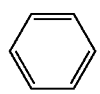 | $C_4H_9$ | |
| 1-3-200 | $C_4H_9$ | 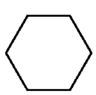 | — | 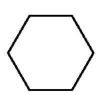 | 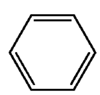 | $C_5H_{11}$ | |
| 1-3-201 | $C_5H_{11}$ | 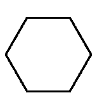 | — | 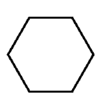 | 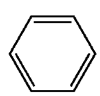 | $CH_3$ | |
| 1-3-202 | $C_5H_{11}$ | 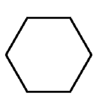 | — | 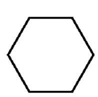 | 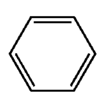 | $C_2H_5$ | |
| 1-3-203 | $C_5H_{11}$ | 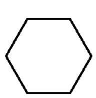 | — | 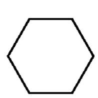 | 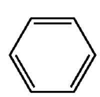 | $C_3H_7$ | Cr 45.3 SmB 65.9 N 265.4 Iso $T_{NI}$: 219.9° C., $\Delta\epsilon$: −1.55, $\Delta n$: 0.140 |
| 1-3-204 | $C_5H_{11}$ | 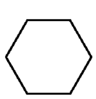 | — | 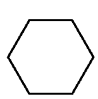 | 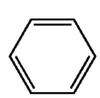 | $C_4H_9$ | |
| 1-3-205 | $C_5H_{11}$ | 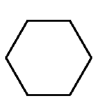 | — | 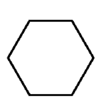 | 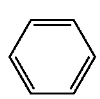 | $C_5H_{11}$ | |

TABLE 126-continued
(1-3)
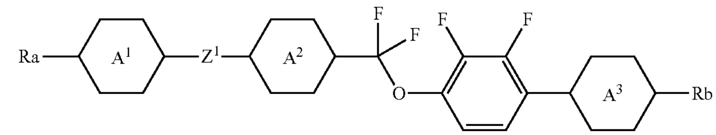
| No. | Ra | $A^1$ | $Z^1$ | $A^2$ | $A^3$ | Rb | Physical property values |
|---|---|---|---|---|---|---|---|
| 1-3-206 | $C_2H_5O$ | 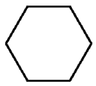 | — | 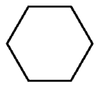 | 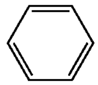 | $C_4H_9$ | |
| 1-3-207 | $C_5H_{11}$ | 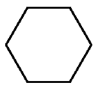 | — | 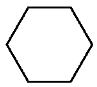 | 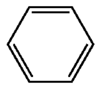 | $OC_2H_5$ | |
| 1-3-208 | $C_2H_5O$ | 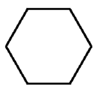 | — | 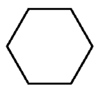 | 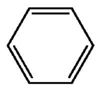 | $OC_4H_9$ | |
| 1-3-209 | $C_3H_7$ | 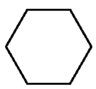 | — | 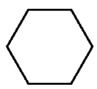 | 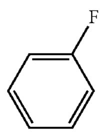 | $OC_4H_9$ | |
| 1-3-210 | $C_5H_{11}$ | 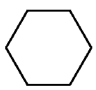 | — | 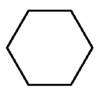 | 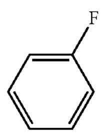 | $OC_2H_5$ | |
TABLE 127
(1-3)
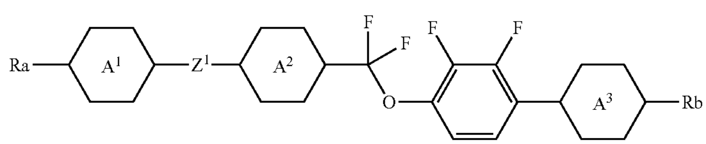
| No. | Ra | $A^1$ | $Z^1$ | $A^2$ | $A^3$ | Rb | Physical property values |
|---|---|---|---|---|---|---|---|
| 1-3-211 | $C_3H_7$ | 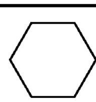 | — | 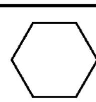 | 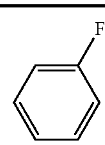 | $C_5H_{11}$ | |
| 1-3-212 | $C_5H_{11}$ | 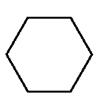 | — | 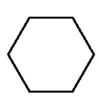 | 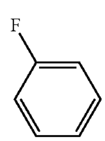 | $C_2H_5$ | |
| 1-3-213 | $C_4H_9O$ | 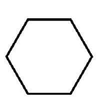 | — | 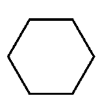 | 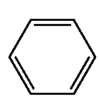 | $C_3H_7$ | |
| 1-3-214 | $CH_2{=}CH$ | 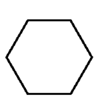 | — | 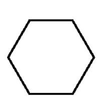 | 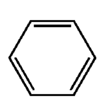 | $C_5H_{11}$ | |

TABLE 127-continued
(1-3)
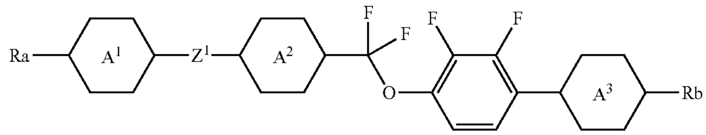
| No. | Ra | $A^1$ | $Z^1$ | $A^2$ | $A^3$ | Rb | Physical property values |
|---|---|---|---|---|---|---|---|
| 1-3-215 | $CH_2{=}CH$ | 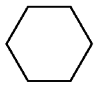 | — | 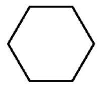 | 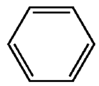 | $C_2H_5$ | |
| 1-3-216 | $CH_2{=}CHC_2H_4$ | 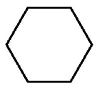 | — | 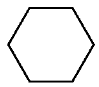 | 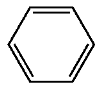 | $C_3H_7$ | |
| 1-3-217 | $CH_3CH{=}CH$ | 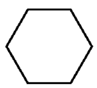 | — | 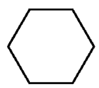 | 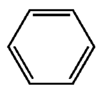 | $CH_3$ | |
| 1-3-218 | $CH_2{=}CHC_2H_4$ | 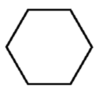 | — | 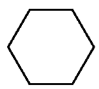 | 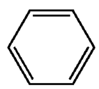 | $C_2H_5$ | |
| 1-3-219 | $C_3H_7CH{=}CH$ | 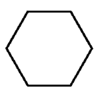 | — | 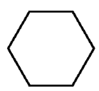 |  | $C_3H_7$ | |
| 1-3-220 | $CH_3CH{=}CHC_2H_4$ | 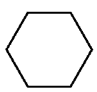 | — | 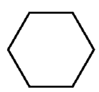 |  | $C_4H_9$ | |
| 1-3-221 | $CH_3$ | 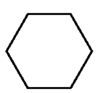 | — | 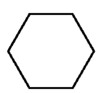 | 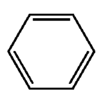 | $CH_2OC_3H_7$ | |
| 1-3-222 | $C_4H_9$ | 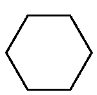 | — | 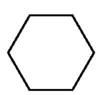 | 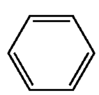 | $CH_2CH_2F$ | |
| 1-3-223 | $C_2H_5$ | 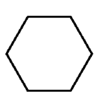 | — | 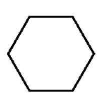 | 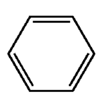 | $CH{=}CHCH_3$ | |
| 1-3-224 | $C_3H_7$ | 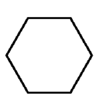 | — | 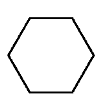 | 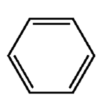 | $CH{=}CHC_3H_7$ | |
| 1-3-225 | $C_3H_7$ | 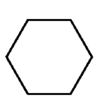 | — | 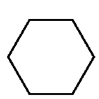 | 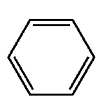 | $C_2H_4CH{=}CH_2$ | |

TABLE 128
(1-3)
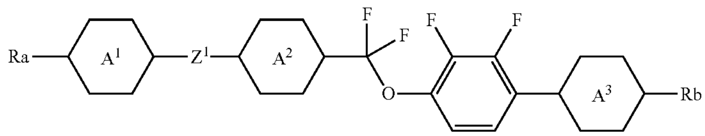
| No. | Ra | A¹ | Z¹ | A² | A³ | Rb | Physical property values |
|---|---|---|---|---|---|---|---|
| 1-3-226 | $C_2H_5$ | 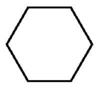 | — | 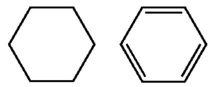 | | $C_2H_4CH{=}CH_2$ | |
| 1-3-227 | $C_5H_{11}$ | 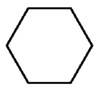 | — | 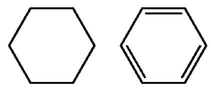 | | $C_2H_4CH{=}CHCH_3$ | |
| 1-3-228 | $C_3H_7$ | 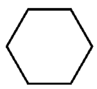 | — | 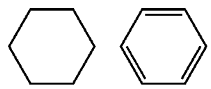 | | $C_2H_4CH{=}CHCH_3$ | |
| 1-3-229 | $CH_2{=}CH$ | 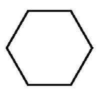 | — | 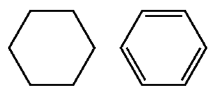 | | $C_2H_4CH{=}CH_2$ | |
| 1-3-230 | $CH_3CH{=}CH$ | 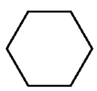 | — | 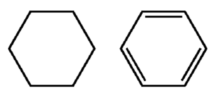 | | $C_2H_4CH{=}CH_2$ | |
| 1-3-231 | $C_3H_7OCH_2$ | 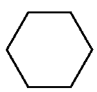 | — | 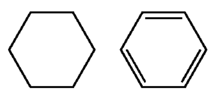 | | $C_3H_7$ | |
| 1-3-232 | $C_3H_7$ | 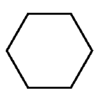 | — | 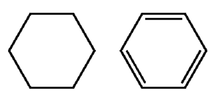 | | $OC_2H_4CH{=}CH_2$ | |
| 1-3-233 | $C_5H_{11}$ | 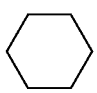 | $CH_2CH_2$ | 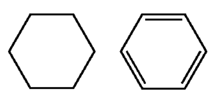 | | $C_2H_5$ | |
| 1-3-234 | $C_5H_{11}$ | 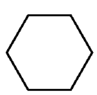 | $CH_2CH_2$ | 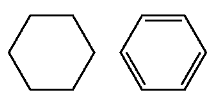 | | $C_3H_7$ | |
| 1-3-235 | $C_3H_7$ | 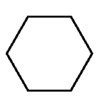 | $CH_2O$ | 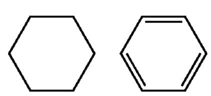 | | H | |
| 1-3-236 | $C_2H_5$ | 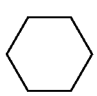 | $OCH_2$ | 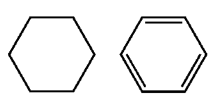 | | $C_3H_7$ | |
| 1-3-237 | $C_4H_9$ | 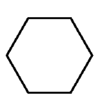 | COO | 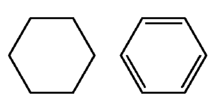 | | $C_4H_9$ | |
| 1-3-238 | $C_3H_7$ | 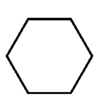 | OCO | 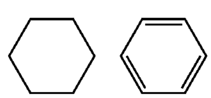 | | $C_2H_5$ | |
| 1-3-239 | $C_7H_{15}$ | 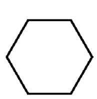 | $CF_2O$ | 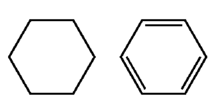 | | $C_2H_5$ | |

TABLE 128-continued
(1-3)
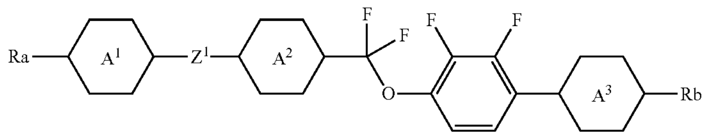
| No. | Ra | $A^1$ | $Z^1$ | $A^2$ | $A^3$ | Rb | Physical property values |
|---|---|---|---|---|---|---|---|
| 1-3-240 | $C_9H_{19}$ | 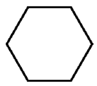 | $OCF_2$ | 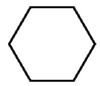 | 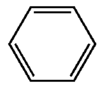 | $CH_3$ | |
TABLE 129
(1-3)
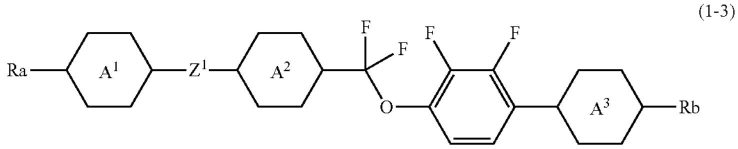
| No. | Ra | $A^1$ | $Z^1$ | $A^2$ | $A^3$ | Rb | Physical property values |
|---|---|---|---|---|---|---|---|
| 1-3-241 | $CH_3$ | 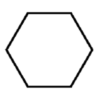 | — | 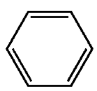 | 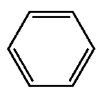 | $CH_3$ | |
| 1-3-242 | $CH_3$ | 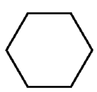 | — |  | 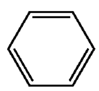 | $C_2H_5$ | |
| 1-3-243 | $CH_3$ | 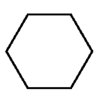 | — | 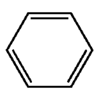 | 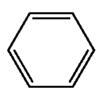 | $C_3H_7$ | |
| 1-3-244 | $CH_3$ | 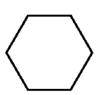 | — | 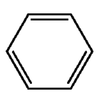 | 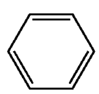 | $C_4H_9$ | |
| 1-3-245 | $CH_3$ | 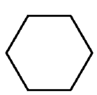 | — | 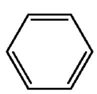 | 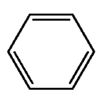 | $C_5H_{11}$ | |
| 1-3-246 | $C_2H_5$ | 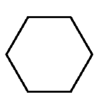 | — | 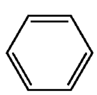 | 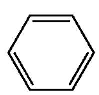 | $CH_3$ | |
| 1-3-247 | $C_2H_5$ | 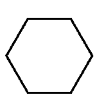 | — | 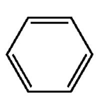 | 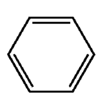 | $C_2H_5$ | |
| 1-3-248 | $C_2H_5$ | 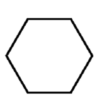 | — | 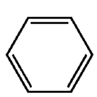 | 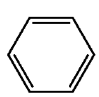 | $C_3H_7$ | |
| 1-3-249 | $C_2H_5$ | 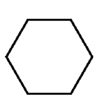 | — | 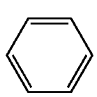 | 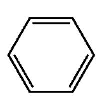 | $C_4H_9$ | |
| 1-3-250 | $C_2H_5$ | 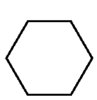 | — | 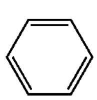 | 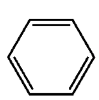 | $C_5H_{11}$ | |

TABLE 129-continued
(1-3)
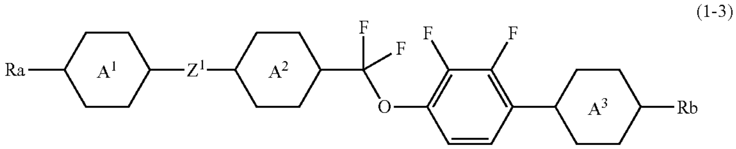
| No. | Ra | $A^1$ | $Z^1$ | $A^2$ | $A^3$ | Rb | Physical property values |
|---|---|---|---|---|---|---|---|
| 1-3-251 | $C_3H_7$ | 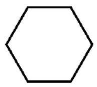 | — | 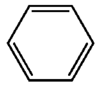 | 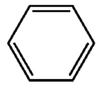 | $CH_3$ | |
| 1-3-252 | $C_3H_7$ | 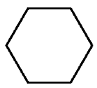 | — | 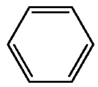 | 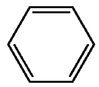 | $C_2H_5$ | |
| 1-3-253 | $C_3H_7$ | 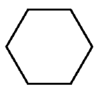 | — |  | 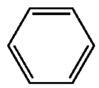 | $C_3H_7$ | |
| 1-3-254 | $C_3H_7$ | 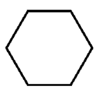 | — | 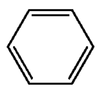 | 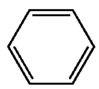 | $C_4H_9$ | |
| 1-3-255 | $C_3H_7$ | 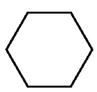 | — |  | 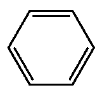 | $C_5H_{11}$ | |
TABLE 130
(1-3)
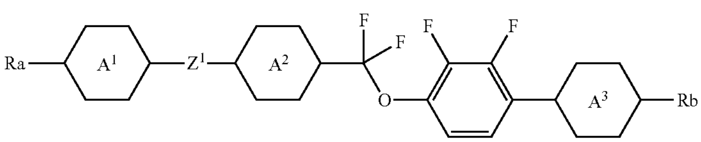
| No. | Ra | $A^1$ | $Z^1$ | $A^2$ | $A^3$ | Rb | Physical property values |
|---|---|---|---|---|---|---|---|
| 1-3-256 | $C_4H_9$ | 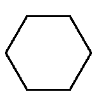 | — | 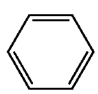 | 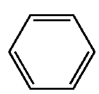 | $CH_3$ | |
| 1-3-257 | $C_4H_9$ | 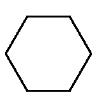 | — | 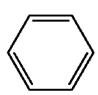 | 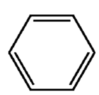 | $C_2H_5$ | |
| 1-3-258 | $C_4H_9$ | 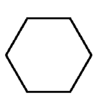 | — | 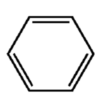 | 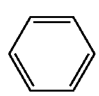 | $C_3H_7$ | |
| 1-3-259 | $C_4H_9$ | 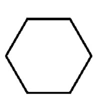 | — | 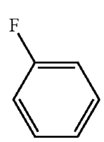 | 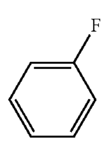 | $C_4H_9$ | |
| 1-3-260 | $C_4H_9$ | 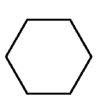 | — | 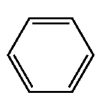 | 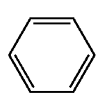 | $C_5H_{11}$ | |

TABLE 130-continued
(1-3)
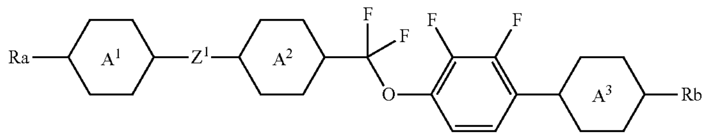
| No. | Ra | $A^1$ | $Z^1$ | $A^2$ | $A^3$ | Rb | Physical property values |
|---|---|---|---|---|---|---|---|
| 1-3-261 | $C_5H_{11}$ | 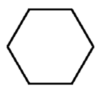 | — | 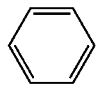 | 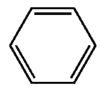 | $CH_3$ | |
| 1-3-262 | $C_5H_{11}$ | 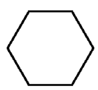 | — | 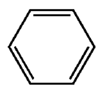 | 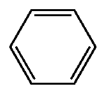 | $C_2H_5$ | |
| 1-3-263 | $C_5H_{11}$ | 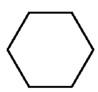 | — | 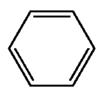 | 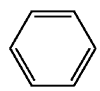 | $C_3H_7$ | |
| 1-3-264 | $C_5H_{11}$ | 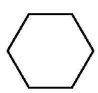 | — | 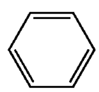 | 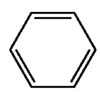 | $C_4H_9$ | |
| 1-3-265 | $C_5H_{11}$ | 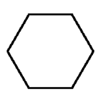 | — | 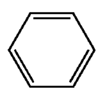 | 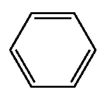 | $C_5H_{11}$ | |
| 1-3-266 | $C_2H_5O$ | 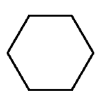 | — | 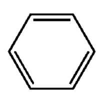 | 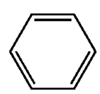 | $C_4H_9$ | |
| 1-3-267 | $C_5H_{11}$ | 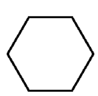 | — | 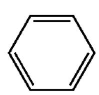 | 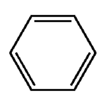 | $OC_2H_5$ | |
| 1-3-268 | $C_2H_5O$ | 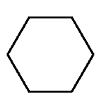 | — | 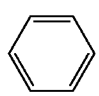 | 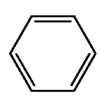 | $OC_4H_9$ | |
| 1-3-269 | $C_3H_7$ | 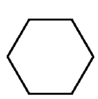 | — | 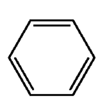 | 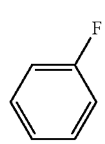 | $OC_4H_9$ | |
| 1-3-270 | $C_5H_{11}$ | 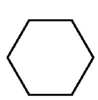 | — | 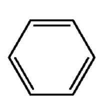 | 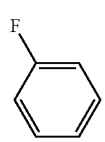 | $OC_2H_5$ | |

TABLE 131
(1-3)
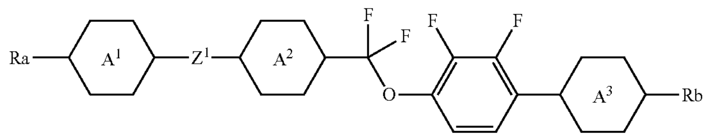
| No. | Ra | A1 | Z1 | A2 | A3 | Rb | Physical property values |
|---|---|---|---|---|---|---|---|
| 1-3-271 | $C_3H_7$ | 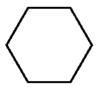 | — | 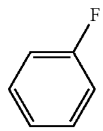 | 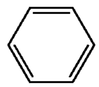 | $C_5H_{11}$ | |
| 1-3-272 | $C_3H_7O$ | 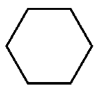 | — | 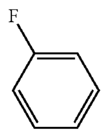 | 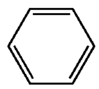 | $C_5H_{11}$ | |
| 1-3-273 | $C_5H_{11}$ | 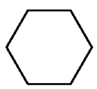 | — | 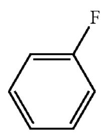 | 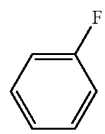 | $OC_2H_5$ | |
| 1-3-274 | $CH_2{=}CH$ | 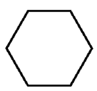 | — | 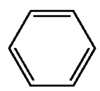 |  | $C_5H_{11}$ | |
| 1-3-275 | $CH_3CH{=}CH$ | 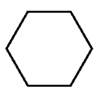 | — | 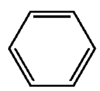 |  | $C_2H_5$ | |
| 1-3-276 | $CH_2{=}CHC_2H_4$ | 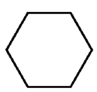 | — | 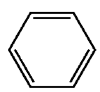 | 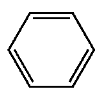 | $C_3H_7$ | |
| 1-3-277 | $C_3H_7CH{=}CH$ | 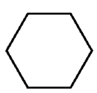 | — | 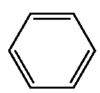 | 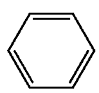 | $CH_3$ | |
| 1-3-278 | $CH_3CH{=}CHC_2H_4$ | 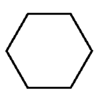 | — | 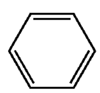 | 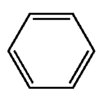 | $C_2H_5$ | |
| 1-3-279 | $C_2H_5$ | 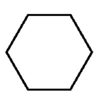 | — | 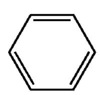 | 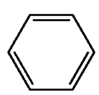 | $CH_2CH_2CHF_2$ | |
| 1-3-280 | $CH_2FCH_2CH_2$ | 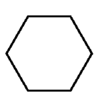 | — | 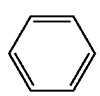 | 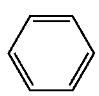 | $C_4H_9$ | |
| 1-3-281 | $CH_3$ | 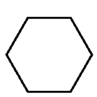 | — | 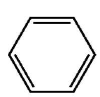 | 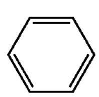 | $CH{=}CH_2$ | |
| 1-3-282 | $C_4H_9$ | 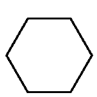 | — | 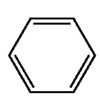 | 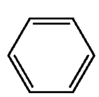 | $CH{=}CHCH_3$ | |
| 1-3-283 | $C_2H_5$ | 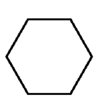 | — | 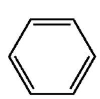 | 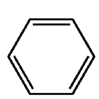 | $C_2H_4CH{=}CH_2$ | |

TABLE 131-continued
(1-3)
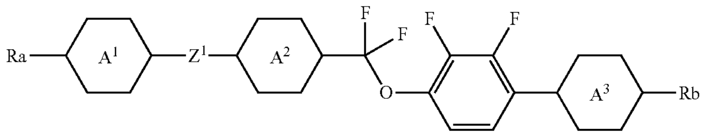
| No. | Ra | $A^1$ | $Z^1$ | $A^2$ | $A^3$ | Rb | Physical property values |
|---|---|---|---|---|---|---|---|
| 1-3-284 | $C_3H_7$ | 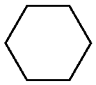 | — | 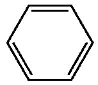 | 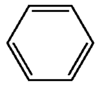 | $C_2H_4CH{=}CH_2$ | |
| 1-3-285 | $C_3H_7$ | 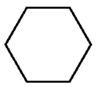 | — |  | 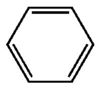 | $CH{=}CHC_3H_7$ | |
TABLE 132
(1-3)
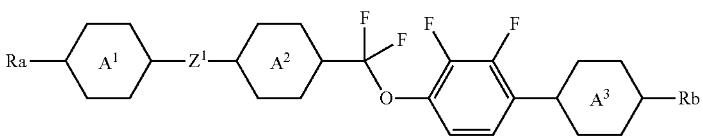
| No. | Ra | $A^1$ | $Z^1$ | $A^2$ | $A^3$ | Rb | Physical property values |
|---|---|---|---|---|---|---|---|
| 1-3-286 | $C_2H_5$ | 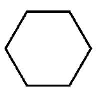 | — | 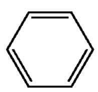 | 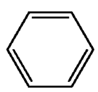 | $CH{=}CHC_3H_7$ | |
| 1-3-287 | $C_5H_{11}$ | 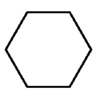 | — |  |  | $C_2H_4CH{=}CHCH_3$ | |
| 1-3-288 | $C_3H_7$ | 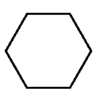 | — | 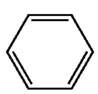 | 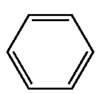 | $C_2H_4CH{=}CHCH_3$ | |
| 1-3-289 | $CH_2{=}CH$ | 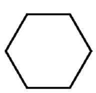 | — | 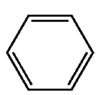 | 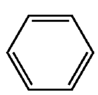 | $C_2H_4CH{=}CH_2$ | |
| 1-3-290 | $CH_3CH{=}CH$ | 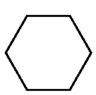 | — | 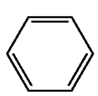 | 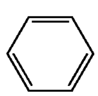 | $CH{=}CH_2$ | |
| 1-3-291 | $C_2H_5OCH_2$ | 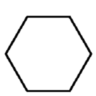 | — | 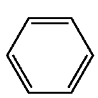 | 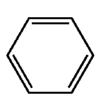 | $C_3H_7$ | |
| 1-3-292 | $C_3H_7$ | 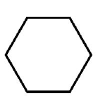 | — | 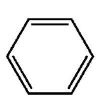 | 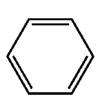 | $OC_2H_4CH{=}CH_2$ | |
| 1-3-293 | $C_3H_7$ | 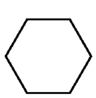 | $CH_2CH_2$ | 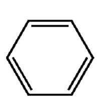 | 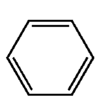 | $C_2H_5$ | |

TABLE 132-continued
(1-3)
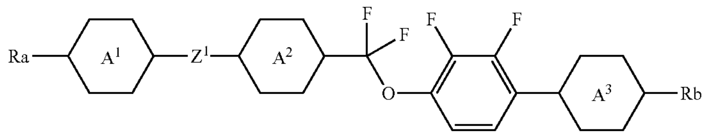
| No. | Ra | $A^1$ | $Z^1$ | $A^2$ | $A^3$ | Rb | Physical property values |
|---|---|---|---|---|---|---|---|
| 1-3-294 | $C_2H_5$ | 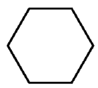 | $(CH_2)_4$ |  | 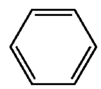 | $C_3H_7$ | |
| 1-3-295 | $C_3H_7$ | 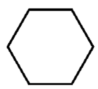 | $CH_2O$ | 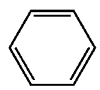 | 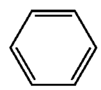 | $C_2H_5$ | |
| 1-3-296 | $C_2H_5$ | 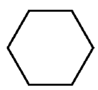 | $OCH_2$ | 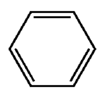 | 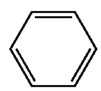 | $C_3H_7$ | |
| 1-3-297 | $C_4H_9$ | 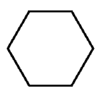 | COO | 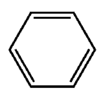 | 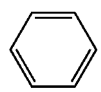 | $C_4H_9$ | |
| 1-3-298 | $C_3H_7$ | 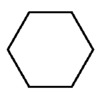 | OCO | 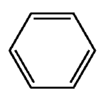 | 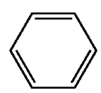 | H | |
| 1-3-299 | $C_2H_5$ | 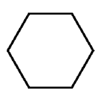 | $CF_2O$ | 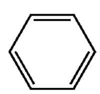 | 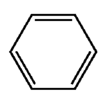 | $C_7H_{15}$ | |
| 1-3-300 | $CH_3$ | 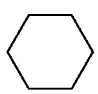 | $OCF_2$ | 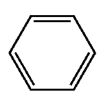 | 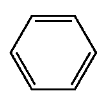 | $C_2H_5$ | |
TABLE 133
(1-3)
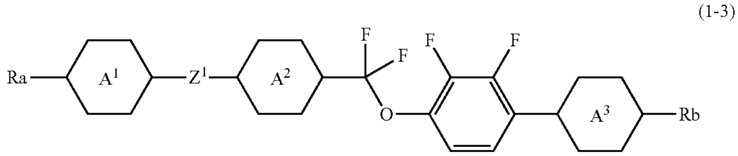
| No. | Ra | $A^1$ | $Z^1$ | $A^2$ | $A^3$ | Rb | Physical property values |
|---|---|---|---|---|---|---|---|
| 1-3-301 | $CH_3$ | 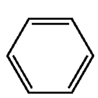 | — | 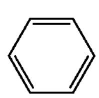 | 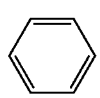 | $CH_3$ | |
| 1-3-302 | $CH_3$ | 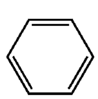 | — | 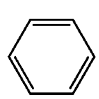 | 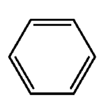 | $C_2H_5$ | |
| 1-3-303 | $CH_3$ | 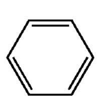 | — | 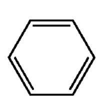 | 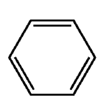 | $C_3H_7$ | |

TABLE 133-continued
(1-3)
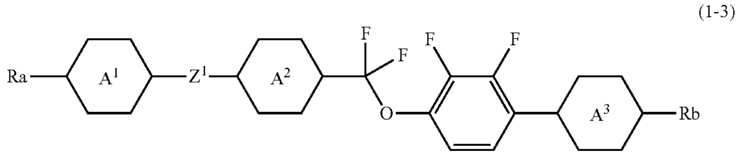
| No. | Ra | A¹ | Z¹ | A² | A³ | Rb | Physical property values |
|---|---|---|---|---|---|---|---|
| 1-3-304 | $CH_3$ | 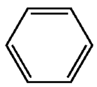 | — | 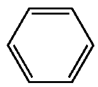 | 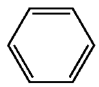 | $C_4H_9$ | |
| 1-3-305 | $CH_3$ | 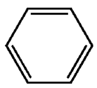 | — | 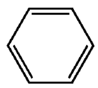 | 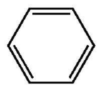 | $C_5H_{11}$ | |
| 1-3-306 | $C_2H_5$ |  | — | 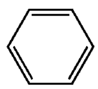 | 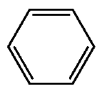 | $CH_3$ | |
| 1-3-307 | $C_2H_5$ | 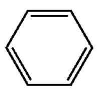 | — | 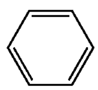 | 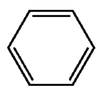 | $C_2H_5$ | |
| 1-3-308 | $C_2H_5$ |  | — |  | 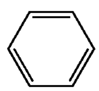 | $C_3H_7$ | |
| 1-3-309 | $C_2H_5$ |  | — |  | 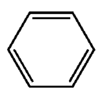 | $C_4H_9$ | |
| 1-3-310 | $C_2H_5$ |  | — | 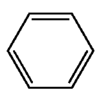 | 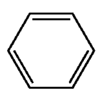 | $C_5H_{11}$ | |
| 1-3-311 | $C_3H_7$ | 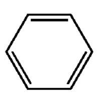 | — | 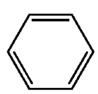 | 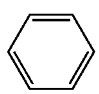 | $CH_3$ | |
| 1-3-312 | $C_3H_7$ | 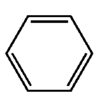 | — | 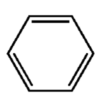 | 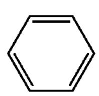 | $C_2H_5$ | |
| 1-3-313 | $C_3H_7$ | 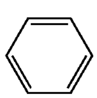 | — | 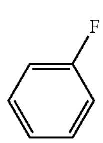 | 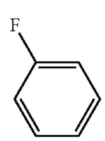 | $C_3H_7$ | |
| 1-3-314 | $C_3H_7$ | 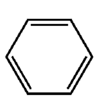 | — | 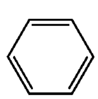 | 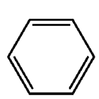 | $C_4H_9$ | |
| 1-3-315 | $C_3H_7$ | 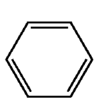 | — | 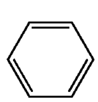 | 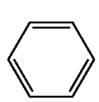 | $C_5H_{11}$ | |

TABLE 134
(1-3)
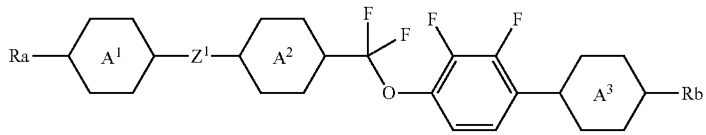
| No. | Ra | $A^1$ | $Z^1$ | $A^2$ | $A^3$ | Rb | Physical property values |
|---|---|---|---|---|---|---|---|
| 1-3-316 | $C_4H_9$ | 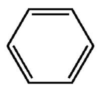 | — | 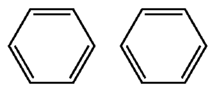 | | $CH_3$ | |
| 1-3-317 | $C_4H_9$ |  | — | 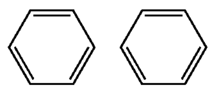 | | $C_2H_5$ | |
| 1-3-318 | $C_4H_9$ |  | — | 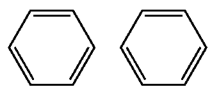 | | $C_3H_7$ | |
| 1-3-319 | $C_4H_9$ | 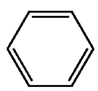 | — | 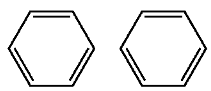 | | $C_4H_9$ | |
| 1-3-320 | $C_4H_9$ | 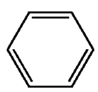 | — | 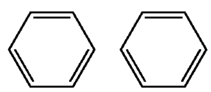 | | $C_5H_{11}$ | |
| 1-3-321 | $C_5H_{11}$ | 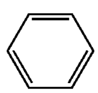 | — | 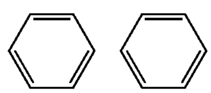 | | $CH_3$ | |
| 1-3-322 | $C_5H_{11}$ | 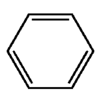 | — | 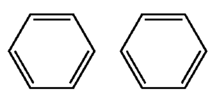 | | $C_2H_5$ | |
| 1-3-323 | $C_5H_{11}$ | 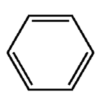 | — | 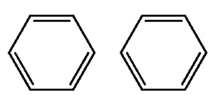 | | $C_3H_7$ | |
| 1-3-324 | $C_5H_{11}$ | 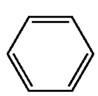 | — | 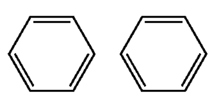 | | $C_4H_9$ | |
| 1-3-325 | $C_5H_{11}$ | 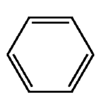 | — | 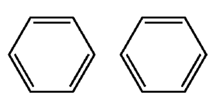 | | $C_5H_{11}$ | |
| 1-3-326 | $C_2H_5O$ | 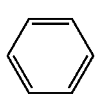 | — | 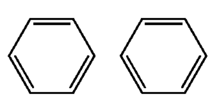 | | $C_4H_9$ | |
| 1-3-327 | $C_5H_{11}$ | 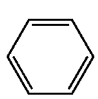 | — | 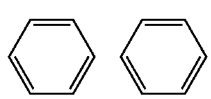 | | $OC_2H_5$ | |
| 1-3-328 | $C_2H_5O$ | 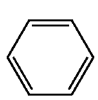 | — | 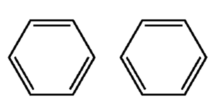 | | $OC_4H_9$ | |
| 1-3-329 | $C_3H_7$ | 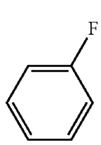  | — | 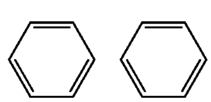 | | $OC_4H_9$ | |

TABLE 134-continued
(1-3)
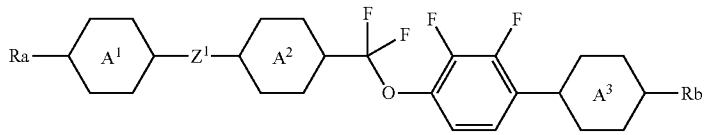
| No. | Ra | $A^1$ | $Z^1$ | $A^2$ | $A^3$ | Rb | Physical property values |
|---|---|---|---|---|---|---|---|
| 1-3-330 | $C_5H_{11}$ |  | — | 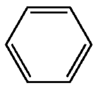 | 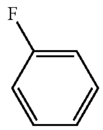 | $OC_2H_5$ | |
TABLE 135
(1-3)
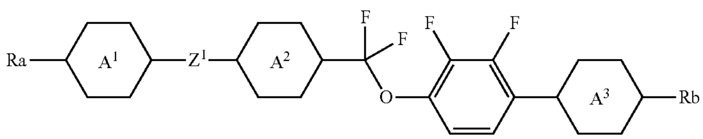
| No. | Ra | $A^1$ | $Z^1$ | $A^2$ | $A^3$ | Rb | Physical property values |
|---|---|---|---|---|---|---|---|
| 1-3-331 | $C_3H_7$ |  | — | 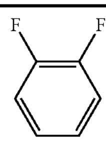 | 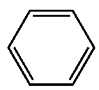 | $C_5H_{11}$ | |
| 1-3-332 | $C_3H_7O$ | 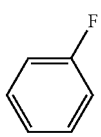 | — | 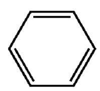 | 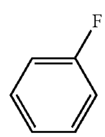 | $OC_2H_5$ | |
| 1-3-333 | $C_5H_{11}$ | 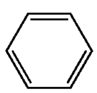 | — | 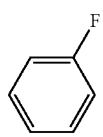 | 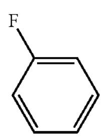 | $OC_2H_5$ | |
| 1-3-334 | $C_2H_5O$ | 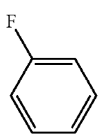 | — | 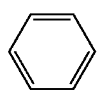 | 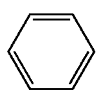 | $C_5H_{11}$ | |
| 1-3-335 | $C_4H_9$ | 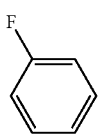 | — | 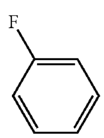 | 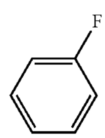 | $C_2H_5$ | |
| 1-3-336 | $C_2H_5O$ | 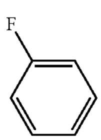 | — | 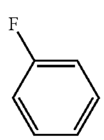 | 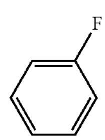 | $OC_4H_9$ | |
| 1-3-337 | $CH_2{=}CH$ | 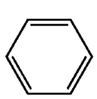 | — | 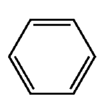 | 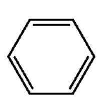 | $CH_3$ | |

TABLE 135-continued
(1-3)
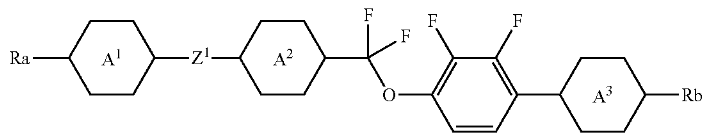
| No. | Ra | A¹ | Z¹ | A² | A³ | Rb | Physical property values |
|---|---|---|---|---|---|---|---|
| 1-3-338 | $CH_3CH{=}CH$ |  | — | 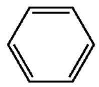 | 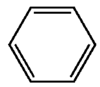 | $C_2H_5$ | |
| 1-3-339 | $CH_2{=}CHC_2H_4$ |  | — | 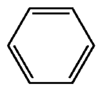 | 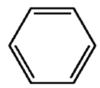 | $C_3H_7$ | |
| 1-3-340 | $C_3H_7CH{=}CH$ |  | — |  | 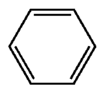 | $C_4H_9$ | |
| 1-3-341 | $CH_3CH{=}CHC_2H_4$ | 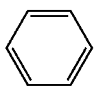 | — | 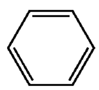 | 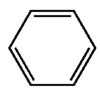 | $CH_3$ | |
| 1-3-342 | $C_4H_9$ |  | — |  | 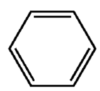 | $CH{=}CH_2$ | |
| 1-3-343 | $C_2H_5$ |  | — |  |  | $CH{=}CHCH_3$ | |
| 1-3-344 | $C_3H_7$ | 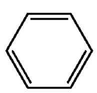 | — | 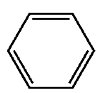 | 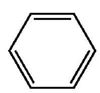 | $CH{=}CHC_3H_7$ | |
| 1-3-345 | $C_3H_7$ | 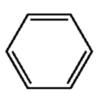 | — | 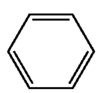 | 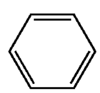 | $C_2H_4CH{=}CH_2$ | |
TABLE 136
(1-3)
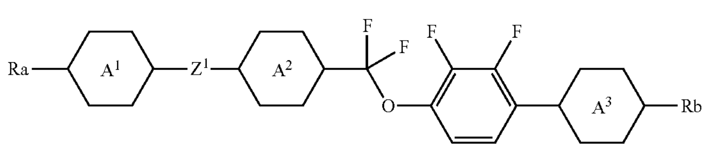
| No. | Ra | A¹ | Z¹ | A² | A³ | Rb | Physical property values |
|---|---|---|---|---|---|---|---|
| 1-3-346 | $C_2H_5$ | 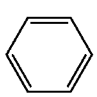 | — | 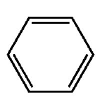 | 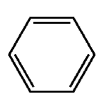 | $C_2H_4CH{=}CH_2$ | |
| 1-3-347 | $C_5H_{11}$ | 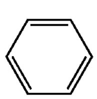 | — | 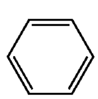 | 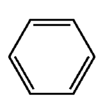 | $C_2H_4CH{=}CHCH_3$ | |

TABLE 136-continued
(1-3)
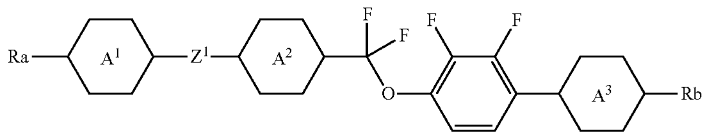
| No. | Ra | $A^1$ | $Z^1$ | $A^2$ | $A^3$ | Rb | Physical property values |
|---|---|---|---|---|---|---|---|
| 1-3-348 | $C_3H_7$ | 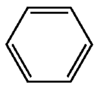 | — | 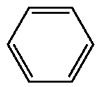 | 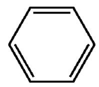 | $C_2H_4CH{=}CHCH_3$ | |
| 1-3-349 | $CH_3CH{=}CHC_2H_4$ |  | — | 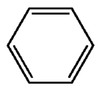 | 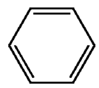 | $C_2H_4CH{=}CH_2$ | |
| 1-3-350 | $CH_2{=}CHC_2H_4$ | 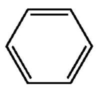 | — | 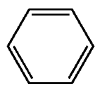 | 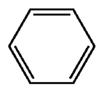 | $C_2H_4CH{=}CHCH_3$ | |
| 1-3-351 | $C_4H_9OCH_2$ | 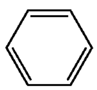 | — | 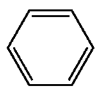 | 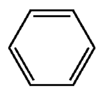 | $C_3H_7$ | |
| 1-3-352 | $C_3H_7$ |  | — |  | 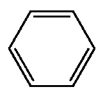 | $OC_2H_4CH{=}CH_2$ | |
| 1-3-353 | $C_3H_7$ |  | $CH_2CH_2$ | 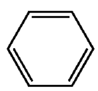 | 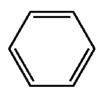 | $C_2H_5$ | |
| 1-3-354 | $C_2H_5$ |  | $CH_2CH_2$ |  | 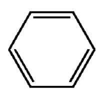 | $C_3H_7$ | |
| 1-3-355 | $C_3H_7$ |  | $CH_2O$ | 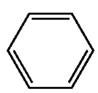 | 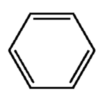 | $C_2H_5$ | |
| 1-3-356 | $C_2H_5$ | 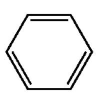 | $OCH_2$ | 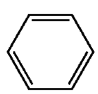 | 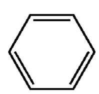 | $C_3H_7$ | |
| 1-3-357 | $C_4H_9O$ | 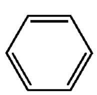 | COO | 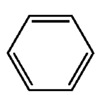 | 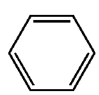 | $C_4H_9$ | |
| 1-3-358 | $C_3H_7$ | 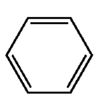 | OCO | 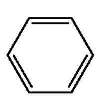 | 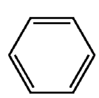 | $C_7H_{15}$ | |
| 1-3-359 | $C_2H_5$ | 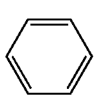 | $CF_2O$ | 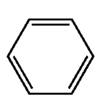 | 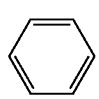 | $C_4H_9$ | |
| 1-3-360 | $CH_3$ | 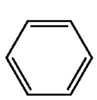 | $OCF_2$ | 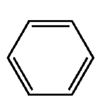 | 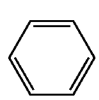 | $C_2H_5$ | |

TABLE 137
(1-3)
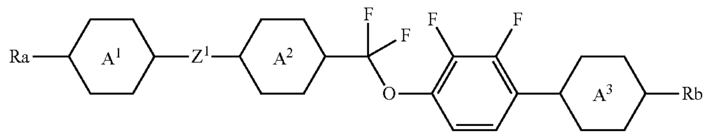
| No. | Ra | $A^1$ | $Z^1$ | $A^2$ | $A^3$ | Rb | Physical property values |
|---|---|---|---|---|---|---|---|
| 1-3-361 | $C_3H_7$ | 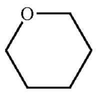 | — | 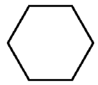 | 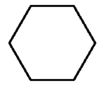 | $C_2H_5$ | |
| 1-3-362 | $C_2H_5$ | 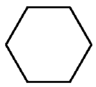 | — | 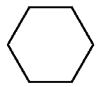 | 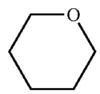 | $C_4H_9$ | |
| 1-3-363 | $C_5H_{11}$ | 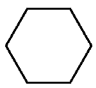 | — | 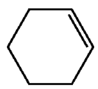 | 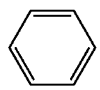 | $C_3H_7$ | Cr 51.2 N 207.9 Iso<br>$T_{NI}$: 188.6° C., Δ n: 0.154 |
| 1-3-364 | $C_4H_9$ | 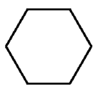 | — | 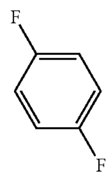 | 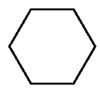 | $C_2H_5$ | |
| 1-3-365 | $CH_3$ | 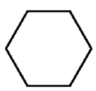 | — | 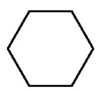 | 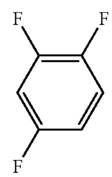 | $OC_2H_5$ | |
| 1-3-366 | $C_2H_5$ | 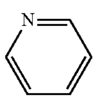 | — | 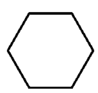 | 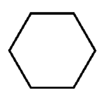 | $C_2H_5$ | |
| 1-3-367 | $C_2H_5$ | 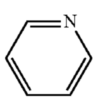 | — | 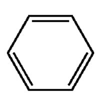 | 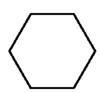 | $C_3H_7$ | |
| 1-3-368 | $C_2H_5$ | 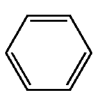 | — | 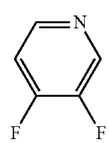 | 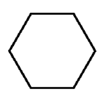 | $C_3H_7$ | |
| 1-3-369 | $C_2H_5O$ | 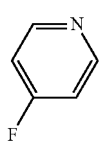 | — | 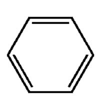 | 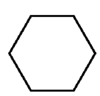 | $C_4H_9$ | |
| 1-3-370 | $C_2H_5$ | 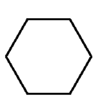 | — | 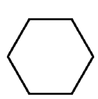 | 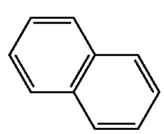 | $C_5H_{11}$ | |
| 1-3-371 | $C_3H_7$ | 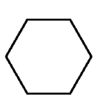 | — | 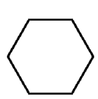 | 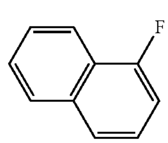 | $C_4H_9$ | |

TABLE 137-continued
(1-3)
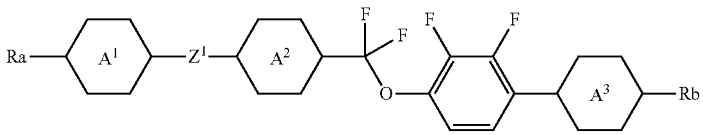
| No. | Ra | $A^1$ | $Z^1$ | $A^2$ | $A^3$ | Rb | Physical property values |
|---|---|---|---|---|---|---|---|
| 1-3-372 | $C_3H_7$ | 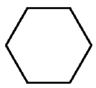 | — | 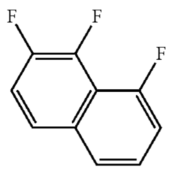 | 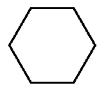 | $C_2H_5$ | |
| 1-3-373 | $C_2H_5$ | 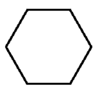 | — | 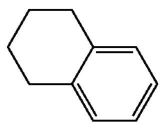 | 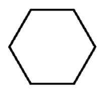 | $C_5H_{11}$ | |
| 1-3-374 | $C_3H_7$ | 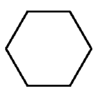 | — | 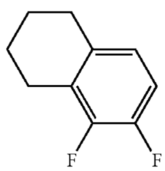 | 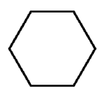 | $C_4H_9$ | |
| 1-3-375 | $C_3H_7$ | 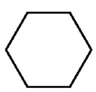 | — | 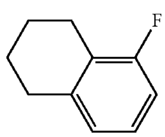 | 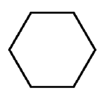 | $C_5H_{11}$ | |
TABLE 138
(1-3)
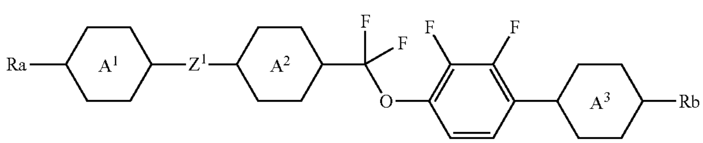
| No. | Ra | $A^1$ | $Z^1$ | $A^2$ | $A^3$ | Rb | Physical property values |
|---|---|---|---|---|---|---|---|
| 1-3-376 | $C_4H_9$ | 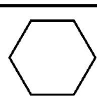 | — | 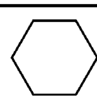 | 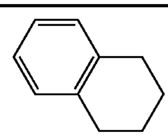 | $C_5H_{11}$ | |
| 1-3-377 | $C_5H_{11}$ | 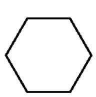 | — | 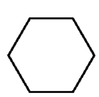 | 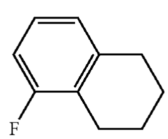 | $C_2H_5$ | |
| 1-3-378 | $C_4H_9$ | 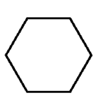 | — | 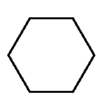 | 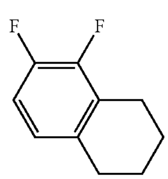 | $C_3H_7$ | |

TABLE 138-continued
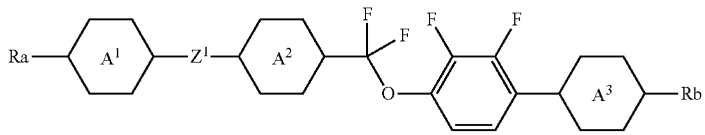
(1-3)
| No. | Ra | $A^1$ | $Z^1$ | $A^2$ | $A^3$ | Rb | Physical property values |
|---|---|---|---|---|---|---|---|
| 1-3-379 | $C_4H_9$ | 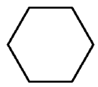 | — | 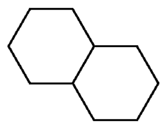 | 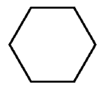 | $C_4H_9$ | |
| 1-3-380 | $C_2H_5O$ | 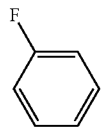 | — | 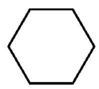 | 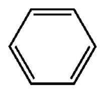 | $C_5H_{11}$ | |
| 1-3-381 | $C_3H_7$ | 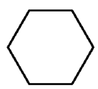 | — | 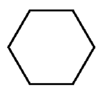 | 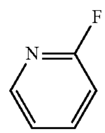 | $OC_4H_9$ | |
| 1-3-382 | $C_5H_{11}$ | 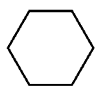 | — | 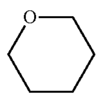 | 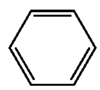 | $C_2H_5$ | |
| 1-3-383 | $C_5H_{11}$ | 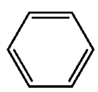 | — | 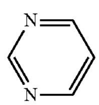 | 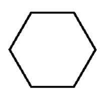 | $C_3H_7$ | |
| 1-3-384 | $C_5H_{11}$ | 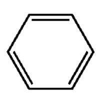 | — | 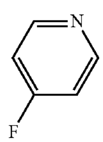 | 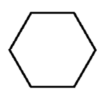 | $C_4H_9$ | |
| 1-3-385 | $C_2H_5O$ | 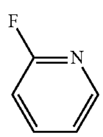 | — | 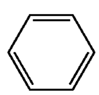 | 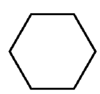 | $C_5H_{11}$ | |
| 1-3-386 | $C_4H_9O$ | 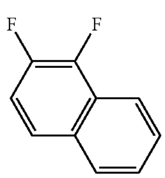 | — | 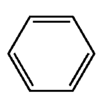 | 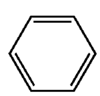 | $C_4H_9$ | |
| 1-3-387 | $C_5H_{11}$ | 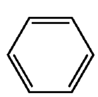 | — | 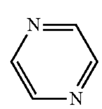 | 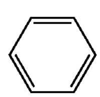 | $OC_2H_5$ | |
| 1-3-388 | $C_2H_5O$ | 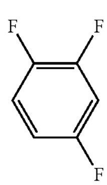 | — | 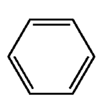 | 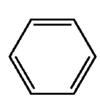 | $C_5H_{11}$ | |

TABLE 138-continued
(1-3)
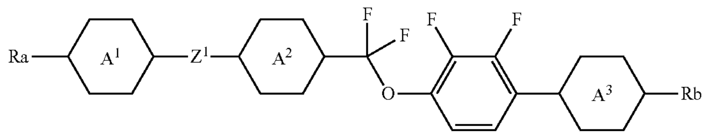
| No. | Ra | $A^1$ | $Z^1$ | $A^2$ | $A^3$ | Rb | Physical property values |
|---|---|---|---|---|---|---|---|
| 1-3-389 | $C_5H_{11}$ | 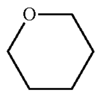 | — | 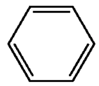 | 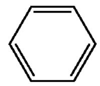 | $C_3H_7$ | |
| 1-3-390 | $C_3H_7$ | 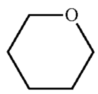 | — | 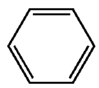 | 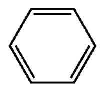 | $C_5H_{11}$ | |
TABLE 139
(2-3)
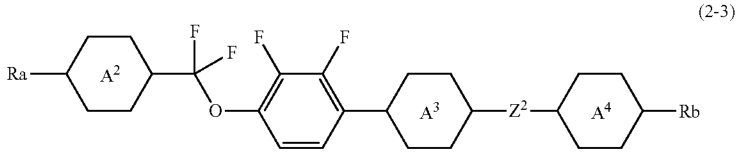
| No. | Ra | $A^2$ | $A^3$ | $Z^2$ | $A^4$ | Rb | Physical property values |
|---|---|---|---|---|---|---|---|
| 2-3-1 | $CH_3$ | 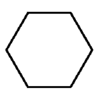 | 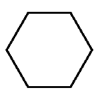 | — | 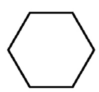 | $CH_3$ | |
| 2-3-2 | $CH_3$ | 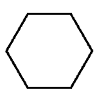 | 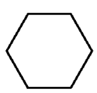 | — | 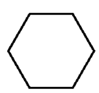 | $C_2H_5$ | |
| 2-3-3 | $CH_3$ | 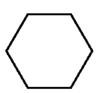 | 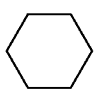 | — | 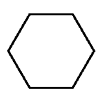 | $C_3H_7$ | |
| 2-3-4 | $CH_3$ | 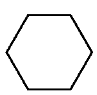 | 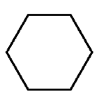 | — | 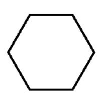 | $C_4H_9$ | |
| 2-3-5 | $CH_3$ | 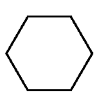 | 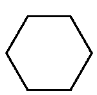 | — | 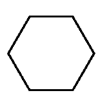 | $C_5H_{11}$ | |
| 2-3-6 | $C_2H_5$ | 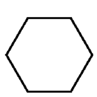 | 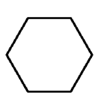 | — | 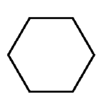 | $CH_3$ | |
| 2-3-7 | $C_2H_5$ | 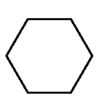 | 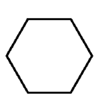 | — | 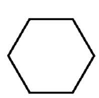 | $C_2H_5$ | |
| 2-3-8 | $C_2H_5$ | 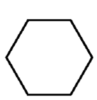 | 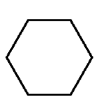 | — | 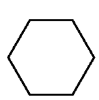 | $C_3H_7$ | |

TABLE 139-continued
(2-3)
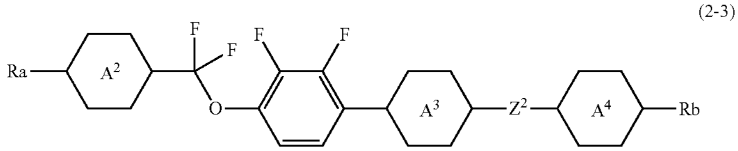
| No. | Ra | $A^2$ | $A^3$ | $Z^2$ | $A^4$ | Rb | Physical property values |
|---|---|---|---|---|---|---|---|
| 2-3-9 | $C_2H_5$ | 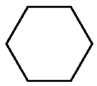 | 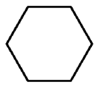 | — | 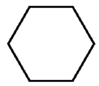 | $C_4H_9$ | |
| 2-3-10 | $C_2H_5$ | 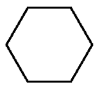 | 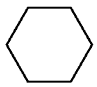 | — | 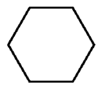 | $C_5H_{11}$ | |
| 2-3-11 | $C_3H_7$ | 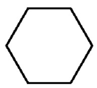 | 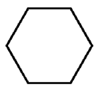 | — | 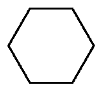 | $CH_3$ | |
| 2-3-12 | $C_3H_7$ | 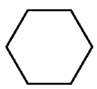 | 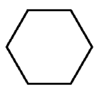 | — | 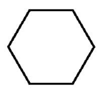 | $C_2H_5$ | |
| 2-3-13 | $C_3H_7$ | 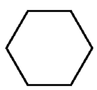 | 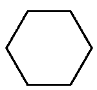 | — | 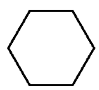 | $C_3H_7$ | |
| 2-3-14 | $C_3H_7$ | 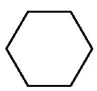 | 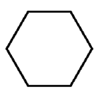 | — | 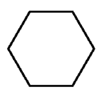 | $C_4H_9$ | |
| 2-3-15 | $C_3H_7$ | 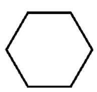 | 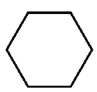 | — | 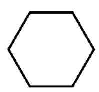 | $C_5H_{11}$ | |
TABLE 140
(2-3)
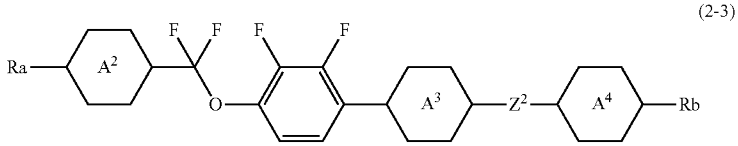
| No. | Ra | $A^2$ | $A^3$ | $Z^2$ | $A^4$ | Rb | Physical property values |
|---|---|---|---|---|---|---|---|
| 2-3-16 | $C_4H_9$ | 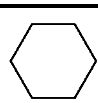 | 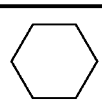 | — | 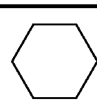 | $CH_3$ | |
| 2-3-17 | $C_4H_9$ | 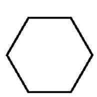 | 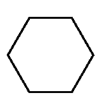 | — | 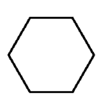 | $C_2H_5$ | |
| 2-3-18 | $C_4H_9$ | 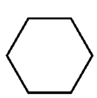 | 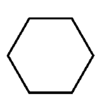 | — | 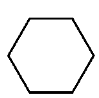 | $C_3H_7$ | |

TABLE 140-continued
(2-3)
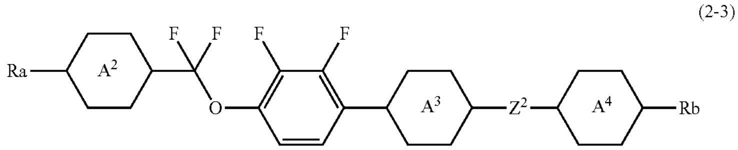
| No. | Ra | $A^2$ | $A^3$ | $Z^2$ | $A^4$ | Rb | Physical property values |
|---|---|---|---|---|---|---|---|
| 2-3-19 | $C_4H_9$ | 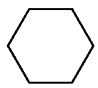 | 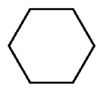 | — | 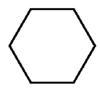 | $C_4H_9$ | |
| 2-3-20 | $C_4H_9$ | 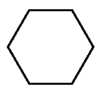 | 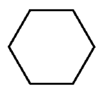 | — | 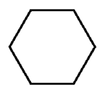 | $C_5H_{11}$ | |
| 2-3-21 | $C_5H_{11}$ | 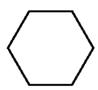 | 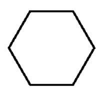 | — | 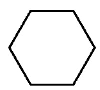 | $CH_3$ | |
| 2-3-22 | $C_5H_{11}$ | 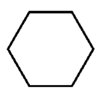 | 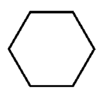 | — | 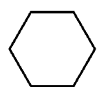 | $C_2H_5$ | |
| 2-3-23 | $C_5H_{11}$ | 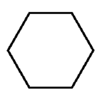 | 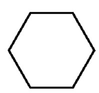 | — | 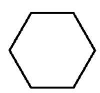 | $C_3H_7$ | |
| 2-3-24 | $C_5H_{11}$ | 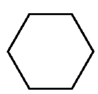 | 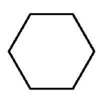 | — | 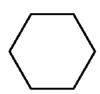 | $C_4H_9$ | |
| 2-3-25 | $C_5H_{11}$ | 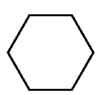 | 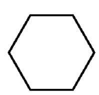 | — | 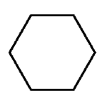 | $C_5H_{11}$ | |
| 2-3-26 | $C_2H_5O$ | 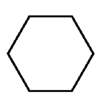 | 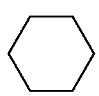 | — | 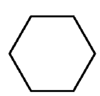 | $C_4H_9$ | |
| 2-3-27 | $C_5H_{11}$ | 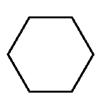 | 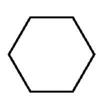 | — | 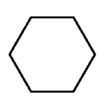 | $OC_2H_5$ | |
| 2-3-28 | $C_2H_5O$ | 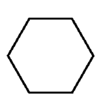 | 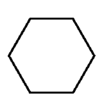 | — | 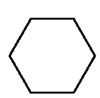 | $OC_4H_9$ | |
| 2-3-29 | $CH_2{=}CH$ | 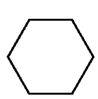 | 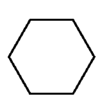 | — | 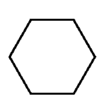 | $C_3H_7$ | |
| 2-3-30 | $CH_2{=}CH$ | 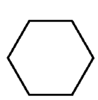 | 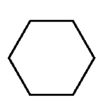 | — | 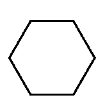 | $C_5H_{11}$ | |

TABLE 141
(2-3)
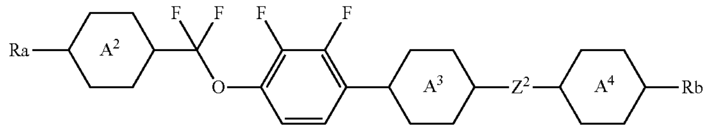
| No. | Ra | $A^2$ | $A^3$ | $Z^2$ | $A^4$ | Rb | Physical property values |
|---|---|---|---|---|---|---|---|
| 2-3-31 | $CH_3CH{=}CH$ | 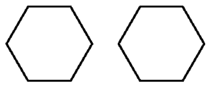 | | — | 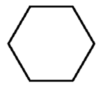 | $C_3H_7$ | |
| 2-3-32 | $CH_3CH{=}CH$ | 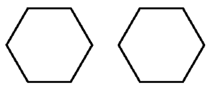 | | — | 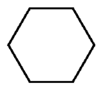 | $C_5H_{11}$ | |
| 2-3-33 | $CH_2{=}CHC_2H_4$ | 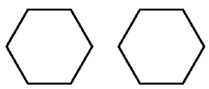 | | — | 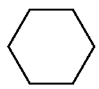 | $C_3H_7$ | |
| 2-3-34 | $CH_2{=}CHC_2H_4$ | 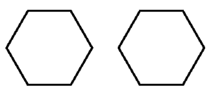 | | — | 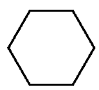 | $C_5H_{11}$ | |
| 2-3-35 | $C_3H_7CH{=}CH$ | 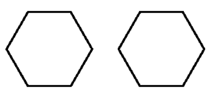 | | — | 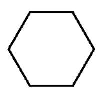 | $C_2H_5$ | |
| 2-3-36 | $C_3H_7CH{=}CH$ | 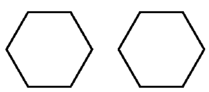 | | — | 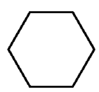 | $C_3H_7$ | |
| 2-3-37 | $CH_3CH{=}CHC_2H_4$ | 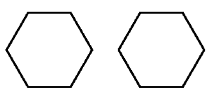 | | — | 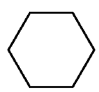 | $CH_3$ | |
| 2-3-38 | $CH_3CH{=}CHC_2H_4$ | 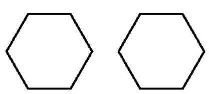 | | — | 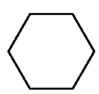 | $C_2H_5$ | |
| 2-3-39 | $C_3H_7$ | 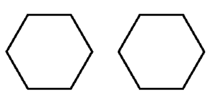 | | — | 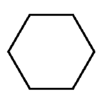 | $CH{=}CH_2$ | |
| 2-3-40 | $C_5H_{11}$ | 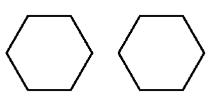 | | — | 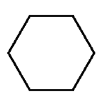 | $CH{=}CH_2$ | |
| 2-3-41 | $C_3H_7$ | 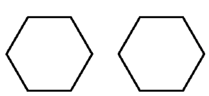 | | — | 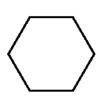 | $CH{=}CHCH_3$ | |
| 2-3-42 | $C_4H_9$ | 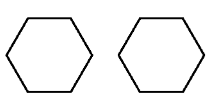 | | — | 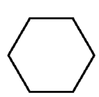 | $CH{=}CHCH_3$ | |
| 2-3-43 | $C_2H_5$ | 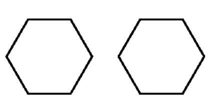 | | — | 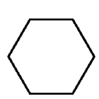 | $C_2H_4CH{=}CH_2$ | |
| 2-3-44 | $C_3H_7$ | 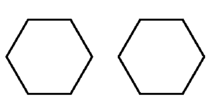 | | — | 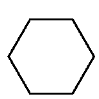 | $C_2H_4CH{=}CH_2$ | |

TABLE 141-continued
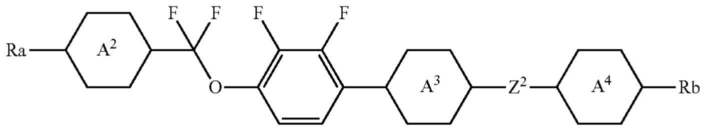
(2-3)
| No. | Ra | $A^2$ | $A^3$ | $Z^2$ | $A^4$ | Rb | Physical property values |
|---|---|---|---|---|---|---|---|
| 2-3-45 | $CH_3$ | 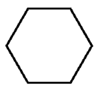 | 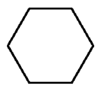 | — | 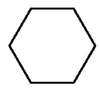 | $CH{=}CHC_3H_7$ | |
TABLE 142
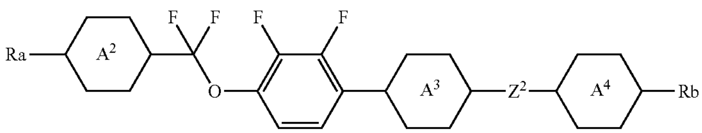
(2-3)
| No. | Ra | $A^2$ | $A^3$ | $Z^2$ | $A^4$ | Rb | Physical property values |
|---|---|---|---|---|---|---|---|
| 2-3-46 | $C_2H_5$ | 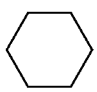 | 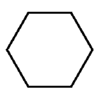 | — | 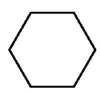 | $CH{=}CHC_3H_7$ | |
| 2-3-47 | $C_2H_5$ | 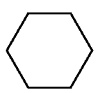 | 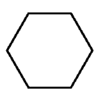 | — | 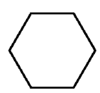 | $C_2H_4CH{=}CHCH_3$ | |
| 2-3-48 | $C_3H_7$ | 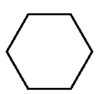 | 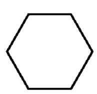 | — | 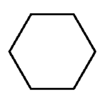 | $C_2H_4CH{=}CHCH_3$ | |
| 2-3-49 | $CH_2{=}CH$ | 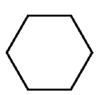 | 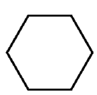 | — | 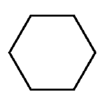 | $C_2H_4CH{=}CH_2$ | |
| 2-3-50 | $CH_3CH{=}CH$ | 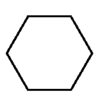 | 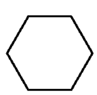 | — | 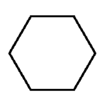 | $CH{=}CH_2$ | |
| 2-3-51 | $C_3H_7OCH_2$ | 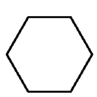 | 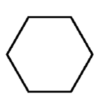 | — | 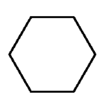 | $C_3H_7$ | |
| 2-3-52 | $C_5H_{11}$ | 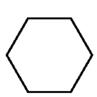 | 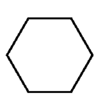 | — | 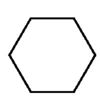 | $OC_2H_4CH{=}CH_2$ | |
| 2-3-53 | $C_3H_7$ | 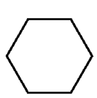 | 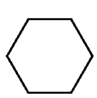 | $CH_2CH_2$ | 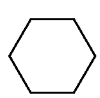 | $C_2H_5$ | |
| 2-3-54 | $C_5H_{11}$ | 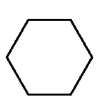 | 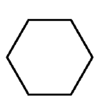 | $CH_2CH_2$ | 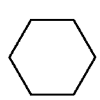 | $C_3H_7$ | |

TABLE 142-continued
(2-3)
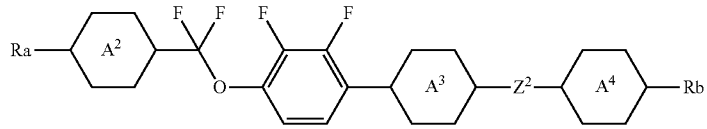
| No. | Ra | $A^2$ | $A^3$ | $Z^2$ | $A^4$ | Rb | Physical property values |
|---|---|---|---|---|---|---|---|
| 2-3-55 | $C_3H_7$ | 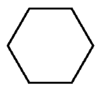 | 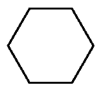 | $CH_2O$ | 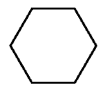 | $C_2H_5$ | |
| 2-3-56 | $C_5H_{11}$ | 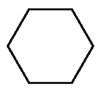 | 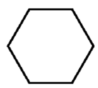 | $OCH_2$ | 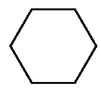 | $C_3H_7$ | |
| 2-3-57 | H | 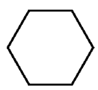 | 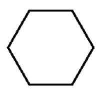 | COO | 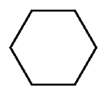 | $C_4H_9$ | |
| 2-3-58 | $C_7H_{15}$ | 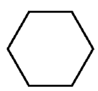 | 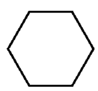 | OCO | 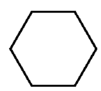 | $C_4H_9$ | |
| 2-3-59 | $C_2H_5$ | 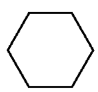 | 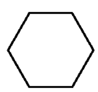 | $CF_2O$ | 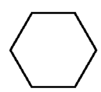 | $C_6H_{13}$ | |
| 2-3-60 | $CH_3$ | 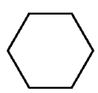 | 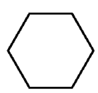 | $OCF_2$ | 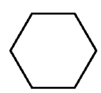 | $C_2H_5$ | |
TABLE 143
(2-3)
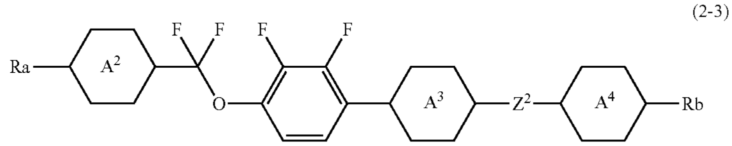
| No. | Ra | $A^2$ | $A^3$ | $Z^2$ | $A^4$ | Rb | Physical property values |
|---|---|---|---|---|---|---|---|
| 2-3-61 | $CH_3$ | 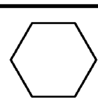 | 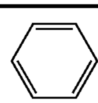 | — | 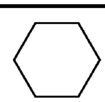 | $CH_3$ | |
| 2-3-62 | $CH_3$ | 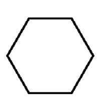 | 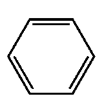 | — | 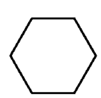 | $C_2H_5$ | |
| 2-3-63 | $CH_3$ | 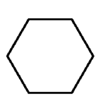 | 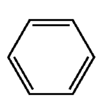 | — | 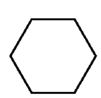 | $C_3H_7$ | |
| 2-3-64 | $CH_3$ | 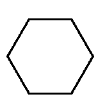 | 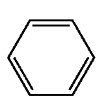 | — | 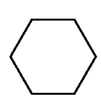 | $C_4H_9$ | |

TABLE 143-continued
(2-3)
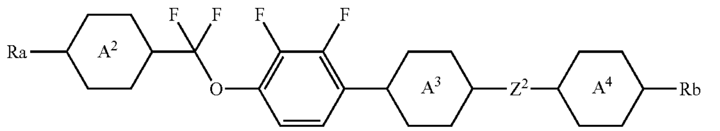
| No. | Ra | $A^2$ | $A^3$ | $Z^2$ | $A^4$ | Rb | Physical property values |
|---|---|---|---|---|---|---|---|
| 2-3-65 | $CH_3$ | 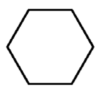 | 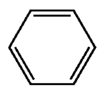 | — | 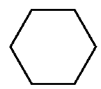 | $C_5H_{11}$ | |
| 2-3-66 | $C_2H_5$ | 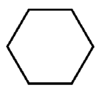 | 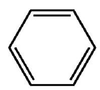 | — | 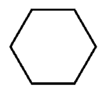 | $CH_3$ | |
| 2-3-67 | $C_2H_5$ | 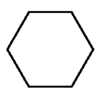 | 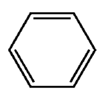 | — | 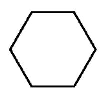 | $C_2H_5$ | |
| 2-3-68 | $C_2H_5$ | 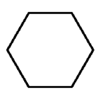 | 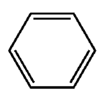 | — | 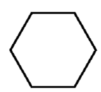 | $C_3H_7$ | |
| 2-3-69 | $C_2H_5$ | 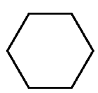 | 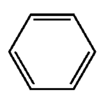 | — | 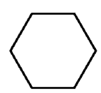 | $C_4H_9$ | |
| 2-3-70 | $C_2H_5$ | 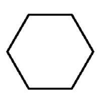 | 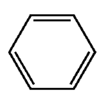 | — | 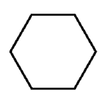 | $C_5H_{11}$ | |
| 2-3-71 | $C_3H_7$ | 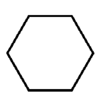 | 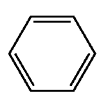 | — | 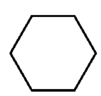 | $CH_3$ | |
| 2-3-72 | $C_3H_{17}$ | 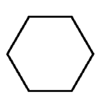 | 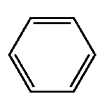 | — | 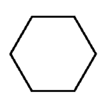 | $C_2H_5$ | |
| 2-3-73 | $C_3H_7$ | 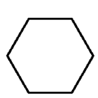 | 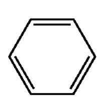 | — | 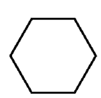 | $C_3H_7$ | |
| 2-3-74 | $C_3H_7$ | 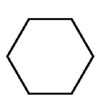 | 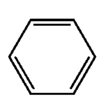 | — | 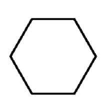 | $C_4H_9$ | |
| 2-3-75 | $C_3H_7$ | 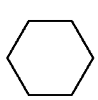 | 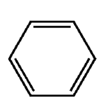 | — | 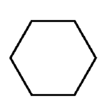 | $C_5H_{11}$ | |

TABLE 144
(2-3)
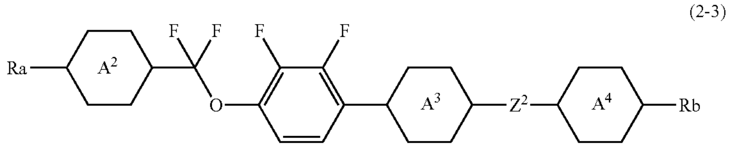
| No. | Ra | $A^2$ | $A^3$ | $Z^2$ | $A^4$ | Rb | Physical property values |
|---|---|---|---|---|---|---|---|
| 2-3-76 | $C_4H_9$ | 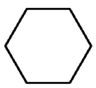 | 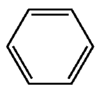 | — | 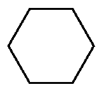 | $CH_3$ | |
| 2-3-77 | $C_4H_9$ | 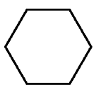 |  | — | 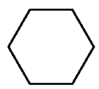 | $C_2H_5$ | |
| 2-3-78 | $C_4H_9$ | 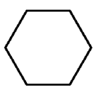 |  | — | 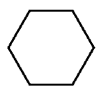 | $C_3H_7$ | |
| 2-3-79 | $C_4H_9$ | 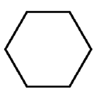 | 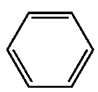 | — | 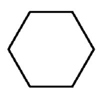 | $C_4H_9$ | |
| 2-3-80 | $C_4H_9$ | 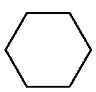 | 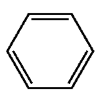 | — | 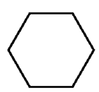 | $C_5H_{11}$ | |
| 2-3-81 | $C_5H_{11}$ | 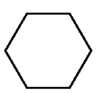 | 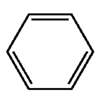 | — | 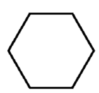 | $CH_3$ | |
| 2-3-82 | $C_5H_{11}$ | 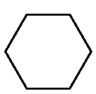 | 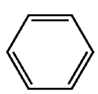 | — | 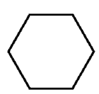 | $C_2H_5$ | |
| 2-3-83 | $C_5H_{11}$ | 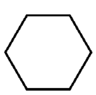 | 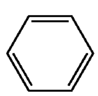 | — | 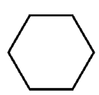 | $C_3H_7$ | |
| 2-3-84 | $C_5H_{11}$ | 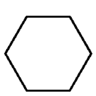 | 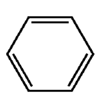 | — | 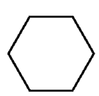 | $C_4H_9$ | |
| 2-3-85 | $C_5H_{11}$ | 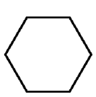 | 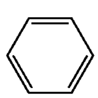 | — | 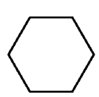 | $C_3H_7$ | |
| 2-3-86 | $C_2H_5O$ | 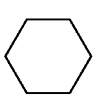 | 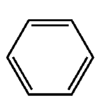 | — | 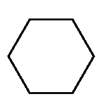 | $C_4H_9$ | |
| 2-3-87 | $C_5H_{11}$ | 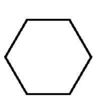 | 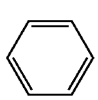 | — | 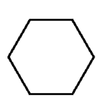 | $OC_2H_5$ | |
| 2-3-88 | $C_2H_5O$ | 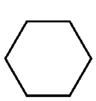 | 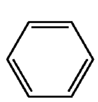 | — | 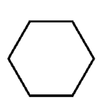 | $OC_4H_9$ | |

TABLE 144-continued
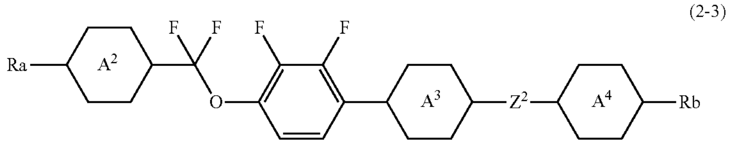
(2-3)
| No. | Ra | $A^2$ | $A^3$ | $Z^2$ | $A^4$ | Rb | Physical property values |
|---|---|---|---|---|---|---|---|
| 2-3-89 | $C_5H_{11}$ | 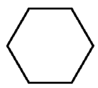 | 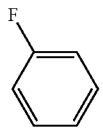 | — | 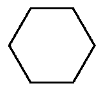 | $C_3H_7$ | |
| 2-3-90 | $C_3H_7$ | 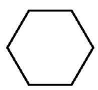 | 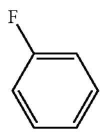 | — | 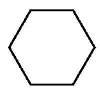 | $C_5H_{11}$ | |
TABLE 145
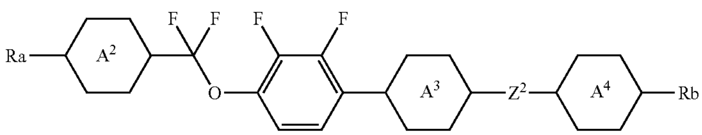
(2-3)
| No. | Ra | $A^2$ | $A^3$ | $Z^2$ | $A^4$ | Rb | Physical property values |
|---|---|---|---|---|---|---|---|
| 2-3-91 | $C_2H_5$ | 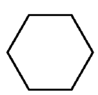 | 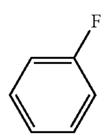 | — | 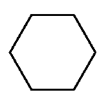 | $C_4H_9$ | |
| 2-3-92 | $C_5H_{11}$ | 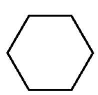 | 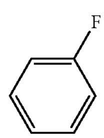 | — | 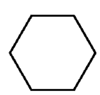 | $C_2H_5$ | |
| 2-3-93 | $CH_2{=}CH$ | 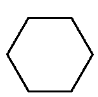 | 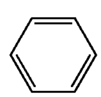 | — | 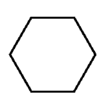 | $C_3H_7$ | |
| 2-3-94 | $CH_2{=}CH$ | 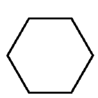 | 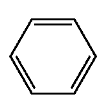 | — | 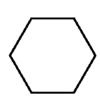 | $C_5H_{11}$ | |
| 2-3-95 | $CH_3CH{=}CH$ | 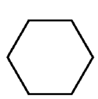 | 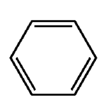 | — | 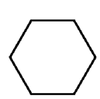 | $C_2H_5$ | |
| 2-3-96 | $CH_2{=}CHC_2H_4$ | 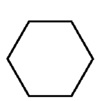 | 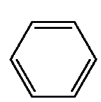 | — | 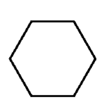 | $C_3H_7$ | |

TABLE 145-continued
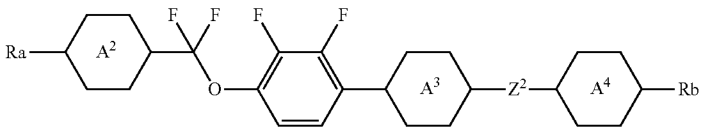
(2-3)
| No. | Ra | $A^2$ | $A^3$ | $Z^2$ | $A^4$ | Rb | Physical property values |
|---|---|---|---|---|---|---|---|
| 2-3-97 | $C_3H_7CH{=}CH$ | 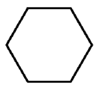 | 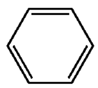 | — | 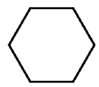 | $CH_3$ | |
| 2-3-98 | $CH_3CH{=}CHC_2H_4$ | 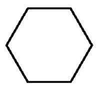 | 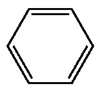 | — | 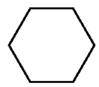 | $C_2H_5$ | |
| 2-3-99 | $C_3H_7$ | 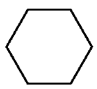 | 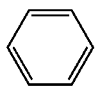 | — | 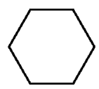 | $CH{=}CH_2$ | |
| 2-3-100 | $C_5H_{11}$ | 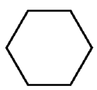 |  | — | 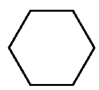 | $CH{=}CH_2$ | |
| 2-3-101 | $C_3H_7$ | 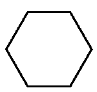 |  | — | 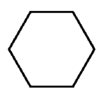 | $CH{=}CHCH_3$ | |
| 2-3-102 | $C_4H_9$ | 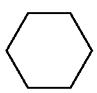 | 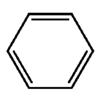 | — | 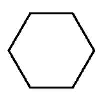 | $CH{=}CHCH_3$ | |
| 2-3-103 | $C_2H_5$ | 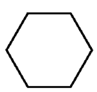 | 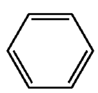 | — | 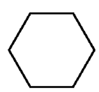 | $C_2H_4CH{=}CH_2$ | |
| 2-3-104 | $C_3H_7$ | 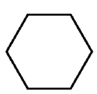 | 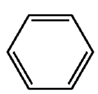 | — | 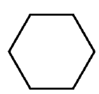 | $C_2H_4CH{=}CH_2$ | |
| 2-3-105 | $CH_3$ | 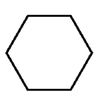 | 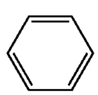 | — | 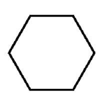 | $CH{=}CHC_3H_7$ | |
TABLE 146
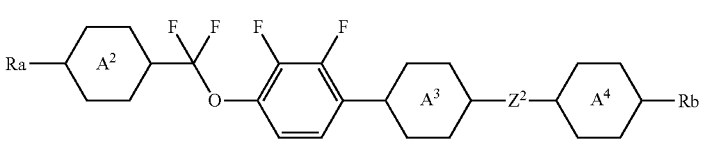
(2-3)
| No. | Ra | $A^2$ | $A^3$ | $Z^2$ | $A^4$ | Rb | Physical property values |
|---|---|---|---|---|---|---|---|
| 2-3-106 | $C_2H_5$ | 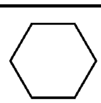 | 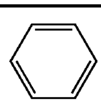 | — | 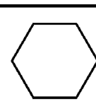 | $CH{=}CHC_3H_7$ | |

TABLE 146-continued
(2-3)
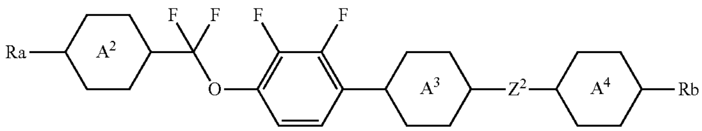
| No. | Ra | $A^2$ / $A^3$ | $Z^2$ | $A^4$ | Rb | Physical property values |
|---|---|---|---|---|---|---|
| 2-3-107 | $C_2H_5$ | 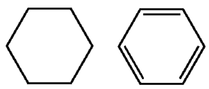 | — | 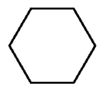 | $C_2H_4CH{=}CHCH_3$ | |
| 2-3-108 | $C_3H_7$ | 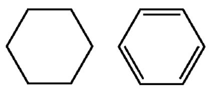 | — | 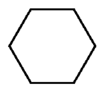 | $C_2H_4CH{=}CHCH_3$ | |
| 2-3-109 | $CH_2{=}CH$ | 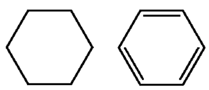 | — | 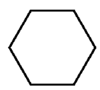 | $C_2H_4CH{=}CH_2$ | |
| 2-3-110 | $CH_3CH{=}CH$ | 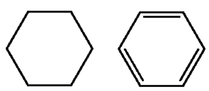 | — | 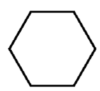 | $CH{=}CH_2$ | |
| 2-3-111 | $C_5H_{11}OCH_2$ | 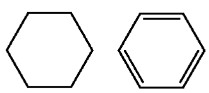 | — | 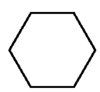 | $C_3H_7$ | |
| 2-3-112 | $C_3H_7$ | 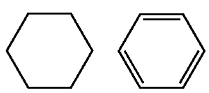 | — | 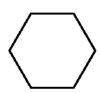 | $OC_2H_4CH{=}CH_2$ | |
| 2-3-113 | $C_4H_9$ | 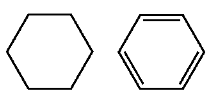 | $CH_2CH_2$ | 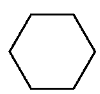 | $C_2H_5$ | |
| 2-3-114 | $C_5H_{11}$ | 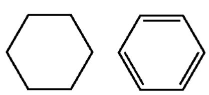 | $CH{=}CH$ | 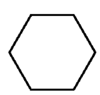 | $C_3H_7$ | |
| 2-3-115 | $C_3H_7$ | 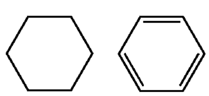 | $CH_2O$ | 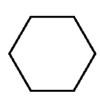 | $C_2H_5$ | |
| 2-3-116 | $C_5H_{11}$ | 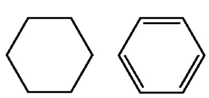 | $OCH_2$ | 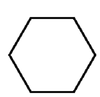 | $C_6H_{13}$ | |
| 2-3-117 | $C_5H_{11}$ | 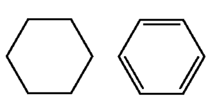 | COO | 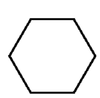 | $C_4H_9$ | |
| 2-3-118 | $C_2H_5$ | 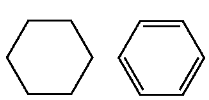 | OCO | 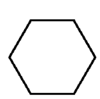 | $C_4H_9$ | |
| 2-3-119 | $C_2H_5$ | 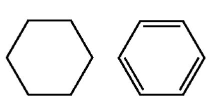 | $CF_2O$ | 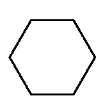 | $CH_3$ | |
| 2-3-120 | $C_4H_9$ | 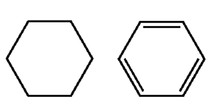 | $OCF_2$ | 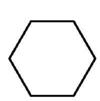 | $C_2H_5$ | |

TABLE 147
(2-3)
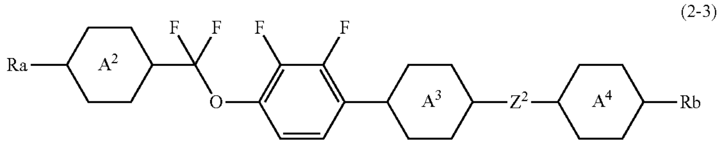
| No. | Ra | $A^2$ | $A^3$ | $Z^2$ | $A^4$ | Rb | Physical property values |
|---|---|---|---|---|---|---|---|
| 2-3-121 | $CH_3$ | 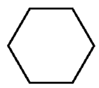 | 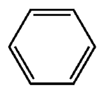 | — | 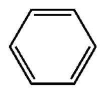 | $CH_3$ | |
| 2-3-122 | $CH_3$ | 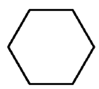 | 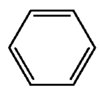 | — | 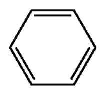 | $C_2H_5$ | |
| 2-3-123 | $CH_3$ | 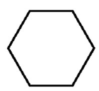 | 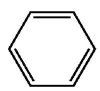 | — | 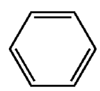 | $C_3H_7$ | |
| 2-3-124 | $CH_3$ | 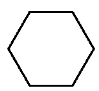 | 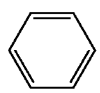 | — | 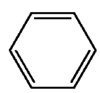 | $C_4H_9$ | |
| 2-3-125 | $CH_3$ | 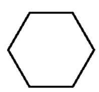 | 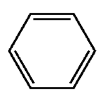 | — | 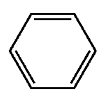 | $C_5H_{11}$ | |
| 2-3-126 | $C_2H_5$ | 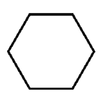 | 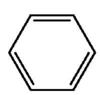 | — | 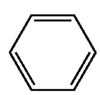 | $CH_3$ | |
| 2-3-127 | $C_2H_5$ | 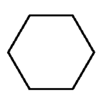 | 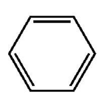 | — | 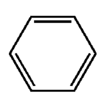 | $C_2H_5$ | |
| 2-3-128 | $C_2H_5$ | 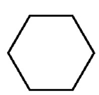 | 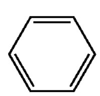 | — | 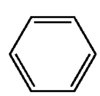 | $C_3H_7$ | |
| 2-3-129 | $C_2H_5$ | 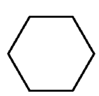 | 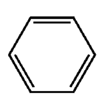 | — | 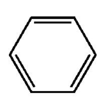 | $C_4H_9$ | |
| 2-3-130 | $C_2H_5$ | 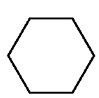 | 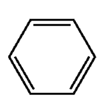 | — | 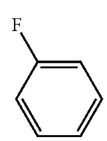 | $C_5H_{11}$ | |
| 2-3-131 | $C_3H_7$ | 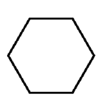 | 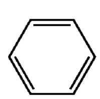 | — | 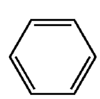 | $CH_3$ | |
| 2-3-132 | $C_3H_7$ | 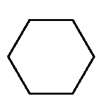 | 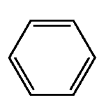 | — | 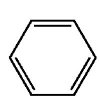 | $C_2H_5$ | |
| 2-3-133 | $C_3H_7$ | 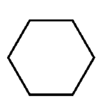 | 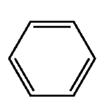 | — | 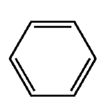 | $C_3H_7$ | |

TABLE 147-continued
(2-3)
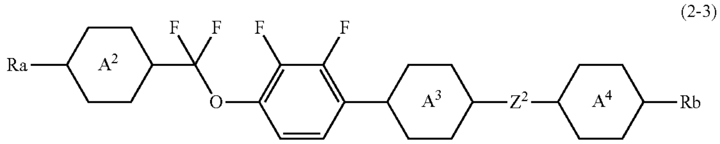
| No. | Ra | $A^2$ | $A^3$ | $Z^2$ | $A^4$ | Rb | Physical property values |
|---|---|---|---|---|---|---|---|
| 2-3-134 | $C_3H_7$ | 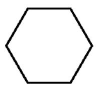 |  | — | 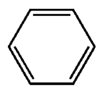 | $C_4H_9$ | |
| 2-3-135 | $C_3H_7$ | 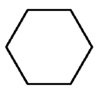 |  | — | 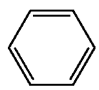 | $C_5H_{11}$ | |
TABLE 148
(2-3)
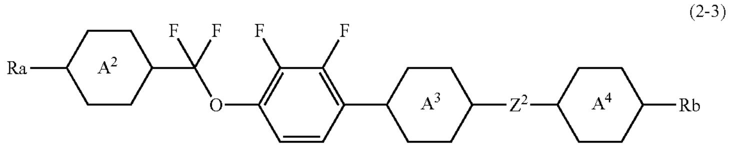
| No. | Ra | $A^2$ | $A^3$ | $Z^2$ | $A^4$ | Rb | Physical property values |
|---|---|---|---|---|---|---|---|
| 2-3-136 | $C_4H_9$ | 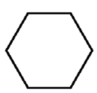 | 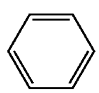 | — | 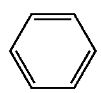 | $CH_3$ | |
| 2-3-137 | $C_4H_9$ | 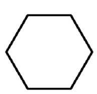 | 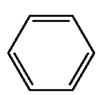 | — | 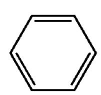 | $C_2H_5$ | |
| 2-3-138 | $C_4H_9$ | 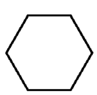 | 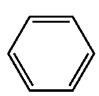 | — | 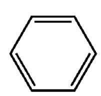 | $C_3H_7$ | |
| 2-3-139 | $C_4H_9$ | 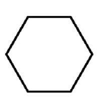 | 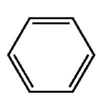 | — | 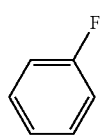 | $C_4H_9$ | |
| 2-3-140 | $C_4H_9$ | 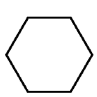 | 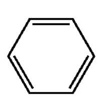 | — | 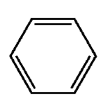 | $C_5H_{11}$ | |
| 2-3-141 | $C_5H_{11}$ | 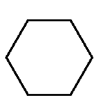 | 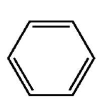 | — | 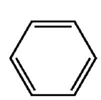 | $CH_3$ | |
| 2-3-142 | $C_5H_{11}$ | 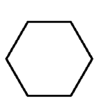 | 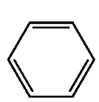 | — | 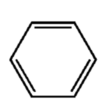 | $C_2H_5$ | |

TABLE 148-continued
(2-3)
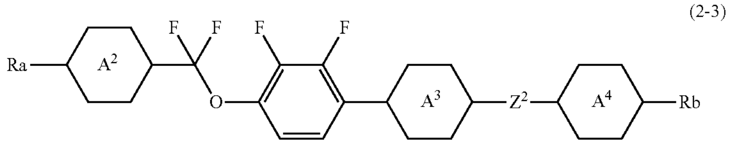
| No. | Ra | $A^2$ | $A^3$ | $Z^2$ | $A^4$ | Rb | Physical property values |
|---|---|---|---|---|---|---|---|
| 2-3-143 | $C_5H_{11}$ | 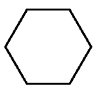 |  | — | 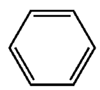 | $C_3H_7$ | |
| 2-3-144 | $C_5H_{11}$ | 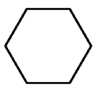 |  | — |  | $C_4H_9$ | |
| 2-3-145 | $C_5H_{11}$ | 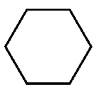 | 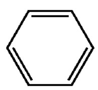 | — | 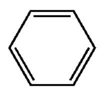 | $C_5H_{11}$ | |
| 2-3-146 | $C_2H_5O$ | 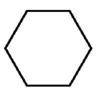 |  | — | 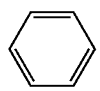 | $C_4H_9$ | |
| 2-3-147 | $C_5H_{11}$ | 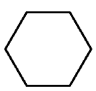 |  | — | 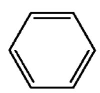 | $OC_2H_5$ | |
| 2-3-148 | $C_2H_5O$ | 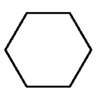 | 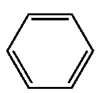 | — | 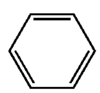 | $OC_4H_9$ | |
| 2-3-149 | $C_3H_7$ | 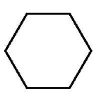 | 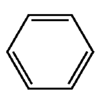 | — | 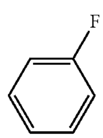 | $OC_4H_9$ | |
| 2-3-150 | $C_5H_{11}$ | 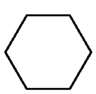 | 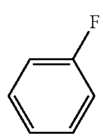 | — | 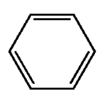 | $OC_2H_5$ | |
TABLE 149
(2-3)
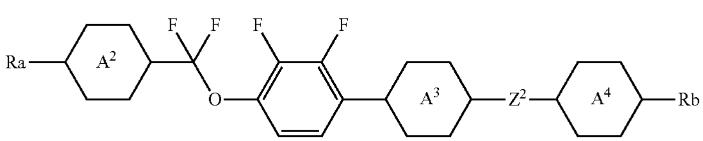
| No. | Ra | $A^2$ | $A^3$ | $Z^2$ | $A^4$ | Rb | Physical property values |
|---|---|---|---|---|---|---|---|
| 2-3-151 | $C_3H_7$ | 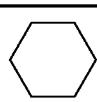 | 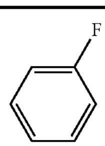 | — | 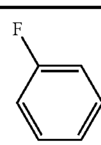 | $C_5H_{11}$ | |

TABLE 149-continued
(2-3)
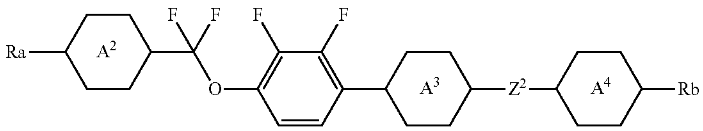
| No. | Ra | $A^2$ | $A^3$ | $Z^2$ | $A^4$ | Rb | Physical property values |
|---|---|---|---|---|---|---|---|
| 2-3-152 | $C_3H_7O$ | 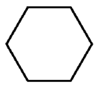 | 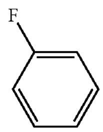 | — | 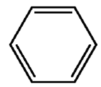 | $C_5H_{11}$ | |
| 2-3-153 | $C_5H_{11}$ | 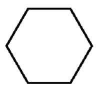 | 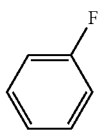 | — | 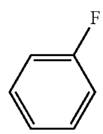 | $OC_2H_5$ | |
| 2-3-154 | $CH_2{=}CH$ | 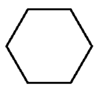 |  | — | 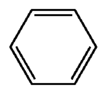 | $C_5H_{11}$ | |
| 2-3-155 | $CH_3CH{=}CH$ | 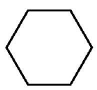 |  | — | 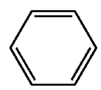 | $C_2H_5$ | |
| 2-3-156 | $CH_2{=}CHC_2H_4$ | 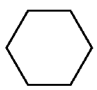 |  | — | 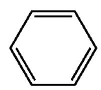 | $C_3H_7$ | |
| 2-3-157 | $C_3H_7CH{=}CH$ | 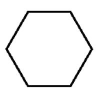 |  | — | 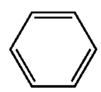 | $CH_3$ | |
| 2-3-158 | $CH_3CH{=}CHC_2H_4$ | 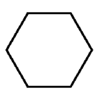 | 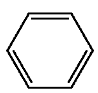 | — | 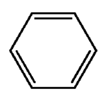 | $C_2H_5$ | |
| 2-3-159 | $C_2H_5$ | 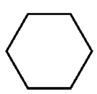 | 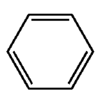 | — | 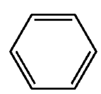 | $CH_2CH_2CHF_2$ | |
| 2-3-160 | $CH_2FCH_2CH_2$ | 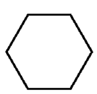 | 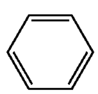 | — | 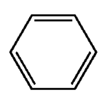 | $C_4H_9$ | |
| 2-3-161 | $CH_3$ | 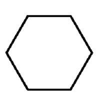 | 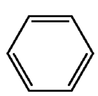 | — | 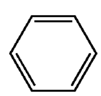 | $CH{=}CH_2$ | |
| 2-3-162 | $C_4H_9$ | 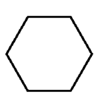 | 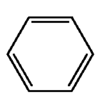 | — | 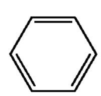 | $CH{=}CHCH_3$ | |
| 2-3-163 | $C_2H_5$ | 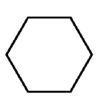 | 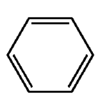 | — | 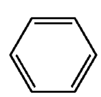 | $C_2H_4CH{=}CH_2$ | |
| 2-3-164 | $C_3H_7$ | 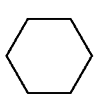 | 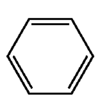 | — | 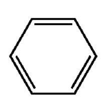 | $C_2H_4CH{=}CH_2$ | |

TABLE 149-continued
(2-3)
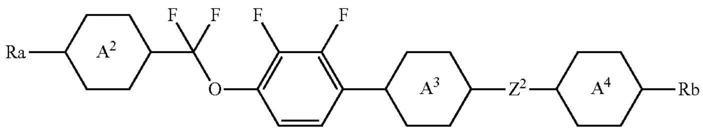
| No. | Ra | $A^2$ | $A^3$ | $Z^2$ | $A^4$ | Rb | Physical property values |
|---|---|---|---|---|---|---|---|
| 2-3-165 | $C_3H_7$ | 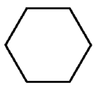 | 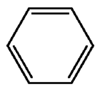 | — | 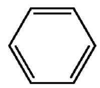 | $CH{=}CHC_3H_7$ | |
TABLE 150
(2-3)
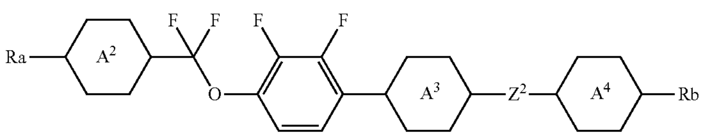
| No. | Ra | $A^2$ | $A^3$ | $Z^2$ | $A^4$ | Rb | Physical property values |
|---|---|---|---|---|---|---|---|
| 2-3-166 | $C_2H_5$ | 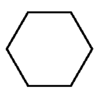 |  | — | 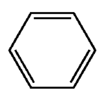 | $CH{=}CHC_3H_7$ | |
| 2-3-167 | $C_5H_{11}$ | 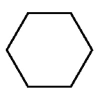 |  | — | 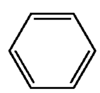 | $C_2H_4CH{=}CHCH_3$ | |
| 2-3-168 | $C_3H_7$ | 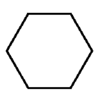 | 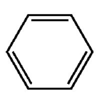 | — | 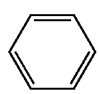 | $C_2H_4CH{=}CHCH_3$ | |
| 2-3-169 | $CH_2{=}CH$ | 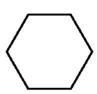 | 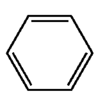 | — | 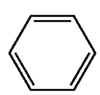 | $C_2H_4CH{=}CH_2$ | |
| 2-3-170 | $CH_3CH{=}CH$ | 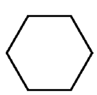 | 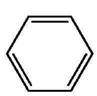 | — | 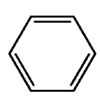 | $CH{=}CH_2$ | |
| 2-3-171 | $C_2H_5OCH_2$ | 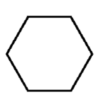 | 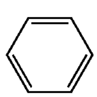 | — | 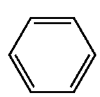 | $C_3H_7$ | |
| 2-3-172 | $C_3H_7$ | 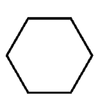 | 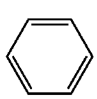 | — | 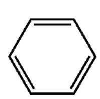 | $OC_2H_4CH{=}CH_2$ | |
| 2-3-173 | $C_3H_7$ | 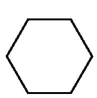 | 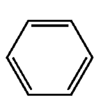 | $CH_2CH_2$ | 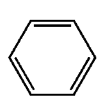 | $C_2H_5$ | |
| 2-3-174 | $C_2H_5$ | 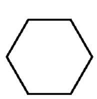 | 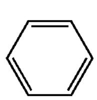 | $C{\equiv}C$ | 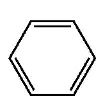 | $C_3H_7$ | |

TABLE 150-continued
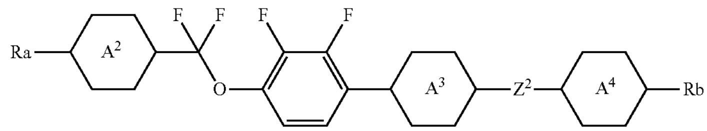
(2-3)
| No. | Ra | $A^2$ | $A^3$ | $Z^2$ | $A^4$ | Rb | Physical property values |
|---|---|---|---|---|---|---|---|
| 2-3-175 | $C_3H_7$ | 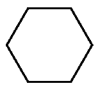 | 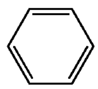 | $CH_2O$ | 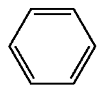 | $C_2H_5$ | |
| 2-3-176 | $C_2H_5$ | 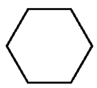 | 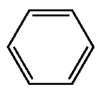 | $OCH_2$ | 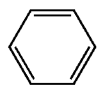 | $C_3H_7$ | |
| 2-3-177 | $C_4H_9$ | 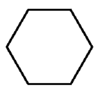 | 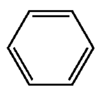 | COO | 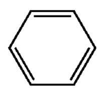 | $C_4H_9$ | |
| 2-3-178 | $C_3H_7$ | 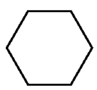 | 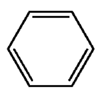 | OCO | 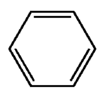 | H | |
| 2-3-179 | $C_2H_5$ | 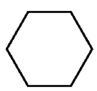 | 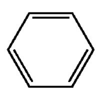 | $CF_2O$ | 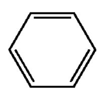 | $C_7H_5$ | |
| 2-3-180 | $CH_3$ | 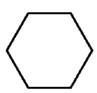 | 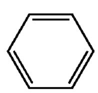 | $OCF_2$ | 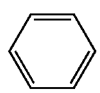 | $C_2H_5$ | |
TABLE 151
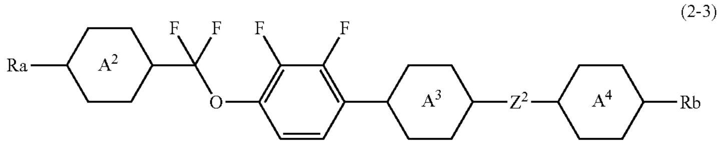
(2-3)
| No. | Ra | $A^2$ | $A^3$ | $Z^2$ | $A^4$ | Rb | Physical property values |
|---|---|---|---|---|---|---|---|
| 2-3-181 | $CH_3$ | 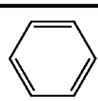 | 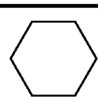 | — | 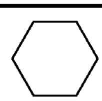 | $CH_3$ | |
| 2-3-182 | $CH_3$ | 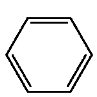 | 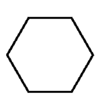 | — | 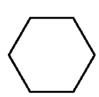 | $C_2H_5$ | |
| 2-3-183 | $CH_3$ | 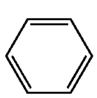 | 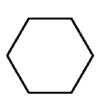 | — | 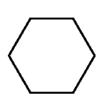 | $C_3H_7$ | |
| 2-3-184 | $CH_3$ | 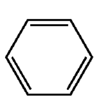 | 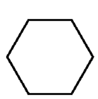 | — | 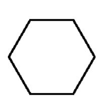 | $C_4H_9$ | |

TABLE 151-continued
(2-3)
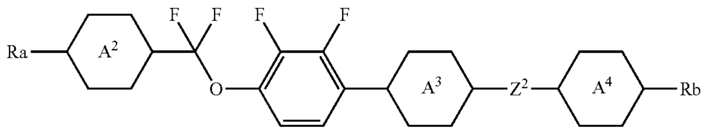
| No. | Ra | $A^2$ | $A^3$ | $Z^2$ | $A^4$ | Rb | Physical property values |
|---|---|---|---|---|---|---|---|
| 2-3-185 | $CH_3$ | 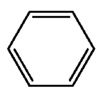 | 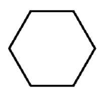 | — | 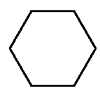 | $C_5H_{11}$ | |
| 2-3-186 | $C_2H_5$ | 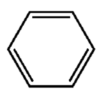 | 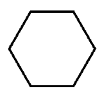 | — | 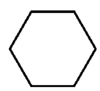 | $CH_3$ | |
| 2-3-187 | $C_2H_5$ | 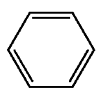 | 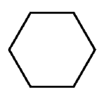 | — | 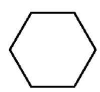 | $C_2H_5$ | |
| 2-3-188 | $C_2H_5$ | 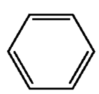 | 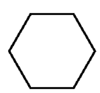 | — | 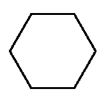 | $C_3H_7$ | |
| 2-3-189 | $C_2H_5$ | 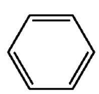 | 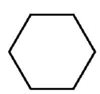 | — | 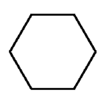 | $C_4H_9$ | |
| 2-3-190 | $C_2H_5$ | 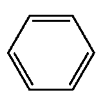 | 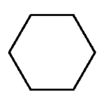 | — | 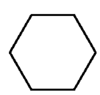 | $C_5H_{11}$ | |
| 2-3-191 | $C_3H_7$ | 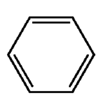 | 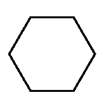 | — | 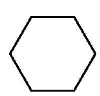 | $CH_3$ | |
| 2-3-192 | $C_3H_7$ | 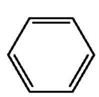 | 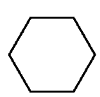 | — | 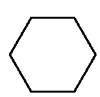 | $C_2H_5$ | |
| 2-3-193 | $C_3H_7$ | 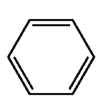 | 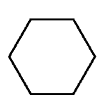 | — | 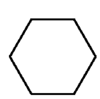 | $C_3H_7$ | |
| 2-3-194 | $C_3H_7$ | 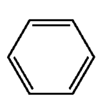 | 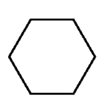 | — | 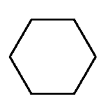 | $C_4H_9$ | |
| 2-3-195 | $C_3H_7$ | 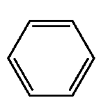 | 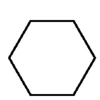 | — | 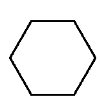 | $C_5H_{11}$ | |

TABLE 152
(2-3)
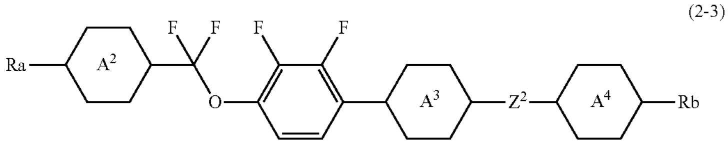
| No. | Ra | $A^2$ | $A^3$ | $Z^2$ | $A^4$ | Rb | Physical property values |
|---|---|---|---|---|---|---|---|
| 2-3-196 | $C_4H_9$ | 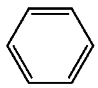 | 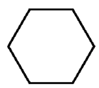 | — | 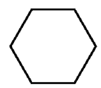 | $CH_3$ | |
| 2-3-197 | $C_4H_9$ | 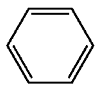 | 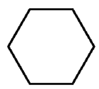 | — | 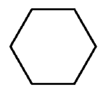 | $C_2H_5$ | |
| 2-3-198 | $C_4H_9$ |  | 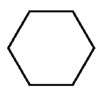 | — | 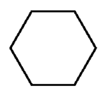 | $C_3H_7$ | |
| 2-3-199 | $C_4H_9$ | 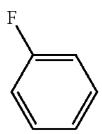 | 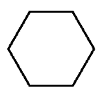 | — | 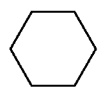 | $C_4H_9$ | |
| 2-3-200 | $C_4H_9$ |  | 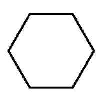 | — | 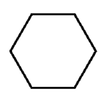 | $C_5H_{11}$ | |
| 2-3-201 | $C_5H_{11}$ | 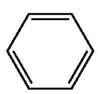 | 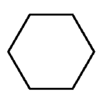 | — | 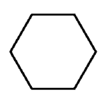 | $CH_3$ | |
| 2-3-202 | $C_5H_{11}$ | 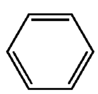 | 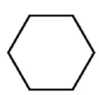 | — | 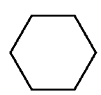 | $C_2H_5$ | |
| 2-3-203 | $C_5H_{11}$ | 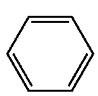 | 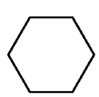 | — | 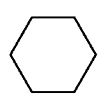 | $C_3H_7$ | |
| 2-3-204 | $C_5H_{11}$ | 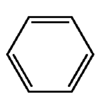 | 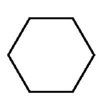 | — | 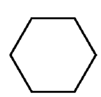 | $C_4H_9$ | |
| 2-3-205 | $C_5H_{11}$ | 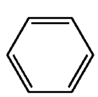 | 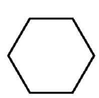 | — | 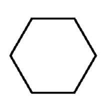 | $C_3H_7$ | |
| 2-3-206 | $C_2H_5O$ | 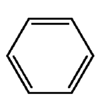 | 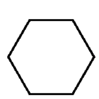 | — | 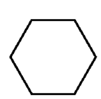 | $C_4H_9$ | |
| 2-3-207 | $C_5H_{11}$ | 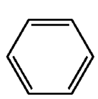 | 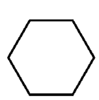 | — | 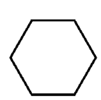 | $OC_2H_5$ | |
| 2-3-208 | $C_2H_5O$ | 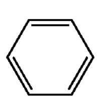 | 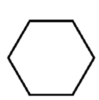 | — | 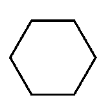 | $OC_4H_9$ | |

TABLE 152-continued
(2-3)
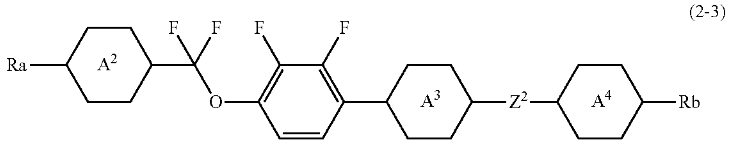
| No. | Ra | $A^2$ | $A^3$ | $Z^2$ | $A^4$ | Rb | Physical property values |
|---|---|---|---|---|---|---|---|
| 2-3-209 | $C_5H_{11}$ |  | 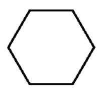 | — | 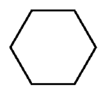 | $C_3H_7$ | |
| 2-3-210 | $C_3H_7$ | 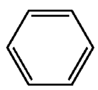 | 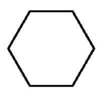 | — | 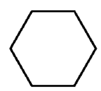 | $C_5H_{11}$ | |
TABLE 153
(2-3)
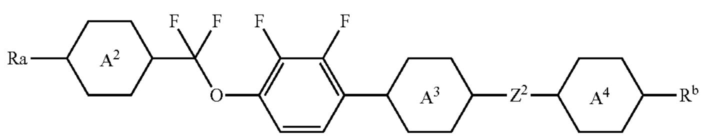
| No. | Ra | $A^2$ | $A^3$ | $Z^2$ | $A^4$ | Rb | Physical property values |
|---|---|---|---|---|---|---|---|
| 2-3-211 | $C_2H_5$ | 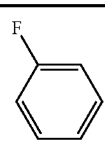 | 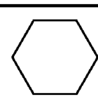 | — | 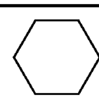 | $CH_2CH_2F$ | |
| 2-3-212 | $CH_3OC_2H_4$ | 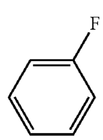 | 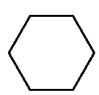 | — | 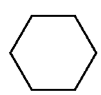 | $C_2H_5$ | |
| 2-3-213 | $CH_2{=}CH$ | 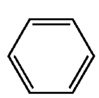 | 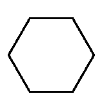 | — | 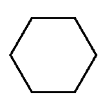 | $C_3H_7$ | |
| 2-3-214 | $CH_2{=}CH$ | 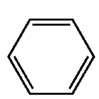 | 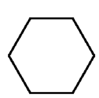 | — | 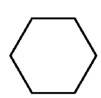 | $C_5H_{11}$ | |
| 2-3-215 | $CH_3CH{=}CH$ | 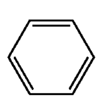 | 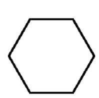 | — | 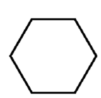 | $C_2H_5$ | |
| 2-3-216 | $CH_2{=}CHC_2H_4$ | 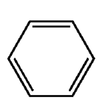 | 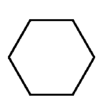 | — | 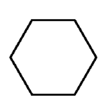 | $C_3H_7$ | |
| 2-3-217 | $C_3H_7CH{=}CH$ | 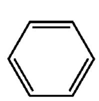 | 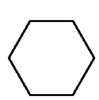 | — | 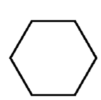 | $C_4H_9$ | |

TABLE 153-continued
(2-3)
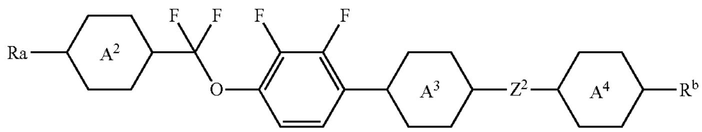
| No. | Ra | $A^2$ | $A^3$ | $Z^2$ | $A^4$ | Rb | Physical property values |
|---|---|---|---|---|---|---|---|
| 2-3-218 | $CH_3CH{=}CHC_2H_4$ |  | 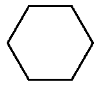 | — | 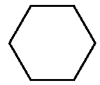 | $C_2H_5$ | |
| 2-3-219 | $C_3H_7$ | 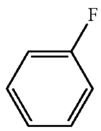 | 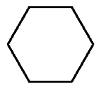 | — | 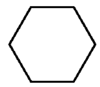 | $CH{=}CH_2$ | |
| 2-3-220 | $C_5H_{11}$ |  | 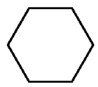 | — | 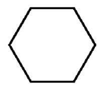 | $CH{=}CH_2$ | |
| 2-3-221 | $C_3H_7$ |  | 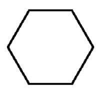 | — | 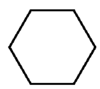 | $CH{=}CHCH_3$ | |
| 2-3-222 | $C_4H_9$ |  | 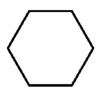 | — | 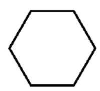 | $CH{=}CHCH_3$ | |
| 2-3-223 | $C_3H_7$ | 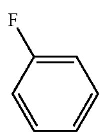 | 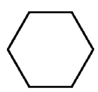 | — | 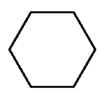 | $C_2H_4CH{=}CH_2$ | |
| 2-3-224 | $C_3H_7$ | 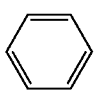 | 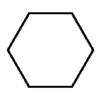 | — | 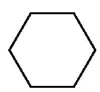 | $C_2H_4CH{=}CH_2$ | |
| 2-3-225 | $C_4H_9$ | 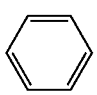 | 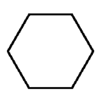 | — | 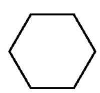 | $CH{=}CHC_3H_7$ | |
TABLE 154
(2-3)
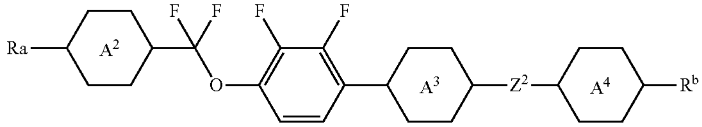
| No. | Ra | $A^2$ | $A^3$ | $Z^2$ | $A^4$ | Rb | Physical property values |
|---|---|---|---|---|---|---|---|
| 2-3-226 | $C_2H_5$ | 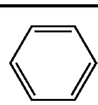 | 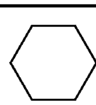 | — | 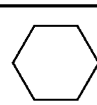 | $CH{=}CHC_3H_7$ | |

TABLE 154-continued
(2-3)
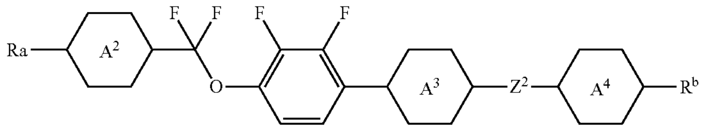
| No. | Ra | $A^2$ | $A^3$ | $Z^2$ | $A^4$ | Rb | Physical property values |
|---|---|---|---|---|---|---|---|
| 2-3-227 | $C_2H_5$ | 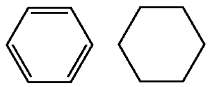 | | — | 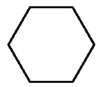 | $C_2H_4CH{=}CHCH_3$ | |
| 2-3-228 | $C_3H_7$ | 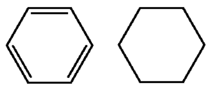 | | — | 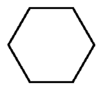 | $C_2H_4CH{=}CHCH_3$ | |
| 2-3-229 | $CH_2{=}CH$ | 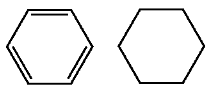 | | — | 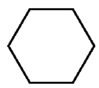 | $CH{=}CH_2$ | |
| 2-3-230 | $CH_3CH{=}CH$ | 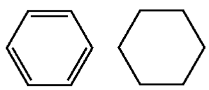 | | — | 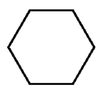 | $C_2H_4CH{=}CH_2$ | |
| 2-3-231 | $CH_3OCH_2$ | 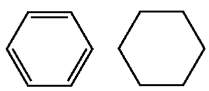 | | — | 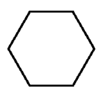 | $C_3H_7$ | |
| 2-3-232 | $C_2H_5$ | 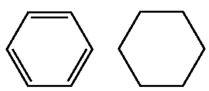 | | — | 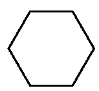 | $OC_3H_4CH{=}CH_2$ | |
| 2-3-233 | $C_5H_{11}$ | 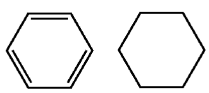 | | $CH_2CH_2$ | 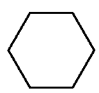 | $C_2H_5$ | |
| 2-3-234 | $C_5H_{11}$ | 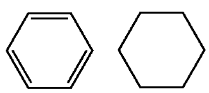 | | $(CH_2)_4$ | 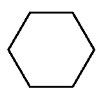 | $C_3H_7$ | |
| 2-3-235 | $C_2H_5$ | 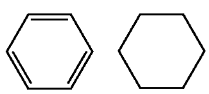 | | $CH_2O$ | 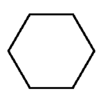 | $C_3H_7$ | |
| 2-3-236 | $C_3H_7$ | 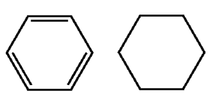 | | $OCH_2$ | 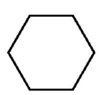 | $CH_3$ | |
| 2-3-237 | $C_5H_{11}$ | 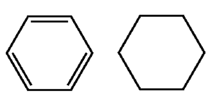 | | COO | 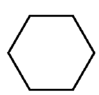 | $C_4H_9$ | |
| 2-3-238 | $C_2H_5$ | 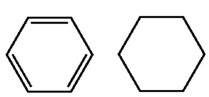 | | OCO | 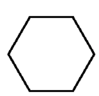 | $C_3H_7$ | |
| 2-3-239 | $C_2H_5$ | 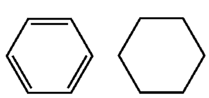 | | $CF_2O$ | 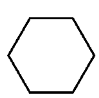 | $C_6H_{13}$ | |
| 2-3-240 | $C_4H_9$ | 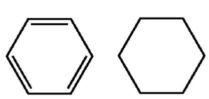 | | $OCF_2$ | 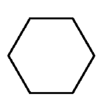 | $C_2H_5$ | |

TABLE 155
(2-3)
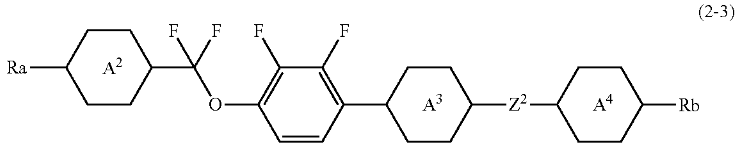
| No. | Ra | $A^2$ | $A^3$ | $Z^2$ | $A^4$ | Rb | Physical property values |
|---|---|---|---|---|---|---|---|
| 2-3-241 | $CH_3$ | 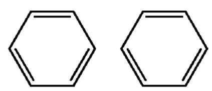 | | — | 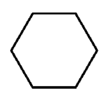 | $CH_3$ | |
| 2-3-242 | $CH_3$ | 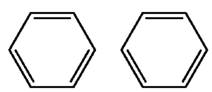 | | — | 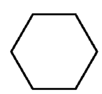 | $C_2H_5$ | |
| 2-3-243 | $CH_3$ | 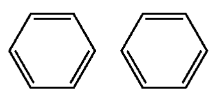 | | — | 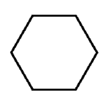 | $C_3H_7$ | |
| 2-3-244 | $CH_3$ | 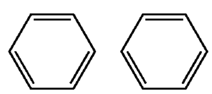 | | — | 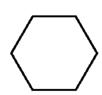 | $C_4H_9$ | |
| 2-3-245 | $CH_3$ | 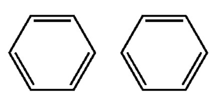 | | — | 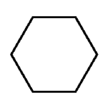 | $C_5H_{11}$ | |
| 2-3-246 | $C_2H_5$ | 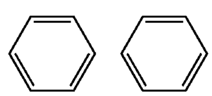 | | — | 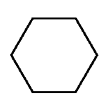 | $CH_3$ | |
| 2-3-247 | $C_2H_5$ | 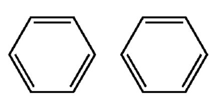 | | — | 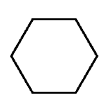 | $C_2H_5$ | |
| 2-3-248 | $C_2H_5$ | 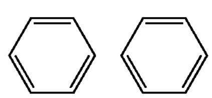 | | — | 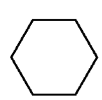 | $C_3H_7$ | |
| 2-3-249 | $C_2H_5$ | 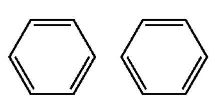 | | — | 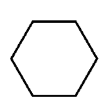 | $C_4H_9$ | |
| 2-3-250 | $C_2H_5$ | 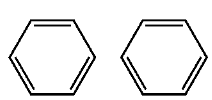 | | — | 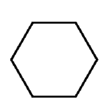 | $C_5H_{11}$ | |
| 2-3-251 | $C_3H_7$ | 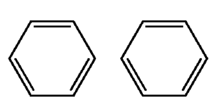 | | — | 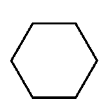 | $CH_3$ | |
| 2-3-252 | $C_3H_7$ | 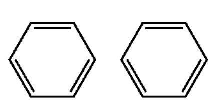 | | — | 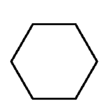 | $C_2H_5$ | |
| 2-3-253 | $C_3H_7$ | 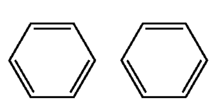 | | — | 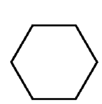 | $C_3H_7$ | |
| 2-3-254 | $C_3H_7$ | 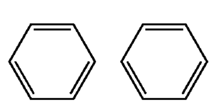 | | — | 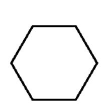 | $C_4H_9$ | |

TABLE 155-continued
(2-3)
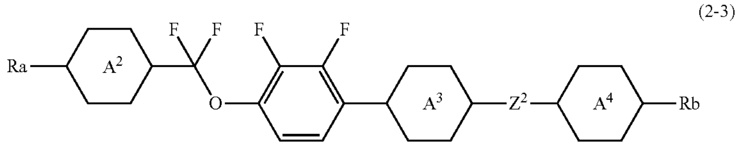
| No. | Ra | $A^2$ | $A^3$ | $Z^2$ | $A^4$ | Rb | Physical property values |
|---|---|---|---|---|---|---|---|
| 2-3-255 | $C_3H_7$ |  | 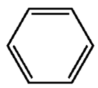 | — | 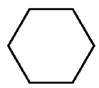 | $C_5H_{11}$ | |
TABLE 156
(2-3)
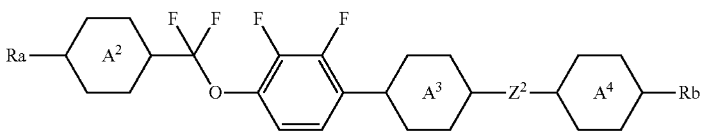
| No. | Ra | $A^2$ | $A^3$ | $Z^2$ | $A^4$ | Rb | Physical property values |
|---|---|---|---|---|---|---|---|
| 2-3-256 | $C_4H_9$ | 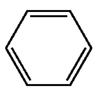 | 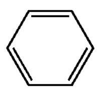 | — | 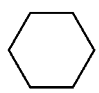 | $CH_3$ | |
| 2-3-257 | $C_4H_9$ |  | 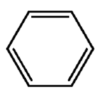 | — | 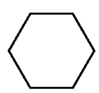 | $C_2H_5$ | |
| 2-3-258 | $C_4H_9$ |  | 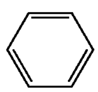 | — | 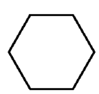 | $C_3H_7$ | |
| 2-3-259 | $C_4H_9$ | 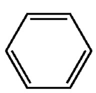 | 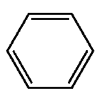 | — | 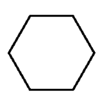 | $C_4H_9$ | |
| 2-3-260 | $C_4H_9$ | 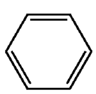 | 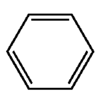 | — | 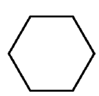 | $C_5H_{11}$ | |
| 2-3-261 | $C_5H_{11}$ | 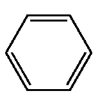 | 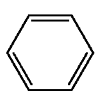 | — | 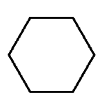 | $CH_3$ | |
| 2-3-262 | $C_5H_{11}$ | 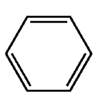 | 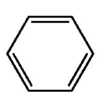 | — | 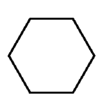 | $C_2H_5$ | |
| 2-3-263 | $C_5H_{11}$ | 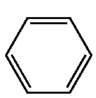 | 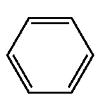 | — | 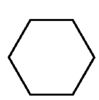 | $C_3H_7$ | |
| 2-3-264 | $C_5H_{11}$ | 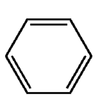 | 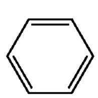 | — | 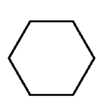 | $C_4H_9$ | |
| 2-3-265 | $C_5H_{11}$ | 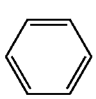 | 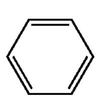 | — | 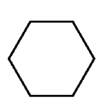 | $C_5H_{11}$ | |

TABLE 156-continued
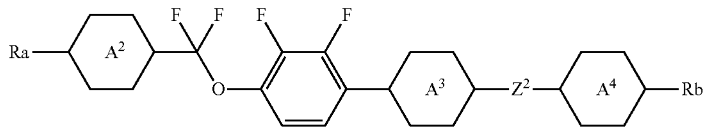
(2-3)
| No. | Ra | $A^2$ | $A^3$ | $Z^2$ | $A^4$ | Rb | Physical property values |
|---|---|---|---|---|---|---|---|
| 2-3-266 | $C_2H_5O$ |  | 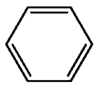 | — | 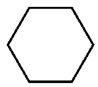 | $C_4H_9$ | |
| 2-3-267 | $C_5H_{11}$ | 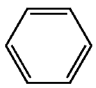 | 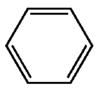 | — | 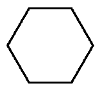 | $OC_2H_5$ | |
| 2-3-268 | $C_2H_5O$ |  | 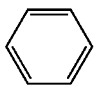 | — | 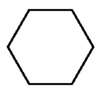 | $OC_4H_9$ | |
| 2-3-269 | $C_3H_7$ | 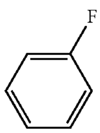 | 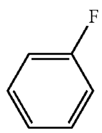 | — | 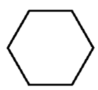 | $OC_4H_9$ | |
| 2-3-270 | $C_5H_{11}$ | 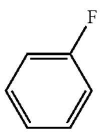 | 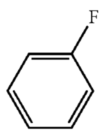 | — | 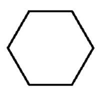 | $OC_2H_5$ | |
TABLE 157
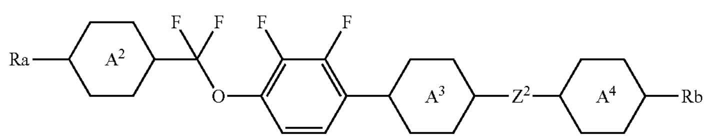
(2-3)
| No. | Ra | $A^2$ | $A^3$ | $Z^2$ | $A^4$ | Rb | Physical property values |
|---|---|---|---|---|---|---|---|
| 2-3-271 | $C_3H_7$ | 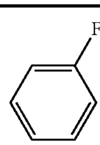 | 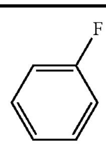 | — | 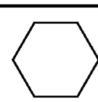 | $C_5H_{11}$ | |
| 2-3-272 | $C_5H_{11}$ | 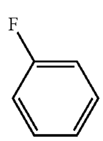 | 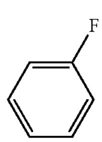 | — | 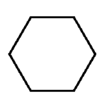 | $C_2H_5$ | |
| 2-3-273 | $C_4H_9O$ | 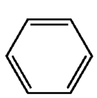 | 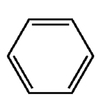 | — | 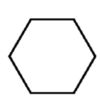 | $C_3H_7$ | |
| 2-3-274 | $CH_2{=}CH$ | 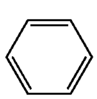 | 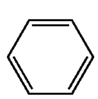 | — | 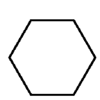 | $C_5H_{11}$ | |

TABLE 157-continued
(2-3)
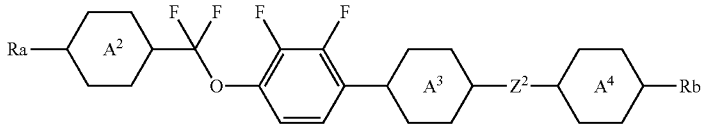
| No. | Ra | $A^2$ | $A^3$ | $Z^2$ | $A^4$ | Rb | Physical property values |
|---|---|---|---|---|---|---|---|
| 2-3-275 | $CH_3CH{=}CH$ |  |  | — | 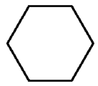 | $C_2H_5$ | |
| 2-3-276 | $C_3H_7CH{=}CH$ |  | 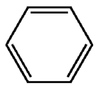 | — | 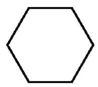 | $C_3H_7$ | |
| 2-3-277 | $CH_2{=}CHC_2H_4$ |  |  | — | 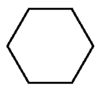 | $CH_3$ | |
| 2-3-278 | $CH_2{=}CHC_2H_4$ | 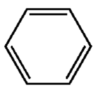 |  | — | 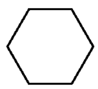 | $C_2H_5$ | |
| 2-3-279 | $CH_3CH{=}CHC_2H_4$ |  |  | — | 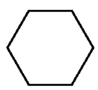 | $C_3H_7$ | |
| 2-3-280 | $CH_3CH{=}CHC_2H_4$ |  |  | — | 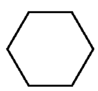 | $C_4H_9$ | |
| 2-3-281 | $C_3H_7$ | 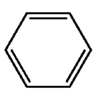 | 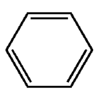 | — | 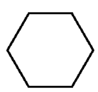 | $CH_2OC_3H_7$ | |
| 2-3-282 | $C_4H_9$ | 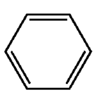 | 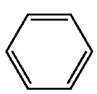 | — | 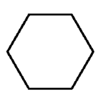 | $CH_2CH_2F$ | |
| 2-3-283 | $C_2H_5$ | 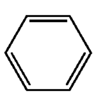 | 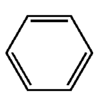 | — | 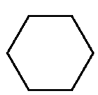 | $CH{=}CH_2$ | |
| 2-3-284 | $C_3H_7$ | 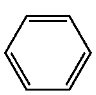 | 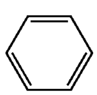 | — | 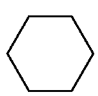 | $CH{=}CHCH_3$ | |
| 2-3-285 | $C_3H_7$ | 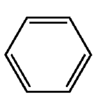 | 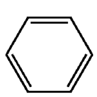 | — | 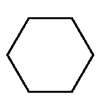 | $CH{=}CHC_3H_7$ | |

TABLE 158
(2-3)
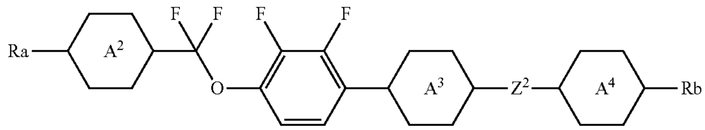
| No. | Ra | $A^2$ | $A^3$ | $Z^2$ | $A^4$ | Rb | Physical property values |
|---|---|---|---|---|---|---|---|
| 2-3-286 | $C_2H_5$ | 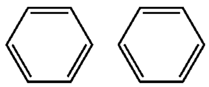 | | — | 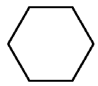 | $C_2H_4CH{=}CH_2$ | |
| 2-3-287 | $C_5H_{11}$ | 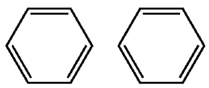 | | — | 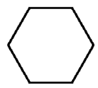 | $C_2H_4CH{=}CH_2$ | |
| 2-3-288 | $C_4H_9$ | 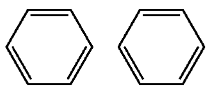 | | — | 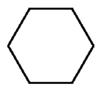 | $C_2H_4CH{=}CHCH_3$ | |
| 2-3-289 | $CH_2{=}CHC_2H_4$ | 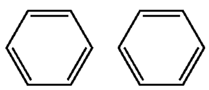 | | — | 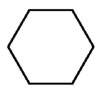 | $CH{=}CH_2$ | |
| 2-3-290 | $CH_3CH{=}CHC_2H_4$ | 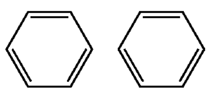 | | — | 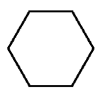 | $CH{=}CHCH_3$ | |
| 2-3-291 | $CH_3OCH_2CH_2$ | 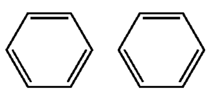 | | — | 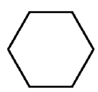 | $C_3H_7$ | |
| 2-3-292 | $C_3H_7$ | 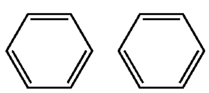 | | — | 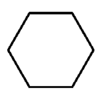 | $OC_2H_4CH{=}CH_2$ | |
| 2-3-293 | $C_5H_{11}$ | 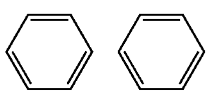 | | $CH_2CH_2$ | 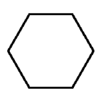 | $C_2H_5$ | |
| 2-3-294 | $C_5H_{11}$ | 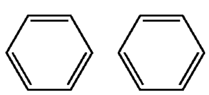 | | $CH_2CH_2$ | 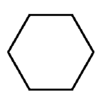 | $C_3H_7$ | |
| 2-3-295 | $C_3H_7$ | 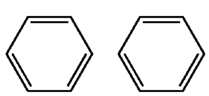 | | $CH_2O$ | 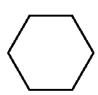 | $C_5H_{11}$ | |
| 2-3-296 | $C_2H_5$ | 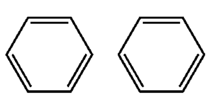 | | $OCH_2$ | 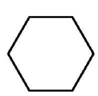 | $C_3H_7$ | |
| 2-3-297 | $C_4H_9$ | 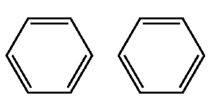 | | COO | 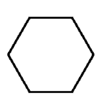 | $C_4H_9$ | |
| 2-3-298 | $C_3H_7$ | 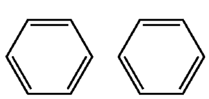 | | OCO | 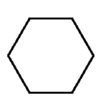 | $C_2H_5$ | |
| 2-3-299 | $C_{10}H_{21}$ | 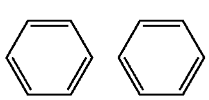 | | $CF_2O$ | 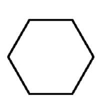 | $C_2H_5$ | |

TABLE 158-continued
(2-3)
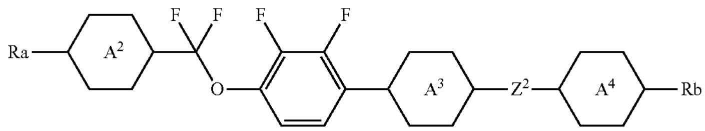
| No. | Ra | $A^2$ | $A^3$ | $Z^2$ | $A^4$ | Rb | Physical property values |
|---|---|---|---|---|---|---|---|
| 2-3-300 | $CH_3$ |  | 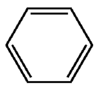 | $OCF_2$ | 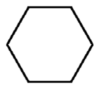 | $CH_3$ | |
TABLE 159
(2-3)
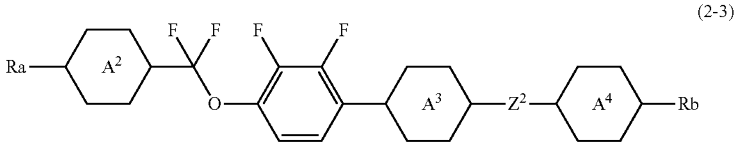
| No. | Ra | $A^2$ | $A^3$ | $Z^2$ | $A^4$ | Rb | Physical property values |
|---|---|---|---|---|---|---|---|
| 2-3-301 | $CH_3$ |  |  | — | 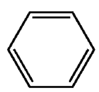 | $CH_3$ | |
| 2-3-302 | $CH_3$ |  | 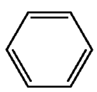 | — | 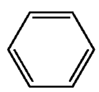 | $C_2H_5$ | |
| 2-3-303 | $CH_3$ | 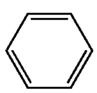 | 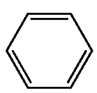 | — | 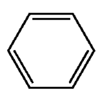 | $C_3H_7$ | |
| 2-3-304 | $CH_3$ | 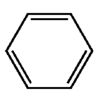 | 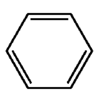 | — | 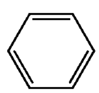 | $C_4H_9$ | |
| 2-3-305 | $CH_3$ | 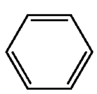 | 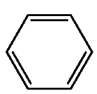 | — | 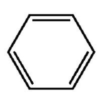 | $C_5H_{11}$ | |
| 2-3-306 | $C_2H_5$ | 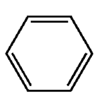 | 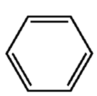 | — | 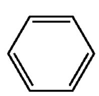 | $CH_3$ | |
| 2-3-307 | $C_2H_5$ | 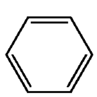 | 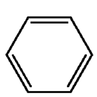 | — | 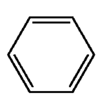 | $C_2H_5$ | |
| 2-3-308 | $C_2H_5$ | 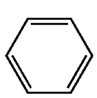 | 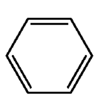 | — | 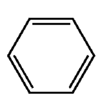 | $C_3H_7$ | |
| 2-3-309 | $C_2H_5$ | 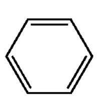 | 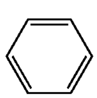 | — | 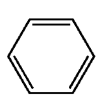 | $C_4H_9$ | |
| 2-3-310 | $C_2H_5$ | 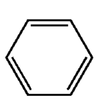 | 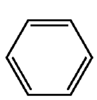 | — | 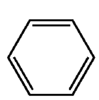 | $C_5H_{11}$ | |

TABLE 159-continued
(2-3)
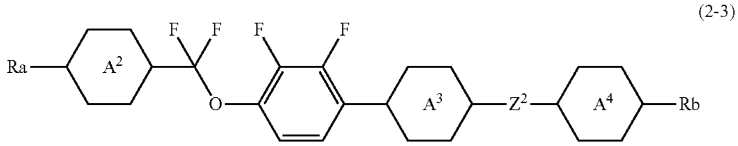
| No. | Ra | $A^2$ | $A^3$ | $Z^2$ | $A^4$ | Rb | Physical property values |
|---|---|---|---|---|---|---|---|
| 2-3-311 | $C_3H_7$ | 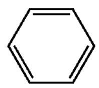 | 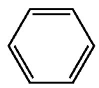 | — | 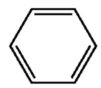 | $CH_3$ | |
| 2-3-312 | $C_3H_7$ |  |  | — | 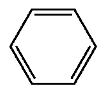 | $C_2H_5$ | |
| 2-3-313 | $C_3H_7$ |  | 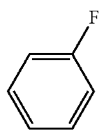 | — | 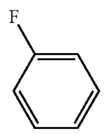 | $C_3H_7$ | |
| 2-3-314 | $C_3H_7$ | 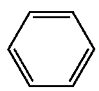 | 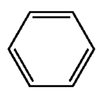 | — | 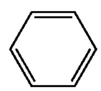 | $C_4H_9$ | |
| 2-3-315 | $C_3H_7$ |  | 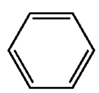 | — | 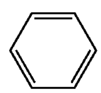 | $C_5H_{11}$ | |
TABLE 160
(2-3)
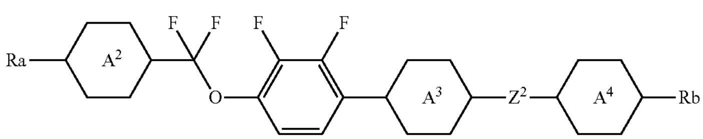
| No. | Ra | $A^2$ | $A^3$ | $Z^2$ | $A^4$ | Rb | Physical property values |
|---|---|---|---|---|---|---|---|
| 2-3-316 | $C_4H_9$ | 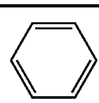 | 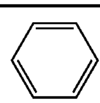 | — | 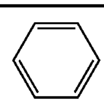 | $CH_3$ | |
| 2-3-317 | $C_4H_9$ | 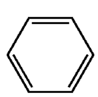 | 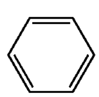 | — | 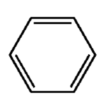 | $C_2H_5$ | |
| 2-3-318 | $C_4H_9$ | 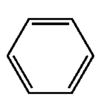 | 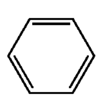 | — | 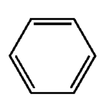 | $C_3H_7$ | |
| 2-3-319 | $C_4H_9$ | 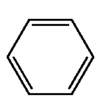 | 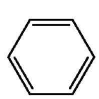 | — | 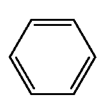 | $C_4H_9$ | |
| 2-3-320 | $C_4H_9$ | 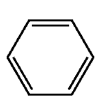 | 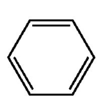 | — | 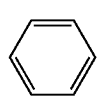 | $C_5H_{11}$ | |

TABLE 160-continued
(2-3)
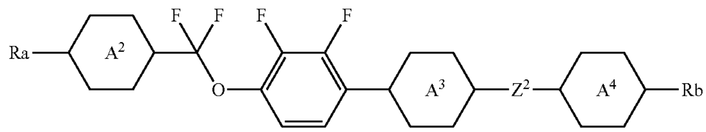
| No. | Ra | $A^2$ | $A^3$ | $Z^2$ | $A^4$ | Rb | Physical property values |
|---|---|---|---|---|---|---|---|
| 2-3-321 | $C_5H_{11}$ |  | 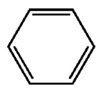 | — | 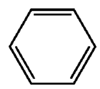 | $CH_3$ | |
| 2-3-322 | $C_5H_{11}$ | 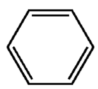 |  | — | 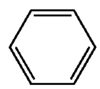 | $C_2H_5$ | |
| 2-3-323 | $C_5H_{11}$ | 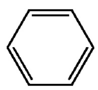 | 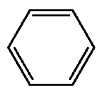 | — | 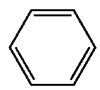 | $C_3H_7$ | |
| 2-3-324 | $C_5H_{11}$ |  | 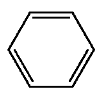 | — | 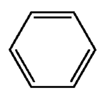 | $C_4H_9$ | |
| 2-3-325 | $C_5H_{11}$ | 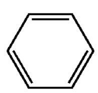 | 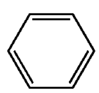 | — | 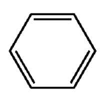 | $C_5H_{11}$ | |
| 2-3-326 | $C_2H_5O$ | 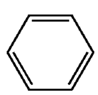 | 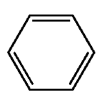 | — | 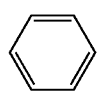 | $C_4H_9$ | |
| 2-3-327 | $C_5H_{11}$ | 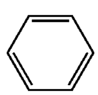 | 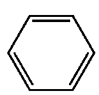 | — | 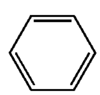 | $OC_2H_5$ | |
| 2-3-328 | $C_2H_5O$ | 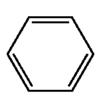 | 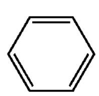 | — | 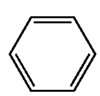 | $OC_4H_9$ | |
| 2-3-329 | $C_3H_7$ | 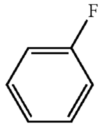 F | 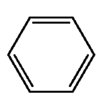 | — | 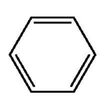 | $OC_4H_9$ | |
| 2-3-330 | $C_5H_{11}$ | 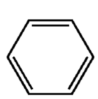 | 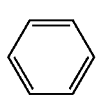 | — | 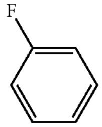 F | $OC_2H_5$ | |

TABLE 161
(2-3)
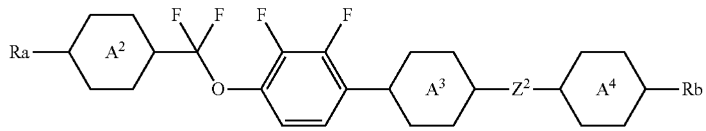
| No. | Ra | $A^2$ | $A^3$ | $Z^2$ | $A^4$ | Rb | Physical property values |
|---|---|---|---|---|---|---|---|
| 2-3-331 | $C_3H_7$ | 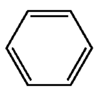 | 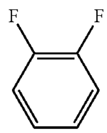 | — | 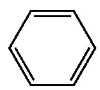 | $C_5H_{11}$ | |
| 2-3-332 | $C_3H_7O$ | 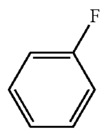 |  | — | 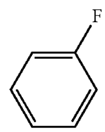 | $OC_2H_5$ | |
| 2-3-333 | $C_5H_{11}$ |  | 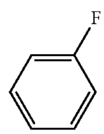 | — | 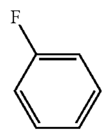 | $OC_2H_5$ | |
| 2-3-334 | $C_2H_5O$ | 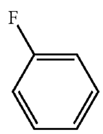 |  | — | 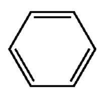 | $C_5H_{11}$ | |
| 2-3-335 | $C_4H_9$ | 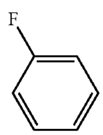 | 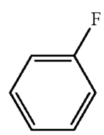 | — | 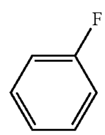 | $C_2H_5$ | |
| 2-3-336 | $C_2H_5O$ | 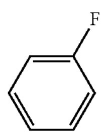 | 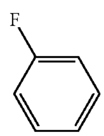 | — | 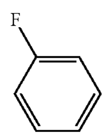 | $OC_4H_9$ | |
| 2-3-337 | $CH_2{=}CH$ | 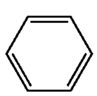 | 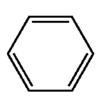 | — | 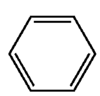 | $CH_3$ | |
| 2-3-338 | $CH_3CH{=}CH$ | 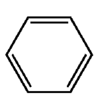 | 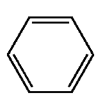 | — | 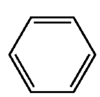 | $C_2H_5$ | |
| 2-3-339 | $CH_2{=}CHC_2H_4$ | 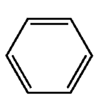 | 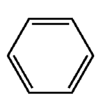 | — | 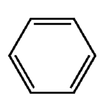 | $C_3H_7$ | |
| 2-3-340 | $C_3H_7CH{=}CH$ | 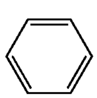 | 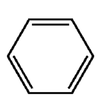 | — | 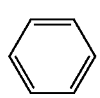 | $C_4H_9$ | |
| 2-3-341 | $CH_3CH{=}CHC_2H_4$ | 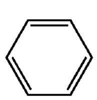 | 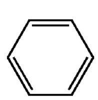 | — | 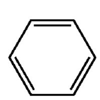 | $CH_3$ | |
| 2-3-342 | $C_4H_9$ | 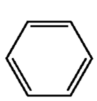 | 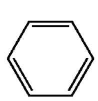 | — | 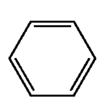 | $CH{=}CH_2$ | |

TABLE 161-continued
(2-3)
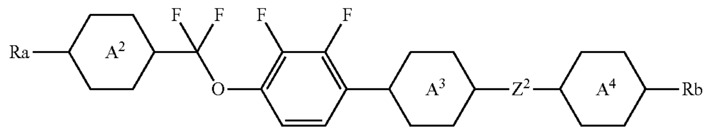
| No. | Ra | $A^2$ | $A^3$ | $Z^2$ | $A^4$ | Rb | Physical property values |
|---|---|---|---|---|---|---|---|
| 2-3-343 | $C_2H_5$ | 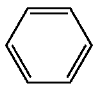 | 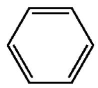 | — | 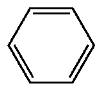 | $CH{=}CHCH_3$ | |
| 2-3-344 | $C_3H_7$ | 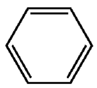 | 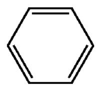 | — | 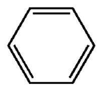 | $CH{=}CHC_3H_7$ | |
| 2-3-345 | $C_3H_7$ | 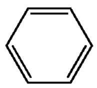 | 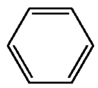 | — | 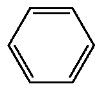 | $C_2H_4CH{=}CH_2$ | |
TABLE162
(2-3)
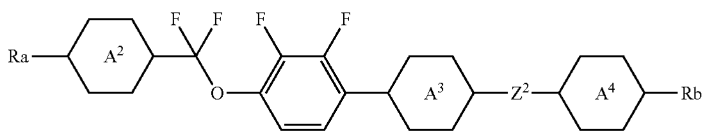
| No. | Ra | $A^2$ | $A^3$ | $Z^2$ | $A^4$ | Rb | Physical property values |
|---|---|---|---|---|---|---|---|
| 2-3-346 | $C_2H_5$ | 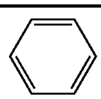 | 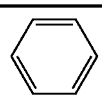 | — | 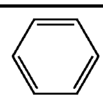 | $C_2H_4CH{=}CH_2$ | |
| 2-3-347 | $C_5H_{11}$ | 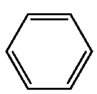 | 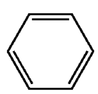 | — | 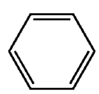 | $C_2H_4CH{=}CHCH_3$ | |
| 2-3-348 | $C_3H_7$ | 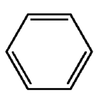 | 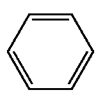 | — | 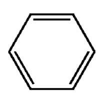 | $C_2H_4CH{=}CHCH_3$ | |
| 2-3-349 | $CH_3CH{=}CHC_2H_4$ | 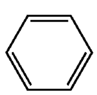 | 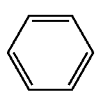 | — | 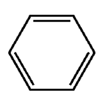 | $C_2H_4CH{=}CH_2$ | |
| 2-3-350 | $CH_2{=}CHC_2H_4$ | 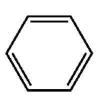 | 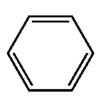 | — | 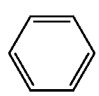 | $C_2H_4CH{=}CHCH_3$ | |
| 2-3-351 | $C_4H_9OCH_2$ | 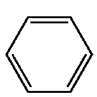 | 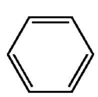 | — | 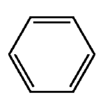 | $C_3H_7$ | |
| 2-3-352 | $C_3H_7$ | 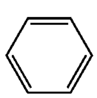 | 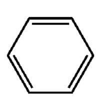 | — | 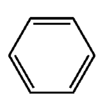 | $OC_2H_4CH{=}CH_2$ | |
| 2-3-353 | $C_3H_7$ | 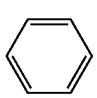 | 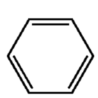 | $CH_2CH_2$ | 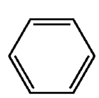 | $C_2H_5$ | |

TABLE162-continued
(2-3)
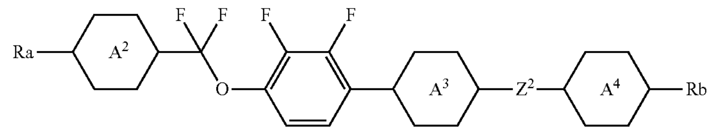
| No. | Ra | $A^2$ | $A^3$ | $Z^2$ | $A^4$ | Rb | Physical property values |
|---|---|---|---|---|---|---|---|
| 2-3-354 | $C_2H_5$ | 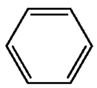 | 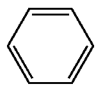 | $CH_2CH_2$ | 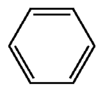 | $C_3H_7$ | |
| 2-3-355 | $C_3H_7$ |  |  | $CH_2O$ | 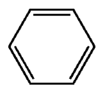 | $C_2H_5$ | |
| 2-3-356 | $C_2H_5$ |  |  | $OCH_2$ | 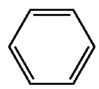 | $C_3H_7$ | |
| 2-3-357 | $C_4H_9O$ |  |  | COO | 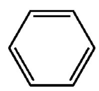 | $C_4H_9$ | |
| 2-3-358 | $C_3H_7$ |  |  | OCO | 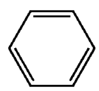 | $C_7H_{15}$ | |
| 2-3-359 | $C_2H_5$ |  | 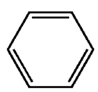 | $CF_2O$ | 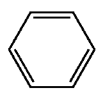 | $C_4H_9$ | |
| 2-3-360 | $CH_3$ |  | 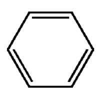 | $OCF_2$ | 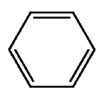 | $C_2H_5$ | |
TABLE 163
(2-3)
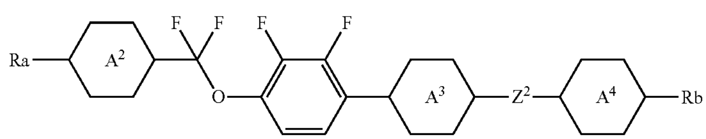
| No. | Ra | $A^2$ | $A^3$ | $Z^2$ | $A^4$ | Rb | Physical property values |
|---|---|---|---|---|---|---|---|
| 2-3-361 | $C_3H_7$ | 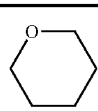 | 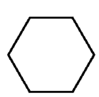 | — | 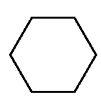 | $C_5H_{11}$ | |
| 2-3-362 | $C_5H_{11}$ | 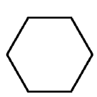 | 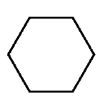 | — | 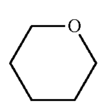 | $C_2H_5$ | |
| 2-3-363 | $CH_3$ | 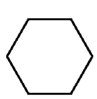 | 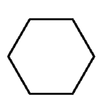 | — | 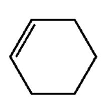 | $C_3H_7$ | |

TABLE 163-continued
(2-3)
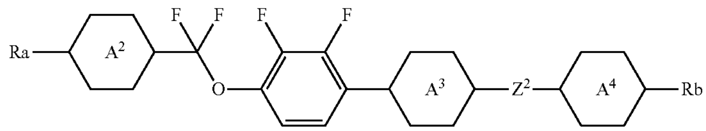
| No. | Ra | $A^2$ | $A^3$ | $Z^2$ | $A^4$ | Rb | Physical property values |
|---|---|---|---|---|---|---|---|
| 2-3-364 | $C_4H_9$ | 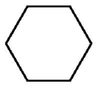 | 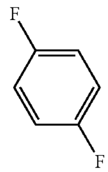 | — | 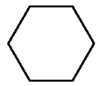 | $C_2H_5$ | |
| 2-3-365 | $C_5H_{11}$ | 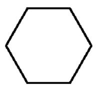 | 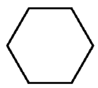 | — | 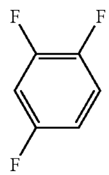 | $OC_4H_9$ | |
| 2-3-366 | $CH_3$ | 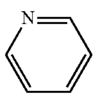 | 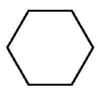 | — | 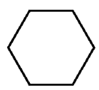 | $C_2H_5$ | |
| 2-3-367 | $C_2H_5$ | 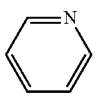 |  | — | 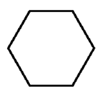 | $C_3H_7$ | |
| 2-3-368 | $C_2H_5$ |  | 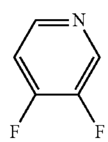 | — | 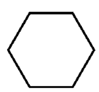 | $C_3H_7$ | |
| 2-3-369 | $C_3H_7O$ | 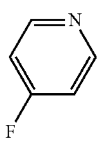 | 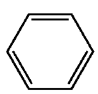 | — | 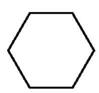 | $C_4H_9$ | |
| 2-3-370 | $C_2H_5$ | 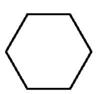 | 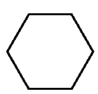 | — | 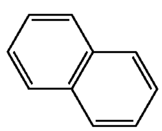 | $C_5H_{11}$ | |
| 2-3-371 | $C_3H_7$ | 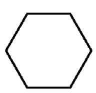 | 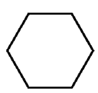 | — | 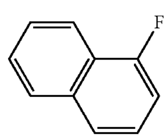 | $C_4H_9$ | |
| 2-3-372 | $C_3H_7$ | 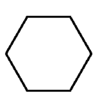 | 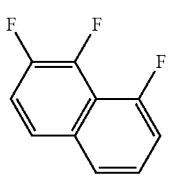 | — | 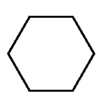 | $C_2H_5$ | |
| 2-3-373 | $C_2H_5$ | 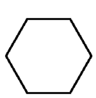 | 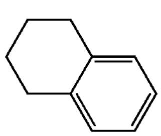 | — | 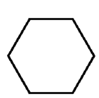 | $C_5H_{11}$ | |

TABLE 163-continued
(2-3)
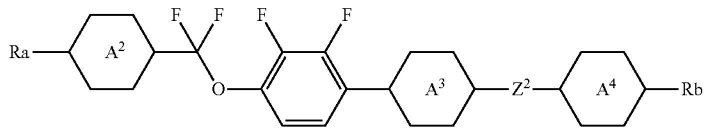
| No. | Ra | $A^2$ | $A^3$ | $Z^2$ | $A^4$ | Rb | Physical property values |
|---|---|---|---|---|---|---|---|
| 2-3-374 | $C_3H_7$ | 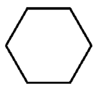 | 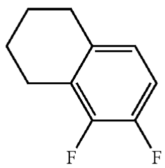 | — | 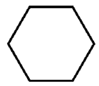 | $C_4H_9$ | |
| 2-3-375 | $C_3H_7$ | 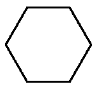 | 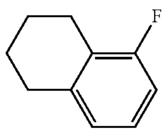 | — | 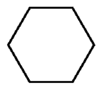 | $C_5H_{11}$ | |
TABLE 164
(2-3)
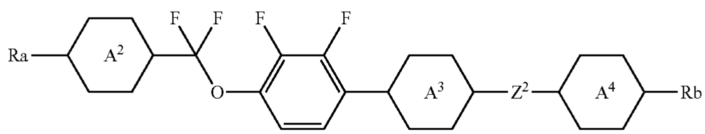
| No. | Ra | $A^2$ | $A^3$ | $Z^2$ | $A^4$ | Rb | Physical property values |
|---|---|---|---|---|---|---|---|
| 2-3-376 | $C_4H_9$ | 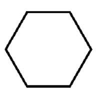 | 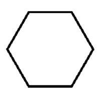 | — | 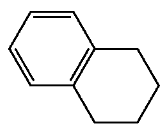 | $C_5H_{11}$ | |
| 2-3-377 | $C_5H_{11}$ | 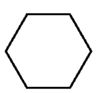 | 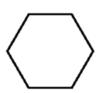 | — | 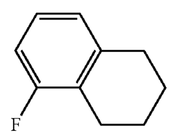 | $C_2H_5$ | |
| 2-3-378 | $C_4H_9$ | 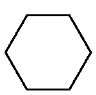 | 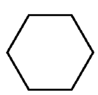 | — | 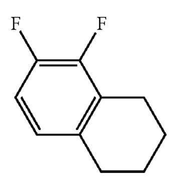 | $C_3H_7$ | |
| 2-3-379 | $C_4H_9$ | 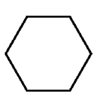 | 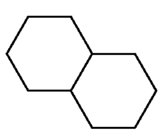 | — | 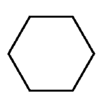 | $C_4H_9$ | |
| 2-3-380 | $C_4H_9$ | 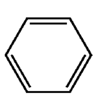 | 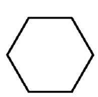 | — | 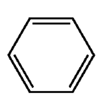 | $C_5H_{11}$ | |

TABLE 164-continued
(2-3)
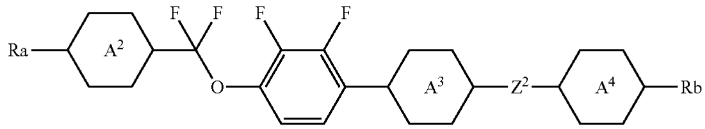
| No. | Ra | $A^2$ | $A^3$ | $Z^2$ | $A^4$ | Rb | Physical property values |
|---|---|---|---|---|---|---|---|
| 2-3-381 | $C_5H_{11}$ | 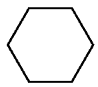 | 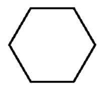 | — | 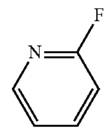 | $OC_4H_9$ | |
| 2-3-382 | $C_5H_{11}$ | 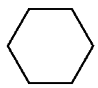 | 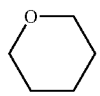 | — | 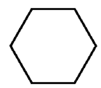 | $C_2H_5$ | |
| 2-3-383 | $C_5H_{11}$ |  | 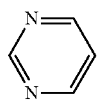 | — | 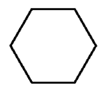 | $C_3H_7$ | |
| 2-3-384 | $C_5H_{11}$ | 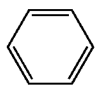 | 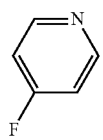 | — | 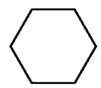 | $C_4H_9$ | |
| 2-3-385 | $CH_3O$ | 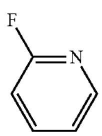 | 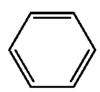 | — | 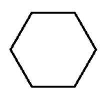 | $C_5H_{11}$ | |
| 2-3-386 | $C_2H_5O$ | 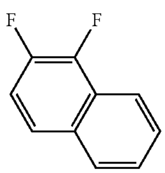 | 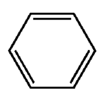 | — | 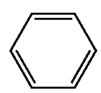 | $C_4H_9$ | |
| 2-3-387 | $C_5H_{11}$ | 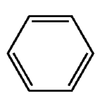 | 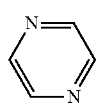 | — | 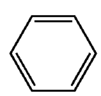 | $CH_3$ | |
| 2-3-388 | $C_4H_9O$ | 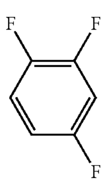 | 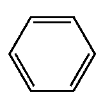 | — | 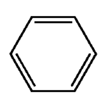 | $C_5H_{11}$ | |
| 2-3-389 | $C_5H_{11}$ | 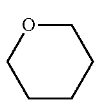 | 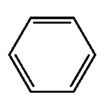 | — | 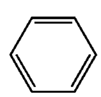 | $C_3H_7$ | |
| 2-3-390 | $C_3H_7$ | 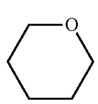 | 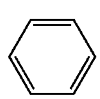 | — | 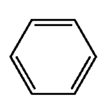 | $C_5H_{11}$ | |

Comparative Example 1

As a comparative example, 2,3-difluoro-4-(trans-4-pentylcyclohexylmethoxy)-4'-propylbiphenyl (R-1), which had three rings and a methyleneoxy bonding group, was synthesized.

(R-1)

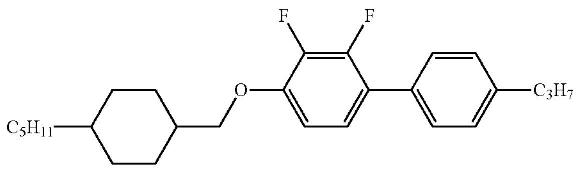

Chemical shifts δ (ppm) in $^{1}$H-NMR analysis were described below, and the compound obtained was identified as 2,3-difluoro-4-(trans-4-pentylcyclohexylmethoxy)-4'-propylbiphenyl (R-1). The measurement solvent was $CDCl_3$.

Chemical shift δ (ppm); 7.42(d, 2H), 7.24(d, 2H), 7.07(t, 1H), 6.77(t, 1H), 3.86(d, 2H), 2.63(t, 2H), 1.97-1.89(m, 2H), 1.87-1.76(m, 3H), 1.68(sext, 2H), 1.36-1.17(m, 9H), 1.13-1.02(m, 2H), and 1.01-0.86(m, 8H).

The phase transition temperature of the compound (R-1) obtained was as follows.

Phase transition temperature: C 50.4 N 116.8 Iso.

A liquid crystal composition A consisting of 85% by weight of the mother liquid crystals (i) and 15% by weight of the compound (R-1) was prepared. The physical property-values of the liquid crystal composition obtained were measured, and the extrapolated values of the physical properties of the liquid crystal compound (R-1) were calculated by extrapolating the measured values. The values were as follows.

Maximum temperature ($T_{NI}$)=115.3° C.; dielectric anisotropy (Δ∈)=−6.05; optical anisotropy (Δn)=0.155; viscosity (η)=61.2 mPa·s Physical Properties of Liquid Crystal Compound (No. 1-1-203):

Five compounds for the mother liquid crystals (i) described above were mixed to prepare the mother liquid crystals (i) having a nematic phase. The physical properties of the mother liquid crystals (i) were as follows.

Maximum temperature ($T_{NI}$)=71.7° C.; optical anisotropy (Δn)=0.137; dielectric anisotropy (Δ∈)=11.0.

The physical property-values of the liquid crystal composition composed of 85% by weight of the mother liquid crystals (i) and 15% by weight of 2,3-difluoro-4-(trans-4'-pentylbicyclohexyl-trans-4-ylmethoxy)-4'-biphenyl (No. 1-1-203) obtained in Example 7, as described above, were as follows.

Maximum temperature ($T_{NI}$)=214.6° C.; dielectric anisotropy (Δ∈)=−4.7; optical anisotropy (Δn)=0.167; viscosity (η)=53.7 mPa·s.

From these results it was found that the liquid crystal compound (No. 1-1-203) had a high maximum temperature ($T_{NI}$), a large negative dielectric anisotropy (Δ∈), and a low viscosity (η).

The compound (No. 1-1-203) of the invention was found to be excellent in view of wide liquid crystal phases, a high maximum temperature ($T_{NI}$) of a nematic phase, and a low viscosity (η) in comparison with this compound (R-1).

Comparative Example 2

As a comparative example, trans-4'-pentylbicyclohexyl-trans-4-carboxylic acid 4-(trans-4-propylcyclohexyl)phenylester (R-2), which had four rings and an ester bonding group, was synthesized.

(R-2)

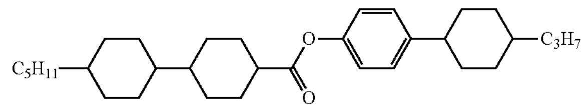

Chemical shifts δ (ppm) in $^{1}$H-NMR analysis were described below, and the compound obtained was identified as trans-4'-pentylbicyclohexyl-trans-4-carboxylic acid 4-(trans-4-propylcyclohexyl)phenylester (R-2). The measurement solvent was $CDCl_3$.

Chemical shift δ (ppm) ; 7.18(d, 2H), 6.95(d, 2H) and 2.44(m, 2H), 2.17-2.11(m, 2H), 1.90-1.81(m, 6H), 1.80-1.67 (m, 4H), and 1.57-0.80(m, 34H).

The phase transition temperature of the compound (R-1) obtained was as follows.

Phase transition temperature: Cr 34.1 SmB 227.5 N 303.0 Iso.

The liquid crystal composition C composed of 85% by weight of mother liquid crystals (i) and 15% by weight of the compound (R-1) obtained was prepared. The dielectric anisotropy (Δ∈) of the liquid crystal composition C obtained was measured, and the extrapolated value of dielectric anisotropy (Δ∈) of the liquid crystal compound (R-2) was calculated by extrapolating the measured values. The value was as follows.

Dielectric anisotropy (Δ∈)=−0.49.

Physical Properties of Liquid Crystal Compound (No. 1-2-23):

The physical property-values of the liquid crystal composition composed of 85% by weight of the mother liquid crystals (i) and 15% by weight of trans-4'-pentylbicyclohexyl-trans-4-carboxylic acid 2,3-difluoro-4-(trans-4-propylcyclohexyl)phenylester (No. 1-2-23) obtained in Example 11, as described above, was as follows.

Maximum temperature ($T_{NI}$)=255.9° C.; dielectric anisotropy (Δ∈)=−3.6; optical anisotropy (Δn)=0.114.

These values show that the liquid crystal compound (No. 1-2-23) has a high maximum temperature ($T_{NI}$) and a large negative dielectric anisotropy (Δ∈).

Comparison of this compound (R-2) with the compound (No. 1-2-23) of the invention showed that the compound (No. 1-2-23) of the invention is excellent in having a large negative dielectric anisotropy.

Comparative Example 3

As a comparative example, trans-4-{difluoro-[4-(trans-methylcyclohexyl)phenoxy]methyl}-trans-4'-pentylbicyclohexyl (R-3), which had four rings and a difluoromethyleneoxy bonding group, and was described in patent document No. 5 (DE 10,136,751), was synthesized.

(R-3)

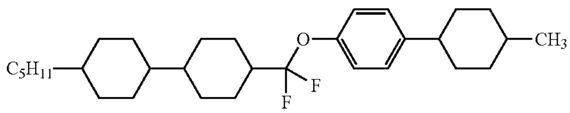

Chemical shifts δ (ppm) in $^1$H-NMR analysis were described below, and the compound obtained was identified as trans-4-{difluoro-[4-(trans-methylcyclohexyl)phenoxy] methyl}-trans-4'-pentylbicyclohexyl (R-3). The measurement solvent was $CDCl_3$.

Chemical shift δ (ppm); 7.14(d, 2H), 7.06(d, 2H) and 2.43 (tt, 1H), 2.08-1.92(m, 3H), 1.89-1.67(m, 10H), and 1.48-0.79 (m, 30H).

The phase transition temperature of the compound (R-3) obtained was as follows.

Phase transition temperature: Cr 51.5 SmB 190.7 N 255.5 Iso. Furthermore, the liquid crystal composition E composed of 85% by weight of the mother liquid crystals (i) and 15% by weight of the compound (R-3) was prepared. The dielectric anisotropy (Δ∈) of the liquid crystal composition E obtained was measured, and the extrapolated value of the dielectric anisotropy (Δ∈) of the liquid crystal compound (R-1) was calculated by extrapolating the measured values. The value was as follows.

Dielectric anisotropy (Δ∈)=+0.18.

Physical Properties of Liquid Crystal Compound (No. 1-3-203):

The physical-property values of the liquid crystal composition composed of 85% by weight of the mother liquid crystal (i) and 15% by weight of 4-[difluoro-(trans-4'-pentylbicyclohexyl-3-ene-4-yl)methoxy]-2,3-difluoro-4'-propylbiphenyl (No. 1-3-203) obtained in Example 14, as described above, were as follows.

Maximum temperature ($T_{NI}$)=219.9° C.; dielectric anisotropy (Δ∈)=−1.55; optical anisotropy (Δn)=0.140; viscosity (n); 43.7 mPa·s.

From these results it was found the liquid crystal compound (No. 1-3-203) had a high maximum temperature ($T_{NI}$) and a large negative dielectric anisotropy (Δ∈).

The compound (No. 1-3-203) of the invention was found to be excellent in view of a wide nematic phase and a large negative dielectric anisotropy (Δ∈) in comparison with this compound (R-3).

Example 17

Examples of Liquid Crystal Compositions

The representative compositions of the invention are summarized in Composition Example 1 to Composition Example 12. First, compounds which are the components of a composition, and its amount (% by weight) are shown. The compounds are indicated, according to the definition in Table 165, with the symbols of the left-terminal group, bonding group, ring structure, and right-terminal group. The configuration of 1,4-cyclohexylene is a trans form. When the sign of the terminal group is absent, the terminal group means hydrogen. Next, the physical property-values of the composition are shown. The physical property-values here are measured values themselves.

TABLE 165

Method of Description of Compound using Symbols

R—($A_1$)—$Z_1$— · · · —$Z_n$—($A_n$)—R'

| | |
|---|---|
| 1) Left-Terminal Group R— | Symbol |
| $C_nH_{2n+1}$ | n |
| $C_nH_{2n+1}O$ | nO |
| $C_mH_{2m+1}OC_nH_{2n}$ | mOn |
| $CH_2$=CH | V |
| $C_nH_{2n+1}$ CH=CH | nV |
| $CH_2$=CH $C_nH_{2n}$ | Vn |
| $C_mH_{2m+1}$ CH=CH $C_nH_{2n}$ | mVN |
| $CF_2$=CH | VFF |
| $CF_2$=CH $C_nH_{2n}$ | VFFn |
| 2) Right-Terminal Group R' | Symbol |
| $C_nH_{2n+1}$ | n |
| $OC_nH_{2n+1}$ | On |
| CH=$CH_2$ | V |
| CH=CH $C_nH_{2n+1}$ | Vn |
| $C_nH_{2n}$ CH=$CH_2$ | nV |
| CH=$CF_2$ | VFF |
| $COOCH_3$ | EMe |
| 3) Bonding Group $Z_n$ | Symbol |
| $CnH_{2n}$ | n |
| COO | E |
| CH=CH | V |
| $CH_2O$ | 1O |
| $OCH_2$ | O1 |
| $CF_2O$ | X |
| 4) Ring Structure $A_n$ | Symbol |
| 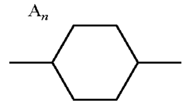 | H |
| 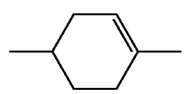 | Ch |
| 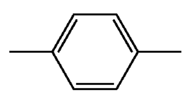 | B |
| 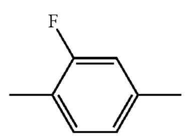 | B(2F) |
| 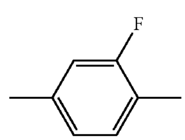 | B(3F) |
| 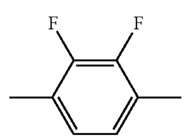 | B(2F,3F) |
| 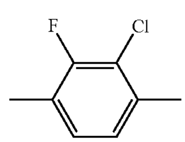 | B(2F,3Cl) |

TABLE 165-continued

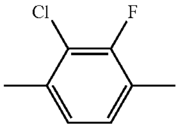

B(2Cl,3F)

5) Example of Description

Example 1. 5-HH1OB(2F,3F)H-3

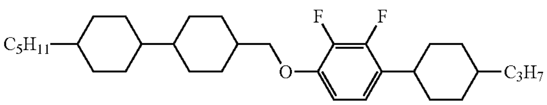

Example 2. 5-HHEB(2F,3F)H-3

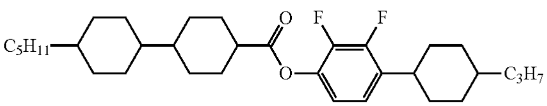

Example 3. 5-HBB(3F)B-3

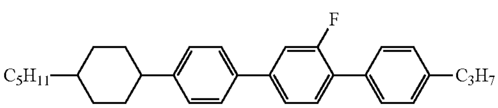

Example 4. 5-HBB(2F,3F)-O2

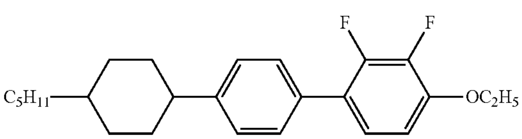

Physical property-values were measured according to the following methods. Many of these measurement methods were described in the Standard of Electric Industries Association of Japan, EIAJ-ED-2521A, or those with some modifications.

(1) Maximum Temperature of Nematic Phase (NI; ° C.)

A sample was put on a hot plate in a melting point apparatus equipped with a polarizing microscope, and heated at the rate of 1° C. per minute. A temperature was measured when part of sample changed from a nematic phase to an isotropic liquid. Hereinafter, the maximum temperature of a nematic phase may be abbreviated to "maximum temperature."

(2) Minimum Temperature of Nematic Phase (TC; ° C.)

Samples having a nematic phase were respectively kept in freezers at 0° C., −10° C., −20° C., −30° C., and −40° C. for ten days, and then liquid crystal phases were observed. For example, when a sample still remained in a nematic phase at −20° C., and changed to crystals (or a smectic phase) at −30° C., $T_c$ was expressed as ≤−20° C. Hereinafter, the minimum temperature of a nematic phase may be abbreviated to "minimum temperature."

(3) Optical anisotropy (Δn; Measured at 25° C.)

The optical anisotropy was measured by use of an Abbe refractometer with a polarizing plate attached to the ocular, using light at a wavelength of 589 nm. The surface of a main prism was rubbed in one direction, and then a sample was dropped onto the main prism. A refractive index (n∥) was measured when the direction of polarization was parallel to that of rubbing and a refractive index (n⊥) was measured when the direction of polarization was perpendicular to that of rubbing. The value (Δn) of optical anisotropy was calculated from the formula of Δn=n∥−n⊥.

(4) Viscosity (η; Measured at 20° C.; mPa·s)

An E type viscometer was used for measurement.

(5) Dielectric Anisotropy (Δ∈; Measured at 25° C.)

An ethanol (20 mL) solution of octadecyltriethoxysilane (0.16 mL) was applied to well-washed glass substrates. The glass substrates were rotated with a spinner, and then heated at 150° C. for 1 hour. A VA device in which a distance (cell gap) was 20 μm was assembled from the two glass substrates. A polyimide alignment film was prepared on glass substrates in a similar manner. After a rubbing-treatment to the alignment film obtained on the glass substrates, a TN device in which a distance between the two glass substrates was 9 μm and the twist angle was 80 degrees was assembled.

A sample (a liquid crystal composition, or a mixture of a liquid crystal compound and mother liquid crystals) was put in the VA device obtained, applied with a voltage of 0.5 V (1 kHz, sine waves), and then a dielectric constant (∈∥) in a major axis direction of the liquid crystal molecules was measured. The sample (the liquid crystal composition, or the mixture of the liquid crystal compound and the mother liquid crystals) was put in the TN device obtained, applied with a voltage of 0.5 V (1 kHz, sine waves), and then the dielectric constant (∈⊥) in a minor axis direction of liquid crystal molecules was measured. The value of dielectric anisotropy was calculated from the equation of Δ∈=∈∥−∈⊥. A composition in which this value is negative has a negative dielectric anisotropy.

(6) Voltage Holding Ratio (VHR; Measured at 25° C. and 100° C.; %)

A TN device was prepared by putting a sample in a cell which has a polyimide alignment film and a distance between two glass substrates (cell gap) of 6 μm. The TN device was charged at 25° C. by applying pulse voltage (60 microseconds at 5V). The waveforms of the voltage applied to the TN device were observed with a cathode ray oscilloscope and an area between a voltage curve and a horizontal axis in a unit period (16.7 milliseconds) was measured. An area was similarly measured based on the waveform of the applied voltage after the TN device had been removed. The value of the voltage holding ratio (%) was calculated from the equation: (voltage holding ratio)=(value of the area in the presence of a TN device)/(value of the area in the absence of TN device)×100.

The ratio (percentage) of components or liquid crystal compounds is the weight percentage (% by weight) based on the total weight of the liquid crystal compound. A composition is prepared by mixing components, such as liquid crystal compounds, after the weight of the components has been measured. Therefore, it is easy to calculate the % by weight of the components.

Composition Example 1

| | |
|---|---|
| V-H1OB(2F,3F)HH-3 | 5% |
| 5-H1OB(2F,3F)HH-3 | 5% |
| 2-HH-3 | 8% |
| 3-H2H—V | 5% |
| 3-HB—O2 | 12% |
| 5-HB—O2 | 13% |
| 3-HHB-1 | 7% |
| V2—HHB-1 | 10% |
| 3-H2B(2F,3F)—O2 | 12% |

-continued

| | |
|---|---|
| 5-H2B(2F,3F)—O2 | 13% |
| 3-HBB(2F,3F)—O2 | 5% |
| 5-HBB(2F,3F)—O2 | 5% |

NI = 82.3° C.; Δn = 0.093; Δε = −2.5.

Composition Example 2

| | |
|---|---|
| 5-H1OB(2F,3F)HH-3 | 5% |
| 3-HH1OB(2F,3F)B(3F)—O4 | 5% |
| 2-HH-3 | 5% |
| 2-H2H-3 | 5% |
| 3-HB—O2 | 16% |
| 5-HB—O2 | 16% |
| V—HHB-1 | 11% |
| 3-H2B(2F,3F)—O2 | 13% |
| 5-H2B(2F,3F)—O2 | 14% |
| 3-HBB(2F,3F)—O2 | 5% |
| 5-HBB(2F,3F)—O2 | 5% |

NI = 71.0° C.; Δn = 0.097; Δε = −2.9.

Composition Example 3

| | |
|---|---|
| V—H1OB(2F,3F)HH-3 | 3% |
| 5-H1OB(2F,3F)HH-3 | 5% |
| 5-H1OB(2F,3F)BH-3 | 5% |
| 5-H1OB(2F,3F)BB-3 | 3% |
| 2-H2H-3 | 10% |
| 3-H2H—V | 15% |
| 3-HB—O2 | 11% |
| 5-HB—O2 | 11% |
| 3-H2B(2F,3F)—O2 | 17% |
| 3-HBB(2F,3F)—O2 | 10% |
| 5-HBB(2F,3F)—O2 | 10% |

NI = 82.0° C.; TC =< −20° C.; Δn = 0.100; Δε = −3.4.

Composition Example 4

| | |
|---|---|
| 5-HH1OB(2F,3F)H-3 | 6% |
| 5-HH1OB(2F,3F)B-3 | 5% |
| 3-H2H—V | 17% |
| 3-HB—O2 | 7% |
| 3-HHB-1 | 5% |
| V2—HHB-1 | 3% |
| 3-HHB—O1 | 5% |
| 3-H2B(2F,3F)—O2 | 18% |
| 5-H2B(2F,3F)—O2 | 19% |
| 3-HBB(2F,3F)—O2 | 7% |
| 5-HBB(2F,3F)—O2 | 8% |

NI = 81.4° C.; TC =< −20° C.; Δn = 0.096; Δε = −3.4.

Composition Example 5

| | |
|---|---|
| 5-HHEB(2F,3F)H-3 | 5% |
| 5-HBEB(2F,3F)H-3 | 3% |
| 5-HB(3F)EB(2F,3F)H-3 | 3% |
| 2-H2H-3 | 5% |

-continued

| | |
|---|---|
| 3-H2H—V | 17% |
| V—HHB-1 | 8% |
| 3-HBB-2 | 5% |
| 3-HB(2F,3F)—O2 | 10% |
| 3-H2B(2F,3F)—O2 | 20% |
| 3-HBB(2F,3F)—O2 | 8% |
| 5-HBB(2F,3F)—O2 | 10% |
| 3-HBB(2F,3Cl)—O2 | 3% |
| 3-HBB(2Cl,3F)—O2 | 3% |

NI = 87.7° C.; TC <= −20° C.; Δn = 0.103; Δε = −3.4.

Composition Example 6

| | |
|---|---|
| 5-BBEB(2F,3F)H-3 | 5% |
| 5-HHEB(2F,3F)B-3 | 8% |
| 5-HBEB(2F,3F)B-3 | 3% |
| 2-H2H-3 | 5% |
| 3-H2H—V | 6% |
| 3-HB—O2 | 18% |
| 5-HB(2F,3F)—O2 | 10% |
| 3-H2B(2F,3F)—O2 | 20% |
| 2-HHB(2F,3F)-1 | 5% |
| 3-HHB(2F,3F)—O2 | 10% |
| 5-HHB(2F,3F)—O2 | 10% |

NI = 85.7° C.; TC <= −20° C.; Δn = 0.098; Δε = −3.5.

Composition Example 7

| | |
|---|---|
| 5-BBEB(2F,3F)B-3 | 5% |
| 5-HEB(2F,3F)HH-3 | 5% |
| 5-BEB(2F,3F)HH-3 | 5% |
| 2-H2H-3 | 15% |
| 3-H2H—V | 5% |
| 3-HHB-3 | 5% |
| 2-BBB(2F)-3 | 5% |
| 3-H2B(2F,3F)—O2 | 20% |
| 5-H2B(2F,3F)—O2 | 15% |
| 3-HH2B(2F,3F)—O2 | 10% |
| 5-HH2B(2F,3F)—O2 | 10% |

NI = 84.9° C.; TC <= −20° C.; Δn = 0.096; Δε = −3.5.

Composition Example 8

| | |
|---|---|
| 5-HChXB (2F,3F) B-3 | 5% |
| 5-HHXB (2F,3F) B-3 | 5% |
| 2-H2H-3 | 6% |
| 3-H2H—V | 17% |
| 3-HHEH-3 | 3% |
| 3-HHEH-5 | 3% |
| 3-HB (2F,3F) —O2 | 11% |
| 5-HB (2F,3F) —O2 | 11% |
| 5-HB (2F,3Cl) —O2 | 5% |
| 3-HB (2Cl,3F) —O2 | 5% |
| 5-HHB (2F,3F) —O2 | 5% |
| 3-HH2B (2F,3F) —O2 | 12% |
| 5-HH2B (2F,3F) —O2 | 12% |

NI = 81.6° C.; Δn = 0.077; Δε = −3.4.

Composition Example 9

| | |
|---|---|
| 3-HH1OB(2F,3F)B(3F)—O4 | 5% |
| 3-HHEB(2F,3F)B(3F)—O4 | 5% |
| 3-HB—O2 | 16% |
| V—HHB-1 | 18% |
| 3-H2B(2F,3F)—O2 | 20% |
| 5-H2B(2F,3F)—O2 | 20% |
| 3-HH2B(2F,3F)—O2 | 8% |
| 5-HH2B(2F,3F)—O2 | 8% |

NI = 82.5° C.; TC <= −20° C.; Δn = 0.100; Δϵ = −3.5.

Composition Example 10

| | |
|---|---|
| V—HH1OB(2F,3F)B-3 | 8% |
| V—HH1OB(2F,3F)H-3 | 7% |
| 2-H2H-3 | 5% |
| 3-H2H—V | 17% |
| 3-HBBH-5 | 3% |
| 1O1—HBBH-4 | 3% |
| 5-HBB(3F)B-2 | 3% |
| V—HB(2F,3F)—O2 | 7% |
| 5-HB(2F,3F)—O2 | 7% |
| 3-H2B(2F,3F)—O2 | 12% |
| 5-H2B(2F,3F)—O2 | 12% |
| 3-HBB(2F,3F)—O2 | 8% |
| 5-HBB(2F,3F)—O2 | 8% |

NI = 80.7° C.; TC <= −20° C.; Δn = 0.099; Δϵ = −3.4.

Composition Example 11

| | |
|---|---|
| 5-HHEB(2F,3F)H-3 | 6% |
| 5-HEB(2F,3F)HH-3 | 5% |
| 2-H2H-3 | 10% |
| 3-H2H—V | 15% |
| 2-BB(3F)B-3 | 5% |
| 5-HBB(3F)B-2 | 5% |
| 3-H2B(2F,3F)—O2 | 16% |
| 5-H2B(2F,3F)—O2 | 16% |
| V—HHB(2F,3F)—O2 | 5% |
| 5-HHB(2F,3F)—O2 | 6% |
| 5-HBB(2F,3F)—O2 | 5% |
| 3-HHB(2F,3Cl)—O2 | 3% |
| 3-HHB(2Cl,3F)—O2 | 3% |

NI = 87.3° C.; TC <= −20° C.; Δn = 0.097; Δϵ = −3.4.

Comparative Composition Example 1

Comparative Composition Example 1 containing the compound (R-1) obtained in Comparative Example 1 and a compound similar to the compound (R-1) was prepared in order to compare with Composition Example 1.
The characteristics were as follows.

| | | |
|---|---|---|
| 5-H1OB(2F,3F)B-3 | (R-1) | 5% |
| 5-H1OB(2F,3F)B—O2 | | 5% |
| 2-HH-3 | | 8% |
| 3-H2H—V | | 5% |
| 3-HB—O2 | | 12% |
| 5-HB—O2 | | 13% |
| 3-HHB-1 | | 7% |
| V2—HHB -1 | | 10% |
| 3-H2B(2F,3F)—O2 | | 12% |
| 5-H2B(2F,3F)—O2 | | 13% |
| 3-HBB(2F,3F)—O2 | | 5% |
| 5-HBB(2F,3F)—O2 | | 5% |

NI = 71.5° C.; Δn = 0.097; Δϵ = −2.5.

The composition in Composition Example 1 was found to have a higher maximum temperature (NI) of a nematic phase in comparison with the composition in Comparative Composition Example 1.

Comparative Composition Example 2

Comparative Composition Example 2, in which the compound (R-2) obtained in Comparative Example 2 and a compound similar to the compound (R-2) were contained, was prepared in order to compare with Composition Example 2. The characteristics were as follows.

| | | |
|---|---|---|
| 3-HHEBH-3 | | 5% |
| 5-HHEBH-3 | (R-2) | 5% |
| 2-HH-3 | | 5% |
| 2-H2H-3 | | 5% |
| 3-HB—O2 | | 16% |
| 5-HB—O2 | | 16% |
| V—HHB-1 | | 11% |
| 3-H2B (2F,3F) —O2 | | 13% |
| 5-H2B (2F,3F) —O2 | | 14% |
| 3-HBB (2F,3F) —O2 | | 5% |
| 5-HBB (2F,3F) —O2 | | 5% |

Δn = 0.092; Δϵ = −2.3.

The composition in Composition Example 2 was found to have a larger negative dielectric anisotropy (Δ∈) in comparison with the composition in Comparative Composition Example 2.

Industrial Applicability

The liquid crystal compound of the invention can be used as a material for a liquid crystal display device, and a liquid crystal composition including this compound can be suitably used for a liquid crystal display device.

what is claimed is:

1. A compound represented by formula (a):

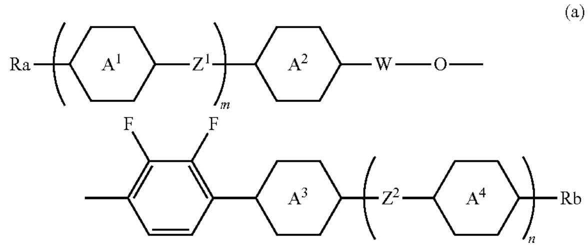

(a)

wherein

Ra and Rb are each independently hydrogen, alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons, and in these alkyl, alkenyl, alkoxy, alkoxyalkyl, and alkenyloxy, arbitrary hydrogen may be replaced by fluorine;

ring $A^1$, ring $A^2$, ring $A^3$, and ring $A^4$ are each independently 1,4-cyclohexylene, 1,4-cyclohexenylene, tetrahydropyran-2,5-diyl, 1,4-phenylene, 2-fluoro-1,4-phenylene, 3-fluoro-1,4-phenylene, naphthalene-2,6-diyl, decahydronaphthalene-2,6-diyl, or 1,2,3,4-tetrahydronaphthalene-2,6-diyl;

$Z^1$ and $Z^2$ are each independently a single bond, —$(CH_2)_2$—, —$(CH_2)_4$—, —CH═CH—, —C≡C—, —$CH_2O$—, —$OCH_2$—, —COO—, —OCO—, —$CF_2O$—, or —$OCF_2$—; and W is —$CH_2$—, —CO—, or —$CF_2$—; and m and n are each independently 0, 1, or 2, and the sum of m and n is 1 or 2, provided that when the sum of m and n is 1, W is —$CH_2$— or —CO—;

when m=1 and n=0, ring $A^3$ is 1,4-cyclohexylene;

when ring $A^2$ is 3-fluoro-1,4-phenylene, W is —$CH_2$—.

2. The compound according to claim 1, wherein

Ra and Rb are each independently alkyl having 1 to 12 carbons, alkenyl having 2 to 12 carbons, alkoxy having 1 to 11 carbons, alkoxyalkyl having 2 to 11 carbons, or alkenyloxy having 2 to 11 carbons; and ring $A^1$, ring $A^2$, ring $A^3$, and ring $A^4$ are each independently 1,4-cyclohexylene, 1,4-cyclohexenylene, tetrahydropyran-2,5-diyl, 1,4-phenylene, 2-fluoro-1,4-phenylene, or 3-fluoro-1,4-phenylene.

3. A compound represented by any one of formula (a-1) and formula (a-2):

(a-1)

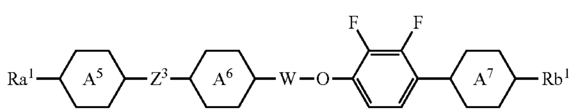

(a-2)

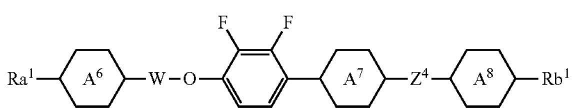

wherein $Ra^1$ and $Rb^1$ are each independently alkyl having 1 to 12 carbons, alkoxy having 1 to 11 carbons, or alkenyl having 2 to 12 carbons;

ring $A^5$, ring $A^6$, ring $A^7$, and ring $A^8$ are each independently 1,4-cyclohexylene, 1,4-phenylene, 2-fluoro-1,4-phenylene, or 3-fluoro-1,4-phenylene;

$Z^3$ and $Z^4$ are each independently a single bond or —$(CH_2)_2$—; and

W is —$CH_2$—, or —CO—;

provided that when ring $A^6$ is 3-fluoro-1,4-phenylene, W is —$CH_2$—.

4. A compound represented by any one of formulas (a-1-1) to (a-1-3) and formulas (a-2-1) to (a-2-6):

(a-1-1)

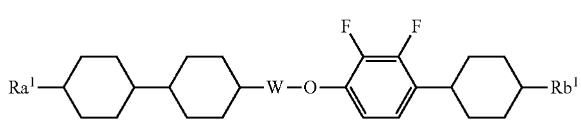

-continued (a-1-2)

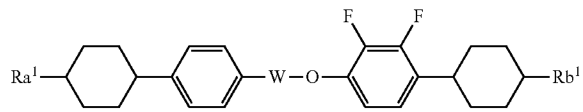

(a-1-3)

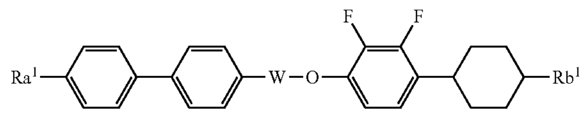

(a-2-1)

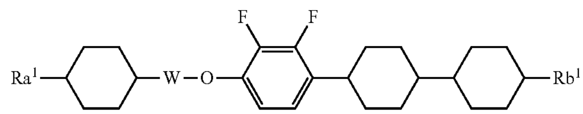

(a-2-2)

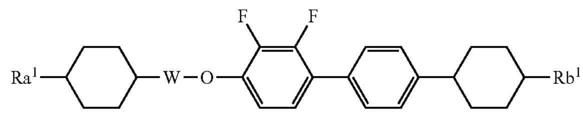

(a-2-3)

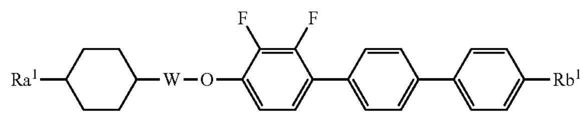

(a-2-4)

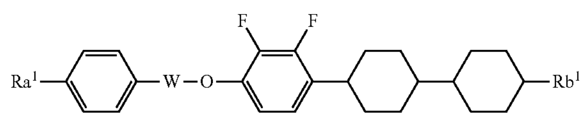

(a-2-5)

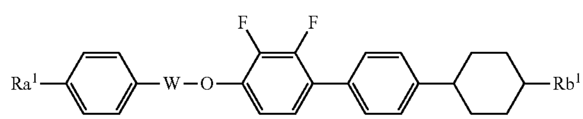

(a-2-6)

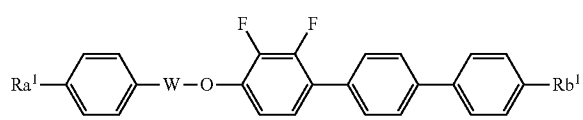

wherein $Ra^1$ and $Rb^1$ are each independently alkyl having 1 to 12 carbons, alkoxy having 1 to 11 carbons, or alkenyl having 2 to 12 carbons; and W is —$CH_2$—, or —CO—.

5. The compound according to claim 4, wherein W is —$CH_2$— in formulas (a-1-1) to (a-1-3) and formulas (a-2-1) to (a-2-6).

6. The compound according to claim 4, wherein W is —CO— in formulas (a-1-1) to (a-1-3) and formulas (a-2-1) to (a-2-6).

7. A liquid crystal composition having a negative dielectric anisotropy that comprises a first component which is at least one compound selected from the group of compounds according to claim 1 and a second component which is at least one compound selected from the group of compounds represented by formulas (e-1) to (e-3):

(e-1)

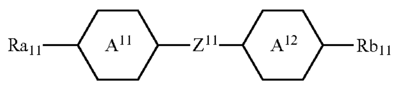

(e-2)

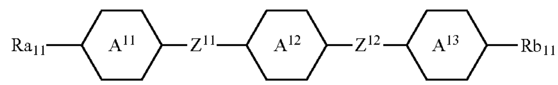

(e-3)

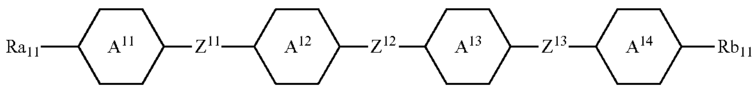

wherein $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine;

ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl; and $Z^{11}$, $Z^{12}$, and $Z^{13}$ are each independently a single bond, —$(CH_2)_2$—, —CH═CH—, —C≡C—, —COO—, or —$CH_2O$—.

8. A liquid crystal composition having a negative dielectric anisotropy that comprises a first component which is at least one compound selected from the group of compounds represented by formulas (a-1-1) to (a-1-3) and formulas (a-2-1) to (a-2-6) according to claim 4, and a second component selected from the group of compounds represented by formulas (e-1) to (e-3)

(e-1)

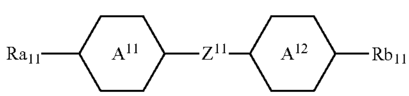

(e-2)

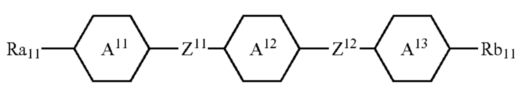

-continued (e-3)

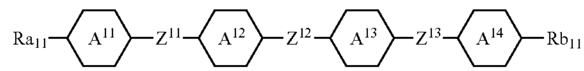

wherein $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine; ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl; and $Z^{11}$, $Z^{12}$, and $Z^{13}$ are each independently a single bond, —$(CH_2)_2$—, —CH═CH—, —CC—, —COO—, or —$CH_2O$—.

9. The liquid crystal composition according to claim 8, wherein the content ratio of the first component is in the range of 5% to 60% by weight, and the content ratio of the second component is in the range of 40% to 95% by weight, based on the total weight of the liquid crystal composition.

10. The liquid crystal composition according to claim 9 that further comprises a third component which is at least one compound selected from the group of compounds represented by formulas (g-1) to (g-6), in addition to the first and second components:

(g-1)

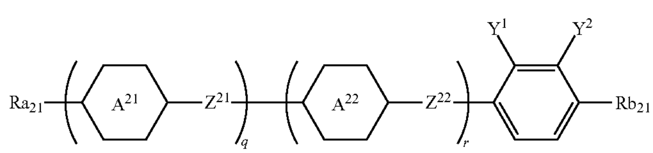

(g-2)

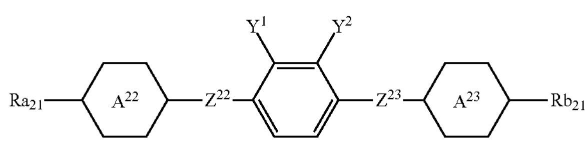

(g-3)

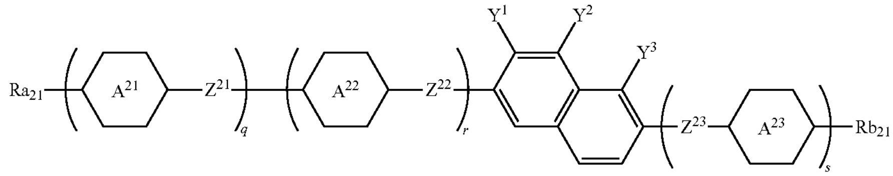

-continued (g-4)

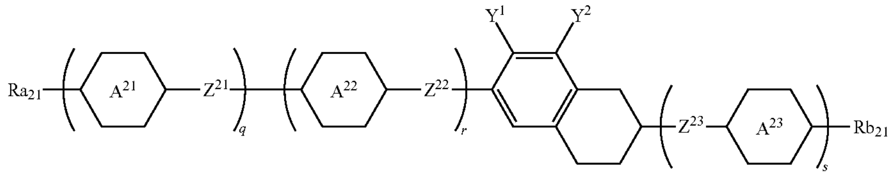

(g-5)

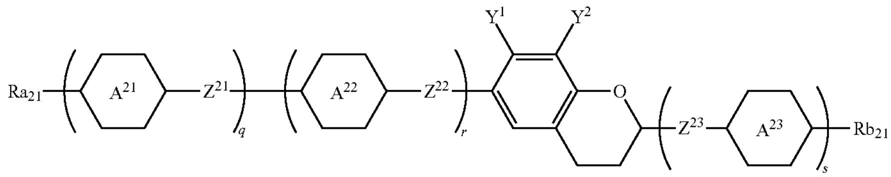

(g-6)

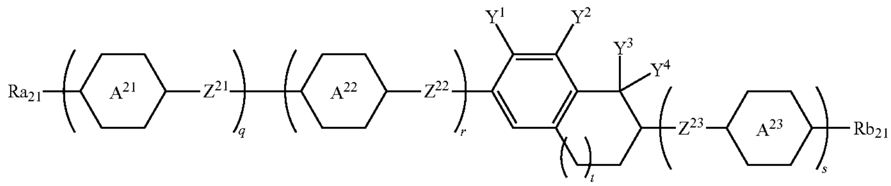

wherein $Ra_{21}$ and $Rb_{21}$ are each independently hydrogen or alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine;

ring $A^{21}$, ring $A^{22}$, and ring $A^{23}$ are each independently 1,4-cyclohexylene, 1,4-phenylene, 2-fluoro-1,4-phenylene, 3-fluoro-1,4-phenylene, pyrimidine-2,5-diyl, 1,3 -dioxane-2,5-diyl, or tetrahydropyran-2,5-diyl;

$Z^{21}$, $Z^{22}$, and $Z^{23}$ are each independently a single bond, —$(CH_2)_2$—, —CH═CH—, —C≡C—, —$OCF_2$—, —$CF_2O$—, —$OCF_2CH_2CH_2$—, —$CH_2CH_2CF_2O$—, —COO—, —OCO—, —$OCH_2$—, or —$CH_2O$—;

$Y^1$, $Y^2$, and $Y^4$ are each independently fluorine or chlorine;

q, r, and s are each independently 0, 1, or 2, and q+r+s is 1, 2, or 3; and t is 0, 1, or 2.

11. The liquid crystal composition according to claim 10, wherein the third component is at least one compound selected from the group of compounds represented by formulas (h-1) to (h-7):

(h-1)

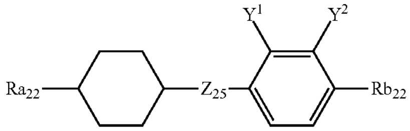

(h-2)

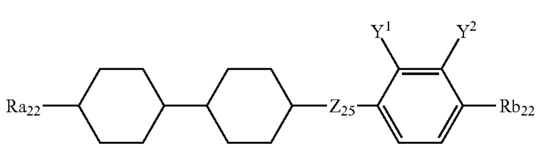

-continued (h-3)

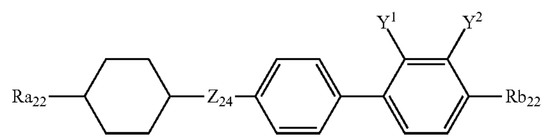

(h-4)

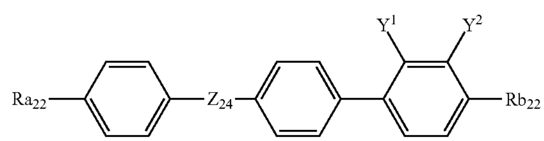

(h-5)

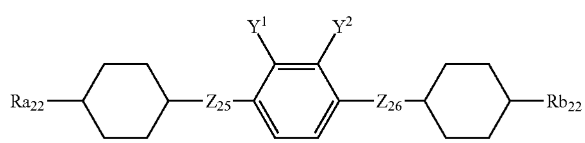

(h-6)

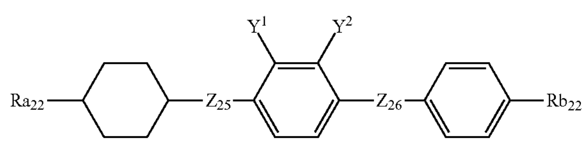

(h-7)

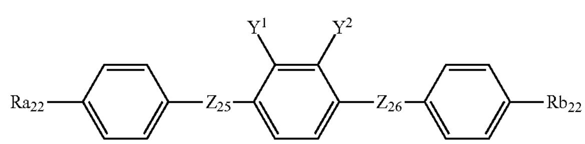

wherein $Ra_{22}$ and $Rb_{22}$ are a straight-chain alkyl having 1 to 8 carbons, a straight-chain alkenyl having 2 to 8 carbons, or alkoxy having 1 to 7 carbons;

$Z^{24}$, $Z^{25}$, and $Z^{26}$ are a single bond, —$(CH_2)_2$—, —COO—, —OCO—, —$CH_2O$—, or —$OCH_2$—; and $Y^1$ and $Y^2$ are simultaneously fluorine or one of $Y^1$ and $Y^2$ is fluorine and the other is chlorine.

12. A liquid crystal composition having a negative dielectric anisotropy that comprises a first component which is at least one compound selected from the group of compounds represented by formulas (a-1-1) to (a-1-3) and formulas (a-2-1)to (a-2-6) according to claim 4, a second component which is at least one compound selected from the group of compounds represented by formulas (e-1) to (e-3)

(e-1)

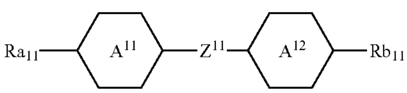

(e-2)

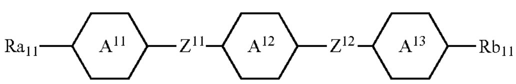

(e-3)

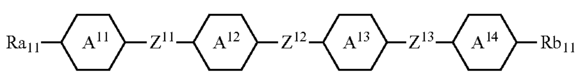

wherein $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine; ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl; and $Z^{11}$, $Z^{12}$, and $Z^{13}$ are each independently a single bond, —$(CH_2)_2$—, —CH═CH—, —CC—, —COO—, or —$CH_2O$—; and a third component which is at least one compound selected from the group of compounds represented by formulas (h-1) to (h-7) according to claim 13

(h-1)

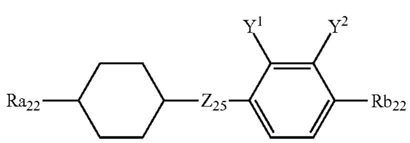

(h-2)

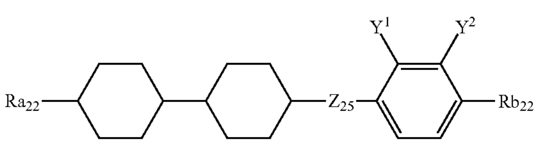

(h-3)

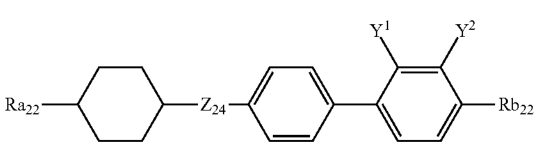

(h-4)

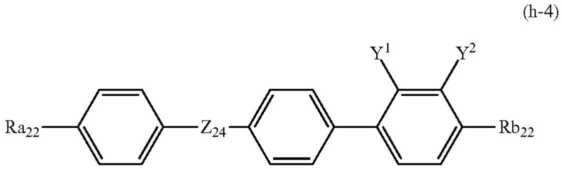

-continued (h-5)

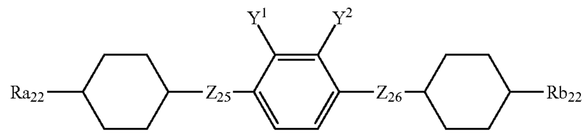

(h-6)

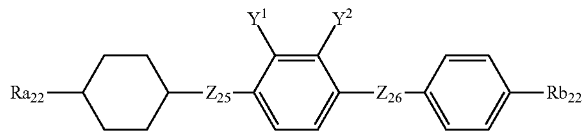

(h-7)

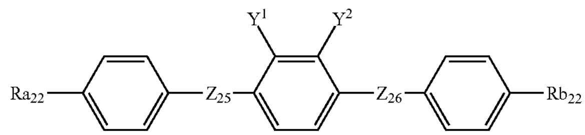

wherein $Ra_{22}$ and $Rb_{22}$ are a straight-chain alkyl having 1 to 8 carbons, a straight-chain alkenyl having 2 to 8 carbons, or alkoxy having 1 to 7 carbons; $Z^{24}$, $Z^{25}$, and $Z^{26}$ are a single bond, —$(CH_2)_2$—, —COO—, —OCO—, —$CH_2O$—, or —$OCH_2$—; and $Y^1$ and $Y^2$ are simultaneously fluorine or one of $Y^1$ and $Y^2$ is fluorine and the other is chlorine.

13. The liquid crystal composition according to claim 12, wherein the content ratio of the first component is in the range of 5% to 60% by weight, the content ratio of the second component is in the range of 20% to 75% by weight, and the content ratio of the third component is in the range of 20% to 75% by weight, based on the total weight of the liquid crystal composition.

14. A liquid crystal display device that comprises the liquid crystal composition according to claim 7.

15. The liquid crystal display device according to claim 14, wherein the operation mode thereof is a VA mode or an IPS mode, and the driving mode thereof is an active matrix mode.

16. A liquid crystal composition having a negative dielectric anisotropy that comprises a first component which is at least one compound selected from the group of compounds represented by formulas (a-1) and (a-2) according to claim 3 and a second component which is at least one compound selected from the group of compounds represented by formulas (e-1) to (e-3)

(e-1)

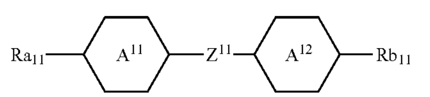

(e-2)

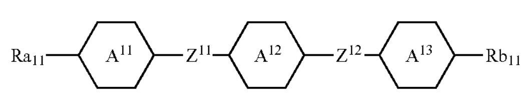

(e-3)

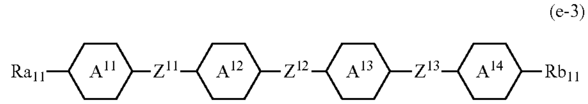

wherein $Ra_{11}$ and $Rb_{11}$ are each independently alkyl having 1 to 10 carbons, and in this alkyl, —$CH_2$— may be nonadjacently replaced by —O—, —$(CH_2)_2$— may be nonadjacently replaced by —CH═CH—, and hydrogen may be replaced by fluorine; ring $A^{11}$, ring $A^{12}$, ring $A^{13}$, and ring $A^{14}$ are each independently 1,4-cyclohexylene, 1,4-phenylene, 2-fluoro-1,4-phenylene, 3-fluoro-1,4-phenylene, pyrimidine-2,5-diyl, 1,3-dioxane-2,5-diyl, or tetrahydropyran-2,5-diyl; and $Z^{11}$, $Z^{12}$, and $Z^{13}$ are each independently a single bond, —$(CH_2)_2$—, —CH═CH—, —CC—, —COO—, or —$CH_2O$—.

17. A liquid crystal display device that comprises the liquid crystal composition according to claim 11.

18. The liquid crystal display device according to claim 17, wherein the operation mode thereof is a VA mode or an IPS mode, and the driving mode thereof is an active matrix mode.

* * * * *